US007711598B2

(12) United States Patent
Perkowski

(10) Patent No.: US 7,711,598 B2
(45) Date of Patent: *May 4, 2010

(54) WEB-BASED CONSUMER PRODUCT MARKETING COMMUNICATION NETWORK FOR MANAGING AND DELIVERING CONSUMER PRODUCT MARKETING COMMUNICATIONS TO CONSUMERS ALONG E-COMMERCE (EC) ENABLED WEB SITES ON THE WORLD WIDE WEB (WWW), USING MULTI-MODE VIRTUAL KIOSKS (MMVKS) DRIVEN BY SERVER=SIDE COMPONENTS EMBODYING CONSUMER PRODUCT IDENTIFIERS AND DRIVEN BY CONSUMER PRODUCT INFORMATION (CPI) LINKS MANAGED BY PRODUCT MANUFACTURER TEAM MEMBERS AND/OR THEIR AGENTS

(75) Inventor: Thomas J. Perkowski, Darien, CT (US)

(73) Assignee: IPF, Inc., Darien, CT (US)

( * ) Notice: Subject to any disclaimer, the term of this patent is extended or adjusted under 35 U.S.C. 154(b) by 1299 days.

This patent is subject to a terminal disclaimer.

(21) Appl. No.: 10/058,970

(22) Filed: Jan. 28, 2002

(65) Prior Publication Data

US 2003/0009392 A1 Jan. 9, 2003

Related U.S. Application Data

(63) Continuation of application No. 09/716,848, filed on Nov. 17, 2000, now abandoned, which is a continuation-in-part of application No. 09/695,744, filed on Oct. 24, 2000, which is a continuation-in-part of application No. 09/641,908, filed on Aug. 18, 2000, now abandoned, which is a continuation-in-part of application No. 09/599,690, filed on Jun. 22, 2000, now abandoned, which is a continuation-in-part of application No. 09/483,105, filed on Jan. 14, 2000, now abandoned, and a continuation-in-part of application No. 09/465,859, filed on Dec. 17, 1999, now abandoned, which is a continuation-in-part of application No. 09/447,121, filed on Nov. 22, 1999, now Pat. No. 6,625,581, and a continuation-in-part of application No. 09/441,973, filed on Nov. 17, 1999, now Pat. No. 6,961,712, which is a continuation-in-part of application No. 09/284,917, filed as application No. PCT/US97/19227 on Oct. 27, 1997, now abandoned, and a continuation-in-part of application No. 08/736,798, filed on Oct. 25, 1996, now Pat. No. 5,918,214, and a continuation-in-part of application No. 08/752,136, filed on Nov. 19, 1996, now Pat. No. 6,064,979, and a continuation-in-part of application No. 08/826,120, filed on Mar. 27, 1997, now abandoned, and a continuation-in-part of application No. 08/854,877, filed on May 12, 1997, now Pat. No. 5,950,173, and a continuation-in-part of application No. 08/871,815, filed on Jun. 9, 1997, now Pat. No. 7,143,055, and a continuation-in-part of application No. 08/936,375, filed on Sep. 24, 1997, now abandoned.

(51) Int. Cl.
*G06Q 30/00* (2006.01)

(52) U.S. Cl. ............................ 705/14; 705/26; 705/27

(58) Field of Classification Search .................. 705/14, 705/26, 27

See application file for complete search history.

(56) References Cited

U.S. PATENT DOCUMENTS

| | | | |
|---|---|---|---|
| 4,654,482 | A | 3/1987 | DeAngelis |
| 4,775,935 | A | 10/1988 | Yourick |
| 4,841,132 | A | 6/1989 | Kajitani et al. |
| 5,029,104 | A | 7/1991 | Dodson |
| 5,264,822 | A | 11/1993 | Vogelman et al. |
| 5,288,976 | A | 2/1994 | Citron et al. |
| 5,307,456 | A | 4/1994 | MacKay |
| 5,319,542 | A | 6/1994 | King, Jr. et al. |
| 5,333,237 | A | 7/1994 | Stefanopoulos |
| 5,355,472 | A | 10/1994 | Lewis |
| 5,398,336 | A | 3/1995 | Tantry et al. |
| 5,448,046 | A | 9/1995 | Swartz |
| 5,524,195 | A | 6/1996 | Clanton et al. |

| | | | |
|---|---|---|---|
| 5,528,490 | A | 6/1996 | Hill |
| 5,532,735 | A | 7/1996 | Blahut |
| 5,572,643 | A | 11/1996 | Judson |
| 5,583,560 | A | 12/1996 | Florin |
| 5,592,378 | A | 1/1997 | Cameron et al. |
| 5,594,509 | A | 1/1997 | Florin et al. |
| 5,612,527 | A | 3/1997 | Ovadia |
| 5,635,694 | A | 6/1997 | Tuhro |
| 5,640,193 | A | 6/1997 | Wellner |
| 5,694,546 | A | 12/1997 | Reisman |
| 5,715,444 | A | 2/1998 | Danish et al. |
| 5,721,827 | A | 2/1998 | Logan et al. |
| 5,724,521 | A | 3/1998 | Dedrick |
| 5,737,619 | A | 4/1998 | Judson |
| 5,737,739 | A | 4/1998 | Shirley et al. |
| 5,740,549 | A | 4/1998 | Reilly et al. |
| 5,742,768 | A | 4/1998 | Gennaro et al. |
| 5,761,071 | A | 6/1998 | Bernstein et al. |
| 5,804,803 | A | 9/1998 | Cragun et al. |
| 5,838,906 | A | 11/1998 | Doyle et al. |
| 5,841,978 | A | 11/1998 | Rhoads |
| 5,854,897 | A | 12/1998 | Radziewicz et al. |
| 5,864,823 | A | 1/1999 | Levitan |
| 5,869,819 | A | 2/1999 | Knowles et al. |
| 5,890,175 | A | 3/1999 | Wong et al. |
| 5,895,454 | A | 4/1999 | Harrington |
| 5,897,622 | A | 4/1999 | Blinn et al. |
| 5,902,353 | A | 5/1999 | Reber et al. |
| 5,903,729 | A | 5/1999 | Reber et al. |
| 5,905,248 | A | 5/1999 | Russell et al. |
| 5,905,251 | A | 5/1999 | Knowles |
| 5,913,040 | A | 6/1999 | Rakavy et al. |
| 5,913,210 | A | 6/1999 | Call |
| 5,918,213 | A | 6/1999 | Bernard et al. |
| 5,918,214 | A | 6/1999 | Perkowski |
| 5,930,767 | A | 7/1999 | Reber et al. |
| 5,933,811 | A | 8/1999 | Angles et al. |
| 5,933,829 | A | 8/1999 | Durst et al. |
| 5,937,390 | A | 8/1999 | Hyodo |
| 5,937,392 | A | 8/1999 | Alberts |
| 5,938,726 | A | 8/1999 | Reber et al. |
| 5,940,074 | A | 8/1999 | Britt et al. |
| 5,940,595 | A | 8/1999 | Reber et al. |
| 5,946,646 | A | 8/1999 | Schena et al. |
| 5,948,061 | A | 9/1999 | Merriman et al. |
| 5,950,173 | A | 9/1999 | Perkowski |
| 5,957,695 | A | 9/1999 | Redford et al. |
| 5,959,623 | A | 9/1999 | Van Hoff et al. |
| 5,960,411 | A | 9/1999 | Hartman et al. |
| 5,963,916 | A | 10/1999 | Kaplan |
| 5,964,836 | A | 10/1999 | Rowe et al. |
| 5,966,696 | A | 10/1999 | Giraud |
| 5,971,277 | A | 10/1999 | Cragun et al. |
| 5,978,773 | A | 11/1999 | Hudetz et al. |
| 5,979,757 | A | 11/1999 | Tracy et al. |
| 5,986,651 | A | 11/1999 | Reber et al. |
| 5,992,752 | A | 11/1999 | Wilz, Sr. et al. |
| 5,995,105 | A | 11/1999 | Reber et al. |
| 5,996,007 | A | 11/1999 | Klug et al. |
| 5,999,912 | A | 12/1999 | Wodarz et al. |
| 5,999,914 | A | 12/1999 | Blinn et al. |
| 6,009,407 | A | 12/1999 | Garg |
| 6,009,410 | A | 12/1999 | LeMole et al. |
| 6,011,537 | A | 1/2000 | Slotznick |
| 6,012,083 | A | 1/2000 | Savitzky et al. |
| 6,012,102 | A | 1/2000 | Shachar |
| 6,027,024 | A | 2/2000 | Knowles |
| 6,032,195 | A | 2/2000 | Reber et al. |
| 6,035,332 | A | 3/2000 | Ingrassia, Jr. et al. |
| 6,038,545 | A | 3/2000 | Mandeberg et al. |
| 6,044,218 | A | 3/2000 | Faustini |
| 6,045,048 | A | 4/2000 | Wilz, Sr. et al. |
| 6,061,659 | A | 5/2000 | Murray |
| 6,064,979 | A | 5/2000 | Perkowski |
| 6,065,024 | A | 5/2000 | Renshaw |
| 6,078,848 | A | 6/2000 | Bernstein |
| 6,081,827 | A | 6/2000 | Reber et al. |
| 6,091,411 | A | 7/2000 | Straub |
| 6,094,673 | A | 7/2000 | Dilip et al. |
| 6,108,656 | A | 8/2000 | Durst et al. |
| 6,119,165 | A | 9/2000 | Li et al. |
| 6,125,388 | A | 9/2000 | Reisman |
| 6,134,548 | A | 10/2000 | Gottsman et al. |
| 6,138,151 | A | 10/2000 | Reber et al. |
| 6,141,666 | A | 10/2000 | Tobin |
| 6,152,369 | A | 11/2000 | Wilz et al. |
| 6,154,738 | A | 11/2000 | Call |
| 6,157,946 | A | 12/2000 | Itakura et al. |
| 6,199,048 | B1 | 3/2001 | Hudetz et al. |
| 6,213,394 | B1 | 4/2001 | Schumacher et al. |
| 6,247,044 | B1 | 6/2001 | Gosling et al. |
| 6,314,451 | B1 | 11/2001 | Landsman et al. |
| 6,314,457 | B1 | 11/2001 | Schena et al. |
| 6,317,761 | B1 | 11/2001 | Landsman |
| 6,430,554 | B1 | 8/2002 | Rothschild |
| 6,434,563 | B1 | 8/2002 | Pasquali et al. |
| 6,448,979 | B1 | 9/2002 | Schena et al. |
| 6,490,567 | B1 | 12/2002 | Gregory |
| 6,532,481 | B1 | 3/2003 | Fassett, Jr. |
| 6,865,593 | B1 | 3/2005 | Reshef et al. |
| 6,925,495 | B2 | 8/2005 | Hegde et al. |
| 6,959,286 | B2 | 10/2005 | Perkowski |
| 2002/0129089 | A1 | 9/2002 | Hegde et al. |
| 2002/0161672 | A1 | 10/2002 | Banks et al. |

FOREIGN PATENT DOCUMENTS

| | | | |
|---|---|---|---|
| EP | 0 744 856 | A2 | 11/1996 |
| EP | 0 822 535 | A3 | 2/1998 |
| EP | 0 837 406 | A2 | 4/1998 |
| EP | 0 856 812 | A2 | 5/1998 |
| EP | 0 856 812 | A3 | 5/1999 |
| WO | WO 00/28455 | | 5/1900 |
| WO | WO 95/15533 | | 6/1995 |
| WO | WO 96/30864 | | 10/1996 |
| WO | WO 97/01137 | | 1/1997 |
| WO | WO 97/07656 | | 3/1997 |
| WO | WO 97/21183 | | 6/1997 |
| WO | WO 97/37319 | | 10/1997 |
| WO | WO 98/03923 | | 1/1998 |
| WO | WO 98/06055 | | 2/1998 |
| WO | WO 98/09243 | | 3/1998 |
| WO | WO 98/19259 | | 5/1998 |
| WO | WO 98/20411 | | 5/1998 |
| WO | WO 98/20434 | | 5/1998 |
| WO | WO 98/20440 | | 5/1998 |
| WO | WO 98/21679 | | 5/1998 |
| WO | WO 98/21713 | | 5/1998 |
| WO | WO 98/24036 | | 6/1998 |
| WO | WO 98/24049 | | 6/1998 |
| WO | WO 98/25198 | | 6/1998 |
| WO | WO 98/29822 | | 7/1998 |
| WO | WO 98/34458 | | 8/1998 |
| WO | WO 98/35297 | | 8/1998 |
| WO | WO 98/38589 | | 9/1998 |
| WO | WO 98/38761 | | 9/1998 |
| WO | WO 98/51035 | | 11/1998 |
| WO | WO 98/51036 | | 11/1998 |
| WO | WO 98/51077 | | 11/1998 |
| WO | WO 98/57295 | | 12/1998 |
| WO | WO 98/58320 | | 12/1998 |
| WO | WO 99/00756 | | 1/1999 |
| WO | WO 99/33013 | | 7/1999 |
| WO | WO 99/33014 | | 7/1999 |
| WO | WO 00/16205 | | 3/2000 |
| WO | WO 00/16211 | | 3/2000 |

| | | |
|---|---|---|
| WO | WO 00/43862 | 7/2000 |
| WO | WO 00/45302 | 8/2000 |
| WO | WO 00/50844 | 8/2000 |
| WO | WO 00/63780 | 10/2000 |
| WO | WO 00/65509 | 11/2000 |
| WO | WO 00/70525 | 11/2000 |
| WO | WO 01/01586 A3 | 1/2001 |
| WO | WO 01/15019 A2 | 3/2001 |
| WO | WO 01/15021 A2 | 3/2001 |
| WO | WO 01/15035 A2 | 3/2001 |
| WO | WO 01/39001 A1 | 5/2001 |

OTHER PUBLICATIONS

PCT/US00/31757, 2001.
PCT/US97/19227, 1998.
U.S. Appl. No. 08/691,263, filed Jan. 1, 2000, Swift et al.
Product brochure for the Open AdStream System (OAS) by Real Media, 1995, pp. 1-9.
Product brochure entitled "The Catalog" (1996) by QuickResponse Services Corporation, www.qrs.com, pp. 1-2.
Operating manual for the QRS Keystone for Vendors (1996) by QRS Corporation, www.qrs.com, pp. 1-126.
Operating manual for the QRS Keystone for Retailers (1996) by QRS Corporation, www.qrs.com, pp. 1-115.
Web-based product for the Synclink Item Catalog by Vialink, Inc., http://www.vialink.com/products-catalog.html, 1 page.
Excerpts from the web-based publication entitled "Introduction to JDBC® " by JavaSoft, circa 1999, http://java.sun.com/docs/books/dbc/into.html, pp. 1-4.
Scientic article entitled "Animating the Ad" by Mark Gimein, The Industry Standard, Feb. 22-Mar. 1, 1999, pp. 1-6.
Web-based product brochure for "Home Network Enliven Services" by Enliven Services, http://www.enliven.com/products/prodinfo.htm, 1999, pp. 1-8.
Web-based product brochure for "Thinking Media ActiveAds" by Thinking Media, http://thethinkingmedia.com/activeads/index.html, 1999, 1 page.
Product brochure for "NCR Web Kiosk Solutions" by NCR Corporation, www.ncr.com, 1999, pp. 1-14.
Scientific publication entitled "In-House vs. Out-Sourced Ad Serving" by Real Media, Inc., Fort Washington PA, Dec. 22, 1998, pp. 1-4.
Scientific publication entitled "IDOCs™ Linking the Worlds of Print and Electronic Media[SM] " by NeoMedia Technologies, Inc., Sep. 11, 1998, pp. 1-8.
Press Release entitled "Applied Intelligence Group Inc. Announces New Product Solution that Enhances its Core ViaLink Service" by Investors Press Releases., http://www2.vialink.com/investors/press_releases/02_24_98.html, Feb. 24, 1998, pp. 1-2.
Web-based technical report entitled "Amended Annual Report (10KSB) for Applied Intelligence Group, Inc." http://www.edgar-online.com, Mar. 28, 1997, pp. 1-55.
Draft Technical Report entitled "Thre Retail Store of the Future: Crest of the Third Wave" by Robert J. Corey, Ph.D. and John R. Spears, Ed.D., Jan. 15, 1997, pp. 1-45.
Product Brochure for the PREMO WEBDOX by Premenos Corporation, Concord, CA, www.premenos.com, 1997, 1 page.
Operating manual entitled "WEBDOX General Information Manual" by Premenos Corp., Concord, CA, 1996-1997, pp. 1-20.
Scientific publication entitled "Smart Catalogs and Virtual Catalogs" by Keller, Computer Sci.Dept., Stanford University, 1995, pp. 1-11.
Scientific publication entitled "World-Wide Web: The Information Universe", 1996, by Tim Berners-Lee et al., CERN, 1211 Geneva 23, Switzerland, pp. 1-8.
Web article entitled "Macromedia Takes Stake in ePod" by Pamela Parker, Jul. 5, 2000, http://www.clickz.com/news/article/php/408081.
Web article entitled "New Ad Vehicle Fights the Banner Ad Clickthrough Dilemma" by Ann M. Mack, May 22, 2000, Brandweek, http://www.findarticles.com/p/articles/mi_moBDW/is_21_41/ai_62661555.
Web article entitled "NBCi Signs 3-Tier Deal to Plug ePod Showcase" by Ann M. Mack, 2001, AdweekOnline, http://www.geoffclendenning.com/Adweek%20Online2.htm.
Web article entitled "e-Pod Bundles with DoubleClick", AdWeekOnline Interactive Neww, Jun. 15, 2000, http://www.goffclendenning.com/Adweek%20Online.htm.
Web Article entitled "E-Commerce Report: E-Tailers Fine-Tune Affiliate Sales" by Bob Tedeschi, Nov. 6, 2000, New York Times on the Web, http://www.geoffclendenning.com/NYTimes_press.htm.

*Primary Examiner*—Mark Fadok
(74) *Attorney, Agent, or Firm*—Thomas J. Perkowski, Esq., P.C.

(57) ABSTRACT

A Web-based consumer product marketing communication network for managing and delivering consumer product marketing communications to consumers along E-Commerce (EC) enabled Web sites on the World Wide Web (WWW). The network employs one or more Web-based Multi-Mode Virtual Kiosks (MMVKs), each having a plurality of independently programmable display modes, for displaying one or more advertising spots, one or more promotional spots, and a set of consumer product information (CPI) resources through its Web-based graphical user interface (GUI). The network also includes a database server for storing and managing a CPI link structure for each MMVK deployed on the network. Each CPI link structure includes a consumer product identifier assigned to the corresponding consumer product, and a set of URLs specifying the location of a plurality of CPI resources located on the WWW. Members of product management team use the set of URLs to program the programmable display modes of each MMVK. By virtue of the MMVK-driven communication network of the present invention, consumer product management teams can now consistently deliver to product information and brand messaging to consumers along electronic streams of commerce.

17 Claims, 172 Drawing Sheets

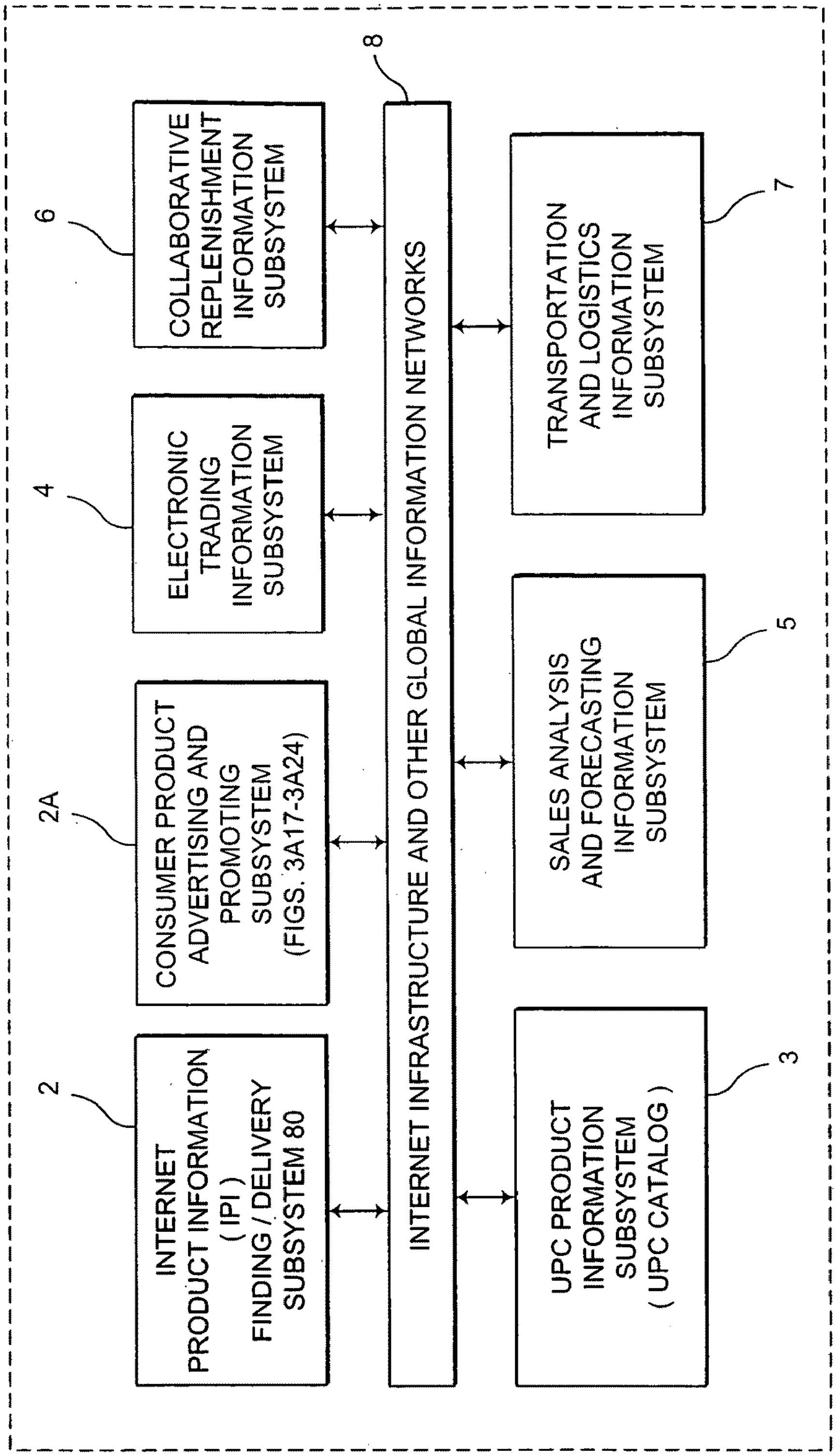
1
First Illustrative Embodiment
F I G. 1

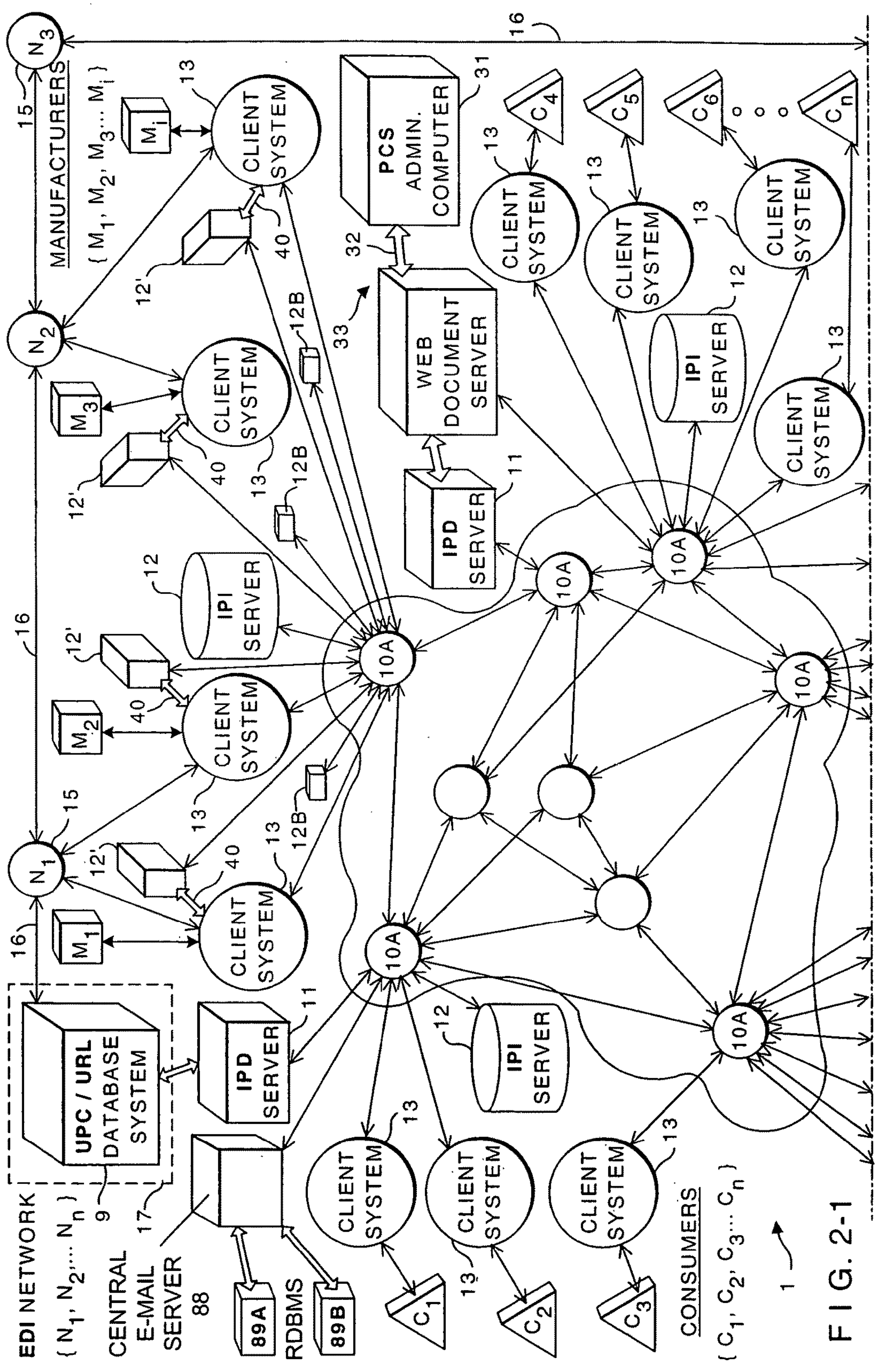
F I G. 2-1

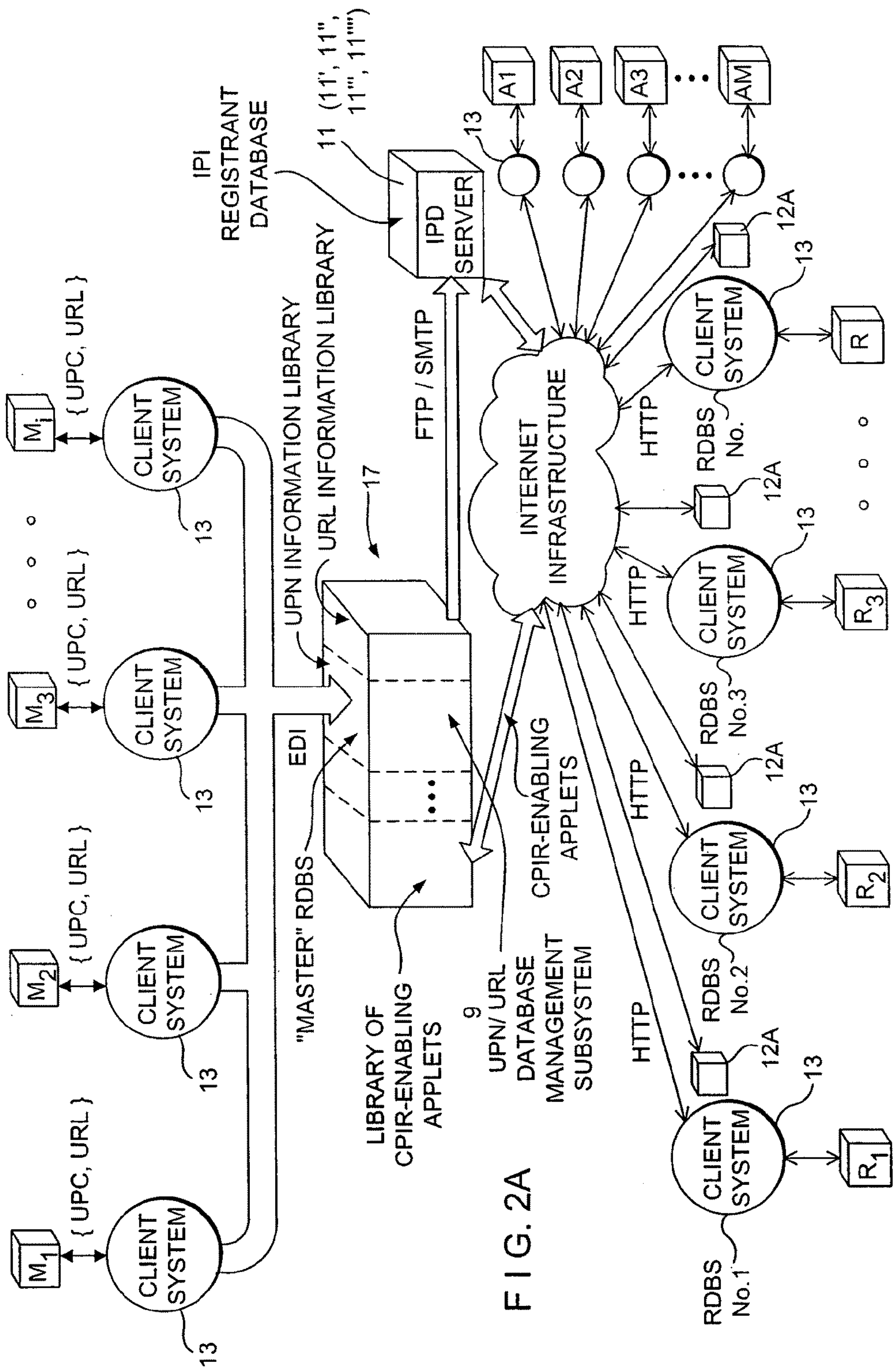
F I G. 2A

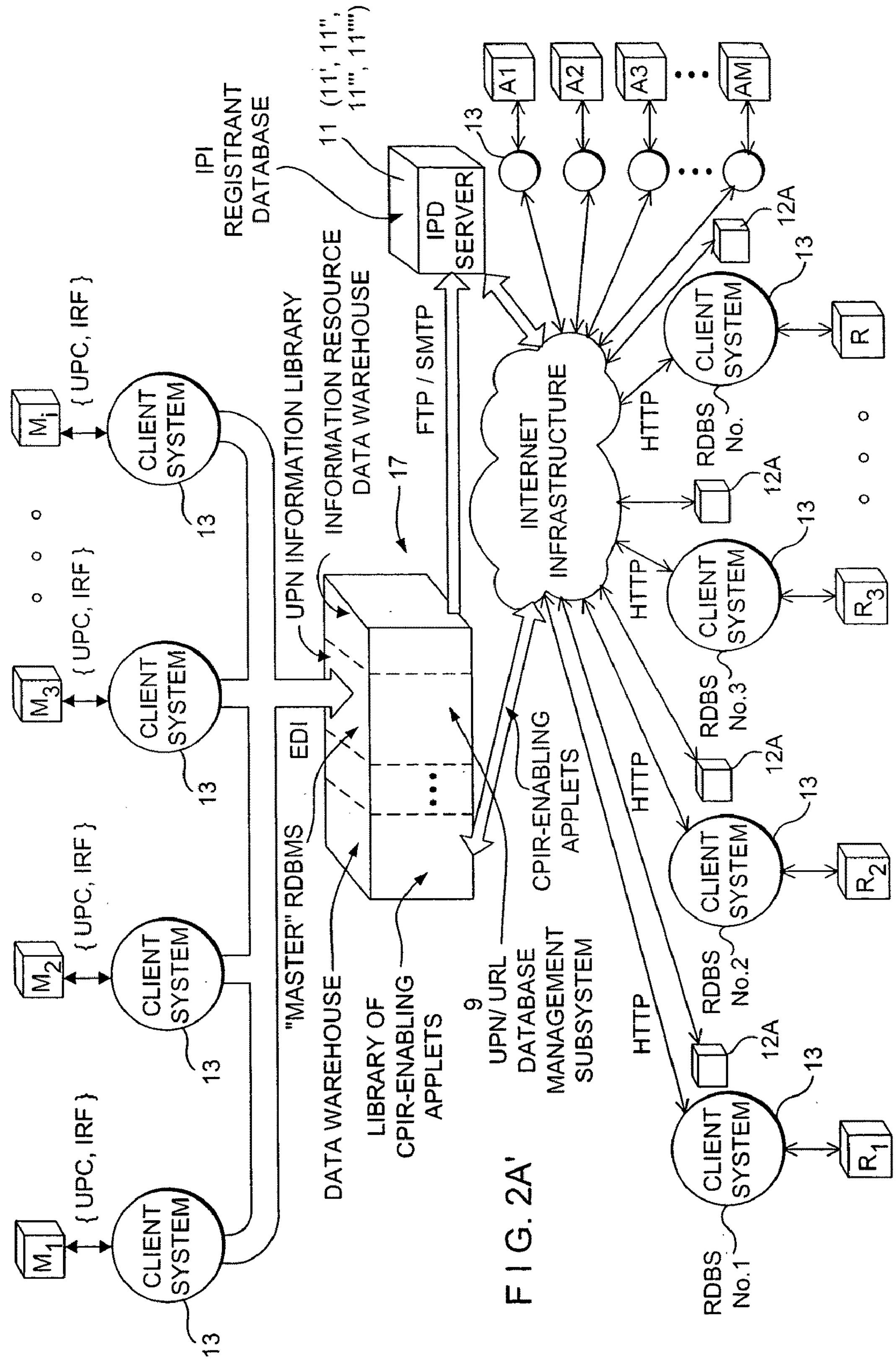
F I G. 2A'

MECHANISM FOR ACCESSING CONSUMER PRODUCT INFORMATION FROM RDBMS SERVER USING SERVER-SIDE APPLETS EMBEDDED IN HTML DOCUMENTS
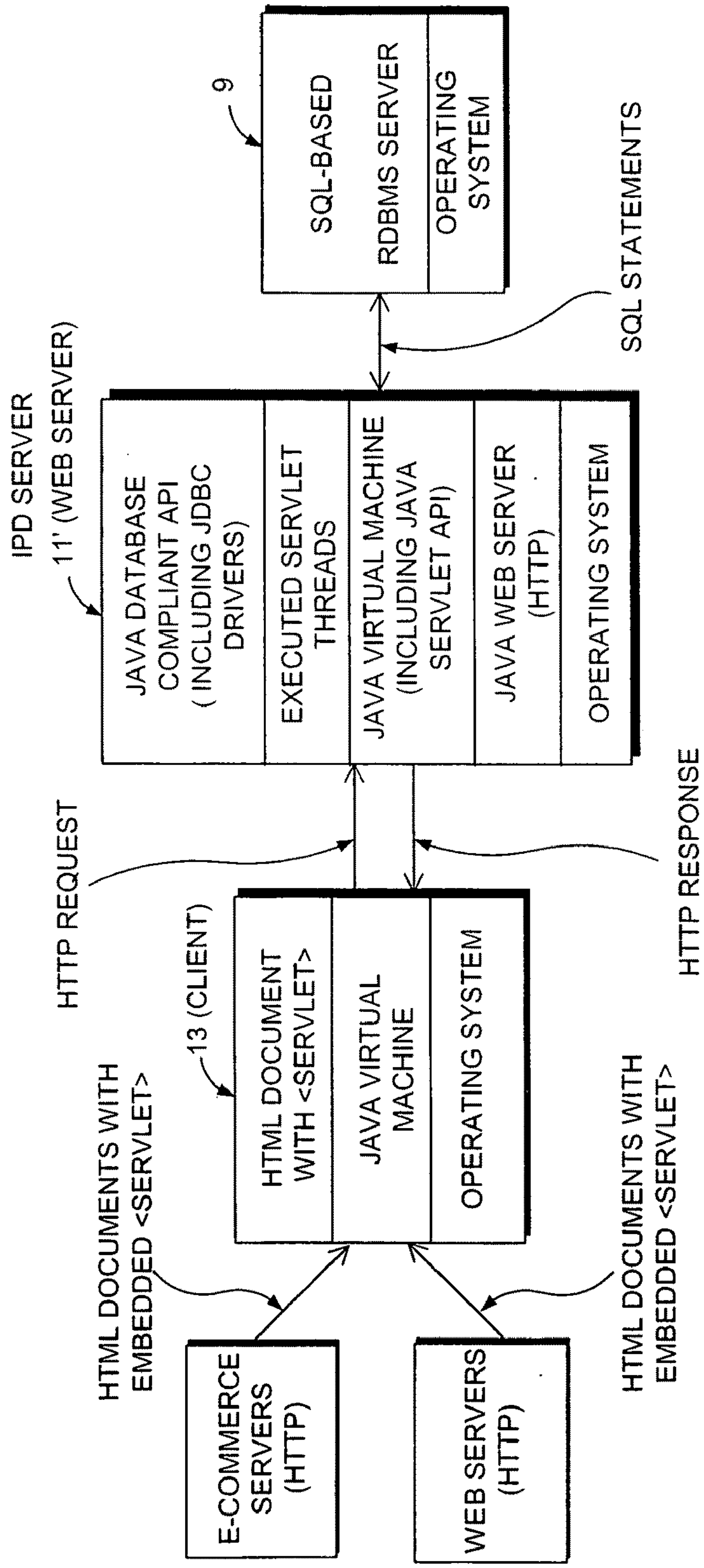
FIG. 2B1

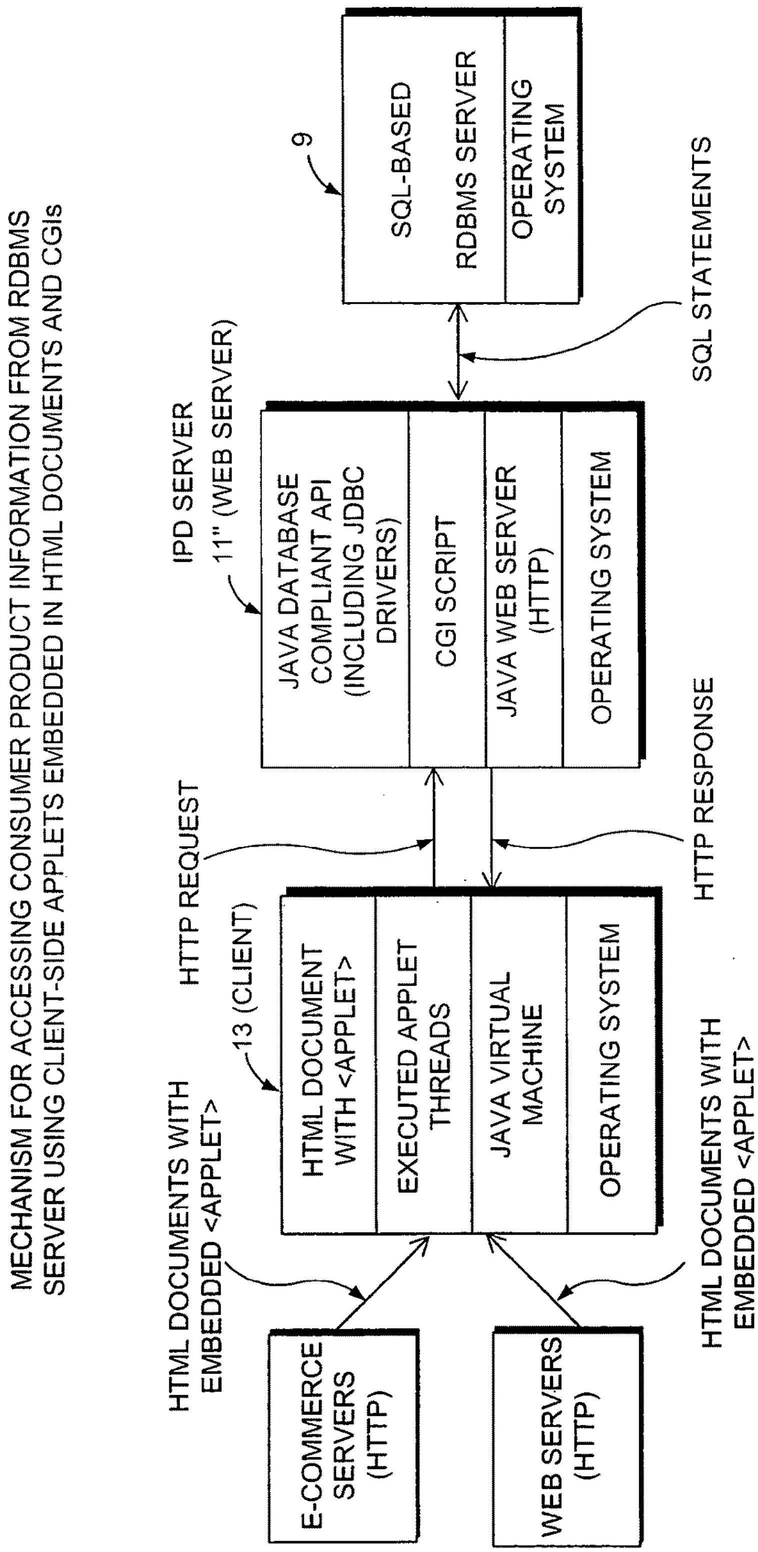
FIG. 2B2

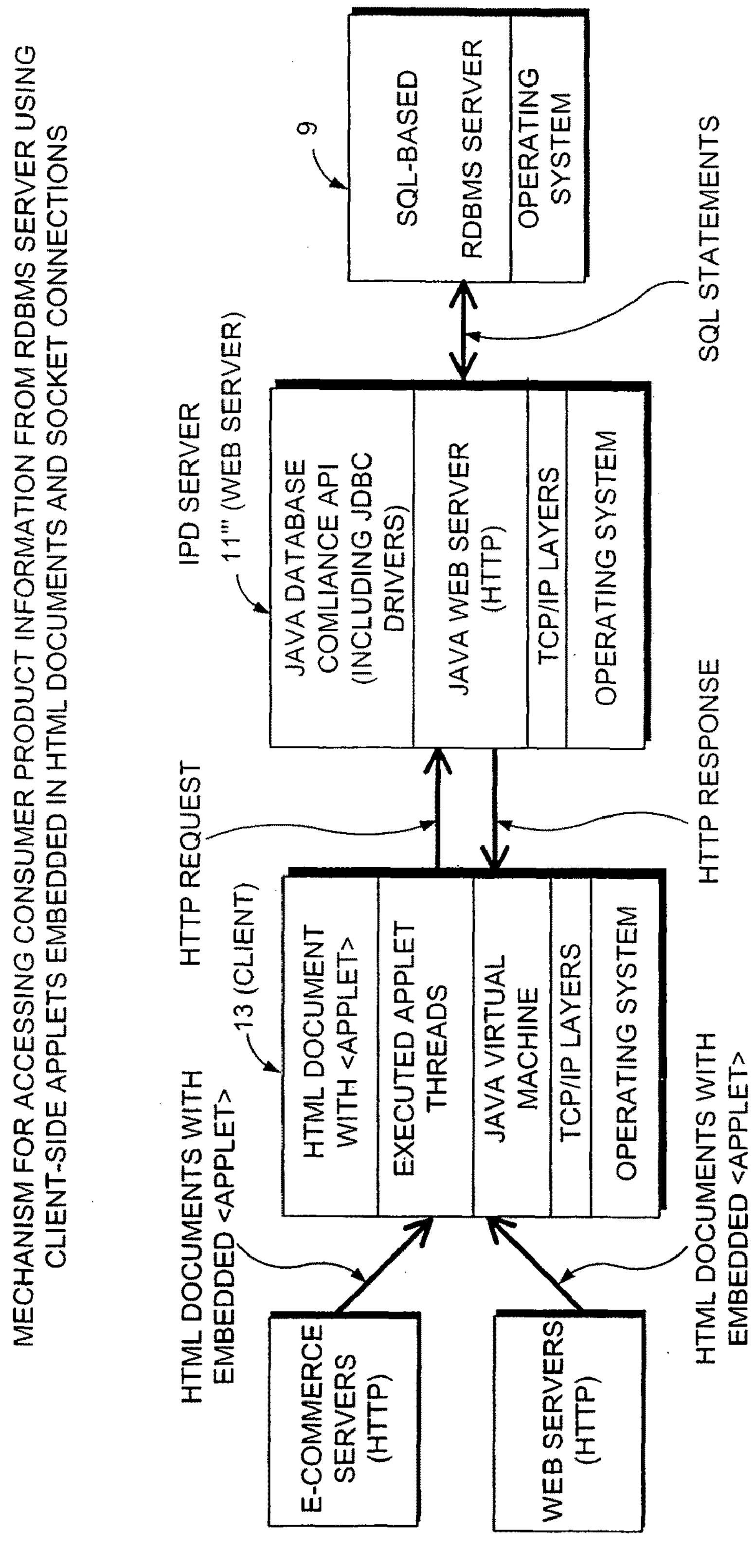
F I G. 2B3

MECHANISM FOR ACCESSING CONSUMER PRODUCT INFORMATION FROM RDBMS SERVER USING CLIENT-SIDE APPLETS EMBEDDED IN HTML DOCUMENTS AND REMOTE METHOD OF INVOCATION (RMI) ON JAVA WEB SERVER
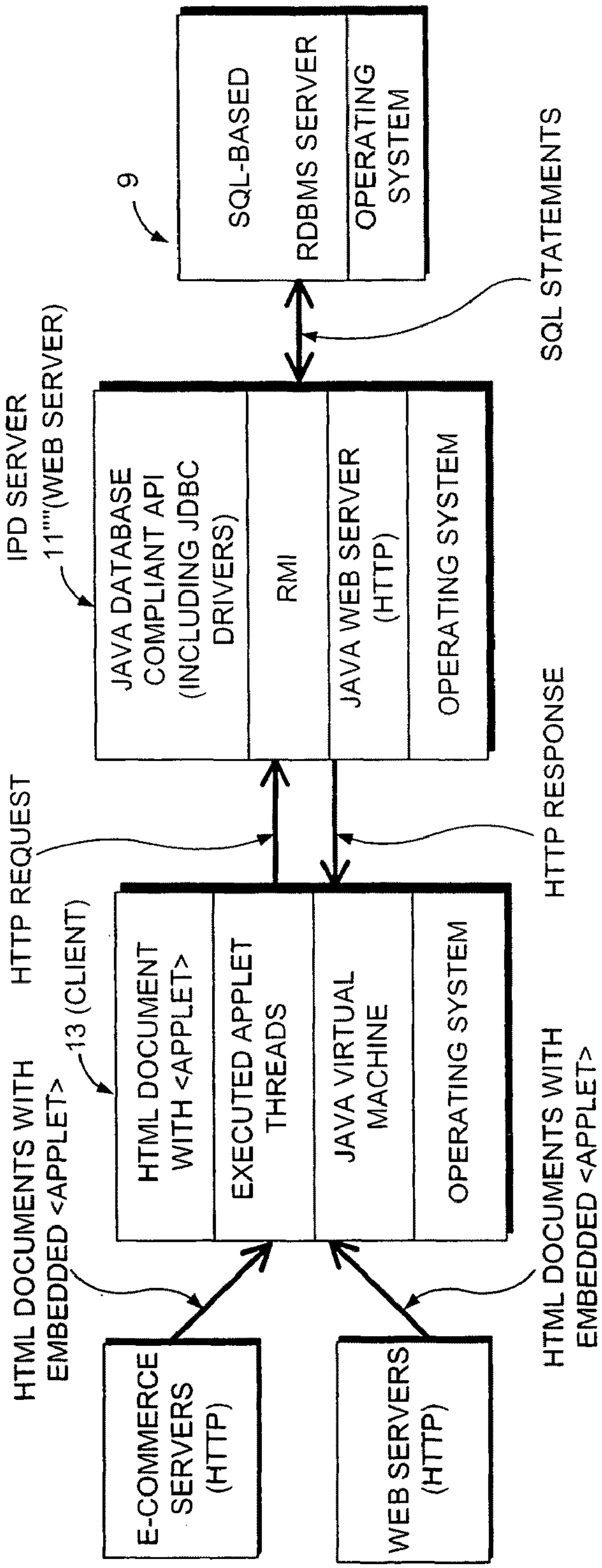
F I G. 2B4

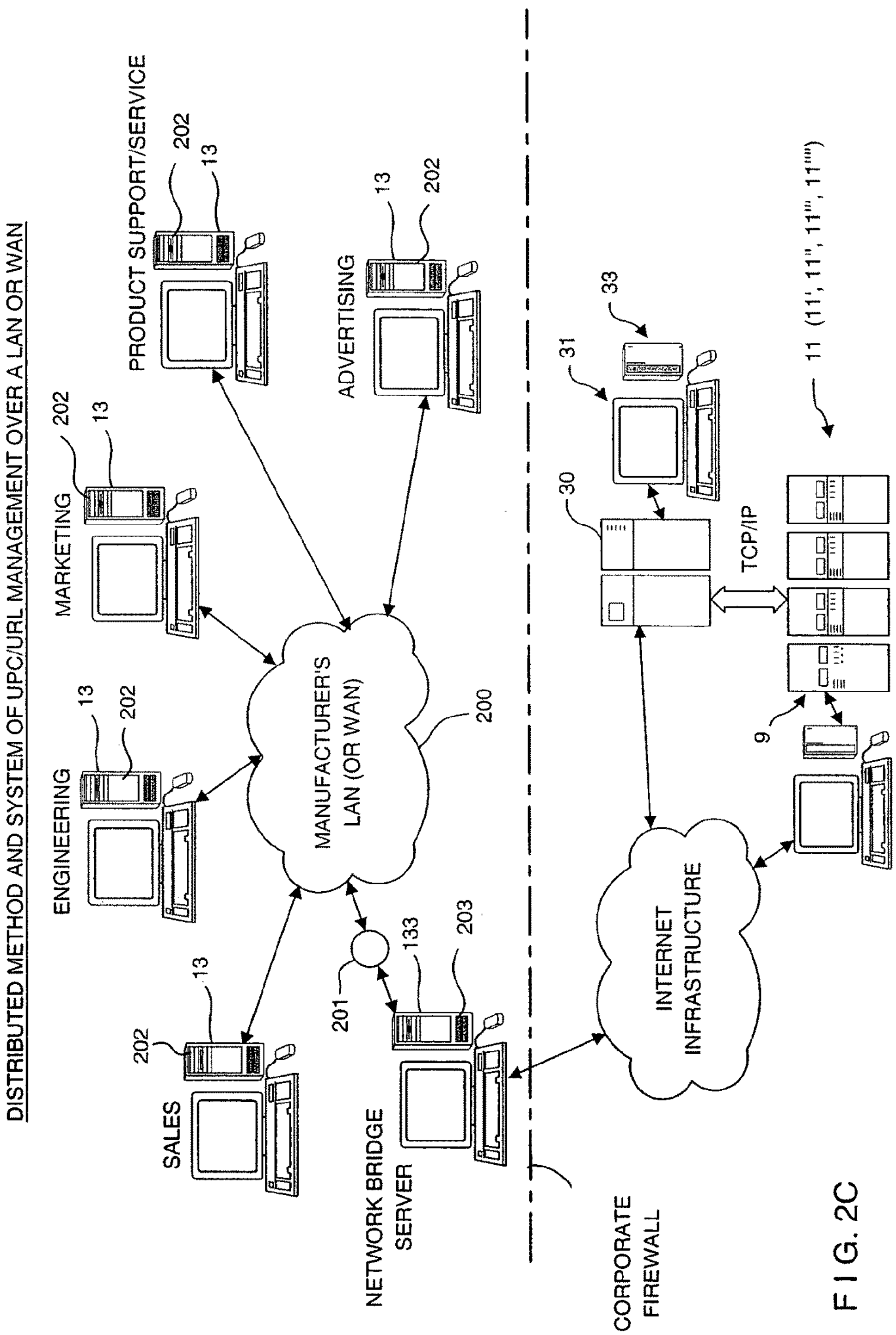
F I G. 2C

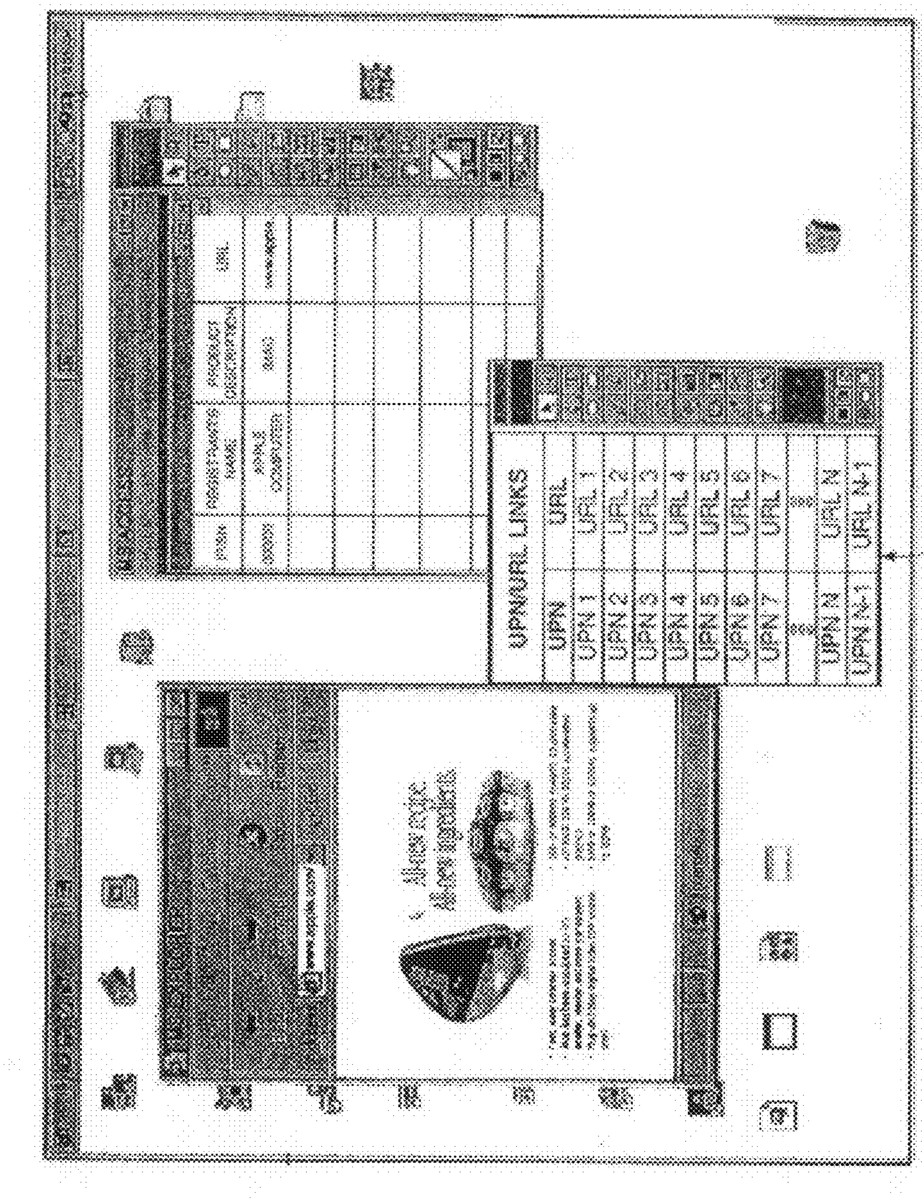
FIG. 2C1

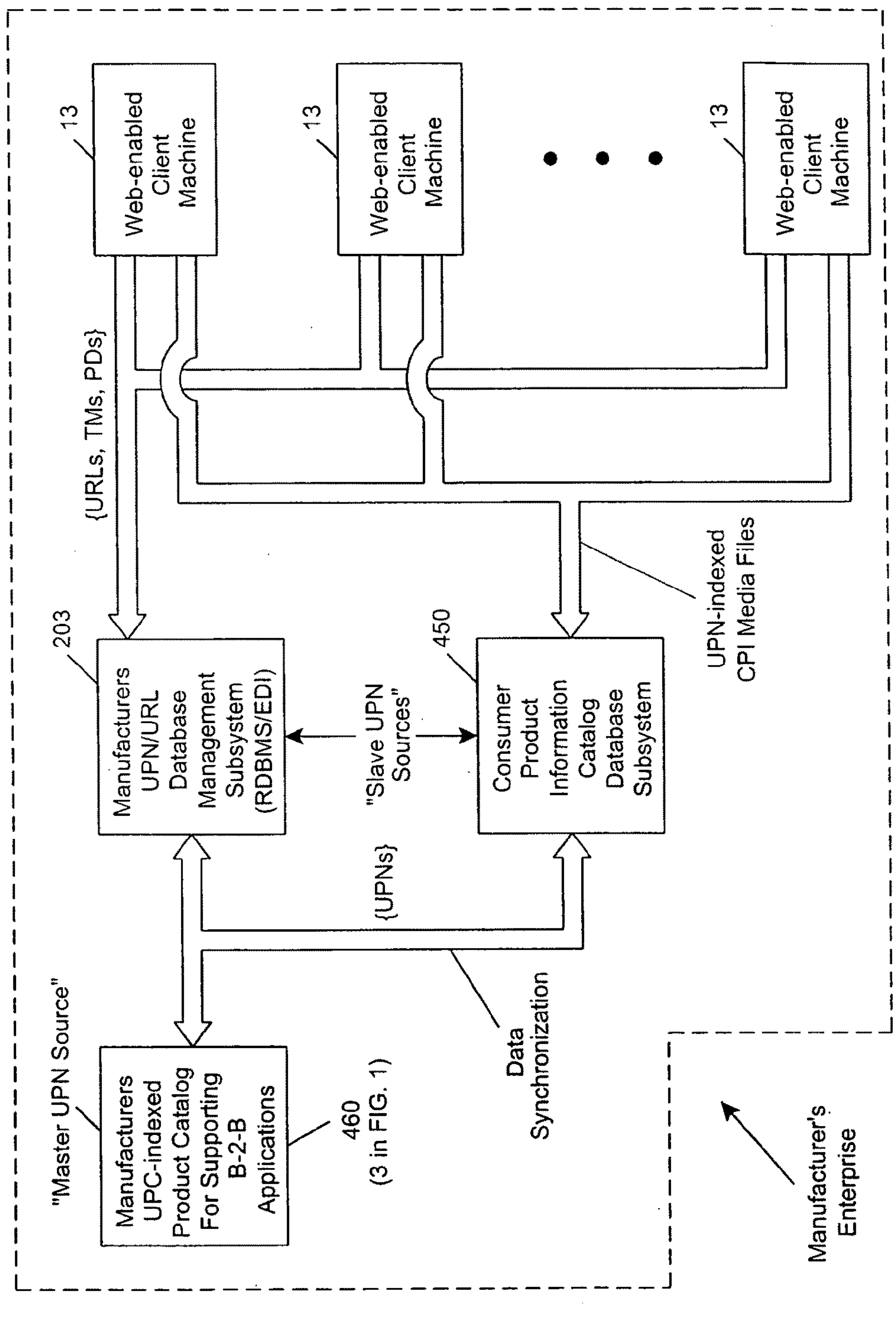
FIG. 2C2

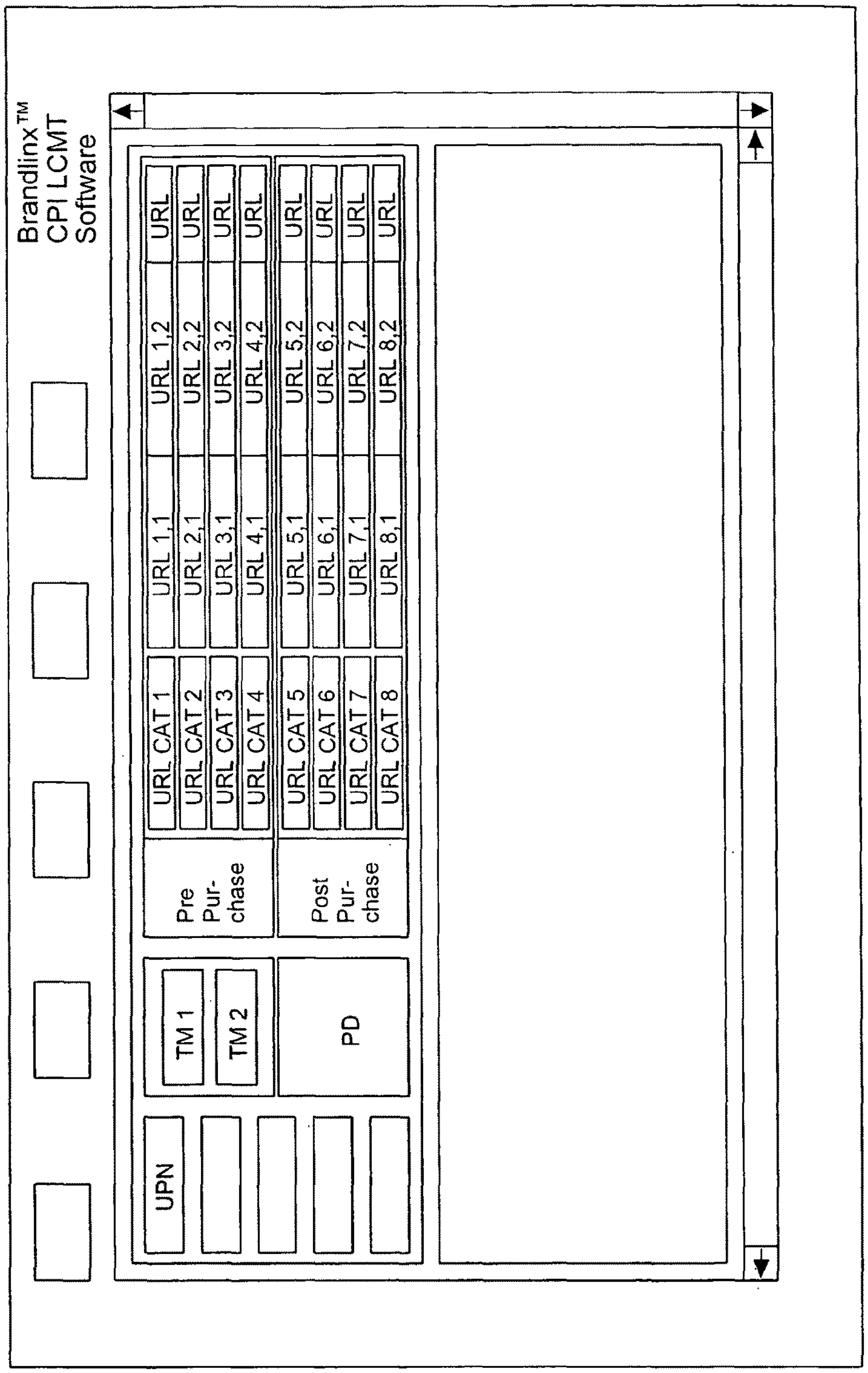
FIG. 2C3

DISTRIBUTED METHOD AND SYSTEM OF UPC/URL MANAGEMENT OVER A LAN OR WAN
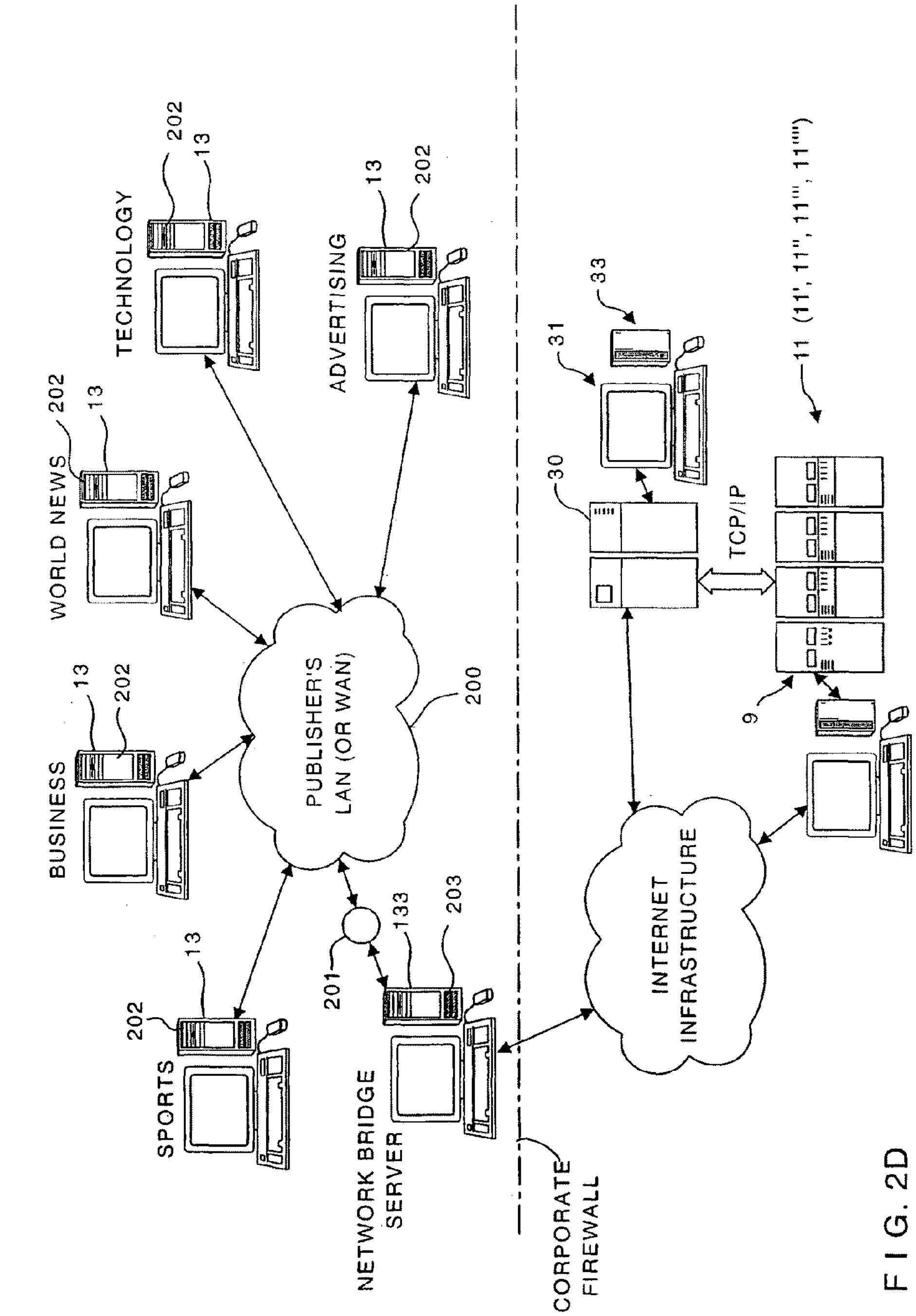
F I G. 2D

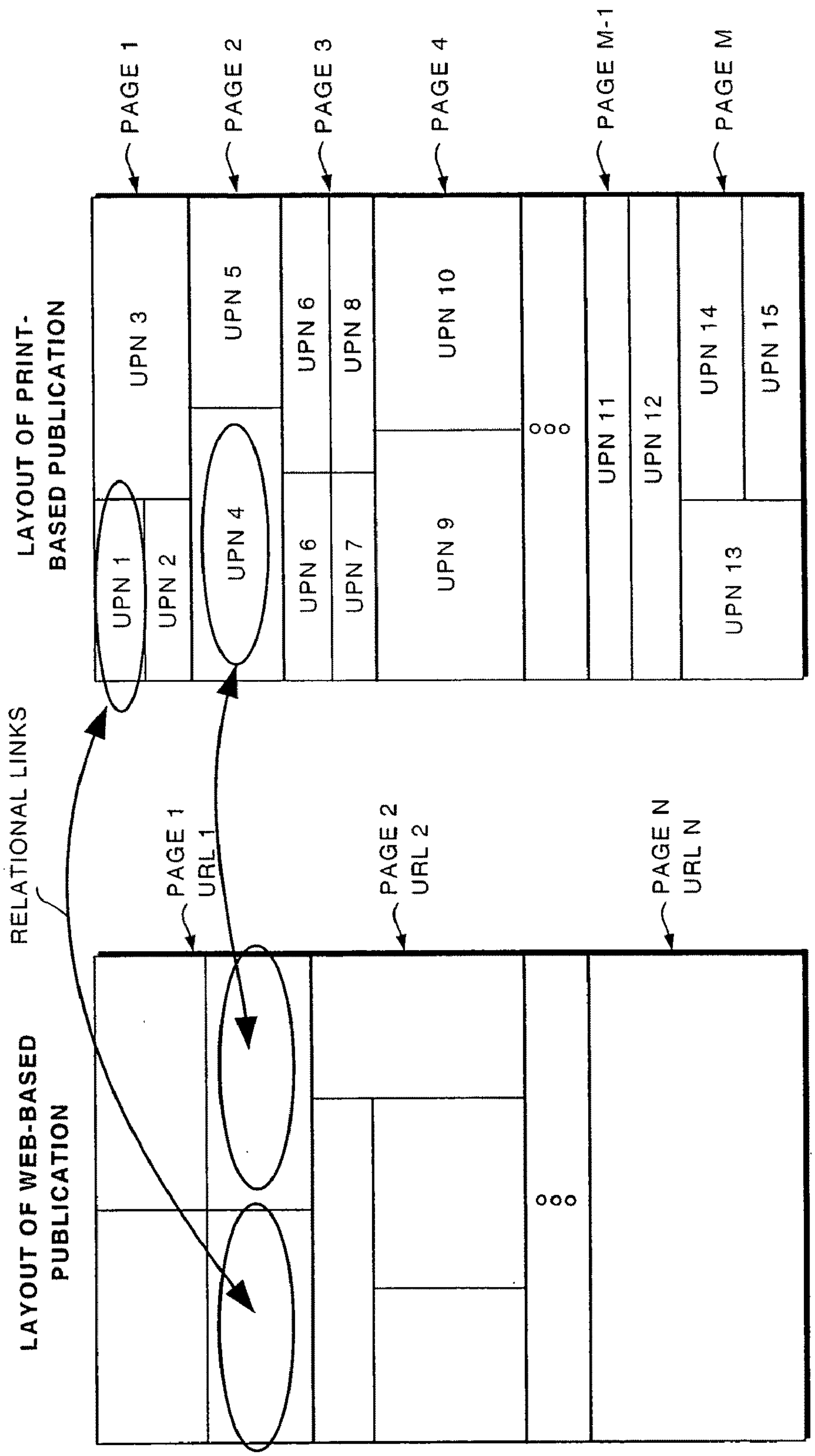
FIG. 2E2
FIG. 2E1

| UPN/URL LINKS | |
|---|---|
| UPN | URL |
| UPN 1 | URL 1 |
| UPN 2 | URL 2 |
| UPN 3 | URL 3 |
| UPN 4 | URL 4 |
| UPN 5 | URL 5 |
| UPN 6 | URL 6 |
| UPN 7 | URL 7 |
| UPN 8 | URL 8 |
| UPN 9 | URL 9 |
| UPN 10 | URL 10 |
| UPN 11 | URL 11 |
| UPN 12 | URL 12 |
| UPN 13 | URL 13 |
| ooo | ooo |
| UPN N | URL N |
| UPN N-1 | URL N-1 |

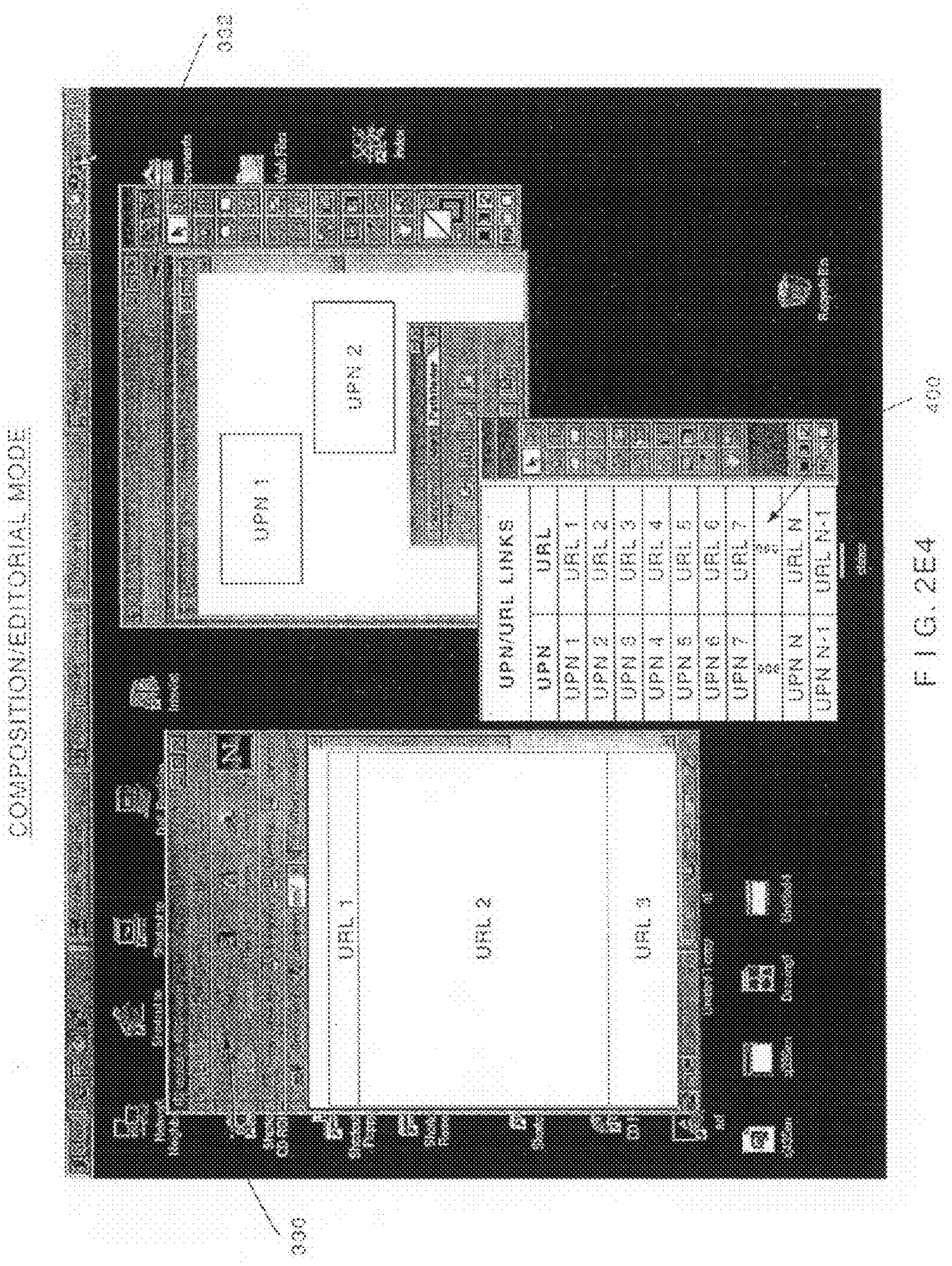
FIG. 2E4

UPN/URL DATA LINKING MODE
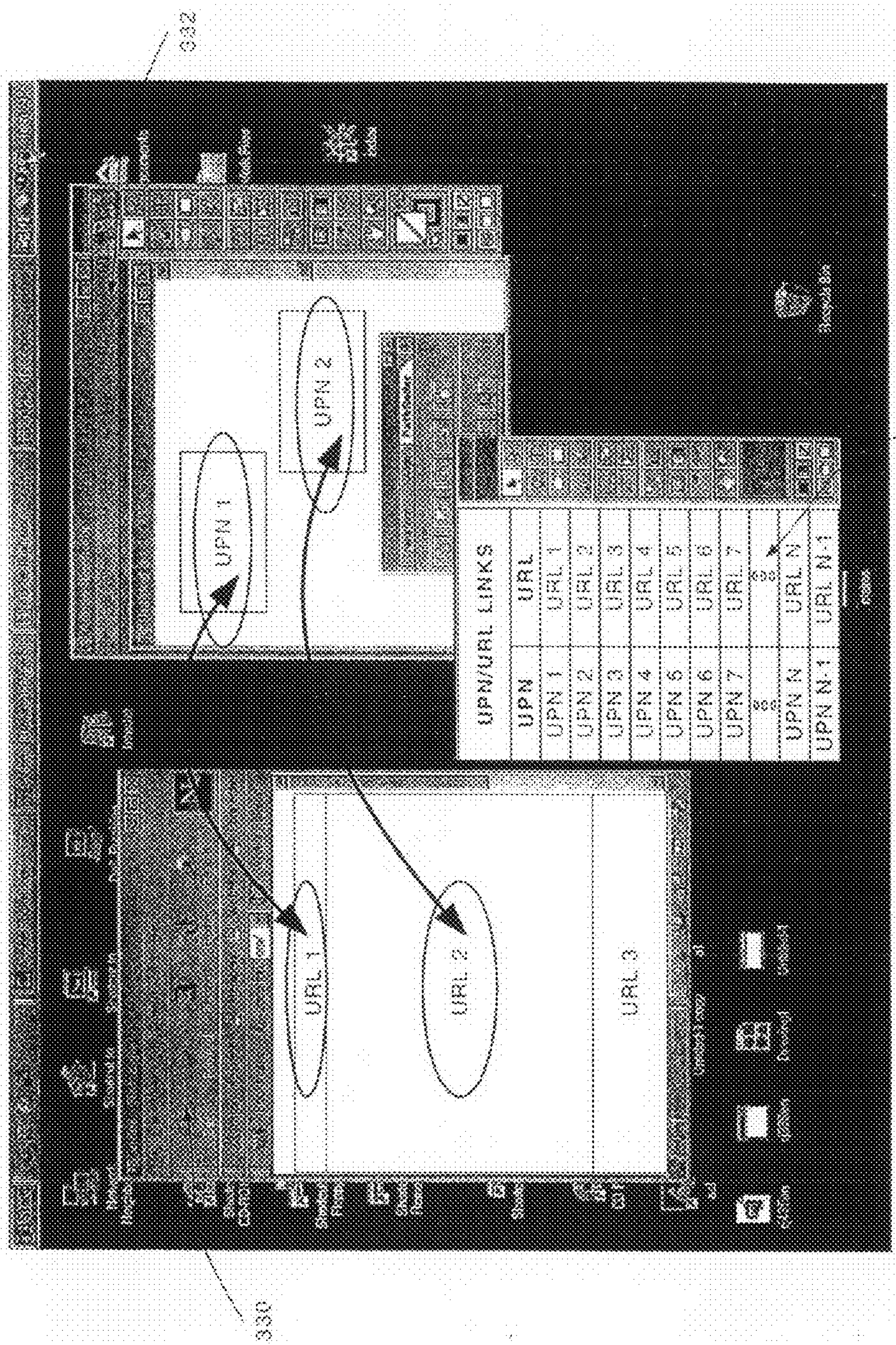
FIG. 2E5

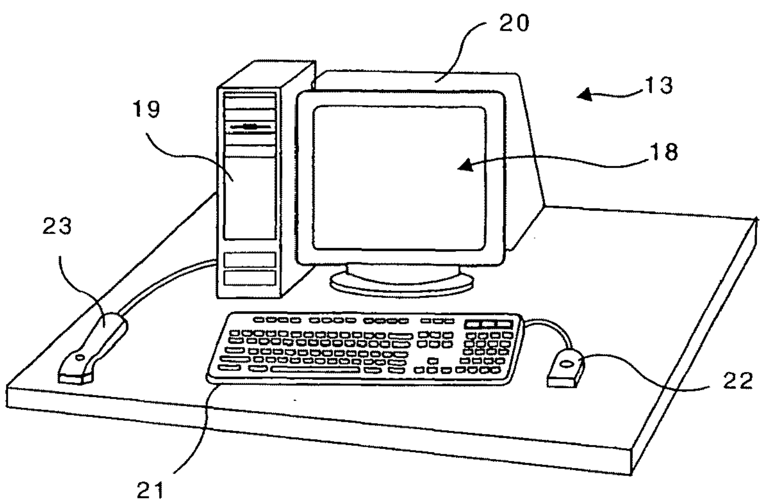
F I G. 3A1
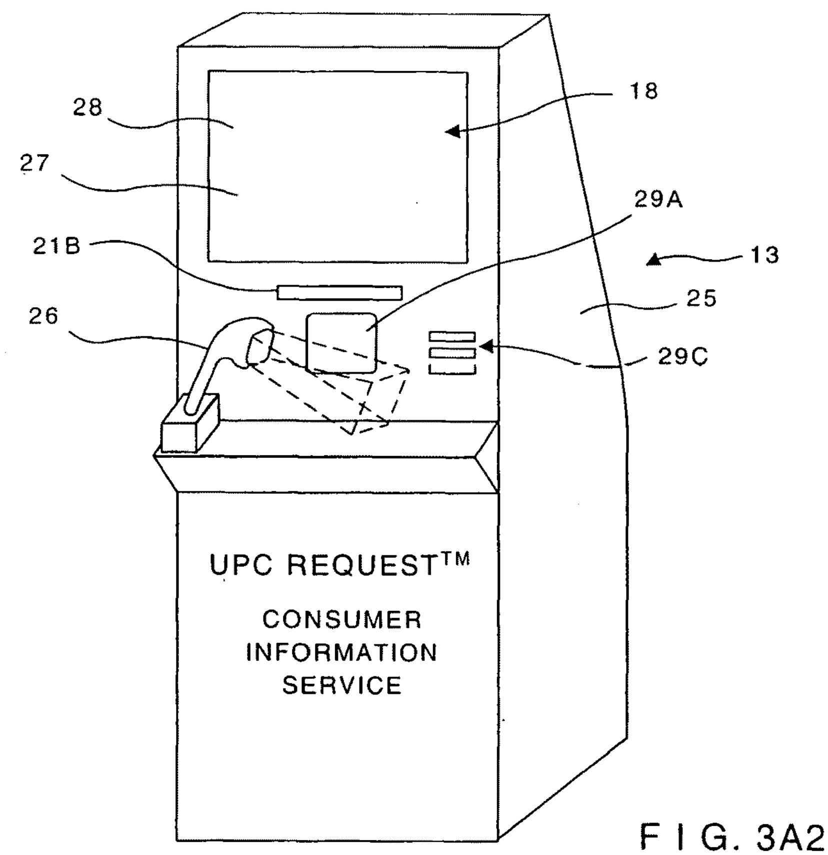
F I G. 3A2

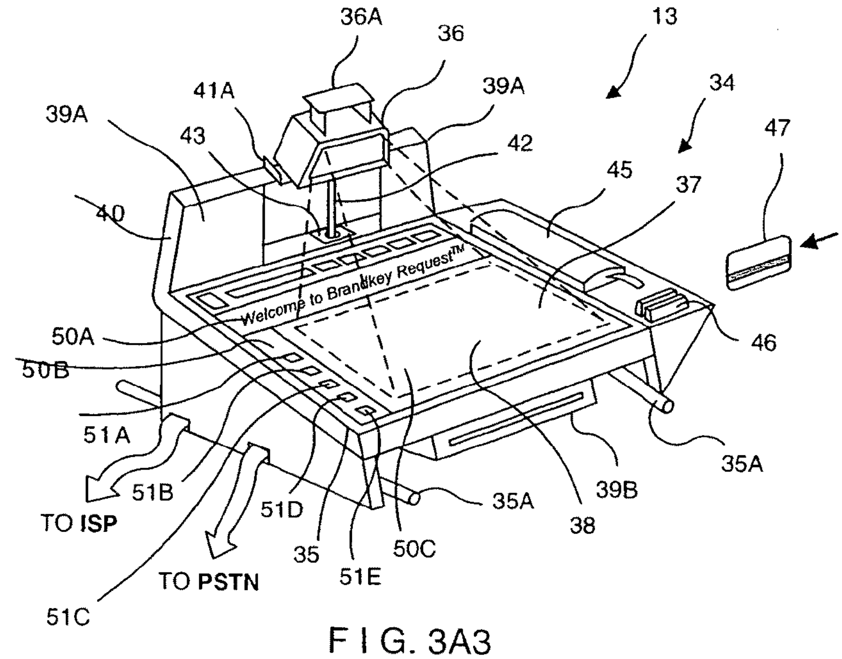
F I G. 3A3
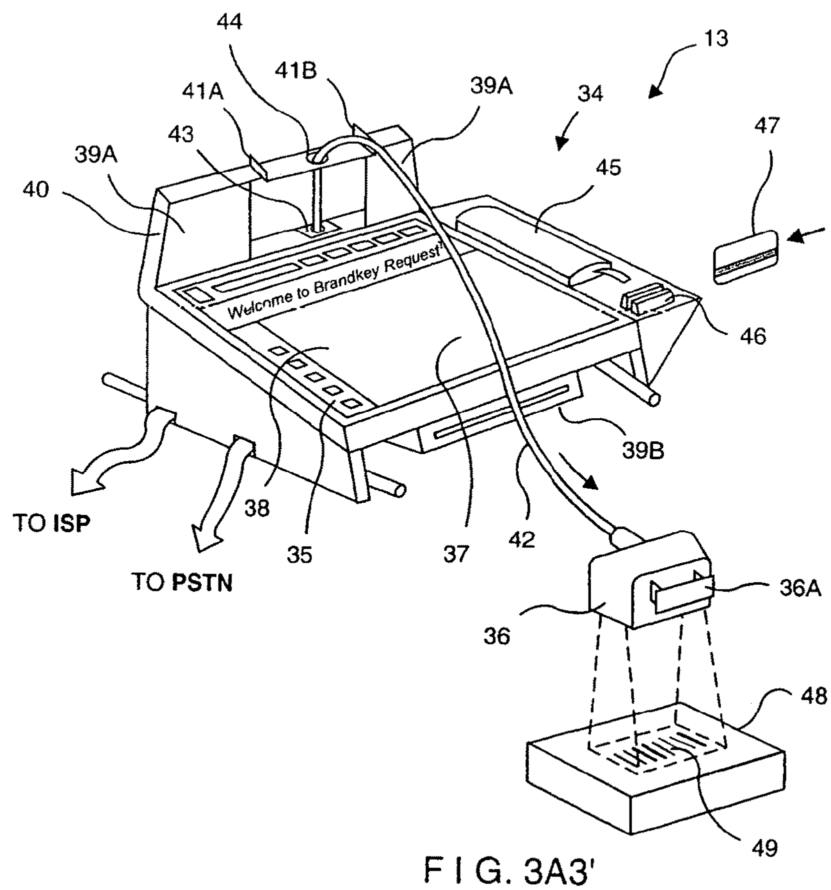
F I G. 3A3'

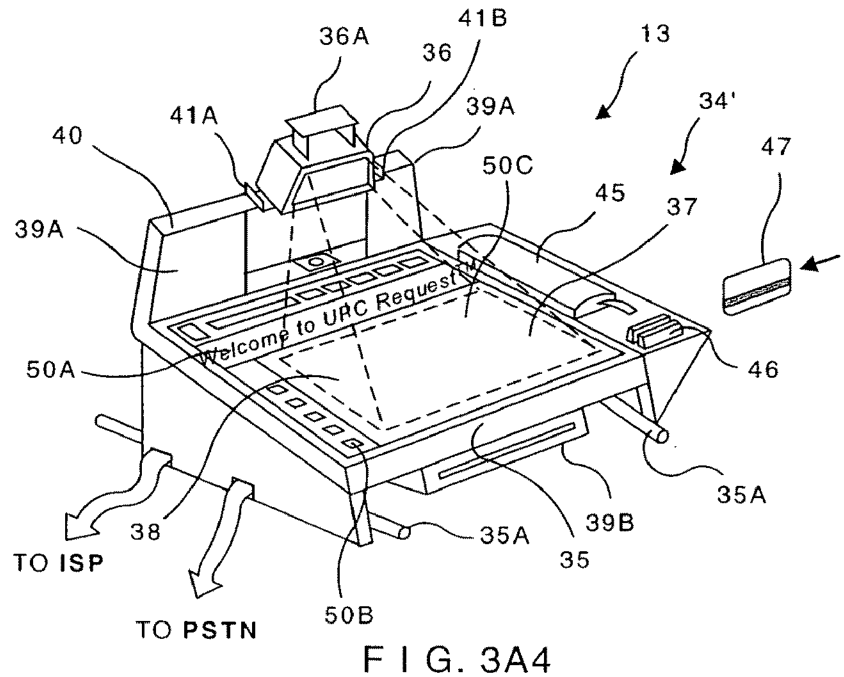
F I G. 3A4
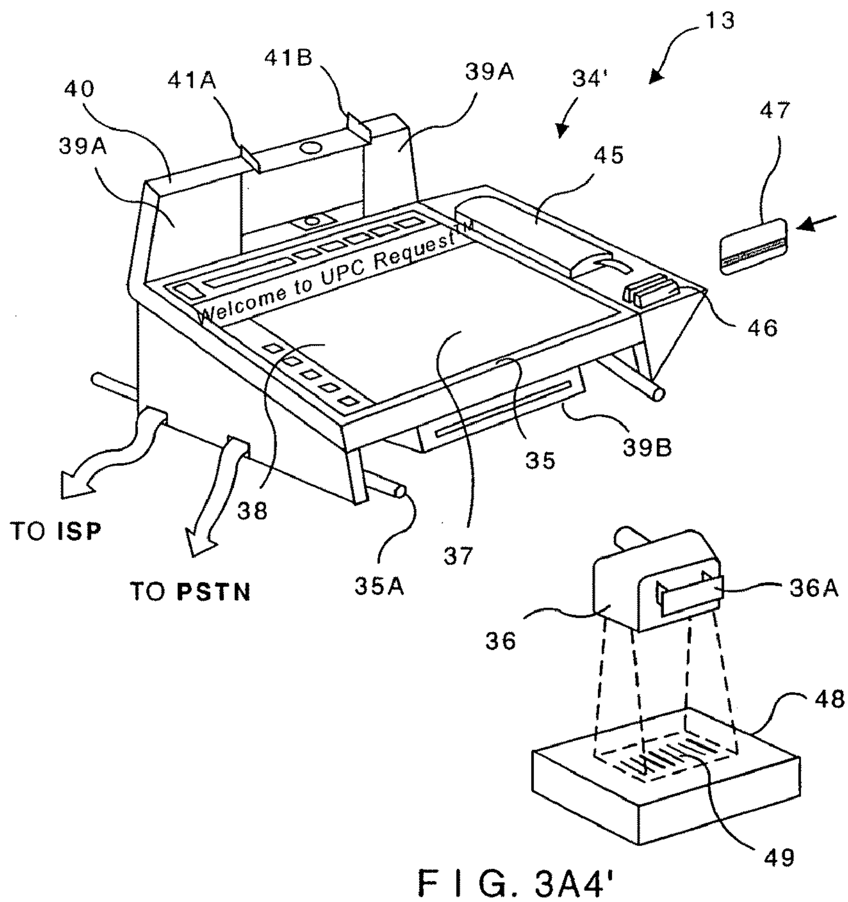
F I G. 3A4'

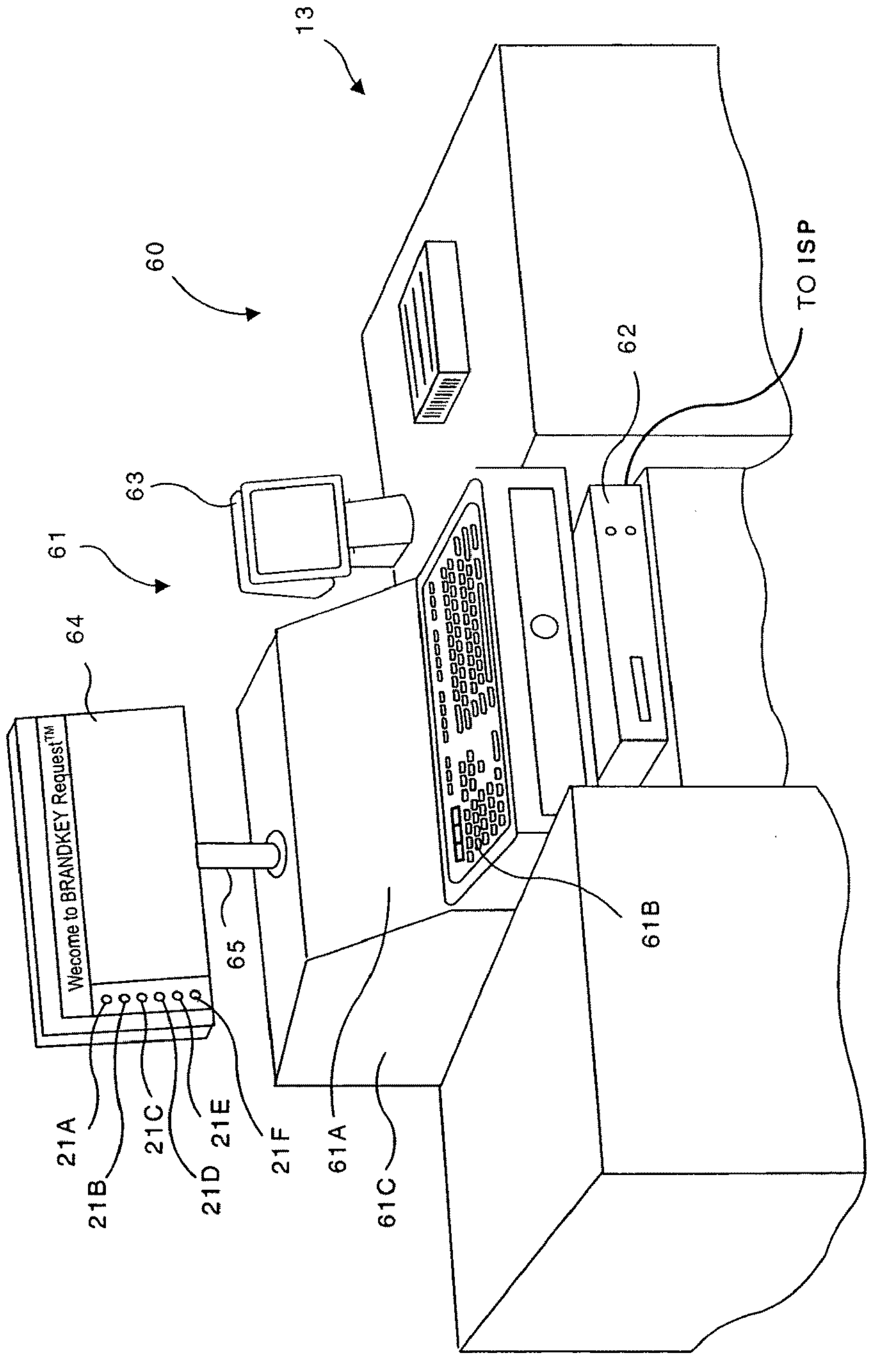
FIG. 3A5

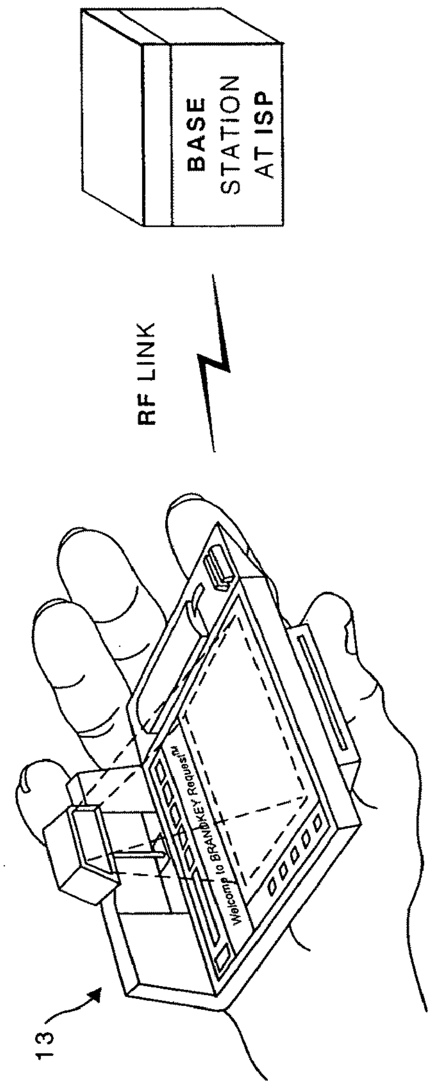
FIG. 3A6

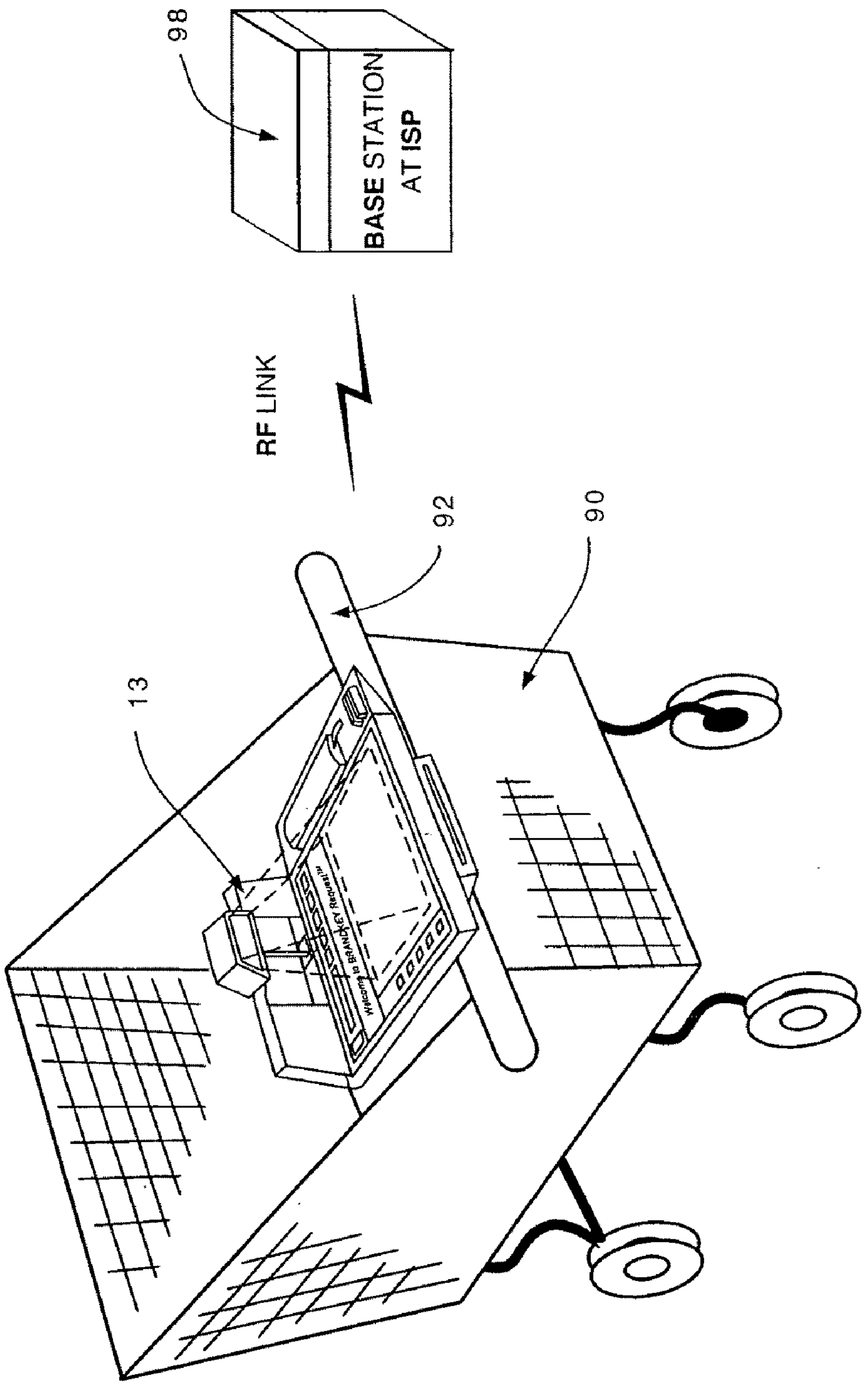
FIG. 3A7

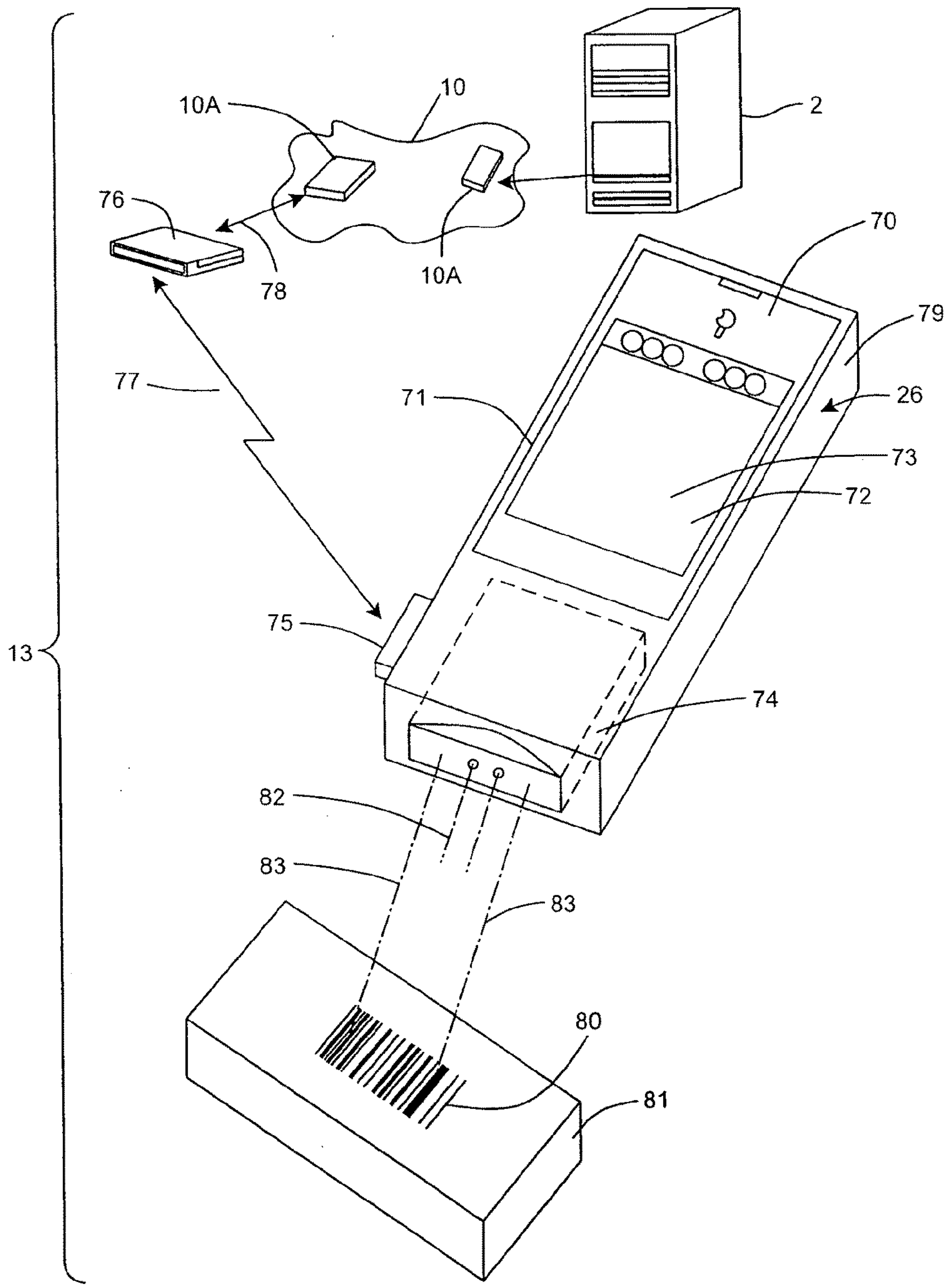
FIG. 3A8

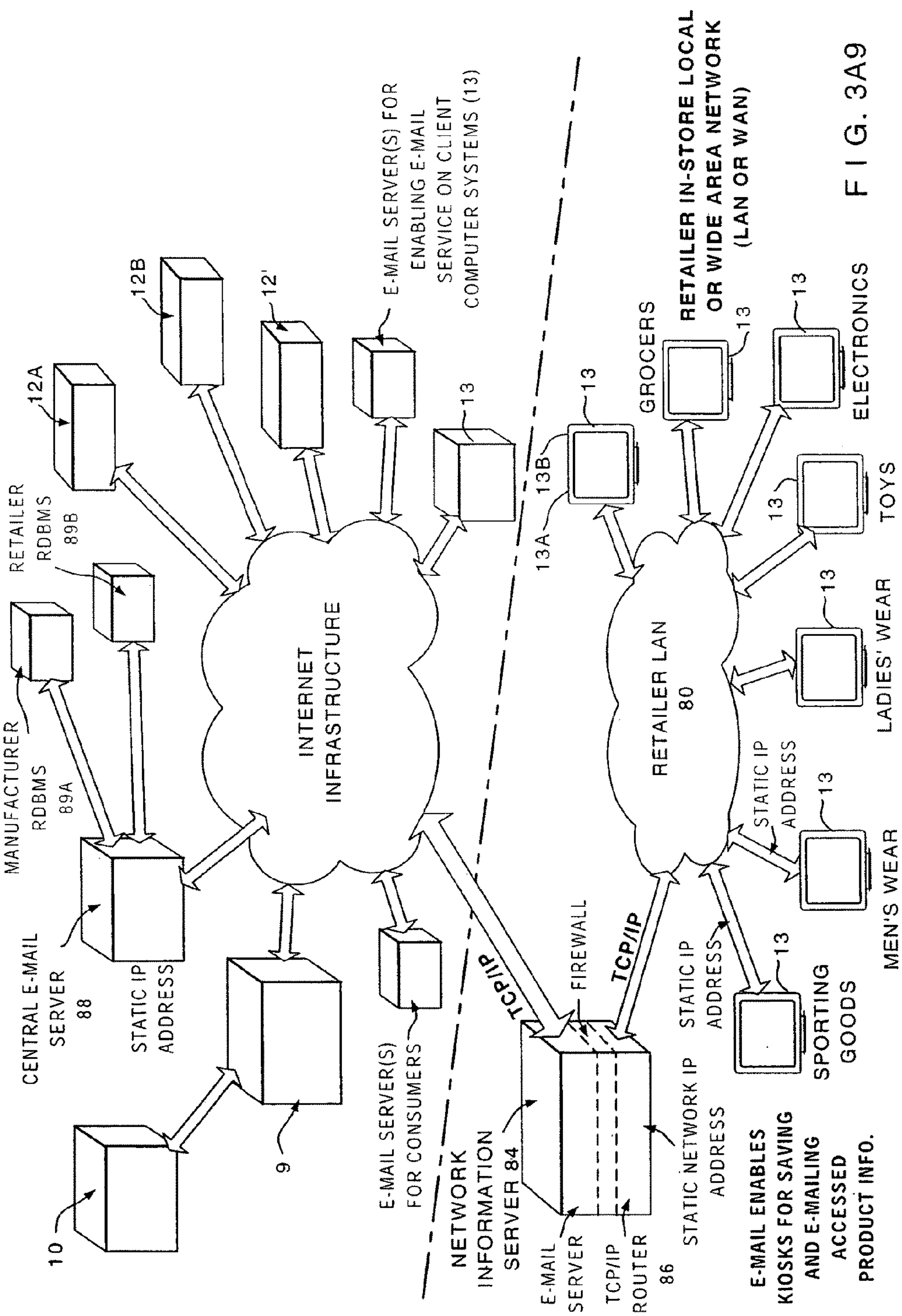
FIG. 3A9

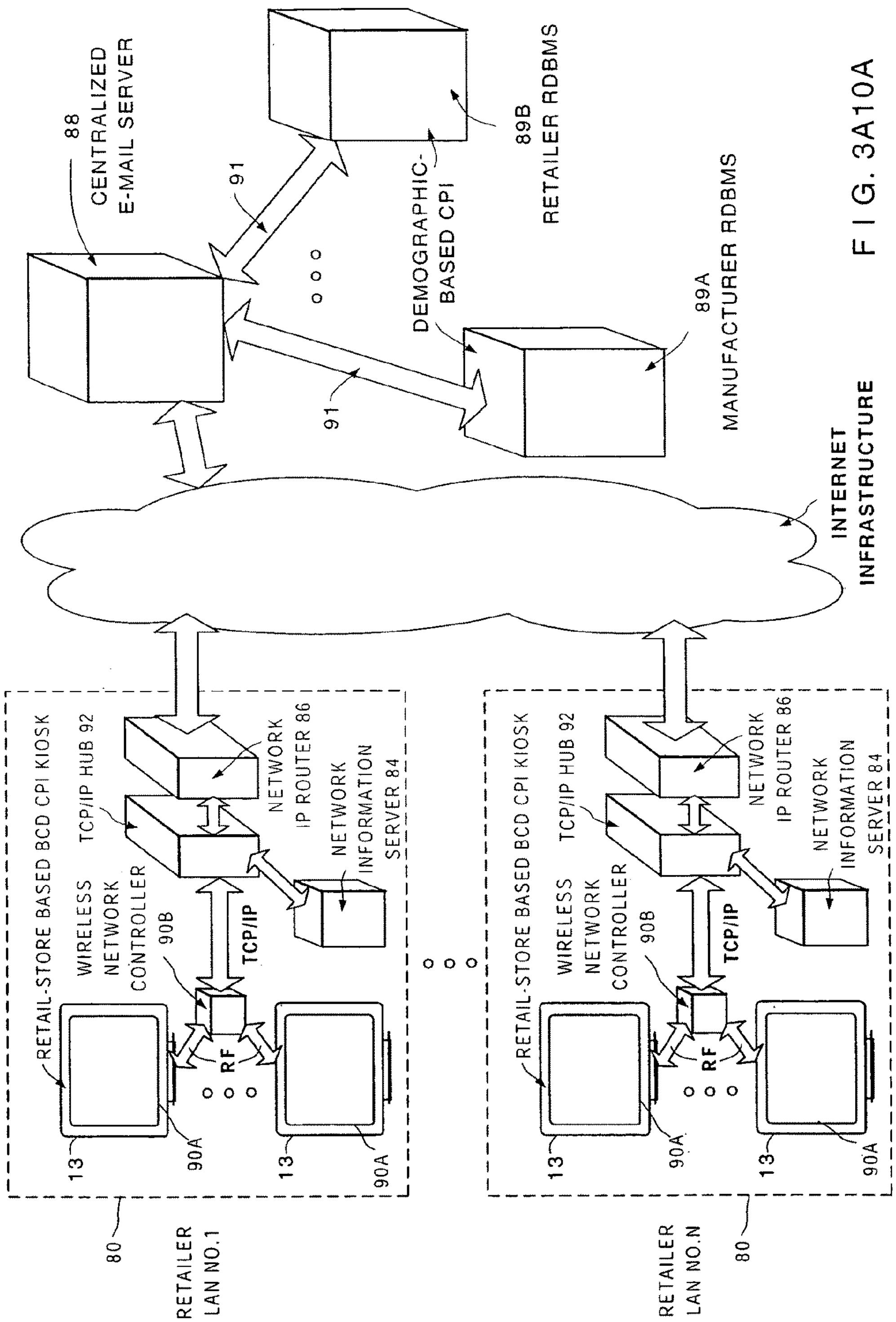
FIG. 3A10A

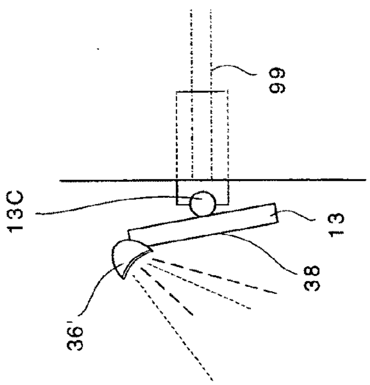
F I G. 3A10D
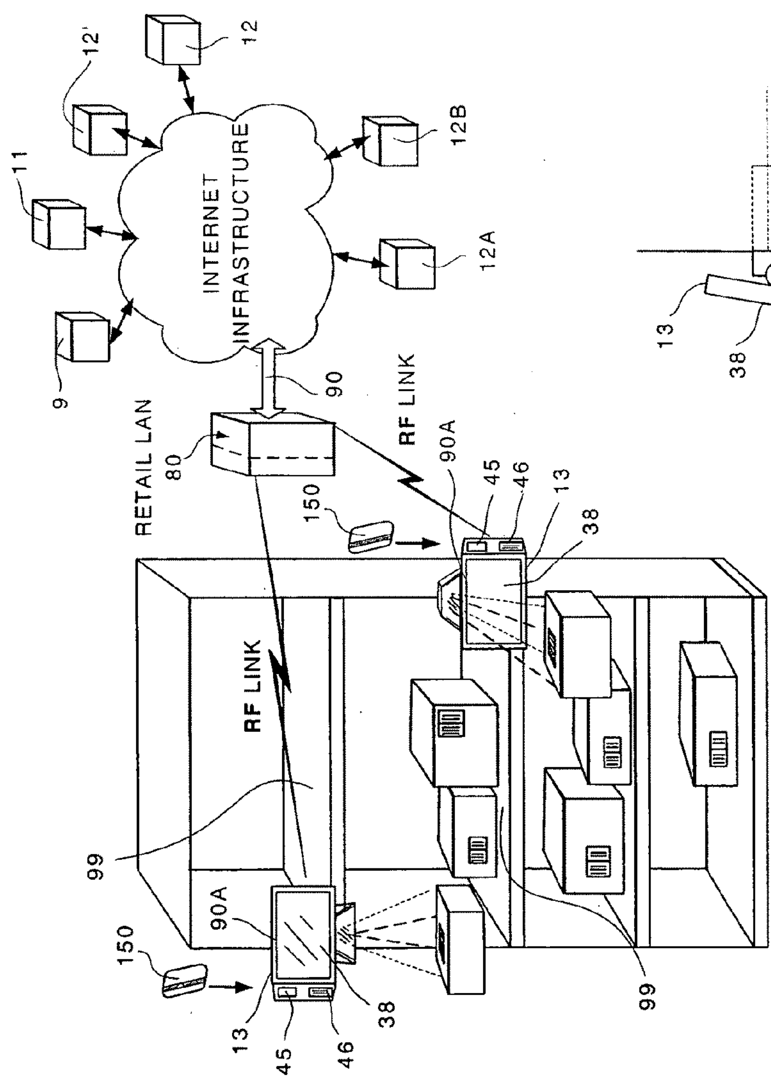
F I G. 3A10B
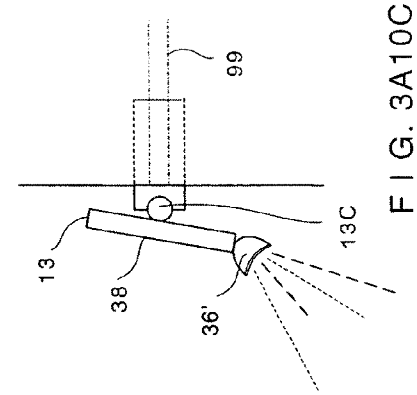
F I G. 3A10C

MASTER DATABASE TABLE

MAINTAINED BY RETAILER DATABASE MANAGEMENT SUBSYSTEM

| RETAILE R NAME | RETAILER KIOSK E-MAIL ACCNT. NO. | RETAIL KIOSK NO. | UPN | URL | DATE | DESTINATION E-MAIL (HOME) | E-MAIL DELIVERY CONFIRMATION | CONSUMER NAME | CONSUMER ADDRESS |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| ⋮ | ⋮ | ⋮ | ⋮ | ⋮ | ⋮ | ⋮ | ⋮ | ⋮ | ⋮ |
| | | | | | | | | | |

FIG. 3A11

MASTER DATABASE TABLE
MAINTAINED BY MANUFACTURER DATABASE MANAGEMENT SUBSYSTEM

| MANUFACTURER (MIN) | RETAIL KIOSK NO. | UPN | URL | DATE | DESTINATION E-MAIL ADDRESS | E-MAIL DELIVERY CRITERIA | CONSUMER NAME | CONSUMER ADDRESS |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| ••• | ••• | ••• | ••• | ••• | ••• | ••• | ••• | ••• |
| | | | | | | | | |

FIG. 3A12

Figure 3A:
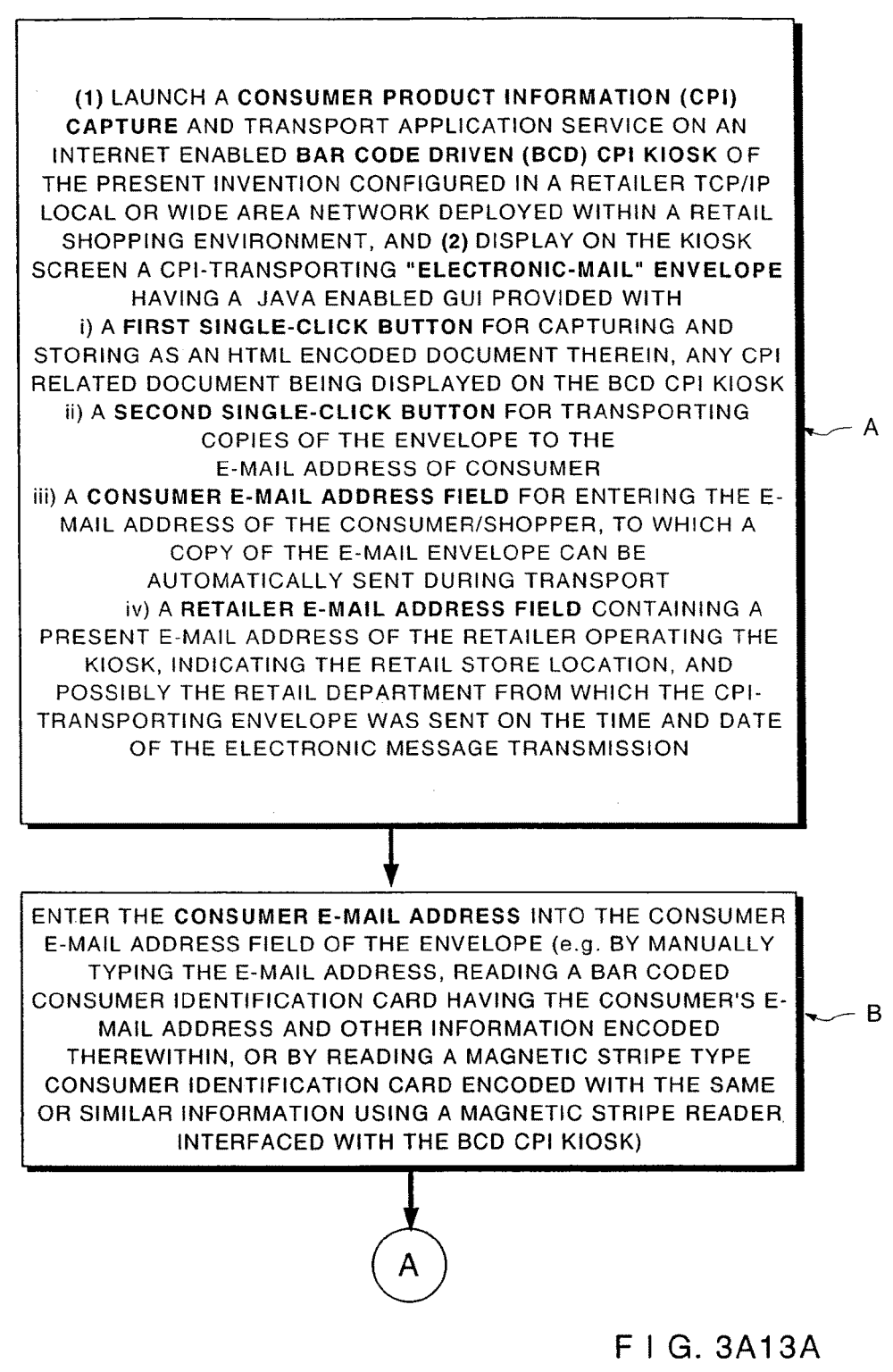

(1) LAUNCH A CONSUMER PRODUCT INFORMATION (CPI) CAPTURE AND TRANSPORT APPLICATION SERVICE ON AN INTERNET ENABLED BAR CODE DRIVEN (BCD) CPI KIOSK OF THE PRESENT INVENTION CONFIGURED IN A RETAILER TCP/IP LOCAL OR WIDE AREA NETWORK DEPLOYED WITHIN A RETAIL SHOPPING ENVIRONMENT, AND (2) DISPLAY ON THE KIOSK SCREEN A CPI-TRANSPORTING "ELECTRONIC-MAIL" ENVELOPE HAVING A JAVA ENABLED GUI PROVIDED WITH i) A FIRST SINGLE-CLICK BUTTON FOR CAPTURING AND STORING AS AN HTML ENCODED DOCUMENT THEREIN, ANY CPI RELATED DOCUMENT BEING DISPLAYED ON THE BCD CPI KIOSK ii) A SECOND SINGLE-CLICK BUTTON FOR TRANSPORTING COPIES OF THE ENVELOPE TO THE E-MAIL ADDRESS OF CONSUMER iii) A CONSUMER E-MAIL ADDRESS FIELD FOR ENTERING THE E-MAIL ADDRESS OF THE CONSUMER/SHOPPER, TO WHICH A COPY OF THE E-MAIL ENVELOPE CAN BE AUTOMATICALLY SENT DURING TRANSPORT iv) A RETAILER E-MAIL ADDRESS FIELD CONTAINING A PRESENT E-MAIL ADDRESS OF THE RETAILER OPERATING THE KIOSK, INDICATING THE RETAIL STORE LOCATION, AND POSSIBLY THE RETAIL DEPARTMENT FROM WHICH THE CPI-TRANSPORTING ENVELOPE WAS SENT ON THE TIME AND DATE OF THE ELECTRONIC MESSAGE TRANSMISSION

A

ENTER THE CONSUMER E-MAIL ADDRESS INTO THE CONSUMER E-MAIL ADDRESS FIELD OF THE ENVELOPE (e.g. BY MANUALLY TYPING THE E-MAIL ADDRESS, READING A BAR CODED CONSUMER IDENTIFICATION CARD HAVING THE CONSUMER'S E-MAIL ADDRESS AND OTHER INFORMATION ENCODED THEREWITHIN, OR BY READING A MAGNETIC STRIPE TYPE CONSUMER IDENTIFICATION CARD ENCODED WITH THE SAME OR SIMILAR INFORMATION USING A MAGNETIC STRIPE READER INTERFACED WITH THE BCD CPI KIOSK)

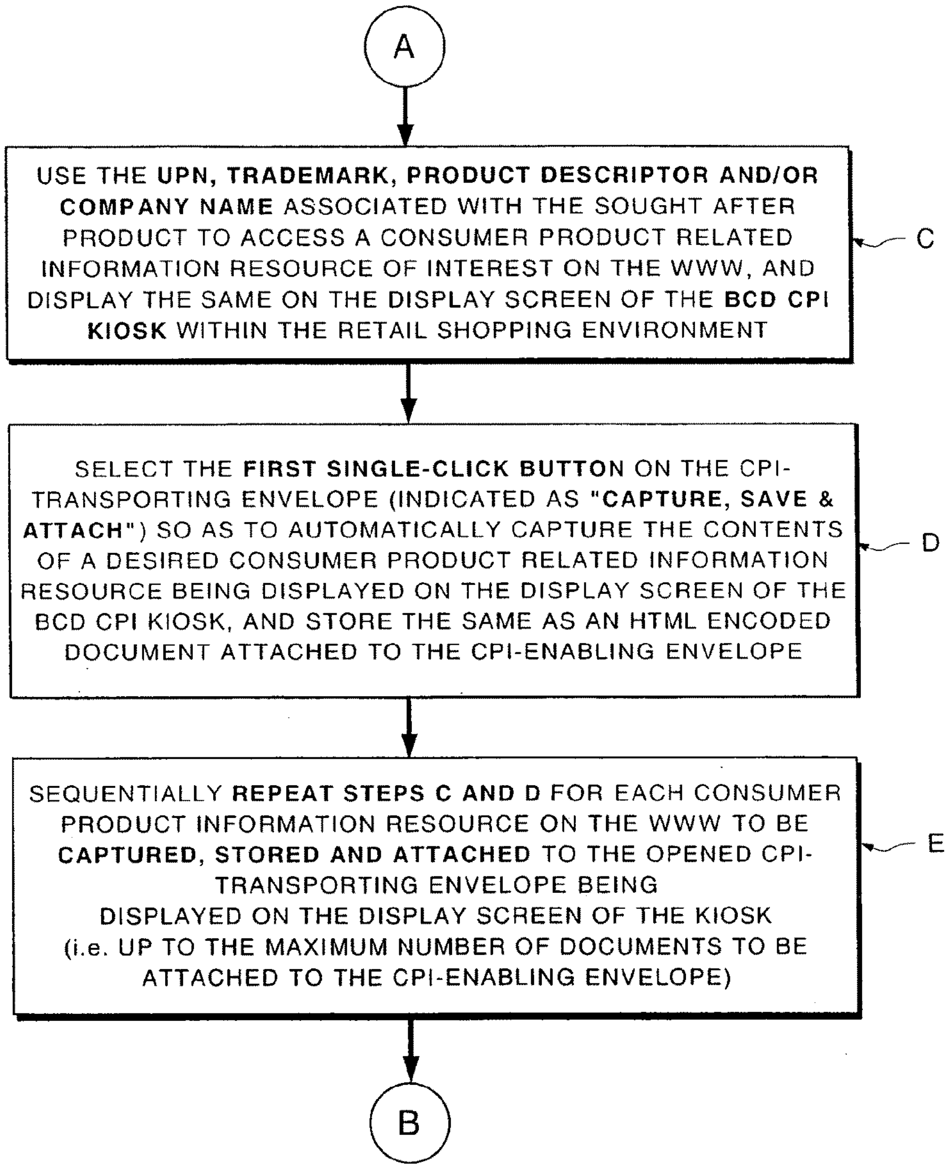
FIG. 3A13B

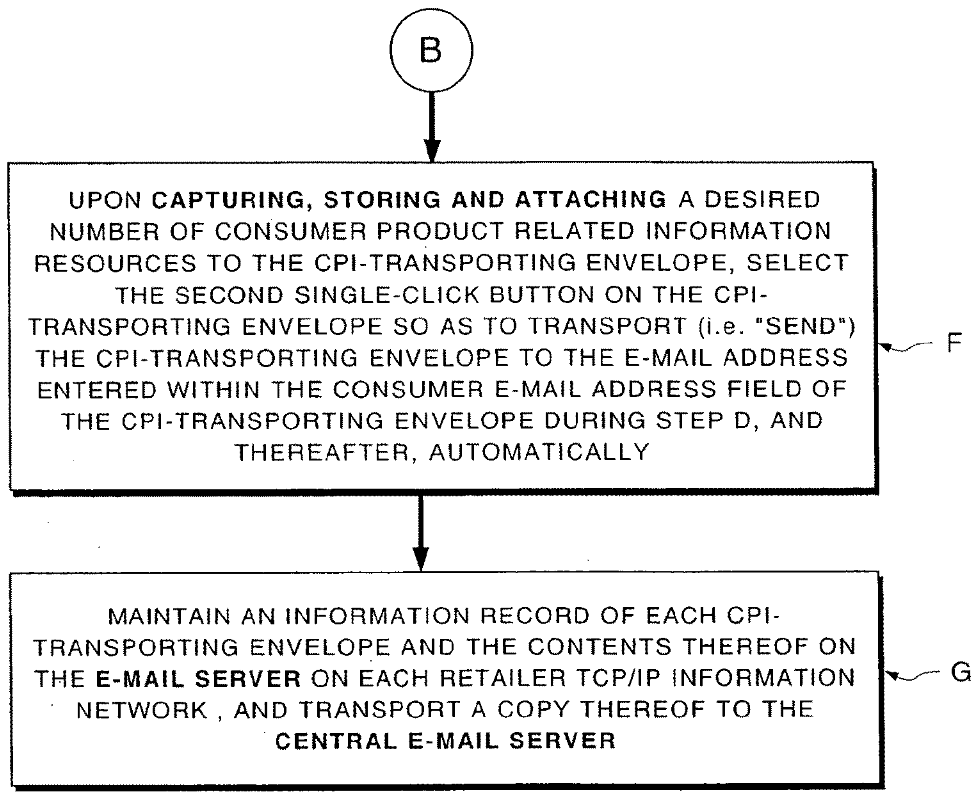
FIG. 3A13C

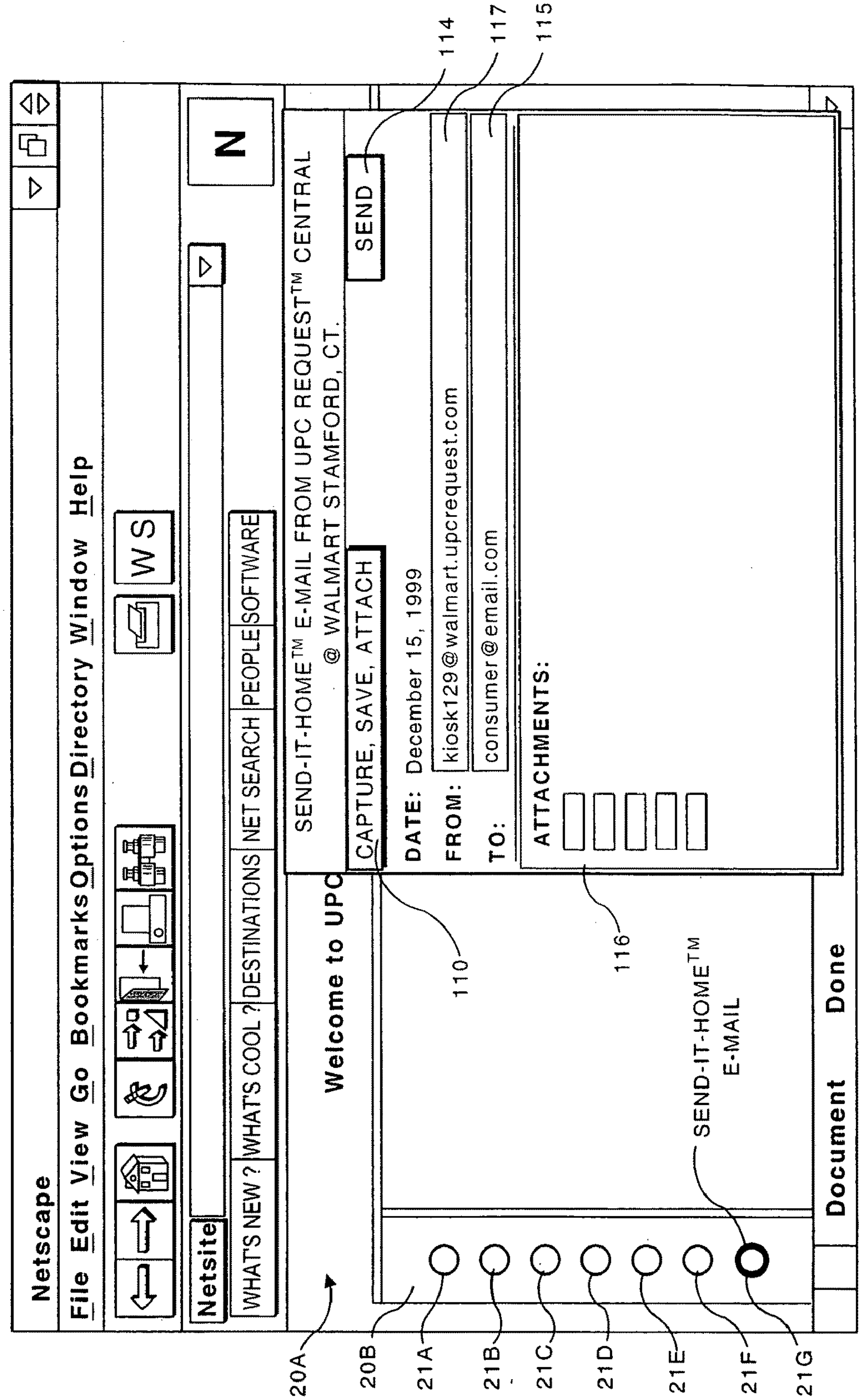
FIG. 3A14

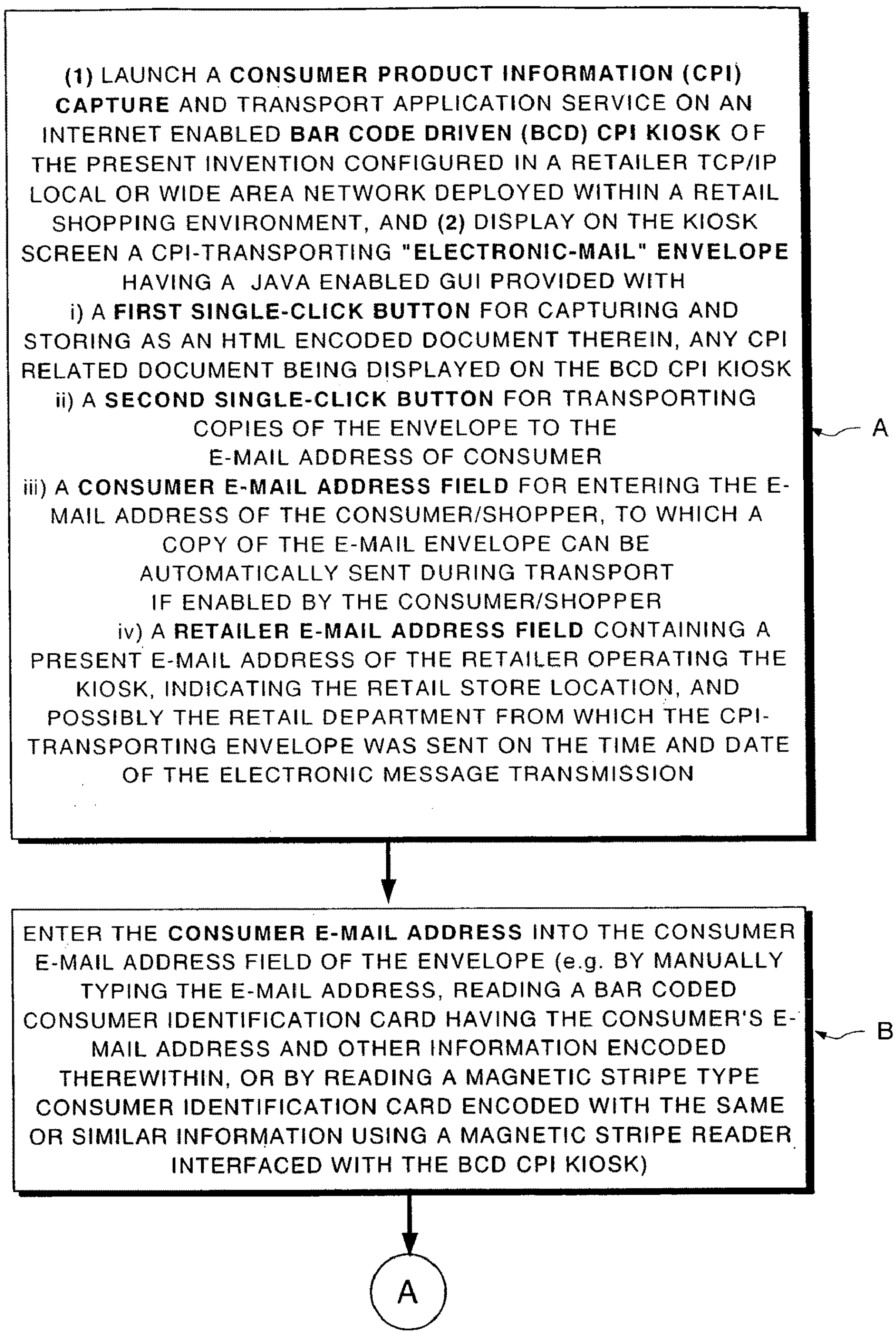
FIG. 3A15A

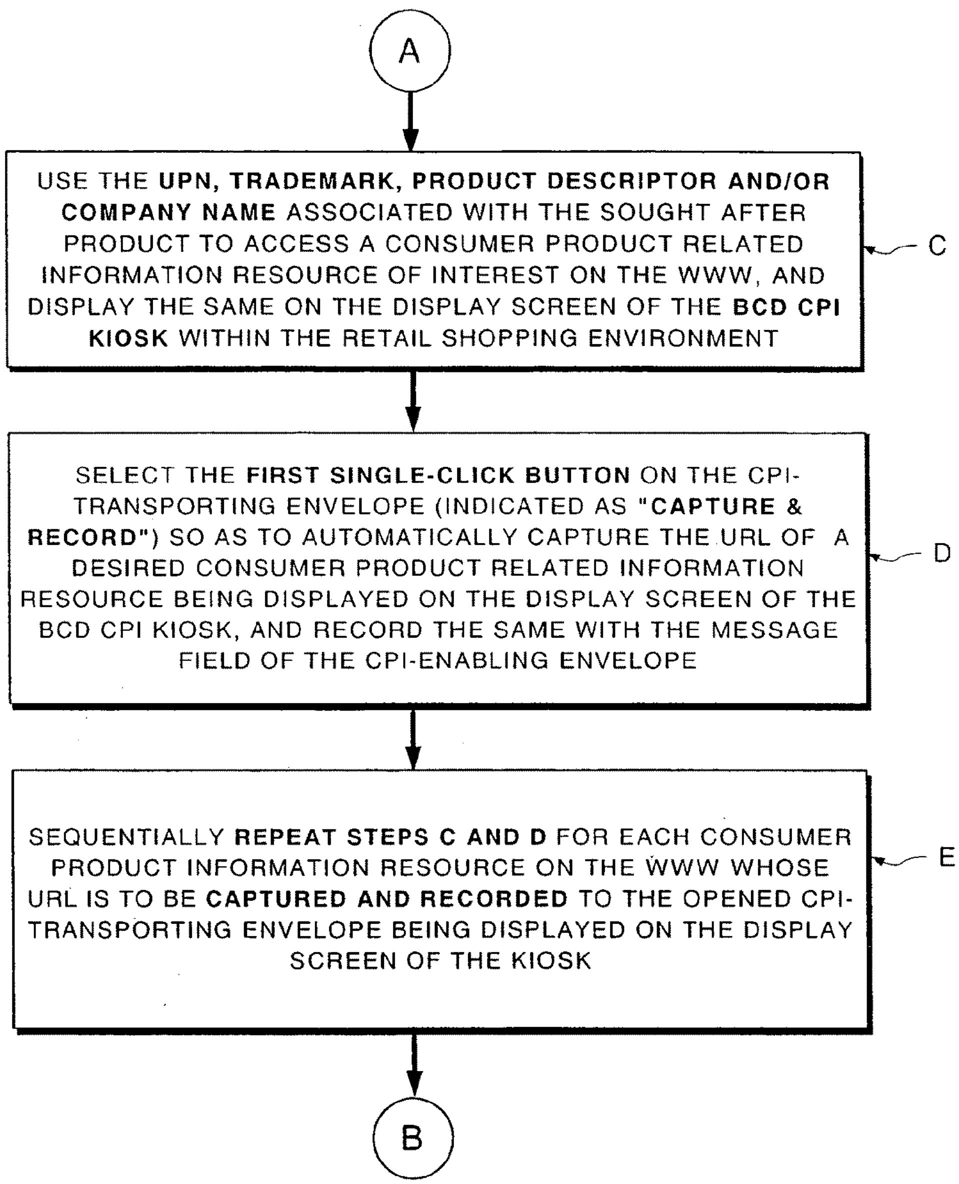
FIG. 3A15B

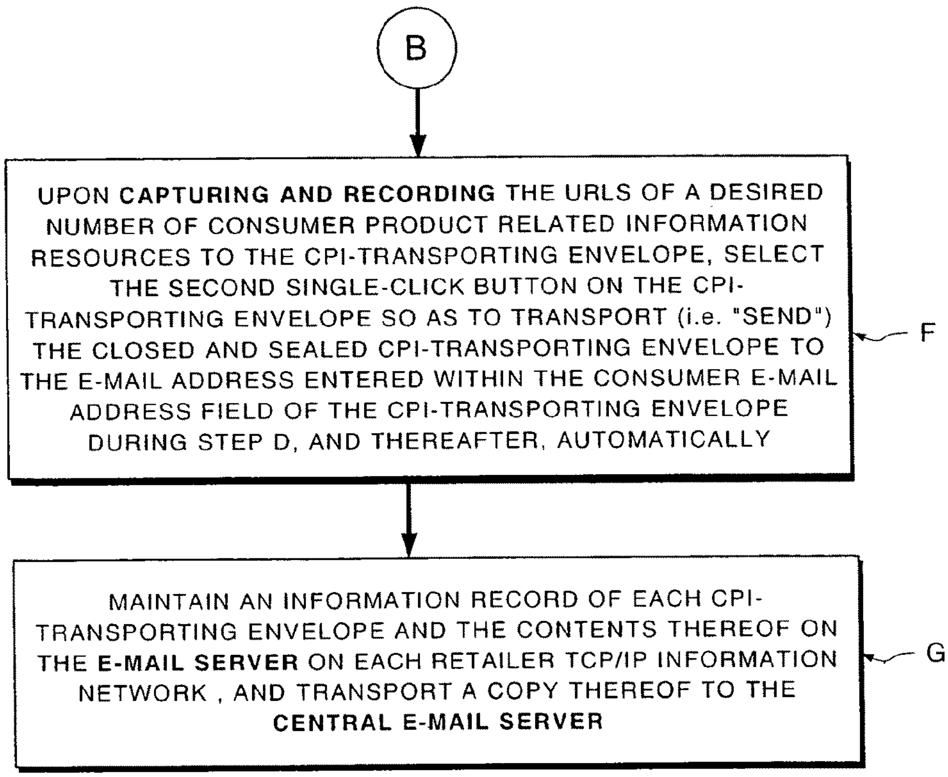
FIG. 3A15C

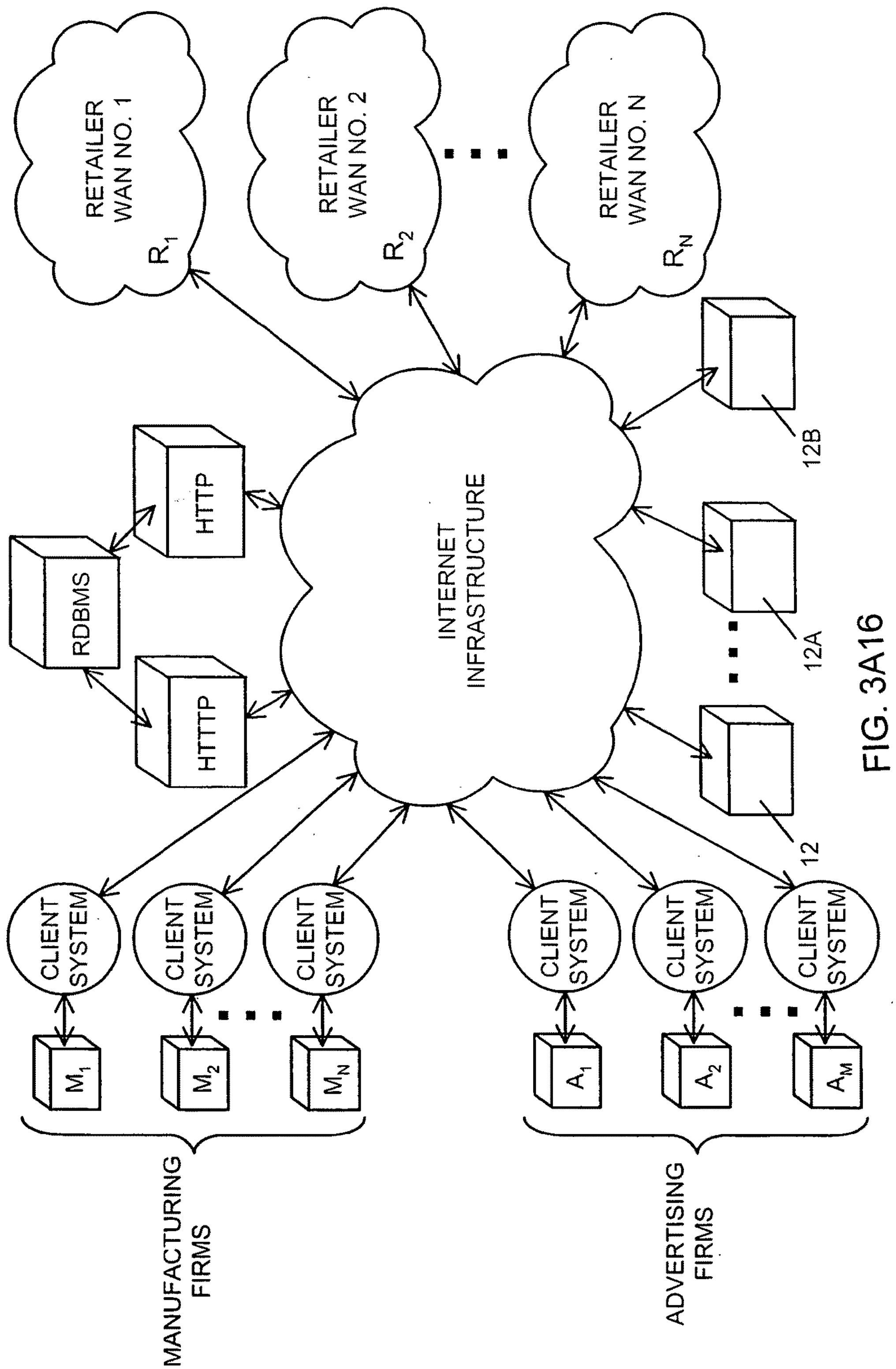
FIG. 3A16

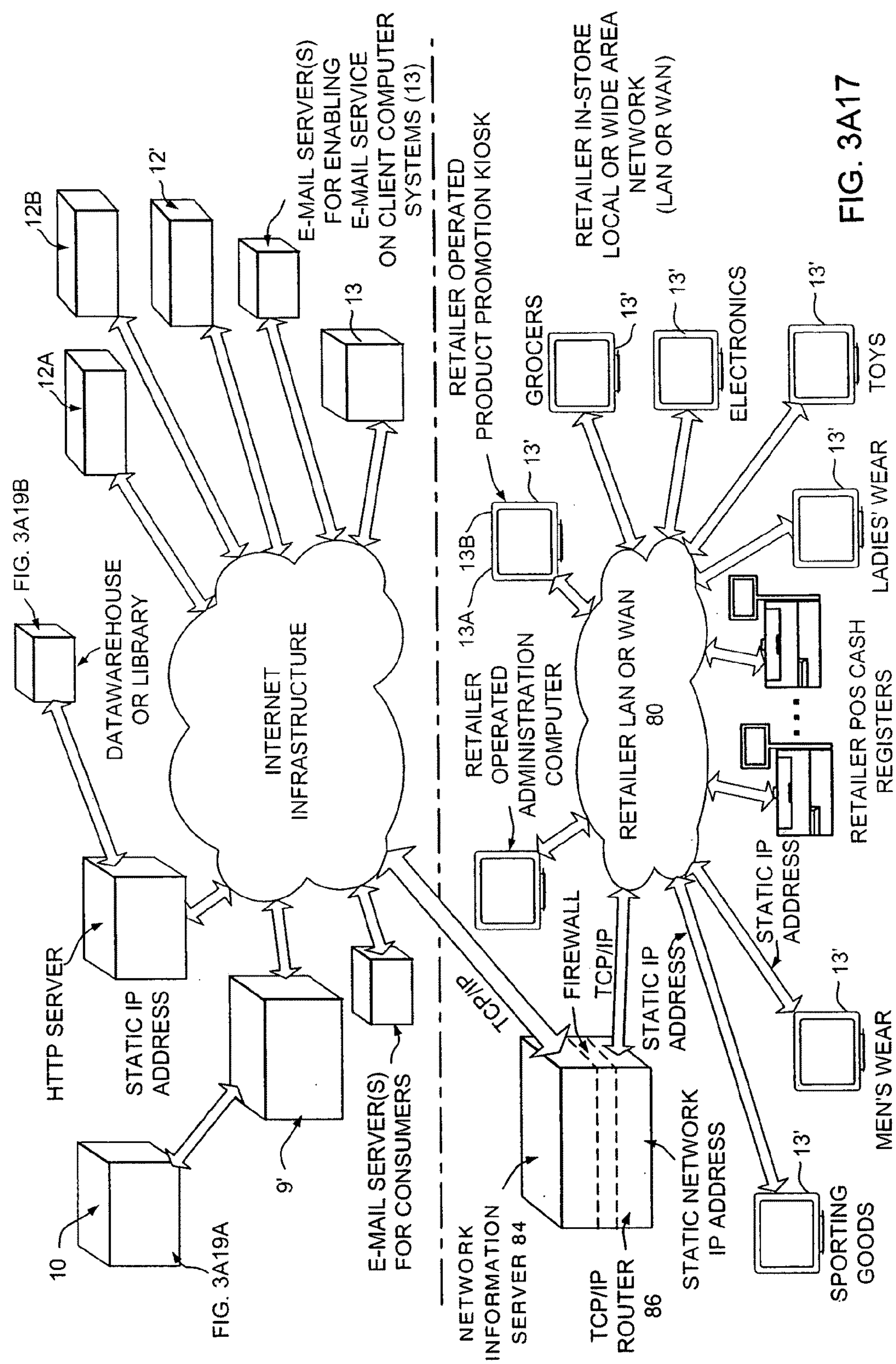
FIG. 3A17

| UPN | RETAILER | URL NO.1 | ••• | URL NO. N | TRADEMARKS | PRODUCT DESCRIPTION | E-MAIL |
|---|---|---|---|---|---|---|---|
| | | | | | | | |
| | | | | | | | |
| | | | | | | | |
| | | | ••• | | | | |
| | | | | | | | |
| | | | | | | | |
| | | | | | | | |
| | | | | | | | |
| | | | | | | | |
| ••• | ••• | ••• | ••• | ••• | ••• | ••• | ••• |
| | | | | | | | |

FIG. 3A18

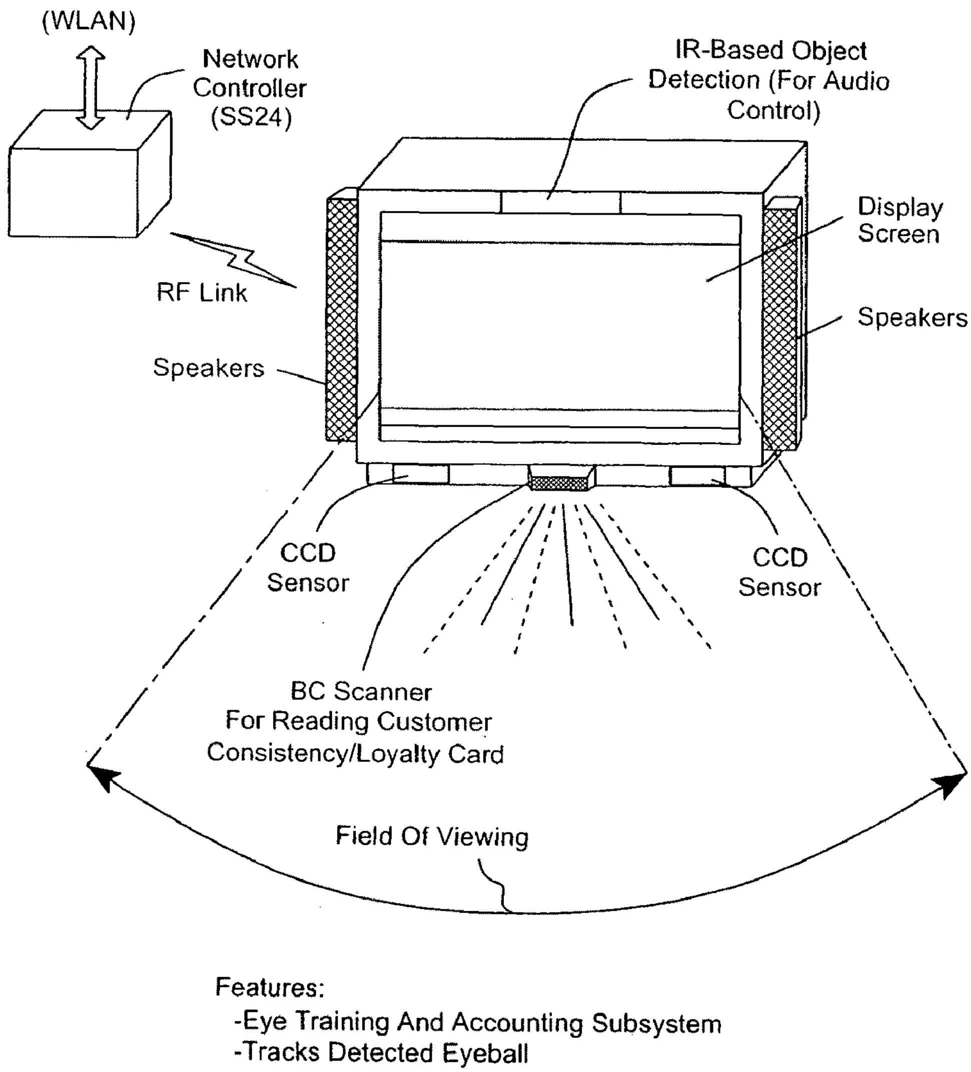
FIG. 3A19A

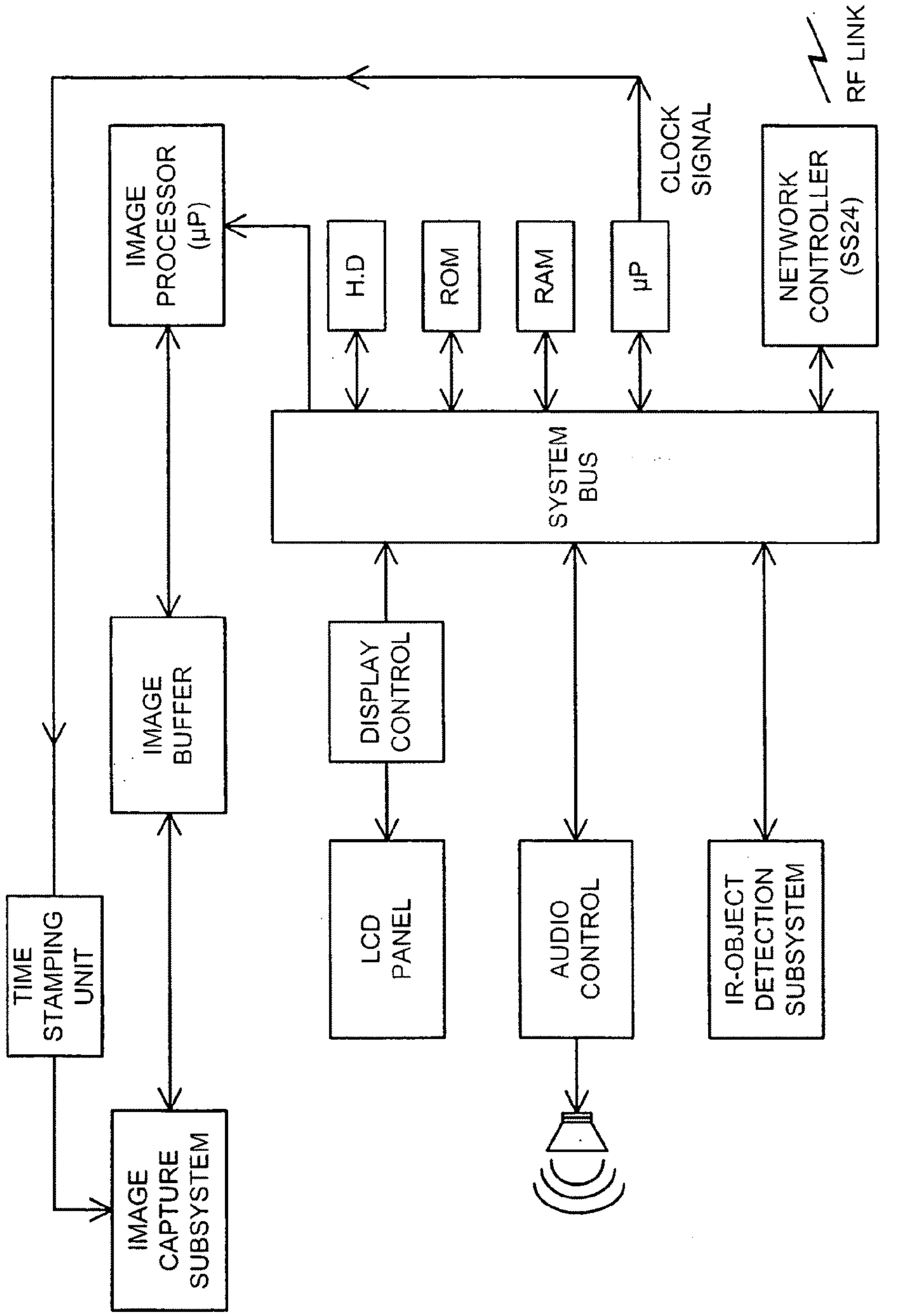
FIG. 3A19B

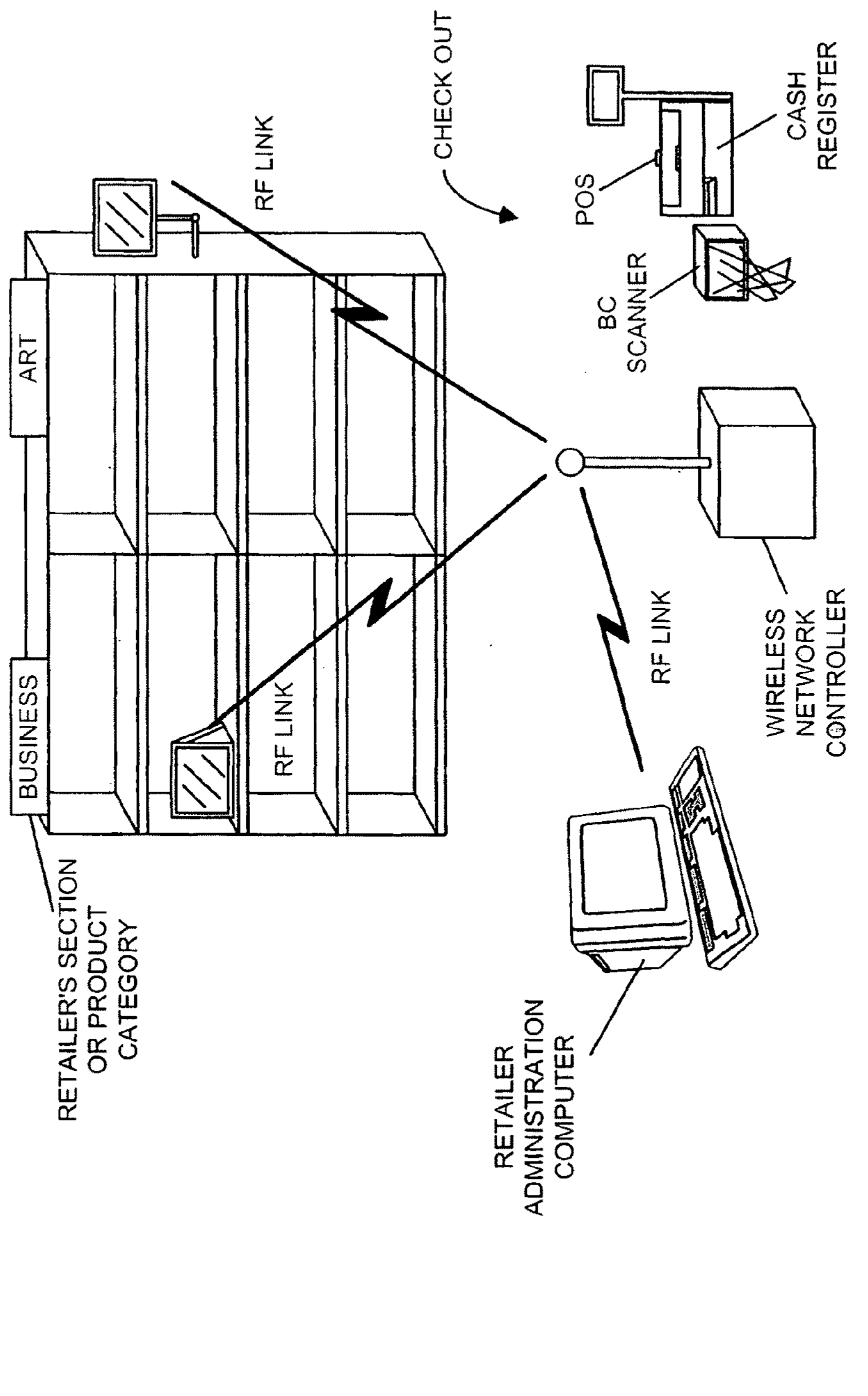
FIG. 3A20

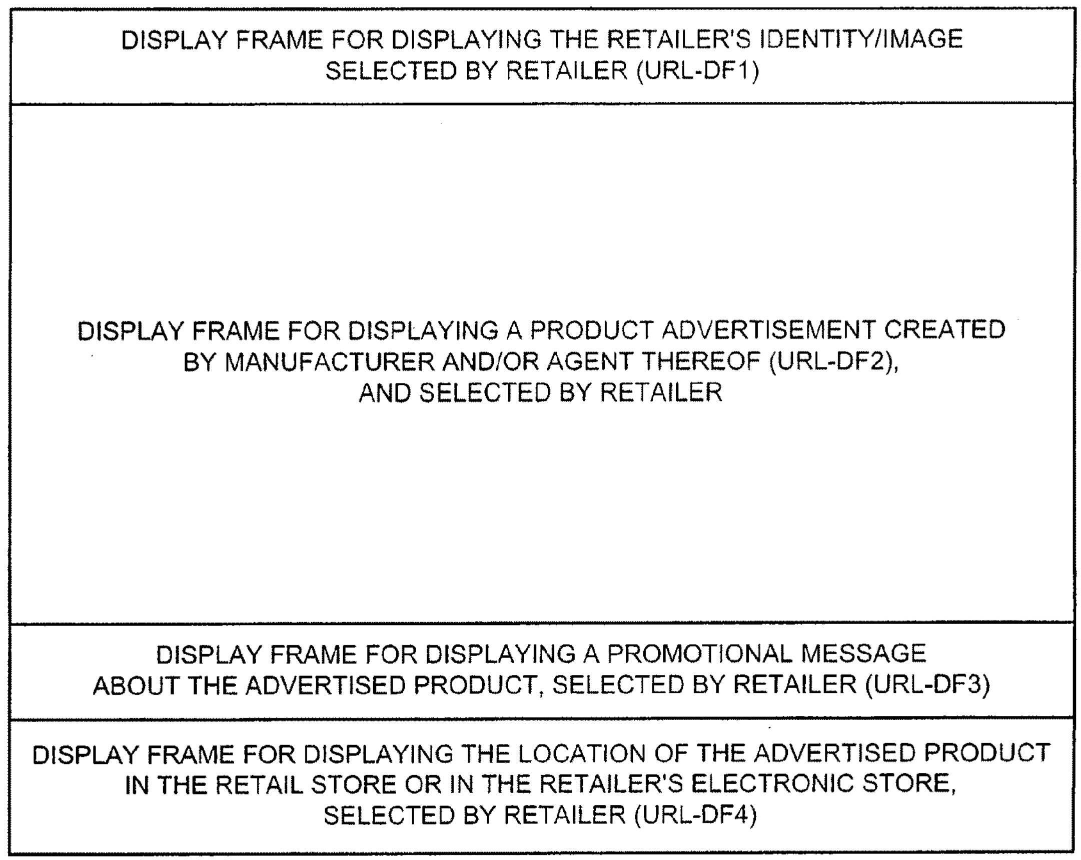
FIG. 3A21A

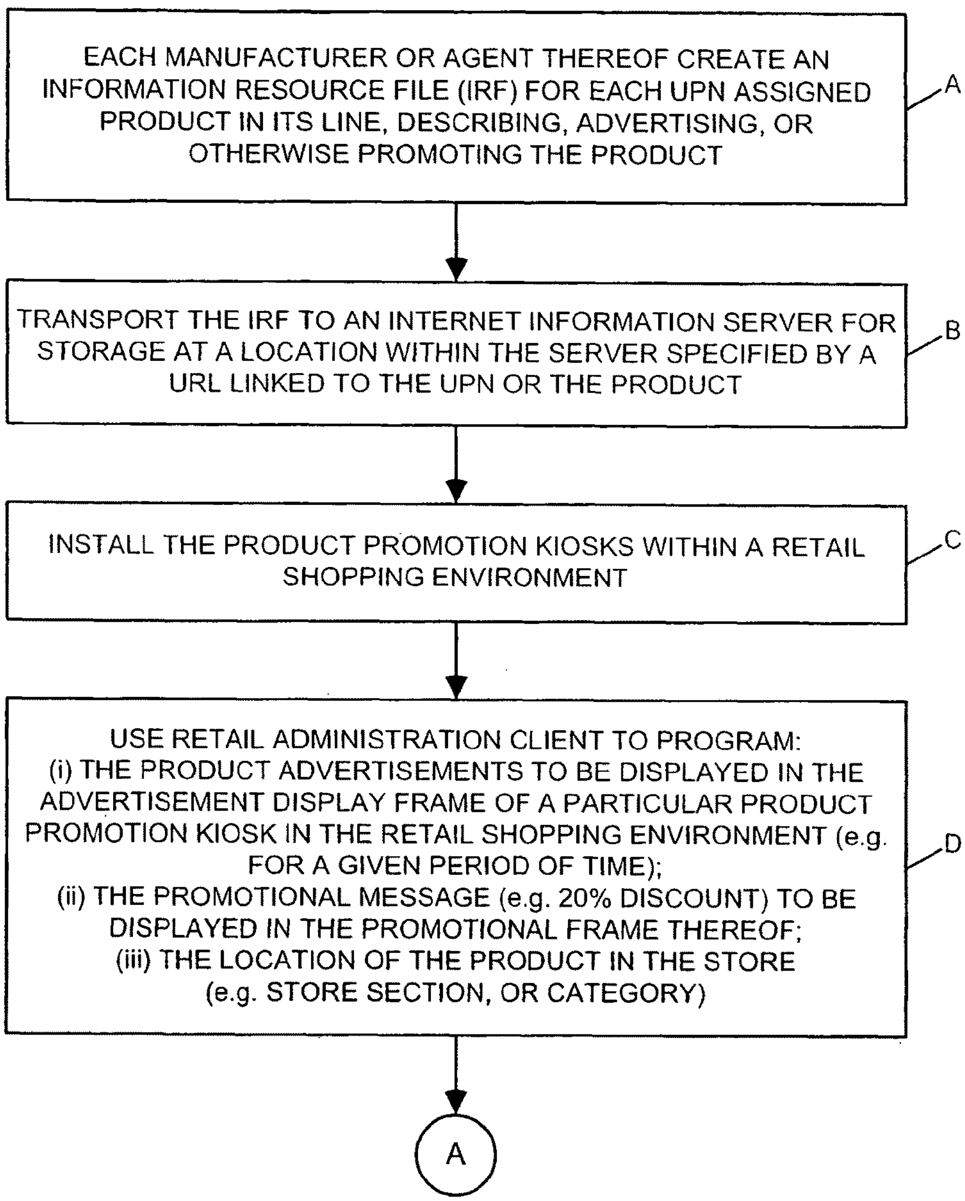
FIG. 3A22A

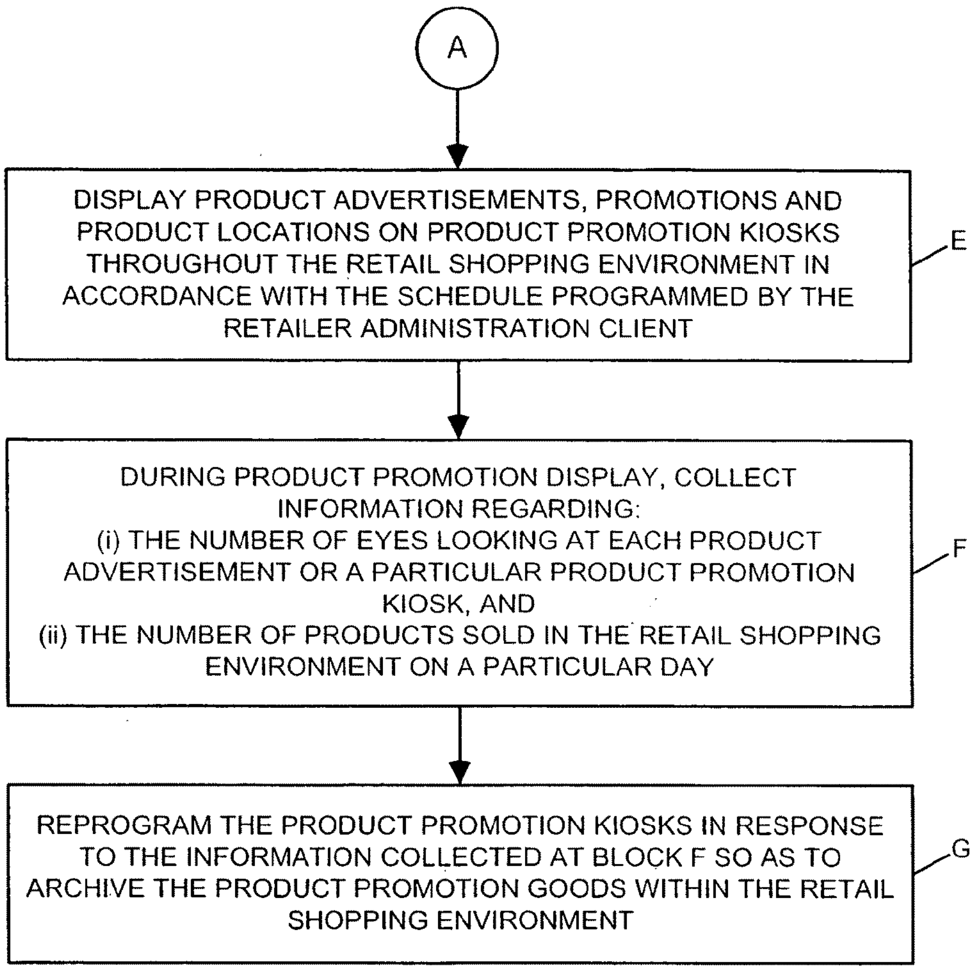
FIG. 3A22B

PRODUCT PROMOTION PROGRAMMING TABLE

| DATE:<br>TIME (INTERVALS) | RETAILER KIOSK NO. | STATIC IP ADDRESS | URL-DF1 | URL-DF2 | URL-DF3 | URL-DF4 |
|---|---|---|---|---|---|---|
| | | | | | | |
| | | | | | | |
| | | | | | | |
| | | | | | | |
| | | | | | | |
| | | | | | | |
| | | | | | | |
| | | | | | | |
| | | | | | | |
| ⋮ | ⋮ | ⋮ | ⋮ | ⋮ | ⋮ | ⋮ |
| | | | | | | |

FIG. 3A23

| UPN (PRODUCT) | TIME/DATE | EYE COUNTS | URL/AD | # OF UPN SOLD ON SAME DATE | # OF UPN SOLD ON 2ND DATE | # OF UPN SOLD ON 3RD DATE | # OF UPN SOLD ON 4TH DATE |
|---|---|---|---|---|---|---|---|
| | | | | | | | |
| | | | | | | | |
| | | | | | | | |
| | | | | | | | |
| | | | | | | | |
| | | | | | | | |

REPORT

FIG. 3A24

| IP / SN | REGISTRANT'S NAME AND ADDRESS | PRODUCT DESCRIPTION | UNIFORM RESOURCE LOCATOR (URL) | TRADE/ SERVICE MARKS | e-mail ADDRESS | CPIR APPLETS | STATUS |
|---|---|---|---|---|---|---|---|
| 7/18908/ 17674/0 | APPLE COMPUTER, INC. CUPERTINO, CA. | POWER MAC 7600/120 COMPUTER | http:// www.power.com/pc | POWER MAC | | | |
| | | | | | | | |
| 0/373/100/6 | PROCTOR & GAMBLE | TOOTH PASTE | http:// www.tooth.com/pc | CREST | | | |
| 3/12547/ 68404/0 | WARNER WELCOME | ACID REDUCER | http:// www.zantac.com/pc | ZANTAC ZANTAC 75 | | | |
| | | | | | | | |
| | | | | | | | |
| 0/00005/ 17643/4 | KODAK, INC. | FILM PROCESSING | http:// www.kodak.com/pc | KODAK | | | |
| | | | | | | | |
| | | | | | | | |
| ⋮ | ⋮ | ⋮ | ⋮ | ⋮ | ⋮ | ⋮ | ⋮ |
| 0/27242/ 51057/9 | SONY, INC. | PERSONAL COMPUTER | http://www.sony.com/ pc | SONY | | | |

CONSUMER PRODUCT INFO. REQUEST, CPIR-ENABLING APPLET LIBRARY

FIG. 4A1

| $URL_i$ | PRODUCT SPECIFICATION INFORMATION FIELD | PRODUCT UPDATE INFORMATION FIELD | PRODUCT WARRANTY / SERVING INFORMATION FIELD | PRODUCT INCENTIVE INFORMATION FIELD | PRODUCT REVIEW INFORMATION FIELD | MISCELLA-NEOUS INFORMATION FIELD | PRODUCT ADVERTI-SEMENT INFORMATION FIELD |
|---|---|---|---|---|---|---|---|
| | | | | | | | |
| | | | | | | | |
| | | | | | | | |
| ⋮ | ⋮ | ⋮ | ⋮ | ⋮ | ⋮ | ⋮ | ⋮ |
| | | | | | | | |

FIG. 4A2

| I P / S N | REGISTRANT'S NAME AND ADDRESS | PRODUCT DESCRIPTION | TRADE/SERVICE MARKS | E-MAIL ADDRESS | STATUS |
|---|---|---|---|---|---|
| | | | | | |
| 7/05089/37460/7 | NETSCAPE COMMUNICATIONS CORP. | INTERNET NAVIGATOR | NETSCAPE, NAVIGATOR | | |
| | | | | | |
| | | | | | |
| 0/30000/01020/4 | QUAKER, INC. | OATMEAL | QUAKER | | |
| 0/496/390/1 | COLA COLA, INC. | COCA SODA | COCA - COLA, COKE | | |
| | | | | | |
| 0/7599/24245/2 | WARNER BROS. | PAT METHANY AUDIO CD | GEFFEN | | |
| | | | | | |
| ⋮ | ⋮ | ⋮ | ⋮ | ⋮ | ⋮ |
| | | | | | |

FIG. 4B

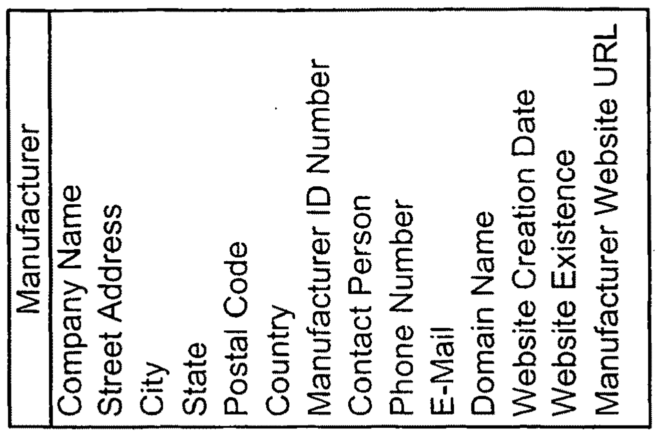
FIG. 4C1
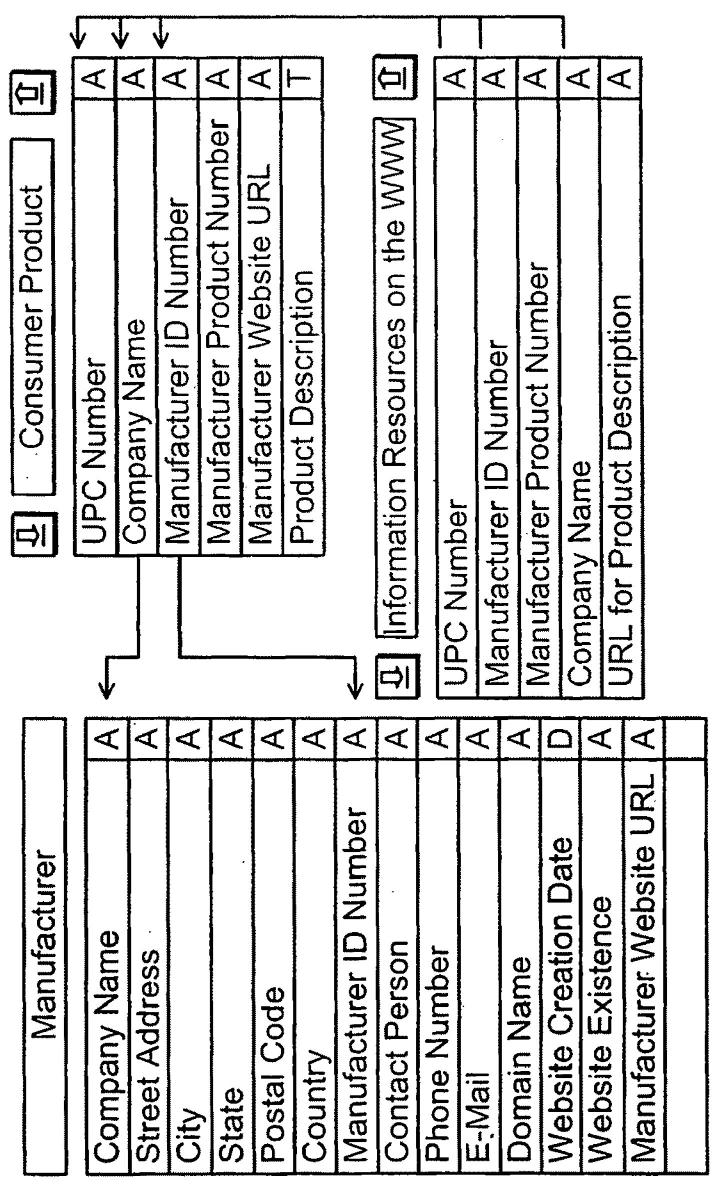
FIG. 4C

| Consumer Product |
|---|
| UPC Number |
| Company Name |
| Manufacturer ID Number |
| Manufacturer Product Number |
| Manufacturer Website URL |
| Product Description |
| Primary Trademark |
| Secondary Trademark |
| Package Type |
| UPC Symbol Type |
| Website Marking on Package |
| 800 Consumer Phone Number |

FIG. 4C2

| Info. Resources on WWW |
|---|
| UPC Number |
| Manufacturer ID Number |
| Manufacturer Product Number |
| Company Name |
| URL For Product Description |
| URL For Product Manual |
| URL For Warranty Service |
| URL For WWW Advertisement |
| URL For WWW Advertisement |
| URL For WWW Advertisement |
| URL For Product Wholesaler |
| URL For Product Wholesaler |
| URL For Product Wholesaler |
| URL For Product Retailer No.1 |
| URL For Product Retailer No.2 |
| URL For Product Retailer No.3 |
| URL For Direct Product Purchase |
| URL For Complementary Product |
| URL For Complementary Product |
| URL For Complementary Product |
| URL For Company Annual Report |
| URL For Company Stock Purchase |

FIG. 4C3

| RETAILER |
|---|
| Company Name |
| Street Address |
| City |
| State |
| Postal Code |
| Country |
| Manufacturer ID Number |
| Contact Person |
| Phone Number |
| E-Mail |
| Domain Name |
| Website Creation Date |
| Website Existence |
| Manufacturer Website URL |
| Manufacturer No. 1 |
| Manufacturer No. 2 |
| Manufacturer No. 3 |
| Manufacturer No. 4 |
| Manufacturer No. 5 |
| Manufacturer No. 6 |
| Manufacturer No. 7 |
| Manufacturer No. 8 |
| Manufacturer No. 9 |
| Manufacturer No. 10 |
| ⋮ |
| Manufacturer No. N |

FIG. 4D

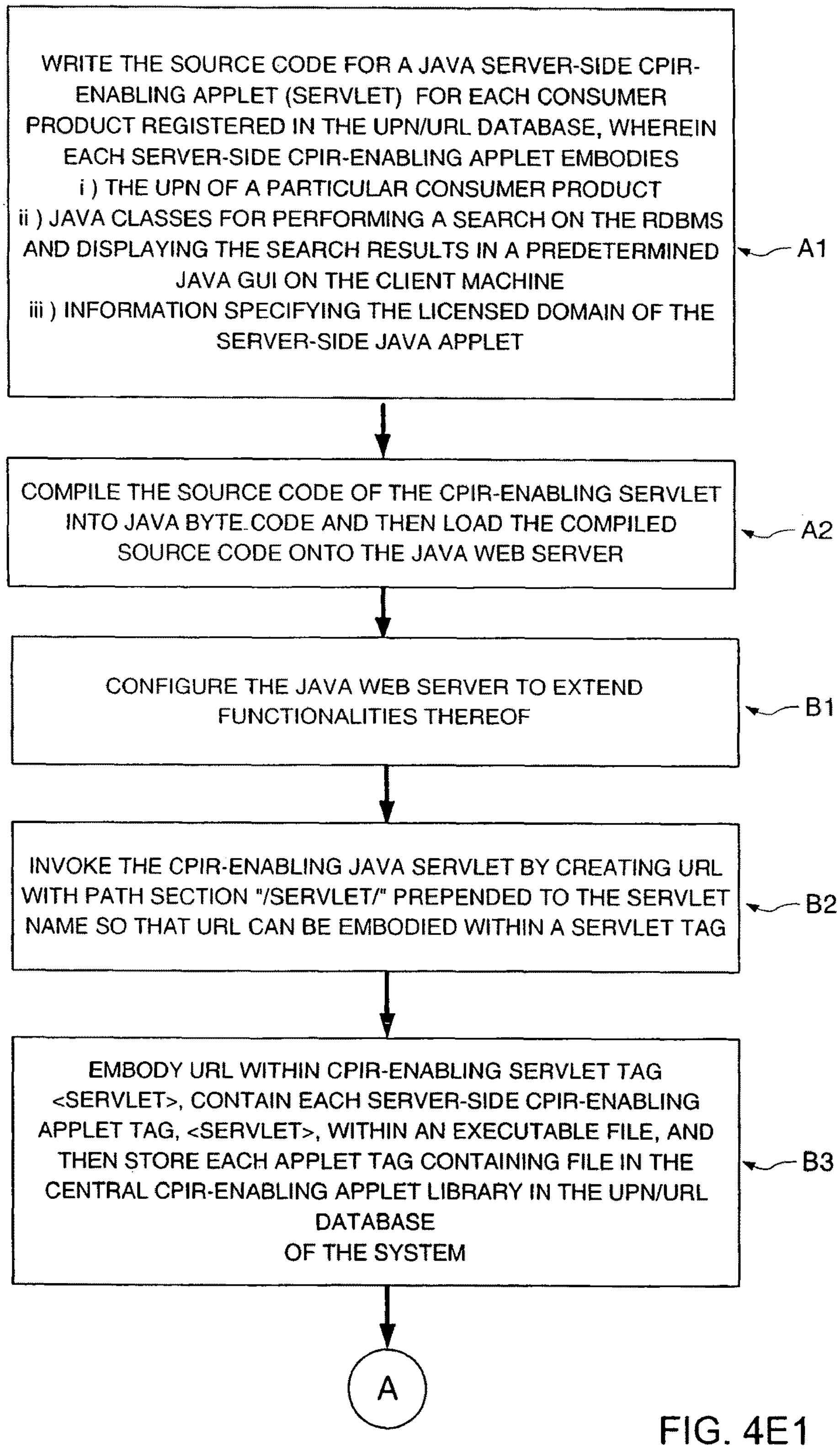
FIG. 4E1

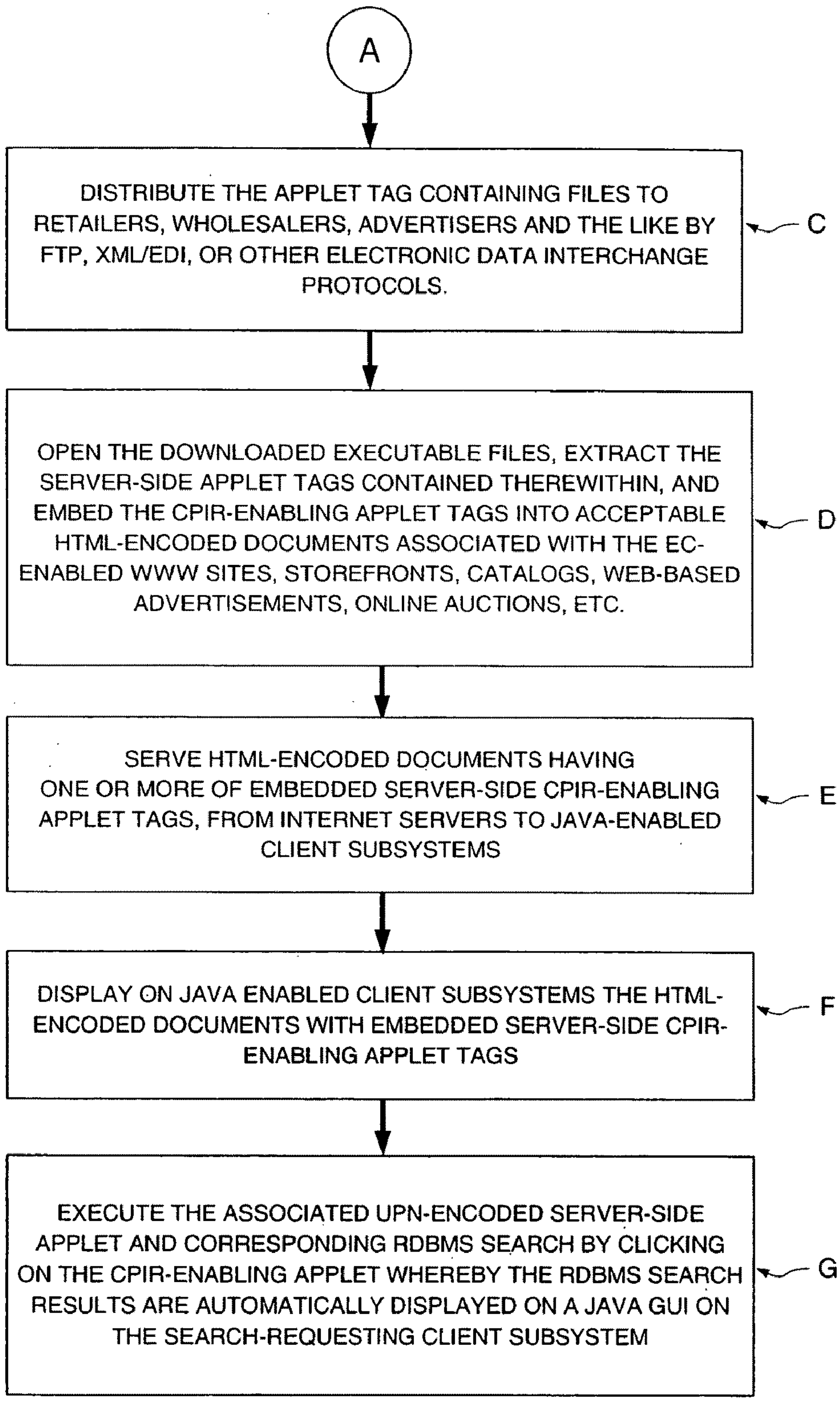
FIG. 4E2

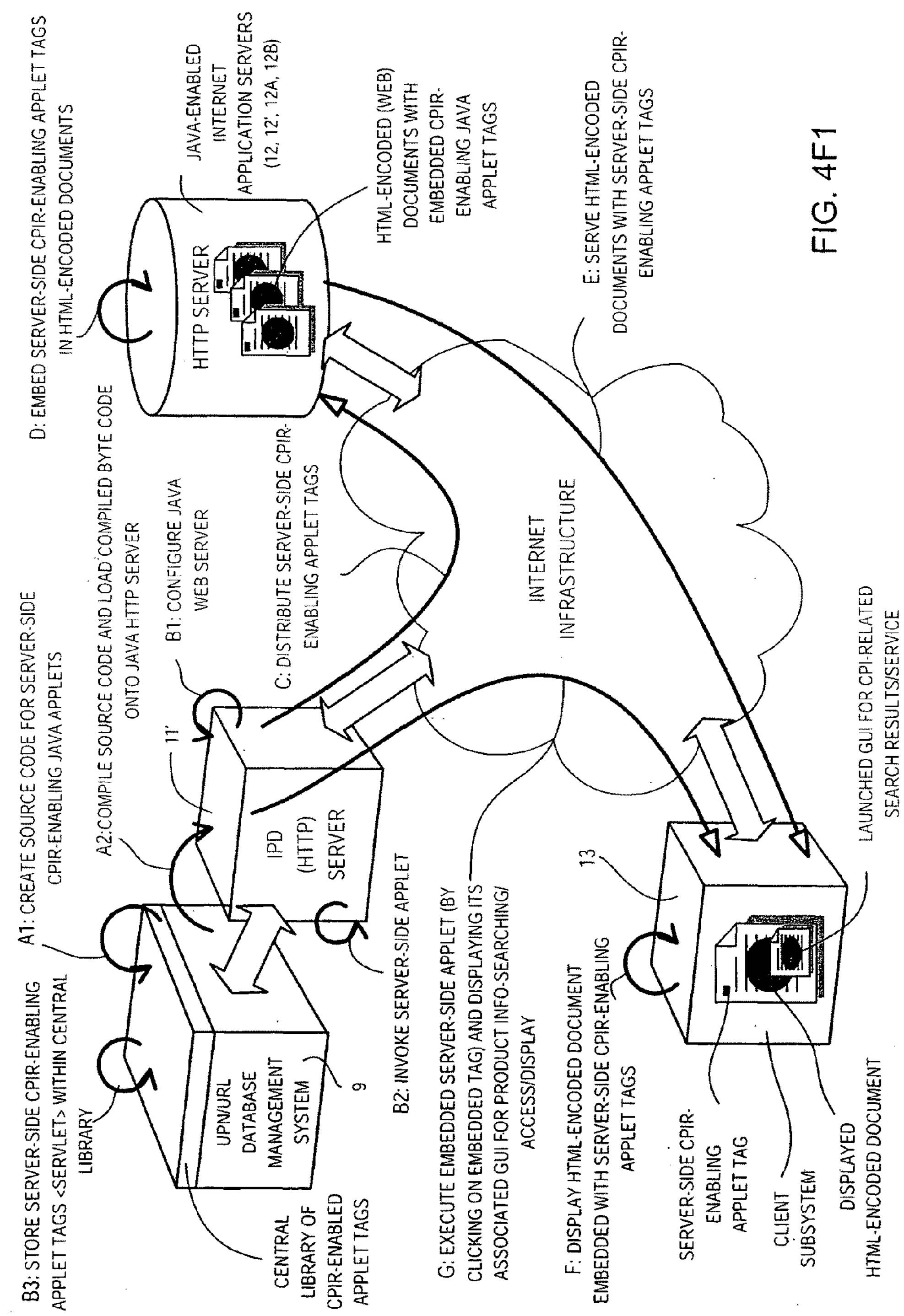
FIG. 4F1

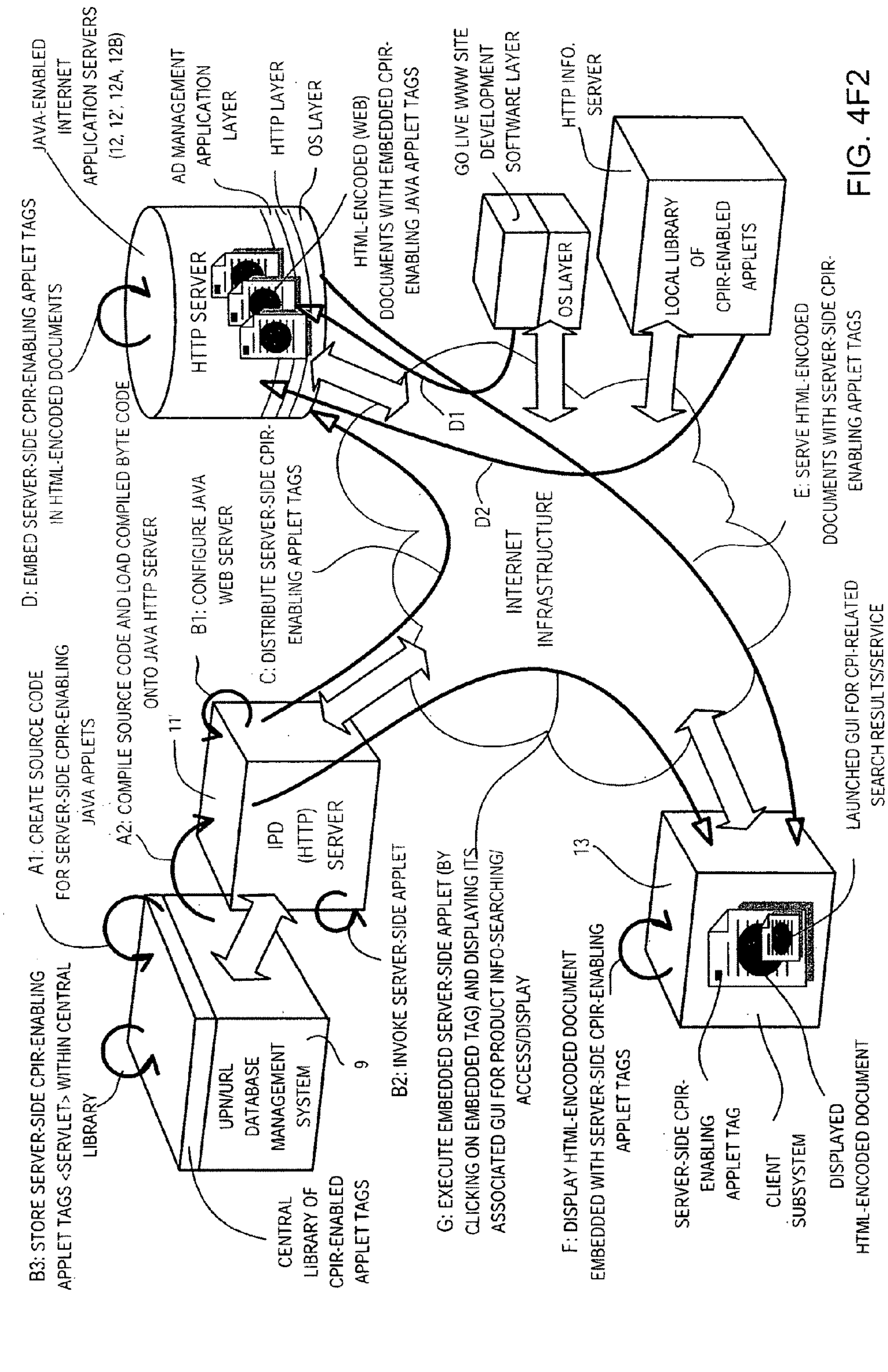
FIG. 4F2

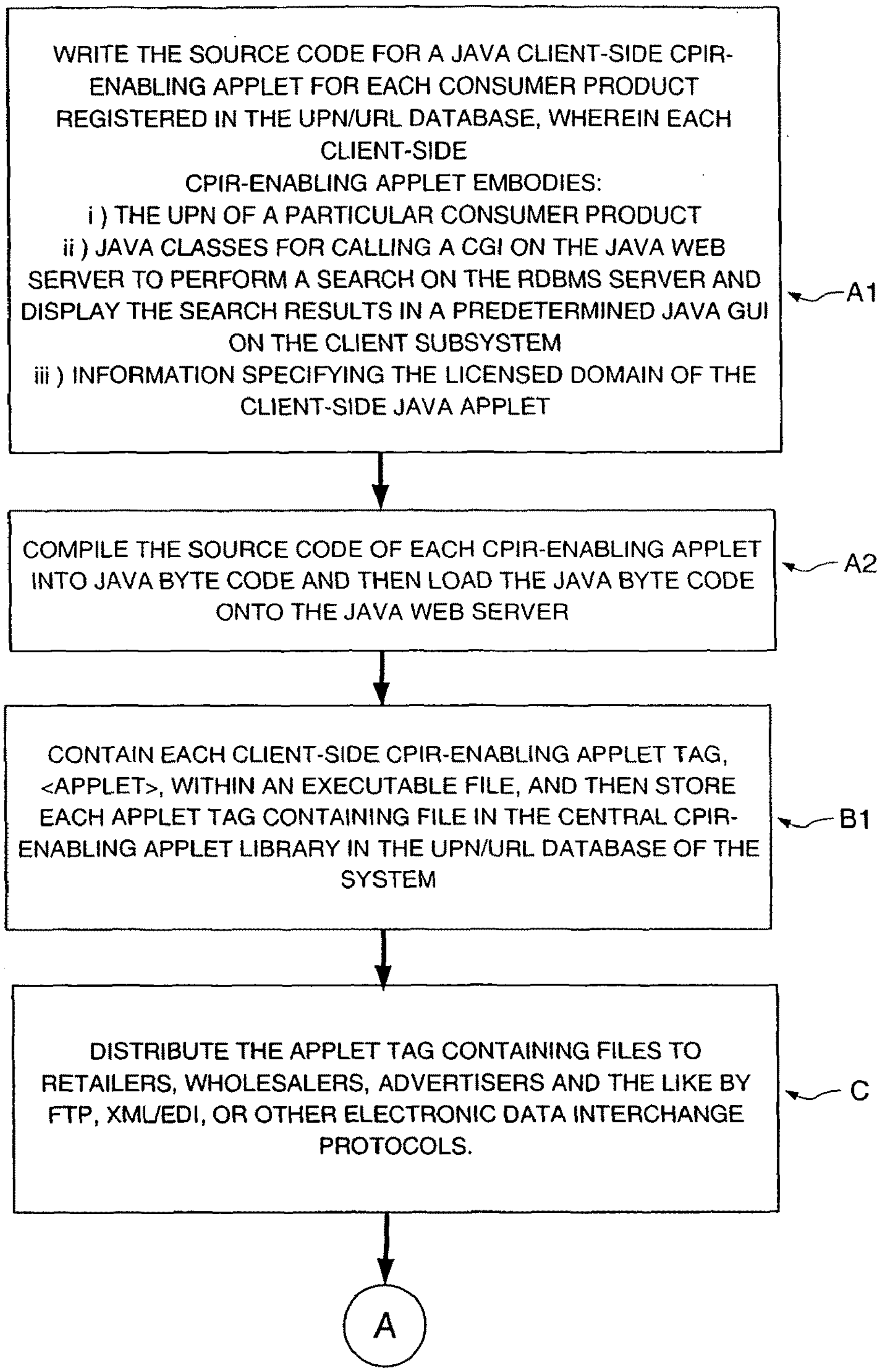
FIG. 4G1

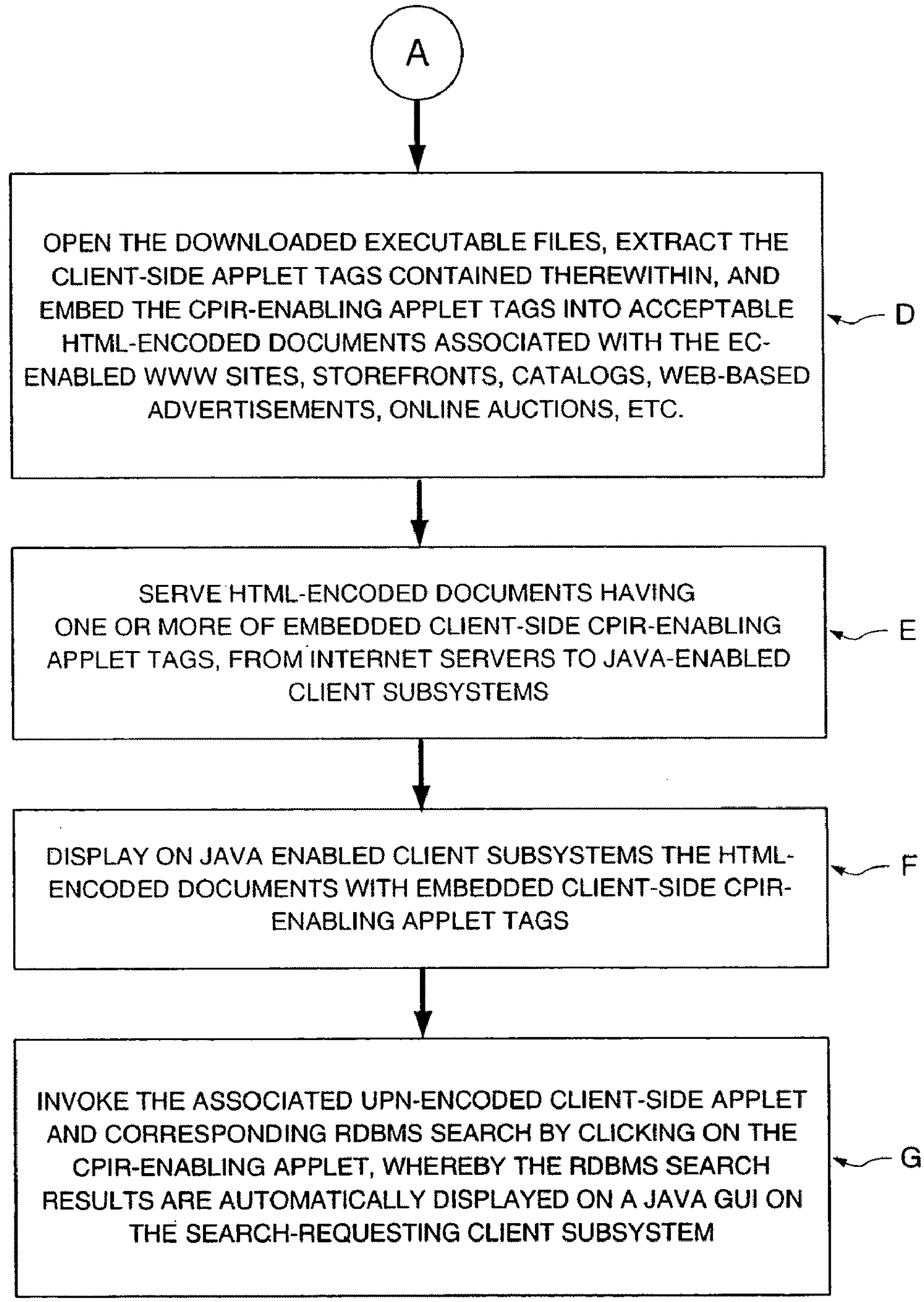
FIG. 4G2

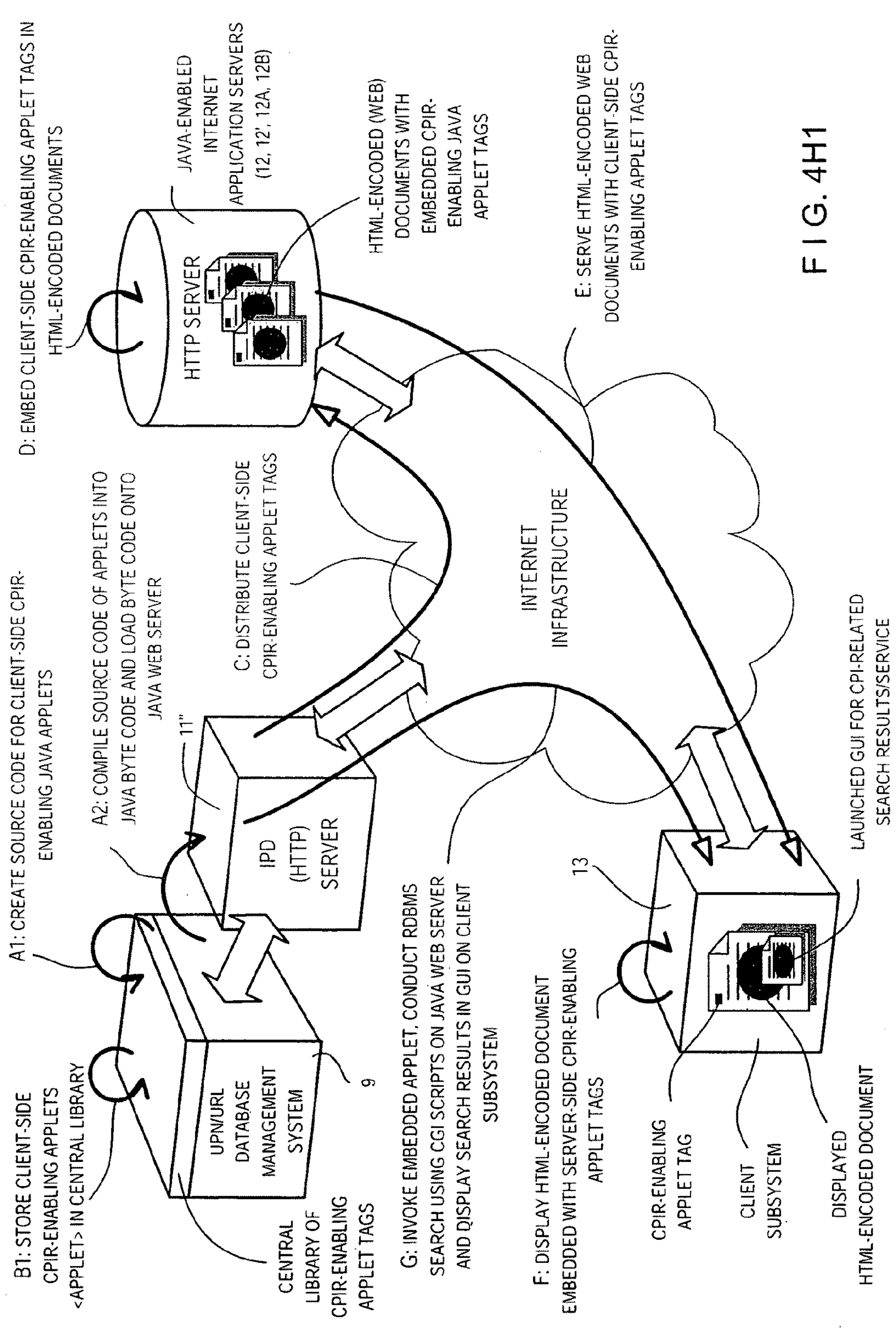
FIG. 4H1

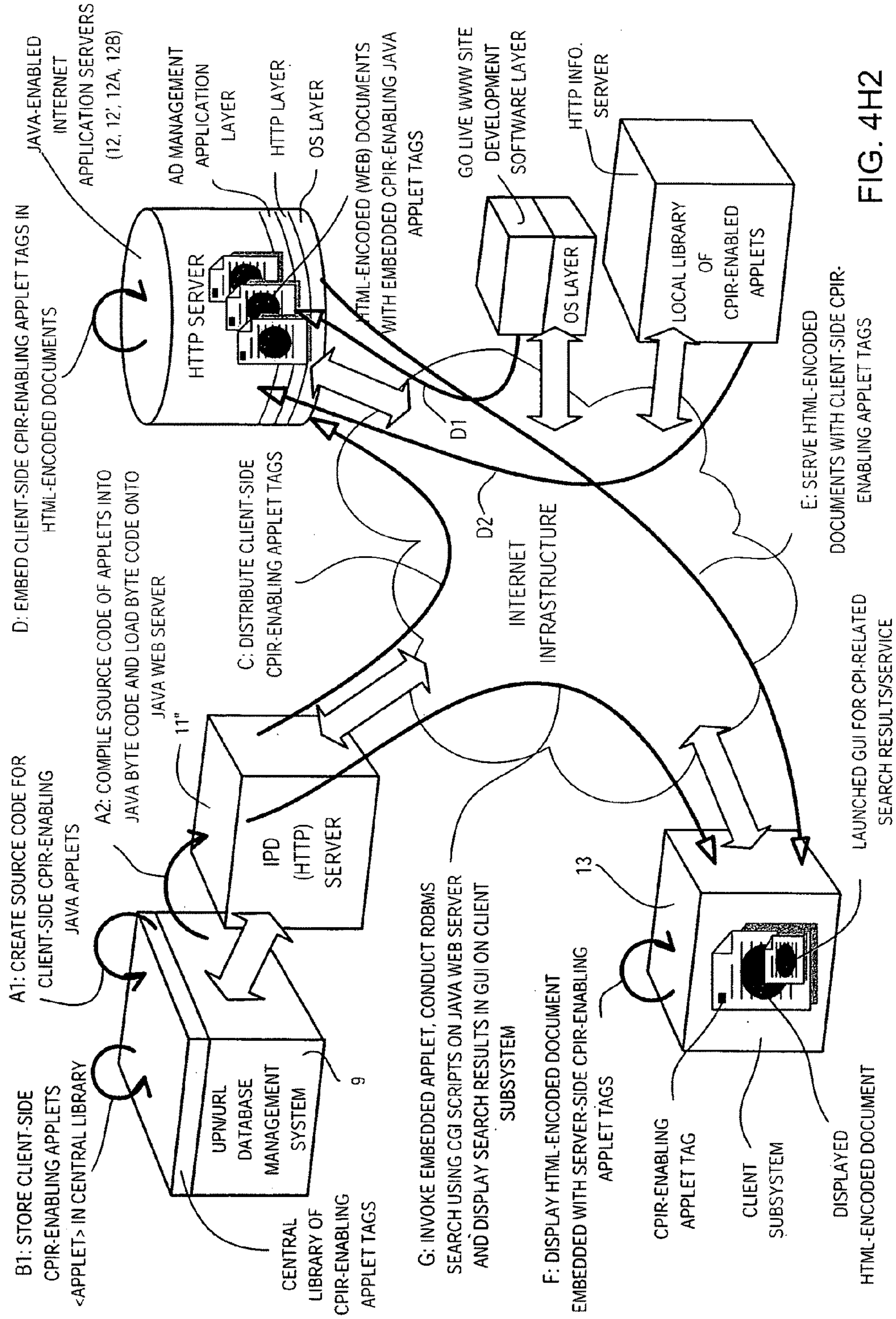
FIG. 4H2

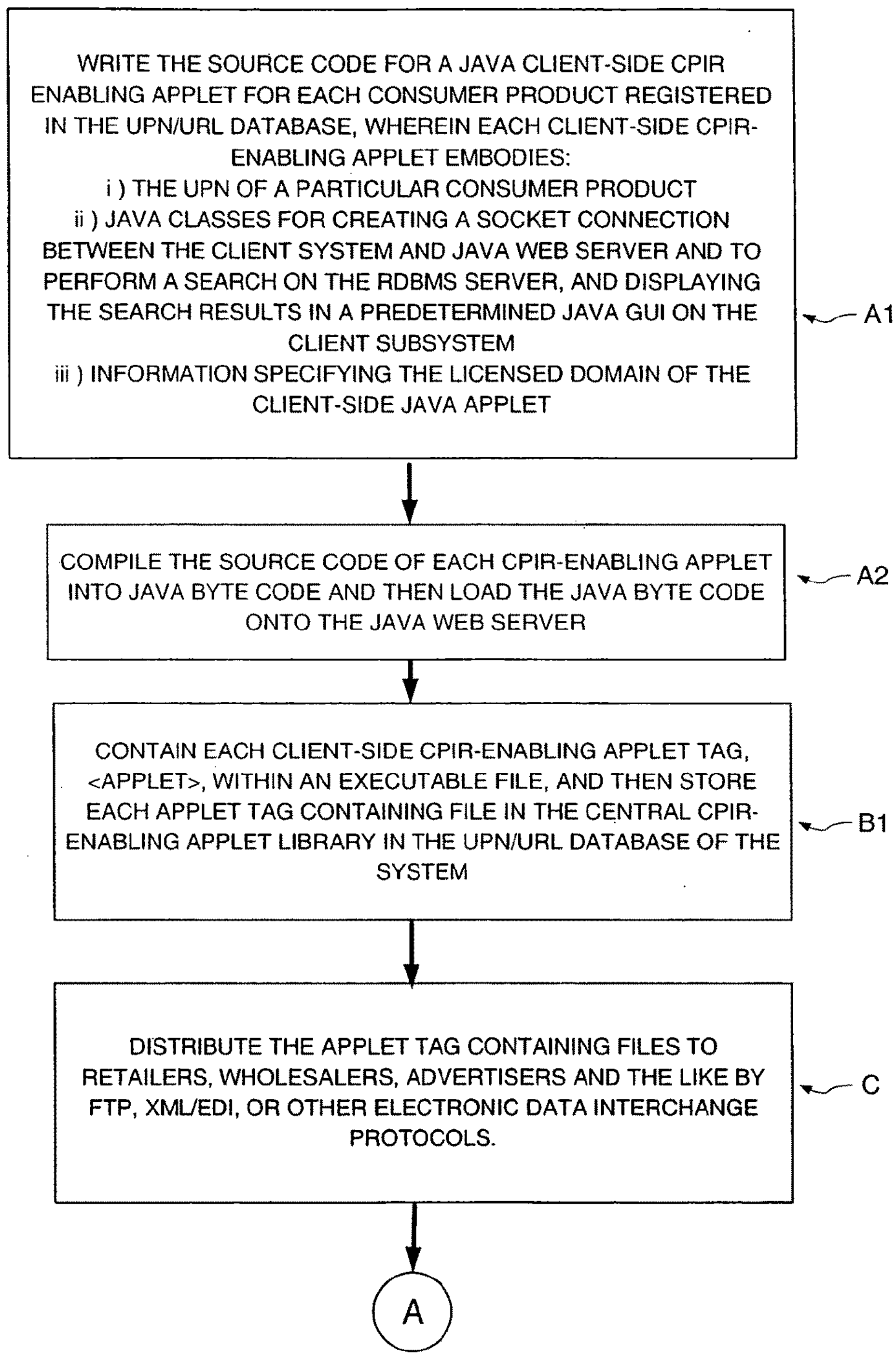
FIG. 4I1

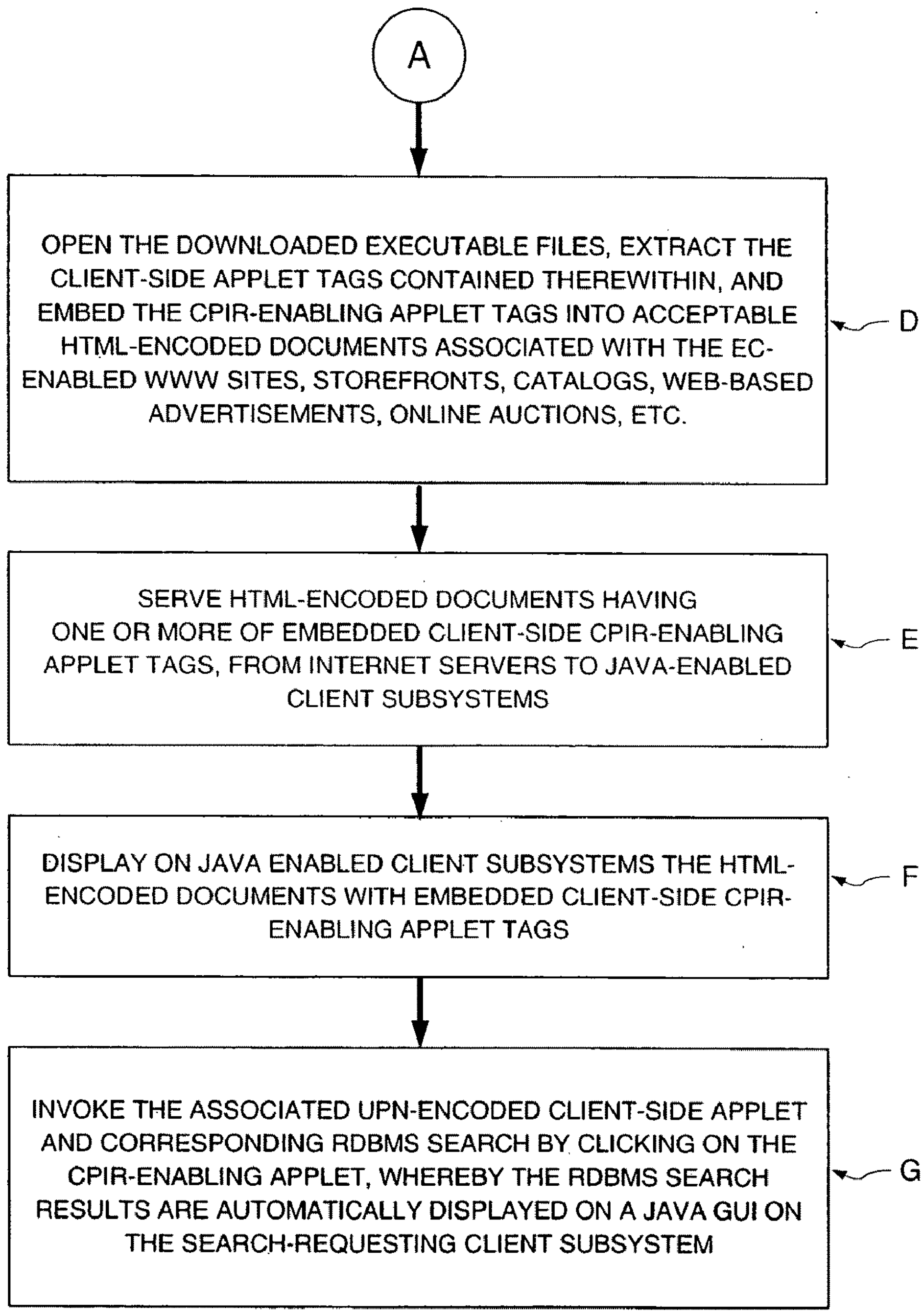
FIG. 4I2

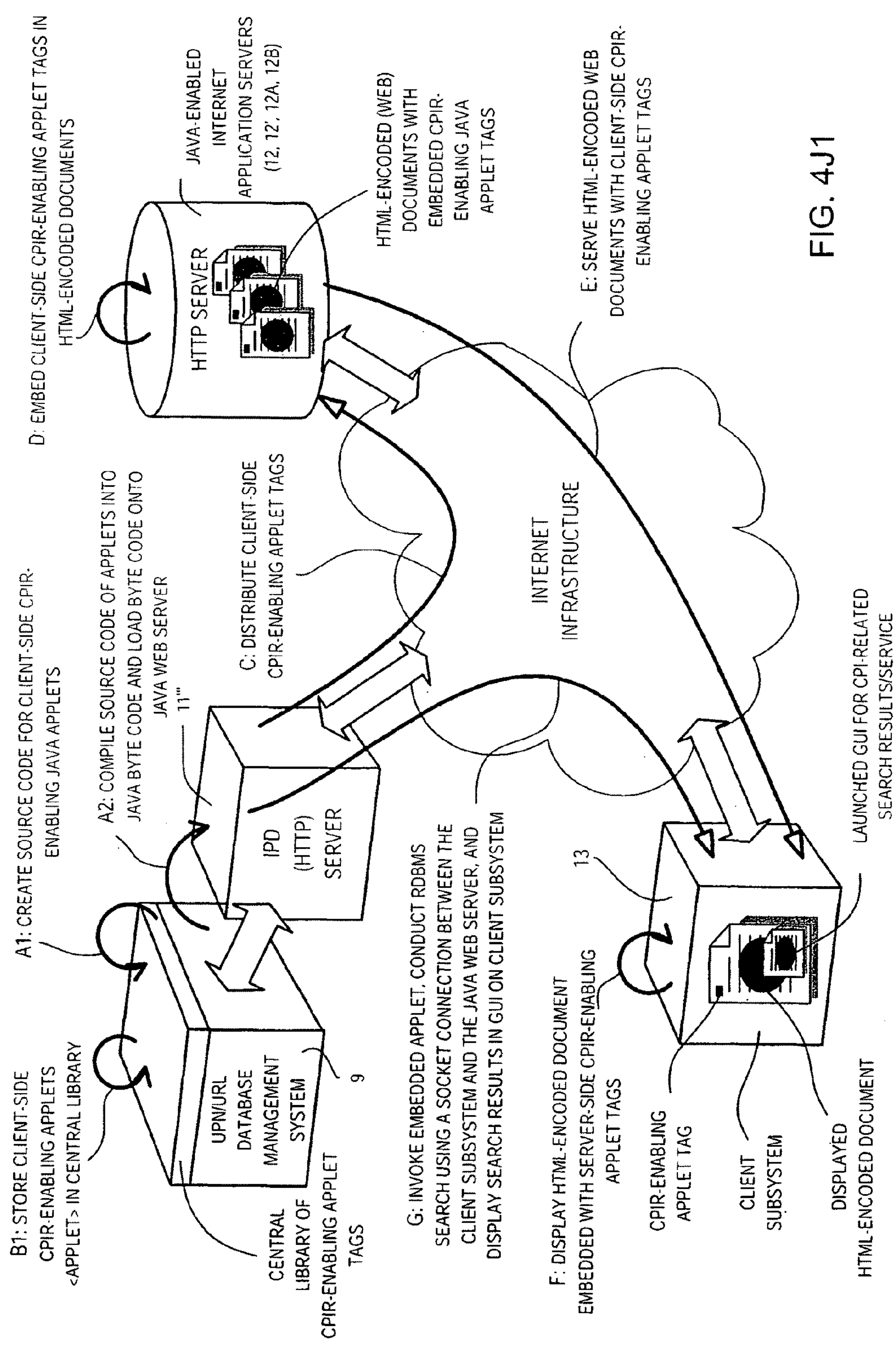
FIG. 4J1

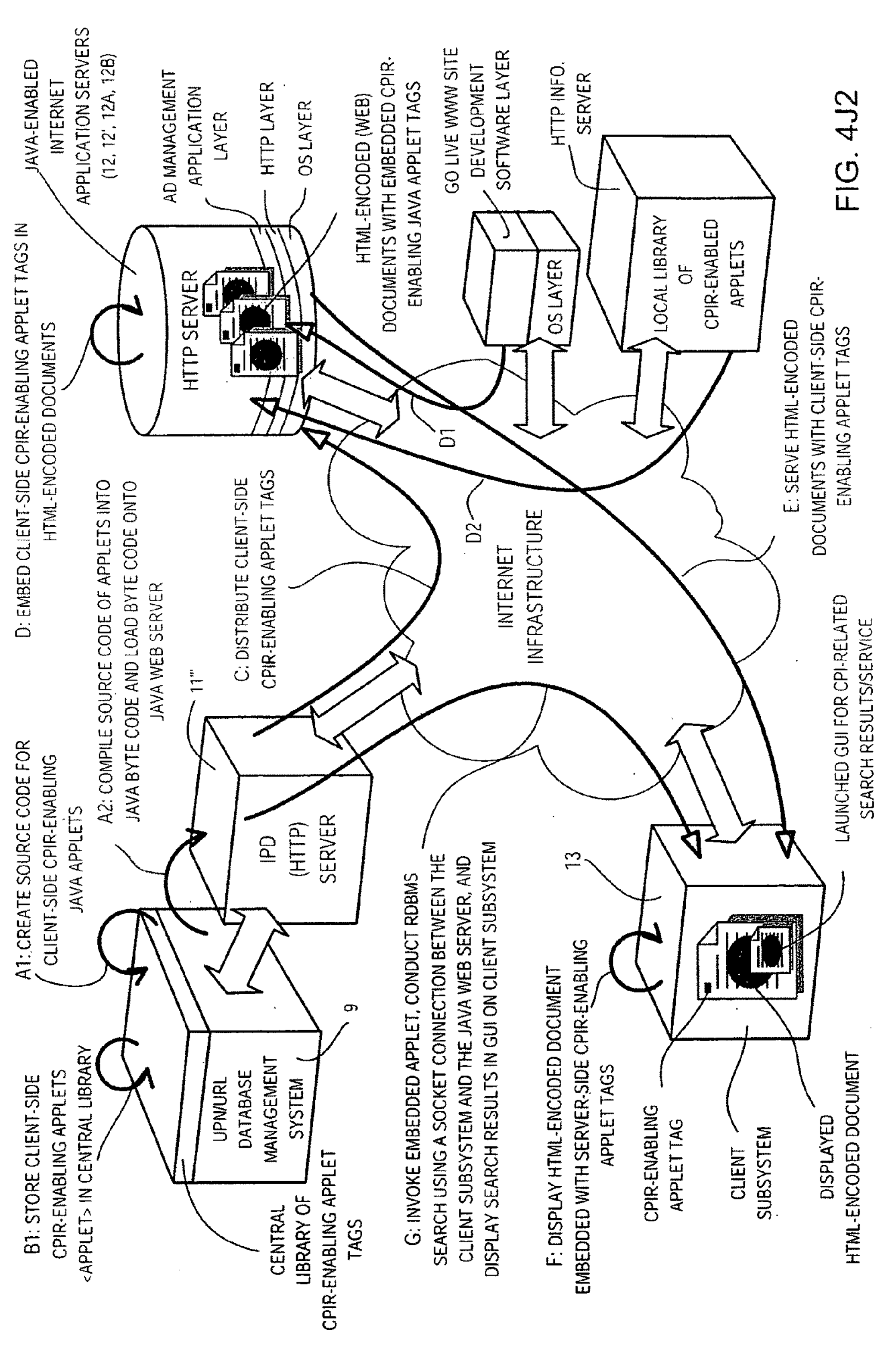
FIG. 4J2

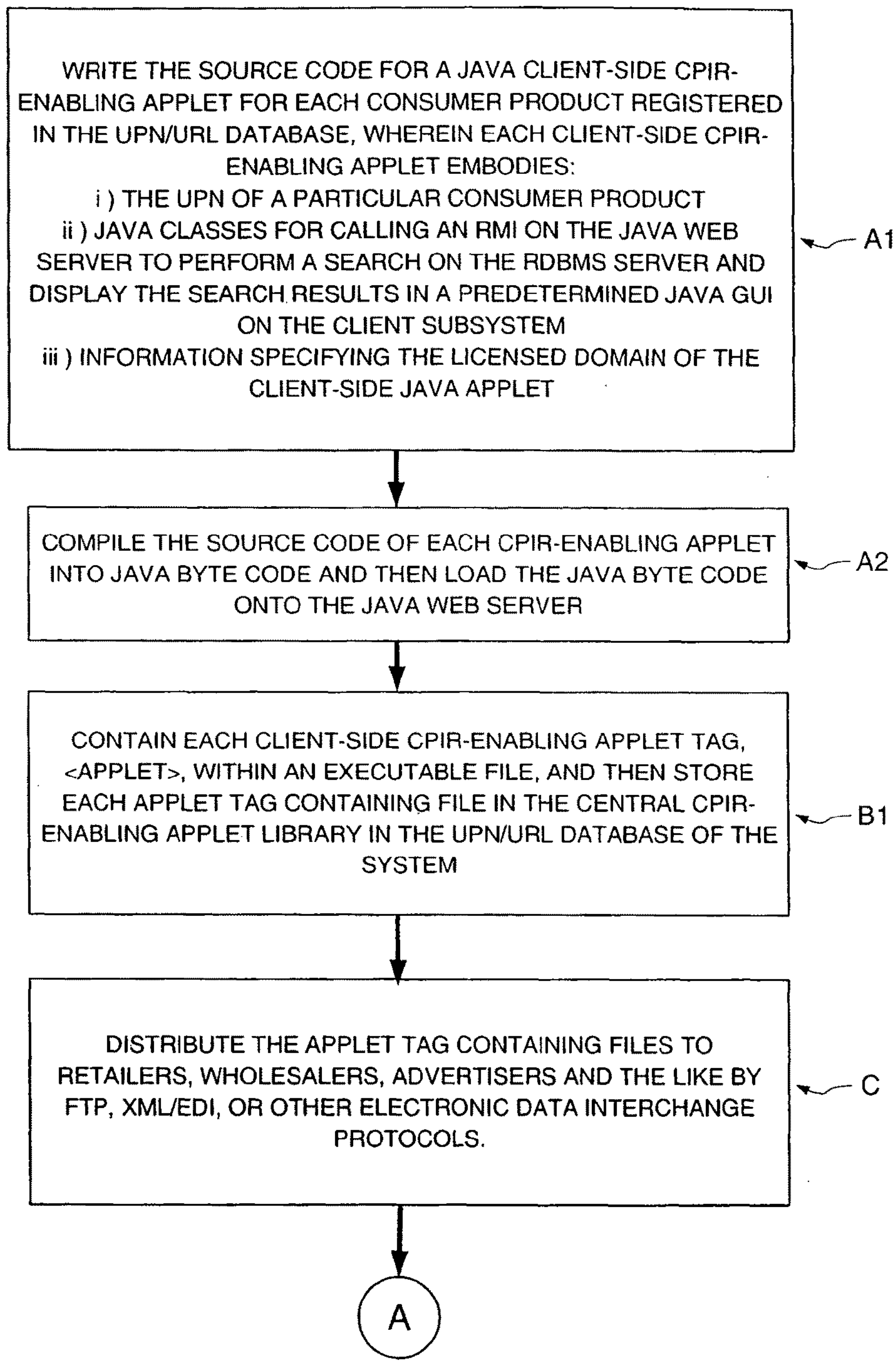
FIG. 4K1

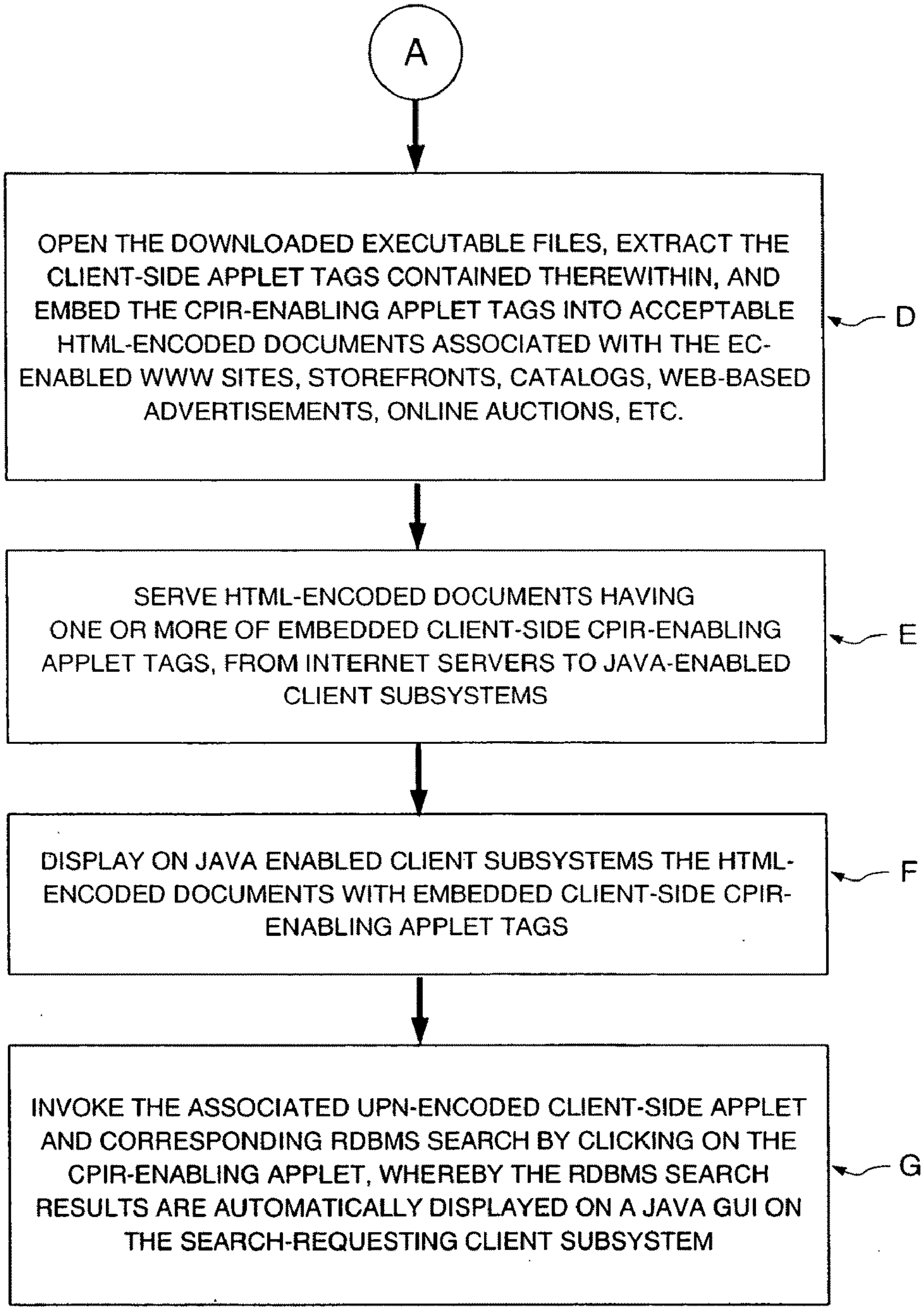
FIG. 4K2

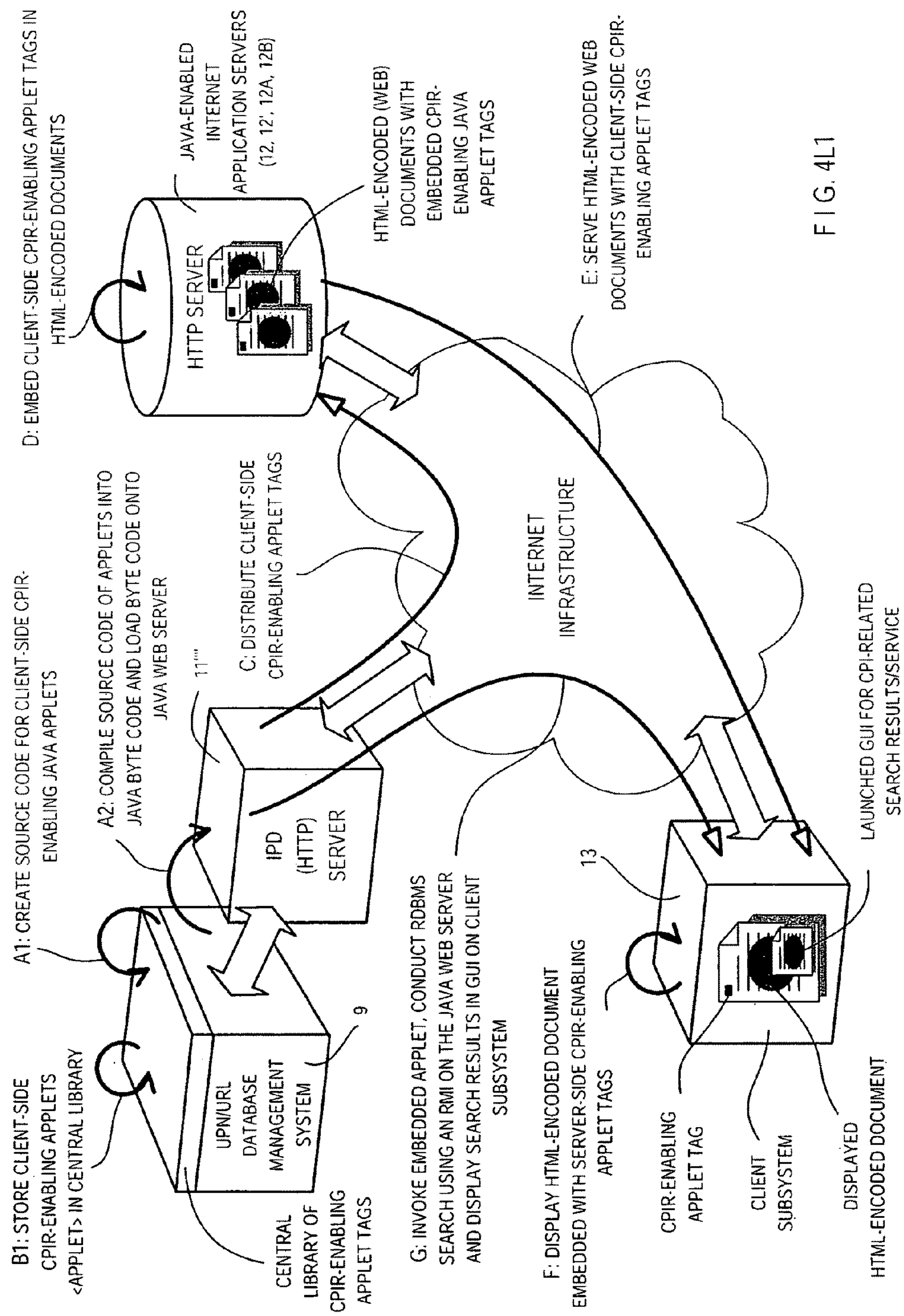
FIG. 4L1

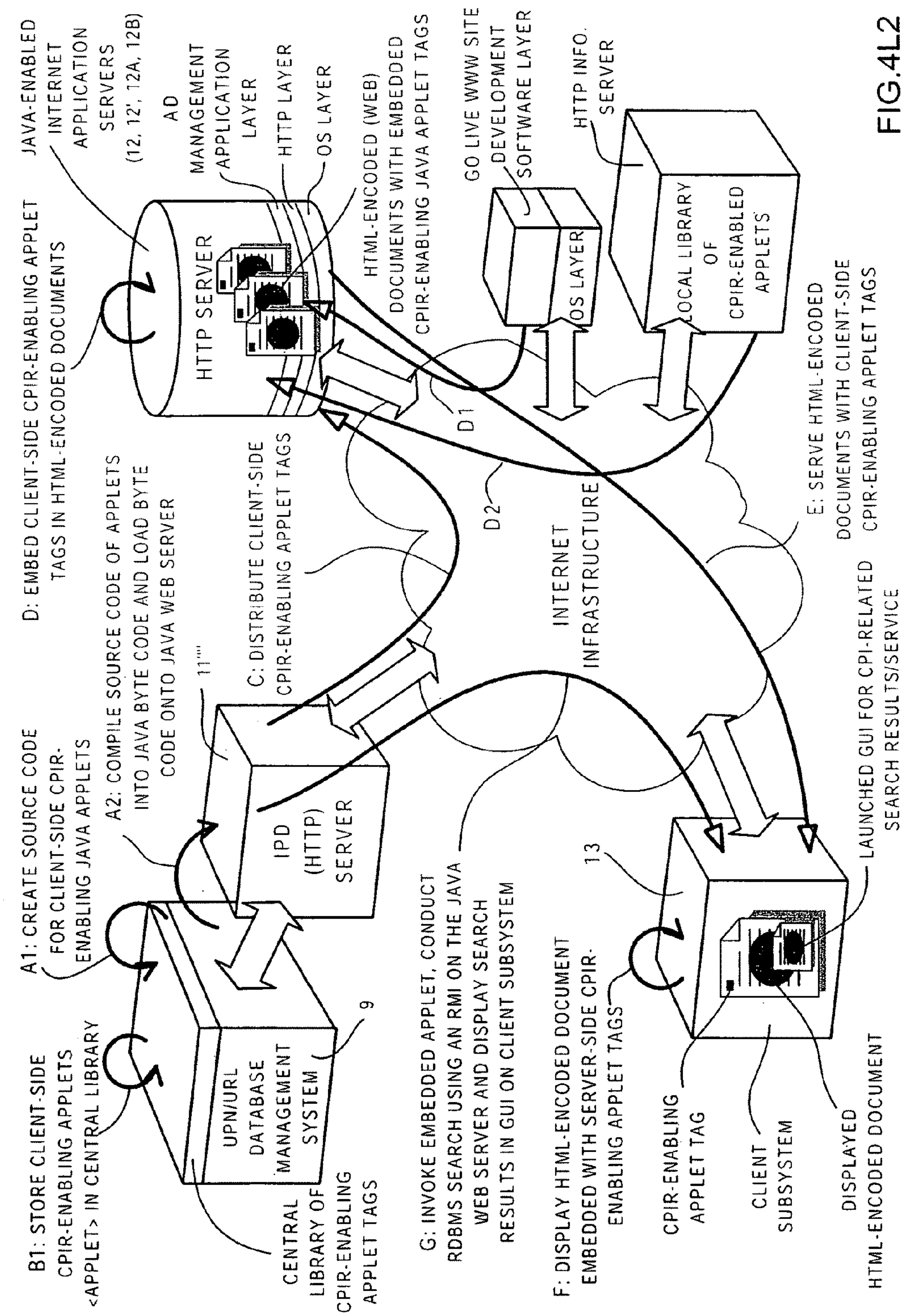
FIG.4L2

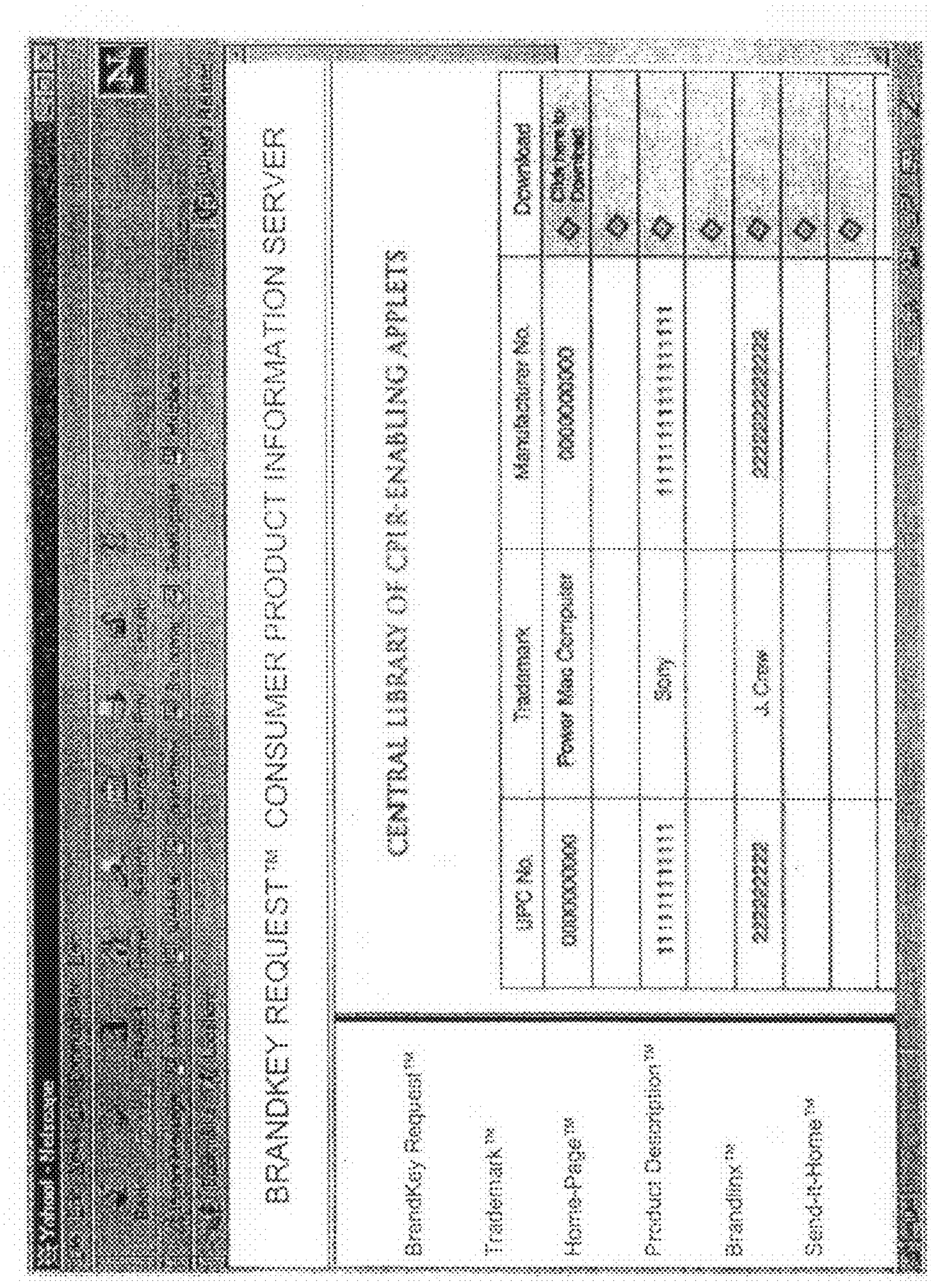
FIG. 4M1

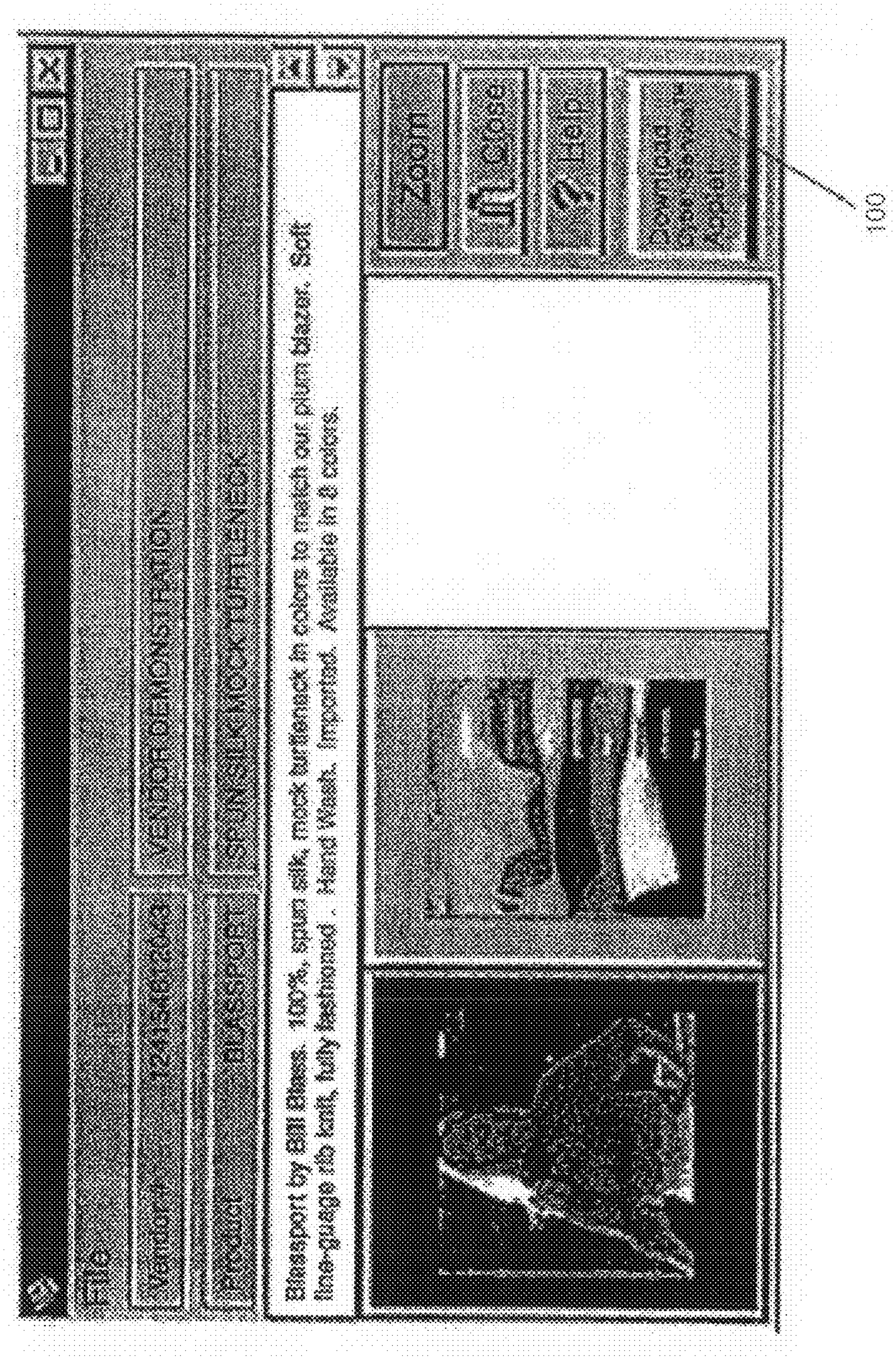
FIG. 4M2

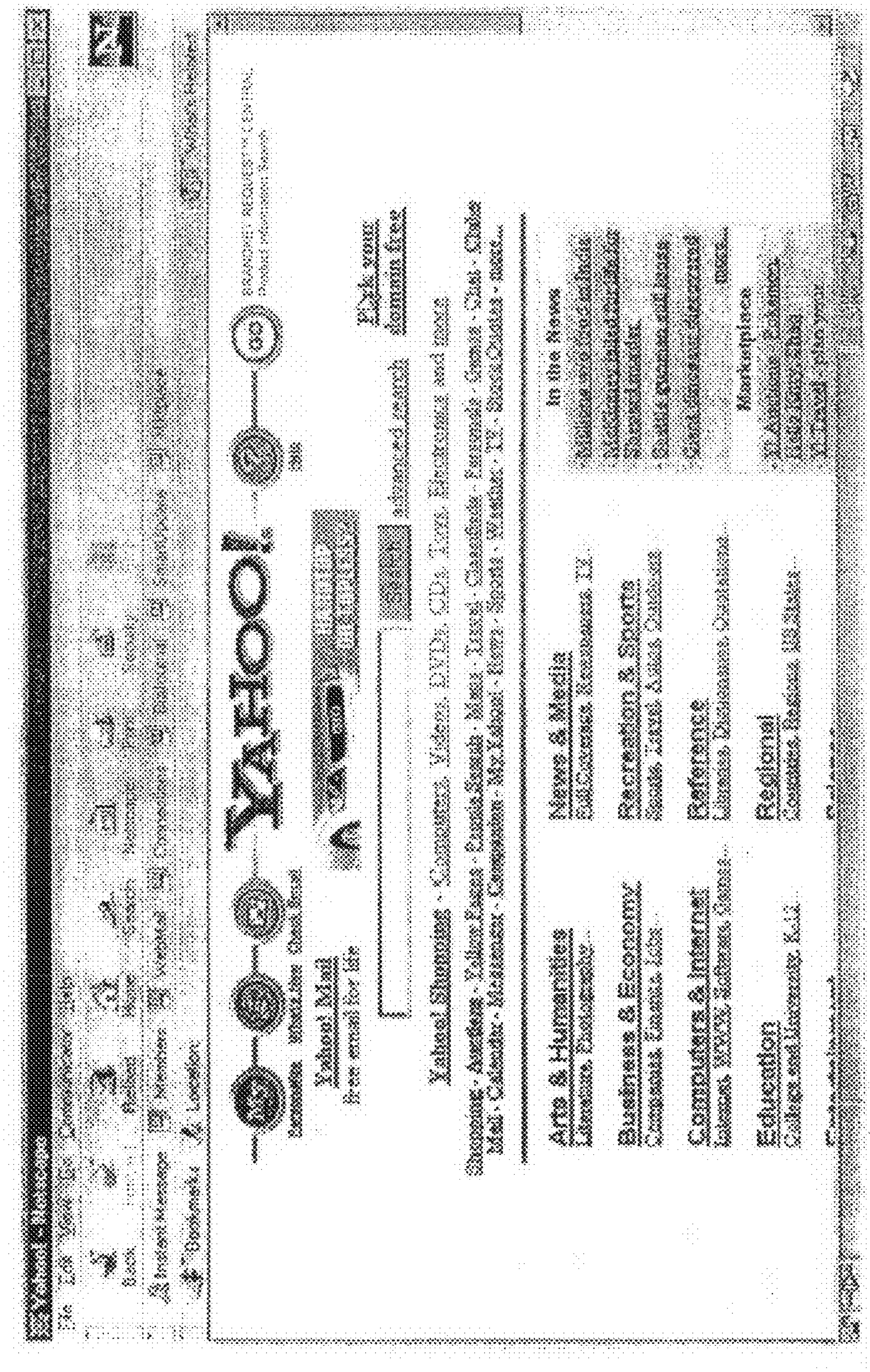
FIG. 4N1

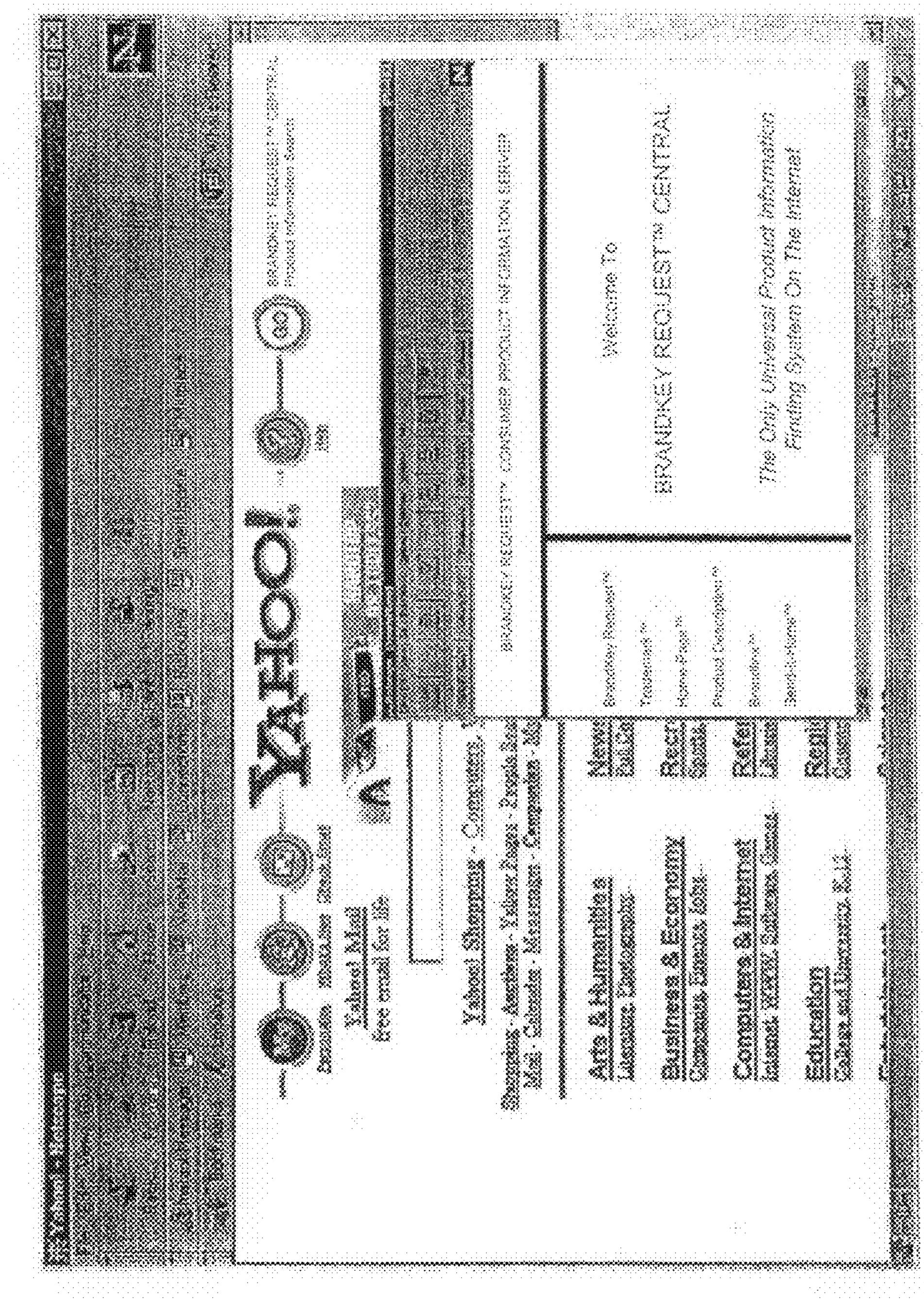
FIG. 4N2

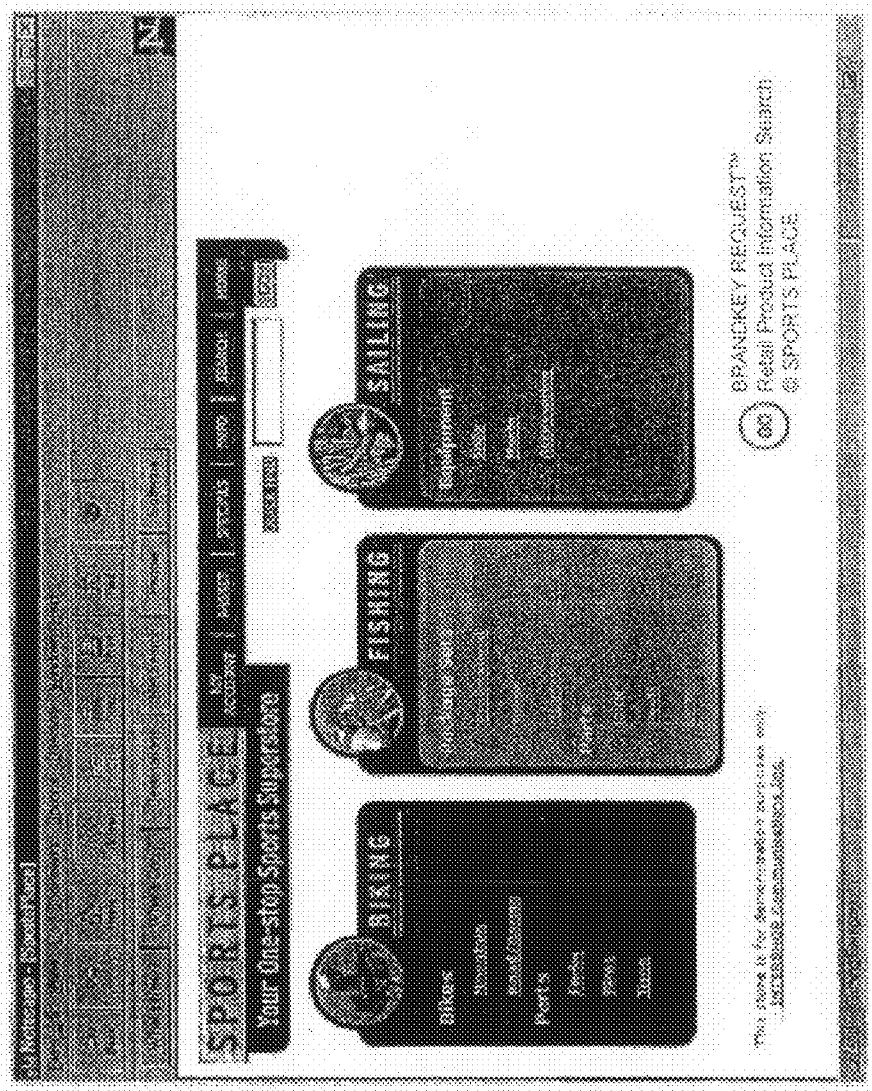
FIG. 4O1

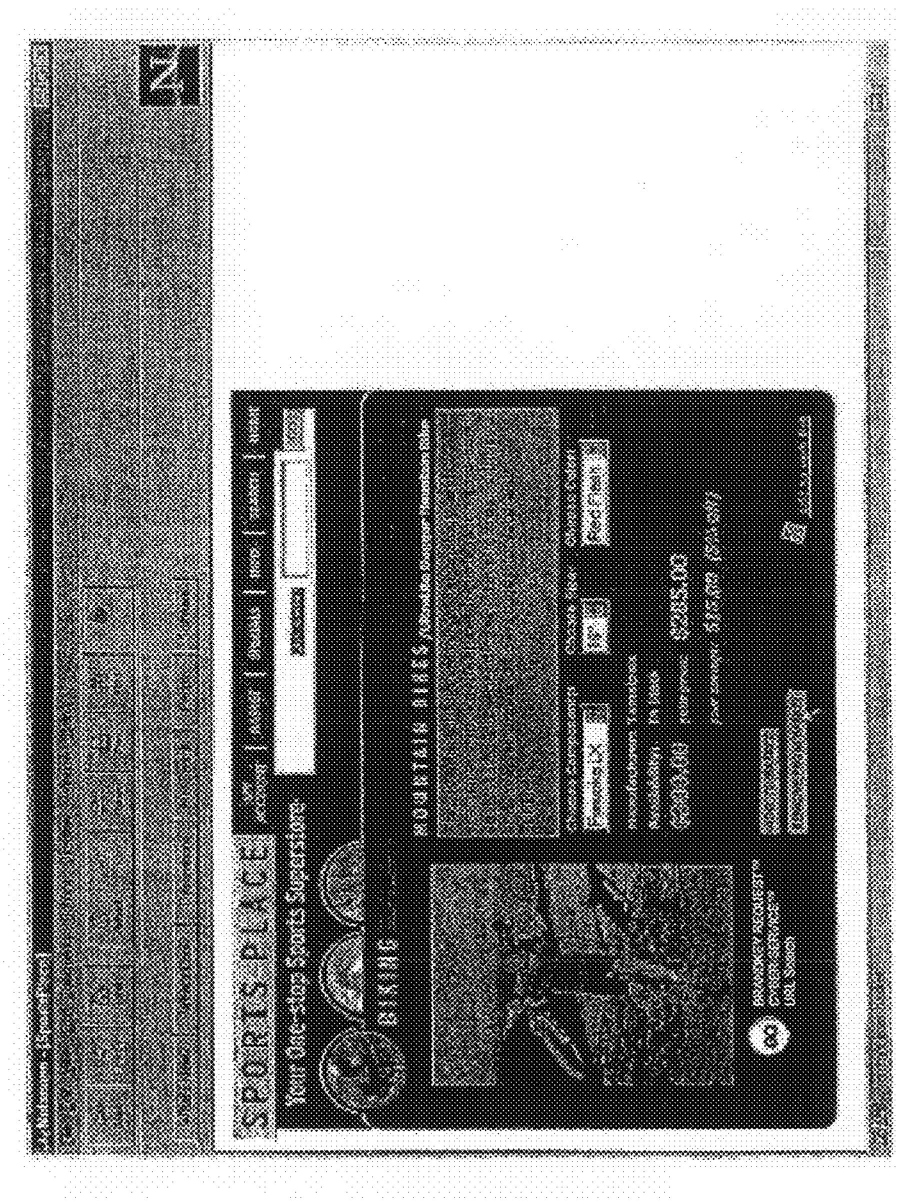
FIG. 4P1

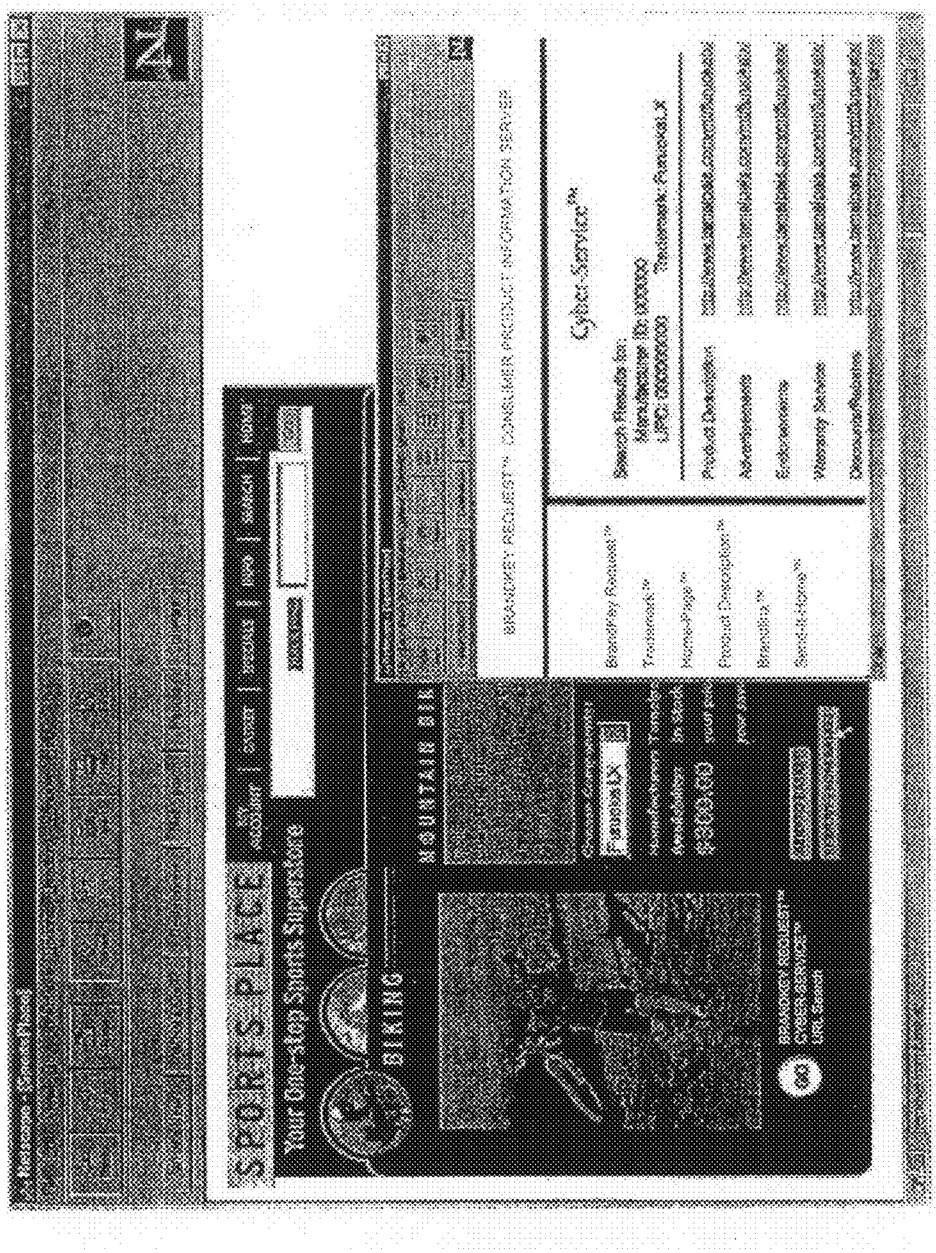
FIG. 4P2

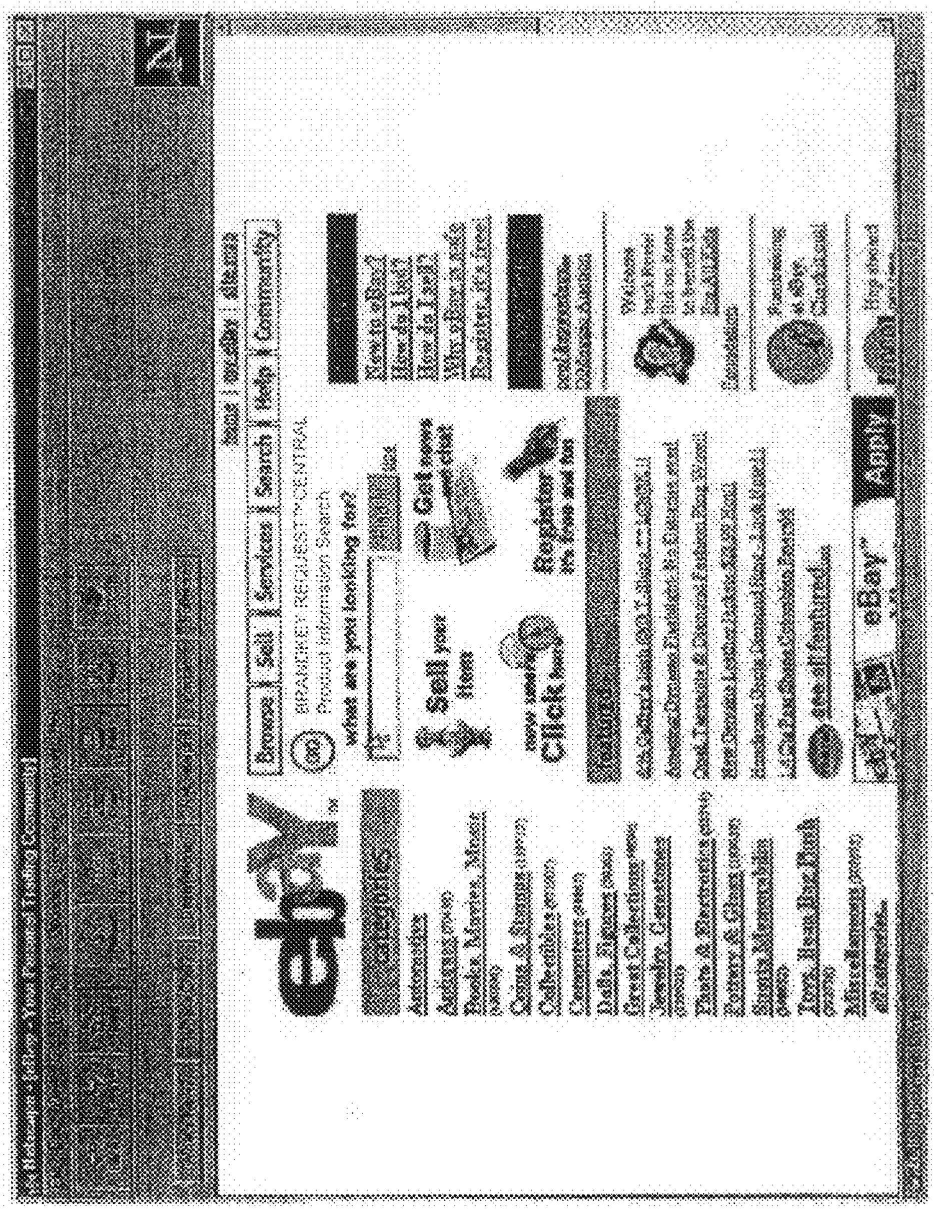
FIG. 4Q1

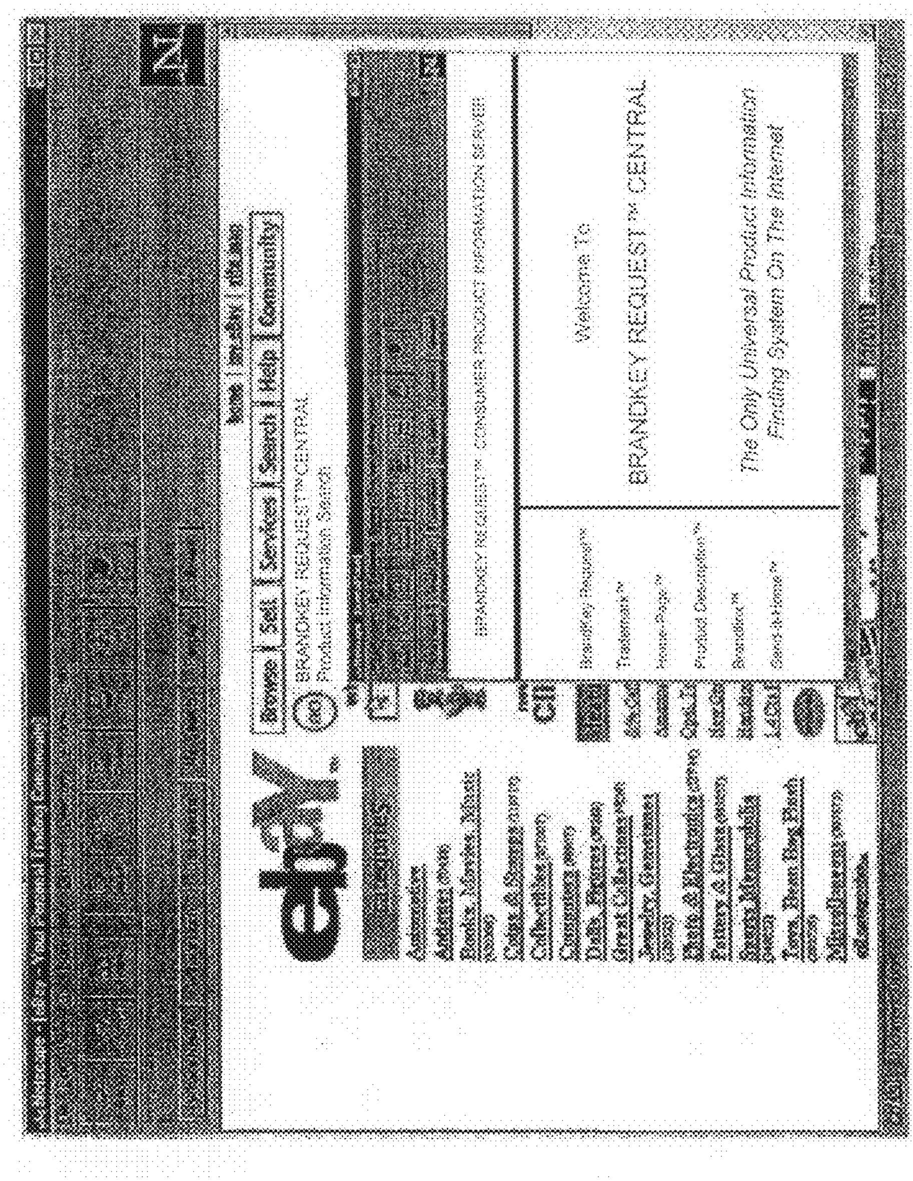
FIG. 4Q2

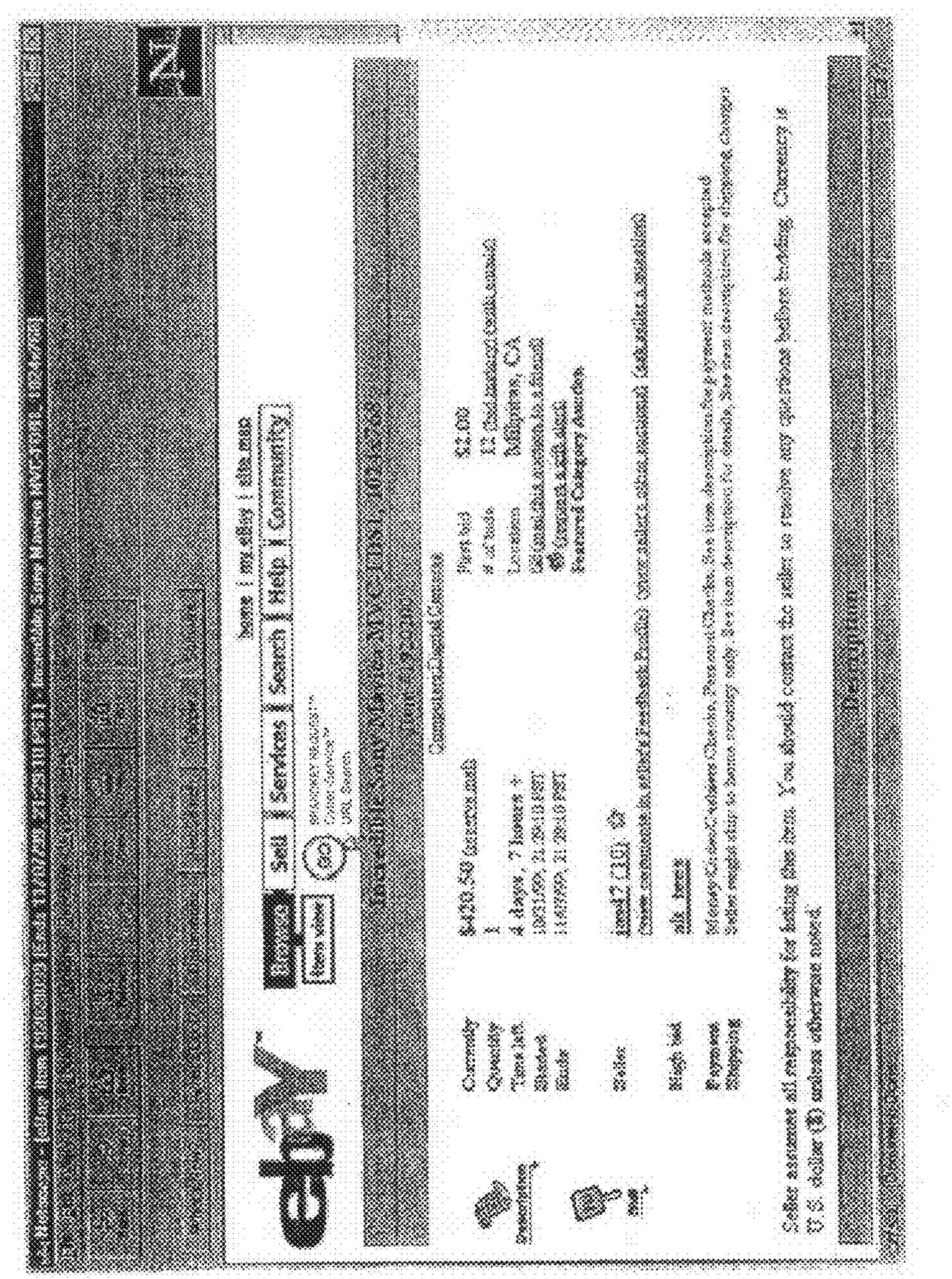
FIG. 4R1

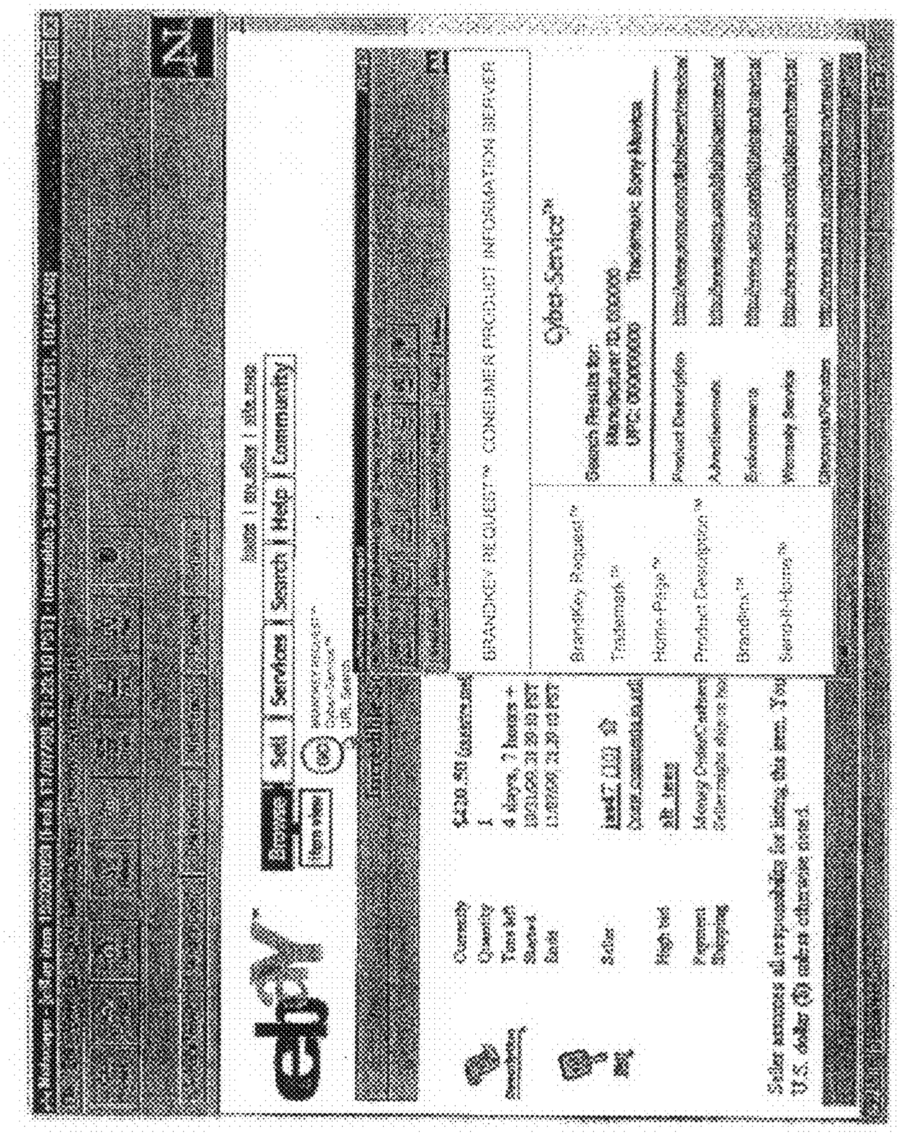
FIG. 4R2

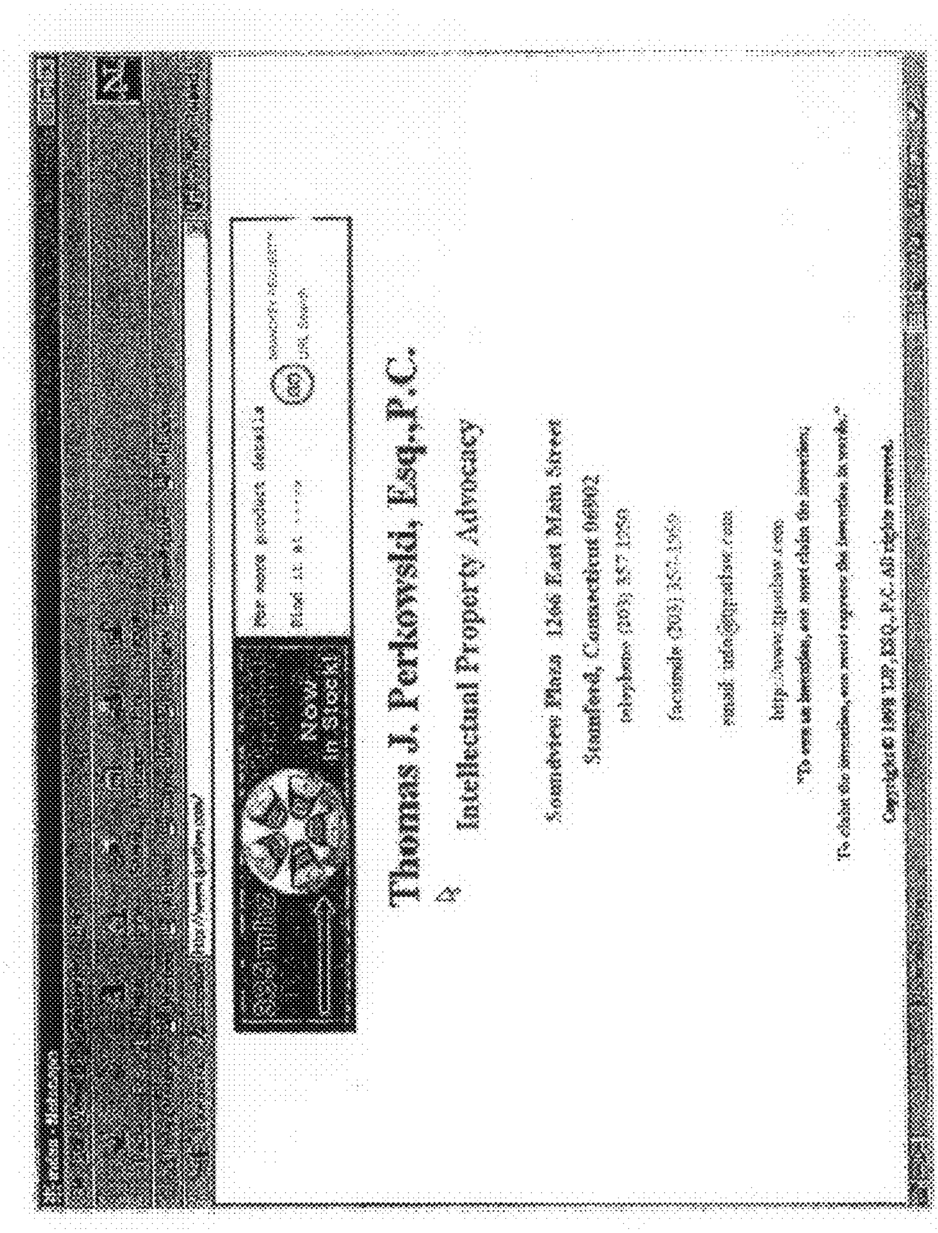
FIG. 4S1

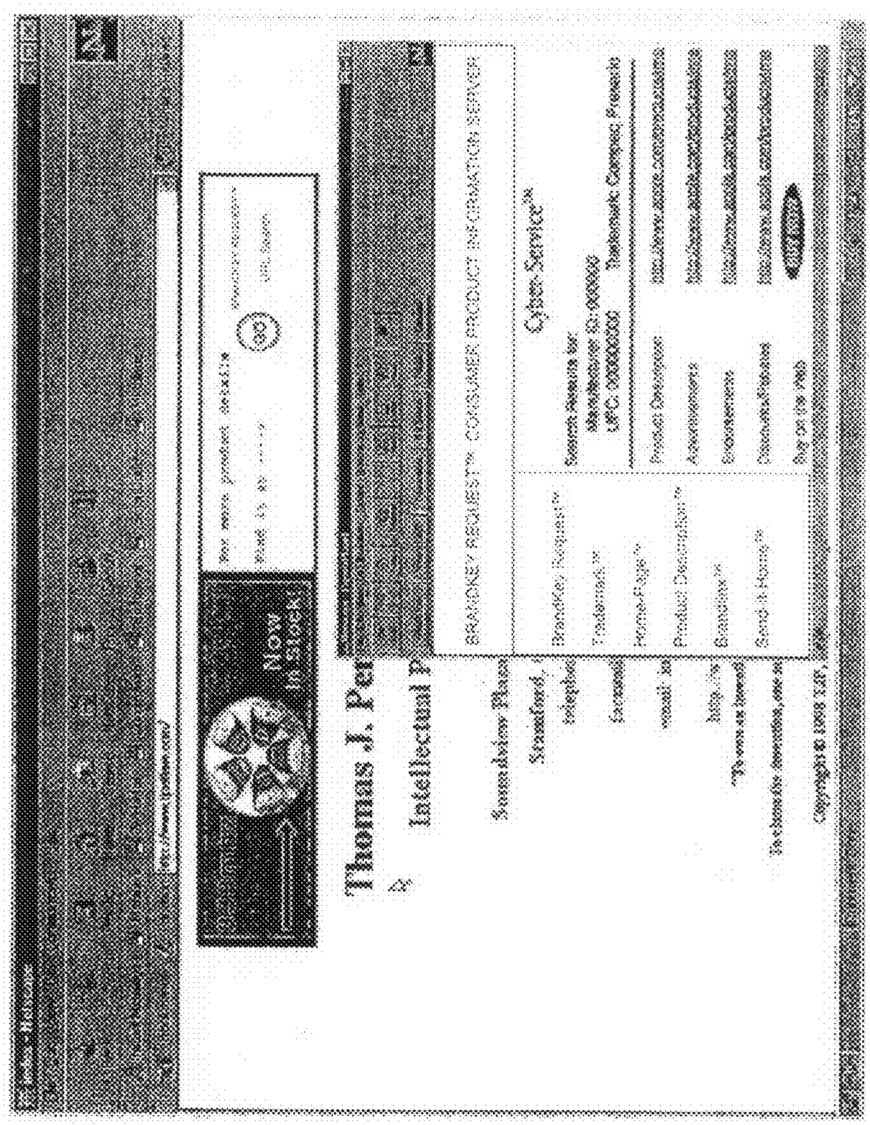
FIG. 4S2

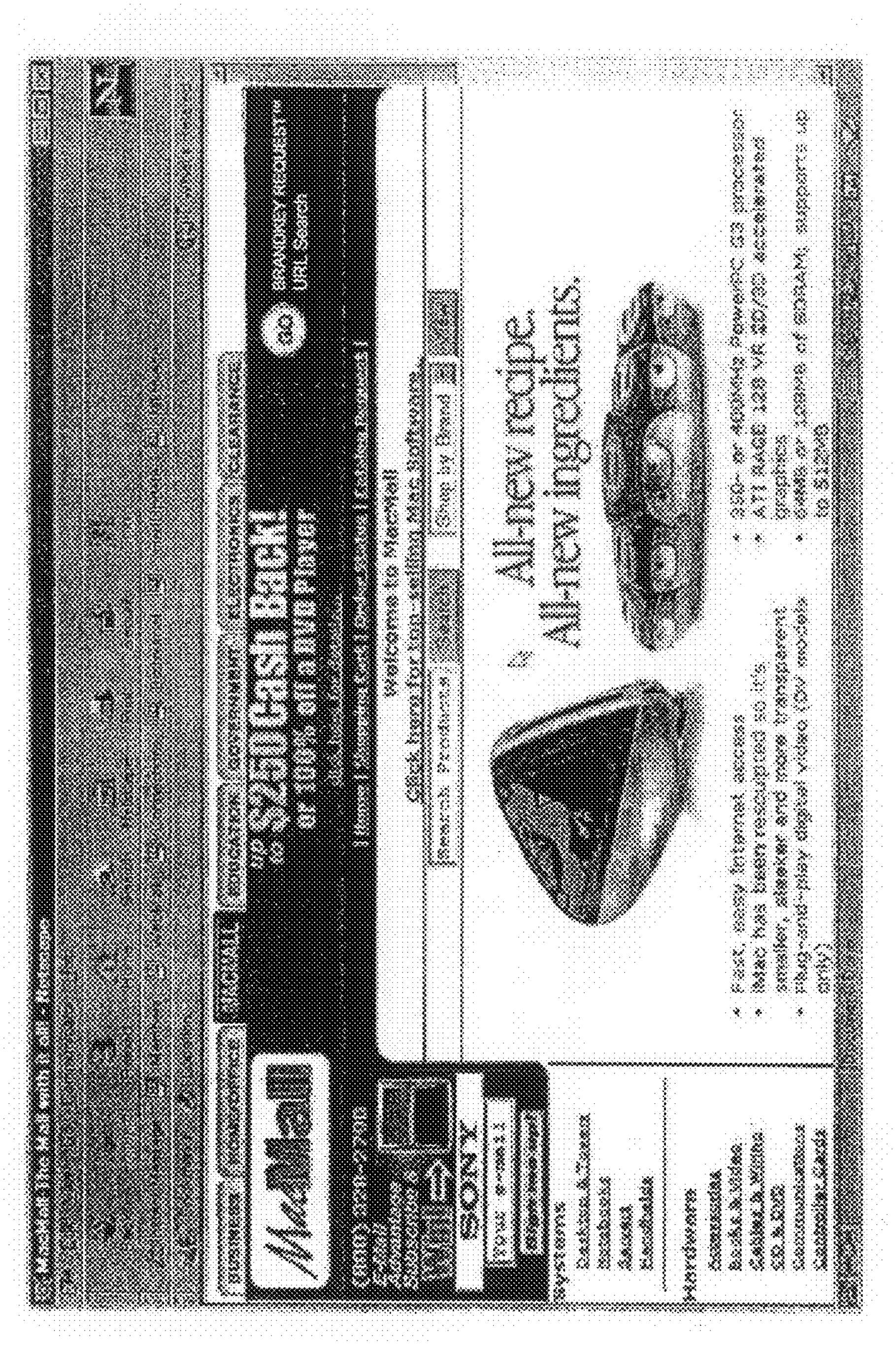
FIG. 4S3

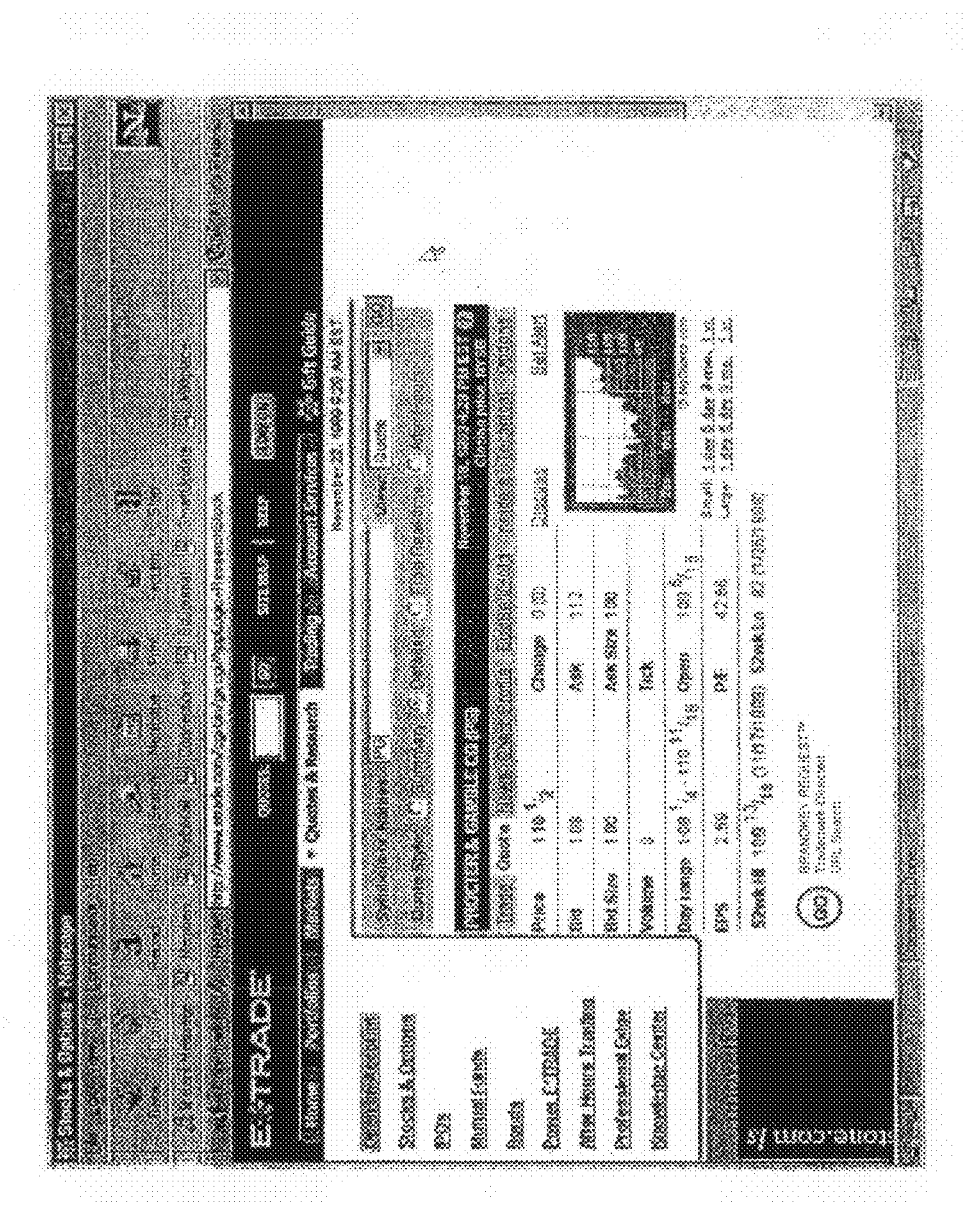
FIG. 4T1

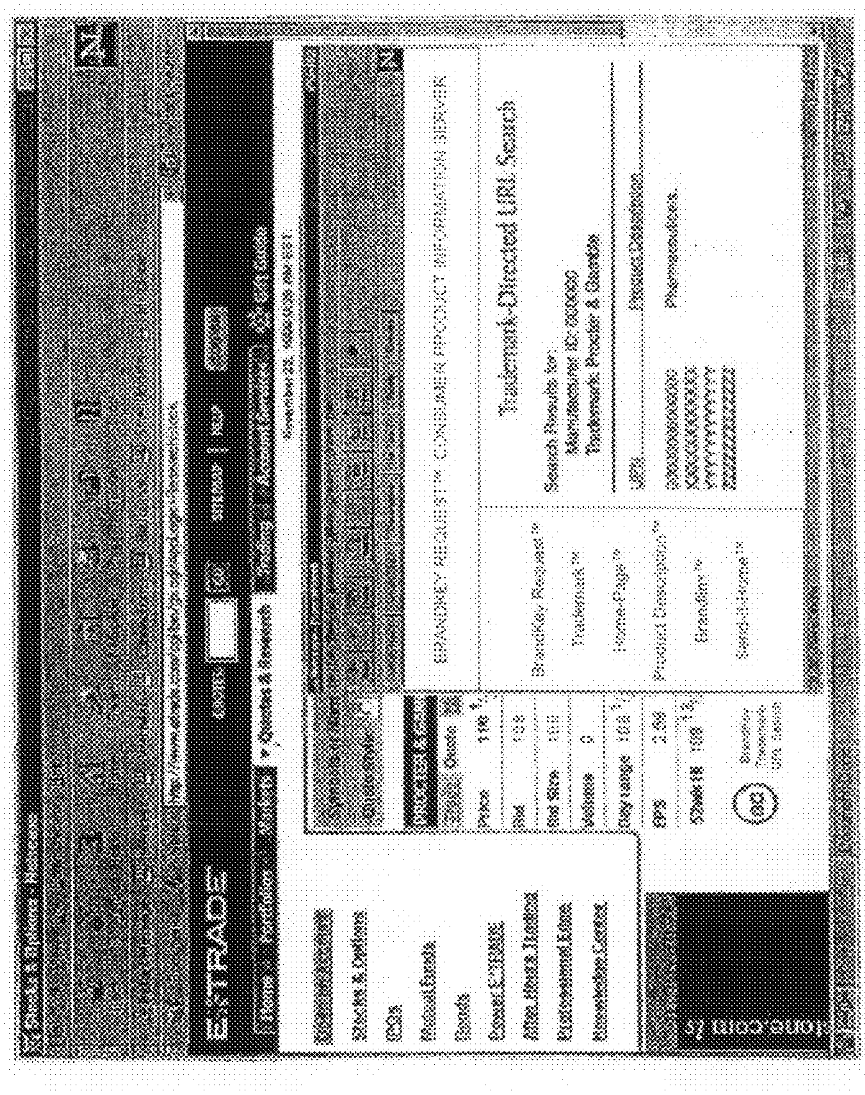
FIG. 4T2

MANUFACTURER / PRODUCT REGISTRATION MODE

MANUFACTURER WEBSITE SEARCH MODE

UPN - DIRECTED INFORMATION ACCESS MODE

TRADE - MARK DIRECTED SEARCH MODE

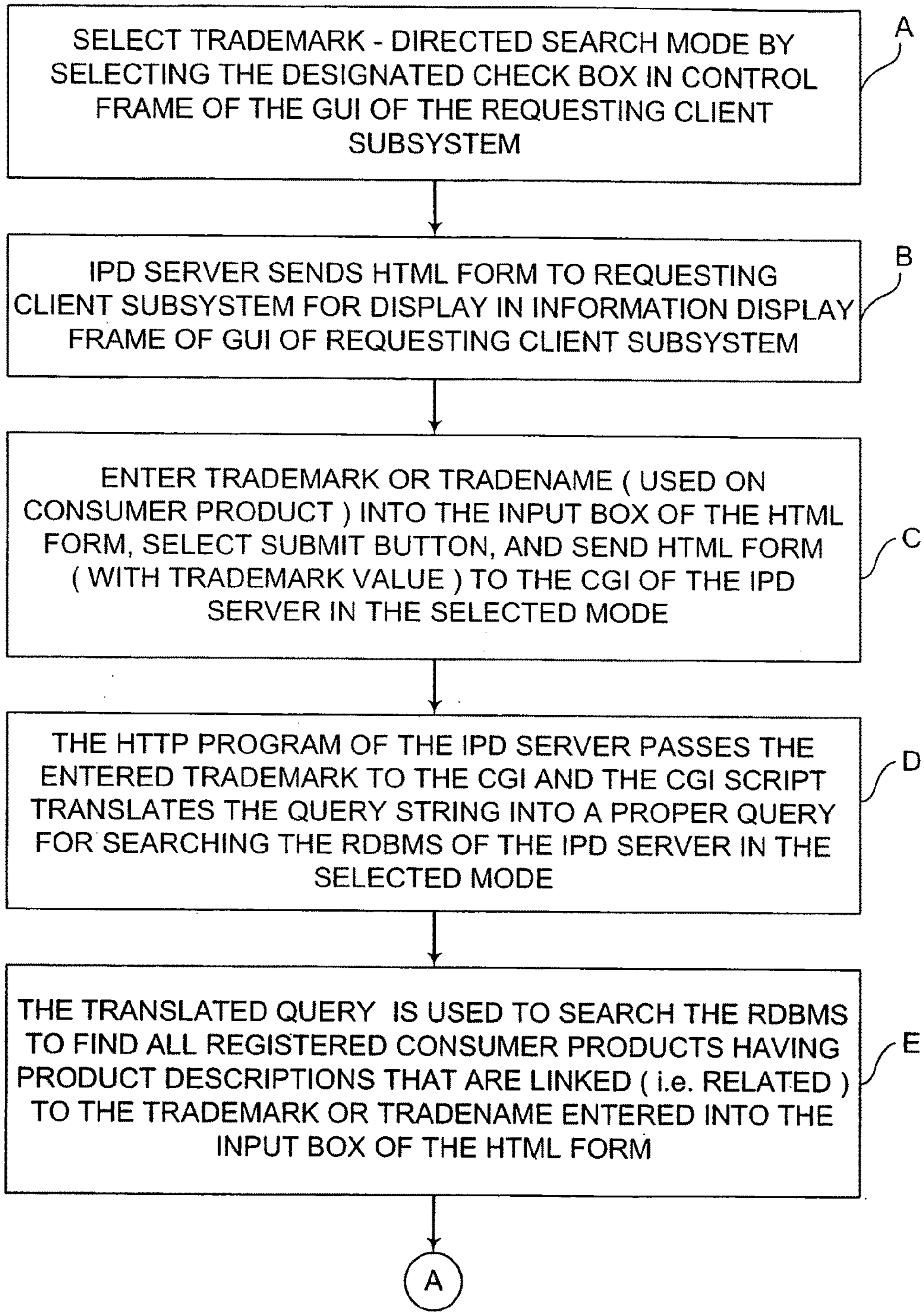
FIG. 6D1

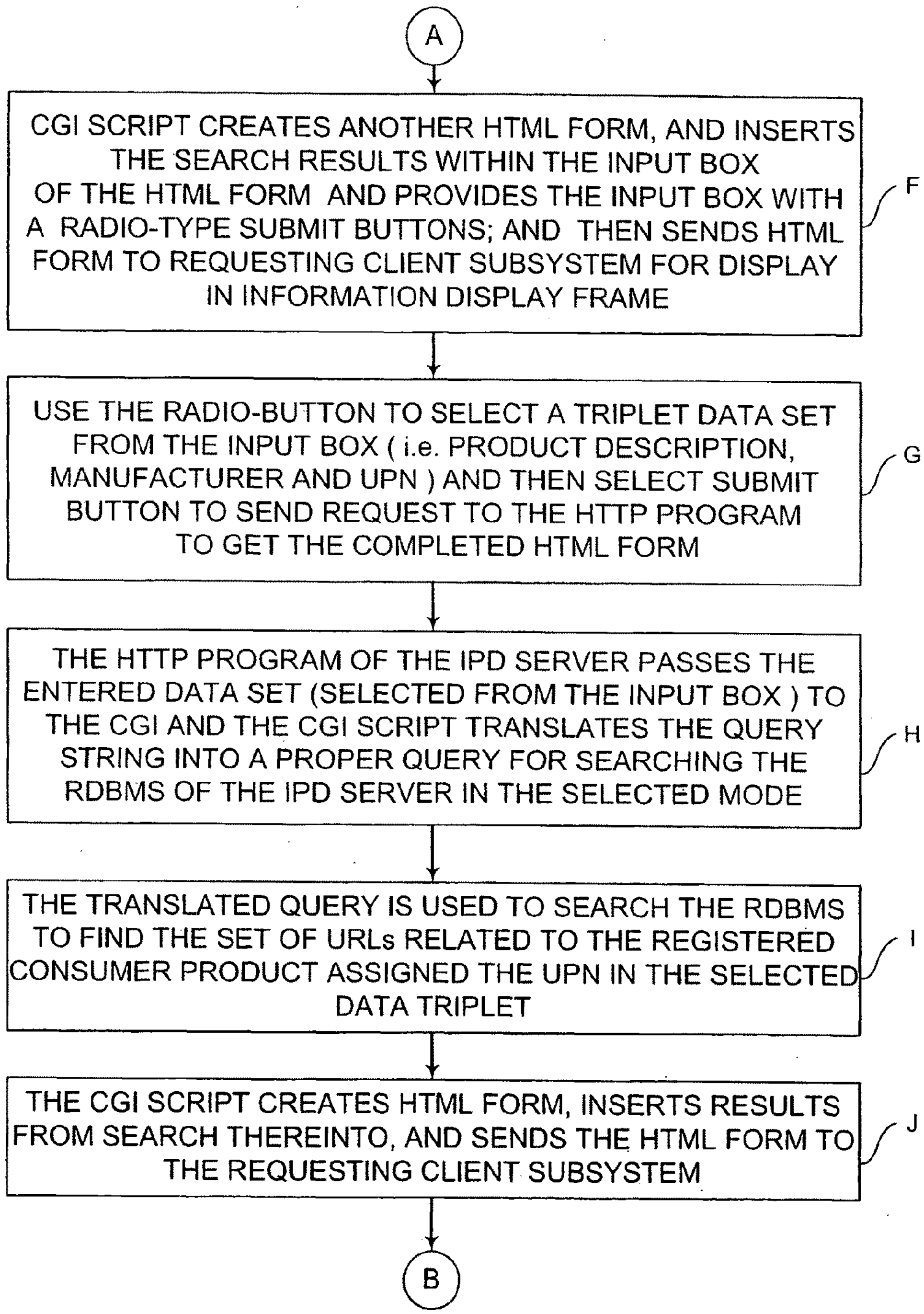
FIG. 6D2

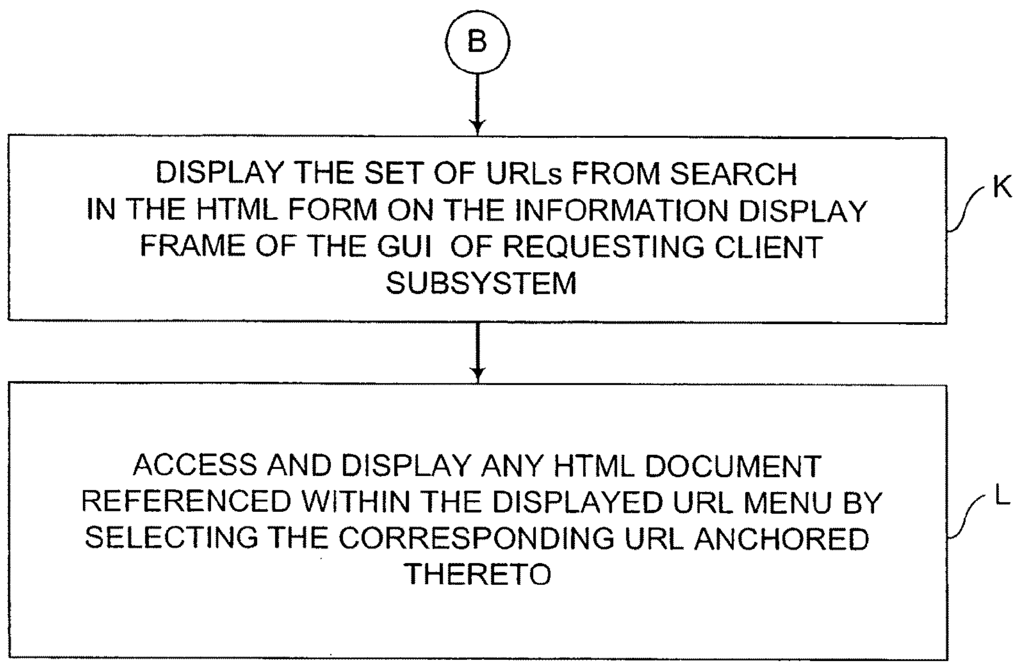
FIG. 6D3

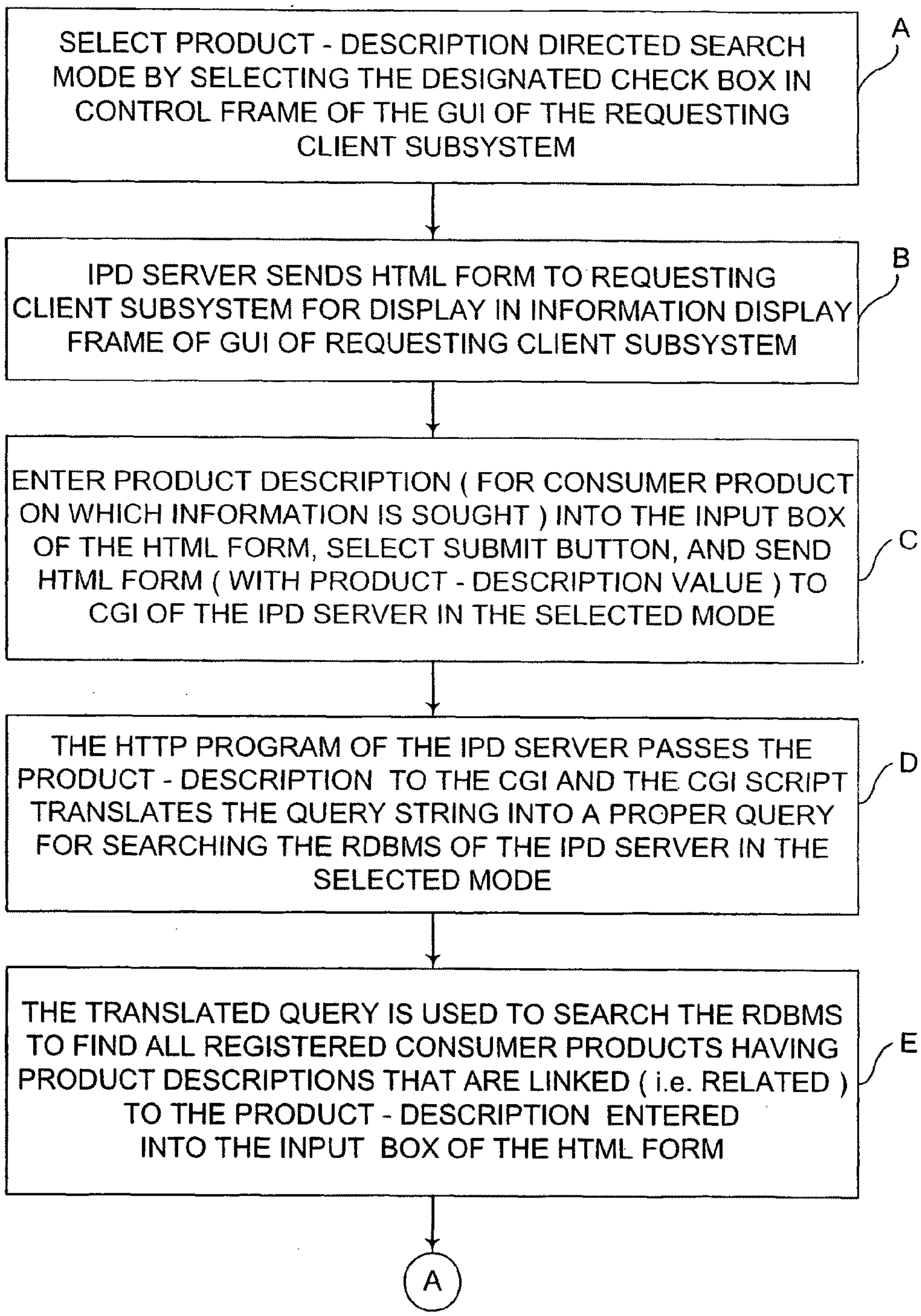
FIG. 6E1

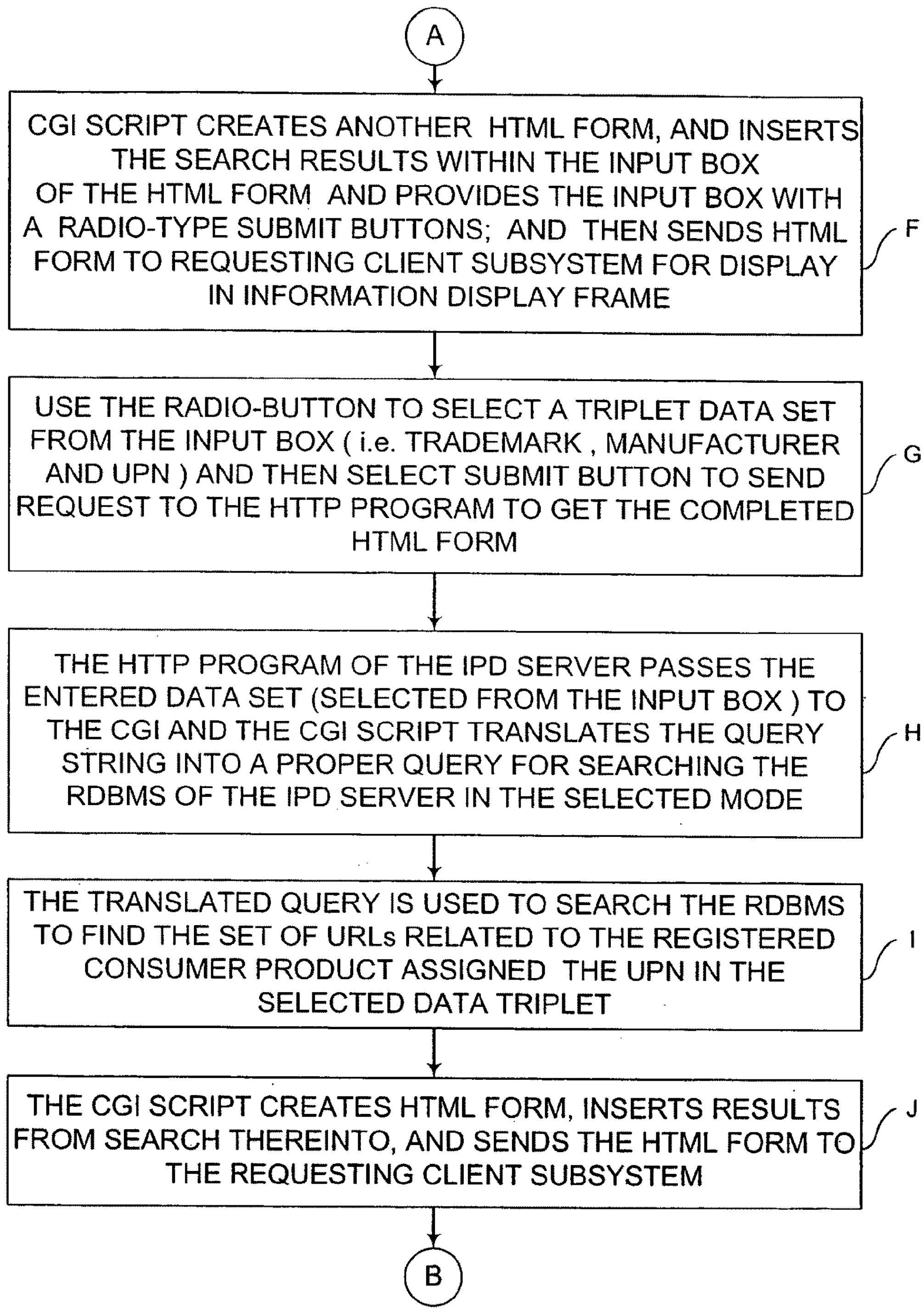
FIG. 6E2

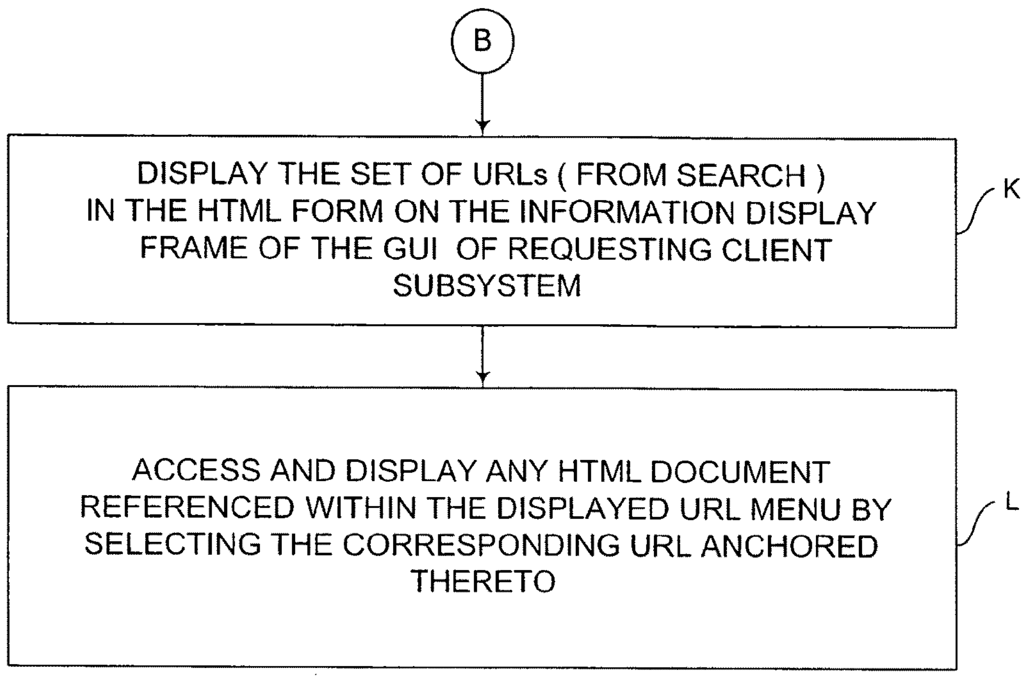
FIG. 6E3

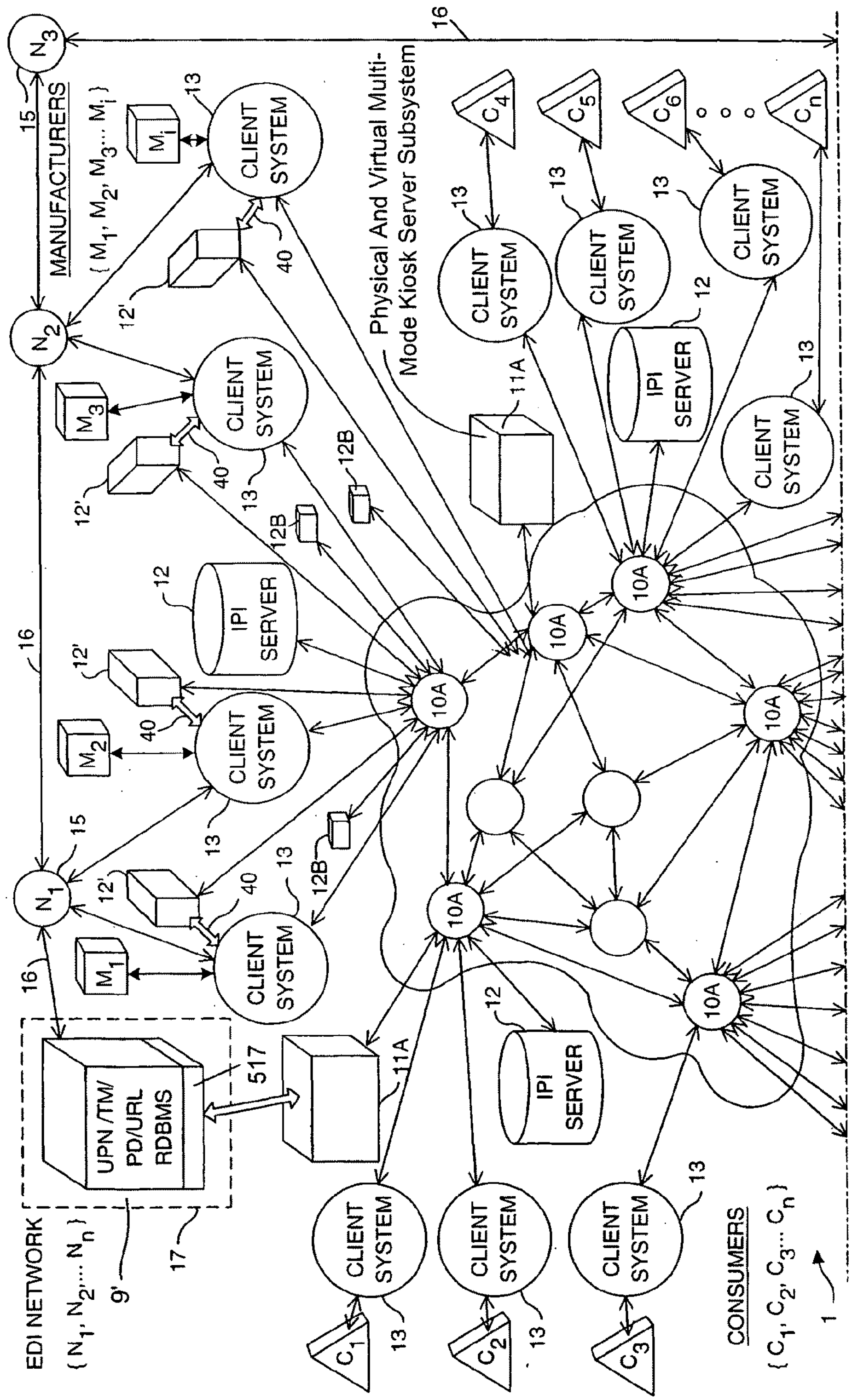
F I.G. 10A1

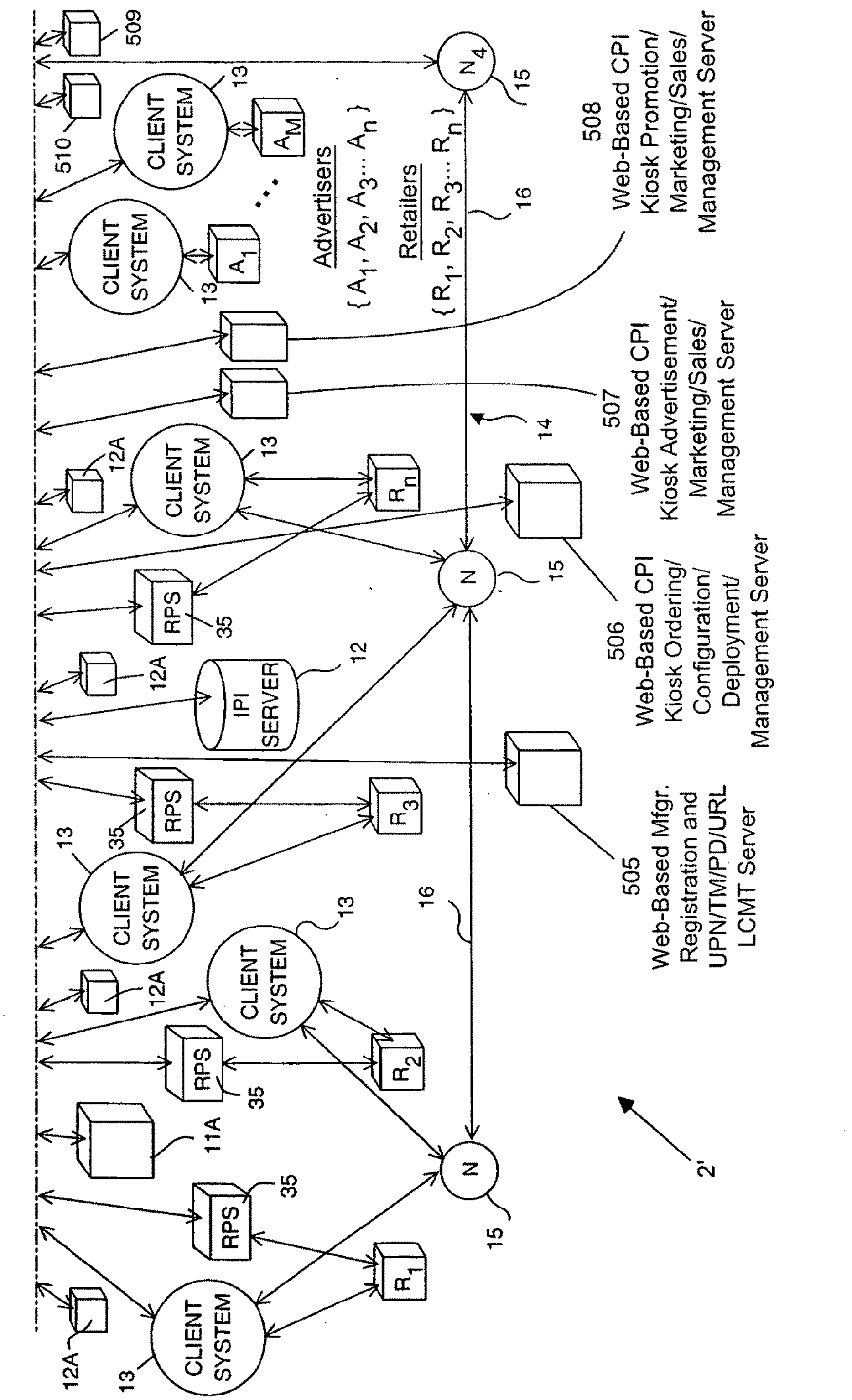
F I G. 10A2

| | | |
|---|---|---|
| Company Name | Alpha 20 | Enterable; Modifiable |
| Street Address | Alpha 20 | Enterable; Modifiable |
| City | Alpha 20 | Enterable; Modifiable |
| State | Alpha 20 | Enterable; Modifiable |
| Postal Code | Alpha 20 | Enterable; Modifiable |
| Country | Alpha 20 | Enterable; Modifiable |
| MIN Assigned by UCC/EAN | Alpha 20 | Enterable; Modifiable |
| URL of Mfgr. WWW Site | Alpha 20 | Enterable; Modifiable |
| Phone Number | Alpha 20 | Enterable; Modifiable |
| E-Mail Address | Alpha 20 | Enterable; Modifiable |
| Fax Number | Alpha 20 | Enterable; Modifiable |
| Standard Industry Codes (SIC) | Alpha 20 | Enterable; Modifiable |
| Marketing Executive Identity | Alpha 20 | Enterable; Modifiable |
| Marketing Executive Phone No. | Alpha 20 | Enterable; Modifiable |
| Marketing Executive E-Mail | Alpha 20 | Enterable; Modifiable |
| UPN/URL Management SW Installed | Alpha 20 | Enterable; Modifiable |
| UPC Management SW for EDI B2B | Alpha 20 | Enterable; Modifiable |
| UPC Service Bureau Employed | Alpha 20 | Enterable; Modifiable |
| UPC Service Bureau Contact | Alpha 20 | Enterable; Modifiable |
| UPC Service Bureau Phone Number | Alpha 20 | Enterable; Modifiable |
| UPC Service Bureau E-Mail | Alpha 20 | Enterable; Modifiable |
| EDI Vender Employed | Alpha 20 | Enterable; Modifiable |
| EDI Vender Contact Person | Alpha 20 | Enterable; Modifiable |
| EDI Vender Phone Number | Alpha 20 | Enterable; Modifiable |
| EDI Vender E-Mail Address | Alpha 20 | Enterable; Modifiable |
| EDI Service Bureau Employed | Alpha 20 | Enterable; Modifiable |
| EDI Service Bureau Contact | Alpha 20 | Enterable; Modifiable |
| EDI Service Bureau Phone Number | Alpha 20 | Enterable; Modifiable |
| EDI Service Bureau E-Mail | Alpha 20 | Enterable; Modifiable |
| Number of UPC/URL SW Licenses | Alpha 20 | Enterable; Modifiable |
| UPN/URL Mngt. SW License Total | Alpha 20 | Enterable; Modifiable |
| Total Number of UPC Numbers | Alpha 20 | Enterable; Modifiable |
| Date of UPC Number Accounting | Alpha 20 | Enterable; Modifiable |
| Annual UPC/URL Mngt. SW Fee Due | Alpha 20 | Enterable; Modifiable |
| Date of UPC/URL SW Fee Payment | Alpha 20 | Enterable; Modifiable |
| UPC/URL SW Fee Agent | Alpha 20 | Enterable; Modifiable |
| UPC/URL SW Fee Agent Phone | Alpha 20 | Enterable; Modifiable |
| UPC/URL SW Fee Agent E-Mail | Alpha 20 | Enterable; Modifiable |
| Date of Record Update | Alpha 20 | Enterable; Modifiable |

FIG. 15A

| Structure: UPN/URL Management SW License | | |
|---|---|---|
| MIN Assigned by UCC/EAN | Alpha 20 | Enterable; Modifiable |
| Version of UPN/URL Mgmt. SW | Alpha 20 | Enterable; Modifiable |
| Number of Licenses Granted | Alpha 20 | Enterable; Modifiable |
| UPN/URL Mgmt. SW License Keys | Alpha 20 | Enterable; Modifiable |
| UPN/URL Mgmt. SW Acct. Number | Alpha 20 | Enterable; Modifiable |
| UPN/URL Mgmt. SW Acct. Rep | Alpha 20 | Enterable; Modifiable |
| UPN/URL Mgmt. SW Download Date | Alpha 20 | Enterable; Modifiable |
| Date of Record Update | Alpha 20 | Enterable; Modifiable |

FIG. 15B

| | | |
|---|---|---|
| MIN Assigned by UCC/EAN | Alpha 20 | Enterable; Modifiable |
| Assigned UPN (UPC or UPC/EAN) | Alpha 20 | Enterable; Modifiable |
| UPN Symbology Type | Alpha 20 | Enterable; Modifiable |
| Primary Trademark/Brand | Alpha 20 | Enterable; Modifiable |
| Secondary Trademark/Brand | Alpha 20 | Enterable; Modifiable |
| Product Description | Alpha 20 | Enterable; Modifiable |
| Cash Register Short Description | Alpha 20 | Enterable; Modifiable |
| Cash Register Description | Alpha 20 | Enterable; Modifiable |
| Model Number | Alpha 20 | Enterable; Modifiable |
| Package Type | Alpha 20 | Enterable; Modifiable |
| Labeling Language | Alpha 20 | Enterable; Modifiable |
| URL Marking on Package | Alpha 20 | Enterable; Modifiable |
| Service Phone Number on Package | Alpha 20 | Enterable; Modifiable |
| Brand Manager Identity | Alpha 20 | Enterable; Modifiable |
| Brand Manager Phone Number | Alpha 20 | Enterable; Modifiable |
| Brand Manager E-Mail Address | Alpha 20 | Enterable; Modifiable |
| Product Manager Identity | Alpha 20 | Enterable; Modifiable |
| Product Manager Phone Number | Alpha 20 | Enterable; Modifiable |
| Product Manager E-Mail Address | Alpha 20 | Enterable; Modifiable |
| Trademark Notice on Package | Alpha 20 | Enterable; Modifiable |
| Copyright Notice on Package | Alpha 20 | Enterable; Modifiable |
| Patent Notice on Package | Alpha 20 | Enterable; Modifiable |
| URL for Primary TM Image | Alpha 20 | Enterable; Modifiable |
| URL for Secondary Image | Alpha 20 | Enterable; Modifiable |
| Effective Change Date | Alpha 20 | Enterable; Modifiable |
| System Last Updated | Alpha 20 | Enterable; Modifiable |
| Release Date | Alpha 20 | Enterable; Modifiable |
| Public Release Date | Alpha 20 | Enterable; Modifiable |
| End Availability Date | Alpha 20 | Enterable; Modifiable |

FIG. 15C

| | | |
|---|---|---|
| Assigned UPN | Alpha 20 | Enterable; Modifiable |
| URL for Product Description | Alpha 20 | Enterable; Modifiable |
| URL for Product Instructions | Alpha 20 | Enterable; Modifiable |
| URL for Product Oper. Manual | Alpha 20 | Enterable; Modifiable |
| URL for Orig. Warranty Service | Alpha 20 | Enterable; Modifiable |
| URL for Extended Warranty Service | Alpha 20 | Enterable; Modifiable |
| URL for 1st Ad on WWW | Alpha 20 | Enterable; Modifiable |
| URL for 2nd Ad on WWW | Alpha 20 | Enterable; Modifiable |
| URL for 3rd Ad on WWW | Alpha 20 | Enterable; Modifiable |
| URL for 4th Ad on WWW | Alpha 20 | Enterable; Modifiable |
| URL for 5th Ad on WWW | Alpha 20 | Enterable; Modifiable |
| URL for 1st Product Review | Alpha 20 | Enterable; Modifiable |
| URL for 2nd Product Review | Alpha 20 | Enterable; Modifiable |
| URL for 3rd Product Review | Alpha 20 | Enterable; Modifiable |
| URL for 4th Product Review | Alpha 20 | Enterable; Modifiable |
| URL for 5th Product Review | Alpha 20 | Enterable; Modifiable |
| URL for 1st Product Endorsement | Alpha 20 | Enterable; Modifiable |
| URL for 2nd Product Endorsement | Alpha 20 | Enterable; Modifiable |
| URL for 3rd Product Endorsement | Alpha 20 | Enterable; Modifiable |
| URL for 4th Product Endorsement | Alpha 20 | Enterable; Modifiable |
| URL for 5th Product Endorsement | Alpha 20 | Enterable; Modifiable |
| URL for Mfgr. Service Request | Alpha 20 | Enterable; Modifiable |
| URL for Product Returns to Mfgr. | Alpha 20 | Enterable; Modifiable |
| URL for Product News | Alpha 20 | Enterable; Modifiable |
| URL for Company News | Alpha 20 | Enterable; Modifiable |
| URL for FAQs about Product | Alpha 20 | Enterable; Modifiable |
| URL for Customer Service Line 1 | Alpha 20 | Enterable; Modifiable |
| URL for Customer Service Line 2 | Alpha 20 | Enterable; Modifiable |
| URL for Mfgr. Promotion # 1 | Alpha 20 | Enterable; Modifiable |
| URL for Mfgr. Promotion # 2 | Alpha 20 | Enterable; Modifiable |
| URL for Mfgr. Promotion # 3 | Alpha 20 | Enterable; Modifiable |
| URL for Retailer Promotion # 1 | Alpha 20 | Enterable; Modifiable |
| URL for Retailer Promotion # 2 | Alpha 20 | Enterable; Modifiable |
| URL for Retailer Promotion # 3 | Alpha 20 | Enterable; Modifiable |
| URL for Retailer Promotion # 4 | Alpha 20 | Enterable; Modifiable |
| URL for Retailer Promotion # 5 | Alpha 20 | Enterable; Modifiable |
| URL for Retailer Promotion # 6 | Alpha 20 | Enterable; Modifiable |
| URL for Retailer Promotion # 7 | Alpha 20 | Enterable; Modifiable |
| URL for Retailer Promotion # 8 | Alpha 20 | Enterable; Modifiable |
| URL for Retailer Promotion # 9 | Alpha 20 | Enterable; Modifiable |
| URL for Retailer Promotion # 10 | Alpha 20 | Enterable; Modifiable |

FIG. 15D1

| | | |
|---|---|---|
| URL for Direct Mfgr. Purchase | Alpha 20 | Enterable; Modifiable |
| URL for Dealer Location in USA | Alpha 20 | Enterable; Modifiable |
| URL for Product Wholesaler # 1 | Alpha 20 | Enterable; Modifiable |
| URL for Product Wholesaler # 2 | Alpha 20 | Enterable; Modifiable |
| URL for Product Wholesaler # 3 | Alpha 20 | Enterable; Modifiable |
| URL for Product Wholesaler # 4 | Alpha 20 | Enterable; Modifiable |
| URL for Product Retailer # 1 | Alpha 20 | Enterable; Modifiable |
| URL for Product Retailer # 2 | Alpha 20 | Enterable; Modifiable |
| URL for Product Retailer # 3 | Alpha 20 | Enterable; Modifiable |
| URL for Product Retailer # 4 | Alpha 20 | Enterable; Modifiable |
| URL for Product Retailer # 5 | Alpha 20 | Enterable; Modifiable |
| URL for Product Retailer # 6 | Alpha 20 | Enterable; Modifiable |
| URL for Product Retailer # 7 | Alpha 20 | Enterable; Modifiable |
| URL for Product Retailer # 8 | Alpha 20 | Enterable; Modifiable |
| URL for Product Retailer # 9 | Alpha 20 | Enterable; Modifiable |
| URL for Product Retailer # 10 | Alpha 20 | Enterable; Modifiable |
| URL for Product Retailer # 11 | Alpha 20 | Enterable; Modifiable |
| URL for Product Retailer # 12 | Alpha 20 | Enterable; Modifiable |
| URL for Product Retailer # 13 | Alpha 20 | Enterable; Modifiable |
| URL for Product Retailer # 14 | Alpha 20 | Enterable; Modifiable |
| URL for Product Retailer # 15 | Alpha 20 | Enterable; Modifiable |
| URL for Product Retailer # 16 | Alpha 20 | Enterable; Modifiable |
| URL for Product Retailer # 17 | Alpha 20 | Enterable; Modifiable |
| URL for Product Retailer # 18 | Alpha 20 | Enterable; Modifiable |
| URL for Product Retailer # 19 | Alpha 20 | Enterable; Modifiable |
| URL for Product Retailer # 20 | Alpha 20 | Enterable; Modifiable |
| URL for Complimentary Product 1 | Alpha 20 | Enterable; Modifiable |
| URL for Complimentary Product 2 | Alpha 20 | Enterable; Modifiable |
| URL for Complimentary Product 3 | Alpha 20 | Enterable; Modifiable |
| URL for Complimentary Product 4 | Alpha 20 | Enterable; Modifiable |
| URL for Complimentary Product 5 | Alpha 20 | Enterable; Modifiable |
| URL for Special Product Notices | Alpha 20 | Enterable; Modifiable |
| URL for Product Uses | Alpha 20 | Enterable; Modifiable |
| URL for Product Recreations | Alpha 20 | Enterable; Modifiable |
| URL for Mfgr. Affiliate # 1 | Alpha 20 | Enterable; Modifiable |
| URL for Mfgr. Affiliate # 2 | Alpha 20 | Enterable; Modifiable |
| URL for Mfgr. Affiliate # 3 | Alpha 20 | Enterable; Modifiable |
| URL for Mfgr. Affiliate # 4 | Alpha 20 | Enterable; Modifiable |
| URL for Mfgr. Affiliate # 5 | Alpha 20 | Enterable; Modifiable |
| URL for Product Updates | Alpha 20 | Enterable; Modifiable |
| URL for Software Downloads | Alpha 20 | Enterable; Modifiable |
| URL for Mfgr.-Sponsored Auctions | Alpha 20 | Enterable; Modifiable |
| URL for Rtlr.-Sponsored Auctions | Alpha 20 | Enterable; Modifiable |
| URL for Mfgr. Suggested Rtl. Price | Alpha 20 | Enterable; Modifiable |
| Date of Record Update | Alpha 20 | Enterable; Modifiable |

FIG. 15D2

| Structure: Retailer | | |
|---|---|---|
| Company Name | Alpha 20 | Enterable; Modifiable |
| Street Address | Alpha 20 | Enterable; Modifiable |
| City | Alpha 20 | Enterable; Modifiable |
| State | Alpha 20 | Enterable; Modifiable |
| Postal Code | Alpha 20 | Enterable; Modifiable |
| Country | Alpha 20 | Enterable; Modifiable |
| Retailer ID No. | Alpha 20 | Enterable; Modifiable |
| Contact Person | Alpha 20 | Enterable; Modifiable |
| Phone Number | Alpha 20 | Enterable; Modifiable |
| E-Mail Address | Alpha 20 | Enterable; Modifiable |
| Fax Number | Alpha 20 | Enterable; Modifiable |
| URL of Retailer WWW Site | Alpha 20 | Enterable; Modifiable |
| Purchasing Director Identity | Alpha 20 | Enterable; Modifiable |
| Purchasing Director Phone | Alpha 20 | Enterable; Modifiable |
| Purchasing Director E-Mail | Alpha 20 | Enterable; Modifiable |
| UPC Catalog Provider | Alpha 20 | Enterable; Modifiable |
| UPC Catalog Provider Contact | Alpha 20 | Enterable; Modifiable |
| UPC Catalog Provider Phone | Alpha 20 | Enterable; Modifiable |
| UPC Calalog Provider E-Mail | Alpha 20 | Enterable; Modifiable |
| EDI B2B Enabler | Alpha 20 | Enterable; Modifiable |
| EDI B2B Enabler Contact | Alpha 20 | Enterable; Modifiable |
| EDI B2B Enabler Phone | Alpha 20 | Enterable; Modifiable |
| EDI B2B Enabler E-Mail | Alpha 20 | Enterable; Modifiable |
| EDI Vender | Alpha 20 | Enterable; Modifiable |
| EDI Vender Contact Identity | Alpha 20 | Enterable; Modifiable |
| EDI Vender Phone | Alpha 20 | Enterable; Modifiable |
| EDI Vender E-mail | Alpha 20 | Enterable; Modifiable |
| Marketing Manager | Alpha 20 | Enterable; Modifiable |
| Total Number of Retail Stores | Alpha 20 | Enterable; Modifiable |
| Date of Record Update | Alpha 20 | Enterable; Modifiable |

FIG. 15E

| Structure: Retailer/Mfgr. P-Store Relation | | |
|---|---|---|
| Retail P-Store ID No. | Alpha 20 | Enterable; Modifiable |
| Manufacturer # 1 ID No. | Alpha 20 | Enterable; Modifiable |
| Manufacturer # 2 ID No. | Alpha 20 | Enterable; Modifiable |
| Manufacturer # 3 ID No. | Alpha 20 | Enterable; Modifiable |
| Manufacturer # 4 ID No. | Alpha 20 | Enterable; Modifiable |
| Manufacturer # 5 ID No. | Alpha 20 | Enterable; Modifiable |
| Manufacturer # 6 ID No. | Alpha 20 | Enterable; Modifiable |
| Manufacturer # 7 ID No. | Alpha 20 | Enterable; Modifiable |
| Manufacturer # 8 ID No. | Alpha 20 | Enterable; Modifiable |
| Manufacturer # 9 ID No. | Alpha 20 | Enterable; Modifiable |
| Manufacturer # 10 ID No. | Alpha 20 | Enterable; Modifiable |
| Total # Mfgr. Relationships | Alpha 20 | Enterable; Modifiable |
| Date of Record Update | Alpha 20 | Enterable; Modifiable |

FIG. 15F

| Structure: Mfgr./Retailer Relationships | | |
|---|---|---|
| MIN Assigned By UCC/EAN | Alpha 20 | Enterable; Modifiable |
| Retailer # 1 ID No. | Alpha 20 | Enterable; Modifiable |
| Retailer # 2 ID No. | Alpha 20 | Enterable; Modifiable |
| Retailer # 3 ID No. | Alpha 20 | Enterable; Modifiable |
| Retailer # 4 ID No. | Alpha 20 | Enterable; Modifiable |
| Retailer # 5 ID No. | Alpha 20 | Enterable; Modifiable |
| Retailer # 6 ID No. | Alpha 20 | Enterable; Modifiable |
| Retailer # 7 ID No. | Alpha 20 | Enterable; Modifiable |
| Retailer # 8 ID No. | Alpha 20 | Enterable; Modifiable |
| Retailer # 9 ID No. | Alpha 20 | Enterable; Modifiable |
| Retailer # 10 ID No. | Alpha 20 | Enterable; Modifiable |
| Total # Retailer Relationships | Alpha 20 | Enterable; Modifiable |
| Date of Record Update | Alpha 20 | Enterable; Modifiable |

FIG. 15G

| Structure: Consumer | | |
|---|---|---|
| Consumer Name | Alpha 20 | Enterable; Modifiable |
| Consumer ID No. | Alpha 20 | Enterable; Modifiable |
| E-Mail Address | Alpha 20 | Enterable; Modifiable |
| Street Address | Alpha 20 | Enterable; Modifiable |
| City | Alpha 20 | Enterable; Modifiable |
| State | Alpha 20 | Enterable; Modifiable |
| Postal Code | Alpha 20 | Enterable; Modifiable |
| Phone Number | Alpha 20 | Enterable; Modifiable |
| Shopped at Retail Store ID Nos. | Alpha 20 | Enterable; Modifiable |
| Shopped at Retailer Store ID No. | Alpha 20 | Enterable; Modifiable |
| Consumer Index 1 | Alpha 20 | Enterable; Modifiable |
| Consumer Index 2 | Alpha 20 | Enterable; Modifiable |
| Consumer Index 3 | Alpha 20 | Enterable; Modifiable |
| Consumer Index 4 | Alpha 20 | Enterable; Modifiable |
| Consumer Index 5 | Alpha 20 | Enterable; Modifiable |
| Consumer Index 6 | Alpha 20 | Enterable; Modifiable |
| Consumer Index 7 | Alpha 20 | Enterable; Modifiable |
| Consumer Index 8 | Alpha 20 | Enterable; Modifiable |
| Consumer Index 9 | Alpha 20 | Enterable; Modifiable |
| Credit Card Nos. | Alpha 20 | Enterable; Modifiable |

FIG. 15H

| Structure: Advertiser | | |
|---|---|---|
| Advertiser Name | Alpha 20 | Enterable; Modifiable |
| Street Address | Alpha 20 | Enterable; Modifiable |
| City | Alpha 20 | Enterable; Modifiable |
| State | Alpha 20 | Enterable; Modifiable |
| Postal Code | Alpha 20 | Enterable; Modifiable |
| Contact Person | Alpha 20 | Enterable; Modifiable |
| Phone Number | Alpha 20 | Enterable; Modifiable |
| E-Mail Address | Alpha 20 | Enterable; Modifiable |
| Fax Number | Alpha 20 | Enterable; Modifiable |
| Advertiser ID No. | Alpha 20 | Enterable; Modifiable |
| Ad Agent for Mfgr. # 1 | Alpha 20 | Enterable; Modifiable |
| Ad Agent for Mfgr. # 2 | Alpha 20 | Enterable; Modifiable |
| Ad Agent for Mfgr. # 3 | Alpha 20 | Enterable; Modifiable |
| Ad Agent for Mfgr. # 4 | Alpha 20 | Enterable; Modifiable |
| Ad Agent for Mfgr. # 5 | Alpha 20 | Enterable; Modifiable |
| Ad Agent for Mfgr. # 6 | Alpha 20 | Enterable; Modifiable |
| Ad Agent for Mfgr. # 7 | Alpha 20 | Enterable; Modifiable |
| Ad Agent for Mfgr. # 8 | Alpha 20 | Enterable; Modifiable |
| Ad Agent for Mfgr. # 9 | Alpha 20 | Enterable; Modifiable |
| Total # Mfgr. Agency Relations | Alpha 20 | Enterable; Modifiable |
| Ad Agent for Retailer # 1 | Alpha 20 | Enterable; Modifiable |
| Ad Agent for Retailer # 2 | Alpha 20 | Enterable; Modifiable |
| Ad Agent for Retailer # 3 | Alpha 20 | Enterable; Modifiable |
| Ad Agent for Retailer # 4 | Alpha 20 | Enterable; Modifiable |
| Ad Agent for Retailer # 5 | Alpha 20 | Enterable; Modifiable |
| Ad Agent for Retailer # 6 | Alpha 20 | Enterable; Modifiable |
| Ad Agent for Retailer # 7 | Alpha 20 | Enterable; Modifiable |
| Ad Agent for Retailer # 8 | Alpha 20 | Enterable; Modifiable |
| Ad Agent for Retailer # 9 | Alpha 20 | Enterable; Modifiable |
| Ad Agent for Retailer # 10 | Alpha 20 | Enterable; Modifiable |
| Total # Rtlr. Agency Relations | Alpha 20 | Enterable; Modifiable |
| URL for Advertiser WWW Site | Alpha 20 | Enterable; Modifiable |
| Advertiser Network Acct. No. | Alpha 20 | Enterable; Modifiable |
| Advertiser Network Password | Alpha 20 | Enterable; Modifiable |
| Date of Record Update | Alpha 20 | Enterable; Modifiable |

FIG. 15I

| Structure: Promoter | | |
|---|---|---|
| Promoter Name | Alpha 20 | Enterable; Modifiable |
| Street Address | Alpha 20 | Enterable; Modifiable |
| City | Alpha 20 | Enterable; Modifiable |
| State | Alpha 20 | Enterable; Modifiable |
| Postal Code | Alpha 20 | Enterable; Modifiable |
| Contact Person | Alpha 20 | Enterable; Modifiable |
| Phone Number | Alpha 20 | Enterable; Modifiable |
| E-Mail Address | Alpha 20 | Enterable; Modifiable |
| Fax Number | Alpha 20 | Enterable; Modifiable |
| Promoter ID No. | Alpha 20 | Enterable; Modifiable |
| Promo Agent for Mfgr. # 1 | Alpha 20 | Enterable; Modifiable |
| Promo Agent for Mfgr. # 2 | Alpha 20 | Enterable; Modifiable |
| Promo Agent for Mfgr. # 3 | Alpha 20 | Enterable; Modifiable |
| Promo Agent for Mfgr. # 4 | Alpha 20 | Enterable; Modifiable |
| Promo Agent for Mfgr. # 5 | Alpha 20 | Enterable; Modifiable |
| Promo Agent for Mfgr. # 6 | Alpha 20 | Enterable; Modifiable |
| Promo Agent for Mfgr. # 7 | Alpha 20 | Enterable; Modifiable |
| Promo Agent for Mfgr. # 8 | Alpha 20 | Enterable; Modifiable |
| Promo Agent for Mfgr. # 9 | Alpha 20 | Enterable; Modifiable |
| Total # Mfgr. Agency Relations | Alpha 20 | Enterable; Modifiable |
| Promo Agent for Rtlr. # 1 | Alpha 20 | Enterable; Modifiable |
| Promo Agent for Rtlr. # 2 | Alpha 20 | Enterable; Modifiable |
| Promo Agent for Rtlr. # 3 | Alpha 20 | Enterable; Modifiable |
| Promo Agent for Rtlr. # 4 | Alpha 20 | Enterable; Modifiable |
| Promo Agent for Rtlr. # 5 | Alpha 20 | Enterable; Modifiable |
| Promo Agent for Rtlr. # 6 | Alpha 20 | Enterable; Modifiable |
| Promo Agent for Rtlr. # 7 | Alpha 20 | Enterable; Modifiable |
| Promo Agent for Rtlr. # 8 | Alpha 20 | Enterable; Modifiable |
| Promo Agent for Rtlr. # 9 | Alpha 20 | Enterable; Modifiable |
| Promo Agent for Rtlr. # 10 | Alpha 20 | Enterable; Modifiable |
| Total # Rtlr. Agency Relations | Alpha 20 | Enterable; Modifiable |
| URL for Promoter WWW Site | Alpha 20 | Enterable; Modifiable |
| Promoter Network Acct. No. | Alpha 20 | Enterable; Modifiable |
| Promoter Network Password | Alpha 20 | Enterable; Modifiable |
| Date of Record Update | Alpha 20 | Enterable; Modifiable |

FIG. 15J

| Structure: Physical Kiosk | | |
|---|---|---|
| Physical Kiosk ID No. | Alpha 20 | Enterable; Modifiable |
| Retail P-Store ID No. | Alpha 20 | Enterable; Modifiable |
| Physical Kiosk HTTP Server URL | Alpha 20 | Enterable; Modifiable |
| Assigned Static IP Address | Alpha 20 | Enterable; Modifiable |
| P-Kiosk Aisle/Shelf Location | Alpha 20 | Enterable; Modifiable |
| Physical Kiosk Access Password | Alpha 20 | Enterable; Modifiable |
| CPI Request Service Status | Alpha 20 | Enterable; Modifiable |
| Ad Display Service Status | Alpha 20 | Enterable; Modifiable |
| Promotion Service Status | Alpha 20 | Enterable; Modifiable |
| Kiosk Activity Index No. 1 | Alpha 20 | Enterable; Modifiable |
| Kiosk Activity Index No. 2 | Alpha 20 | Enterable; Modifiable |
| Kiosk Activity Index No. 3 | Alpha 20 | Enterable; Modifiable |
| Kiosk Activity Index No. 4 | Alpha 20 | Enterable; Modifiable |
| Kiosk Activity Index No. 5 | Alpha 20 | Enterable; Modifiable |
| Status of Retailer's MIN Filter | Alpha 20 | Enterable; Modifiable |
| Cost of Kiosk Ad Spot on Mon. | Alpha 20 | Enterable; Modifiable |
| Cost of Kiosk Ad Spot on Tues. | Alpha 20 | Enterable; Modifiable |
| Cost of Kiosk Ad Spot on Wed. | Alpha 20 | Enterable; Modifiable |
| Cost of Kiosk Ad Spot on Thurs. | Alpha 20 | Enterable; Modifiable |
| Cost of Kiosk Ad Spot on Fri. | Alpha 20 | Enterable; Modifiable |
| Cost of Kiosk Ad Spot on Sat. | Alpha 20 | Enterable; Modifiable |
| Cost of Kiosk Ad Spot on Sun. | Alpha 20 | Enterable; Modifiable |
| Cost of Kiosk Ad Promo on Mon. | Alpha 20 | Enterable; Modifiable |
| Cost of Kiosk Ad Promo on Tues. | Alpha 20 | Enterable; Modifiable |
| Cost of Kiosk Ad Promo on Wed. | Alpha 20 | Enterable; Modifiable |
| Cost of Kiosk Ad Promo on Thur. | Alpha 20 | Enterable; Modifiable |
| Cost of Kiosk Ad Promo on Fri. | Alpha 20 | Enterable; Modifiable |
| Cost of Kiosk Ad Promo on Sat. | Alpha 20 | Enterable; Modifiable |
| Cost of Kiosk Ad Promo on Sun. | Alpha 20 | Enterable; Modifiable |
| CPIR Request Service GUI Type | Alpha 20 | Enterable; Modifiable |
| Ad Display Service GUI Type | Alpha 20 | Enterable; Modifiable |
| Promo Service GUI Type | Alpha 20 | Enterable; Modifiable |
| Date of Record Update | | |

FIG. 15K

| Structure: Retailer Physical Store | | |
|---|---|---|
| Retailer ID No. | Alpha 20 | Enterable; Modifiable |
| Address | Alpha 20 | Enterable; Modifiable |
| City | Alpha 20 | Enterable; Modifiable |
| State | Alpha 20 | Enterable; Modifiable |
| Postal Code | Alpha 20 | Enterable; Modifiable |
| Country | Alpha 20 | Enterable; Modifiable |
| Retail P-Store ID No. | Alpha 20 | Enterable; Modifiable |
| Store Manager Identity | Alpha 20 | Enterable; Modifiable |
| Store Manager Phone | Alpha 20 | Enterable; Modifiable |
| Store Manager E-Mail | Alpha 20 | Enterable; Modifiable |
| Regional Manager Identity | Alpha 20 | Enterable; Modifiable |
| Regional Manager Phone | Alpha 20 | Enterable; Modifiable |
| Regional Manager E-Mail | Alpha 20 | Enterable; Modifiable |
| Number of Store Aisles | Alpha 20 | Enterable; Modifiable |
| Number of Floors | Alpha 20 | Enterable; Modifiable |
| Floor Plan Diagrams | Alpha 20 | Enterable; Modifiable |
| Product Catagory/Shelf Maps | Alpha 20 | Enterable; Modifiable |
| Available Internet Connectivity | Alpha 20 | Enterable; Modifiable |
| Retailer/Manufacturer Relations | Alpha 20 | Enterable; Modifiable |
| Date of Record Update | Alpha 20 | Enterable; Modifiable |

FIG. 15L

| Structure: Physical Kiosk HTTP Server | | |
|---|---|---|
| Physical Kiosk HTTP Server URL | Alpha 20 | Enterable; Modifiable |
| Physical Kiosk HTTP Server Log | Alpha 20 | Enterable; Modifiable |
| Physical Kiosk ID No. | Alpha 20 | Enterable; Modifiable |
| Date of Record Update | Alpha 20 | Enterable; Modifiable |

FIG. 15M

| Structure: Retailer's Physical Kiosk Cat. | | |
|---|---|---|
| Retail P-Store ID No. | Alpha 20 | Enterable; Modifiable |
| Physical Kiosk ID No. 1 | Alpha 20 | Enterable; Modifiable |
| Physical Kiosk ID No. 2 | Alpha 20 | Enterable; Modifiable |
| Physical Kiosk ID No. 3 | Alpha 20 | Enterable; Modifiable |
| Physical Kiosk ID No. 4 | Alpha 20 | Enterable; Modifiable |
| Physical Kiosk ID No. 5 | Alpha 20 | Enterable; Modifiable |
| Physical Kiosk ID No. 6 | Alpha 20 | Enterable; Modifiable |
| Physical Kiosk ID No. 7 | Alpha 20 | Enterable; Modifiable |
| Physical Kiosk ID No. 8 | Alpha 20 | Enterable; Modifiable |
| Physical Kiosk ID No. 9 | Alpha 20 | Enterable; Modifiable |
| Total # of Physical Kiosks | Alpha 20 | Enterable; Modifiable |
| Date of Record Update | Alpha 20 | Enterable; Modifiable |

FIG. 15N

| Structure: Physical Kiosk E-Mail | | |
|---|---|---|
| Physical Kiosk ID No. | Alpha 20 | Enterable; Modifiable |
| Physical Kiosk E-Mail Log | Alpha 20 | Enterable; Modifiable |
| Date of Record Update | Alpha 20 | Enterable; Modifiable |

FIG. 15O

| Structure: Physical Kiosk User Activity | | |
|---|---|---|
| Date(s) of Activity Measurement | Alpha 20 | Enterable; Modifiable |
| Physical Kiosk ID No. | Alpha 20 | Enterable; Modifiable |
| Number of HTML Pages Accessed | Alpha 20 | Enterable; Modifiable |
| Number of UPC Requests at Kiosk | Alpha 20 | Enterable; Modifiable |
| Different HTML Pages Served-Up | Alpha 20 | Enterable; Modifiable |
| Outgoing E-mail Transmissions | Alpha 20 | Enterable; Modifiable |
| System Mode Transitions | Alpha 20 | Enterable; Modifiable |
| E-Commerce Transactions Made | Alpha 20 | Enterable; Modifiable |
| Number of UPC Requests at Kiosk | Alpha 20 | Enterable; Modifiable |
| Date Of Record Update | Alpha 20 | Enterable; Modifiable |

FIG. 15P

| Structure: Ad Spot Order-Virtual Kiosk | | |
|---|---|---|
| UPN of Advertised Product | Alpha 20 | Enterable; Modifiable |
| Virtual Kiosk ID No. | Alpha 20 | Enterable; Modifiable |
| Scheduled Date of Ad Spot | Alpha 20 | Enterable; Modifiable |
| Advertiser Placing Order | Alpha 20 | Enterable; Modifiable |
| Date of Ad Spot Order | Alpha 20 | Enterable; Modifiable |
| Advertiser ID No. | Alpha 20 | Enterable; Modifiable |
| Cost of Ad Spot | Alpha 20 | Enterable; Modifiable |
| URL of Advertisement Spot | Alpha 20 | Enterable; Modifiable |
| Time Duration of Ad Spot | Alpha 20 | Enterable; Modifiable |
| Copyright Owner of Advertisement | Alpha 20 | Enterable; Modifiable |
| Ordered Number of Displays/Date | Alpha 20 | Enterable; Modifiable |
| File Format of Advertisement | Alpha 20 | Enterable; Modifiable |
| Virtual Kiosk Ad Spot ID No. | Alpha 20 | Enterable; Modifiable |
| Actual Number of Displays/Date | Alpha 20 | Enterable; Modifiable |
| Actual Number of Interruptions | Alpha 20 | Enterable; Modifiable |
| Ad Spot Cost | Alpha 20 | Enterable; Modifiable |
| Date of Ad Payment | Alpha 20 | Enterable; Modifiable |
| Date of Record Update | Alpha 20 | Enterable; Modifiable |

FIG. 15Q

| Structure: Ad Spot Order-Physical Kiosk | | |
|---|---|---|
| UPN of Advertised Product | Alpha 20 | Enterable; Modifiable |
| Physical Kiosk ID No. | Alpha 20 | Enterable; Modifiable |
| Scheduled Date of Ad Spot | Alpha 20 | Enterable; Modifiable |
| Advertiser Placing Order | Alpha 20 | Enterable; Modifiable |
| Date of Ad Campaign | Alpha 20 | Enterable; Modifiable |
| Advertiser ID No. | Alpha 20 | Enterable; Modifiable |
| Cost Ad Spot | Alpha 20 | Enterable; Modifiable |
| URL Of Advertisement Spot | Alpha 20 | Enterable; Modifiable |
| Time Duration of Ad Spot | Alpha 20 | Enterable; Modifiable |
| Copyright Owner Of Advertisement | Alpha 20 | Enterable; Modifiable |
| Ordered Number of Displays/Date | Alpha 20 | Enterable; Modifiable |
| File Format of Advertisement | Alpha 20 | Enterable; Modifiable |
| Physical Kiosk Ad Spot ID No. | Alpha 20 | Enterable; Modifiable |
| Actual Number of Displays/Date | Alpha 20 | Enterable; Modifiable |
| Actual Number of Interruptions | Alpha 20 | Enterable; Modifiable |
| Ad Spot Payment | Alpha 20 | Enterable; Modifiable |
| Date of Ad Spot Payment | Alpha 20 | Enterable; Modifiable |
| Date of Record Update | Alpha 20 | Enterable; Modifiable |

FIG. 15R

| Structure: Promo Spot Order-Physical Kiosk | | |
|---|---|---|
| UPN of Promoted Product | Alpha 20 | Enterable; Modifiable |
| Physical Kiosk ID No. | Alpha 20 | Enterable; Modifiable |
| Scheduled Date of Promo Spot | Alpha 20 | Enterable; Modifiable |
| Promoter Placing Order | Alpha 20 | Enterable; Modifiable |
| Date of Promo Campaign | Alpha 20 | Enterable; Modifiable |
| Promoter ID No. | Alpha 20 | Enterable; Modifiable |
| URL Of Promotional Ad in DF1 | Alpha 20 | Enterable; Modifiable |
| Promotional Message In DF2 | Alpha 20 | Enterable; Modifiable |
| Promotional Message In DF3 | Alpha 20 | Enterable; Modifiable |
| Promotional Message In DF4 | Alpha 20 | Enterable; Modifiable |
| Promotional Message In DF5 | Alpha 20 | Enterable; Modifiable |
| Time Duration of Promotion Spot | Alpha 20 | Enterable; Modifiable |
| Copyright Owner Of Promo Ad | Alpha 20 | Enterable; Modifiable |
| Ordered Number of Displays/Date | Alpha 20 | Enterable; Modifiable |
| File Format of Promotional Ad | Alpha 20 | Enterable; Modifiable |
| Physical Kiosk Promo Spot ID No. | Alpha 20 | Enterable; Modifiable |
| Actual Number of Displays/Date | Alpha 20 | Enterable; Modifiable |
| Actual Number of Interruptions | Alpha 20 | Enterable; Modifiable |
| Cost of Promo Spot | Alpha 20 | Enterable; Modifiable |
| Promo Spot Payment | Alpha 20 | Enterable; Modifiable |
| Date of Promo Spot Payment | Alpha 20 | Enterable; Modifiable |
| Date of Record Update | Alpha 20 | Enterable; Modifiable |

FIG. 15S

| Structure: Physical Kiosk Ad Campaign | | |
|---|---|---|
| Physical Kiosk ID No. | Alpha 20 | Enterable; Modifiable |
| Date of Ad Campaign | Alpha 20 | Enterable; Modifiable |
| Ad Spot ID No. 1 | Alpha 20 | Enterable; Modifiable |
| Ad Spot ID No. 2 | Alpha 20 | Enterable; Modifiable |
| Ad Spot ID No. 3 | Alpha 20 | Enterable; Modifiable |
| Ad Spot ID No. 4 | Alpha 20 | Enterable; Modifiable |
| Ad Spot ID No. 5 | Alpha 20 | Enterable; Modifiable |
| Ad Spot ID No. 6 | Alpha 20 | Enterable; Modifiable |
| Ad Spot ID No. 7 | Alpha 20 | Enterable; Modifiable |
| Ad Spot ID No. 8 | Alpha 20 | Enterable; Modifiable |
| Ad Spot ID No. 9 | Alpha 20 | Enterable; Modifiable |
| Ad Spot ID No. 10 | Alpha 20 | Enterable; Modifiable |
| Total Ad Spots Ordered On Kiosk | Alpha 20 | Enterable; Modifiable |
| Date of Record Update | Alpha 20 | Enterable; Modifiable |

FIG. 15T

| Structure: Physical Kiosk Promo Campaign | | |
|---|---|---|
| Physical Kiosk ID No. | Alpha 20 | Enterable; Modifiable |
| Date of Promo Campaign | Alpha 20 | Enterable; Modifiable |
| Physical Kiosk Promo Spot ID No. 1 | Alpha 20 | Enterable; Modifiable |
| Physical Kiosk Promo Spot ID No. 2 | Alpha 20 | Enterable; Modifiable |
| Physical Kiosk Promo Spot ID No. 3 | Alpha 20 | Enterable; Modifiable |
| Physical Kiosk Promo Spot ID No. 4 | Alpha 20 | Enterable; Modifiable |
| Physical Kiosk Promo Spot ID No. 5 | Alpha 20 | Enterable; Modifiable |
| Physical Kiosk Promo Spot ID No. 6 | Alpha 20 | Enterable; Modifiable |
| Physical Kiosk Promo Spot ID No. 7 | Alpha 20 | Enterable; Modifiable |
| Physical Kiosk Promo Spot ID No. 8 | Alpha 20 | Enterable; Modifiable |
| Physical Kiosk Promo Spot ID No. 9 | Alpha 20 | Enterable; Modifiable |
| Physical Kiosk Promo Spot ID No. 10 | Alpha 20 | Enterable; Modifiable |
| Total Ad Spots Ordered | Alpha 20 | Enterable; Modifiable |
| Date of Record Update | Alpha 20 | Enterable; Modifiable |

FIG. 15U

| Structure: Virtual Kiosk | | |
|---|---|---|
| Virtual Kiosk ID No. | Alpha 20 | Enterable; Modifiable |
| Retail P-Store or E-Store ID No. | Alpha 20 | Enterable; Modifiable |
| Type of Virtual Kiosk | Alpha 20 | Enterable; Modifiable |
| CPIR-Enabling Applet ID No. | Alpha 20 | Enterable; Modifiable |
| Licensed Internet Domain | Alpha 20 | Enterable; Modifiable |
| Virtual Kiosk Licensee (i.e. Retailer, Mfgr., et al) | Alpha 20 | Enterable; Modifiable |
| Virtual Kiosk Enabling Password | Alpha 20 | Enterable; Modifiable |
| E-Store Web-Page Location | Alpha 20 | Enterable; Modifiable |
| CPI Request Service Status | Alpha 20 | Enterable; Modifiable |
| Ad Display Service Status | Alpha 20 | Enterable; Modifiable |
| Promotion Service Status | Alpha 20 | Enterable; Modifiable |
| Kiosk Activity Index No. 1 | Alpha 20 | Enterable; Modifiable |
| Kiosk Activity Index No. 2 | Alpha 20 | Enterable; Modifiable |
| Kiosk Activity Index No. 3 | Alpha 20 | Enterable; Modifiable |
| Kiosk Activity Index No. 4 | Alpha 20 | Enterable; Modifiable |
| Status of Retailer MIN Filter | Alpha 20 | Enterable; Modifiable |
| Cost of Kiosk Ad Spot on Mon. | Alpha 20 | Enterable; Modifiable |
| Cost of Kiosk Ad Spot on Tues. | Alpha 20 | Enterable; Modifiable |
| Cost of Kiosk Ad Spot on Wed. | Alpha 20 | Enterable; Modifiable |
| Cost of Kiosk Ad Spot on Thurs. | Alpha 20 | Enterable; Modifiable |
| Cost of Kiosk Ad Spot on Fri. | Alpha 20 | Enterable; Modifiable |
| Cost of Kiosk Ad Spot on Sat. | Alpha 20 | Enterable; Modifiable |
| Cost of Kiosk Ad Spot on Sun. | Alpha 20 | Enterable; Modifiable |
| Cost of Kiosk Promo Spot on Mon. | Alpha 20 | Enterable; Modifiable |
| Cost of Kiosk Promo Spot on Tue. | Alpha 20 | Enterable; Modifiable |
| Cost of Kiosk Promo Spot on Wed. | Alpha 20 | Enterable; Modifiable |
| Cost of Kiosk Promo Spot on Thu. | Alpha 20 | Enterable; Modifiable |
| Cost of Kiosk Promo Spot on Fri. | Alpha 20 | Enterable; Modifiable |
| Cost of Kiosk Promo Spot on Sat. | Alpha 20 | Enterable; Modifiable |
| Cost of Kiosk Promo Spot on Sun. | Alpha 20 | Enterable; Modifiable |
| URL Accessing Virtual Kiosk | Alpha 20 | Enterable; Modifiable |
| Date of Record Update | Alpha 20 | Enterable; Modifiable |

FIG. 15V

| Structure: CPIR-Enabling Applet | | |
|---|---|---|
| CPIR-Enabling Applet ID No. | Alpha 20 | Enterable; Modifiable |
| Type of CPIR-Enabling Applet | Alpha 20 | Enterable; Modifiable |
| URL of CPIR-Enabling Applet BC | Alpha 20 | Enterable; Modifiable |
| Virtual Kiosk ID No. | Alpha 20 | Enterable; Modifiable |
| Virtual Kiosk Server Log | Alpha 20 | Enterable; Modifiable |
| Date of Record Update | Alpha 20 | Enterable; Modifiable |

FIG. 15W

| Structure: Retailer E-Store | | |
|---|---|---|
| Retailer ID No. | Alpha 20 | Enterable; Modifiable |
| Address | Alpha 20 | Enterable; Modifiable |
| City | Alpha 20 | Enterable; Modifiable |
| State | Alpha 20 | Enterable; Modifiable |
| Postal Code | Alpha 20 | Enterable; Modifiable |
| Country | Alpha 20 | Enterable; Modifiable |
| Retail E-Store ID No. | Alpha 20 | Enterable; Modifiable |
| E-Store Manager Identity | Alpha 20 | Enterable; Modifiable |
| E-Store Manager Phone | Alpha 20 | Enterable; Modifiable |
| E-Store Manager E-Mail | Alpha 20 | Enterable; Modifiable |
| E-Store WWW Site Map | Alpha 20 | Enterable; Modifiable |
| Retailer/Manfacturer Relations | Alpha 20 | Enterable; Modifiable |
| Date of Record Update | Alpha 20 | Enterable; Modifiable |

FIG. 15X

| Structure: Retailer's Virtual Kiosk Cat. | | |
|---|---|---|
| Retail P-Store ID No. | Alpha 20 | Enterable; Modifiable |
| Virtual Kiosk ID No. 1 | Alpha 20 | Enterable; Modifiable |
| Virtual Kiosk ID No. 2 | Alpha 20 | Enterable; Modifiable |
| Virtual Kiosk ID No. 3 | Alpha 20 | Enterable; Modifiable |
| Virtual Kiosk ID No. 4 | Alpha 20 | Enterable; Modifiable |
| Virtual Kiosk ID No. 5 | Alpha 20 | Enterable; Modifiable |
| Virtual Kiosk ID No. 6 | Alpha 20 | Enterable; Modifiable |
| Virtual Kiosk ID No. 7 | Alpha 20 | Enterable; Modifiable |
| Virtual Kiosk ID No. 8 | Alpha 20 | Enterable; Modifiable |
| Virtual Kiosk ID No. 9 | Alpha 20 | Enterable; Modifiable |
| Total # of Virtual Kiosks | Alpha 20 | Enterable; Modifiable |
| Retailer ID No. | Alpha 20 | Enterable; Modifiable |
| Date of Record Update | Alpha 20 | Enterable; Modifiable |

FIG. 15Y

| Structure: Virtual Kiosk E-Mail | | |
|---|---|---|
| Virtual Kiosk ID No. | Alpha 20 | Enterable; Modifiable |
| Virtual Kiosk E-Mail Log | Alpha 20 | Enterable; Modifiable |
| Date of Record Update | Alpha 20 | Enterable; Modifiable |

FIG. 15Z

| Structure: Virtual Kiosk User Activity | | |
|---|---|---|
| Date(s) of Activity Measurement | Alpha 20 | Enterable; Modifiable |
| Virtual Kiosk ID No. | Alpha 20 | Enterable; Modifiable |
| Number of HTML Pages Accessed | Alpha 20 | Enterable; Modifiable |
| Number of UPC Requests at Kiosk | Alpha 20 | Enterable; Modifiable |
| Number of Trademark Requests | Alpha 20 | Enterable; Modifiable |
| Different HTML Pages Served-Up | Alpha 20 | Enterable; Modifiable |
| Outgoing E-mail Transmissions | Alpha 20 | Enterable; Modifiable |
| System Mode Transitions | Alpha 20 | Enterable; Modifiable |
| E-Commerce Transactions Made | Alpha 20 | Enterable; Modifiable |
| Date of Record Update | Alpha 20 | Enterable; Modifiable |

FIG. 15AA

| Structure: Promo Spot Order- Virtual Kiosk | | |
|---|---|---|
| UPN of Promoted Product | Alpha 20 | Enterable; Modifiable |
| Virtual Kiosk ID No. | Alpha 20 | Enterable; Modifiable |
| Scheduled Date of Promo Spot | Alpha 20 | Enterable; Modifiable |
| Promoter Placing Order | Alpha 20 | Enterable; Modifiable |
| Dated Promo Spot Order | Alpha 20 | Enterable; Modifiable |
| Promoter ID No. | Alpha 20 | Enterable; Modifiable |
| URL of Promotional Ad In DF1 | Alpha 20 | Enterable; Modifiable |
| Promotional Message In DF2 | Alpha 20 | Enterable; Modifiable |
| Promotional Message In DF3 | Alpha 20 | Enterable; Modifiable |
| Promotional Message In DF4 | Alpha 20 | Enterable; Modifiable |
| Promotional Message In DF5 | Alpha 20 | Enterable; Modifiable |
| Time Duration of Promotion Spot | Alpha 20 | Enterable; Modifiable |
| Copyright Owner of Promo Ad | Alpha 20 | Enterable; Modifiable |
| Ordered Number of Displays/Date | Alpha 20 | Enterable; Modifiable |
| File Format of Promotional Ad | Alpha 20 | Enterable; Modifiable |
| Virtual Kiosk Promo Spot ID No. | Alpha 20 | Enterable; Modifiable |
| Actual Number of Displays/Date | Alpha 20 | Enterable; Modifiable |
| Actual Number of Interruptions | Alpha 20 | Enterable; Modifiable |
| Cost Of Promo Spot | Alpha 20 | Enterable; Modifiable |
| Promo Cost Payment | Alpha 20 | Enterable; Modifiable |
| Date of Promo Payment | Alpha 20 | Enterable; Modifiable |
| Date of Record Update | Alpha 20 | Enterable; Modifiable |

FIG. 15BB

| Structure: Virtual Kiosk Promo Campaign | | |
|---|---|---|
| Virtual Kiosk ID No. | Alpha 20 | Enterable; Modifiable |
| Date of Promo Campaign | Alpha 20 | Enterable; Modifiable |
| Virtual Kiosk Promo Spot ID No. 1 | Alpha 20 | Enterable; Modifiable |
| Virtual Kiosk Promo Spot ID No. 2 | Alpha 20 | Enterable; Modifiable |
| Virtual Kiosk Promo Spot ID No. 3 | Alpha 20 | Enterable; Modifiable |
| Virtual Kiosk Promo Spot ID No. 4 | Alpha 20 | Enterable; Modifiable |
| Virtual Kiosk Promo Spot ID No. 5 | Alpha 20 | Enterable; Modifiable |
| Virtual Kiosk Promo Spot ID No. 6 | Alpha 20 | Enterable; Modifiable |
| Virtual Kiosk Promo Spot ID No. 7 | Alpha 20 | Enterable; Modifiable |
| Virtual Kiosk Promo Spot ID No. 8 | Alpha 20 | Enterable; Modifiable |
| Virtual Kiosk Promo Spot ID No. 9 | Alpha 20 | Enterable; Modifiable |
| Virtual Kiosk Promo Spot ID No. 10 | Alpha 20 | Enterable; Modifiable |
| Total Promo Spot Ordered | Alpha 20 | Enterable; Modifiable |
| Date of Record Update | Alpha 20 | Enterable; Modifiable |

FIG. 15CC

| Structure: Virtual Kiosk Ad Campaign | | |
|---|---|---|
| Virtual Kiosk ID No. | Alpha 20 | Enterable; Modifiable |
| Date of Ad Campaign | Alpha 20 | Enterable; Modifiable |
| Virtual Kiosk Ad Spot ID No. 1 | Alpha 20 | Enterable; Modifiable |
| Virtual Kiosk Ad Spot ID No. 2 | Alpha 20 | Enterable; Modifiable |
| Virtual Kiosk Ad Spot ID No. 3 | Alpha 20 | Enterable; Modifiable |
| Virtual Kiosk Ad Spot ID No. 4 | Alpha 20 | Enterable; Modifiable |
| Virtual Kiosk Ad Spot ID No. 5 | Alpha 20 | Enterable; Modifiable |
| Virtual Kiosk Ad Spot ID No. 6 | Alpha 20 | Enterable; Modifiable |
| Virtual Kiosk Ad Spot ID No. 7 | Alpha 20 | Enterable; Modifiable |
| Virtual Kiosk Ad Spot ID No. 8 | Alpha 20 | Enterable; Modifiable |
| Virtual Kiosk Ad Spot ID No. 9 | Alpha 20 | Enterable; Modifiable |
| Virtual Kiosk Ad Spot ID No. 10 | Alpha 20 | Enterable; Modifiable |
| Total Ad Spots Ordered On Kiosk | Alpha 20 | Enterable; Modifiable |
| Date of Record Update | Alpha 20 | Enterable; Modifiable |

FIG. 15DD

| Structure: Ad Credit- Physical Kiosk | | |
|---|---|---|
| Advertiser ID No. | Alpha 20 | Enterable; Modifiable |
| Physical Kiosk ID No. | Alpha 20 | Enterable; Modifiable |
| Physical Kiosk Ad Spot ID No. | Alpha 20 | Enterable; Modifiable |
| UPN of Advertised Product | Alpha 20 | Enterable; Modifiable |
| URL of Interrupted Ad | Alpha 20 | Enterable; Modifiable |
| Date of Interruption | Alpha 20 | Enterable; Modifiable |
| Time of Interruption | Alpha 20 | Enterable; Modifiable |
| UPN of Interrupting Product | Alpha 20 | Enterable; Modifiable |
| Amount of Ad Credit | Alpha 20 | Enterable; Modifiable |
| Date of Record Creation | Alpha 20 | Enterable; Modifiable |

FIG. 15EE

| Structure: Ad Credit- Virtual Kiosk | | |
|---|---|---|
| Advertiser ID No. | Alpha 20 | Enterable; Modifiable |
| Virtual Kiosk ID No. | Alpha 20 | Enterable; Modifiable |
| Virtual Kiosk Ad Spot ID No. | Alpha 20 | Enterable; Modifiable |
| URL of Advertised Product | Alpha 20 | Enterable; Modifiable |
| URL of Interrupted Ad | Alpha 20 | Enterable; Modifiable |
| Date of Interruption | Alpha 20 | Enterable; Modifiable |
| Time of Interruption | Alpha 20 | Enterable; Modifiable |
| UPN of Interrupting Product | Alpha 20 | Enterable; Modifiable |
| Amount of Ad Credit | Alpha 20 | Enterable; Modifiable |
| Date of Record Creation | Alpha 20 | Enterable; Modifiable |

FIG. 15FF

| Structure: Promo Credit- Physical Kiosk | | |
|---|---|---|
| Advertiser ID No. | Alpha 20 | Enterable; Modifiable |
| Physical Kiosk ID No. | Alpha 20 | Enterable; Modifiable |
| Physical Kiosk Promo Spot ID No. | Alpha 20 | Enterable; Modifiable |
| UPN of Advertised Product | Alpha 20 | Enterable; Modifiable |
| URL of Interrupted Ad | Alpha 20 | Enterable; Modifiable |
| Date of Interruption | Alpha 20 | Enterable; Modifiable |
| Time of Interruption | Alpha 20 | Enterable; Modifiable |
| UPN of Interrupting Product | Alpha 20 | Enterable; Modifiable |
| Amount of Promo Credit | Alpha 20 | Enterable; Modifiable |
| Date of Record Creation | Alpha 20 | Enterable; Modifiable |

FIG. 15GG

| Structure: Promo Credit- Virtual Kiosk | | |
|---|---|---|
| Advertiser Identification No. | Alpha 20 | Enterable; Modifiable |
| Virtual Kiosk ID No. | Alpha 20 | Enterable; Modifiable |
| Physical Kiosk Promo Spot ID No. | Alpha 20 | Enterable; Modifiable |
| UPN of Advertised Product | Alpha 20 | Enterable; Modifiable |
| URL of Interrupted Ad | Alpha 20 | Enterable; Modifiable |
| Date of Interruption | Alpha 20 | Enterable; Modifiable |
| Time of Interruption | Alpha 20 | Enterable; Modifiable |
| UPN of Interrupting Product | Alpha 20 | Enterable; Modifiable |
| Amount of Promo Credit | Alpha 20 | Enterable; Modifiable |
| Date of Record Creation | Alpha 20 | Enterable; Modifiable |

FIG. 15HH

| Structure: Purchase at Physical Store | | |
|---|---|---|
| Retailer ID No. | Alpha 20 | Enterable; Modifiable |
| Retail P-Store ID No. | Alpha 20 | Enterable; Modifiable |
| UPN of Product Sold | Alpha 20 | Enterable; Modifiable |
| Date of Product Sale | Alpha 20 | Enterable; Modifiable |
| Time of Product Sale | Alpha 20 | Enterable; Modifiable |
| Price of Sold Product | Alpha 20 | Enterable; Modifiable |
| Customer ID No. | Alpha 20 | Enterable; Modifiable |
| Credit Card No. | Alpha 20 | Enterable; Modifiable |
| Retailer's Discount | Alpha 20 | Enterable; Modifiable |
| Mfgr's Promo Discount | Alpha 20 | Enterable; Modifiable |
| URL of Promo Advertisement | Alpha 20 | Enterable; Modifiable |
| Date of Record Creation | Alpha 20 | Enterable; Modifiable |

FIG. 15II

| Structure: Purchase at E-Store | | |
|---|---|---|
| Retailer ID No. | Alpha 20 | Enterable; Modifiable |
| Retail E-Store ID No. | Alpha 20 | Enterable; Modifiable |
| UPN of Product Sold | Alpha 20 | Enterable; Modifiable |
| Date of Product Sale | Alpha 20 | Enterable; Modifiable |
| Time of Product Sale | Alpha 20 | Enterable; Modifiable |
| Price of Sold Product | Alpha 20 | Enterable; Modifiable |
| Customer ID No. | Alpha 20 | Enterable; Modifiable |
| Credit Card No. | Alpha 20 | Enterable; Modifiable |
| Retailer's Promo Discount | Alpha 20 | Enterable; Modifiable |
| Mfgr's Promo Discount | Alpha 20 | Enterable; Modifiable |
| URL of Promo Advertisement | Alpha 20 | Enterable; Modifiable |
| Date of Record Creation | Alpha 20 | Enterable; Modifiable |

FIG. 15JJ

| Structure: Retailer/Mfgr. E-Store Relation | | |
|---|---|---|
| Retailer E-Store ID No. | Alpha 20 | Enterable; Modifiable |
| Manufacturer # 1 ID No. | Alpha 20 | Enterable; Modifiable |
| Manufacturer # 2 ID No. | Alpha 20 | Enterable; Modifiable |
| Manufacturer # 3 ID No. | Alpha 20 | Enterable; Modifiable |
| Manufacturer # 4 ID No. | Alpha 20 | Enterable; Modifiable |
| Manufacturer # 5 ID No. | Alpha 20 | Enterable; Modifiable |
| Manufacturer # 6 ID No. | Alpha 20 | Enterable; Modifiable |
| Manufacturer # 7 ID No. | Alpha 20 | Enterable; Modifiable |
| Manufacturer # 8 ID No. | Alpha 20 | Enterable; Modifiable |
| Manufacturer # 9 ID No. | Alpha 20 | Enterable; Modifiable |
| Manufacturer # 10 ID No. | Alpha 20 | Enterable; Modifiable |
| Total # Mfgr. Relationships | Alpha | Enterable; Modifiable |
| Date of Record Update | 20Alpha 20 | Enterable; Modifiable |

FIG. 15KK

| Structure: Mfgr. Rights | | |
|---|---|---|
| P-Kiosk Aisle/Shelf Location | Alpha 20 | Enterable; Modifiable |
| MIN of Mfgr. # 1 | Alpha 20 | Enterable; Modifiable |
| MIN of Mfgr. # 2 | Alpha 20 | Enterable; Modifiable |
| MIN of Mfgr. # 3 | Alpha 20 | Enterable; Modifiable |
| MIN of Mfgr. # 4 | Alpha 20 | Enterable; Modifiable |
| MIN of Mfgr. # 5 | Alpha 20 | Enterable; Modifiable |
| MIN of Mfgr. # 6 | Alpha 20 | Enterable; Modifiable |
| MIN of Mfgr. # 7 | Alpha 20 | Enterable; Modifiable |
| MIN of Mfgr. # 8 | Alpha 20 | Enterable; Modifiable |
| MIN of Mfgr. # 9 | Alpha 20 | Enterable; Modifiable |
| MIN of Mfgr. # 10 | Alpha 20 | Enterable; Modifiable |
| Date of Record Update | Alpha 20 | Enterable; Modifiable |

FIG. 15LL

| Structure: Mfgr. E-Store Web Page Rights | | |
|---|---|---|
| E-Store Web Page Location | Alpha 20 | Enterable; Modifiable |
| MIN of Mfgr. # 1 | Alpha 20 | Enterable; Modifiable |
| MIN of Mfgr. # 2 | Alpha 20 | Enterable; Modifiable |
| MIN of Mfgr. # 3 | Alpha 20 | Enterable; Modifiable |
| MIN of Mfgr. # 4 | Alpha 20 | Enterable; Modifiable |
| MIN of Mfgr. # 5 | Alpha 20 | Enterable; Modifiable |
| MIN of Mfgr. # 6 | Alpha 20 | Enterable; Modifiable |
| MIN of Mfgr. # 7 | Alpha 20 | Enterable; Modifiable |
| MIN of Mfgr. # 8 | Alpha 20 | Enterable; Modifiable |
| Date of Record Update | Alpha 20 | Enterable; Modifiable |

(Mfgr's Virtual Shelf Rights Aisle)

FIG. 15MM

Modes Of Information Service In The CPI Link Creation, Management, And Transport Subsystem (501)

- Registration Of Manufacture/Creation Of Manufacturer Account
- Log-In By Manufacturer
- Download And Register UPN/TM/PD/URL Link
- Creation/Management/And Transport (LCMT) Software
- Installation And Set-Up UPN/TM/PD/URL LCMT Software Within Manufacturer's Enterprise
- Selection And Customizing UPN/TM/PD/URL LCMT GUI Design-
    - Manufacturer Customization Options;
        - Default CPI Categories For Linked URL,
        - Custom CPI Categories For Linked URL
- On-Line Training For UPN/TM/PD/URL LCMT Software
- Update Manufacturer Registration Information
- Certificate Of Manufacturer's Product Advertising Agents
- Certificate Of Manufacturer's Product Promotional Agents

FIG. 16

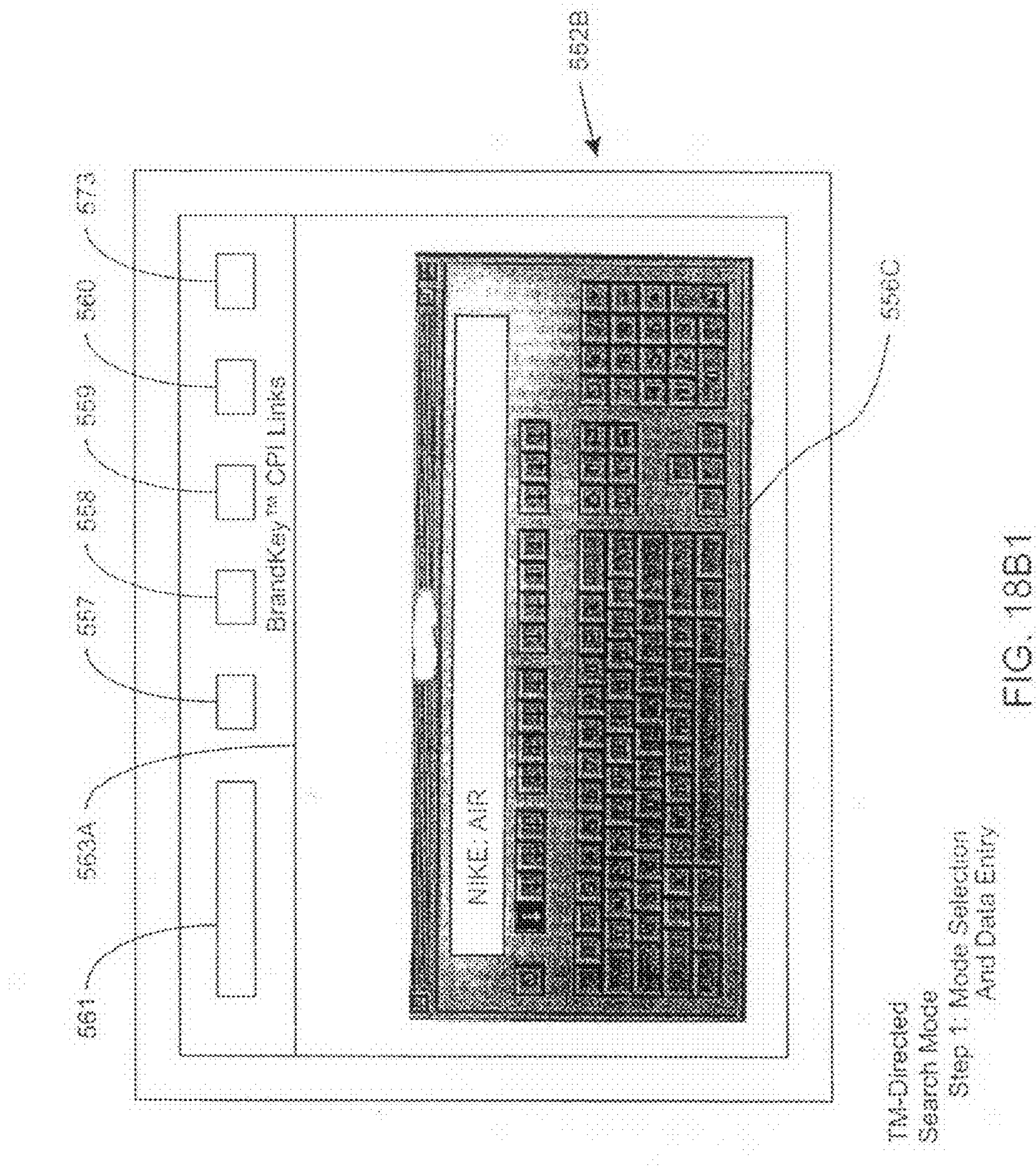
FIG. 18B1

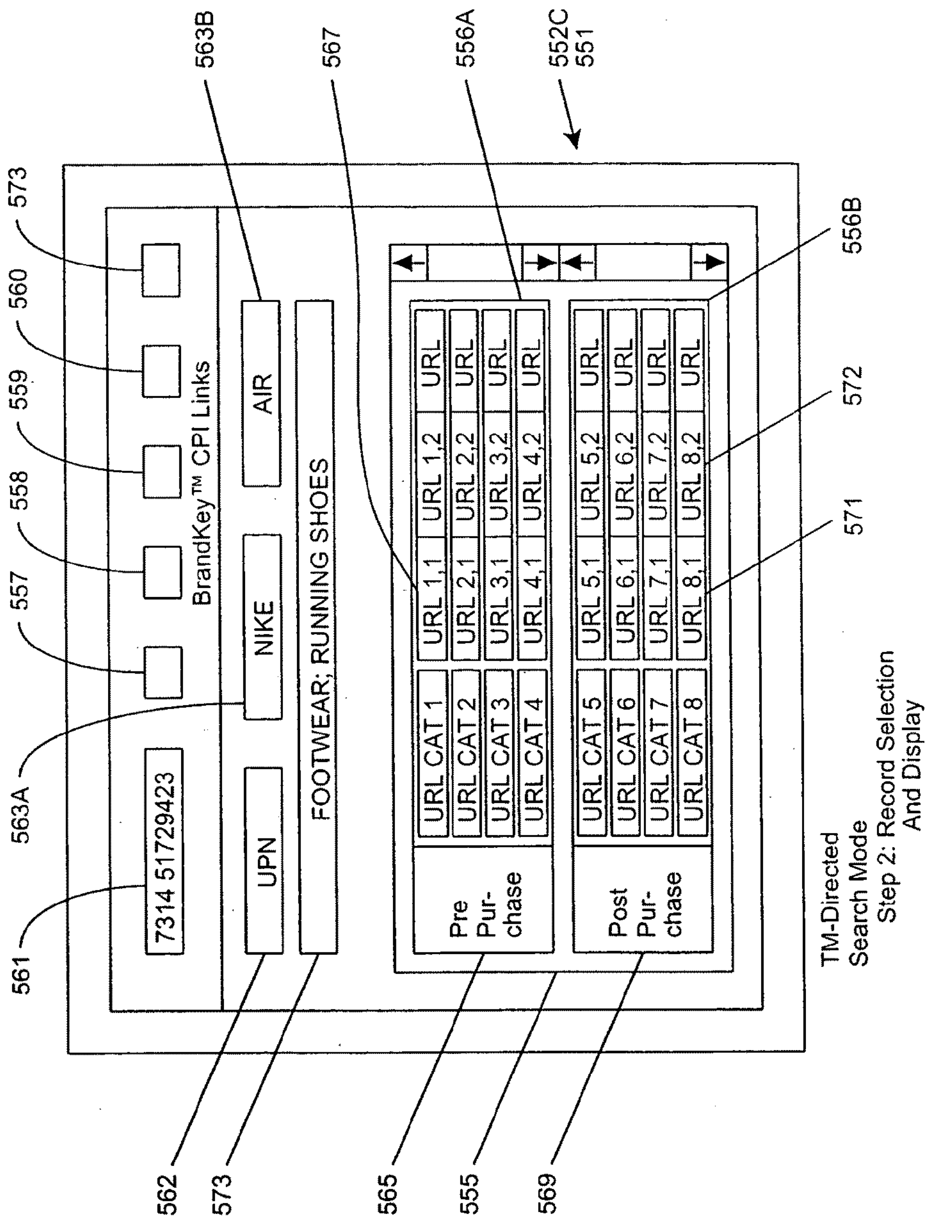
FIG. 18B2

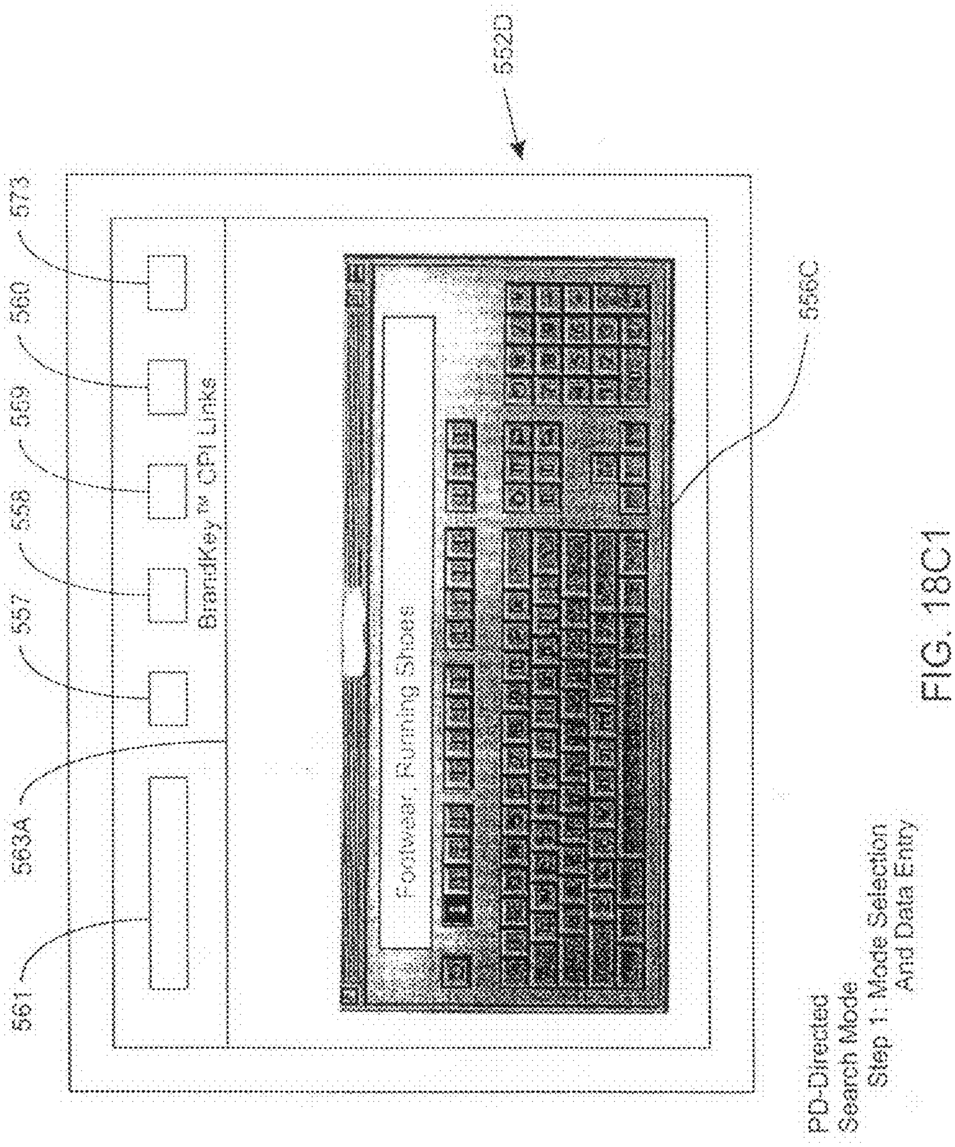
FIG. 18C1
PD-Directed
Search Mode
Step 1: Mode Selection
And Data Entry

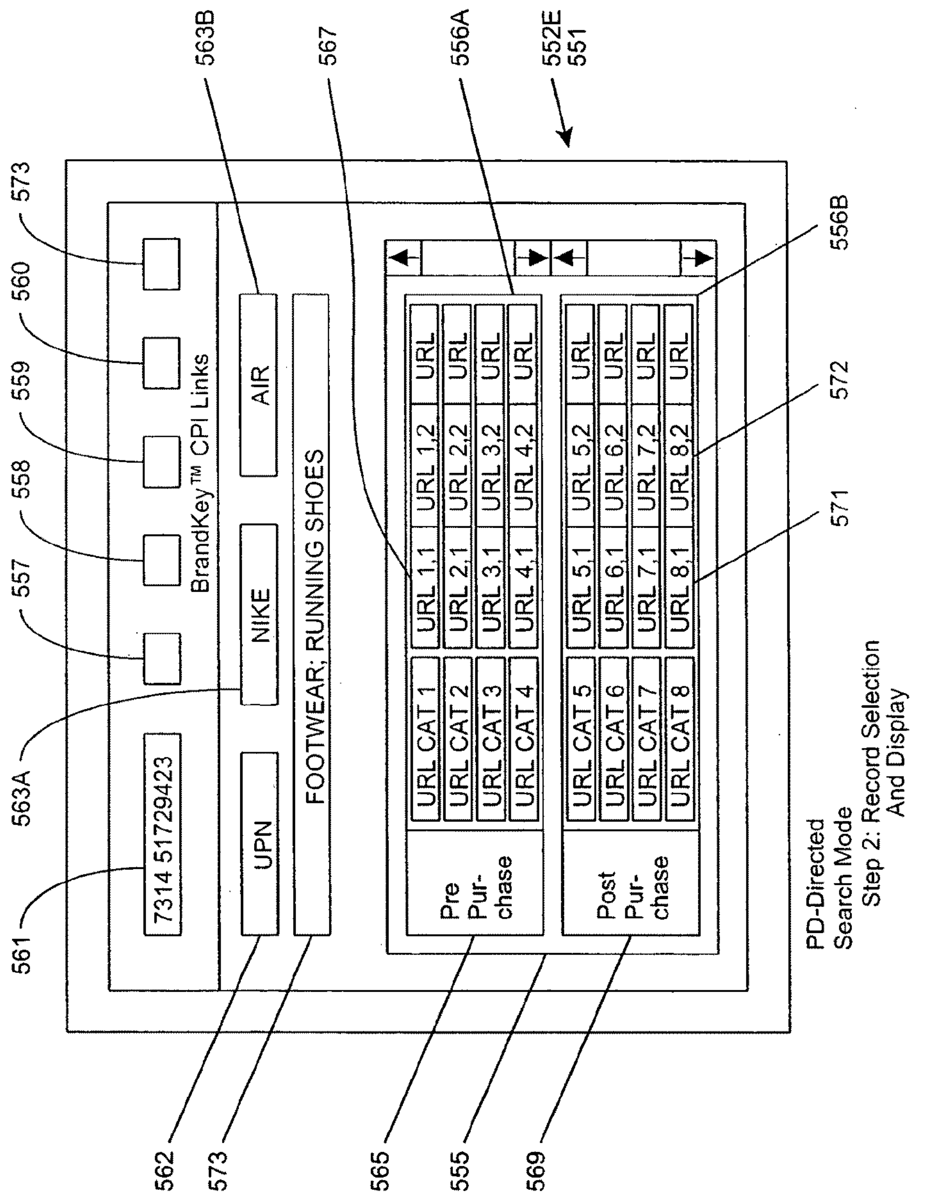
FIG. 18C2

Modes Of Information Service In The CPI Kiosk Configuration, Deployment, Management And Access Subsystem (504)

Retailers (In Physical And Electronic Streams Of Commerce)

- Registration Of Retailer/Creation Of Retailer Account
- Log-In By Retailer
- Update And Display Kiosk Deployment Directory-
- Select/Order Physical And Virtual Kiosk For Deployment
  - Specify Location Of Kiosk Installation And Deployment
  - Selection Of Information Services Delivered By Deployed CPI Kiosk
  - Selection And Customization Of CPI Design- Kiosk GUI Design
- Registration Of Manufacturer's Physical Aisle/Shelf Rights/Privileges On CPI Kiosks
- Certification Of Retailer's Advertising Agents
- Certification Of Retailer's Product Promotional Agents
- Monitoring Performance Of Registered Retailer Advertising Agents
- Monitoring Performance Of Registered Retailer Promotional Agents Consumers

- Registration Of Consumer (For Retailer-Issued Courtesy Cards)
- Display Of Kiosk Deployment Directories
  - Virtual CPI Kiosks Deployed In Retailer E-Stores
  - Physical CPI Kiosks Deployed In Retailer P-Stores
  - Virtual CPI Kiosks Deployed On WWW
- Monitor Consumer CPI E-Mail Transmissions From Subsystem

FIG. 19A

Manufacturer's (In Electronic Streams Of Commerce)

- Registration Of Manufacture/Creation Of Retailer Account
- Log-In By Manufacturer
  Update And Display Manufacturer's Virtual Kiosk Deployment Directory-
- Select/Order Virtual Kiosk For Deployment
  - Specify Domain Of Virtual Kiosk Installation And Deployment
  - Selection Of Information Services Delivered By Deployed Virtual CPI Kiosk
  - Selection And Customize Of-Virtual CPI Kiosk GUI Design
- Registration Of Manufacturer's Aisle/Shelf Rights/Privileges On CPI Kiosks
- Certification Of Manufacturer's Advertising Agents
- Certification Of Manufacturer's Product Promotional Agents
- Monitoring Performance Of Certified/Registered Manufacturer's Advertising Agents
- Monitoring Performance Of Certified/Registered Manufacturer's Promotional Agents

FIG. 19B

Data-Processing Method Carried Out On CPI Requests Made By Consumers From Physical Retailer-Based CPI Kiosks In Accordance With The Principles Of The Present Invention Data Filtering On CPI Requests Made From Physical Kiosks Deployed In A Retailers Store Data-Processing Method Carried Out On CPI Requests Made By Consumers From Virtual-Type Retailer-Based CPI Kiosks In Accordance With The Principles Of The Present Invention Data Filtering On CPI Requests Made From Virtual (Applet-Enabled) Kiosks Deployed At An E-Tailers WWW Site Or E-Store Modes of Information Service in the Consumer Product Advertisement Marketing, Programming, Management and Delivery Subsystem (502)

Advertisers

- Registration Of Advertiser/Creation Of Advertiser Account
- Log-In By Advertiser
- Display Kiosk Advertising Directory Identifying CPI Kiosks On Which The Advertiser Is Authorized To Display Advertisements On Consumer Products
- Display Kiosk Advertising Directory Identifying CPI Kiosks On Which The Advertiser Is Authorized To Display Advertisements On A Particular Brand Or Brands Of Consumer Product
- Register Kiosk Advertising Campaign To Be Displayed On A Retailer-Authorized Subnetwork Of CPI Kiosks
- Build Kiosk Advertising Campaign By Placing Ad Spot Orders To Be Run On A Particular Subnetwork Of CPI Kiosks
- Run And Display-Kiosk Advertising Campaign On Retailer-Authorized Subnetwork Of CPI Kiosk Subnetwork
- Modify Kiosk Advertising Campaign
- Monitor Performance Of Kiosk Advertising Campaign

FIG. 29

Data-Processing Method Applied During The Generation Of A Kiosk Advertising Directory Identifying A Deployed Network Of Physical And Virtual Types Of Retailer-Based CPI Kiosks On Which Particular Advertisers And Advertising Agents Are Authorized By Retailers To Display Product Advertisements, In Accordance With The Principles Of The Present Invention

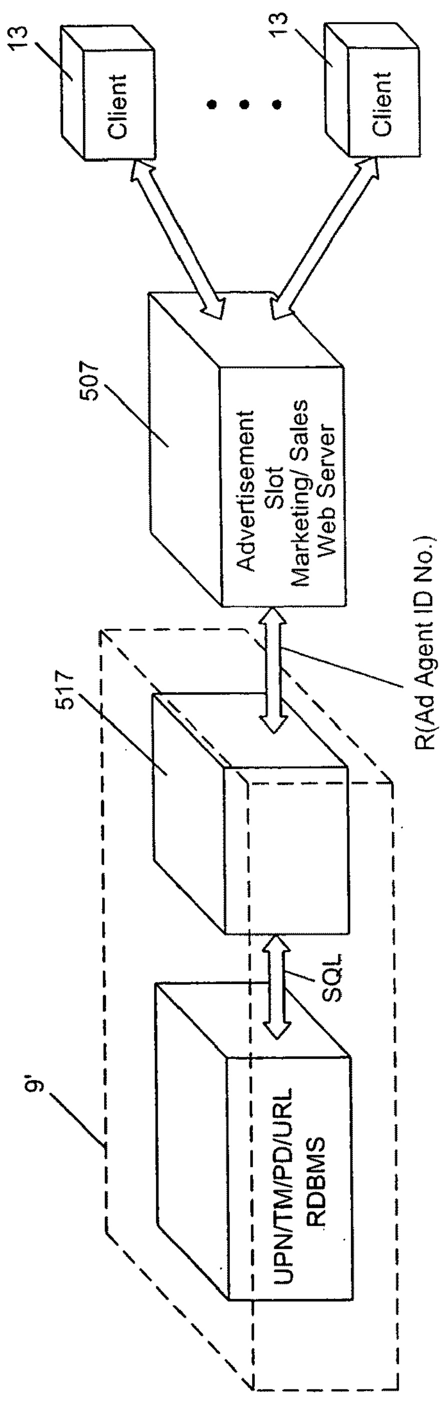

FIG. 31

Data Processing Method For Generating A General Kiosk Advertising Directory Which Includes Only (Physical And Virtual) Kiosks On Which The Registered Advertiser Is Authorized By Retailers To Place Ad Spot Orders For Execution And Display Data-Processing Method Applied During The Generation Of A Kiosk Advertising Directory Identifying A Deployed Network Of Physical And Virtual Types Of Retailer-Based CPI Kiosks On Which A Particular Advertiser Or Advertising Agent Is Authorized By Kiosk-Hosting Retailers To Display Product Advertisements Regarding A Particular Brand Of UPN-Indexed Consumer Product In Accordance With The Principles Of The Present Invention

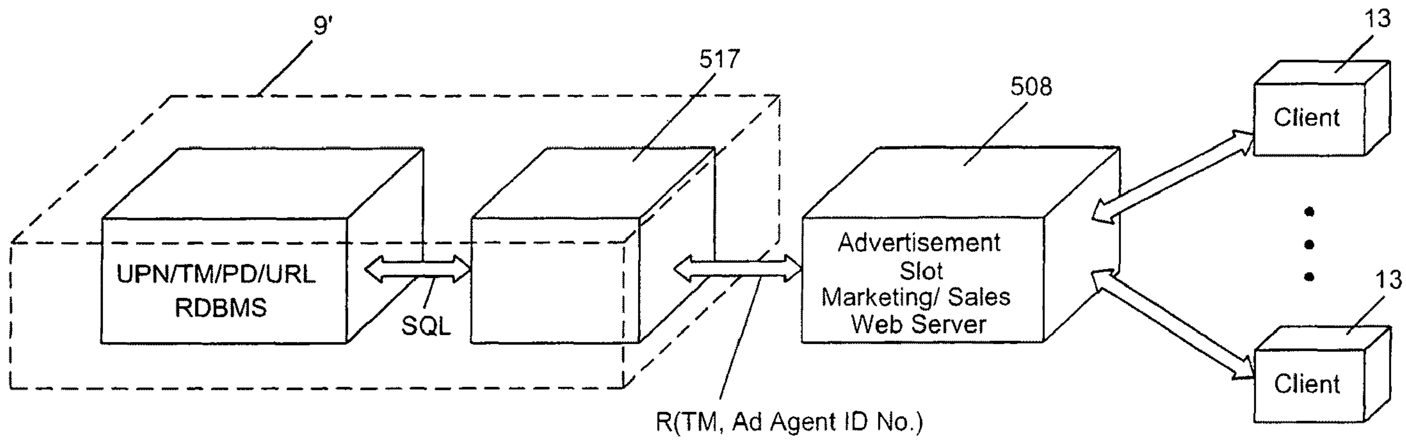

FIG. 33

Figure 34A:
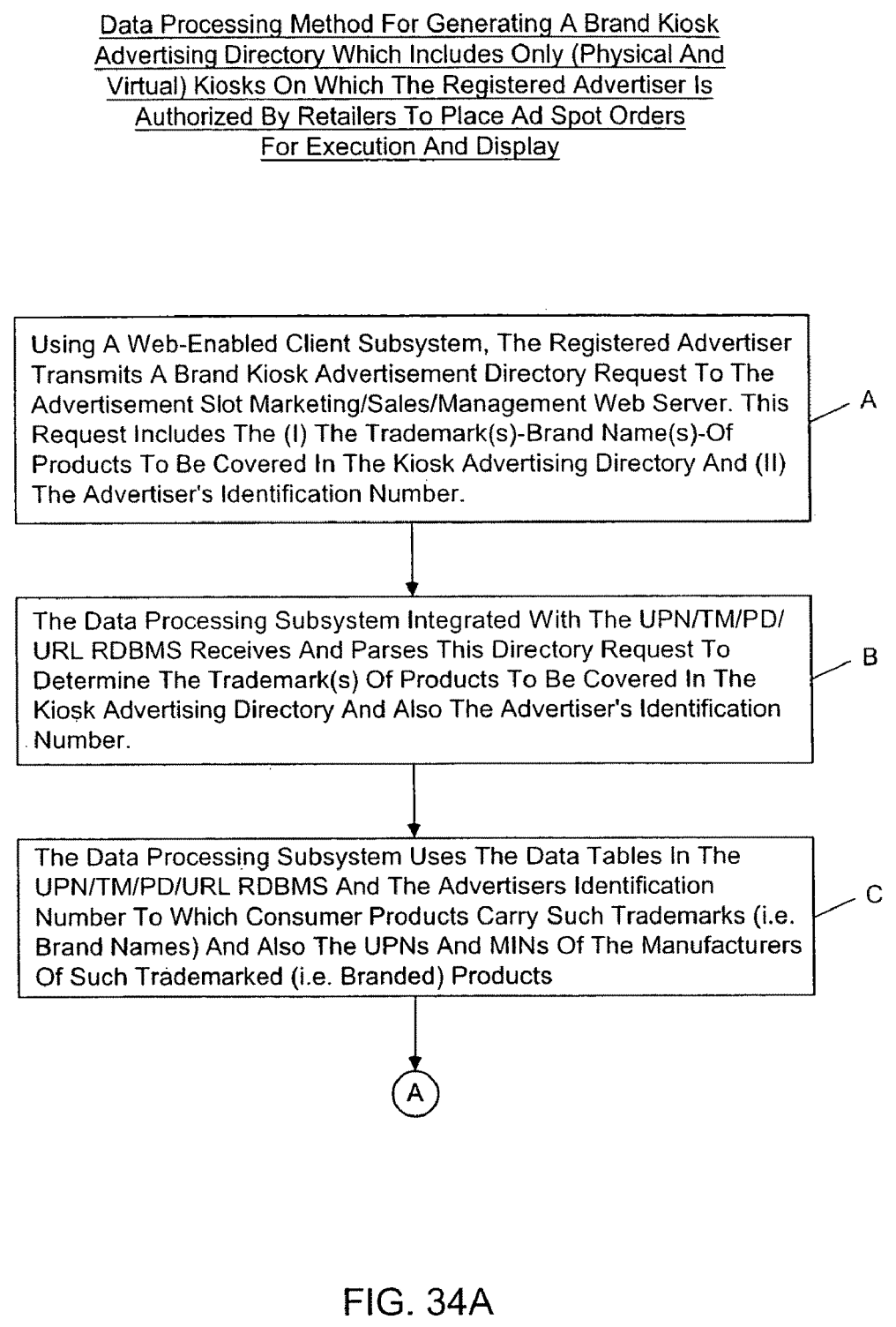

Data Processing Method For Generating A Brand Kiosk Advertising Directory Which Includes Only (Physical And Virtual) Kiosks On Which The Registered Advertiser Is Authorized By Retailers To Place Ad Spot Orders For Execution And Display Using A Web-Enabled Client Subsystem, The Registered Advertiser Transmits A Brand Kiosk Advertisement Directory Request To The Advertisement Slot Marketing/Sales/Management Web Server. This Request Includes The (I) The Trademark(s)-Brand Name(s)-Of Products To Be Covered In The Kiosk Advertising Directory And (II) The Advertiser's Identification Number. — A

↓

The Data Processing Subsystem Integrated With The UPN/TM/PD/URL RDBMS Receives And Parses This Directory Request To Determine The Trademark(s) Of Products To Be Covered In The Kiosk Advertising Directory And Also The Advertiser's Identification Number. — B

↓

The Data Processing Subsystem Uses The Data Tables In The UPN/TM/PD/URL RDBMS And The Advertisers Identification Number To Which Consumer Products Carry Such Trademarks (i.e. Brand Names) And Also The UPNs And MINs Of The Manufacturers Of Such Trademarked (i.e. Branded) Products — C

Modes of Information Service in the Consumer Product Promotion Marketing, Programming, Management and Delivery Subsystem (503)

Promoters

- Registration Of Promoter/Creation Of Promotion Account
- Log-In By Promoter
- Display Kiosk Promotional Directory Identifying CPI Kiosks On Which The Promoter Is Authorized To Display Promotion On Consumer Products
- Display Kiosks On Which The Promoter Is Authorized To Display Promotions On A Particular Brand Or Brands Of Consumer Products
- Register Kiosk Promotions Campaign To Be Displayed On A Retailer-Authorized Subnetwork Of CPI Kiosks
- Run And Display-Kiosk Promotion Campaign On Retailer-Authorized Subnetwork Of CPI Kiosk Subnetwork
- Modify Instituted Kiosk Promotion Campaign
- Monitor Kiosk Promotion Campaign

FIG. 35

Data-Processing Method Applied During The Generation Of A Kiosk Promotion Directory Identifying A Deployed Network Of Physical And Virtual Types Of Retailer-Based CPI Kiosks On Which Particular Promoters And Promotional Agents Are Authorized By Retailers To Display Product Promotions In Accordance With The Principles Of The Present Invention Data Processing Method For Generating A General Kiosk Promotion Directory Which Includes Only (Physical And Virtual) Kiosks On Which The Registered Promoter Is Authorized By Retailers To Place Promo Spot Orders For Execution And Display A: Using A Web-Enabled Client Subsystem, The Registered Promoter Transmits A General Kiosk Promotion Directory Request To The Promotion Spot Marketing/Sales/Management Web Server. This Request Includes The Promoter's Identification Number.

↓

Figure 38A:
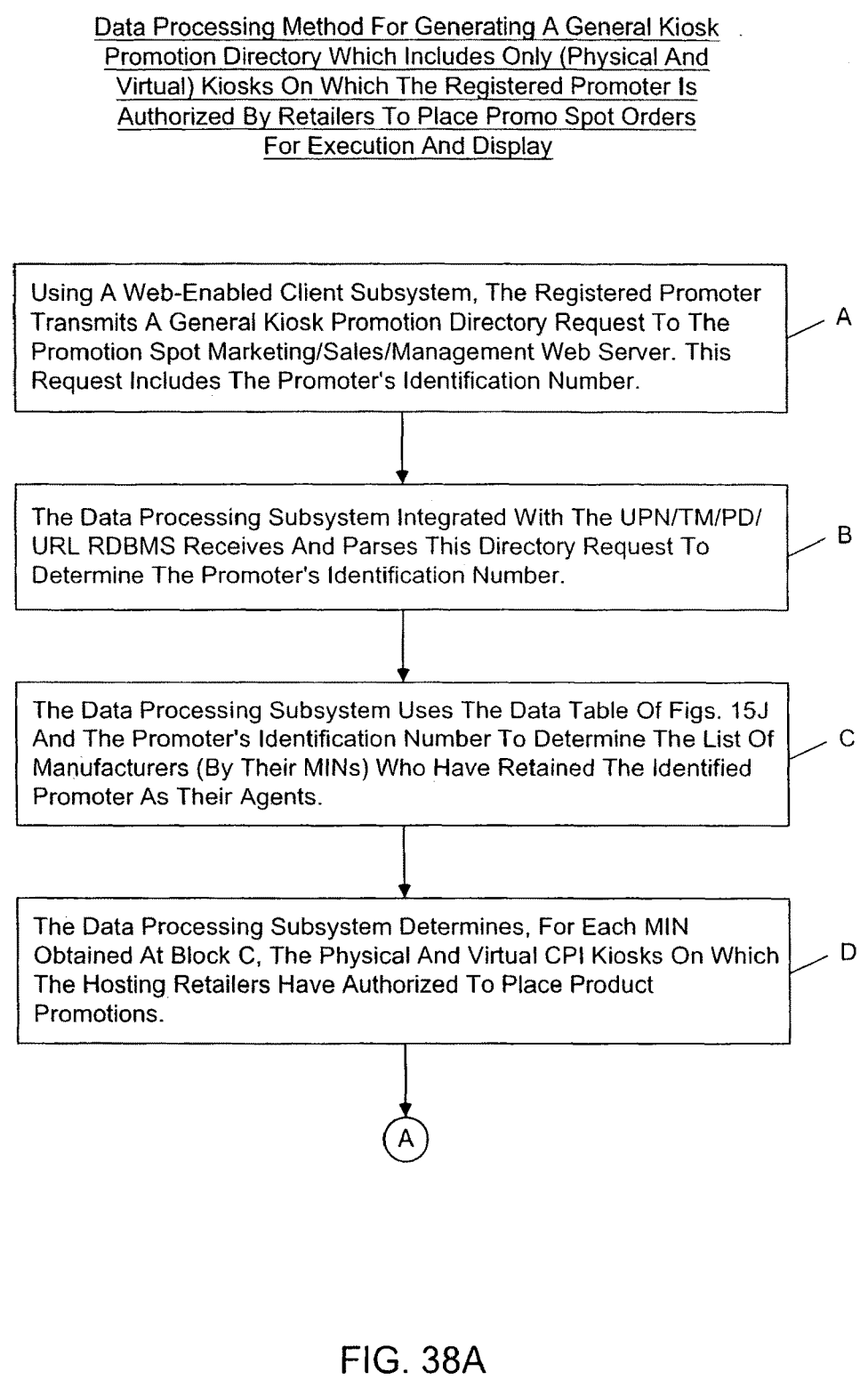

B: The Data Processing Subsystem Integrated With The UPN/TM/PD/URL RDBMS Receives And Parses This Directory Request To Determine The Promoter's Identification Number.

↓

C: The Data Processing Subsystem Uses The Data Table Of Figs. 15J And The Promoter's Identification Number To Determine The List Of Manufacturers (By Their MINs) Who Have Retained The Identified Promoter As Their Agents.

↓

D: The Data Processing Subsystem Determines, For Each MIN Obtained At Block C, The Physical And Virtual CPI Kiosks On Which The Hosting Retailers Have Authorized To Place Product Promotions.

Data-Processing Method Applied During The Generation Of A Kiosk Promotion Directory Identifying A Deployed Network Of Physical And Virtual Types Of Retailer-Based CPI Kiosks On Which A Particular Promoter Or Promotional Agent Is Authorized By Kiosk-Hosting Retailers To Display Product Promotions Regarding A Particular Brand Of UPN-Indexed Consumer Product In Accordance With The Principles Of The Present Invention

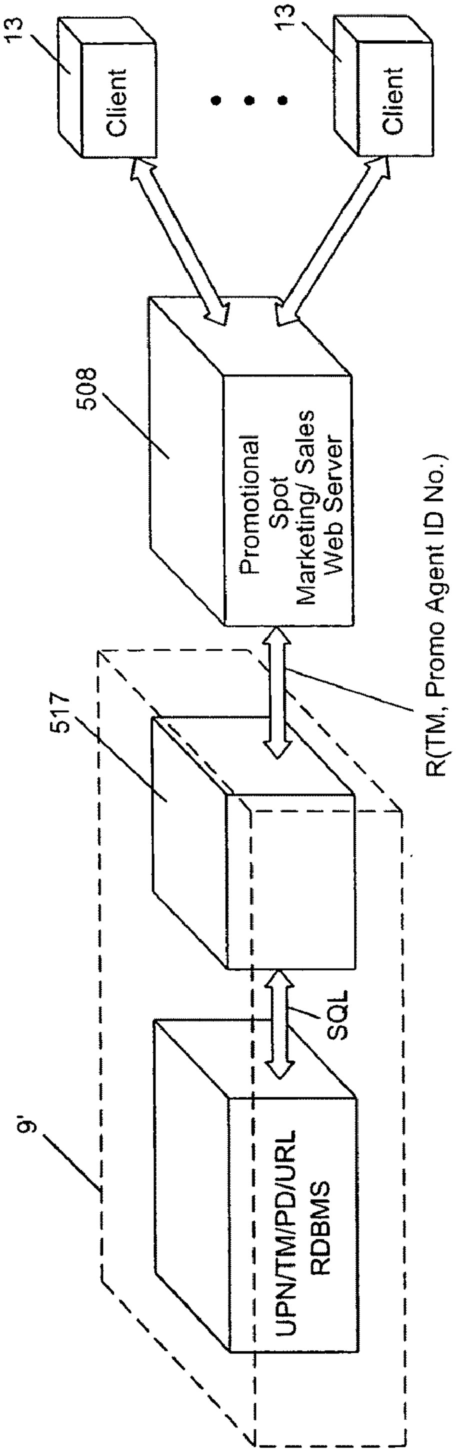

FIG. 39

Physical Multi-Mode (CPI) Kiosk

WEB-BASED CONSUMER PRODUCT MARKETING COMMUNICATION NETWORK FOR MANAGING AND DELIVERING CONSUMER PRODUCT MARKETING COMMUNICATIONS TO CONSUMERS ALONG E-COMMERCE (EC) ENABLED WEB SITES ON THE WORLD WIDE WEB (WWW), USING MULTI-MODE VIRTUAL KIOSKS (MMVKS) DRIVEN BY SERVER=SIDE COMPONENTS EMBODYING CONSUMER PRODUCT IDENTIFIERS AND DRIVEN BY CONSUMER PRODUCT INFORMATION (CPI) LINKS MANAGED BY PRODUCT MANUFACTURER TEAM MEMBERS AND/OR THEIR AGENTS

RELATED CASES

This Application is a Continuation of application Ser. No. 09/716,848 filed Nov. 17, 2000; which is a Continuation-in-Part of application Ser. No. 09/695,744 filed Oct. 24, 2000; which is a Continuation-in-Part of application Ser. No. 09/641,908 filed Aug. 18, 2000 now abandoned; which is a Continuation-in-Part of application Ser. No. 09/599,690 filed Jun. 22, 2000 now abandoned which is a Continuation-in-Part of Ser. No. 09/483,105 filed Jan. 14, 2000 now abandoned; and a Continuation-in-Part of application Ser. No. 09/465,859 filed Dec. 17, 1999 now abandoned; which is a Continuation-in-Part of application Ser. No. 09/447,121 filed Nov. 22, 1999 now U.S. Pat. No. 6,625,581; which is a Continuation-in-Part of application Ser. No. 09/441,973 filed Nov. 17, 1999 now U.S. Pat. No. 6,961,712; which is a Continuation-in-Part of application Ser. No. 09/284,917 filed Apr. 21, 1999 now abandoned and which was entered into the U.S. on Apr. 21, 1999 which is a National Stage Entry Application from International Application No. PCT/US97/19227 filed Oct. 27, 1997, published as WIPO Publication No. WO 98/19259 on May 7, 1998; as well as a Continuation-in-Part of application Ser. No. 08/736,798, published as U.S. Pat. No. 5,918,214, filed Oct. 25, 1996; Ser. No. 08/752,136 now U.S. Pat. No. 6,064,979 filed Nov. 19, 1996; Ser. No. 08/826,120 filed Mar. 27, 1997 now abandoned; Ser. No. 08/854,877 filed May 12, 1997, now U.S. Pat. No. 5,950,173; Ser. No. 08/871,815 filed Jun. 9, 1997 now U.S. Pat. No. 7,143,055; and Ser. No. 08/936,375 filed Sep. 24, 1997 now abandoned, each said Application is commonly owned by IPF, Inc., and is incorporated herein by reference in its entirety as if fully set forth herein.

BACKGROUND OF INVENTION

1. Field of Invention

The present invention generally relates to a novel Internet-based method of and system for educating consumers and marketing products and services thereto within physical and electronic retail environments.

2. Brief Description of the Prior Art

Presently, an enormous amount of time, money and effort is expended daily by thousands of manufacturers and retailers to market, brand, advertise and sell their products and services to consumers in both regional and global markets. Prior to the creation of the World Wide Web (WWW), based on the Hypertext Markup Language (HTML) and the Hypertext Transmission Protocol (HTTP) invented by Tim Berners-Lee, et al., conventional marketing and advertising systems and methods used in print, radio, and television based communication mediums to communicate messages to consumers in the marketplace.

Since the development of the WWW and its enabling information file formats and communication protocols, a number of Internet-based advertising systems and networks have been developed and deployed in the world of consumer product and service advertising and promotion. Examples of commercially-available Internet-based advertising and promotion systems include: the Open Ad Stream™ (5.0) Internet Advertising Sales, Advertising-Management Software Technology And Media Services Network by RealMedia, Inc.; the DoubleClick™ Internet Advertising Sales, Advertising-Management And Media Services Network by DoubleClick, Inc. which employ its proprietary DART™ technology for collecting and analyzing audience behavior, predicting which ads will be most effective, measures ad effectiveness, and providing data for Web publishers and advertisers; the Adfusion™ Integrated Advertising Marketing, Sales and Management System by Adfusion, Inc. which integrates all phases of the media buying process including media research and planning, media inventory and yield management, secure online negotiation, the transaction execution, and tracking and post-campaign reporting; and the Promotions.com™ On-Line Promotion System by Promotions.com, Inc. formerly Webstakes.com, which develops customized online promotions for clients providing technology and consulting services necessary to run the promotions on clients' own Web sites, and offering direct marketing e-mail services using a database of customer profiles.

Recently, two principally different methods have been proposed for providing product information to consumers over the Internet.

U.S. Pat. No. 5,640,193 to Wellner discloses a system and method for accessing and displaying Web-based consumer product related information to consumers using a Internet-enabled computer system, whereby in response to reading a URL-encoded bar code symbol on or associated with a product, the information resource specified by the URL is automatically accessed and displayed on the Internet-enabled computer system. Current commercial realizations of this general information access technique include the GoCode™ Print-to-Web Information Access System by GoCode, Inc. of Charleston, S.C. While this system and method enables access of consumer product information related information resources on the WWW by reading URL-encoded bar code symbols, it requires that custom URL-encoded bar code symbols be created, printed and applied to each and every physical product in the stream of commerce.

U.S. Pat. No. 5,978,773 to Hudetz, et al discloses a solution to the problem presented by the system and method of U.S. Pat. No. 5,640,193. This solution involves the use of a UPC/URL database in order to translate UPC numbers (and other unique codes) read from consumer products by a bar code scanner, into the URLs of published information resources on the WWW relating to the UPC-labeled consumer product.

Like U.S. Pat. No. 5,978,773 to Hudetz, et al, WIPO Publication No. WO 98/03923 discloses the use of a UPC/URL database in order to translate UPC numbers read from consumer products by a bar code scanner, into the URLs of published information resources on the WWW relating to the UPC-labeled consumer product. Current commercial realizations of this general information access technique include: the PaperClick™ Print-To-Web Information Access System by Neomedia Technologies, Inc., of Fort Meyers, Fla.; the AirClic™ Wireless Print-to-Web Media Consumer Product and Service Information Access System by Airclic, Inc. of Blue Bell, Pa.; the Cue-Cat™ Web-based Print-to-Media Product Information Access System by DigitalConvergence, Inc., of Dallas, Tex.; the Qode™ Wireless Print-to-Web Media Consumer Product Information Access System by Qode.Com, Inc. of Fort Lauderdale, Fla.; et al.

While U.S. Pat. No. 5,978,773 and WIPO Publication No. WO 98/03923 both provide an effective solution to the problem presented by U.S. Pat. No. 5,640,193 to Wellner, et al., these prior art references and systems completely fail to recognize or otherwise address the myriad of problems relating to UPC/URL-link collection, management, delivery, access and display along the retail supply and demand chain, which must be first solved in order deliver a technically feasible, globally-extensive, UPC-driven consumer product information system for the benefit of consumers worldwide.

For over a decade, several years before the development of the WWW, both General Electric Information Services (GEIS) division of General Electric (GE) Corporation, and Quick Response Services (QRS), Inc. have maintained independent consumer product information databases based on the retail industry standard Universal Product Code (UPC) numbering system. These consumer product information databases, branded as the GEIS UPC Express® Product Catalog (recently renamed the GPC Express™ UPC Product Catalog), and the QRS Keystone™ UPC Product Catalog, are maintained in large-scale RDBMS that are connected to secure value-added networks, referred to as VANs, as well as the infrastructure of the Internet, and thus are easily accessible by retailers using Internet-enabled client computers. These UPC Product Catalogs contain "supply-side related" information records on millions of consumer products from thousands of manufacturers selling their products to retailers along the retail chain, at wholesale prices, terms and conditions. The supply-side related information contained in these centralized UPC Product Catalogs are locally maintained by the manufacturers (i.e. vendors) using conventional UPC management software, as developed by Intercoastal Data Corporation (IDC) of Carrollton, Ga., and BarCode World, Inc. These manufacturer-managed UPC Product Catalogs are then periodically uploaded to GEIS's and/or QRS's centralized UPC Product Catalogs, using electronic data interchange (EDI) processes carried out between each manufacturer's UPC Product Catalog and the centralized UPC Product Catalog. The purpose of such uploading operations is to update these centralized UPC Product Catalogs with current and accurate pricing and shipping information required by retailers who visit these centralized UPC Product Catalogs, download the UPC Product Catalogs of their manufacturer trading partners (or portions thereof), to review current product offerings and wholesale prices, terms and conditions, and thereafter purchase desired products from the downloaded manufacturer's UPC Product Catalog using conventional EDI-enabled electronic-commerce (EC) transaction techniques. In essence, the primary function of these centralized UPC Product Catalogs is to enable B-2-B EC transactions between retailers and manufacturers (i.e. vendors) so that retailers can maintain a supply of products in their inventories sufficient to meet the demand for such products by consumers along the retain chain.

In addition to such centralized UPC Product Catalogs described above, these network administrators (GEIS and QRS) use information collected from B-2-B EC-transactions enabled by their centralized UPC Product Catalogs, to provide a number of other solutions to problems relating to electronic commerce (EC) merchandising and logistics within the global supply chain. Such ancillary information services include, for example: Sales, Analysis and Forecasting Services providing retailers with information about what products consumers are buying; Collaborative Replenishment Services for determining what products retailers can buy in order to satisfy consumer demand at any given point of time; and Transportation and Logistics Information Services for providing retailers with information about when products purchased by them (at wholesale) will be delivered to their stores. Such information services are offered to retailers on a global basis through VANs and the Internet.

While the above-described supply-chain information management and delivery systems and services collectively cooperate to optimize the process of moving raw materials into finished products and into the hands of consumers, such supply-side information systems fail to address the information needs of the consumers of retail products who require and desire product-related information prior to, as well as after, the purchase of consumer-products. Moreover, such systems and services fail altogether to address the problems facing manufacturer marketing, brand and product managers, and their advertising and promotion agents, as well as retailer marketing and product managers and their advertising and promotion agents working along the demand-side of the retail chain.

Thus, it is clear that there is great need in the art for an improved Internet-based method of and system for collecting, managing, and delivering product related information to the consumers along the retail chain, while avoiding the shortcomings and drawbacks of prior art systems and methodologies.

DISCLOSURE OF THE INVENTION

Accordingly, a primary object of the present invention is to provide a novel method of and apparatus for enabling manufacturers to collect and manage consumer product-related information and transmit the same to consumers in both physical and electronic retail shopping environments including at home, work and on the road, while overcoming the shortcomings and drawbacks of prior art systems and methodologies.

Another object of the present invention is to provide such apparatus in the form of a novel consumer-product information collection, management, transmission and delivery system.

Another object of the present invention is to provide such a system with an Internet-based product information database subsystem which, for each commercially available consumer-product, stores a number of information elements including: the name of the manufacturer; the Universal Product Code (UPC) assigned to the product by the manufacturer; one or more URLs specifying the location of information resources (e.g. Web-pages) on the Internet relating to the UPC-labeled consumer-product; and the like.

Another object of the present invention is to provide such a system, in which the URLs stored in the Internet-based product information database are categorically arranged and displayed according to specific types of product information (e.g., product specifications and operation manuals; product wholesalers and retailers; product advertisements and promotions; product endorsements; product updates and reviews; product warranty/servicing; related or complementary products; product incentives including rebates, discounts and/or coupons; etc.) that relate to the kind of information required, desired or otherwise sought by consumers, wholesalers, retailers and/or trading partners; product prices at which the products are being offered for sale by a particular retailer; and the like.

Another object of the present invention is to provide such a system, wherein the information maintained within the Internet-based product information database management subsystem provides a manufacturer-defined consumer-product directory that can be used by various persons along the retail chain.

Another object of the present invention is to provide such a system and method of using the same, which will accelerate the acceptance of electronic commerce on the Internet and the development of the electronic marketplace, which can be used by consumers and small and large businesses alike.

Another object of the present invention is to provide such a system and method, wherein virtually any type of product can be registered with the system by symbolically linking or relating (i) its preassigned Universal Product Number (e.g. UPC or EAN number) or at least the Manufacture Identification Number (MIN) portion thereof with (ii) the Uniform Resource Locators (URLs) of one or more information resources on the Internet (e.g. the home page of the manufacturers Web-site) related to such products.

Another object of the present invention is to provide such a system and method wherein a Web-based document transport subsystem is provided for use by manufacturers as well as their advertisers and agents in registering the UPNs (e.g. UPC numbers) of their products and the URLs of the information resources related to such products.

Another object of the present invention is to provide such a system with a number of different modes of operation, namely: a Manufacturer/Product Registration Mode, wherein manufacturers can register their companies and consumer products (e.g. UPC numbers and URLs) with the system; an UPN-Directed Information Access Mode, wherein consumers can access and display information menus containing UPC numbers linked to URLs pointing Web pages containing consumer product related information by scanning the UPC label on the consumer product or by entering the UPC number thereof into a data-entry screen displayed by the system in this mode; a Manufacturer Website Search Mode, wherein the home page of a manufacturers Web-site can be automatically accessed and displayed by scanning the UPC label on any consumer product of the manufacturer or by entering the UPC number thereof into a data-entry screen displayed by the system in this mode; a Trademark-Directed Search Mode enabling consumers to use trademarks and/or trade names associated with consumer products to search for consumer-product related information registered within the system; and a Product-Description Directed Search Mode enabling consumers to use product descriptors associated with particular consumer products to search for consumer-product related information registered within the system.

Another object of the present invention is to provide such a system, wherein when the system is in its UPN-Directed Information Menu Access Mode, a predesignated information resource (e.g. advertisement, product information, etc.) pertaining to any commercial product registered with the system can be automatically accessed from the Internet and displayed from the Internet browser by simply entering the registered product s UPN into the Internet browser manually or by bar code symbol scanning.

Another object of the present invention is to provide such a system, wherein when the system is in its Trademark-Directed Search Mode, a predesignated information resource (e.g. advertisement, product information, etc.) pertaining to any commercial product registered with the system can be automatically accessed from the Internet and displayed from the Internet browser by simply entering the registered products trademark(s) and/or associated company name into the Internet browser.

Another object of the present invention is to provide such a system, wherein when the system is in its Product-Description (PD)-Directed Search Mode, a predesignated information resource (e.g. advertisement, product information, etc.) pertaining to any commercial product registered with the system can be automatically accessed from the Internet and displayed from the Internet browser by simply entering the registered product s product description into the Internet browser.

Another object of the present invention is to provide such a system, wherein a predesignated information resource pertaining to any commercial product having been assigned a Universal Product Number (UPN) can be accessed from the Internet and displayed from the Internet browser by simply selecting and then entering the UPN numeric string into an Input Box which pops up on an HTML form displayed by an Internet browser.

Another object of the present invention is to provide such a system in which a relational database, referred to as an Internet Product Directory (IPD), is realized on one or more data-synchronized IPD Servers for the purpose of registering product related information, namely: (i) information representative of commercial product descriptions, the trademarks used in connection therewith, the company names providing and/or promoting such products, the E-mail addresses of such companies, and the corresponding URLs on the Internet specifying current (i.e. up-to-date) Internet Website locations providing product-related information customized to such products.

Another object of the present invention is to provide such a product information finding and serving system, wherein the URLs symbolically linked to each registered product in the IPD Servers thereof are categorized as relating primarily to Product Advertisements, Product Specifications, Product Updates, Product Distributors, Product Warranty/Servicing, and/or Product Incentives (e.g. rebates, discounts and/or coupons), and that such URL categories are graphically displayed to the requester by way of easy-to-read display screens during URL selection and Web-site connection.

A further object of the present invention is to provide an Internet-based system wherein: (1) manufacturers and their agents are enabled to simply link (i.e. relate), manage and update within a centralized database, the UPC (and/or UPC/EAN) numbers on their products and the Uniform Resource Locators (URLs) of HTTP-encoded document (i.e. Web pages) containing particular kinds of consumer product-related information published on the Internet by the manufacturers, their agents and/or third parties; and (2) consumers, in retail stores, at home, in the office and on the road, are enabled to simply access such consumer product-related information using such UPC (and/or UPC/EAN) numbers and/or by scanning UPC (or UPC/EAN) bar code symbols encoded with such product identification numbers.

Another object of the present invention is to provide a novel method of carrying out electronic-type commercial transactions involving the purchase of products, which are advertised on the Internet at uniform resource locations (URLs) that are registered with the IPI system of the present invention.

Another object of the present invention is to provide a novel system for and method of finding the UPN or USN associated with any particular registered product, respectively, by simply selecting a Java GUI button on the Internet browser display screen in order to enter a Trademark-Directed Search Mode, whereby (i) a dialogue box is displayed on the display screen requesting any known trademarks associated with the product, and/or the name of the company that makes, sells or distributes the particular product, and (ii) the corresponding UPN (i.e. UPC number or EAN number) registered with the IPD Servers is displayed to the user for acceptance, whereupon the Internet Uniform Resource Locators (URLs) are automatically accessed from the IPD Servers and displayed on the display screen of the Internet browser for subsequent URL selection and Web-site connection.

Another object of the present invention is to provide such a system and method, wherein during the Trademark-Directed Search Mode, the UPN (e.g. UPC or EAN number) associated with any registered product can be found within the database of the IPD Server using any trademark(s) and/or the company name commonly associated with the product.

Another object of the present invention is to provide a novel system and method for serving consumer-product related information to Internet users in retail shopping environments (e.g. department stores, supermarkets, superstores, home-centers and the like) as well as at home, work or on the road.

Another object of the present invention is to provide a consumer product information access terminal located at a point-of-sale (POS) station, wherein the bar code symbol reader integrated with the POS station can be used to read the UPC numbers on consumer products being offered for sale in the store in order to access consumer product related information from hyper-linked Web-sites on the Internet, for display on an LCD screen located at the POS station and viewable from various positions by the sales clerk as well as consumer shoppers.

Another object of the present invention is to provide a system and method, wherein one or more computer-based kiosks are installed within retail shopping environments and each such kiosk has an automatic bar code symbol reader for reading the UPC numbers on consumer products being offered for sale in the store, and also an LCD touch-type display screen for displaying product-related information accessed from hyper-linked Web-sites on the Internet.

Another object of the present invention is to provide such a system and method, wherein one or more computer-based kiosks are installed within retail shopping environments and each such kiosk has an automatic bar code symbol reader for reading the UPC numbers on consumer products being offered for sale in the store, and also a LCD touch-type display screen for displaying product-related information accessed from hyper-linked Web-sites on the Internet.

Another object of the present invention is to provide such a consumer product information kiosk, wherein the laser scanning bar code symbol reader can be easily removed from its support stand to scan large consumer products that might be difficult to present within the scanning field while the bar code symbol reader is supported above the LCD display panel.

Another object of the present invention is to provide such a consumer product information kiosk, wherein the laser scanning bar code symbol reader has a cordless interface with the kiosk so that it may be moved about within a retail store in a portable manner to scan UPC labels and access consumer product related information.

Another object of the present invention is to provide a consumer product information kiosk for use with the system hereof, that is completely transportable within the store by hand, or may be mounted upon a shopping cart or other vehicle for the convenience of shoppers and the like.

Another object of the present invention is to provide virtual or Cyber sales and service agents within retail shopping environments by installing the computer-based kiosks of the present invention therein.

Another object of the present invention is to provide a Web-based information delivery system and method, wherein the computer-based kiosks employed throughout the hosting retailer s store are capable of displaying the price of products offered for sale in the store upon reading the UPC bar code symbol thereon.

Another object of the present invention is to provide a novel consumer product e-marketing system and method, in which Internet-based advertising campaigns can be changed, modified and/or transformed in virtually any way imaginable by simply restructuring the symbolic links between the products and/or services in the campaign using current (i.e. up-to-date) Internet addresses at which Internet-based advertisements and information sources related thereto are located on the Internet.

Another object of the present invention is to provide a novel system for and method of automatically soliciting companies to register their products within the RDBMS associated with such IPD Servers in order that product related information of a multimedia nature (e.g. Web-sites), once registered therewith, can be easily found on the Internet by anyone using the system and method of the present invention.

Another object of the present invention is to provide a novel system for and method of finding and serving consumer-product related information on the Internet, accessible from the Websites of each manufacturer who has registered its UPN/TM/PD/URL links with the system s central IPD RDBMS.

Another object of the present invention is to provide such a system and method, wherein as part of the consumer product registration process, the manufacturer (or retailer) is provided with UPN/TM/PD/URL link creation, management and transport software for maintaining a limited-version of the UPN/TM/PD/URL RDBMS which contains a list of categorized URLs for each UPC-encoded product that the manufacturer (i.e. vendor) sells.

Another object of the present invention is to provide such a system and method, wherein the consumer product related information links contained within the limited-version of the UPN/TM/PD/URL RDBMS of each registered manufacturer (or retailer) can be accessed from the manufacturer s (or retailer s) company Website and served to consumers requesting such information by way of UPC (or UPC/EAN) number entry.

Another object of the present invention is to provide such a system and method, wherein the limited-version of the UPN/TM/PD/URL Database of each registered manufacturer (or retailer) is used to update a central or master UPN/TM/PD/URL Database which is continuously maintained and made accessible to consumers through (i) physical and virtual types of CPI kiosks deployed in licensed retail environments, and (ii) through wireless/mobile and wired/stationary Internet-enabled client subsystems.

Another object of the present invention is to provide a novel method of and system for accessing consumer product related information at points within HTML-encoded documents, at which Universal Product Number (UPN) encoded Java Applets are embedded so as to produce, when executed, a consumer product information display enabling (CPID-enabling) Java-based graphical user interfaces (GUIs) for the convenience of consumers shopping at electronic-commerce (EC) enabled stores, considering the placement of bids at on-line auction sites, or browsing product advertisements appearing on the World Wide Web.

Another object of the present invention is to provide an Internet-based consumer product information collection, managing and delivery system and method, wherein for each consumer product registered within the UPN/TM/PD/URL database of the system, there is created and stored, an interactive consumer product information request (CPIR) enabling Applet (e.g. based on Java™ component principles or Microsoft s Active-X technology) which, when executed upon the initiation by the consumer through a mouse-clicking operation, automatically causes a preassigned CPID-enabling Java GUI to be displayed at the consumer s point of presence in Cyberspace, revealing the results of a consumer product information search conducted upon the product identified by the UPN encoded within the executed Applet.

Another object of the present invention is to provide such an Internet-based consumer product information collection, managing and delivery system and method, wherein (1) the UPN assigned to a particular consumer product by the manufacturer and (2) the URL of the Java script running on the IPD server of the system are encoded within the CPIR-enabling Applet so that, upon execution of the Applet, a consumer product information display (CPID) Java GUI is automatically produced for the consumer s convenience.

Another object of the present invention is to provide an Internet-based consumer product information collection, managing and delivery system and method, wherein the CPID-enabling Java GUI automatically displays a manufacturer-defined menu (i.e. list) of categorized URLs pointing to information resources on the Internet (e.g. WWW) relating to the consumer product identified by the UPN encoded within the CPIR-enabling Applet.

Another object of the present invention is to provide such an Internet-based consumer product information collection, managing and delivery system and method, wherein CPIR-enabling Applets are created by the system administrator, loaded within the UPN/TM/PD/URL database management subsystem thereof, distributed to retailers, wholesalers, manufacturers, advertisers and others for embedding within HTML-encoded documents associated with EC-enabled stores, catalogs, Internet-based product advertisements, on-line auction sites, and other locations on the WWW where accurate consumer product related information is desired or required without leaving the point of presence on the WWW at which the consumer resides.

Another object of the present invention is to provide such an Internet-based consumer product information collection, managing and delivery system and method, wherein CPIR-enabling Applets are created, distributed, embedded within a HTML-encoded document related to a particular consumer product, and subsequently executed by a consumer so as to access and display a manufacturer-defined menu (i.e. list) of categorized URLs pointing to product-related Web-documents.

Another object of the present invention is to provide such an Internet-based consumer product information collection, managing and delivery system and method, wherein the consumer initiating the execution of a particular CPIR-enabling Applet may be anyone desiring or requiring consumer product related information while interacting with the communication medium provided by the Internet and its supported technologies (e.g. WWW, EC, etc.). As such, the consumer may be a student shopping at an EC-enabled (business-to-consumer) retail store for textbooks, a retail purchasing agent shopping at an on-line (business-to-business) wholesale product catalog for product inventory, a dealer looking to purchase a new or used product listed at an on-line auction site, or anyone encountering an Internet-based advertisement while surfing the WWW.

Another object of the present invention is to provide such an Internet-based consumer product information collection, managing and delivery system and method, wherein a thumbnail picture, arbitrary graphical object, predesignated CPIR-indicating icon, or hypertext-type link associated with a particular consumer product can be embedded within the CPIR-enabling Applet associated therewith, so as to enable the consumer to produce a CPID-enabling Java GUI upon encountering the same in an HTML-encoded document on the WWW.

Another object of the present invention is to provide such an Internet-based consumer product information collection, managing and delivery system and method, wherein licensed users can download CPIR-enabling Applets from the CPIR-Enabling Applet Library to any client computer for eventual insertion within the HTML code of a particular Web-document to be published on the Internet in accordance with the licensing arrangement between the contracting parties. Such end-use applications might be in EC-enabled retail product catalogs, EC-enabled wholesale/trade catalogs, Internet-based product advertisements, on-line auction WWW sites, on-line stock trading WWW sites, and the like.

Another object of the present invention is to provide such an Internet-based consumer product information collection, managing and delivery system and method, wherein the CPID-enabling Java GUIs enabled by executed CPIR-enabling Applets can function as CPI-serving virtual kiosks that can be installed at any location in Cyberspace for the convenience of consumers residing therewithin without disturbing their point of presence.

Another object of the present invention is to provide a novel method of and system for delivering consumer product advertisements, promotions and information to consumers over the WWW involving the use of a single mouse-clicking operation by the consumer.

Another object of the present invention is to provide a novel method of and system for embedding CPIR-enabling Applets within HTML-encoded consumer product advertisements published over the WWW involving the use of a single mouse-clicking operation by the consumer.

Another object of the present invention is to provide a novel method of and system for delivering consumer product related information to consumers at on-line auction sites on the WWW involving the use of a single mouse-clicking operation by the consumer.

Another object of the present invention is to provide a novel method of and system for embedding CPIR-enabling Applets within HTML-encoded on-line auction pages published over the WWW.

Another object of the present invention is to provide a novel method of and system for embedding CPIR-enabling Applets within HTML-encoded securities performance charts published at on-line electronic securities trading site on the WWW.

Another object of the present invention is to provide a new method of and system for purchasing a consumer product over the Internet (e.g. WWW) comprising the steps of: embedding a UPN-encoded CPIR-enabling Applet within the HTML-code of a consumer product advertisement, wherein the CPIR-enabling Applet when executed displays a categorized URL menu containing one or more URLs pointing to one or more EC-enabled stores or on-line catalogs on the WWW at which the consumer product identified by the encoded UPN can be purchased and delivered to a particular address in physical space.

Another object of the present invention is to provide a novel virtual CPI kiosk, launchable from predefined points of presence within an EC-enabled store, on-line product catalog or other type of WWW site, for enabling consumers (including retail purchasing agents) to quickly access and display at the predefined point of presence, an interactive menu of categorized URLs pointing to consumer product related information resources published on the WWW and symbolically linked to the UPNs of consumer products within a centralized UPN/TM/PD/URL database management subsystem, by manufacturers and/or their agents.

Another object of the present invention is to provide a novel EC-enabled product catalog having a library of CPIR-enabling Applets embeddable within graphical images of consumer products in HTML-encoded documents and enabling, when executed, a UPN-directed search within the UPN/TM/PD/URL database management subsystem and the display of an interactive menu of categorized URLs pointing to consumer product related information resources published on the WWW and symbolically linked to the UPNs of consumer products within a centralized UPN/TM/PD/URL database management subsystem, by manufacturers and/or their agents.

Another object of the present invention is to provide a novel Internet-based electronic commerce (EC) enabled shopping system comprising an Internet information server connected to the infrastructure of the Internet and supporting the hypertext transmission protocol (http), a Web-enabled client subsystem connected to the infrastructure of the Internet, an EC-enabled WWW site comprising a plurality of interlinked HTML-encoded documents arranged and rendered to provide an electronic store environment when served to a consumer operating the Web-enabled client subsystem, wherein the electronic store environment presents a plurality of products for purchase and sale by an EC-enabled payment method supported over the Internet.

Another object of the present invention is to provide such an Internet-based electronic commerce (EC) enabled shopping system, wherein a Java Applet tag, associated with each product, is embedded within at least one of the HTML-encoded documents displayed on the Web-enabled client subsystem, and each Java Applet tag is associated with a Java Applet encoded with the universal product number (UPN) assigned to one of the products, and, when the consumer selects one of the Java Applet tags, the associated Java Applet is automatically executed enabling a search to be conducted against a product information database hosted on an Internet database server connected to the Internet, from which the results of the UPN-specified search are automatically displayed in a GUI served to the Web-enabled client subsystem.

Another object of the present invention is to provide client-side and server CPIR-enabling Java Applets for enabling the consumer product information searches at virtually any consumer point of presence on the WWW by performing a single mouse-clicking operation.

Another object of the present invention is to provide a novel Internet-based system and method, wherein a plurality of publisher-operated client subsystems (i.e. manufacturer-operated client subsystems) are connected to a local or wide area TCP/IP-based network, for the purpose of enabling different departments within the publishing organization (e.g. advertising, world news, business, technology, sports, finance, education, arts and leisure, etc.) manage different types of UPN/TM/PD/URL links based on the type of information contained within the URL-specified information resource on the WWW.

Another object of the present invention is to provide a novel Internet-based system and method, wherein each publisher is provided with a computer-based publishing system, which enables the electronic layout of: (i) a Web-based publication (e.g. expressible in HTML or SGML code) having different content and advertising sections associated with each Web-page thereof and each such Web-page being located on the WWW at a particular URL; and (ii) a print-media based publication (e.g. expressible in a desired font) having different content sections and advertising sections associated with each printed-page thereof, wherein each such content section and advertising section is assigned a Universal Product Number (UPN) which is symbolically linked to a particular content or advertising section on the corresponding Web-page.

Another object of the present invention is to provide a novel Internet-based system and method, wherein the computer-based publishing subsystem is capable of automatically generating UPN/TM/PD/URL data link tables listing the URLs of each Web page symbolically linked to UPN assigned to a corresponding printed media page, and that such UPN/TM/PD/URL data link tables are transportable to a UPN/TM/PD/URL database management subsystem using electronic data interchange techniques, thereby enabling consumers (e.g. readers) to link from print-media to corresponding Web-based media using the UPNs printed on documents and the like only moments after the Web and print publications have been approved for publishing and sent to a http server and printing press, respectively.

Another object of the present invention is to provide a novel Internet-based consumer product information system and method for use in retail shopping environments, wherein each Web-enabled bar code driven consumer product information kiosk deployed therewithin embodies e-mail messaging capabilities which enable consumers to automatically save and link CPI-related Web documents as individual attachments to a preformatted e-mail message that is transmitted from a retailer-operated e-mail server, to a remote e-mail address specified by the consumer within the retail shopping environment.

Another object of the present invention is to provide a novel Internet-based consumer product information system and method for use in retail shopping environments, wherein each Web-enabled bar code driven consumer product information kiosk deployed therewithin embodies e-mail messaging capabilities which enable consumers to automatically save and record the URLs of CPI-related Web documents within the message field of a preformatted e-mail message that is transmitted from a retailer-operated e-mail server, to a remote e-mail address specified by the consumer within the retail shopping environment.

Another object of the present invention is to provide such novel Internet-based consumer product information system and method for use in retail shopping environments, wherein the e-mail envelope is addressed with the consumer/shopper s home, office or like e-mail address by either reading an e-mail address encoded within a bar code (or magnetic-stripe) structure or manually entering the same within the addressee field, and the stuffed e-mail envelope is transported to its destination by manual selection of a send button within the displayed e-mail envelope.

Another object of the present invention is to provide such a novel Internet-based consumer product information system and method, wherein one or more central e-mail servers are used to collect copies of e-mail documents (and records thereof) transmitted from the Web/e-mail enabled kiosks within each retail shopping environments, for consumer and demographic information analysis, compilation, and storage within RDBMSs that are made accessible to retailers and manufacturers alike for use in product marketing, sales forecasting, customer intelligence, and like operations which enable more effective marketing of consumer products and services in both physical and electronic forms of commerce.

Another object of the present invention is to provide each manufacturer with a novel consumer product information catalog subsystem (RDBMS) for storing and managing media-rich consumer product information content relating to each and every UPN-indexed product that the manufacturer makes, sells and/or distributes to retailers along the retail supply and demand chain.

Another object of the present invention is to provide a novel consumer product information catalog subsystem (RDBMS) which is realizable as a standalone database application supported on one or more client machines operably connected to the LAN or WAN of the manufacturer's enterprise, and or as a network database information server connected to the LAN or WAN and being accessible to various personnel working within the manufacturer's enterprise, and using Web-enabled client machines to carry out consumer product information content management operations across the enterprise, most likely under the supervision of one or more product marketing and/or brand managers, responsible for the marketing and branding of such consumer products.

Another object of the present invention is to provide a novel consumer product information catalog subsystem (RDBMS) for use within an Internet-based consumer product information management, distribution and serving system, wherein one or more computer programs (e.g. scripts) are provided in the RDBMS for the purpose of (i) analyzing the information fields of the RDBMS, (ii) automatically generate a set of UPN/Trademark/Product-Descriptor/URL data links for each UPN-indexed product with the RDBMS, (iii) locally store each such set of UPN/TM/PD/URL data links within the RDBMS, and (iv) ultimately electronically data transport each such set of data links to a UPN/TM/PD/URL RDBMS employed within a consumer product information management, distribution and serving system realized over the Internet.

Another object of the present invention is to provide brand managers with a novel set of consumer product information management tools that can be easily used within the manufacturer's enterprise in a way which provides the brand manager with the choice of either storing the URLs of consumer product related information, and also the actual information file content thereof if such multi-media information content is within the control of the manufacturer's operations, or copyable into the RDBMS under its supervision and control.

Another object of the present invention is to provide a novel method of and apparatus for managing UPN/TM/PD/URL data links within a manufacturer's enterprise, wherein the manufacturer's EDI-enabled UPN/TM/PD/URL RDBMS and/or the consumer product information catalog database management subsystem are configured between (i) a plurality of Web-enabled client machines operated within the manufacturer s enterprise by various departments, and (ii) a conventional manufacturer's EDI-enabled UPC-indexed Product Catalog running on a (possibly remotely-situated) computing platform deployed within a manufacturer's enterprise.

Another object of the present invention is to provide such a novel method and apparatus, wherein the manufacturer's EDI-enabled UPN/TM/PD/URL RDBMS is initialized by importing UPC numbers, trademarks and product-descriptors from the manufacturer's locally-maintained UPC-indexed product catalog deployed within the manufacturer's enterprise.

Another object of the present invention is to provide such a novel method and apparatus, wherein the conventional UPC-indexed product catalog functions as the "master" UPC catalog source within the manufacturer's enterprise, while the manufacturer's EDI-enabled UPN/TM/PD/URL RDBMS functions as a "slave" UPC catalog source within the enterprise, data-synchronized to the master UPC catalog source.

Another object of the present invention is to provide such a novel method and apparatus, wherein the manufacturer's EDI-enabled UPN/TM/PD/URL RDBMS is programmed to automatically (i) access the conventional UPC-indexed product catalog on periodic (e.g. daily) basis and (ii) import up-to-date (i.e. current) UPC numbers, trademarks and product-descriptors that are being used by the manufacturer within its UPC product catalog for enabling B-2-B e-commerce transactions with its retail trading partners.

Another object of the present invention is to provide such a novel method and apparatus, wherein such data-synchronization operations can be carried in a fully automatic, programmed manner over the Internet or particular VAN, regardless of where the manufacturer's EDI-enabled UPN/TM/PD/URL RDBMS and UPC-indexed product catalog resides on the network.

Another object of the present invention is to provide such a novel method and apparatus, wherein by using these imported UPC numbers, trademarks and product-descriptors, through the a above-described database-initialization and data-synchronization techniques of the present invention, the manufacturer's brand managers, product managers, advertising agents and support personnel can manage UPN/TM/PD/URL data links within the manufacturer's EDI-enabled UPN/TM/PD/URL RDBMS and transport the same to the centralized EDI-enabled UPN/TM/PD/URL RDBMS, in cooperation with pre-existing EDI-based B-2-B e-commerce support operations.

Another object of the present invention is to provide such a novel method and apparatus, wherein brand managers, product managers, advertising agents and support personnel can manage UPN/TM-indexed CPI data files within the manufacturer's consumer product information catalog database management subsystem and transport the same to a central UPN-indexed Data warehouse in accordance the principles of the present invention.

Another object of the present invention is to provide such novel methods of the database-initialization and synchronization, wherein the business-to-consumer (B-2-C) consumer product information management and distribution system of the present invention can be used in cooperation with conventional EDI-enabled B-2-B e-commerce transaction networks supported by conventional UPC product catalogs (e.g. the Keystone™ UPC Product Catalog by QRS, Inc. and the UPC Express™ UPC Product Catalog by GEIS), enabling marketing, brand and/or product managers, advertising agents and support personnel to practice the novel UPC/TM/PD/URL management techniques of the present invention without disrupting conventional UPC management operations performed by others within the manufacturer's enterprise in connection with enabling EDI-based B-2-B e-commerce transactions.

Another object of the present invention is to provide an integrated solution to the diverse problems encountered by manufacturers, retailers, e-retailers, the advertising and promotional agents thereof, and consumers along the demand-side of the retail chain.

Another object of the present invention is to provide a consumer product marketing, merchandising and education/information system which enables manufacturers, their agents, retailers and their agents, and consumers to carryout (i.e. perform) four (4) basic product-related functions along the retail supply and demand chain, namely: (1) enables manufacturer's marketing and brand managers to create a composite brand image for each consumer product being offered for sale in both physical and electronic marketplaces; (2) enables manufacturers and their advertising and marketing agents to display consumer product advertisements to consumers, at or near the point of purchase or sale within both physical and electronic retail shopping environments so as to project the desired brand image and positively influence product demand; (3) enables retailers and their marketing and promotional agents to promote consumer products with consumers within physical and electronic retail shopping environments in order to positively influence (i.e. reduce) the supply of such products in inventory and promote sales and profits; and (4) enables consumers to request and obtain reliable information about a manufacturer's consumer product in order to make informed/educated purchases along the demand side of the retail supply and demand chain, while enabling retailer purchasing agents to request and obtain reliable information about a manufacturer's consumer product in order to make informed/educated purchases along the supply side thereof in order to positively influence product demand.

Another object of the present invention is to provide an Internet-based consumer product marketing, merchandising and education/information system, wherein (i) a network of barcode-driven/touch-screen-enabled physical CPI kiosks are physically installed within a brick and mortar (B&M) type retail environments using wireless Internet-connectivity enabling technology, and accessible to millions of retail shoppers across the globe, and (ii) a network of virtual CPI kiosks are symbolically embedded within the HTML-fabric of the WWW (e.g. in EC-based retail stores and catalogs, on-line auction sites, Internet product advertisements, and made accessible to millions of retail shoppers across the Internet.

Another object of the present invention is to provide such an Internet-based consumer product marketing, merchandising and education/information system comprising a plurality of Web (http) information servers, wherein each physical CPI kiosk has a statically assigned IP address and an assigned domain name, and is assigned preferably to a single physical CPI kiosk installed in a retailer s store and graphically displaying a retailer-oriented WWW site at the assigned domain.

Another object of the present invention is to provide such an Internet-based consumer product marketing, merchandising and education/information system comprising a plurality of CPIR-enabling (e.g. JAVA) Applet servers, wherein each CPIR-enabling Applet server has a statically assigned IP address and is assigned to numerous physical CPIR-enabling Applet-driven virtual CPI kiosks deployed at retailer-oriented WWW sites served to physical CPI kiosks in the retailer's store, or otherwise on the WWW.

Another object of the present invention is to provide such an Internet-based consumer product marketing, merchandising and education/information system comprising a central UPN/TM/PD/URL RDBMS having a data processing/filtering subsystem for processing data contained within the UPN/TM/PD/URL RDBMS so that each physical CPI kiosk connected to an enabling Web server (and deployed within a particular retailer's store) is capable of displaying only UPN/TM/PD/URL links created by manufacturer's who (i) sell products in the retailer's physical store and (ii) have acquired rights and/or privileges (by the retailer) to display products on the retailer's store shelves about which the physical kiosk is physically installed.

Another object of the present invention is to provide such an Internet-based consumer product marketing, merchandising and education/information system, wherein a CPIR-enabling Applet/Servlet Generator automatically generates, for each UPN/TM/PD/URL link record in the UPN/TM/PD/URL RDBMS, a CPIR-enabling Applet/Servlet, wherein (i) the compiled code associated with the CPIR-enabling Applet/Servlet is loaded onto one of the plurality of CPIR-enabling Applet servers, and (ii) the corresponding CPIR-enabling Applet tag is loaded within a CPIR-enabling Applet Catalog Web Server for viewing and downloading by retailers, advertisers, auctioneers, et al.

Another object of the present invention is to provide such an Internet-based consumer product marketing, merchandising and education/information system, wherein a data processing/filtering subsystem (e.g. modules of data processing scripts), integrated with the UPN/TM/PD/URL RDBMS, processes data within the RDBMS so that each virtual CPI kiosk deployed within a particular retailer's electronic store and enabled by its Java Applet server is capable of displaying only UPN/TM/PD/URL links created by manufacturer's who (i) sell products in the retailer's electronic store (i.e. e-store) and (ii) have acquired rights and/or privileges (by the retailer) to display products on the retailer's virtual shelves (e.g. Web pages) about which the virtual kiosk is installed within the HTML fabric of the retailer's e-store.

Another object of the present invention is to provide an Internet-based consumer product marketing, merchandising and education/information system, wherein an Internet-Based CPI link, creation, management, transport and delivery subsystem enables the delivery of a suite of information services including, for example, the downloading of and providing technical support for software-based EDI-enabled UPN/TM/PD/URL link creation, management and transport tools that are made available to registered manufacturers, and their agents, as well as to anyone else operating along the retain chain as a vendor of consumer products (which may also include retailers as well). These software-based tools enable the manufacturer s marketing, brand and/or product managers (and their support personnel) to efficiently carry out UPN/TM/PD/URL data-linking and transport operations which are required to build and maintain a dynamic and robust manufacturer-managed UPN/TM/PD/URL link database essential to supporting and operating the other functionally-integrated subsystems in the system.

Another object of the present invention is to provide an Internet-based consumer product marketing, merchandising and education/information system, wherein UPN/TM/PD/URL links are data processed (i.e. filtered) in various ways prior to distribution so as to preserve the trust, confidence and good will developed between manufacturers and retailers in both physical and electronic streams of commerce, thus ensuring delivery of the highest possible level of service and value to consumers, retailers and manufacturers alike.

Another object of the present invention is to provide an Internet-based consumer product marketing, merchandising and education/information system, wherein such data filtering operations involve using information about (i) the manufacturers represented (or promoted) by a particular retailer in a particular retail environment, as well as (ii) the rights and/or privileges accorded to product manufacturers and/or distributors (i.e. vendors) by retailers with regard to displaying a manufacturer's product in, for example, a particular aisle of the retailer's store and perhaps even at a particular shelf location, as well as on a particular Web-page(s) of a retailer's electronic store or catalog (e.g. virtual aisles) and perhaps even at a particular location (i.e. virtual shelf location) therealong.

Another object of the present invention is to provide an Internet-based consumer product marketing, merchandising and education/information system, wherein an Internet-Based Consumer Product Related Information Link Creation, Management and Transport System enables a manufacturer's marketing, brand and/or managers to create and manage a list of UPN/TM/PD/URL links for each consumer product within their product portfolio, using UPN/TM/PD/URL link management software of the present invention, which enables link lists to be stored within a locally managed UPN/TM/PD/URL link RDBMS, and electronically transported to a centrally-locally UPN/TM/PD/URL link RDBMS, from which such link lists are displayed in the form of a UPN/TM/PD/URL link display GUI.

Another object of the present invention is to provide an Internet-based consumer product marketing, merchandising and education/information system, wherein an Internet-Based Consumer Product Advertisement Marketing, Programming, Management and Delivery System enables advertisers of manufacturers and retailers to buy randomly-allocated advertising slots on particular retailer-deployed physical barcode-driven CPI kiosks (and/or retailer-deployed virtual CPI kiosks) and deliver the short UPC-indexed (QuickTime® or Superstitial™ video) product advertisements to consumers over physical and/or virtual CPI kiosks in physical and/or electronic retail stores during moments when consumers are not requesting CPI from the System.

Another object of the present invention is to provide an Internet-based consumer product marketing, merchandising and education/information system, wherein an Internet-Based Consumer Product Advertisement Marketing, Programming, Management and Delivery System enables advertisers (e.g. employed by a particular manufacturer or retailer or working as an advertising agent therefor) to perform a number of functions, namely: (i) register with the system; (ii) log onto the Advertisement Slot Marketing/Sales/Management Web Site maintained by the system administrator or its designated agent; (iii) view catalogs of physical and/or virtual CPI kiosks deployed within retail shopping environments by retailers, at which a registered advertiser can consider purchasing advertisement slots on manufacturer/retailer authorized kiosks (e.g. at a price set by the user activity characteristics of the kiosk periodically measured by the http and/or Applet server enabling the same); (iv) purchase advertisement slots on manufacturer/retailer authorized physical or virtual) CPI kiosks deployed in physical or electronic retail shopping space; (v) create, deploy and manage advertising campaigns over one or more physical and/or virtual kiosks deployed by retailers in retail space; and (vi) monitor the performance of kiosk-based advertising campaigns during execution, as required by client demands and prevailing business considerations, using any Web-enabled client subsystem.

Another object of the present invention is to provide an Internet-based consumer product marketing, merchandising and education/information system, wherein an Internet-Based Consumer Product Promotion Marketing, Programming, Management and Delivery System enables the retailer (e.g. sales manager) to create customized "product promotion campaigns", containing short UPC-indexed (QuickTime® or Superstitial™ video) product advertisements, sales prices and aisle/shelf location directions, for presentation over the network of barcode-driven CPI kiosks deployed within its retail store, or chain of stores, and later analyze the effectiveness of the campaign by comparing sales data collected at the barcode driven point-of-sale (POS) stations within the same stores in which the participating CPI kiosks are deployed.

Another object of the present invention is to provide an Internet-based consumer product marketing, merchandising and education/information system, wherein an Internet-Based Consumer Product Promotion Marketing, Programming, Management and Delivery System enables promoters (e.g. employed by a particular retailer or manufacturer or working as an promotional agent therefor) to perform a number of functions, namely: (i) register with system; (ii) log onto the Promotion Slot Marketing/Sales/Management Web Site maintained by the system administrator or its designated agent; (iii) view catalogs of physical and/or virtual CPI kiosks deployed within retail shopping environments by retailers, at which a registered promoter can consider purchasing or otherwise acquiring promotion slots on manufacturer/retailer authorized kiosks (e.g. at a price set by the user activity characteristics of the kiosk periodically measured by the http and/or Applet server enabling the same); (iv) purchase or otherwise acquire (product sales) promotion slots on manufacturer/retailer authorized physical or virtual kiosks deployed in retail shopping space; (v) create, deploy and manage product promotion campaigns over one or more physical and/or virtual kiosks deployed by retailers (or manufacturers) in retail space; and (vi) monitor the performance of kiosk-based promotion campaigns as required by client demands and prevailing business considerations, using any Web-enabled client subsystem.

Another object of the present invention is to provide an Internet-based consumer product marketing, merchandising and education/information system, wherein EDI-enabled UPN/TM/PD/URL RDBMS software, is downloaded to each registered manufacturer and installed on a manufacturer-operated client machine within the manufacturer s enterprises, for the purpose of: (1) enabling a manufacturer marketing, brand and/or product managers and their agents (contributing to the brand-images of their products) to create UPN/TM/PD/URL links in connection with their consumer products; (2) enabling the manufacturer marketing, brand and/or product managers and their agents, to manage such brand-forming information links within a UPN/TM/PD/URL RDBMS locally-maintained within each manufacturer's enterprise; and (3) enabling the manufacturer marketing, brand and/or product managers and their agents to transport such locally-managed UPN/TM/PD/URL RDBMS to a centralized UPN/TM/PD/URL RDBMS for central management, processing and distribution in accordance with the principles of the present invention.

Another object of the present invention is to provide an Internet-based consumer product marketing, merchandising and education/information system, wherein such EDI-enabled UPN/TM/PD/URL RDBMS software enables the manufacturer to electronically transport data records in its locally-managed UPN/TM/PD/URL RDBMS to a centralized UPN/TM/PD/URL RDBMS so as to enable distribution of its UPN/TM/PD/URL links to: (i) consumers and end-users within physical retail environments having access to a plurality of physical CPI serving kiosks driven by a plurality of Web (http) servers operably connected to the infrastructure of the Internet; (ii) consumers and end-users within electronic retail environments having access to a plurality of virtual CPI serving kiosks driven by a plurality of CPIR-enabling Java Applet servers operably connected to the infrastructure of the Internet; and (iii) consumers and end-users interfaced with a plurality of Web-enabled client machines at home, school, in the office or on the road having access to a plurality of UPN-driven consumer product information portals on the WWW, driven by a plurality of mirrored http information servers operably connected to the infrastructure of the Internet.

Another object of the present invention is to provide an Internet-based consumer product marketing, merchandising and education/information system, wherein one or more Web information servers are provided for serving up to the public, in different languages, WWW sites at which the entire UPN/TM/PD/URL RDBMS is searchable by the public without the restriction of MIN and UPN data filters that are maintained within retail shopping environments to preserve the goodwill embodied within manufacturer and retailer relationships along the retail chain.

Another object of the present invention is to provide an Internet-based consumer product marketing, merchandising and education/information system, wherein a GPS-time synchronized WAP-enabled information server is provided for the purpose of delivering consumer product information links from the UPN/TM/PD/URL RDBMS to a GSU-enabled wireless Web-enabled palm computer carried by a consumer within a physical retail shopping space, when, for example, the palm computer is physically located within a particular portion of the physical retail shopping space.

Another object of the present invention is to provide an Internet-based consumer product marketing, merchandising and education/information system, wherein a CPIR-enabling Applet/Servlet Generator is used to automatically generate, for each UPN/TM/PD/URL link record in the UPN/TM/PD/URL RDBMS, a CPIR-enabling Applet/Servlet, wherein (i) the compiled code associated with the CPIR-enabling Applet/Servlet is loaded onto one of the plurality of CPIR-enabling Applet servers, and (ii) the corresponding CPIR-enabling Applet tag is loaded within a CPIR-enabling Applet Catalog Web Server for viewing and downloading by retailers, advertisers, auctioneers, et al.

Another object of the present invention is to provide an Internet-based consumer product marketing, merchandising and education/information system, wherein the URLs linked to each UPN/TM/PD/URL information record maintained in the UPN/TM/PD/URL RDBMS are organized for display to consumers in two different categories, namely: Pre-purchase Related CPI Links which inform and educate consumers while incrementally driving demand for the product; and Post-Purchase Related CPI Links which provide customers with product related service, instruction and technical support while promoting the retention of customers by such value-added services after the consumer purchase.

Another object of the present invention is to provide an Internet-based consumer product marketing, merchandising and education/information system, wherein the Consumer Product Related Information Link Creation, Management And Transport Subsystem comprises: a web-based manufacturer registration and UPN/TM/PD/URL link creation, management and transport server for (1) supporting manufacturer registration operations, (2) downloading UPN/TM/PD/URL link creation, management and EDI-enabled transport (LCMT) software described hereinabove to registered manufacturers, (3) installing and setting up such software within the manufacturer's enterprise, (4) selecting and customizing the GUI Design for the UPN/TM/PD/URL link display menu filled by the UPN/TM/PD/URL link creation, collection, management and EDI-enabled transport software (e.g. including Manufacturer Customization Options, Default CPI Categories for linked URLs, Custom CPI Categories for linked URLs), (5) On-Line Training for UPN/TM/PD/URL Link Creation, Collection, Management and Transport Software, (6) Updating Manufacturer Registration Information, (7) Registering Manufacturer s Product Advertising Agents, (8) Registering Manufacturers Product Promotional Agents; central UPN/TM/PD/URL RDBMS.

Another object of the present invention is to provide an Internet-based consumer product marketing, merchandising and education/information system, wherein one or more EDI information servers are operably connected to the Internet for receiving the structured files of a UPN/TM/PD/URL RDBMS locally managed within the manufacturer's enterprise using the UPN/TM/PD/URL link creation, collection, management and EDI-enabled transport software downloaded from information server, and each manufacturer-operated client subsystem in the system runs UPN/TM/PD/URL link creation, management and EDI-enabled transport (LCMT) software and enabling marketing, brand and product managers to create, manage and transport UPN/TM/PD/URL links to the central UPN/TM/PD/URL RDBMS.

Another object of the present invention is to provide an Internet-based consumer product marketing, merchandising and education/information system, wherein a web-based manufacturer registration and UPN/TM/PD/URL link creation, management and transport server thereof supports a number of modes of information service for manufacturers and their agents, namely: Registration of Manufacturer/Creation of Manufacturer Account; Log-in by Manufacturer; Download and Register UPN/TM/PD/URL Link Creation, Management and Transport (LCMT) Software; Installation and Set-up of UPN/TM/PD/URL Link Creation, Collection, Management and Transport Software within Manufacturer s Enterprise; Selection and Customizing the GUT Design for the UPN/TM/PD/URL link display menu filled by the UPN/TM/PD/URL LCMT software including Manufacturer Customization Options, i.e. Default CPI Categories for linked URLs and Custom CPI Categories for linked URLs; On-Line Training for UPN/TM/PD/URL LCMT Software; Update Manufacturer Registration Information; Registration of Manufacturer s Product Advertising Agents; and Registration of Manufacturer s Product Promotional Agents.

Another object of the present invention is to provide an Internet-based consumer product marketing, merchandising and education/information system, wherein the UPN/TM/PD/URL link creation, management and transport software running on each manufacturer-operated/managed client computer subsystem has a graphical user interface (GUI) which comprises a number of display structures namely: a window-style framework having a toolbar menu along the upper portion of the framework and an information display window centrally disposed within the framework and having horizontal and vertical scroll bars respectively, for moving into view the UPN/TM/PD/URL link information about a UPN-indexed product registered in its locally-managed UPN/TM/PD/URL; a User Default URL Link Categories button for enabling the user to create a prespecified set of URL link data fields, organizable into "pre-purchase" and "post-purchase" types, into which active URL links can be entered manually, semi-automatically or automatically using the various techniques described hereinabove; a Create Custom URL Link Categories button for enabling the user to create a custom-designed set of URL link fields, organizable into, pre-purchased and post-purchase types, into which active URL links can be entered manually or using the semi-automated techniques described hereinabove; a Create URL Link button for enabling the user to enter URLs into the URL link categories established within the local UPN/TM/PD/URL RDBMS under construction; Manage (i.e. Edit) URL Link button for enabling the user to edit URLs entered into the URL link categories established within the local UPN/TM/PD/URL RDBMS under construction or management; a Transport UPN/TM/PD/URL RDBMS button for enabling the user to manually or automatically initiate/activate the transport of the locally-managed UPN/TM/PD/URL RDBMS to the centrally maintained UPN/TM/PD/URL RDBMS using EDI (e.g. ftp, XML, conventional EDI, etc.) processes as taught in detail hereinabove; UPN/TM/PD/URL Link Record data field for displaying the UPN, trademarks, product descriptors, and URLs related to the consumer product assigned the UPN by the UPC manager of the manufacturer (or vendor); a UPN data field for displaying the UPN associated with a particular UPN/TM/PD/URL Link Record data field; a Trademark (i.e. brand name) data field for displaying the primary trademark associated with a particular UPN/TM/PD/URL Link Record data field; a Product Descriptor (PD) data field for displaying a generic product description or descriptor associated with a particular UPN/TM/PD/URL Link Record data field; a Pre-purchase URL Link Record for displaying a first plurality of Categorized URL Records, each Categorized URL Record containing a Pre-purchase Related URL Category Label and a URL string pointing to an information resource on the Internet, and associated with a particular UPN/TM/PD/URL Link Record data field; a Post-purchase URL Link Record for displaying a second plurality of Categorized URL Records, each Categorized URL Record containing a Post-purchase Related URL Category Label and a URL string pointing to an information resource on the Internet, and associated with a particular UPN/TM/PD/URL Link Record data field.

Another object of the present invention is to provide an Internet-based consumer product marketing, merchandising and education/information system, wherein the data displayed within the GUI is obtained from the data tables comprising the UPN/TM/PD/URL RDBMS, and the UPN, TM and PD data fields are automatically populated with data imported from a UPC management RDBMS for maintaining a UPC Product Sales Catalog, during data importation and synchronization operations.

Another object of the present invention is to provide an Internet-based consumer product marketing, merchandising and education/information system, wherein marketing, brand and product managers are provided with a wide range of choice in URL Link Category labeling, including a means for creating custom-designed URL Link Category labels, and means for producing a list of pre-designed Default URL Link Category label sets, each being specifically tailored to a particular segment and sector of the consumer product industry.

Another object of the present invention is to provide an Internet-based consumer product marketing, merchandising and education/information system, wherein each physical and/or virtual CPI kiosk is provided with a graphical user interface (GUI) for visually displaying UPN/TM/PD/URL link records accessed from the UPN/TM/PD/URL RDBMS, and wherein the kiosk GUI comprises a number of display structures namely: a scalable window-style framework having a toolbar menu along the upper portion of the framework and an information display window centrally disposed within the framework and having horizontal and vertical scroll bars, for displaying (i) UPN/TM/PD/URL link information about any UPN-indexed product registered in its locally-managed UPN/TM/PD/URL in response to a UPN-directed search against the central UPN/TM/PD/URL RDBMS, and (ii) a list of UPN/TM/PD links returned from a trademark (TM) directed search, product directed (PD) search, or manufacturer's home-page (MHP) directed search made against the central UPN/TM/PD/URL RDBMS; a UPN-Directed Search button for enabling the user to initiate a UPN-directed search against the central UPN/TM/PD/URL RDBMS; a TM-Directed Search button for enabling the user to initiate a TM-directed search against the central UPN/TM/PD/URL RDBMS; a PD-Directed Search button for enabling the user to initiate a PD-directed search against the central UPN/TM/PD/URL RDBMS; a MHP-Directed Search button for enabling the user to initiate a MHP-directed search against the central UPN/TM/PD/URL RDBMS; UPN data field for displaying the UPN associated with a particular UPN/TM/PD/URL Link Record data field retrieved from the central UPN/TM/PD/URL RDBMS; a First Trademark (i.e. brand name) data field for displaying the primary trademark associated with the particular UPN/TM/PD/URL Link Record data field; a Second Trademark (i.e. brand name) data field for displaying the secondary trademark associated with the particular UPN/TM/PD/URL Link Record data field; a Product Descriptor data field for displaying a generic product description or descriptor associated with the particular UPN/TM/PD/URL Link Record data field; a Pre-purchase URL Link Record for displaying a first plurality of Categorized URL Records, each Categorized URL Record containing a Pre-purchase Related URL Category Label and a URL string pointing to an information resource on the Internet, and associated with a particular UPN/TM/PD/URL Link Record data field; and a Post-purchase URL Link Record for displaying a second plurality of Categorized URL Records, each Categorized URL Record containing a Post-purchase Related URL Category Label and a URL string pointing to an information resource on the Internet, and associated with a particular UPN/TM/PD/URL Link Record data field.

Another object of the present invention is to provide an Internet-based consumer product marketing, merchandising and education/information system, wherein when the manufacturer (or vendor) has decided to use the predesigned Default URL Link Category labels for its UPN/TM/PD/URL link creation, management and transport GUI, then the physical and virtual kiosk GUIs used to display the manufacturer's (or vendor's) UPN/TM/PD/URL links to consumers will use the same predesigned Default URL Link Category labels to display URLs linked to the UPN/TM/PD/URL Link Records transported to the central UPN/TM/PD/URL RDBMS.

Another object of the present invention is to provide an Internet-based consumer product marketing, merchandising and education/information system, wherein when the manufacturer (or vendor) has decided to use Custom (manufacturer-created) URL Link Category labels for its UPN/TM/PD/URL link creation, management and transport GUI, during UPN/TM/PD/URL link creation, management and transport operations, then the physical and virtual kiosk GUIs used to display the manufacturer's (or vendor's) UPN/TM/PD/URL links to consumers will use the same custom-created URL Link Category labels to display URLs linked to particular UPN/TM/PD/URL Link Records.

Another object of the present invention is to provide an Internet-based consumer product marketing, merchandising and education/information system, wherein the Consumer Product Information Kiosk Configuration, Deployment, Management and Access Subsystem comprises: a web-based CPI kiosk ordering/configuration/deployment/management server for (1) supporting retailer (and e-retailer) and manufacturer registration operations, (2) updating and displaying the Kiosk Deployment Directory for the registered retailer or manufacturer, (3) enabling retailers to select and order physical and/or virtual kiosks for deployment, and manufacturers to select and order virtual kiosks for deployment by the manufacturer or others, (4) specifying the location of physical kiosk installation and deployment, and the domain of virtual kiosk installation and deployment, (5) selecting particular information services to be enabled on and delivered to ordered/deployed CPI kiosks in order to configure the same for its intended application, (6) selecting and customizing the kiosk GUI Design (as a further part of the kiosk configuration process), (7) registering the manufacturer s Aisle/Shelf Rights and Privileges on deployed CPI kiosks, (8) registering the retailer's (or manufacturer s) advertising agents as the case may be, (9) registering the retailer's (or manufacturer s) product promotional agents as the case may be, (10) monitoring the performance of registered retailer (or manufacturer) advertising agents as the case may be, and (11) monitoring the performance of registered retailer (or manufacturer) promotional agents as the case may be.

Another object of the present invention is to provide an Internet-based consumer product marketing, merchandising and education/information system, wherein the retailer may configure its physical CPI kiosk to have a graphical user interface (GUI) which displays a 2-D or 3-D computer graphics model for the aisle and shelf space disposed about the physical CPI kiosk and this computer graphics model is displayed through the physical kiosk GUI so that a consumer viewing the physical CPI kiosk, and the consumer products displayed thereabout, sees (on the touch-screen display screen of the kiosk) a virtual model of the surrounding aisle and shelf space and all of the brands of products displayed thereon.

Another object of the present invention is to provide such an Internet-based consumer product marketing, merchandising and education/information system, wherein each virtual product displayed through the GUI will carry its trademark (i.e. brand), and its location will spatially correspond to the location of its graphical image or icon with the virtual aisle/shelf model displayed on the physical kiosk.

Another object of the present invention is to provide such an Internet-based consumer product marketing, merchandising and education/information system, wherein using this physical CPI GUI, the consumer can access and display the UPN/TM/PD/URL link record associated with a particular consumer product by simply touching the graphical image or icon of a particular consumer product displayed on the touch-screen enabled physical CPI kiosk, and upon the display of the UPN/TM/PD/URL link record, the consumer can then select the URL links relating to types of information sought by the consumer.

Another object of the present invention is to provide such an Internet-based consumer product marketing, merchandising and education/information system, wherein the 2-D or 3-D computer graphics model of the physical shelf (and aisle) space about the physical CPI kiosk is created by the retailer or its agent using appropriate computer-graphic store aisle/shelf modeling software made accessible to the retailer or its agent by the system, and such computer graphic models are stored within the central UPN/TM/PD/URL RDBMS.

Another object of the present invention is to provide an Internet-based consumer product marketing, merchandising and education/information system, wherein manufacturer (i.e. vendor) aisle/shelf rights with respect to a particular physical CPI kiosk deployed in retail store are registered using either a portable wireless bar code symbol reader to read the UPC or UPC/EAN labels on consumer products located on the physical shelves and/or in the physical aisles surrounding the physical CPI kiosk, or using either a portable wireless optical character reader to read the UPC or UPC/EAN labels on consumer products located on the physical shelves and in the physical aisles surrounding the physical CPI kiosk.

Another object of the present invention is to provide such an Internet-based consumer product marketing, merchandising and education/information system, wherein the portable wireless bar code reader or optical character reader is RF-linked to any particular physical CPI kiosk (but preferably to the one being programmed with manufacturer aisle/shelf rights/privileges), or the LAN to which the kiosk is connected, and the manufacturer aisle/shelf right/privilege registration mode can be selected on the physical CPI kiosk to which the bar code symbol reader or optical character reader is linked during manufacturer aisle/shelf right registration operations.

Another object of the present invention is to provide an Internet-based consumer product marketing, merchandising and education/information system, wherein a UPC-directed method of registering manufacturer aisle/shelf rights/privileges is carried out by: (1) the retailer inducing the physical CPI kiosk into its Manufacturer Aisle/Shelf Rights/Privileges Registration Mode, in which the physical CPI kiosk is ready to be programmed with manufacturer identification numbers (MINs) against the physical CPI kiosk s identification number; and (2) the retailer reading the UPC symbol labels on different brands of consumer products on the shelves about the physical CPI kiosk, within and about the aisles thereof, so that such information can be transmitted back to the UPN/TM/PD/URL RDBMS for processing.

Another object of the present invention is to provide such an Internet-based consumer product marketing, merchandising and education/information system, wherein such bar code symbol reading operations can be carried out using: (1) ones eyes and then entering such information into the system by way of keyboard data entry operations; (2) a bar code symbol reader with memory which subsequently downloaded to the UPN/TM/PD/URL RDBMS; or (3) a bar code symbol reader RF-linked to the kiosk being programmed, or to a central wireless network controller with IP-connectivity to the LAN to which the interfaced physical CPI kiosk is connected.

Another object of the present invention is to provide an Internet-based consumer product marketing, merchandising and education/information system, wherein the inputted UPNs are analyzed and the MINs parsed out therefrom to determine a list of manufacturers having aisle/shelf rights to the particular physical kiosk, thereby providing the corresponding kiosk with retailer authorization to subsequently accept product advertisement and promotion spot orders for display to consumers during business hours. For manufacturers not having aisle/shelf rights/privileges to a particular physical CPI kiosk, such manufacturers and their advertising and promotional agents will not be permitted to place product advertisement and promotion spot orders to run on the particular kiosk being programmed, thereby respecting aisle/shelf rights/privileges granted to particular manufacturers by particular retailers as part of their business agreements.

Another object of the present invention is to provide an Internet-based consumer product marketing, merchandising and education/information system, wherein a TM-directed method of registering manufacturer aisle/shelf rights/privileges is carried out by: (1) the retailer inducing the physical CPI kiosk into its Manufacturer Aisle/Shelf Rights/Privileges Registration Mode so that the physical kiosk is ready to be programmed with manufacturer identification numbers (MINs) against the physical CPI kiosk s identification number; and (2) the retailer reads the trademark (or brand name) labels on different brands of consumer products on the shelves about the physical CPI kiosk, within and about the aisles thereof, and enters such information into the system (e.g. via virtual keyboard displayed on the kiosk GUI during this state of programming) so that such information can be transmitted back to the UPN/TM/PD/URL RDBMS for processing.

Another object of the present invention is to provide an Internet-based consumer product marketing, merchandising and education/information system, wherein such trademark reading operations can be carried out using: (1) one s eyes and then entering such information into the system by way of keyboard data entry operations; (2) an optical character reader with memory which subsequently downloaded to the UPN/TM/PD/URL RDBMS; or (3) an optical character reader RF-linked to the kiosk being programmed, or to a central wireless network controller with IP-connectivity to the LAN to which the interfaced physical CPI kiosk is connected.

Another object of the present invention is to provide an Internet-based consumer product marketing, merchandising and education/information system, wherein the inputted TMs are used to determine a list of manufacturers (identified by MIN) having aisle/shelf rights to the particular kiosk, thereby providing the corresponding physical kiosk with retailer authorization to subsequently accept product advertisement and promotion spot orders for display to consumers during business hours. For manufacturers not having aisle/shelf rights/privileges to a particular physical CPI kiosk, such manufacturers and their advertising and promotional agents will not be permitted to place product advertisement and promotion spot orders to run on the particular kiosk being programmed, thereby respecting aisle/shelf rights/privileges granted to particular manufacturers by particular retailers as part of their business agreements.

Another object of the present invention is to provide an Internet-based consumer product marketing, merchandising and education/information system, wherein the CPI kiosk ordering/configuration/deployment/management server supports a number of information services for manufacturers, namely: Registration of Manufacturer/Creation of Manufacturer Account; Log-in by Manufacturer; Update and Display of Manufacturer s Virtual CPI Kiosk Deployment Directory; Select and Order Virtual CPI Kiosks for Deployment; Specification of The Domain of Virtual Kiosk Installation and Deployment; Selection of Information Services Delivered by Deployed Virtual CPI Kiosks; Selection and Customization of CPI Design—Virtual Kiosk GUI Design; Registration of Manufacturer s Virtual Aisle/Shelf Rights and Privileges on Virtual CPI Kiosks; Registration of Manufacturer s Advertising Agents Registration of Manufacturer s Product Promotional Agents; Monitor Performance of Registered Manufacturer Advertising Agents; and Monitor Performance of Registered Manufacturer Promotional Agents.

Another object of the present invention is to provide such an Internet-based consumer product marketing, merchandising and education/information system, wherein once logged into the system, the manufacturer may view (i) a directory/catalog of the virtual UPN-restricted/product-specific CPI kiosks which are currently deployed on the WWW, as well as (ii) a directory of virtual UPN-restricted/product-specific CPI kiosks which may be deployed and installed on the WWW by others who download the enabling CPIR-enabling Applet tags from the CPIR-enabling Applet Tag Server, and embed the tags in the HTML-fabric of the WWW at domains where the virtual kiosks are to be installed.

Another object of the present invention is to provide an Internet-based consumer product marketing, merchandising and education/information system, wherein the manufacturer may choose to deploy multi-mode type virtual product-specific CPI kiosks to the general public so that advertisements and/or product promotions can be programmably displayed from the virtual kiosk when launched from its point of installation on the WWW. In such applications, CPIR-enabling Applet enabling the virtual kiosk may be designed to automatically launch at the time of displaying its host HTML document, thereby providing a kiosk GUI on which to display product advertisement and/or promotion spots about the manufacturer s product.

Another object of the present invention is to provide an Internet-based consumer product marketing, merchandising and education/information system, wherein the Consumer Product Related Advertisement Marketing, Programming, Management and Delivery Subsystem comprises: a web-based product advertisement marketing/sales (http) server for enabling the following services: (1) registering advertisers (e.g. agents of manufacturers and retailers) and the creating advertiser accounts: (2) logging into the subsystem as a registered advertiser; (3) displaying General Kiosk Advertising Directories and identifying CPI kiosks on which the advertiser is authorized to display advertisements on consumer products; (4) displaying Brand Kiosk Advertising Directories and identifying CPI kiosks on which the advertiser is authorized to display advertisements on a particular brand of consumer products; (5) registering Kiosk Advertising Campaigns to be displayed on a retailer-authorized (initially-unspecified) subnetwork of CPI kiosks; (6) building Kiosk Advertising Campaigns by placing advertisement spot orders to be run on a specified subnetwork of CPI kiosks; (10) running and displaying Kiosk Advertising Campaigns on the retailer-authorized subnetwork of CPI kiosks, (11) modifying Kiosk Advertising Campaigns, and (12) monitoring the performance of Kiosk Advertising Campaigns.

Another object of the present invention is to provide such an Internet-based consumer product marketing, merchandising and education/information system, wherein the Internet-Based Consumer Product Advertisement Marketing, Programming, Management And Delivery Subsystem supports a number of information services for advertisers, namely: Registration of Advertiser/Creation of Advertiser Account; Log-in by Advertiser; Display General Kiosk Advertising Directory Identifying CPI Kiosks on which the Advertiser is Authorized to Display Advertisements on Consumer Products; Display Brand Kiosk Advertising Directory Identifying CPI Kiosks on which the Advertiser is Authorized to Display Advertisements on a Particular Brand of Consumer Products; Register Kiosk Advertising Campaign to be displayed on a Retailer-Authorized Subnetwork of CPI Kiosks; Build Kiosk Advertising Campaign by Placing Ad spot Orders to be run on a Particular Subnetwork of CPI Kiosks; Run and Display Kiosk Advertising Campaign on Retailer-Authorized Subnetwork of CPI Kiosks; Modify Kiosk Advertising Campaign; and Monitor Performance of Kiosk Advertising Campaigns.

Another object of the present invention is to provide an Internet-based consumer product marketing, merchandising and education/information system, wherein once the registered advertiser logs into the subsystem, the advertiser may display and view two different kinds of directories, namely: a General-type Kiosk Advertising Directory which can be used to identify CPI Kiosks on which the advertiser is authorized by retailers to display advertisements on consumer products; and a Brand-type Kiosk Advertising Directory which can be used to identify CPI kiosks on which the advertiser is authorized by retailers to display advertisements on a particular brand of consumer products.

Another object of the present invention is to provide an Internet-based consumer product marketing, merchandising and education/information system, wherein the data processing methods used to generate a General Kiosk Advertising Directory from the data contained with the UPN/TM/PD/URL RDBMS comprises: (1) transmitting a general kiosk advertisement directory request to the Advertisement Slot Marketing/Sales/Management Web server; (2) receiving and parsing this directory request to determine the advertiser's identification number; (3) using the data tables of the UPN/TM/PD/URL RDBMS and the advertiser's identification number to determine the list of manufacturers (by their MINs) who have retained the identified advertiser as their agents; (4) determining, for each obtained MIN, the physical and virtual CPI kiosks on which the hosting retailers have authorized to place product advertisements; (5) using the ascertained MINs and manufacturer aisle/shelf rights/privileges recorded within the UPN/TM/PD/URL RDBMS to determine those physical and virtual CPI kiosks on which the advertiser may order advertisements about products of manufacturers who have been granted such rights/privileges, whereby this list of physical and virtual CPI kiosks is then compiled to produce the generalized kiosk advertisement directory for transmission to the requesting advertiser.

Another object of the present invention is to provide an Internet-based consumer product marketing, merchandising and education/information system, wherein the data processing methods used to generate a Brand Kiosk Advertising Directory from the data contained with the UPN/TM/PD/URL RDBMS comprises: (1) transmitting a brand kiosk advertisement directory request to the Advertisement Slot Marketing/Sales/Management Web server, said request including (i) the trademark(s)—brand name(s)—of products to be covered in the kiosk advertising directory, and the (ii) the advertiser's identification number; (2) receiving and parsing this directory request to determine the trademark(s) of products to be covered in the kiosk advertising directory, and also the advertiser's identification number; (3) using the data tables in the UPN/TM/PD/URL RDBMS and the advertiser's identification number to which consumer products carry such trademarks (i.e. brand names) and also the UPNs and MINs of the manufacturers of such trademarked (i.e. branded) products; (4) using the determined MINs to determine the list of physical and virtual CPI kiosks in which manufacturers identified by said MINs having aisle/shelf rights/privileges to display product advertisements; (5) using the list of ascertained CPI kiosks to compile the generalized kiosk advertisement directory for transmission to the requesting advertiser.

Another object of the present invention is to provide such an Internet-based consumer product marketing, merchandising and education/information system, wherein equipped with a kiosk advertising directory, the advertiser builds a kiosk advertising campaign by (1) placing an advertisement spot order to be run on a particular subnetwork of CPI kiosks indicated in the custom-displayed kiosk advertising directory; (2) creating suitable product advertisements (i.e. digital content); and (3) linking the created product advertisements to the advertisement spot order, within the UPN/TM/PD/URL RDBMS.

Another object of the present invention is to provide such an Internet-based consumer product marketing, merchandising and education/information system, wherein the system delivers the advertisement spots to consumers in retail environments through the use of multi-mode CPI kiosks by (1) loading the advertisement spot within the product advertising/promotion spot queue on a Web server; and (2) serving the advertisement spot from the product advertising/promotion spot queue, to the physical CPI kiosk indicated in the advertisement spot order being executed.

Another object of the present invention is to provide an Internet-based consumer product marketing, merchandising and education/information system, wherein the price of each randomly-allocated "product advertising/promotion slot" on a particular retailer CPI kiosk is based on several factors, such as for example: (1) the amount of "consumer-activity" (i.e. the number of consumer product information requests made/placed) at the particular kiosk over, for example, the preceding month or so, so that kiosks which are more frequently used to make consumer product information requests will have higher advertising fees associated with advertising slots maintained in its advertising queue; and (2) the number of product advertising campaigns created and scheduled to run (on a given day) within a particular retail store.

Another object of the present invention is to provide such an Internet-based consumer product marketing, merchandising and education/information system, wherein the system automatically issues advertising fee credits to the advertiser's accounts if and when a product advertisement spot, once displayed during a randomly-assigned/opened product advertisement/promotion slot is interrupted by a consumer requesting consumer product information (from the CPI kiosk) on a consumer product which is not related to the manufacturer of the product about which the advertisement is being displayed.

Another object of the present invention is to provide such an Internet-based consumer product marketing, merchandising and education/information system, wherein no advertising fee credits will be issued to the advertiser's account if and when a product advertisement, once displayed during a randomly-opened product advertising/promotion slot, is interrupted by a consumer requesting consumer product information (from the CPI kiosk) on a consumer product which is related to the manufacturer whose product advertisement is being displayed.

Another object of the present invention is to provide such an Internet-based consumer product marketing, merchandising and education/information system, wherein if the purchased product advertisement, loaded into a purchased product advertisement slot within a particular kiosk's "advertisement/promotion queue", is not displayed over the retailer's CPI kiosks when scheduled for display, then the price paid for the product advertisement is automatically refunded to the advertiser, or the scheduled product advertisement can be rescheduled by the advertiser for display on an alternative display date(s), in accordance with the advertiser's instructions.

Another object of the present invention is to provide such an Internet-based consumer product marketing, merchandising and education/information system, wherein once a kiosk advertising campaign has been ordered to run, the advertiser can enter the Modify Kiosk Advertising Campaign Mode of subsystem, wherein the advertiser is provided the opportunity to modify any one of its registered kiosk advertising campaigns, using a Web-enabled client computer subsystem.

Another object of the present invention is to provide such an Internet-based consumer product marketing, merchandising and education/information system, wherein once a kiosk advertising campaign has run or is running, the advertiser can enter the Monitor Kiosk Advertising Campaign Performance Mode of subsystem, and monitor the performance of any one of the advertiser's kiosk advertising campaigns, using a Web-based client computer.

Another object of the present invention is to provide an Internet-based consumer product marketing, merchandising and education/information system, wherein the Consumer Product Related Promotion Marketing, Programming and Delivery Subsystem comprises: a web-based product Kiosk Promotion Marketing/Sales/Management (http) server for (1) registering promoters and the creating promoter accounts, (2) logging into the subsystem by promoter, (3) displaying General Kiosk Promotion Directories and identifying CPI kiosks on which the promoter is authorized to display promotions on consumer products, (4) displaying Brand Kiosk Promotion Directories and identifying CPI kiosks on which the promoter is authorized to display promotions on a particular brand of consumer products, (5) registering Kiosk Promotion Campaigns to be displayed on an (initially-unspecified) retailer-authorized subnetwork of CPI kiosks, (6) building Kiosk Promotion Campaigns by placing promotion spot orders to be run on a specified subnetwork of CPI kiosks, (10) running and displaying kiosk promotion campaigns on the retailer-authorized subnetwork of CPI kiosks, (11) modifying kiosk promotion campaigns, and (12) monitoring the performance of kiosk promotion campaigns; central UPN/TM/PD/URL RDBMS.

Another object of the present invention is to provide an Internet-based consumer product marketing, merchandising and education/information system, wherein the Internet-Based Consumer Product Promotion Marketing, Programming, Management And Delivery Subsystem supports a number of information services for promoters, namely: Registration of Promoter/Creation of Promotion Account; Log-in by Promoter; Display General Kiosk Promotional Directory—Identifying CPI Kiosks on which the Promoter is Authorized to Display Promotions for Consumer Products; Display Brand Kiosk Promotional Director—Identifying CPI Kiosks on which the Promoter is Authorized to Display Promotions for a Particular Brand of Consumer Products; Register Kiosk Promotion Campaign to be displayed on a Retailer-Authorized Subnetwork of CPI Kiosks; Build Kiosk Promotion Campaign by Placing Promotional spot Orders to be run on a Particular Subnetwork of CPI Kiosks; Run and Display Kiosk Promotion Campaign on Retailer-Authorized Subnetwork of CPI Kiosks; Modify Kiosk Promotion Campaign; and Monitor Performance of Kiosk Promotion Campaign.

Another object of the present invention is to provide such an Internet-based consumer product marketing, merchandising and education/information system, wherein once logged-in the system, the promoter may display and view two different kinds of directories, namely: a General Kiosk Promotion Directory which can be used to identify CPI kiosks on which the promoter is authorized to display promotions on consumer products; and a Brand Kiosk Promotion Directory which can be used to identify CPI Kiosks on which the promoter is authorized to display promotions on a particular brand of consumer products.

Another object of the present invention is to provide such an Internet-based consumer product marketing, merchandising and education/information system, wherein the data processing method used to generate a General Kiosk Promotion Directory for a registered promoter, from the data contained with the UPN/TM/PD/URL RDBMS comprises: (1) transmitting a general kiosk promotion directory request to the promotion spot marketing/sales/management web server, in which the request includes the promoter s identification number; (2) receiving and parsing this directory request to determine the promoter's identification number; (3) using the data tables of the UPN/TM/PD/URL RDBMS and the promoter's identification number to determine the list of manufacturers (by their MINs) who have retained the identified promoter as their agents; (4) determining, for each obtained MIN, the physical and virtual CPI kiosks on which the hosting retailers have authorized to place product promotions; and (5) using the ascertained MINs and manufacturer aisle/shelf rights/privileges recorded within the UPN/TM/PD/URL RDBMS to determine those physical and virtual CPI kiosks on which the promoter may place promotions about products of manufacturers who have been granted such rights/privileges, whereby this list of physical and virtual CPI kiosks are then compiled to produce the generalized kiosk promotion directory for transmission to the requesting promoter.

Another object of the present invention is to provide such an Internet-based consumer product marketing, merchandising and education/information system, wherein the data processing method used to generate a Brand Kiosk Promotion Directory for a registered promoter, from the data contained with the UPN/TM/PD/URL RDBMS comprises: (1) transmitting a brand kiosk promotion directory request to the promotion spot marketing/sales/management web (http) server, in which the request includes (i) the trademark(s)—brand name(s)—of products to be covered in the kiosk promotion directory, and the (ii) the promoter's identification number; (2) receiving and parsing this directory request to determine the trademark(s) of products to be covered in the kiosk promotion directory, and also the promotion identification number; (3) using the data tables in the UPN/TM/PD/URL RDBMS and the promotion identification number to which consumer products carry such trademarks (i.e. brand names) and also the UPNs and MINs of the manufacturers of such trademarked (i.e. branded) products; (4) using the determined MINs to determine the list of physical and virtual CPI kiosks in which manufacturers identified by said MINs having aisle/shelf rights/privileges to display product promotions; and (5) using the list of ascertained physical and virtual CPI kiosks to compile the generalized kiosk promotion directory for transmission to the requesting promoter, whereby this list of physical and virtual CPI kiosks are then compiled to produce the brand kiosk promotion directory for transmission to the requesting promoter.

Another object of the present invention is to provide such an Internet-based consumer product marketing, merchandising and education/information system, wherein equipped with a kiosk advertising directory, the advertiser builds a kiosk advertising campaign by (1) placing an advertisement spot order to be run on a particular subnetwork of CPI kiosks indicated in the custom-displayed kiosk advertising directory; (2) creating suitable product advertisements (i.e. digital content); and (3) linking the created product advertisements to the advertisement spot order, within the UPN/TM/PD/URL RDBMS.

Another object of the present invention is to provide such an Internet-based consumer product marketing, merchandising and education/information system, wherein the system delivers the promotion spots to consumers in retail environments through the use of multi-mode CPI kiosks by (1) loading the promotion spot within the product advertising/promotion spot queue on a Web server; and (2) serving the promotion spot from the product advertising/promotion spot queue, to the physical CPI kiosk indicated in the promotion spot order being executed.

Another object of the present invention is to provide such an Internet-based consumer product marketing, merchandising and education/information system, wherein equipped with a kiosk advertising directory, the advertiser builds a kiosk advertising campaign by (1) placing an advertisement spot order to be run on a particular subnetwork of CPI kiosks indicated in the custom-displayed kiosk advertising directory; (2) creating suitable product advertisements (i.e. digital content); and (3) linking the created product advertisements to the advertisement spot order, within the UPN/TM/PD/URL RDBMS.

Another object of the present invention is to provide such an Internet-based consumer product marketing, merchandising and education/information system, wherein the system delivers the advertisement spots to consumers in retail environments through the use of multi-mode CPI kiosks by (1)

loading the advertisement spot within the product advertising/promotion spot queue on a Web server; and (2) serving the advertisement spot from the product advertising/promotion spot queue, to the physical CPI kiosk indicated in the advertisement spot order being executed.

Another object of the present invention is to provide an Internet-based consumer product marketing, merchandising and education/information system, wherein the price of each randomly-allocated “product advertising/promotion slot” on a particular retailer CPI kiosk is based on several factors, such as for example: (1) the amount of “consumer-activity” (i.e. the number of consumer product information requests made/placed) at the particular kiosk over, for example, the preceding month or so, so that kiosks which are more frequently used to make consumer product information request will have higher advertising fees associated with advertising slots maintained in its advertising queue; and (2) the number of product advertising campaigns created and scheduled to run (on a given day) within a particular retail store.

Another object of the present invention is to provide such an Internet-based consumer product marketing, merchandising and education/information system, wherein the system automatically issues advertising fee credits to the advertiser’s accounts if and when a product advertisement spot, once displayed during a randomly-assigned/opened product advertisement/promotion slot is interrupted by a consumer requesting consumer product information (from the CPI kiosk) on a consumer product which is not related to the manufacturer of the product about which the advertisement is being displayed.

Another object of the present invention is to provide such an Internet-based consumer product marketing, merchandising and education/information system, wherein no advertising fee credits will be issued to the advertiser’s account if and when a product advertisement, once displayed during a randomly-opened product advertising/promotion slot, is interrupted by a consumer requesting consumer product information (from the CPI kiosk) on a consumer product which is related to the manufacturer whose product advertisement is being displayed.

Another object of the present invention is to provide such an Internet-based consumer product marketing, merchandising and education/information system, wherein if the purchased product advertisement, loaded into a purchased product advertisement slot within a particular kiosk’s “advertisement/promotion spot queue”, is not displayed over the retailer’s CPI kiosks when scheduled for display, then the price paid for the product advertisement is automatically refunded to the advertiser, or the scheduled product advertisement can be rescheduled by the advertiser for display on an alternative display date(s), in accordance with the advertiser’s instructions.

Another object of the present invention is to provide such an Internet-based consumer product marketing, merchandising and education/information system, wherein once a kiosk advertising campaign has been ordered to run, the advertiser can enter the Modify Kiosk Advertising Campaign Mode of subsystem, wherein the advertiser is provided the opportunity to modify any one of its registered kiosk advertising campaigns, using a Web-enabled client computer subsystem.

Another object of the present invention is to provide such an Internet-based consumer product marketing, merchandising and education/information system, wherein once a kiosk promotion campaign has run or is running, the promoter can enter the Monitor Kiosk Promotion Campaign Performance Mode of subsystem, and monitor the performance of any one of the promoter s kiosk promotion campaigns, using a Web-based client computer.

Another object of the present invention is to provide an Internet-based consumer product marketing, merchandising and education/information system, wherein the price of each randomly-allocated “product advertising/promotion slot” on a particular retailer CPI kiosk is based on several factors, such as for example: (1) the amount of “consumer-activity” (i.e. the number of consumer product information requests made/placed) at the particular kiosk over, for example, the preceding month or so, so that kiosks which are more frequently used to make consumer product information request will have higher promotion fees associated with promotion slots maintained in its promotion queue; and (2) the number of product promotion campaigns created and scheduled to run (on a given day) within a particular retail store.

Another object of the present invention is to provide such an Internet-based consumer product marketing, merchandising and education/information system, wherein the system automatically issues promotion fee credits to the promoter s account if and when a product promotion spot, once displayed during a randomly-assigned/opened product advertisement/promotion slot is interrupted by a consumer requesting consumer product information (from the CPI kiosk) on a consumer product which is not related to the manufacturer of the product about which the promotion is being displayed.

Another object of the present invention is to provide such an Internet-based consumer product marketing, merchandising and education/information system, wherein no promotion fee credits will be issued to the promoter s account if and when a product promotion, once displayed during a randomly-opened product advertising/promotion slot, is interrupted by a consumer requesting consumer product information (from the CPI kiosk) on a consumer product which is related to the manufacturer whose product promotion is being displayed.

Another object of the present invention is to provide such an Internet-based consumer a product marketing, merchandising and education/information system, wherein if the purchased product promotion, loaded into a purchased product promotion slot within a particular kiosk’s “advertisement/promotion queue”, is not displayed over the retailer’s CPI kiosks when scheduled for display, then the price paid for the product promotion is automatically refunded to the promoter, or the scheduled product promotion can be rescheduled by the promoter for display on an alternative display date(s), in accordance with the promoter s instructions.

Another object of the present invention is to provide such an Internet-based consumer product marketing, merchandising and education/information system, wherein once a kiosk promotion campaign has been ordered to run, the promoter can enter the Modify Kiosk Promotion Campaign Mode of subsystem, wherein the promoter is provided the opportunity to modify any one of its registered kiosk promotion campaigns, using a Web-enabled client computer subsystem.

Another object of the present invention is to provide such an Internet-based consumer product marketing, merchandising and education/information system, wherein once a kiosk promotion campaign has run or is running, the promoter can enter the Monitor Kiosk Promotion Campaign Performance Mode of subsystem, and monitor the performance of any one of the promoter s kiosk promotion campaigns, using a Web-based client computer.

Another object of the present invention is to provide an Internet-based consumer product marketing, merchandising and education/information system, wherein when a consumer establishes contact with a physical “multi-mode” CPI kiosk hereof in a retailer’s physical shopping environment, the consumer might be shown either: (1) a product advertisement ordered by the manufacturer of the product sold in the retailer's store, the advertising agent of the manufacturer, the retailer, or the retailer's advertising agent; or (2) a product promotion ordered by the retailer, the retailer's promotional agent, the manufacturer of the promoted product sold in the retailer's store, or the manufacturer's promotional agent. However, in either case, the consumer can automatically interrupt the product advertisement or promotion by (i) scanning the UPC label on a consumer product using the physical kiosk's integrated bar code scanner, (ii) clicking on the CPI Request "button" on the physical kiosk's GUI, or (iii) touching the integrated touch-screen display panel of the physical CPI kiosk.

Another object of the present invention is to provide an Internet-based consumer product marketing, merchandising and education/information system, wherein when a consumer establishes contact with a virtual "multi-mode" CPI kiosk hereof displayed in a virtual retail shopping environment, the consumer might be shown either: (1) a product advertisement ordered by the manufacturer of the product sold in the retailer's store, the advertising agent of the manufacturer, the retailer, or the retailer's advertising agent; or (2) a product promotion ordered by the retailer, the retailer's promotional agent, the manufacturer of the promoted product sold in the retailer's store, or the manufacturer's promotional agent. In either case, however, the consumer can automatically interrupt the product advertisement or promotion by (i) clicking on the product advertisement or promotion, or (ii) clicking on the CPI Request "button" on the virtual kiosk's GUI.

Another object of the present invention is to provide an Internet-based consumer product marketing, merchandising and education/information system, wherein a manufacturer's marketing, brand and/or product managers can project a coherent brand image of their products to consumers worldwide, substantially independent of the level of knowledge and skill of the retailers, advertising agents and promotional agents of the manufacturer. This translates to value to all those participating on the demand side of the retail chain.

Another object of the present invention is to provide an Internet-based consumer product marketing, merchandising and education/information system, wherein each CPI kiosk deployed therein has three primary modes of display operation, namely: a CPI Display Mode; Advertisement Spot Display Mode; and Promotion Spot Display Mode.

Another object of the present invention is to provide an Internet-based consumer product marketing, merchandising and education/information system, wherein a plurality of LCD panel based CPI kiosks are embedded within or supported upon the store shelving structures employed in retail stores, and each said CPI kiosk is configured and deployed as a multi-mode CPI kiosk.

Another object of the present invention is to provide such an Internet-based consumer product marketing, merchandising and education/information system, wherein during its Advertisement Spot Display Mode of operation, purchased advertisement spots, which have been loaded in the physical CPI kiosk's advertisement/promotion spot queue, are automatically displayed in the information display frame of the physical kiosk GUI during the kiosk s quiescent moments of operation (i.e. when consumers are not making CPI requests with the kiosk).

Another object of the present invention is to provide such an Internet-based consumer product marketing, merchandising and education/information system, wherein during its Promotion Spot Display Mode of operation, purchased promotion spots, which have been loaded into the physical CPI kiosk's advertisement/promotion spot queue, are automatically displayed in the information display frame of the physical kiosk GUI during the kiosk s quiescent moments of operation (i.e. when consumer are not making CPI requests). At any instant in time, either an advertisement spot or promotion spot can be displayed within the information display frame of the kiosk GUI. In accordance with the principles of the present invention, the advertisement or promotion spot displayed on a particular retail multi-mode kiosk will be related to a product or product brand by a manufacturer who has been granted aisle/shelf rights/privileges by the retailer, thereby acquiring the right/privilege to display, or have displayed (by its agents), advertisements and/or promotions relating to the manufacturer s (i.e. vendor s) products.

Another object of the present invention is to provide such an Internet-based consumer product marketing, merchandising and education/information system, wherein any of the following conditions at the CPI kiosk can terminate the currently active Advertisement Spot Display Mode or the Promotion Spot Display Mode: touching the touch-screen display screen within its information display frame, within which the advertisement or promotion is displayed; manually selecting a search mode selection button displayed in the horizontal control frame; or reading a bar code symbol label on a consumer product.

Another object of the present invention is to provide an Internet-based consumer product marketing, merchandising and education/information system, wherein a plurality of LCD panel based CPI kiosks are embedded within or supported upon the store shelving structures employed in retail stores, and each said CPI kiosk is configured and deployed as a multi-mode CPI kiosk, and the operation of each multi-mode CPI kiosk can be summarized by the following rules of operation: (1) if a consumer touches the information display frame on the touch-screen (i.e. interactive) GUI, then the multi-mode CPI kiosk will automatically display a GUI, enabling the consumer to conduct a CPI search against the UPN/TM/PD/URL RDBMS; if a consumer manually selects any search mode selection button displayed in the control frame of the GUI, then the multi-mode CPI kiosk will automatically display a corresponding search display screen in the information display frame (e.g. to enable a UPN-directed search, a TM-directed search, or a PD-directed search, or home-page(HP) directed-search, as a the case may be); if a consumer touches the (retail) sponsor frame at the top of the kiosk GUI, then the CPI kiosk will automatically display (within the information display frame) the home-page of the kiosk-hosting retailer, or some other preprogrammed; and if the a consumer reads a (UPC or UPC/EAN) bar code symbol label on a consumer product using the bar code symbol reader integrated within the CPI kiosk, then the CPI kiosk will automatically display a UPN/TM/PD/URL link menu within the information display frame, having an interactive display format; and if the CPI kiosk does not experience any consumer input within a predetermined time period (e.g. 30-45 seconds), then the CPI kiosk will automatically display (in its information display frame) the next product advertisement or promotion spot loaded within the advertisement/promotion spot queue of the Web server driving the CPI kiosk.

Another object of the present invention is to provide an Internet-Based Consumer Product Related Information Link Creation, Management and Transport System enables a manufacturer's marketing, brand and/or managers to create and manage a list of UPN/TM/PD/URL links for each consumer product within their product portfolio, using UPN/TM/PD/URL link management software of the present invention, wherein link lists are stored within a locally managed UPN/TM/PD/URL link RDBMS, and electronically transported to a centrally-locally UPN/TM/PD/URL link RDBMS, from which such link lists are displayed in the form of a UPN/TM/PD/URL link display GUI.

Another object of the present invention is to provide an Internet-Based Consumer Product Advertisement Marketing, Programming, Management and Delivery System enables advertisers of manufacturers and retailers to buy randomly-allocated advertising slots on particular retailer-deployed physical barcode-driven CPI kiosks (and/or retailer-deployed virtual CPI kiosks) and deliver the short UPC-indexed (QuickTime® or Superstitial™ video) product advertisements to consumers over physical and/or virtual CPI kiosks in physical and/or electronic retail stores during moments when consumers are not requesting CPI from the System.

Another object of the present invention is to provide an Internet-Based Consumer Product Advertisement Marketing, Programming, Management and Delivery System enables advertisers (e.g. employed by a particular manufacturer or retailer or working as an advertising agent therefor) to perform a number of functions, namely: (i) register with the system; (ii) log onto the Advertisement Slot Marketing/Sales/Management Web Site maintained by the system administrator or its designated agent; (iii) view catalogs of physical and/or virtual CPI kiosks deployed within retail shopping environments by retailers, at which a registered advertiser can consider purchasing advertisement slots on manufacturer/retailer authorized kiosks (e.g. at a price set by the user activity characteristics of the kiosk periodically measured by the http and/or Applet server enabling the same); (iv) purchase advertisement slots on manufacturer/retailer authorized physical or virtual) CPI kiosks deployed in physical or electronic retail shopping space; (v) create, deploy and manage advertising campaigns over one or more physical and/or virtual kiosks deployed by retailers in retail space; and (vi) monitor the performance of kiosk-based advertising campaigns during execution, as required by client demands and prevailing business considerations, using any Web-enabled client subsystem.

Another object of the present invention is to provide an Internet-Based Consumer Product Promotion Marketing, Programming, Management and Delivery System enables the retailer (e.g. sales manager) to create customized "product promotion campaigns", containing short UPC-indexed (QuickTime® or Superstitial™ video) product advertisements, sales prices and aisle/shelf location directions, for presentation over the network of barcode-driven CPI kiosks deployed within its retail store, or chain of stores, and later analyze the effectiveness of the campaign by comparing sales data collected at the barcode driven point-of-sale (POS) stations within the same stores in which the participating CPI kiosks are deployed.

Another object of the present invention is to provide an Internet-Based Consumer Product Promotion Marketing, Programming, Management and Delivery System which enables promoters (e.g. employed by a particular retailer or manufacturer or working as an promotional agent therefor) to perform a number of functions, namely: (i) register with system; (ii) log onto the Promotion Slot Marketing/Sales/Management Web Site maintained by the system administrator or its designated agent; (iii) view catalogs of physical and/or virtual CPI kiosks deployed within retail shopping environments by retailers, at which a registered promoter can consider purchasing or otherwise acquiring promotion slots on manufacturer/retailer authorized kiosks (e.g. at a price set by the user activity characteristics of the kiosk periodically measured by the http and/or Applet server enabling the same); (iv) purchase or otherwise acquire (product sales) promotion slots on manufacturer/retailer authorized physical or virtual kiosks deployed in retail shopping space; (v) create, deploy and manage product promotion campaigns over one or more physical and/or virtual kiosks deployed by retailers (or manufacturers) in retail space; and (vi) monitor the performance of kiosk-based promotion campaigns as required by client demands and prevailing business considerations, using any Web-enabled client subsystem.

Another object of the present invention is to provide EDI-enabled UPN/TM/PD/URL RDBMS software, which is downloaded to each registered manufacturer and installable on a manufacturer-operated client machine within the manufacturer s enterprises, for the purpose of: (1) enabling a manufacturer marketing, brand and/or product managers and their agents (contributing to the brand-images of their products) to create UPN/TM/PD/URL links in connection with their consumer products; (2) enabling the manufacturer marketing, brand and/or product managers and their agents, to manage such brand-forming information links within a UPN/TM/PD/URL RDBMS locally-maintained within each manufacturer's enterprise; and (3) enabling the manufacturer marketing, brand and/or product managers and their agents to transport such locally-managed UPN/TM/PD/URL RDBMS to a centralized UPN/TM/PD/URL RDBMS for central management, processing and distribution in accordance with the principles of the present invention.

Another object of the present invention is to provide EDI-enabled UPN/TM/PD/URL RDBMS software which enables the manufacturer to electronically transport data records in its locally-managed UPN/TM/PD/URL RDBMS to a centralized UPN/TM/PD/URL RDBMS so as to enable distribution of its UPN/TM/PD/URL links to: (i) consumers and end-users within physical retail environments having access to a plurality of physical CPI serving kiosks driven by a plurality of Web (http) servers operably connected to the infrastructure of the Internet; (ii) consumers and end-users within electronic retail environments having access to a plurality of virtual CPI serving kiosks driven by a plurality of CPIR-enabling Java Applet servers operably connected to the infrastructure of the Internet; and (iii) consumers and end-users interfaced with a plurality of Web-enabled client machines at home, school, in the office or on the road having access to a plurality of UPN-driven consumer product information portals on the WWW, driven by a plurality of mirrored http information servers operably connected to the infrastructure of the Internet.

Another object of the present invention is to provide an Internet-based consumer product marketing, merchandising and education/information system, wherein one or more Web information servers are provided for serving up to the public, in different languages, WWW sites at which the entire UPN/TM/PD/URL RDBMS is searchable by the public without the restriction of MIN and UPN data filters that are maintained within retail shopping environments to preserve the goodwill embodied within manufacturer and retailer relationships along the retail chain.

Another object of the present invention is to provide a GPS-time synchronized WAP-enabled information server for the purpose of delivering consumer product information links from an UPN/TM/PD/URL RDBMS to a GSU-enabled wireless Web-enabled palm computer carried by a consumer within a physical retail shopping space, when, for example, the palm computer is physically located within a particular portion of the physical retail shopping space.

Another object of the present invention is to provide a CPIR-enabling Applet/Servlet Generator which is used to automatically generate a CPIR-enabling Applet/Servlet for each UPN/TM/PD/URL link record in an UPN/TM/PD/URL RDBMS, wherein (i) the compiled code associated with the CPIR-enabling Applet/Servlet is loaded onto one of the plurality of CPIR-enabling Applet servers, and (ii) the corresponding CPIR-enabling Applet tag is loaded within a CPIR-enabling Applet Catalog Web Server for viewing and downloading by retailers, advertisers, auctioneers, et al.

Another object of the present invention is to provide an Internet-based consumer product information system, wherein the URLs linked to each UPN/TM/PD/URL information record maintained in the UPN/TM/PD/URL RDBMS is organized for display to consumers in two different categories, namely: Pre-purchase Related CPI Links which inform and educate consumers while incrementally driving demand for the product; and Post-Purchase Related CPI Links which provide customers with product related service, instruction and technical support while promoting the retention of customers by such value-added services after the consumer purchase.

Another object of the present invention is to provide a Consumer Product Related Information Link Creation, Management And Transport Subsystem which comprises a central UPN/TM/PD/URL RDBMS, and a web-based manufacturer registration and UPN/TM/PD/URL link creation, management and transport (LCMT) server for (1) supporting manufacturer registration operations, (2) downloading UPN/TM/PD/URL link creation, management and EDI-enabled transport (LCMT) software described hereinabove to registered manufacturers, (3) installing and setting up such software within the manufacturer's enterprise, (4) selecting and customizing the GUI Design for the UPN/TM/PD/URL link display menu filled by the UPN/TM/PD/URL link creation, collection, management and EDI-enabled transport software (e.g. including Manufacturer Customization Options, Default CPI Categories for linked URLs, Custom CPI Categories for linked URLs), (5) On-Line Training for UPN/TM/PD/URL Link Creation, Collection, Management and Transport Software, (6) Updating Manufacturer Registration Information, (7) Registering Manufacturer s Product Advertising Agents, (8) Registering Manufacturer s Product Promotional Agents.

Another object of the present invention is to provide UPN/TM/PD/URL link creation, management and transport software for operation on a manufacturer-operated/managed client computer subsystem, and providing a graphical user interface (GUI) which comprises a number of display structures namely: a window-style framework having a toolbar menu along the upper portion of the framework and an information display window centrally disposed within the framework and having horizontal and vertical scroll bars respectively, for moving into view the UPN/TM/PD/URL link information about a UPN-indexed product registered in its locally-managed UPN/TM/PD/URL; a Use Default URL Link Categories button for enabling the user to create a pre-specified set of URL link data fields, organizable into "pre-purchase" and "post-purchase" types, into which active URL links can be entered manually, semi-automatically or automatically using the various techniques described hereinabove.

Another object of the present invention is to provide an UPN/TM/PD/URL RDBMS, wherein the UPN, TM and PD data fields are automatically populated with data imported from a UPC management RDBMS for maintaining a UPC Product Sales Catalog, during data importation and synchronization operations.

Another object of the present invention is to provide a graphical user interface (GUI) for either a physical and/or virtual CPI kiosk capable of visually displaying UPN/TM/PD/URL link records accessed from an UPN/TM/PD/URL RDBMS, and wherein the kiosk GUI comprises a number of display structures namely: a scalable window-style framework having a toolbar menu along the upper portion of the framework and an information display window centrally disposed within the framework and having horizontal and vertical scroll bars, for displaying (i) UPN/TM/PD/URL link information about any UPN-indexed product registered in its locally-managed UPN/TM/PD/URL in response to a UPN-directed search against the central UPN/TM/PD/URL RDBMS, and (ii) a list of UPN/TM/PD links returned from a trademark (TM) directed search, or product directed (PD) search, made against the central UPN/TM/PD/URL RDBMS; a UPN-Directed Search button for enabling the user to initiate a UPN-directed search against the central UPN/TM/PD/URL RDBMS; a TM-Directed Search button for enabling the user to initiate a TM-directed search against the central UPN/TM/PD/URL RDBMS; a PD-Directed Search button for enabling the user to initiate a PD-directed search against the central UPN/TM/PD/URL RDBMS; UPN data field for displaying the UPN associated with a particular UPN/TM/PD/URL Link Record data field retrieved from the central UPN/TM/PD/URL RDBMS; a First Trademark (i.e. brand name) data field for displaying the primary trademark associated with the particular UPN/TM/PD/URL Link Record data field; a Product Descriptor data field for displaying a generic product description or descriptor associated with the particular UPN/TM/PD/URL Link Record data field; a Pre-purchase URL Link Record for displaying a first plurality of Categorized URL Records, each Categorized URL Record containing a Pre-purchase Related URL Category Label and a URL string pointing to an information resource on the Internet, and associated with a particular UPN/TM/PD/URL Link Record data field; and a Post-purchase URL Link Record for displaying a second plurality of Categorized URL Records, each Categorized URL Record containing a Post-purchase Related URL Category Label and a URL string pointing to an information resource on the Internet, and associated with a particular UPN/TM/PD/URL Link Record data field.

Another object of the present invention is to provide a physical CPI kiosk having a kiosk graphical user interface (GUI) which displays a 2-D or 3-D computer graphics model of the aisle and shelf space disposed about the physical CPI kiosk and this computer graphics model is displayed through the kiosk GUI so that a consumer viewing the physical CPI kiosk, and the consumer products displayed thereabout, sees (on the touch-screen display screen of the kiosk) a virtual model of the surrounding aisle and shelf space and all of the brands of products displayed thereon.

Another object of the present invention is to provide such a physical CPI kiosk, wherein each virtual product displayed through the kiosk GUI will carry its trademark (i.e. brand), and its location will spatially correspond to the location of its graphical image or icon with the virtual aisle/shelf model displayed on the physical kiosk.

Another object of the present invention is to provide such a physical CPI kiosk GUI, wherein the consumer can access and display the UPN/TM/PD/URL link record associated with a particular consumer product by simply touching the graphical image or icon of a particular consumer product displayed on the touch-screen enabled physical CPI kiosk, and upon the display of the UPN/TM/PD/URL link record, the consumer can then select the URL links relating to types of information sought by the consumer.

Another object of the present invention is to provide a UPN-directed method of and system for registering manufacturer (i.e. vendor) aisle/shelf rights with respect to a particular physical CPI kiosk deployed in retail store using either a portable wireless bar code symbol reader to read the UPC or UPC/EAN labels on consumer products located on the physical shelves and/or in the physical aisles surrounding the physical CPI kiosk, or using either a portable wireless optical character reader to read the UPC or UPC/EAN labels on consumer products located on the physical shelves and in the physical aisles surrounding the physical CPI kiosk.

Another object of the present invention is to provide such a method of and system for registering manufacturer (i.e. vendor) aisle/shelf rights, wherein inputted UPNs are analyzed and the MINs parsed out therefrom to determine a list of manufacturers having aisle/shelf rights to the particular physical kiosk, thereby providing the corresponding kiosk with retailer authorization to subsequently accept product advertisement and promotion spot orders for display to consumers during the business hours. For manufacturers not having aisle/shelf rights/privileges to a particular physical CPI kiosk, such manufacturers and their advertising and promotional agents will not be permitted to place product advertisement and promotion spot orders to run on the particular kiosk being programmed, thereby respecting aisle/shelf rights/privileges granted to particular manufacturers by particular retailers as part of their business agreements.

Another object of the present invention is to provide a TM-directed method of and system for registering manufacturer aisle/shelf rights/privileges comprising: (1) inducing a physical CPI kiosk into its Manufacturer Aisle/Shelf Rights/Privileges Registration Mode so that the physical kiosk is ready to be programmed with manufacturer identification numbers (MINs) against the physical CPI kiosk s identification number; and (2) reading the trademark (or brand name) labels on different brands of consumer products on the shelves about the physical CPI kiosk, within and about the aisles thereof, and enters such information into the system (e.g. via virtual keyboard displayed on the kiosk GUI during this state of programming) so that such information can be transmitted back to the UPN/TM/PD/URL RDBMS for processing.

Another object of the present invention is to provide such a method of and system for registering manufacturer aisle/shelf rights/privileges with regard to a physical CPI kiosk, wherein the inputted TMs are used to determine a list of manufacturers (identified by MIN) having aisle/shelf rights to the particular kiosk, thereby providing the corresponding physical kiosk with retailer authorization to subsequently accept product advertisement and promotion spot orders for display to consumers during the business hours. For manufacturers not having aisle/shelf rights/privileges to a particular physical CPI kiosk, such manufacturers and their advertising and promotional agents will not be permitted to place product advertisement and promotion spot orders to run on the particular kiosk being programmed, thereby respecting aisle/shelf rights/privileges granted to particular manufacturers by particular retailers as part of their business agreements.

Another object of the present invention is to provide a method of and system for generating a directory/catalog of virtual UPN-restricted/product-specific CPI kiosks which may be deployed and installed on the WWW by others who download CPIR-enabling Applet tags from a CPIR-enabling Applet Tag Library Server, and embed the tags in the HTML-fabric of the WWW at domains where the virtual kiosks are to be installed.

Another object of the present invention is to provide a method of and system for enabling a manufacturer to deploy multi-mode type virtual product-specific kiosks to the general public so that advertisements and/or product promotions can be programmably displayed from the virtual kiosk when launched from its point of installation on the WWW. In such applications, the CPIR-enabling Applet enabling the virtual kiosk may be designed to automatically launch at the time of displaying its host HTML document, thereby providing a kiosk GUI on which to display product advertisement and/or promotion spots about the manufacturer s product.

Another object of the present invention is to provide a method of and system for generating a General-type Kiosk Advertising Directory which can be used by an advertiser to identify CPI kiosks on which the advertiser is authorized by retailers to display advertisements on consumer products.

Another object of the present invention is to provide a method of and system for generating a Brand-type Kiosk Advertising Directory which can be used by an advertiser to identify CPI kiosks on which the advertiser is authorized by retailers to display advertisements on a particular brand of consumer products.

Another object of the present invention is to provide a method of generating a General Kiosk Advertising Directory from data contained with an UPN/TM/PD/URL RDBMS, comprising the steps: (1) transmitting a general kiosk advertisement directory request to the Advertisement Slot Marketing/Sales/Management Web server; (2) receiving and parsing this directory request to determine the advertiser's identification number; (3) using the data tables of the UPN/TM/PD/URL RDBMS and the advertiser's identification number to determine the list of manufacturers (by their MINs) who have retained the identified advertiser as their agents; (4) determining, for each obtained MIN, the physical and virtual CPI kiosks on which the hosting retailers have authorized to place product advertisements; and (5) using the ascertained MINs and manufacturer aisle/shelf rights/privileges recorded within the UPN/TM/PD/URL RDBMS to determine those physical and virtual CPI kiosks on which the advertiser may order advertisements about products of manufacturers who have been granted such rights/privileges, whereby this list of physical and virtual CPI kiosks is then compiled to produce the generalized kiosk advertisement directory for transmission to the requesting advertiser.

Another object of the present invention is to provide a method of generating a Brand Kiosk Advertising Directory from data contained with an UPN/TM/PD/URL RDBMS, comprising the steps: (1) transmitting a brand kiosk advertisement directory request to the Advertisement Slot Marketing/Sales/Management Web server, said request including (i) the trademark(s)—brand name(s)—of products to be covered in the kiosk advertising directory, and the (ii) the advertiser's identification number; (2) receiving and parsing this directory request to determine the trademark(s) of products to be covered in the kiosk advertising directory, and also the advertiser's identification number; (3) using the data tables in the UPN/TM/PD/URL RDBMS and the advertiser's identification number to which consumer products carry such trademarks (i.e. brand names) and also the UPNs and MINs of the manufacturers of such trademarked (i.e. branded) products; (4) using the determined MINs to determine the list of physical and virtual CPI kiosks in which manufacturers identified by said MINs having aisle/shelf rights/privileges to display product advertisements; and (5) using the list of ascertained CPI kiosks to compile the generalized kiosk advertisement directory for transmission to the requesting advertiser.

Another object of the present invention is to provide an Internet-based consumer product marketing system, wherein equipped with a kiosk advertising directory, an advertiser builds a kiosk advertising campaign by (1) placing an advertisement spot order to be run on a particular subnetwork of CPI kiosks indicated in the custom-displayed kiosk advertising directory; (2) creating suitable product advertisements (i.e. digital content); and (3) linking the created product advertisements to the advertisement spot order, within the UPN/TM/PD/URL RDBMS.

Another object of the present invention is to provide such an Internet-based consumer product marketing system, wherein the system delivers the advertisement spots to consumers in retail environments through the use of multi-mode CPI kiosks by (1) loading the advertisement spot within the product advertising/promotion spot queue on a Web server; and (2) serving the advertisement spot from the product advertising/promotion spot queue, to the physical CPI kiosk indicated in the advertisement spot order being executed.

Another object of the present invention is to provide an Internet-based consumer product marketing system, wherein the price of each "product advertising/promotion slot" on a particular retailer CPI kiosk is based on several factors, such as for example: (1) the amount of "consumer-activity" (i.e. the number of consumer product information requests made/placed) at the particular kiosk over, for example, the preceding month or so, so that kiosks which are more frequently used to make consumer product information request will have higher advertising fees associated with advertising slots maintained in its advertising queue; and (2) the number of product advertising campaigns created and scheduled to run (on a given day) within a particular retail store.

Another object of the present invention is to provide such an Internet-based consumer product marketing system, wherein the system automatically issues advertising fee credits to the advertiser's accounts if and when a product advertisement spot, once displayed during a randomly-assigned/opened product advertisement/promotion slot is interrupted by a consumer requesting consumer product information (from the CPI kiosk) on a consumer product which is not related to the manufacturer of the product about which the advertisement is being displayed.

Another object of the present invention is to provide such an Internet-based consumer product marketing system, wherein no advertising fee credits will be issued to the advertiser's account if and when a product advertisement, once displayed during a randomly-opened product advertising/promotion slot, is interrupted by a consumer requesting consumer product information (from the CPI kiosk) on a consumer product which is related to the manufacturer whose product advertisement is being displayed.

Another object of the present invention is to provide such an Internet-based consumer product marketing system, wherein if the purchased product advertisement, loaded into a purchased product advertisement slot within a particular kiosk's "advertisement/promotion queue", is not displayed over the retailer's CPI kiosks when scheduled for display, then the price paid for the product advertisement is automatically refunded to the advertiser, or the scheduled product advertisement can be rescheduled by the advertiser for display on an alternative display date(s), in accordance with the advertiser's instructions.

Another object of the present invention is to provide such an Internet-based consumer product marketing system, wherein once a kiosk advertising campaign has been ordered to run, the advertiser can enter the Modify Kiosk Advertising Campaign Mode of subsystem, wherein the advertiser is provided the opportunity to modify any one of its registered kiosk advertising campaigns, using a Web-enabled client computer subsystem.

Another object of the present invention is to provide such an Internet-based consumer product marketing system, wherein once a kiosk advertising campaign has run or is running, the advertiser can enter the Monitor Kiosk Advertising Campaign Performance Mode of subsystem, and monitor the performance of any one of the advertiser's kiosk advertising campaigns, using a Web-based client computer.

Another object of the present invention is to provide an Internet-based consumer product merchandising system, wherein the promoter may display and view two different kinds of directories, namely: a General Kiosk Promotion Directory which can be used to identify CPI kiosks on which the promoter is authorized to display promotions on consumer products; and a Brand Kiosk Promotion Directory which can be used to identify CPI Kiosks on which the promoter is authorized to display promotions on a particular brand of consumer products.

Another object of the present invention is to provide a method of generating a General Kiosk Promotion Directory for a registered promoter, from data contained with an UPN/TM/PD/URL RDBMS, comprising comprises: (1) transmitting a general kiosk promotion directory request to the promotion spot marketing/sales/management web server, in which the request includes the promoter s identification number; (2) receiving and parsing this directory request to determine the promoter's identification number; (3) using the data tables of the UPN/TM/PD/URL RDBMS and the promoter's identification number to determine the list of manufacturers (by their MINs) who have retained the identified promoter as their agents; (4) determining, for each obtained MIN, the physical and virtual CPI kiosks on which the hosting retailers have been authorized to place product promotions; and (5) using the ascertained MINs and manufacturer aisle/shelf rights/privileges recorded within the UPN/TM/PD/URL RDBMS to determine those physical and virtual CPI kiosks on which the promoter may place promotions about products of manufacturers who have been granted such rights/privileges, whereby this list of physical and virtual CPI kiosks are then compiled to produce the generalized kiosk promotion directory for transmission to the requesting advertiser.

Another object of the present invention is to provide a method of generating a Brand Kiosk Promotion Directory for a registered promoter, from data contained with an UPN/TM/PD/URL RDBMS, comprising: (1) transmitting a brand kiosk promotion directory request to the promotion spot marketing/sales/management web (http) server, in which the request includes (i) the trademark(s)—brand name(s)—of products to be covered in the kiosk promotion directory, and the (ii) the promoter's identification number; (2) receiving and parsing this directory request to determine the trademark(s) of products to be covered in the kiosk promotion directory, and also the promotion identification number; (3) using the data tables in the UPN/TM/PD/URL RDBMS and the promotion identification number to which consumer products carry such trademarks (i.e. brand names) and also the UPNs and MINs of the manufacturers of such trademarked (i.e. branded) products; (4) using the determined MINs to determine the list of physical and virtual CPI kiosks in which manufacturers identified by said MINs having aisle/shelf rights/privileges to display product promotions; and (5) using the list of ascertained physical and virtual CPI kiosks to compile the generalized kiosk promotion directory for transmission to the requesting promoter, whereby this list of physical and virtual CPI kiosks are then compiled to produce the brand kiosk promotion directory for transmission to the requesting advertiser.

Another object of the present invention is to provide an Internet-based consumer product merchandising system, wherein equipped with a kiosk advertising directory, the advertiser builds a kiosk advertising campaign by (1) placing an advertisement spot order to be run on a particular subnetwork of CPI kiosks indicated in the custom-displayed kiosk advertising directory; (2) creating suitable product advertisements (i.e. digital content); and (3) linking the created product advertisements to the advertisement spot order, within the UPN/TM/PD/URL RDBMS.

Another object of the present invention is to provide such an Internet-based consumer product merchandising system, wherein the system delivers the promotion spots to consumers in retail environments through the use of multi-mode CPI kiosks by (1) loading the prom spot within the product advertising/promotion spot queue on a Web server; and (2) serving the promotion spot from the product advertising/promotion spot queue, to the physical CPI kiosk indicated in the promotion spot order being executed.

Another object of the present invention is to provide such an Internet-based consumer product merchandising system, wherein equipped with a kiosk advertising directory, the advertiser builds a kiosk advertising campaign by (1) placing an advertisement spot order to be run on a particular subnetwork of CPI kiosks indicated in the custom-displayed kiosk advertising directory; (2) creating suitable product advertisements (i.e. digital content); and (3) linking the created product advertisements to the advertisement spot order, within the UPN/TM/PD/URL RDBMS.

Another object of the present invention is to provide such an Internet-based consumer product merchandising system, wherein the system delivers the advertisement spots to consumers in retail environments through the use of multi-mode CPI kiosks by (1) loading the advertisement spot within the product advertising/promotion spot queue on a Web server; and (2) serving the advertisement spot from the product advertising/promotion spot queue, to the physical CPI kiosk indicated in the advertisement spot order being executed.

Another object of the present invention is to provide an Internet-based consumer product marketing and merchandising system, wherein the price of each "product advertising/promotion slot" on a particular retailer CPI kiosk is based on several factors, such as for example: (1) the amount of "consumer-activity" (i.e. the number of consumer product information requests made/placed) at the particular kiosk over, for example, the preceding month or so, so that kiosks which are more frequently used to make consumer product information request will have higher advertising fees associated with advertising slots maintained in its advertising queue; and (2) the number of product advertising campaigns created and scheduled to run (on a given day) within a particular retail store.

Another object of the present invention is to provide such an Internet-based consumer product marketing and merchandising system, wherein the system automatically issues advertising fee credits to the advertiser's accounts if and when a product advertisement spot, once displayed during a randomly-assigned/opened product advertisement/promotion slot is interrupted by a consumer requesting consumer product information (from the CPI kiosk) on a consumer product which is not related to the manufacturer of the product about which the advertisement is being displayed.

Another object of the present invention is to provide such an Internet-based consumer product marketing and merchandising system, wherein no advertising fee credits will be issued to the advertiser's account if and when a product advertisement, once displayed during a randomly-opened product advertising/promotion slot, is interrupted by a consumer requesting consumer product information (from the CPI kiosk) on a consumer product which is related to the manufacturer whose product advertisement is being displayed.

Another object of the present invention is to provide such an Internet-based consumer product marketing and merchandising system, wherein if the purchased product advertisement, loaded into a purchased product advertisement slot within a particular kiosk's "advertisement/promotion spot queue", is not displayed over the retailer's CPI kiosks when scheduled for display, then the price paid for the product advertisement is automatically refunded to the advertiser, or the scheduled product advertisement can be rescheduled by the advertiser for display on an alternative display date(s), in accordance with the advertiser's instructions.

Another object of the present invention is to provide such an Internet-based consumer product marketing and merchandising system, wherein once a kiosk advertising campaign has been ordered to run, the advertiser can enter the Modify Kiosk Advertising Campaign Mode of subsystem, wherein the advertiser is provided the opportunity to modify any one of its registered kiosk advertising campaigns, using a Web-enabled client computer subsystem.

Another object of the present invention is to provide such an Internet-based consumer product marketing and merchandising system, wherein once a kiosk promotion campaign has run or is running, the promoter can enter the Monitor Kiosk Promotion Campaign Performance Mode of subsystem, and monitor the performance of any one of the promoter s kiosk promotion campaigns, using a Web-based client computer.

Another object of the present invention is to provide a retail interior structure, wherein a plurality of LCD panel based CPI kiosks are embedded within or supported upon the store shelving structures employed in a retail store environment, and each said CPI kiosk is configured and deployed as a multi-mode CPI kiosk, and the operation of each multi-mode CPI kiosk can be summarized by the following rules of operation: (1) if a consumer touches the information display frame on the touch-screen (i.e. interactive) GUI, then the multi-mode CPI kiosk will automatically display a GUI, enabling the consumer to conduct a CPI search against an UPN/TM/PD/URL RDBMS; if a consumer manually selects any search mode selection button displayed in the control frame of the kiosk GUI, then the multi-mode CPI kiosk will automatically display a corresponding search display screen in the information display frame (e.g. to enable a UPN-directed search, a TM-directed search, or a PD-directed search, as a the case may be); if a consumer touches the (retail) sponsor frame at the top of the kiosk GUI, then the CPI kiosk will automatically display (within the information display frame) the home-page of the kiosk-hosting retailer, or some other pre-programmed information resource; and if the a consumer reads a bar code symbol product label (UPC or UPC/EAN) on a consumer product using the bar code symbol reader integrated within the CPI kiosk, then the CPI kiosk will automatically display a UPN/TM/PD/URL link menu within the information display frame, having an interactive display format; and if the CPI kiosk does not experience any consumer input within a predetermined time period (e.g. 30-45 seconds), then the CPI kiosk will automatically display (in its information display frame) the next product advertisement or promotion spot loaded within the advertisement/promotion spot queue of the Web server driving the CPI kiosk.

These and other objects of the present invention will become apparent hereinafter and in the Claims to Invention

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, briefly described below.

FIG. 1 is a schematic diagram illustrating the various information subsystems provided by the consumer product related information collection, transmission and delivery system of invention along the consumer-product demand chain, namely an Internet-based Product-Information (IPI) Finding and Serving Subsystem, a UPC-based Product-Information Subsystem (UPC Catalog), an Electronic Trading Information Subsystem, a Sales Analysis and Forecasting Information Subsystem, Collaborative Replenishment Information Subsystem, and a Transportation and Logistics Information Subsystem.

FIGS. 2-1 and 2-2 show a schematic diagram of the consumer-product information collection, transmission and delivery system of the illustrative embodiment hereof shown embedded with the infrastructure of the global computer communications network known as the Internet, and comprising a plurality of data-synchronized Internet Product Directory (IPD) Servers connected to the infrastructure of the Internet, a UPN/TM/PD/URL Relational Database Management Subsystem (i.e. UPN/TM/PD/URL RDBMS) 9 connected to one or more of the IPD Servers and one or more globally-extensive electronic data interchange (EDI) networks, a Web-based Document Server connected to at least one of the IPD Servers and the Internet infrastructure, a Web-based Document Administration Computer connected to the Web-based Document Server by way of a TCP/IP connection, a plurality of manufacturer-related electronic-commerce (EC) information servers for hosting EC-enabled stores or EC-enabled on-line catalogs of manufacturers, a plurality of retailer-related electronic-commerce (EC) information servers for hosting EC-enabled stores or EC-enabled on-line catalogs of retailers, a plurality of Internet Product-Information (IPI) Servers connected to the infrastructure of the Internet for serving consumer-product related information to consumers in retail stores and at home, a central e-mail RDBMS for receiving and storing copies of e-mail transmissions from retailer-store based kiosks to e-mail addresses of consumer accessing consumer product information therewith in retail shopping environments, a plurality of Client Subsystems connected to the infrastructure of the Internet and allowing manufacturers to transmit consumer-product related information to the Web-based Document Server for collection and retransmission to the IPD Servers, and a plurality of Client Subsystems connected to the infrastructure of the Internet and allowing consumers in retail stores and at home to request and receive consumer-product related information from the IPD Servers.

FIG. 2A is a schematic diagram illustrating the flow of information along the consumer-product supply and demand chain, including (i) the communication link extending between the information subsystems of manufacturers of UPC-encoded products and the centralized (or master) UPN/TM/PD/URL RDBMS of the consumer-product information collection, transmission and delivery system of the present invention, (ii) the communication link extending between the UPN/TM/PD/URL RDBMS and the IPD Servers of the present invention, (iii) the communication link extending between the IPD Servers and in-store Client Subsystems of retailers, (iv) the communication link extending between the IPI Servers and the in-store Client Subsystems of retailers, (v) the communication link extending between the IPD Servers and the Client Subsystems of consumers, (vi) the communication link extending between the IPI Servers and the Client Subsystems of consumers, and (vii) the communication link extending between the UPN/TM/PD/URL RDBMS for providing consumer product catalog services to retailer purchasing agents and others and enabling the on-line purchase of consumer products between trading partners (e.g. manufactures and retailers) using EDI (or XML/EDI) based business-to-business electronic commerce transactions.

FIG. 2A' is a schematic diagram illustrating the flow of information along the consumer-product supply and demand chain, similar to that shown in FIG. 2A, except that as shown in FIG. 2A', each manufacturer transmits to the UPN/TM/PD/URL RDBMS (realized as a massive data warehouse) one or more information resource files (IRFs) which are symbolically linked to particular UPN-encoded product, and that each IRF is then stored as a Web-based document on an Internet information server at predesignated URL, symbolically linked to the UPN, so that consumers can use the UPN to access a menu of URLs symbolically linked thereto for display of the corresponding Web-documents;

FIG. 2B1 is a block schematic diagram of the IPD Server of the first illustrative embodiment, showing its subsystem components namely a RDBMS server and a Java Web Server with Java servlet support, being accessed by a Java-enabled client machine seeking to access consumer product related information from the RDBMS server using server-side Java Applets whose HTML tags are embedded within HTML-encoded documents served to the client machine from any one of a number of potential http information servers on the Internet.

FIG. 2B2 is a block schematic diagram of the IPD Server of the second illustrative embodiment, showing its subsystem components namely a RDBMS server and a Java Web Server with CGI script support, being accessed by a Java-enabled client machine seeking to access consumer product related information from the RDBMS server using client-side Java Applets whose HTML tags are embedded within HTML-encoded documents served to the client machine from any one of a number of potential http information servers on the Internet.

FIG. 2B3 is a block schematic diagram of the IPD Server of the third illustrative embodiment, showing its subsystem components, namely: a RDBMS server and a Java Web Server being accessed by a Java-enabled client machine seeking to access consumer product related information from the RDBMS server using (i) a socket connection between the client machine and the Java Web server and (ii) client-side Java Applets whose HTML tags are embedded within HTML-encoded documents served to the client machine from any one of a number of potential http information servers on the Internet.

FIG. 2B4 is a block schematic diagram of the IPD Server of the fourth illustrative embodiment, showing its subsystem components, namely: a RDBMS server and a Java Web Server being accessed by a Java-enabled client machine seeking to access consumer product related information from the RDBMS server using (i) a Remote Method of Invocation (RMI) and (ii) client-side Java Applets whose HTML tags are embedded within HTML-encoded documents served to the client machine from any one of a number of potential http information servers on the Internet.

FIG. 2C is a schematic representation of a portion of the system shown in FIGS. 2-1 and 2-2, wherein a plurality of manufacturer-operated client subsystems are shown connected to a local or wide area IP-based network, preferably maintained behind a secure corporate firewall, and the secured manufacturer information network is connected to the infrastructure of the Internet by way of an Internet router and server, for the purpose of enabling different departments within a business organization (e.g. marketing, sales, engineering, support and service, advertising, finance, etc.) manage different types of multi-media consumer product related information, as well as the Universal-Product-Number/trademark/product-descriptor/Universal-Resource-Locator (UPN/TM/PD/URL) links based on the type of information contained within UPN-indexed information resources on the WWW.

FIG. 2C1 is a schematic representation of the GUI of an exemplary computer operating system (OS), on which the UPN/TM/PD/URL data linking function of the present invention is schematically depicted showing a GUI-based window associated with a content-creating application (e.g. Netscape Navigator browsing program), a GUI-based window associated with a UPN/TM/PD/URL link management application (e.g., Microsoft Access or SQL RDBMS program), and the UPN/TM/PD/URL data link GUI displaying the UPN/TM/PD/URL data links between Web documents and a set of UPN-encoded consumer products being managed within the UPN/TM/PD/URL link management application.

FIG. 2C2 is a schematic representation showing the manufacturer's EDI-enabled UPN/TM/PD/URL of the present invention and the consumer product information catalog database management subsystem of the present invention configured between (i) a plurality of Web-enabled client machines operated within the manufacturer s enterprise by various departments as shown in FIG. 2C, and (ii) a conventional manufacturer's EDI-enabled UPC-indexed Product Sales Price Information Catalog (e.g. UPC+5.0 management software by Barcode World, Inc. or UPC Manager software by Inter Coastal Data Corporation) deployed within a manufacturer's enterprise for supporting conventional EDI-enabled business-to-business (B2B) applications between the manufacturer and its various retail trading partners through a conventional EDI-enabled B-2-B trading network (e.g. the QRS Network by QRS, Inc., or the GEIS Network by General Electric Information Services, Inc.).

FIG. 2C3 is a schematic representation of an exemplary graphical user interface (GUI) which is presented to the marketing and brand managers of a manufacturer by the UPN/TM/PD/URL link management software program of the present invention, for the purpose of enabling such marketing personnel to create a "brand-image projecting" consumer product information (CPI) menu for each product in its product portfolio, ultimately for display to consumers and end-users alike by way of physical and/or virtual kiosks deployed within the system of the present invention, wherein each CPI menu contains (i) the Universal Product Number (UPN) uniquely assigned to the corresponding consumer product by the manufacturer, (ii) the trademark(s) used in connection with the marketing of the consumer product, (iii) a generic product description for the consumer product, and (iv) a collection URLs, arranged according to pre-purchase and post-purchases data-types, pointing to diverse types of consumer product related information resources published on the Internet, providing useful information about the consumer product and contributing to the overall brand image thereof which the manufacturer and its agents labor to create in the marketplace through their marketing programs.

FIG. 2D is a schematic representation of a portion of the system shown in FIGS. 2-1 and 2-2, wherein a plurality of publisher-operated client subsystems (i.e. manufacturer-operated client subsystems) are shown connected to a local or wide area IP-based network, preferably maintained behind a secure corporate firewall, and the secured manufacturer information network is connected to the infrastructure of the Internet by way of an Internet router and server, for the purpose of enabling different departments within the publishing organization (e.g. advertising, world news, business, technology, sports, finance, education, arts and leisure, etc.) manage different types of UPN/TM/PD/URL links based on the type of information contained within the URL-specified information resource on the WWW.

FIG. 2E1 is a schematic representation of the split-screen GUI associated with the computer-based publishing software program of the present invention operated in its composition/editorial mode, and having integrated UPN/TM/PD/URL data linking functionalities, showing the layout of a Web-based publication on the left-side of the GUI, and a print-media based publication on the right-side of the GUI.

FIG. 2E2 is a schematic representation of the split-screen GUI associated with the computer-based publishing software program of the present invention operated in its UPN/TM/PD/URL data linking mode, showing the layout of a Web-based publication on the left-side of the GUI, and a print-media based publication on the right-side of the GUI.

FIG. 2E3 is a schematic representation of an exemplary UPN/TM/PD/URL data link table generated during the UPN/TM/PD/URL data link generation mode of operation, and subsequently transported to the UPN/TM/PD/URL RDBMS of the present invention.

FIG. 2E4 is a schematic representation of the GUI of an exemplary computer operating system (OS), on which the OS-based UPN/TM/PD/URL data linking function of the present invention is schematically depicted in its compositional/editorial mode, showing a GUI-based window associated with a first arbitrary content-creating application (e.g. Netscape Navigator browsing program), a GUI-based window associated with a second arbitrary content-creating application (e.g., Adobe® Illustrator graphics program), and the UPN/TM/PD/URL data linking GUI enabling the author to create UPN/TM/PD/URL data links between Web documents and UPN-encoded print-documents.

FIG. 2E5 is a schematic representation of the GUI of an exemplary computer operating system (OS), on which the OS-based UPN/TM/PD/URL data linking function of the present invention is schematically depicted in its UPN/TM/PD/URL Data Linking Mode, showing a GUI-based window associated with a first arbitrary content-creating application (e.g. Netscape Navigator browsing program), a GUI-based window associated with a second arbitrary content-creating application (e.g. Adobe® Illustrator graphics program), and the UPN/TM/PD/URL data linking GUI enabling the author to create UPN/TM/PD/URL data links between Web documents and UPN-encoded print-documents.

FIG. 3A1 is a graphical representation of a first illustrative embodiment of the client computer system of the present invention, designed for use in desktop environments at home, work and play.

FIG. 3A2 is a graphical representation of a second illustrative embodiment of the client computer system of the present invention realized in the form of a bar code driven multimedia kiosk, designed for use as a virtual sales agent in retail shopping environments, such as department stores, supermarkets, superstores, retail outlets and the like.

FIG. 3A3 is a graphical representation of a third illustrative embodiment of the client computer system of the present invention realized in the form of a bar code driven multi-media kiosk, designed for use as a virtual sales agent in retail shopping environments such as department stores, supermarkets, superstores, retail outlets and the like, and shown as having an integrated cord-connected type laser scanning bar code symbol reader disposed overhead its LCD touch-screen panel, a telephone handset for carrying out telephone calls, and a credit card transaction terminal for conducting consumer purchase transactions and other forms of electronic commerce while using the consumer product information finding system of the present invention.

FIG. 3A3' is a graphical representation of the bar code driven multi-media kiosk shown in FIG. 3A3, wherein the laser scanning projection-type bar code symbol reader is removed from its support stand, by pulling its connector cable out of its cable take-up unit, and used to read a bar code symbol on product located a relatively short distance away from the kiosk.

FIG. 3A4 is a graphical representation of a fourth illustrative embodiment of the client computer system of the present invention realized in the form of a bar code driven multi-media kiosk, designed for use as a virtual sales agent in retail shopping environments such as department stores, supermarkets, superstores, retail outlets and the like, and shown as having an integrated cordless type laser scanning bar code symbol reader disposed overhead its LCD touch-screen panel, a telephone handset for carrying out telephone calls, and a credit card transaction terminal for conducting consumer purchase transactions and other forms of electronic commerce while using the consumer product information finding system of the present invention.

FIG. 3A4' is a graphical representation of the bar code driven multi-media kiosk shown in FIG. 3A4, wherein the laser scanning projection-type bar code symbol reader is removed from its support stand and used to read a bar code symbol on a product located a relatively short distance away from the kiosk.

FIG. 3A5 is a graphical representation of a fifth illustrative embodiment of the client computer system of the present invention realized in the form of a consumer product information access terminal, designed for use as a sales agent s tool at a point-of-sale (POS) station in retail shopping environments, wherein the information access terminal has a bar code symbol reader integrated with the POS station for reading the UPC numbers on consumer products being offered for sale in the store, and also a LCD screen capable of being mounted in various viewing positions for displaying consumer product-related information accessed from a centralized database interconnected to the Internet.

FIG. 3A6 is a graphical representation of a sixth illustrative embodiment of the client computer system of the present invention realized in the form of a bar code driven multi-media kiosk, which is completely transportable within the store by the hand of a shopper for shopping convenience in retail environments such as department stores, supermarkets, superstores, retail outlets and the like.

FIG. 3A7 is a graphical representation of a seventh illustrative embodiment of the client computer system of the present invention realized in the form of a bar code driven multi-media kiosk, mounted upon a shopping cart or other vehicle for shopping convenience in retail environments such as department stores, supermarkets, superstores, retail outlets and the like.

FIG. 3A8 is a schematic representation of another embodiment of the transportable bar code driven product information access terminal of the present invention, realized using a Newton Message Pad™ equipped with Nethopper™ http client software and a Motorola™ RF modem PCMCIA card, for wireless access to the Internet.

FIG. 3A9 is a schematic representation of the e-mail enabled consumer product information transport subsystem of the present invention, wherein each bar code driven kiosk located on a local or wide area network within a retail shopping environment is provided with e-mail based consumer product information transport mode of operation which enables a consumer, accessing consumer product information on the WWW within the shopping environment, to (i) capture, save and attach the same to an e-mail envelope which can be automatically addressable to the consumer s home or like e-mail address in response to the consumer presenting a bar coded (or mag-stripe encoded) customer loyalty/courtesy card to be automatically read at the kiosk, (ii) transport the envelope to the consumer's e-mail address, and (iii) transport a copy of each such e-mail transaction to a central e-mail database server for consumer market research and related operations.

FIG. 3A10A is a schematic representation of the illustrative embodiment of the e-mail enabled consumer product information transport subsystem of the present invention comprising a plurality of bar code driven kiosks connected to a retail store based local wide area network, and a retailer/local e-mail server for enabling e-mail based consumer product information transport services on each such kiosk.

FIG. 3A10B is a schematic representation of the IPI finding and serving subsystem of the present invention, wherein a plurality of web/e-mail enabled kiosks are mounted to the shelving system installed within a "brick of mortar" type retail shopping environment.

FIG. 3A10C is an elevated site view of the first web/e-mail enabled kiosk shown in FIG. 3A10B; wherein the kiosk is arranged so that the bar code symbol reading device integrated therewith projects a laser scanning field from below the touch-type LCD screen panel thereof.

FIG. 3A10D is an elevated side view of the second web/e-mail enable kiosk shown in FIG. 3A10B, wherein the kiosk is arranged so that the bar code symbol reading device integrated therewith projects a laser scanning field from above the touch-type LCD screen panel thereof.

FIG. 3A11 is a schematic representation of an exemplary relational database structure maintained within the retailer RDBMS connected to the central e-mail server shown in FIGS. 3A9 and 3A10A.

FIG. 3A12 is a schematic representation of an exemplary relational database structure maintained within the manufacturer RDBMS connected to the central e-mail server shown in FIGS. 3A9 and 3A10A.

FIGS. 3A13A through 3A13C, taken together, show a high-level flow chart for the first illustrative embodiment of the consumer product information (CPI) transport method of the present invention, setting forth the steps carried out when a consumer accesses consumer information from Web/e-mail enabled bar code driven kiosk within a retail shopping environment, and transports the same to the e-mail address of the consumer at home, work or on the road.

FIG. 3A14 is a schematic representation of an exemplary graphical user interface (GUI) displayed on the bar code driven consumer product information kiosk of the present invention when the CPI transport service of FIGS. 3A13A through 3A13C is being performed.

FIGS. 3A15A through 3A15C, taken together, show a high-level flow chart for the second illustrative embodiment of the CPI transport method of the present invention, setting forth the steps carried out when a consumer accesses consumer information from a Web/e-mail enabled bar code driven kiosk within a retail shopping environment, and transports the same to the e-mail address of the consumer at home, work or on the road.

FIG. 3A16 is a schematic representation of the consumer product promotion/advertisement delivery subsystem of the present invention, which is integrated within the overall infrastructure of the high-level system depicted in FIGS. 2-1 and 2-2, and enables the management of Web-based consumer product advertisements created by manufacturers, agents thereof and also retailers alike, and delivery of the same to consumers within physical retail environments using wireless Web-based product promotion/advertising kiosks connected to a TCP/IP-based information network installed therewithin in order to deliver such product advertisements to retail shopping environments from various Internet information servers connected to the infrastructure of the Internet.

FIG. 3A17 is a schematic representation of the consumer product promotion/advertisement delivery subsystem of FIG. 3A16, wherein each retailer-operated Web-based product promotion kiosk on the information network simultaneously displays (i) a product advertisement, (ii) a promotion message related to the advertised product and (iii) the instructions on where to find the advertised product in the shopping environment in accordance with an preprogrammed product advertisement schedule managed by the retailer or agent thereof using a retailer-operated administration computer (i.e. client machine).

FIG. 3A18A is a schematic representation of a database of URLS associated with consumer product advertisements that are symbolically linked to UPNs of consumer products offered for sale in retail shopping environments and which are advertised on Web-based product promotion kiosks installed within the given retail shopping environment.

FIG. 3A19A is a schematic representation of one of the Web-based promotion kiosks installed within the retail shopping LAN of FIGS. 3A17 and 3A18, wherein integrated CCD sensors are provided for automatically capturing images of scenery with the field of view of the kiosk and processing the same to detect the presence of human eyes glazing at the display surface of the kiosk, and wherein each detected pair of eyes is symbolically linked with the UPN of the consumer product being promoted by the kiosk at the time of eye-gaze detection, for subsequent comparison with data collected at retail-based POS stations during the purchase of UPN-labeled products within the retail store on the same date as the promotion of the UPN-labeled product on the product promotion kiosk.

FIG. 3A19B is a schematic block diagram of the Web-based product promotion kiosk schematically depicted in FIG. 3A19C, showing the various subsystem and subcomponents employed therewithin which collectively enable the various functionalities of the kiosk.

FIG. 3A20 is a schematic representation of an exemplary consumer product promotion/advertisement delivery subsystem of FIGS. 3A17 and 3A18, installed within an exemplary retail shopping network, wherein the retailer-operated administration computer system can be used by retailer management to schedule specific product advertisements and promotions throughout particular retail stores.

FIG. 3A21A is a schematic representation of an exemplary frame-work style browser GUI, displayed on each Web-based product promotion kiosk of FIG. 3A19A, and comprising (i) a display frame for displaying the retailer's identity/image, typically set by the retailer or agent thereof), (ii) a display frame for displaying an advertisement of a particular UPN-labeled product registered with the subsystem, typically set by the product manufacturer and/or agent thereof, (iii) a display frame for displaying a promotional message about the advertised product, typically set by the retailer, and (iv) a display frame for displaying the location of the advertised product in the physical retail store or within the retailer's EC-enabled store (e.g. made accessible within the retail store), and typically set by the retailer, as shown in FIG. 3A23.

FIGS. 3A22A and 3A22B, taken collectively, set forth a flow chart describing the steps involved in installing and configuring the consumer product promotion/advertisement delivery subsystem of FIGS. 3A17 and 3A18 for operation within an exemplary retail shopping environment.

FIG. 3A23 is a schematic representation of a Product Promotion Programming Table for an arrangement of product promotion kiosks within a particular retail store, set by a retail manager or administrator using a Web-based client computer located within a particular retail store or some remote location (e.g. retailer's corporate headquarter, branch sales office, etc.), so that particular Web-based product promotion kiosks within the subsystem will display particular advertisements and promotions in accordance with a schedule designed to maximize sales of particular products within a particular retail store.

FIG. 3A24 is a schematic representation of an exemplary product promotion performance report produced by the consumer product promotion/advertisement delivery subsystem of FIGS. 3A17 and 3A18 in order to inform retail management how many shoppers on a given day within a particular retail shopping environment gazed at a particular product advertisement/promotion and actually purchased the advertised product within the retail store, either at a physical POS station or consumer product information kiosk therewithin (as shown in FIGS. 3A2 through 3A8).

FIG. 4A1 is a schematic representation of the relational-type IPI Registrant Database maintained by each IPD Server configured into the system of the illustrative embodiment of the present invention, showing the information fields for storing (i) the information elements representative of the UPN (e.g. UPC data structure, EAN data structure, and/or National Drug Code (NDC) data structure), URLs, trademark(s) ($TM_i$), Company Name (CNi) and company address, Product Description ($PD_i$), E-Mail Address ($EMA_i$) thereof symbolically-linked (i.e. related) for a number of exemplary IPI Registrants listed (i.e. registered) with the IPI Registrant Database maintained by each IPD Server, image files for registered consumer products, and consumer product information request (CPIR) enabling Applets for access by retailers, wholesalers, advertisers, Web publishers, and the like, and insertion within the HTML code of Web documents on various types of Internet information servers hosting WWW sites, as well as EC-enabled WWW-sites, EC-enabled stores and/or on-line e-commerce product catalogs, so that when executed, these CPIR-enabling Applets automatically access a categorized URL menu containing URLs (identified in FIG. 4A2) specifying the location of manufacturer-linked information resources on the Internet pertaining to a particular UPN-labeled product.

FIG. 4A2 is a schematic representation of the information subfield structure of the URL Information Field of the IPI Database of FIG. 4A1, showing the Product Advertisement Information Field, the Product Specification (Description/Operation) Information Field, the Product Update Information Field, the Product Distributor/Reseller/Dealer Information Field, the Product Warranty/Servicing Information Field, the Product Incentive Information Field thereof, the Product Review Information Field, the Related Products Information Field, and Miscellaneous Information Fields detailed hereinafter.

FIG. 4B is a schematic representation of the relational-type Non-IPI Registrant Database maintained by each IPD Server that is configured into the IPI Finding and Serving Subsystem of the illustrative embodiment of the present invention, showing the information fields for storing (i) the information elements representative of the Company Name (CNi) and Company Address, Trademark(s) ($^{TM}{}_1$) registered by the associated Company, E-Mail Address ($EMA_1$) thereof symbolically-linked for a number of exemplary Non-IPI registrants listed within the Non-IPI Registrant Database maintained by each IPD Server, and CPIR enabling Applets for access by retailers, wholesalers, advertisers, Web publishers, and the like, and insertion within the HTML code of Web documents on various types of Internet information servers hosting WWW sites, as well as EC-enabled WWW-sites, EC-enabled stores and/or on-line e-commerce product catalogs, for the purpose described above.

FIG. 4C is a schematic representation of the structure of a relational database management subsystem (RDBMS) used to carry out a best-mode embodiment of the IPI Registrant Database represented in FIGS. 4A1 and 4A2 hereof.

FIG. 4C1 is a schematic representation illustrating the information fields of the table entitled Manufacturer used in the RDBMS shown in FIGS. 4A1 and 4A2 hereof.

FIG. 4C2 is a schematic representation illustrating the information fields of the table entitled Consumer Product used in the RDBMS shown in FIGS. 4A1 and 4A2 hereof.

FIG. 4C3 is a schematic representation illustrating the information fields of the table entitled Information Resources on the WWW used in the RDBMS shown in FIGS. 4A1 and 4A2 hereof.

FIG. 4D is a schematic representation illustrating the information fields of the table entitled Retailer used in the RDBMS shown in FIGS. 4A1 and 4A2 hereof.

FIGS. 4E1 and 4E2, taken together, provide a high-level flow chart describing the steps involved in the first illustrative method of creating, loading, distributing, embedding, displaying, and executing server-side consumer product information request (CPIR) enabling Applets when using the system architecture and servlet-based search and display mechanism schematically depicted in FIG. 2B1, enabling consumers to automatically search the RDBMS for consumer product information related to a particular UPN-specified product while visiting EC-enabled stores and other WWW sites without disturbing the point of presence of the consumer.

FIG. 4F1 is a schematic representation illustrating the method of FIGS. 4E1 and 4E2 being carried out using certain subcomponents of the system depicted in FIGS. 2-1, 2-2, and 2B1, in particular.

FIG. 4F2 is a schematic representation illustrating in greater detail the Applet-embedding step of the method of FIGS. 4E1 and 4E2, carried out using certain subcomponents of the system depicted in FIGS. 2-1 and 2-2.

FIGS. 4G1 and 4G2, taken together, provide a high-level flow chart describing the steps involved in the second illustrative method of creating, loading, distributing, embedding, displaying, and executing client-side consumer product information request (CPIR) enabling Applets when using the system architecture and Applet/CGI-based search and display mechanism schematically depicted in FIG. 2B2, enabling consumers to automatically search the RDBMS for consumer product information related to a particular UPN-specified product while visiting EC-enabled stores and other WWW sites without disturbing the point of presence of the consumer.

FIG. 4H1 is a schematic representation illustrating the method of FIGS. 4G1 and 4G2 being carried out using certain subcomponents of the system depicted in FIGS. 2-1, 2-2, and 2B2, in particular.

FIG. 4H2 is a schematic representation illustrating in greater detail the Applet-embedding step of the method of FIGS. 4G1 and 4G2, carried out using certain subcomponents of the system depicted in FIGS. 2-1 and 2-2.

FIGS. 4I1 and 4I2, taken together, provide a high-level flow chart describing the steps involved in the second illustrative method of creating, loading, distributing, embedding, displaying, and executing client-side CPIR-enabling Applets when using the system architecture and Applet/socket-based search and display mechanism schematically depicted in FIG. 2B3, enabling consumers to automatically search the RDBMS for consumer product information related to a particular UPN-specified product while visiting EC-enabled stores and other WWW sites without disturbing the point of presence of the consumer.

FIG. 4J1 is a schematic representation illustrating the method of FIGS. 4I1 and 4I2 being carried out using certain subcomponents of the system depicted in FIGS. 2-1, 2-2, and 2B3, in particular.

FIG. 4J2 is a schematic representation illustrating in greater detail the Applet-embedding step of the method of FIGS. 4I1 and 4I2, carried out using certain subcomponents of the system depicted in FIGS. 2-1 and 2-2.

FIGS. 4K1 and 4K2, taken together, provide a high-level flow chart describing the steps involved in the fourth illustrative method of creating, loading, distributing, embedding, displaying, and executing client-side CPIR-enabling Applets when using the system architecture and Applet/RMI-based search and display mechanism schematically depicted in FIG. 2B4, enabling consumers to automatically search the RDBMS for consumer product information related to a particular UPN-specified product while visiting EC-enabled stores and other WWW sites without disturbing the point of presence of the consumer.

FIG. 4L1 is a schematic representation illustrating the method of FIGS. 4K1 and 4K2 being carried out using certain subcomponents of the system depicted in FIGS. 2-1, 2-2, and 2B4, in particular.

FIG. 4L2 is a schematic representation illustrating in greater detail the Applet-embedding step of the method of FIGS. 4K1 and 4K2, carried out using certain subcomponents of the system depicted in FIGS. 2-1 and 2-2.

FIG. 4M1 is a graphical illustration of an Internet browser display screen that might be displayed on a client computer subsystem hereof while browsing the Library of CPIR-enabling Java Applet (HTML) Tags maintained within the UPN/TM/PD/URL RDBMS shown in FIGS. 2-1 through 2A, wherein the user (e.g. retail purchasing agent, product catalog manager, advertising agent, or whomever) is provided with the option of viewing and downloading, for each UPN-specified product in the system, an executable file containing the HTML tag for either a client-side or server-side type CPIR-enabling Java Applet associated therewith.

FIG. 4M2 is a graphical illustration of an Internet browser display screen that might be displayed on a client computer subsystem hereof while browsing a product-specific page of an on-line business-to-business consumer product catalog, wherein the user (e.g. retail purchasing agent, product catalog manager, advertising agent, or whomever) is provided with the option of viewing and downloading, for each UPN-specified product offered for sale in the on-line catalog, an executable file containing the HTML tag for either a client-side or server-side type CPIR-enabling Java Applet associated with the UPN-specified consumer product.

FIGS. 4N1 and 4N2 set forth graphical illustrations of Internet browser display screens that might be displayed on a client computer subsystem hereof while browsing a WWW information search engine or directory, such as Yahoo, Lycos, or Excite, looking for information on the WWW related to a particular consumer product, and launching a CPI search enabling GUI in accordance with the principles of the present invention by clicking on the (underlying) HTML tag of either client-side or server-side Applet embedded within the HTML code of the displayed WWW page associated with the search engine/directory.

FIGS. 4O1 and 4O2 set forth graphical illustrations of Internet browser display screens that might be displayed on a client computer subsystem hereof while shopping/browsing an EC-enabled storefront, looking for information on any consumer product which is carried within the retailer s EC-enabled store; and launching a CPI search enabling GUI in accordance with the principles of the present invention by clicking on the HTML tag of a client-side or server-side Applet embedded within the HTML code of the displayed E-store Web page.

FIGS. 4P1 and 4P2 set forth graphical illustrations of Internet browser display screens that might be displayed on a client computer subsystem hereof while shopping/browsing at a particular catalog page in an EC-enabled store, considering whether or not to make an on-line purchase of a particular consumer product displayed on the catalog page; and then initiating a UPN-directed CPI search according to the principles of the present invention by clicking on the HTML tag of a UPN-encoded client-side or server-side Applet embedded within the HTML code of the displayed catalog page.

FIGS. 4Q1 and 4Q2 set forth graphical illustrations of Internet browser display screens that might be displayed on a client computer subsystem hereof while visiting an on-line EC-enabled auction site when considering whether or not to place a bid on a particular consumer product displayed within the auction listings thereof, and then launching a CPI search enabling GUI in accordance with the principles of the present invention by clicking on the HTML tag of a URL-encoded client-side or server-side Applet embedded within the HTML code of the displayed on-line auction Web page.

FIGS. 4R1 and 4R2 set forth graphical illustrations of Internet browser display screens that might be displayed on a client computer subsystem hereof while shopping/browsing at a particular auction page in the EC-enabled auction site of FIGS. 4Q1 and 4Q2, considering whether or not to place at bid on a particular product up being auctioned, and then initiating a UPN-directed CPI search according to the principles of the present invention by clicking on the HTML tag of a UPN-encoded client-side or server-side Applet embedded within the HTML code of the displayed auction page.

FIGS. 4S1 and 4S2 set forth graphical illustrations of Internet browser display screens that might be displayed on a client computer subsystem hereof while browsing a WWW page of any business, organization or ongoing concern, seeing an Internet product or service advertisement of particular interest on the WWW page, and then initiating a UPN-directed CPI search according to the principles of the present invention by clicking on the HTML tag of a UPN-encoded client-side or server-side Applet embedded within the HTML code of the displayed WWW page.

FIG. 4S3 sets forth a graphical illustration of an Internet browser display screen that might be displayed on a client computer subsystem hereof in automatic response to a consumer selecting a URL displayed in the Buy On The Web URL category displayed on the Internet browser display screen of FIG. 4S2, thereby enabling the purchase of the advertised product or service at an EC-enabled store or product catalog specified by the selected URL.

FIGS. 4T1 and 4T2 set forth graphical illustrations of Internet browser display screens that might be displayed on a client computer subsystem hereof while a consumer is reviewing the performance chart of a particular consumer product company displayed at a particular on-line electronic trading WWW site considering whether or not to buy, keep or sell securities (e.g. stock or bonds) in this consumer product company, and eventually requests specific information about the company s products by initiating a trademark/company name-directed CPI search according to the principles of the present invention by clicking on the HTML tag of a trademark/company name-encoded CPIR-enabling Applet embedded within the HTML code of the displayed performance chart.

FIGS. 6D1 through 6D3, taken together, provide a high level flow chart illustrating the steps involved in carrying out the communication protocol shown in FIG. 5C when the IPI Finding and Serving Subsystem is in its Trademark-Directed Search Mode of operation.

FIG. 6E1 through 6E3, taken together, provide a high level flow chart illustrating the steps involved in carrying out the communication protocol shown in FIG. 5E when the IPI Finding and Serving Subsystem is in its Product-Description Directed Search Mode of operation;

FIG. 7 is a schematic representation of an exemplary embodiment of the IPI Finding and Delivery Subsystem of the present invention showing the various constituent subsystems thereof.

FIG. 8 is a schematic representation of a portfolio of Web sites supported and managed by the UPN/TM/PD/URL database management subsystem with the assistance of the manufacturer/product registration subsystem and Web-enabled client subsystems operated by manufacturers and/or their agents in accordance with the information management principles of the present invention.

FIG. 9 is a schematic diagram illustrating the various information subsystems provided by an alternative embodiment of the consumer product information collection, transmission and delivery system of invention along the retail chain, namely the revolutionary Internet-based Consumer Product Marketing, Merchandising and Education/Information Subsystem of the present invention having integrated product functionality (IPF), a conventional UPC-based Product Sales Price Information Subsystem (UPC Product Sales Price Catalog), a conventional Electronic Trading Information Subsystem, a conventional Sales Analysis and Forecasting Information Subsystem, Collaborative Replenishment Information Subsystem, and a conventional Transportation and Logistics Information Subsystem.

FIGS. 10A1 and 10A2, taken together, show a schematic diagram of the Internet-based Consumer Product Marketing, Merchandising and Education/Information System of the illustrative embodiment hereof shown embedded within the infrastructure of the global computer communications network known as the Internet, and comprising a plurality of data-synchronized Internet Product Directory (IPD) Servers connected to the infrastructure of the Internet, a UPN/TM/PD/URL Relational Database Management Subsystem (i.e. UPN/TM/PD/URL RDBMS) connected to one or more of the IPD Servers and one or more globally-extensive electronic data interchange (EDI) networks, a Web-based Document Server connected to at least one of the IPD Servers and the Internet infrastructure, a Web-based Document Administration Computer connected to the Web-based Document Server by way of a TCP/IP connection, a plurality of manufacturer-related electronic-commerce (EC) information servers for hosting EC-enabled stores or EC-enabled on-line catalogs of manufacturers, a plurality of retailer-related electronic-commerce (EC) information servers for hosting EC-enabled stores or EC-enabled on-line catalogs of retailers, a plurality of Internet Product-Information (IPI) Servers connected to the infrastructure of the Internet for serving consumer-product related information to consumers in retail stores and at home, a central e-mail RDBMS for receiving and storing copies of e-mail transmissions from retailer-store based kiosks to e-mail addresses of consumer accessing consumer product information therewith in retail shopping environments, a plurality of Client Subsystems connected to the infrastructure of the Internet and allowing manufacturers to transmit consumer-product related information to the Web-based Document Server for collection and retransmission to the IPD Servers, a plurality of Client Subsystems connected to the infrastructure of the Internet and allowing consumers in retail stores and at home to request and receive consumer-product related information from the IPD Servers, a plurality of mirrored Consumer Product Kiosk Advertisement Marketing/Sales/Management Web (http) Servers, a plurality of mirrored Consumer Product Kiosk Promotion Marketing/Sales/Management Web (http) Servers, and a plurality of Consumer Product Advertising Web Servers operated by a plurality of advertising agents registered with the system.

FIG. 11 is a schematic diagram illustrating the flow of information within the system of the present invention, including (i) the communication link extending between the information subsystems of manufacturers of UPC-encoded products and the centralized (or master) UPN/TM/PD/URL RDBMS of the present invention, (ii) the communication link extending between the UPN/TM/PD/URL RDBMS and the IPD Servers of the present invention, (iii) the communication link extending between the IPD Servers and in-store Client Subsystems of retailers, (iv) the communication link extending between the IPI Servers and the in-store Client Subsystems of retailers, (v) the communication link extending between the IPD Servers and the Client Subsystems of consumers, (vi) the communication link extending between the IPI Servers and the Client Subsystems of consumers, and (vii) the communication link extending between the UPN/TM/PD/URL RDBMS and the EC-enabled UPN-based Consumer Product Catalog Server(s) of the present invention for providing consumer product catalog services to retailer purchasing agents and others and enabling the on-line purchase of consumer products between trading partners (e.g. manufactures and retailers) using EDI (or XML/EDI) based business-to-business electronic commerce transactions, with (viii) a first plurality of mirrored Consumer Product Kiosk Advertisement Marketing/Sales/Management Web (http) Servers of the present invention shown operably connected to the infrastructure of the Internet and accessible by registered advertising agents for purposes of placing advertisement orders with the system and creating, managing and implementing product advertising campaigns deployed within physical and electronic streams of commerce, and (xi) a second plurality of mirrored Consumer Product Kiosk Promotion Marketing/Sales/Management Web (http) Servers of the present invention operably connected to the infrastructure of the Internet and accessible by product promotional agents, for purposes of placing product promotion orders with the system and creating, managing and implementing product advertising and promotion campaigns deployed within physical and electronic streams of commerce.

FIG. 12 is a schematic diagram illustrating the flow of information within the system of the present invention, similar to that shown in FIG. 11, except that as shown in FIG. 12, each manufacturer transmits to the UPN-indexed RDBMS (realized as a massive RDBMS data warehouse) one or more information resource files (IRFs) which are symbolically linked to a particular UPN-encoded product, and that each IRF is then stored as a Web-based document on an Internet information server at predesignated URL, symbolically linked to the UPN, so that consumers can use the UPN to access a menu of URLs symbolically linked thereto for display of the corresponding Web-documents.

FIG. 14 is a schematic representation of the system of FIG. 13, showing a GPS-time synchronized WAP-enabled information server capable of delivering consumer product information and information links from the UPN/TM/PD/URL RDBMS to a GPS-enabled wireless Web-enabled palm computer carried by a consumer within a retail shopping environment, when, for example, the palm computer is physically located within a particular portion of a physical retail shopping space.

FIG. 15A is graphical representation of the RDBMS table entitled MANUFACTURER, showing its primary information fields, namely: Company Name; Street Address; City; State; Postal Code; County; MIN Assigned by UCC/EAN; URL of Manufacturer WWW Site; Phone Number; Email Address; Fax Number; Standard Industry Codes (SIC); Marketing Executive Identity; Marketing Executive Phone No.; Marketing Executive E-mail; UPN/TM/PD/URL Management Software (SW) Installed; UPC Management SW for EDI B2B; UPC Service Bureau Employed; UPC Service Bureau Contact; UPC Service Bureau Phone Number; UPC Service Bureau E-Mail; EDI Vendor Employed; EDI Vendor Contact Person; EDI Vendor Phone Number; EDI Vendor E-Mail Address; EDI Service Bureau Employed; EDI Service Contact; EDI Service Bureau Phone Number EDI Service Bureau E-Mail; Number of UPC/TM/PD/URL SW Licenses; UPN/TM/PD/URL Management SW License Total; Total Number of UPC Numbers; Date of UPC Number Accounting; Annual UPC/TM/PD/URL Management SW Fee Due; Date of UPC/TM/PD/URL SW Fee Payment; UPC/TM/PD/URL SW Fee Agent; UPC/TM/PD/URL SW Fee Agent Phone; UPC/TM/PD/URL SW Fee Agent Email; and Date of Last Record Update.

FIG. 15B is a graphical representation of the RDBMS table entitled UPN/TM/PD/URL MANAGEMENT SOFTWARE (SW) LICENSE, showing its primary information fields, namely: MIN Assigned by UCC/EAN; Version of UPN/TM/PD/URL Management SW; Number of Licenses Granted; UPN/TM/PD/URL Management SW License Keys; UPN/TM/PD/URL Management SW Acct. Number; UPN/TM/PD/URL Management SW Acct. Rep.; UPN/TM/PD/URL Management SW Download Date; and Date of Last Record Update.

FIG. 15C is a graphical representation of the RDBMS table entitled CONSUMER PRODUCT, showing its primary information fields, namely: MIN Assigned by UCC/FAN; Assigned UPN (UPC or UPC/EAN); UPN Symbology type; Primary Trademark (TM)/Brand; Secondary Trademark/Brand; Generic Product Description (PD); Cash Register Short Description; Cash Register Description; Model Number; Package Type; Labeling Language; URL Marking on Package; Service Phone Number on Package; Brand Manager Identity; Brand Manager Phone Number; Brand Manager E-Mail Address; Product Manager Identity; Product Manager Phone Number; Product Manager E-Mail Address; Trademark Notice on Package; Copyright Notice on Package; Patent Notice on Package; URL for Primary TM Image; Date of Last Record Update.

FIGS. 15D1 and 15D2, taken together, provide a graphical representation of the RDBMS table entitled INTERNET INFORMATION RESOURCES, showing its primary information fields, namely: Assigned UPN; URL for Product Description; URL for Product Instructions; URL for Product Operating Manual; URL for Orig. Warranty Service; URL for Extended Warranty Service; URL for 1$^{st}$ Ad on WWW; URL for 2$^{nd}$ Ad on WWW; .N; URL for 1$^{st}$ Product Review; URL for 2$^{nd}$ Product Review; URL for n$^{th}$ Product Review; URL for 1$^{st}$ Product Endorsement; URL for 2$^{nd}$ Product Endorsement; RL for n$^{th}$ Product Endorsement; URL for Manufacturer Service Request; URL for Product Returns to Manufacturer; URL for Product News; URL for Company News; URL for FAQs About Product; URL for Customer Service Line 1; URL for Customer Service Line 2; URL for Manufacturer Promotion #1; URL for Manufacturer Promotion #2; URL for Manufacturer Promotion #3; URL for Retailer Promotion #1; URL for Retailer Promotion #2; N; URL for Direct Manufacturer Purchase; URL for Dealer Location in USA; URL for Product Wholesaler #1; URL for Product Wholesaler #2; URL for Product Wholesaler #N; URL for Product Retailer #1; URL for Product Retailer #2; URL for Product Retailer #N; URL for Complementary Product #1; URL for Complementary Product #2; URL for Complementary Product #N; URL for Special Product Notices; URL for Product Uses and Applications; URL for Recreational Uses of Products; URL for Manufacturer Affiliate #1; URL for Manufacturer Affiliate #2; URL for Manufacturer Affiliate #N; URL for Product Updates; URL for Software Downloads; URL for Manufacturer-Sponsored Auctions; URL for Retailer-Sponsored Auctions; URL for Manufacturer Suggested Retail Price; and Date of Last Record Update.

FIG. 15E is a graphical representation of the RDBMS table entitled RETAILER, showing its primary information fields, namely: Company Name; Street Address; City; State; Postal Code; Country; Retailer ID No.; Contact Person; Phone Number; E-Mail Address; Fax Number; URL of Retailer Director E-Mail; UPC Catalog Provider; UPC Catalog Provider Contact; UPC Catalog Provider Phone; UPC Catalog Provider E-Mail; EDI B2n Enabler; EDI B2B Enabler Contact; EDI B2B Contact Phone; EDI B2B Contact E-Mail; EDI Vendor; EDI Vendor contact Identity; EDI Vendor Contact Phone; EDI Vendor Contact E-Mail; Marketing Manager, Total Number of retail Stores, Total Number of Retail Stores; and Date of Last Record Update.

FIG. 15F is a graphical representation of the RDBMS table entitled RETAILER/P-STORE RELATION, showing its primary information fields, namely: Retail FP-Store ID No.; Manufacturer #1 ID No.; Manufacturer #2 ID No; . . . ; Manufacturer #N ID No.; Total # Manufacturer Relationships; and Date of Last Record Update.

FIG. 15G is a graphical representation of the RDBMS table entitled/RETAILER RELATIONSHIPS showing its primary information fields, namely: MIN Assigned by UCC/EAN; Retailer #1 ID No.; Retailer #2 ID No.; N; Total # Retailer Relationships; and Date of Last Record Update.

FIG. 15H is a graphical representation of the RDBMS table entitled CONSUMER, showing its primary information fields, namely: Consumer Name; Consumer ID No.; E-Mail Address; Street Address; City; State; Postal Code; Phone Number; Shopped at Retail Store ID Nos.; Shopped at Retailer Store ID No.; Consumer Index 1; Consumer Index 2; Consumer Index N; Credit Card Nos.; and Date of Last Record Update.

FIG. 15I is a graphical representation of the RDBMS table entitled ADVERTISER, showing its primary information fields, namely: Advertiser Name; Street Address; City; State; Postal Code; Contact Person; Phone Number; E-Mail Address; Fax Number; Advertiser ID No.; Ad Agent for Manufacturer #1; Ad Agent for Manufacturer #2; Ad Agent for Manufacturer #N; Total # Manufacturer Agency Relations; Ad Agent for Retailer #1; Ad Agent for Retailer. #2; Ad Agent for Retailer #N; Total # Retailer Agency Relations; URL for Advertiser WWW Site; Advertiser Network Acct. No.; Advertiser Network Password; and Date of Last Record Update.

FIG. 15J is a graphical representation of the RDBMS table entitled PROMOTER, showing its primary information fields, namely: Promoter Name; Street Address; City; State; Postal Code; Contact Person; Phone Number; E-Mail Address; Fax Number; Promoter ID No.; Promotion Agent for Manufacturer #1; Promotion Agent for Manufacturer #2; Promotion Agent for Manufacturer #N; Total # Manufacturer Agency Relations; Promotion Agent for Retailer #1; Promotion Agent for Retailer. #2; Promotion Agent for Retailer #N; Total # Retailer Agency Relations; URL for Promoter WWW Site; Promoter Network Acct. No.; Promoter Network Password; and Date of Last Record Update.

FIG. 15K is a graphical representation of the RDBMS table entitled PHYSICAL KIOSK, showing its primary information fields, namely: Physical Kiosk ID No.; Retail P-Store ID No.; Physical Kiosk HTT Server URL; Assigned Static IP Address; P-Kiosk Aisle/Shelf Location; Physical Kiosk Access Password; CPI Request Service Status; Ad Display Service Status; Promotion Service Status; Kiosk Activity Index No. 1; Kiosk Activity Index No. 2; Kiosk Activity Index No. N; Status of Retailer s MIN filter; Cost of Kiosk Ad Spot on Monday; Cost of Kiosk Ad spot on Tues.; Cost of Kiosk Ad spot on Sunday; Cost of Kiosk Ad Promotion on Mon.; Cost of Kiosk Ad Promotion on Tues.; Cost of Kiosk Ad Promotion on Wed.; . . . ; Cost of Kiosk Ad Promotion on Sunday; CPIR Request Service GUI Type; Ad Display service GUI Type; Promotion Service GUI Type; and Date of Last Record Update.

FIG. 15L is a graphical representation of the RDBMS table entitled PHYSICAL STORE, showing its primary information fields, namely: Retailer ID No.; Address; City; State; Postal Code; Country; Retail P-store ID No.; Store Manager Identity; Store Manager Phone; Store Manager E-Mail; Regional Manager Identity; Regional Manager Phone; Regional Manager E-Mail; Number of Store Aisles; Number of Floors; Floor Plan Diagrams; Product Category/Shelf Maps; Available Internet Connectivity; Retailer/Manufacturer Relations; and Date of Last Record Update.

FIG. 15M is a graphical representation of the RDBMS table entitled PHYSICAL KIOSK HTTP SERVER, showing its primary information fields, namely: Physical Kiosk http Server URL; Physical Kiosk http Server Log; Physical Kiosk ID No.; and Date of Last Record Update.

FIG. 15N is a graphical representation of the RDBMS table entitled READER S PHYSICAL KIOSK CATALOG, showing its primary information fields, namely: Retail-Store ID No.; Physical Kiosk ID No. 1; Physical Kiosk ID No. 2; Physical Kiosk ID No. N; Total # of Physical Kiosks; and Date of Last Record Update.

FIG. 15O is a graphical representation of the RDBMS table entitled PHYSICAL KIOSK E-MAIL, showing its primary information fields, namely: Physical Kiosk ID No.; Physical Kiosk E-Mail Log; and Date of Last Record Update.

FIG. 15P is a graphical representation of the RDBMS table entitled PHYSICAL KIOSK USER ACTIVITY, showing its primary information fields, namely: Date(s) of Activity Measurement; Physical Kiosk ID No.; Number of HTML Pages Accessed; Number of BrandKey Requests at Kiosk; different HTML Pages Served-Up; Outgoing E-Mail Transmissions; System Mode Transitions; E-Commerce Transactions Made; Number of BrandKey Requests at Kiosk; and Date of Last Record Update.

FIG. 15Q is a graphical representation of the RDBMS table entitled AD SPOT ORDER—VIRTUAL KIOSK, showing its primary information fields, namely: UPN of Advertised Product; Virtual Kiosk ID No.; Scheduled Date of Ad Spot; Advertiser Placing Order; Date of Ad Spot Order; Advertiser ID No.; Cost of Ad Spot; URL of Advertisement Spot; Time Duration of Ad Spot; Copyright Owner of Advertisement; Ordered Number of Displays/Date; File Format of Advertisement; Virtual Kiosk Ad Spot ID No.; Actual Number of Displays/Date; Actual Number of Interruptions; Ad Spot Cost; Date of Ad Payment; and Date of Last Record Update.

FIG. 15R is a graphical representation of the RDBMS table entitled AD SPOT ORDER—PHYSICAL KIOSK, showing its primary information fields, namely: UPN of Advertised Product; physical Kiosk ID No.; Scheduled Date of Ad Spot; Advertiser Placing Order; Date of Ad Campaign; Advertiser ID No.; Cost Ad Spot; URL of Advertisement Spot; Time Duration of Ad Spot; Copyright Owner of Advertisement; Ordered Number of Displays/Date; File Format of Advertisement; Physical Kiosk Ad Spot ID No.; Actual Number of Displays/Date; Actual Number of Interruptions; Ad spot Payment; Date of Ad Spot Payment; and Date of Last Record Update.

FIG. 15S is a graphical representation of the RDBMS table entitled PROMO SPOT ORDER—PHYSICAL KIOSK, showing its primary information fields, namely: UPN of Promoted Product; Physical Kiosk ID No.; Scheduled Date of Promotion Spot; Promoter Placing Order; Date of Promotion Spot Order; Promoter ID No.; URL of Promotional Ad in DF1; Promotional Message in DF2; Promotional Message in DF3; Promotional Message in DF4; Time Duration of Promotion Spot; Copyright Owner of Promotion Ad; Ordered Number of Displays/Date; File Format of Promotional Ad; Physical Kiosk Promotion Spot ID No.; Actual Number of Displays/Date; Actual Number of Interruptions; Cost of Promotion Spot; promo spot Payment; Date of Promotion Spot Payment; and Date of Last Record Update.

Figure 2:
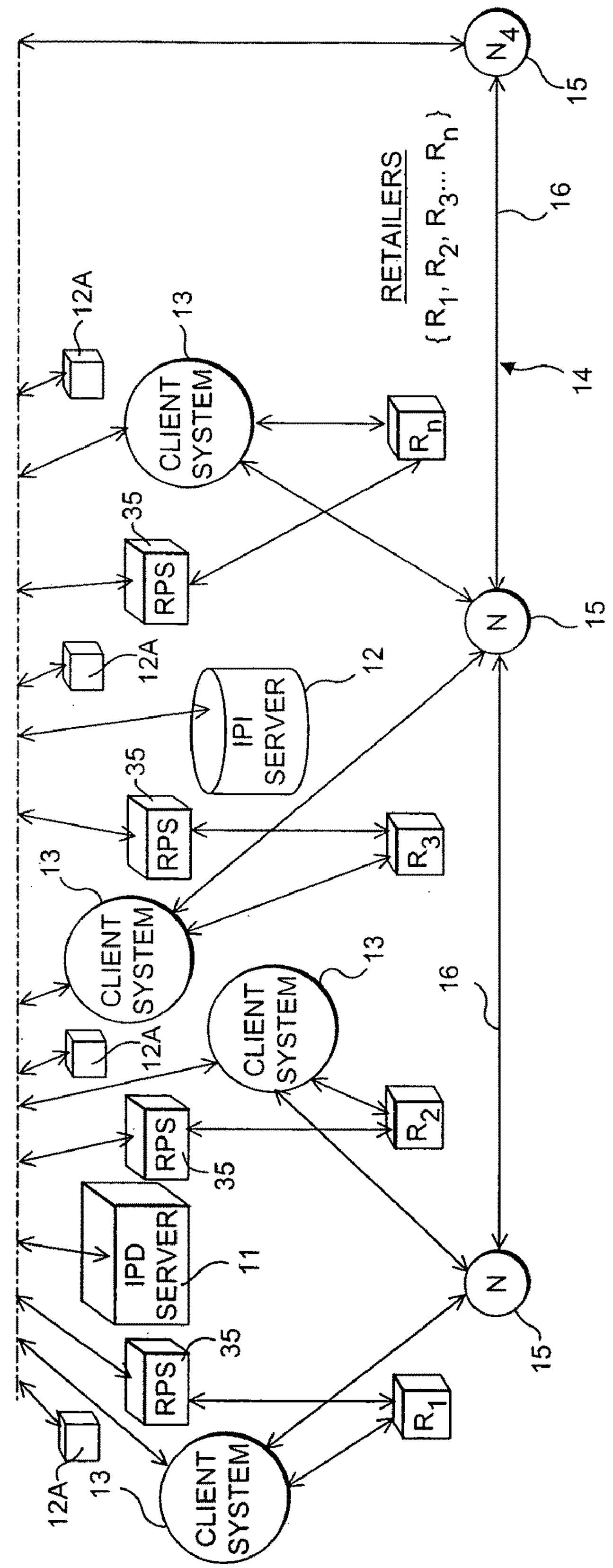

FIG. 15T is a graphical representation of the RDBMS table entitled PHYSICAL KIOSK AD CAMPAIGN, showing its primary information fields, namely: Physical Kiosk ID No.; Date of Ad Campaign; Ad Spot ID No. 1; Ad spot ID No. 2; Ad spot ID No. N; Total Ad Spots Ordered On Kiosk; and Date of Last Record Update.

FIG. 15U is a graphical representation of the RDBMS table entitled PHYSICAL KIOSK PROMO CAMPAIGN, showing its primary information fields, namely: Physical Kiosk ID No.; Date of Promotion Campaign; Physical Kiosk Promotion Spot ID No. 1; Physical Kiosk Promotion Spot ID No. N; Total Ad Spots Ordered; and Date of Last Record Update.

FIG. 15V is a graphical representation of the RDBMS table entitled VIRTUAL KIOSK, showing its primary information fields, namely: Virtual Kiosk ID No.; Retail P-store or E-Store ID No.; Type of Virtual Kiosk; CPIR-enabling Applet ID No.; Licensed Internet Domain; Virtual Kiosk Licensee; Virtual Kiosk Enabling Password; E-Store Web-Page Location; CPI Request Service Status; AD Display Service Status; Promotion Service Status; Kiosk Activity Index No. 1; Kiosk Activity Index No. 2; Kiosk Activity Index No. N; Status of Retailer MIN Filter; Cost of Kiosk Ad Spot on Mon.; Cost of Kiosk Ad Spot on Tues.; Cost of Kiosk Promotion Spot on Mon.; . . . ; Cost of Kiosk Promotion Spot on Sunday; URL for Accessing CPI Kiosk; and Date of Last Record Update.

FIG. 15W is a graphical representation of the RDBMS table entitled CPIR-ENABLING APPLET, showing its primary information fields, namely: CIPR-Enabling Applet ID No.; Type of CPIR-Enabling Applet; URL of CPIR-Enabling Applet BC; Virtual Kiosk ID No.; Virtual Kiosk Server Log; and Date of Last Record Update.

FIG. 15X is a graphical representation of the RDBMS table entitled RETAILER E-STORE, showing its primary information fields, namely: Retailer ID No.; Address; City; State; Postal Code; Country; Retail E-Store ID No.; E-Store Manager Identity; E-Store Manager Phone; E-store Manager E-Mail; E-Store WWW Site Map; Retailer/Manufacturer Relations; and Date of Last Record Update.

FIG. 15Y is a graphical representation of the RDBMS table entitled RETAILER S VIRTUAL KIOSK CATALOG, showing its primary information fields, namely: Retail P-Store ID No.; Virtual Kiosk ID No. 1; Virtual Kiosk ID No. 2; . . . ; Virtual Kiosk ID No. N; Total # of Virtual Kiosks; Retailer ID No.; and Date of Last Record Update.

FIG. 15Z is a graphical representation of the RDBMS table entitled VIRTUAL KIOSK E-MAIL showing its primary information fields, namely: Virtual Kiosk ID No.; Virtual Kiosk E-Mail Log; and Date of Last Record Update.

FIG. 15AA is a graphical representation of the RDBMS table entitled VIRTUAL KIOSK USER ACTIVITY, showing its primary information fields, namely: Date(s) of Activity Measurement; Virtual Kiosk ID No.; Number of HTML Pages Accessed; Number of BrandKey Requests at Kiosk; Number of Trademark Requests; Different HTML Pages Served-Up; Outgoing E-Mail transmissions; System Mode Transitions; E-commerce Transactions Made; and Date of Last Record Update.

FIG. 15BB is a graphical representation of the RDBMS table entitled PROMO SPOT ORDER—VIRTUAL KIOSK, showing its primary information fields, namely; UPN of Promoted Product; Virtual Kiosk ID No.; Scheduled Date of Promotion Spot; Promoter Placing Order; Date of Promotion spot Order; Promoter ID No.; URL of Promotional Ad in DF1; Promotional Message in DF2; Promotional Message in DF3; Promotional Message in DF4; Time Duration of Promotion Spot; Copyright Owner of Promotion Ad; Ordered Number of Displays/Date; File format of Promotional Ad; Virtual Kiosk Promotion spot ID No.; Actual Number of Displays/Date; Actual Number of Interruptions; Cost of Promotion Spot; Promotion Cost Payment; Date of Promotion Payment; and Date of Last Record Update.

FIG. 15CC is a graphical representation of the RDBMS table entitled VIRTUAL KIOSK PROMO CAMPAIGN, showing its primary information fields, namely: Virtual Kiosk ID No.; Date of Promotion Campaign; Virtual Kiosk Promotion Spot ID No. 1; . . . ; Virtual Kiosk Promotion Spot ID No. N; Total Promotion Spots Ordered; and Date of Last Record Update.

FIG. 15DD is a graphical representation of the RDBMS table entitled VIRTUAL KIOSK AD CAMPAIGN, showing its primary information fields, namely: Virtual Kiosk ID No.; Date of Ad Campaign; Virtual Kiosk Ad Spot ID No. 1; Virtual Kiosk Ad Spot ID No. 2; . . . ; Virtual Kiosk Ad Spot No. N; Total Ad spots Ordered on Kiosk; Effective Change Date; and Date of Last Record Update.

FIG. 15EE is a graphical representation of the RDBMS table entitled AD CREDIT—PHYSICAL KIOSK, showing its primary information fields, namely: Advertiser ID No.; Physical Kiosk ID No.; Physical Kiosk Ad Spot ID No.; UPN of Advertised Product; URL of Interrupted Ad; Date of Interruption; Time of Interruption; UPN of Interrupting Product; Amount of Ad Credit; and Date of Last Record Update.

FIG. 15FF is a graphical representation of the RDBMS table entitled AD CREDIT—VIRTUAL KIOSK, showing its primary information fields, namely: Advertiser ID No.; Virtual Kiosk ID No.; Virtual Kiosk Ad spot ID No.; URL of Advertised Product; URL of Interrupted Ad; Date of Interruption; Time of Interruption; UPN of Interrupting Product; Amount of Ad Credit; and Date of Last Record Update.

FIG. 15GG is a graphical representation of the RDBMS table entitled PROMO CREDIT—PHYSICAL KIOSK, showing its primary information fields, namely: Advertiser ID No.; Physical Kiosk ID No.; Physical kiosk Promotion spot ID No.; UPN of Advertised Product; URL of Interrupted Promotion; Date of Interruption; Time of Interruption; UPN of Interrupting Product; Amount of Promotion Credit; and Date of Last Record Update.

FIG. 15HH is a graphical representation of the RDBMS table entitled PROMO CREDIT—VIRTUAL KIOSK, showing its primary information fields, namely: Advertiser Identification No.; Virtual Kiosk ID No.; Physical Kiosk Promotion Spot ID No.; UPN of Advertised Product; URL of Interrupted Promotion; Date of Interruption; Time of Interruption; UPN of Interrupting Product; Amount of Promotion Credit and Date of Last Record Update.

FIG. 15II is a graphical representation of the RDBMS table entitled PURCHASE AT PHYSICAL STORE, showing its primary information fields, namely: Retailer ID No.; Retail P-Store ID No.; UPN of Product Sold; Date of Product Sale; Time of Product Sale; Price of Sold Product; Customer ID No.; Credit Card No.; Retailer s Discount; URL of Promotion Advertisement; and Date of Last Record Update.

FIG. 15JJ is a graphical representation of the RDBMS table entitled PURCHASE AT E-STORE, showing its primary information fields, namely: Retailer ID No.; Retail E-Store ID No.; UPN of Product Sold; Date of Product Sale; Time of Product Sale; Price of Sold Product; Customer ID No.; Credit Card No.; Retailer s Promotion Discount; Manufacturer s Promotion discount; URL of Promotion Advertisement; and Date of Last Record Update.

FIG. 15KK is a graphical representation of the RDBMS table entitled RETAILER/E-STORE RELATON, showing its primary information fields, namely: Retail E-Store ID No.; Manufacturer #1 ID No. (e.g. MIN); Manufacturer #2 ID No.; Manufacturer #N ID No.; Total # Manufacturer Relationships; and Date of Last Record Update.

FIG. 15LL is a graphical representation of the RDBMS table entitled SHELF/AISLE RIGHTS, showing its primary information fields, namely: P-Kiosk Aisle/Shelf Location; MIN of Manufacturer #1; MIN of Manufacturer #2; MIN of Manufacturer #N; Date of Last Record Update.

FIG. 15MM is a graphical representation of the RDBMS table entitled E-STORE WEB-PAGE RIGHTS, showing its primary information fields, namely: E-Store Web-Page Location; MIN of Manufacturer #1; MIN of Manufacturer #2; MIN of Manufacturer #N; and Date of Last Record Update.

FIG. 16 is a table listing the primary modes of information service provided to manufacturers and their agents by the Internet-Based Consumer Product Related Information Link Creation, Management And Transport Subsystem of the present invention.

Figure 16A:
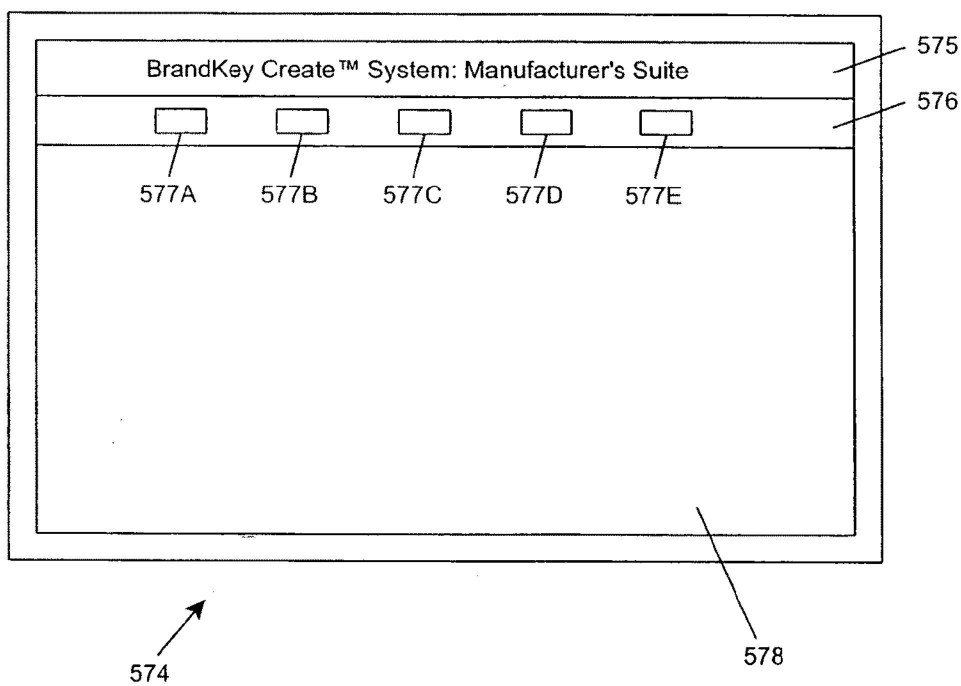

FIG. 16A is a schematic representation of an exemplary GUI used by manufacturers to register with the Internet-Based Consumer Product Related Information Link Creation, Management And Transport Subsystem of the present invention, and access, control and manage the various functions supported thereby.

Figure 17:
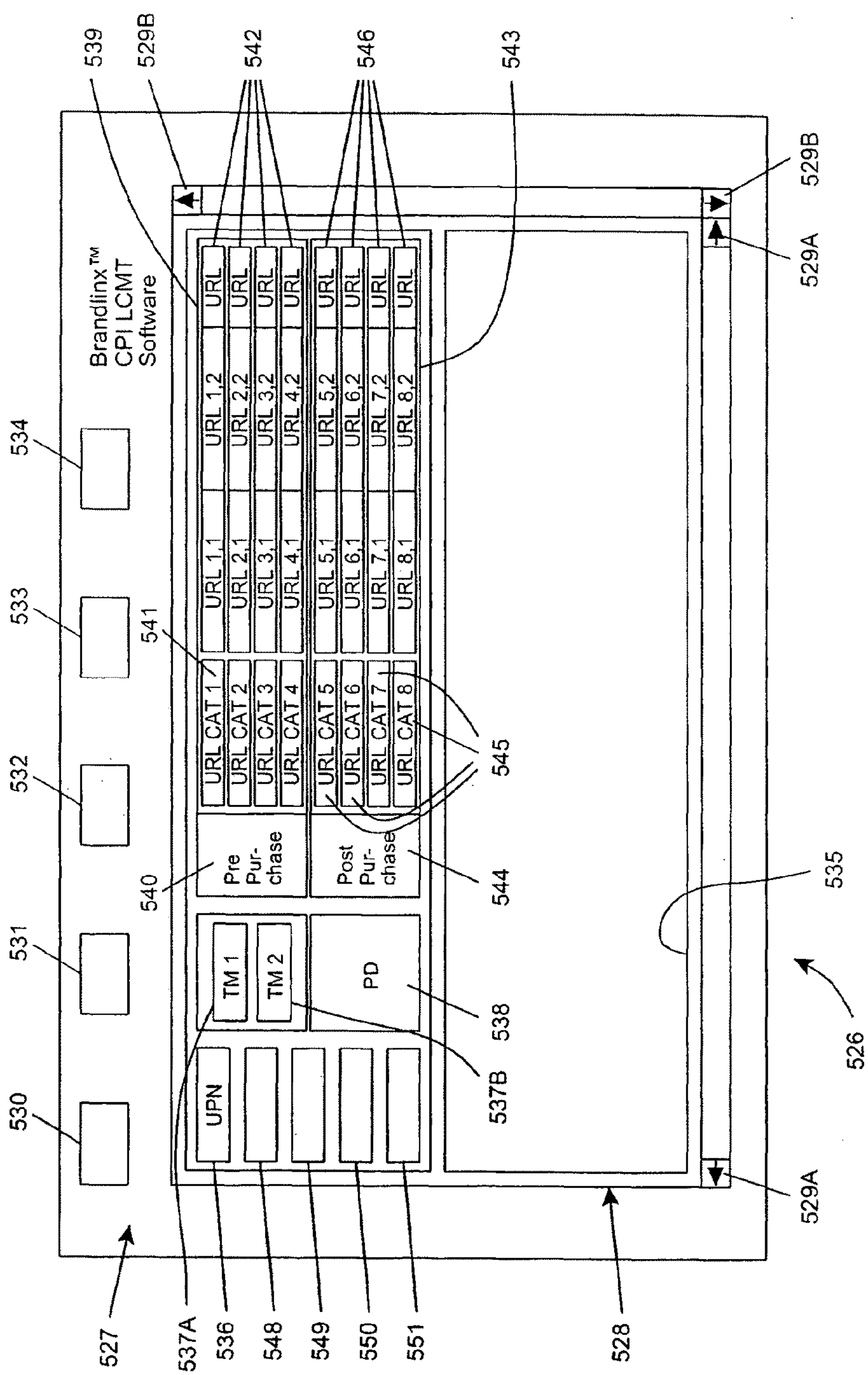

FIG. 17 is a schematic representation of an exemplary GUI, which can be used by manufacturers to register with the Consumer Product Related Information Link Creation, Management And Transport Subsystem of the present invention, and access and use the information services supported thereby.

Figure 17A:
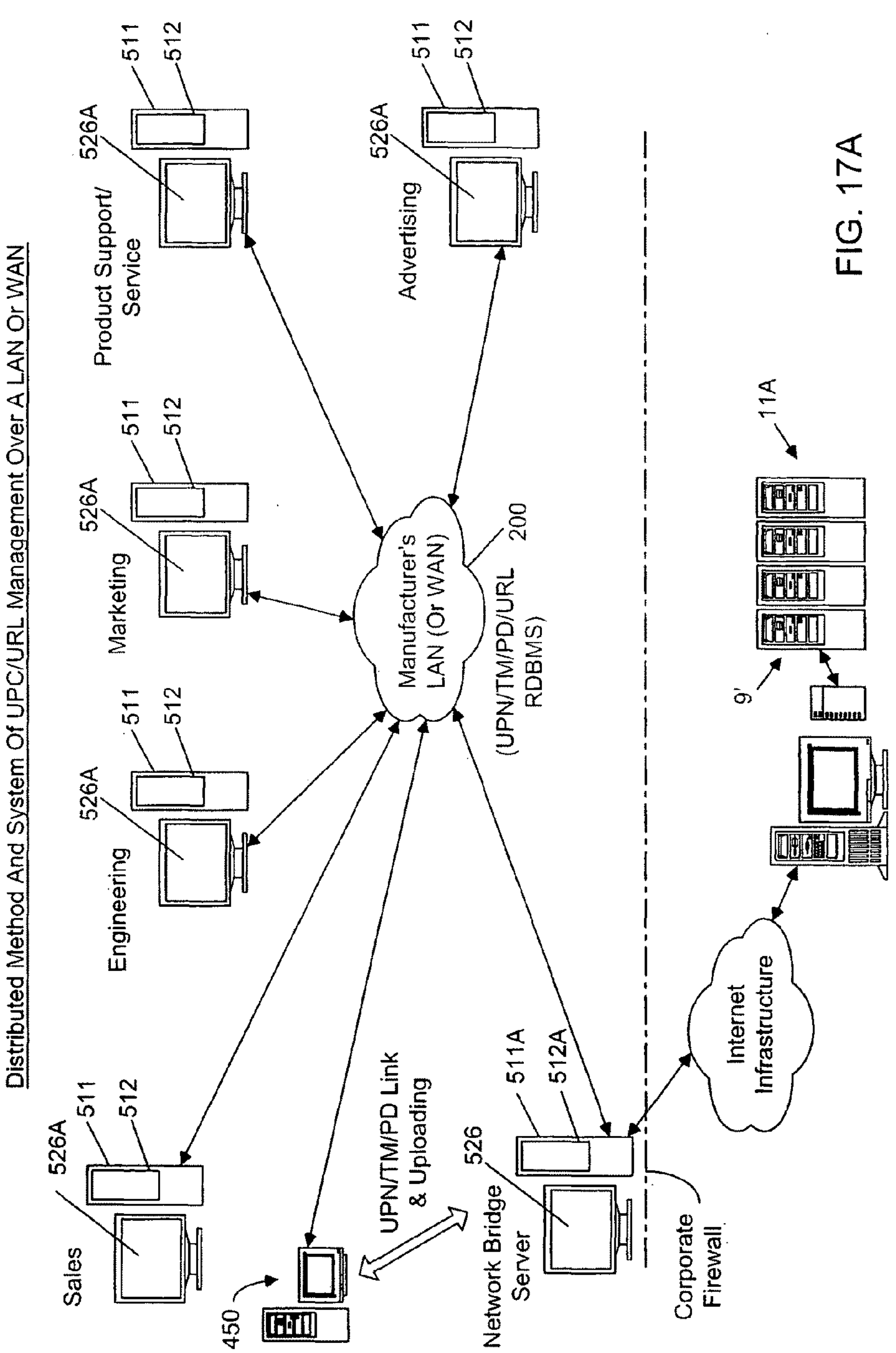

FIG. 17A is a schematic representation of a portion of the system shown in FIGS. 9A through 13, wherein a plurality of manufacturer-operated client subsystems are shown connected to a local or wide area IP-based network, preferably maintained behind a secure corporate firewall, and the secured manufacturer information network is connected to the infrastructure of the Internet by way of an Internet router and server, for the purpose of enabling different departments within a business organization (e.g. marketing, sales, engineering, support and service, advertising, finance, etc.) manage different types of UPN/TM/PD/URL links in accordance with the distributed method of URL category management of the present invention.

Figure 17B:
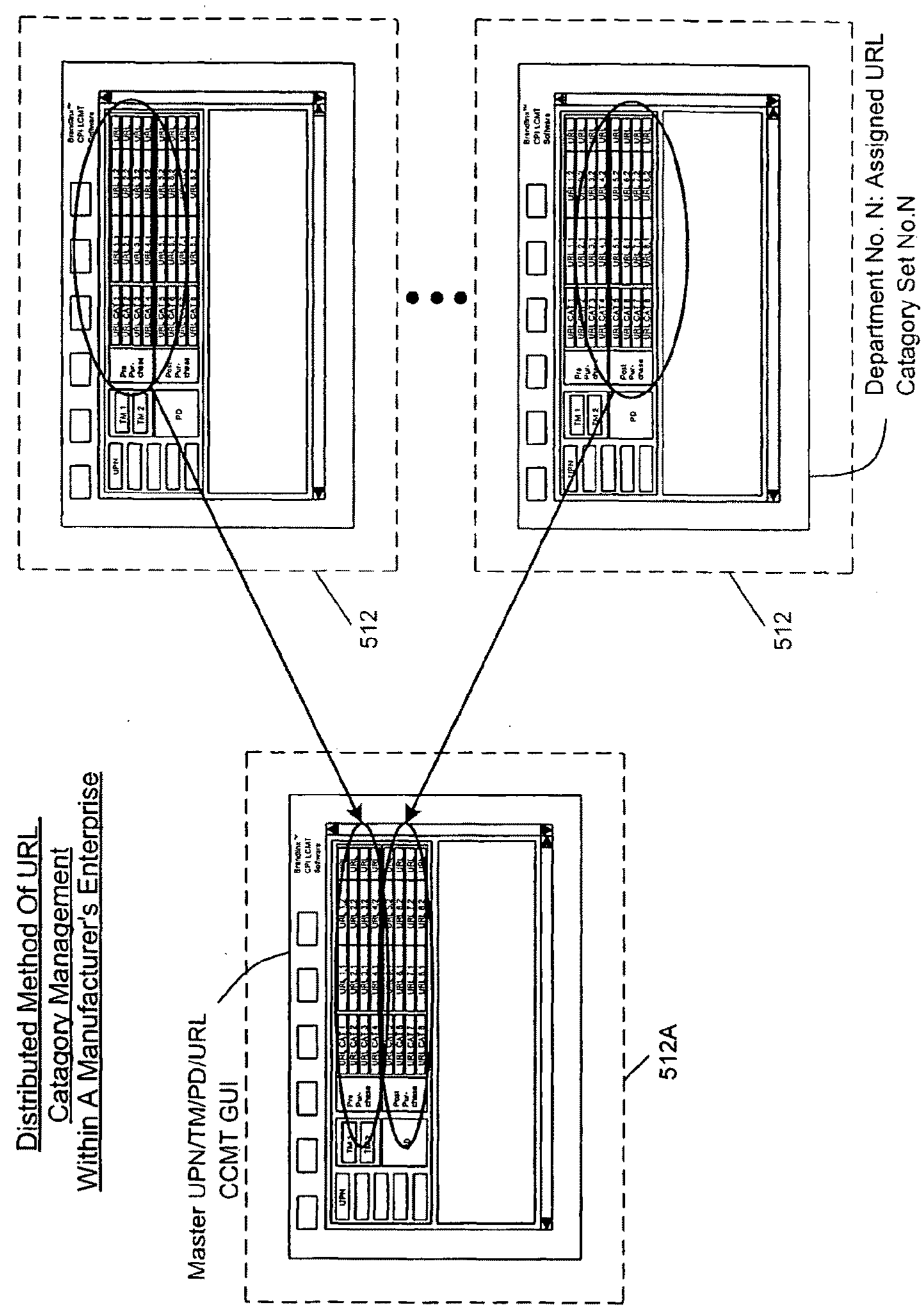

FIG. 17B is a schematic representation of a distributed method of URL category management within a manufacturer s enterprise, wherein a different set of CPI URL categories are assigned to and managed by a different department within the manufacturer s enterprise using a local GUI similar to the one schematically illustrated in FIG. 17, but constrained to accept the entry of URL data for only the set of URL categories assigned by the central UPN/TM/PD/URL management GUI maintained within the manufacturer s enterprises.

Figure 18A:
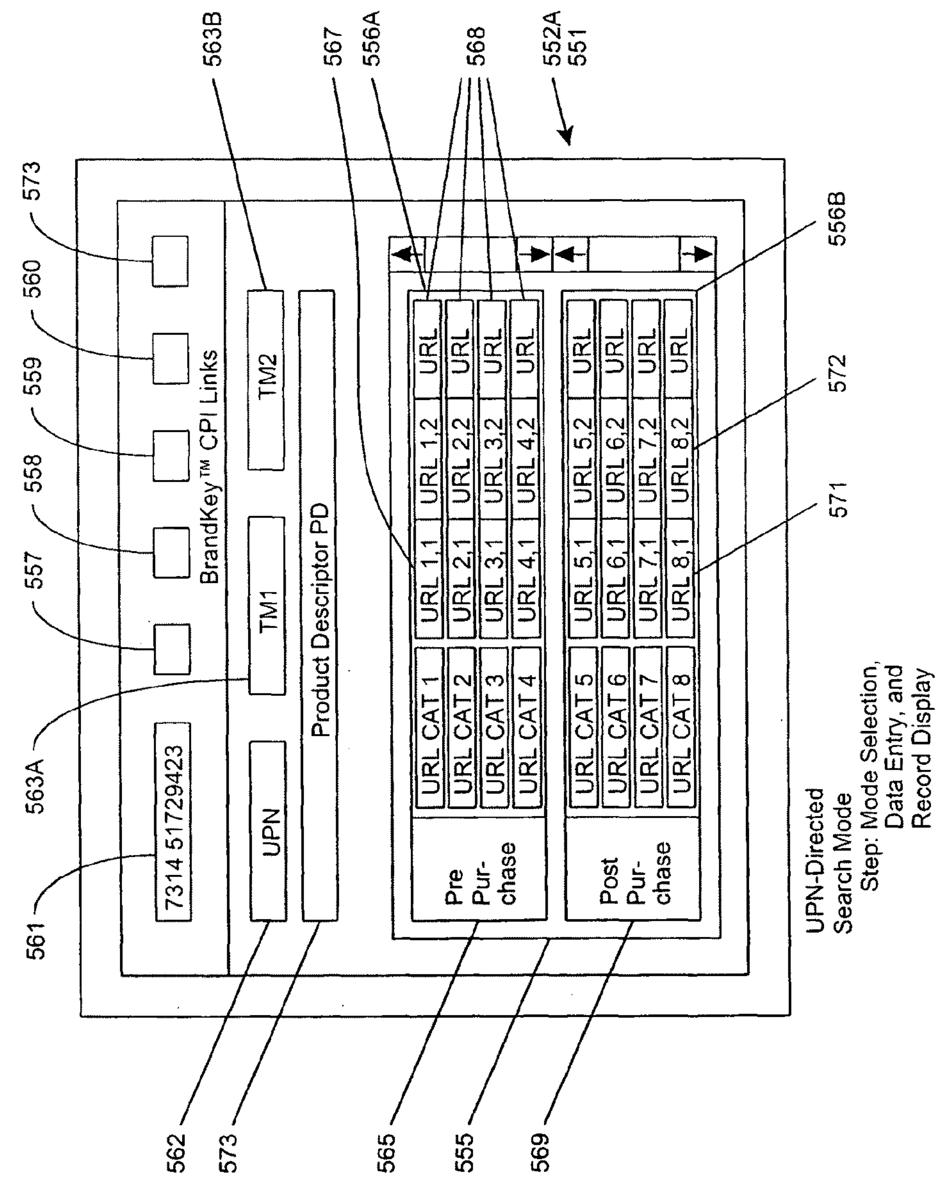

FIG. 18A is a schematic representation of an exemplary (physical or virtual) kiosk GUI which is displayed when (i) the UPN-directed search mode has been selected by the consumer, (ii) UPN data has been entered into the kiosk GUI by either manual data entry into the UPN-entry window in the kiosk GUI or by reading a UPN bar code symbol on a product using a bar code scanner connected to the kiosk, (iii) a database search against the UPN/TM/PD/URL RDBMS has been made, and (iv) the UPN/TM/PD/URL link record retrieved from the database search has been displayed within the kiosk GUI.

FIG. 18B1 is a schematic representation of an exemplary (physical or virtual) kiosk GUI which is displayed when (i) the TM-directed search mode has been selected by the consumer, and (ii) a keyboard emulation screen is automatically displayed to enable the consumer to enter trademark (TM) data into the kiosk GUI by manual data entry.

FIG. 18B2 is a schematic representation of an exemplary (physical or virtual) kiosk GUI which is displayed when (i) the TM-directed search mode has been selected by the consumer, (ii) TM data has been entered into the kiosk GUI by manual data entry using the displayed keyboard emulation screen, (iii) a database search against the UPN/TM/PD/URL RDBMS has been made, and (iv) the UPN/TM/PD/URL link record retrieved from the database search has been displayed within the kiosk GUI.

FIG. 18C1 is a schematic representation of an exemplary (physical or virtual) kiosk GUI which is displayed when (i) the PD-directed search mode has been selected by the consumer, and (ii) a keyboard emulation screen is automatically displayed to enable the consumer to enter product descriptor (PD) data into the kiosk GUI by manual data entry.

FIG. 18C2 is a schematic representation of an exemplary (physical or virtual) kiosk GUI which is displayed when (i) the PD-directed search mode has been selected by the consumer, (ii) PD data has been entered into the kiosk GUI by manual data entry using the displayed keyboard emulation screen, (iii) a database search against the UPN/TM/PD/URL RDBMS has been made, and (iv) the UPN/TM/PD/URL link record retrieved from the database search has been displayed within the kiosk GUI.

FIGS. 19A and 19B taken together provide a table listing the primary modes of information service provided to retailers and consumers alike by the Internet-Based Consumer Product Information Kiosk Configuration, Deployment, Management and Access Subsystem of the present invention.

Figure 20A:
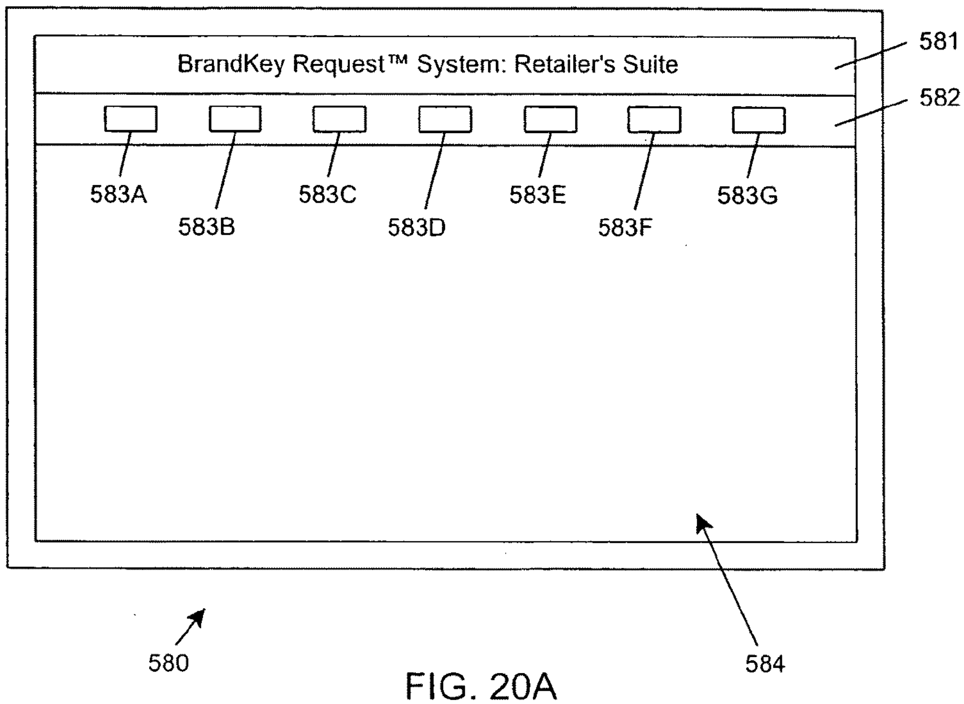

FIG. 20A is a schematic representation of an exemplary GUI used by retailers to register with Consumer Product Information Kiosk Configuration, Deployment, Management and Access Subsystem of the present invention, and access, control and manage the various functions supported thereby.

Figure 20B:
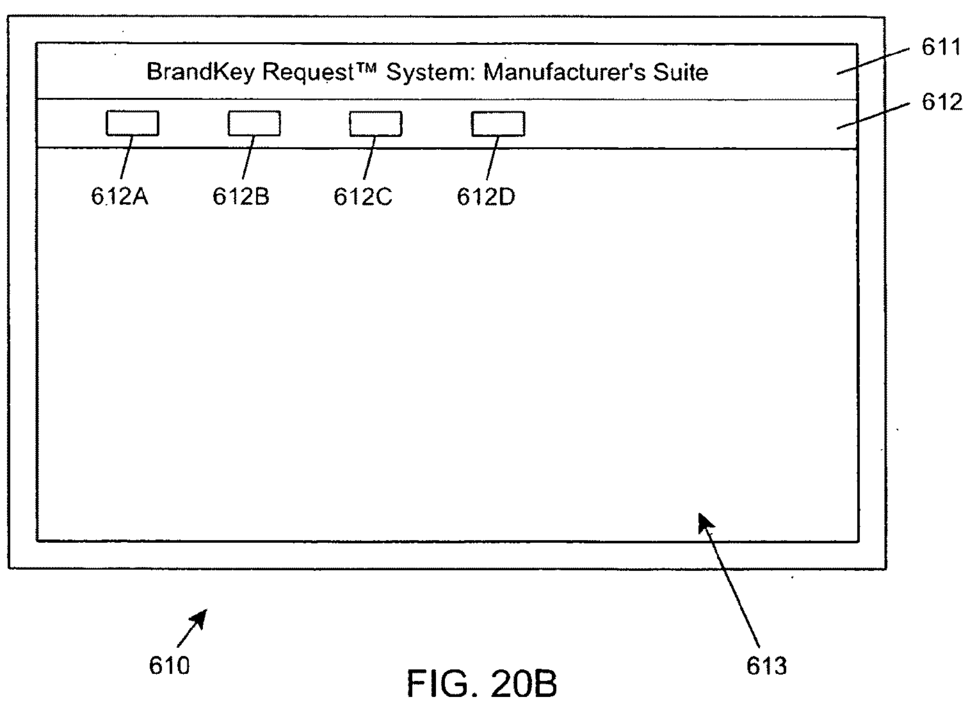

FIG. 20B is a schematic representation of an exemplary GUI used by manufacturers to register with Consumer Product Information Kiosk Configuration, Deployment, Management and Access Subsystem of the present invention, and access, control and manage the various functions supported thereby.

Figure 21A:
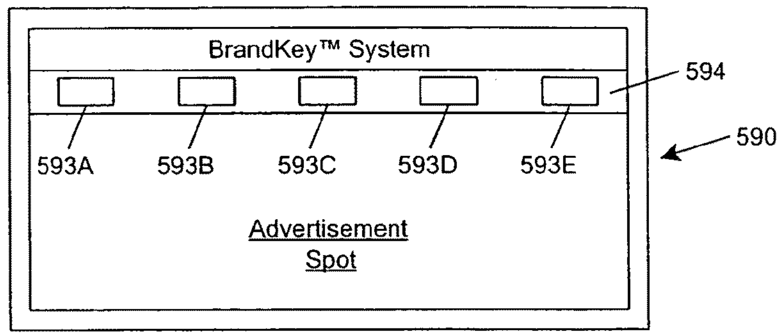

FIG. 21A is a schematic representation of an exemplary three-frame Netscape-style GUI screen displayed on the multi-mode physical CPI kiosk of the present invention, during its Advertisement Spot Display Mode of operation, in which purchased advertisement spots loaded in the physical CPI kiosk's advertisement/promotion spot queue are automatically displayed on the display screen of the physical CPI kiosk during its quiescent moments (i.e. when consumer are not making CPI requests).

Figure 21B:
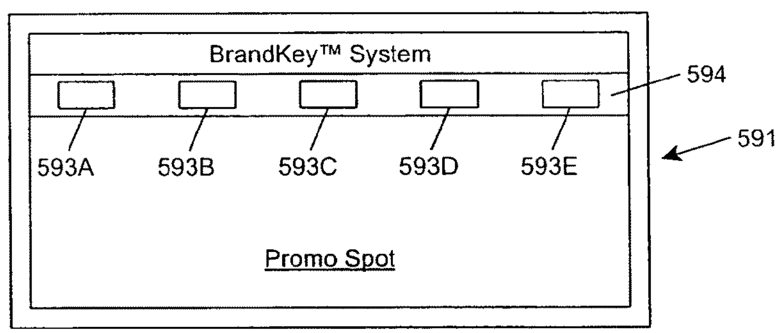

FIG. 21B is a schematic representation of an exemplary three-frame Netscape-style GUI screen displayed on the multi-mode physical CPI kiosk of the present invention during its Promotion Spot Display Mode of operation, in which purchased promotion spots loaded into the physical CPI kiosk's advertisement/promotion spot queue are automatically displayed on the display screen of the physical CPI kiosk during its quiescent moments (i.e. when consumer are not making CPI requests).

Figure 21C:
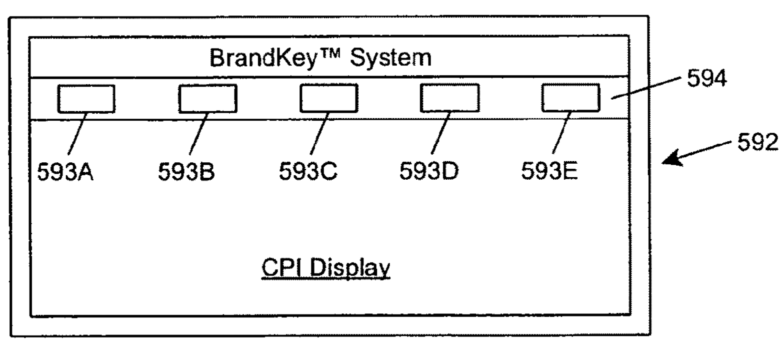

FIG. 21C is a schematic representation of a first exemplary three-frame Netscape-style GUI kiosk screen for automatic display on a multi-mode physical CPI kiosk of the present invention when engaged into its CPI Display Mode of operation in response to an interruption of its Advertisement Spot Display Mode of operation or its Promotion Spot Display Mode of operation, and wherein CPI requested by a consumer is displayed in response to manual data input or scanning of UPN labels on consumer products.

Figure 22:
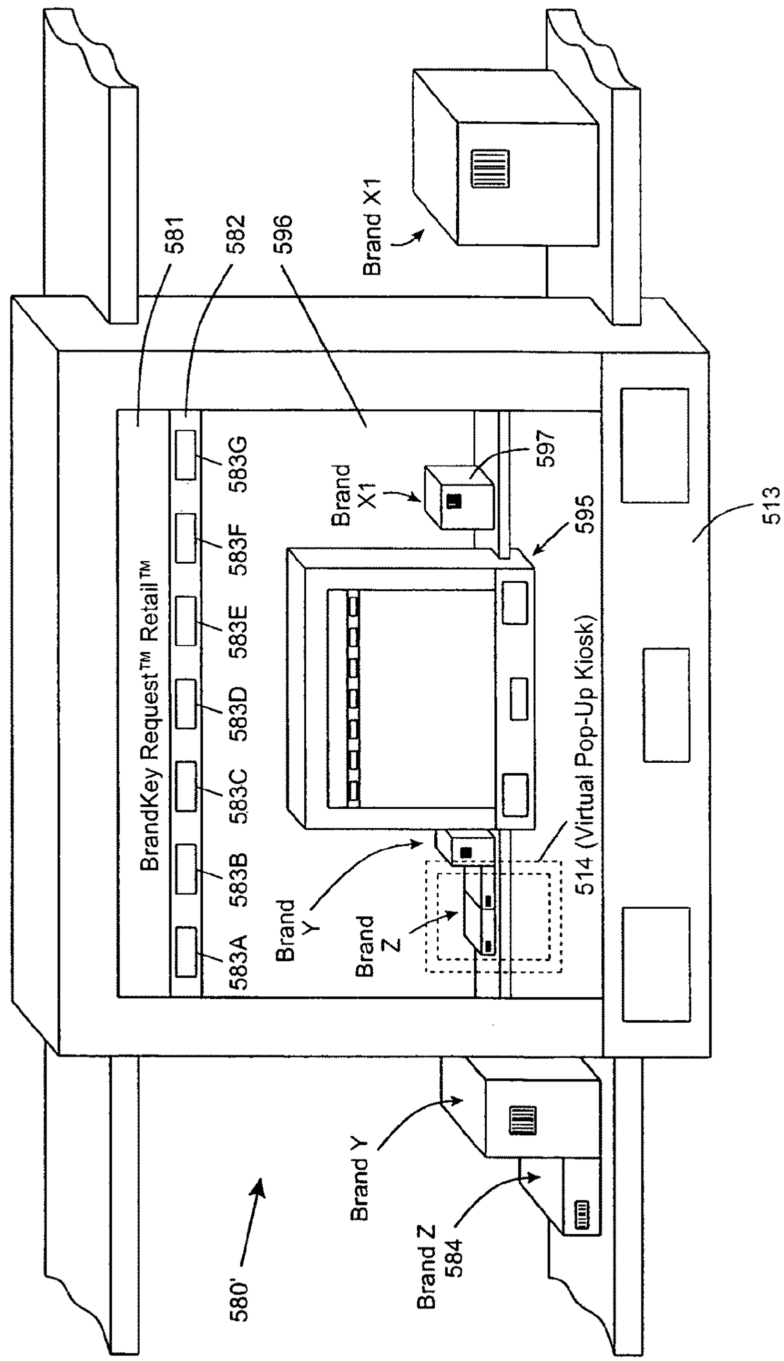

FIG. 22 is a schematic representation of a second exemplary three-frame Netscape-style GUI kiosk screen for automatic display on a multi-mode physical CPI kiosk of the present invention when engaged in its CPI Display Mode of operation (in response to an interruption of its Advertisement or Promotion Spot Display Mode of operation), during which a virtual 2-D or 3-D computer graphics model of the physical CPI kiosk, its surrounding aisles, shelf-space and products stocked thereon is displayed on the kiosk GUI screen, and requested UPN/TM/PD/URL link records retrieved from UPN/TM/PD/URL RDBMS 9' are displayed on the GUI kiosk screen in response to either (i) the manual entry of search criteria (e.g. UPN, TM or PD) into the search window of the kiosk GUI, or (ii) the optical scanning of UPN labels applied to consumer products by manufacturers.

Figure 23:
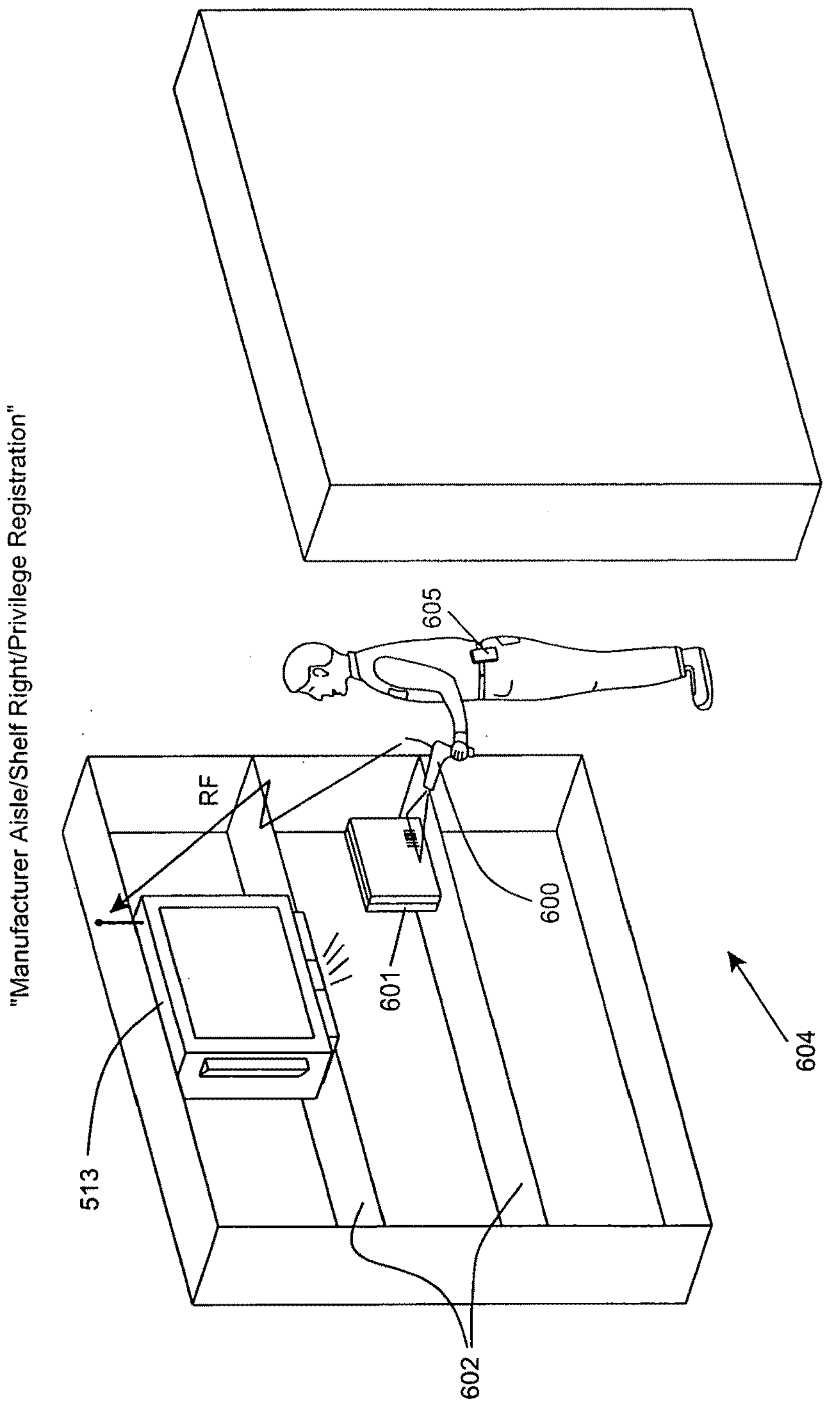

FIG. 23 is a schematic representation of a physical-type CPI kiosk installed within the aisle of a retailer's store, and operating in its manufacturer aisle/shelf right/privilege registration mode, so that a manufacturer's aisle/shelf rights/privileges can be registered with respect to the CPI kiosk by either reading the bar code symbol on the consumer product using a portable bar code reader, or reading the trademark/brand name on the product using an optical character reader, preferably RF-linked to the CPI kiosk or LAN to which the kiosk is connected in accordance with the principles of the present invention.

Figure 24A:
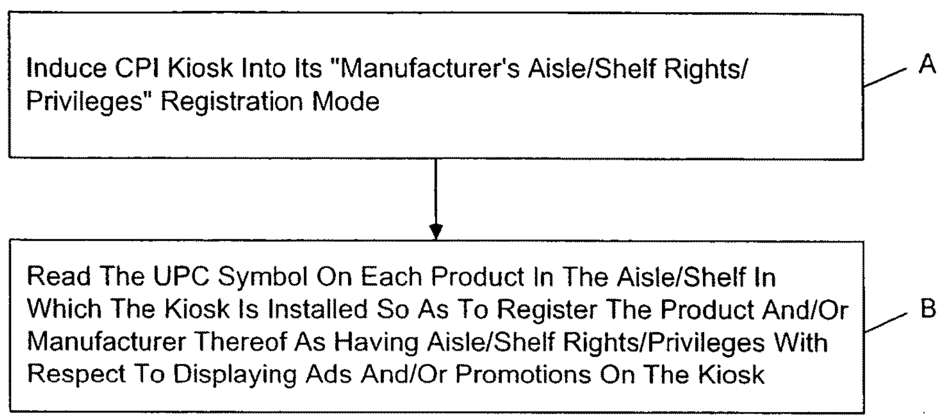

FIG. 24A show a high-level flow chart illustrating the primary steps involved in carrying lout a UPN-directed method of registering manufacturer aisle/shelf rights/privileges with a particular CPI kiosk, as schematically depicted in FIG. 23.

Figure 24B:
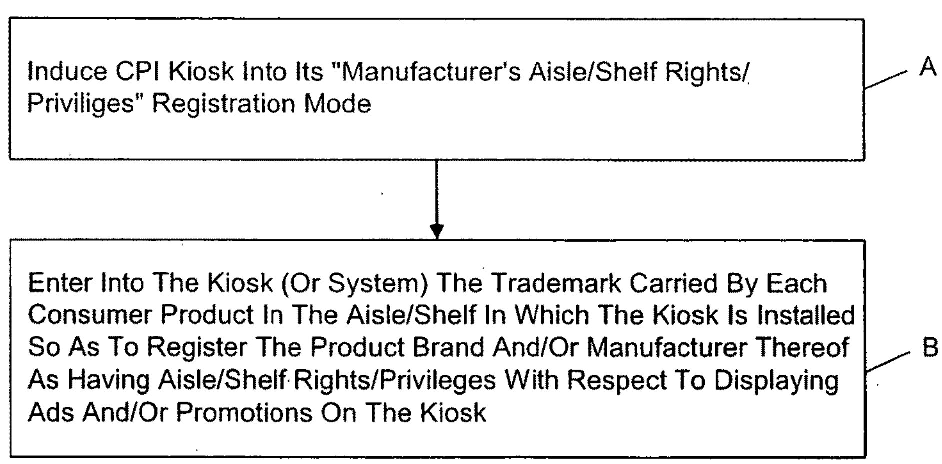

FIG. 24B show a high-level flow chart illustrating the primary steps involved in carrying out a Trademark/Brand name-directed method of registering manufacturer aisle/shelf rights/privileges with a particular CPI kiosk, as schematically depicted in FIG. 23.

Figure 25:
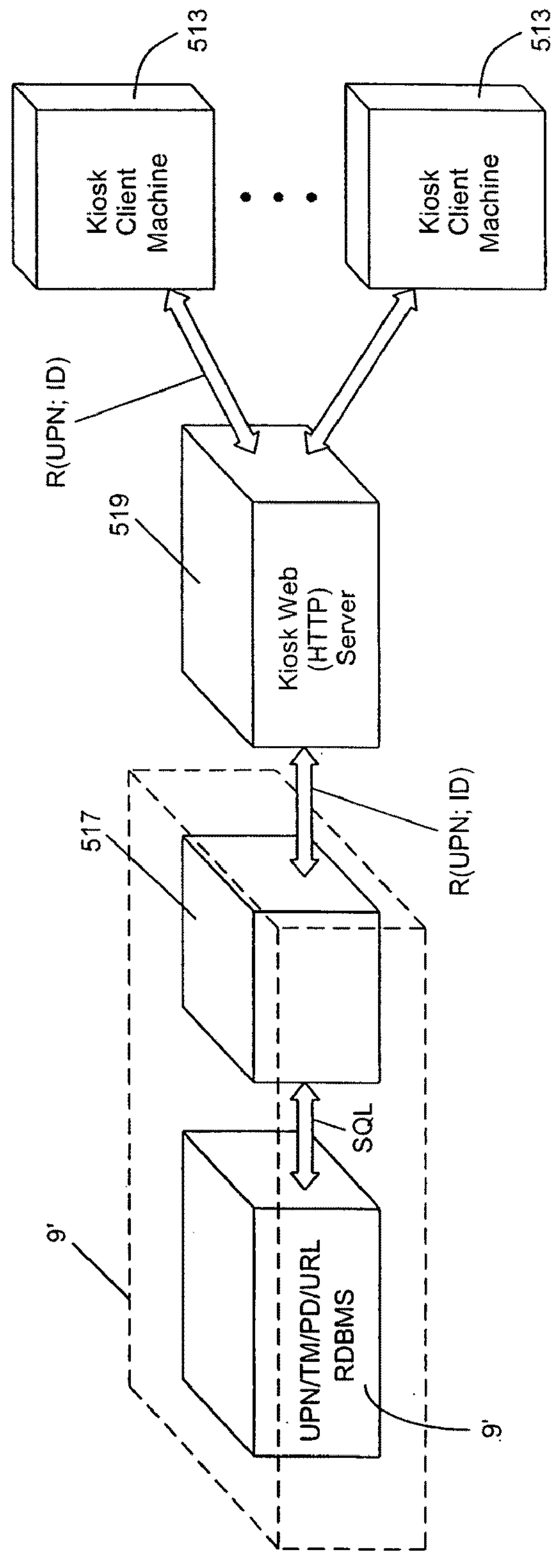

FIG. 25 is a schematic representation of the data-processing method carried out in response to CPI requests made by consumers from physical retailer-based CPI kiosks in accordance with the principles of the present invention.

Figure 26A:
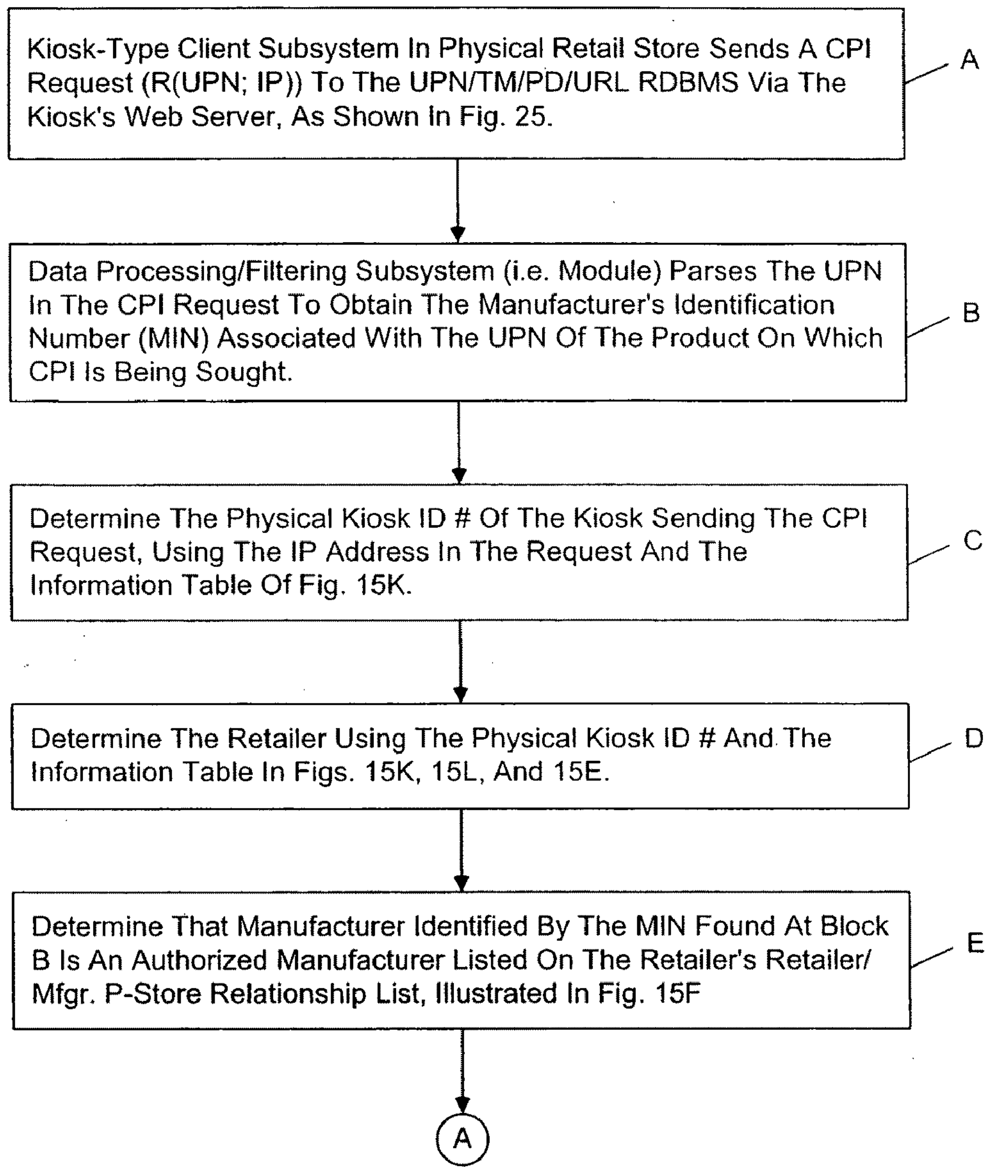
Figure 26B:
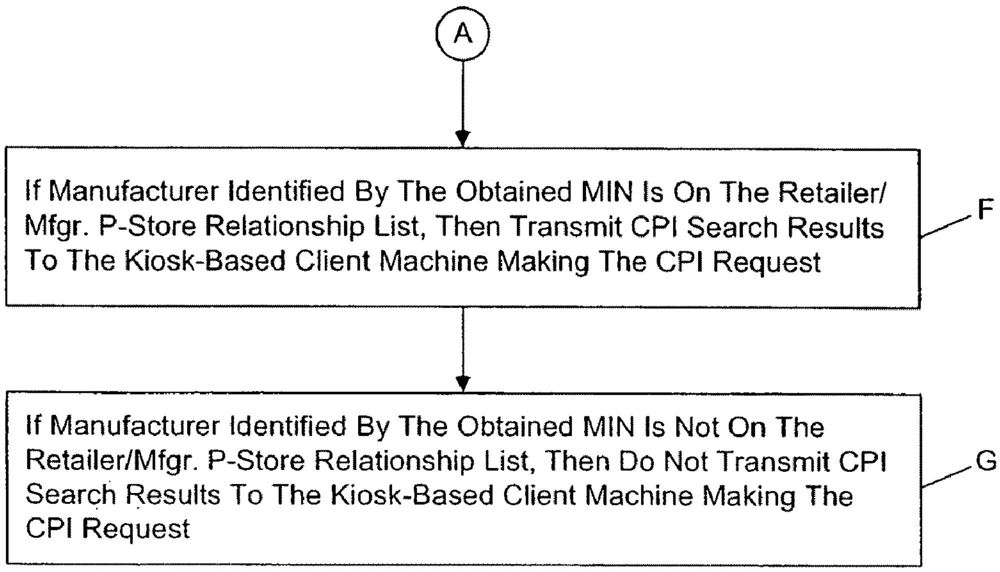

FIGS. 26A and 26B, taken together, show a high-level flow chart illustrating the primary steps involved in carrying out the data-processing method schematically depicted in FIG. 25.

Figure 27:
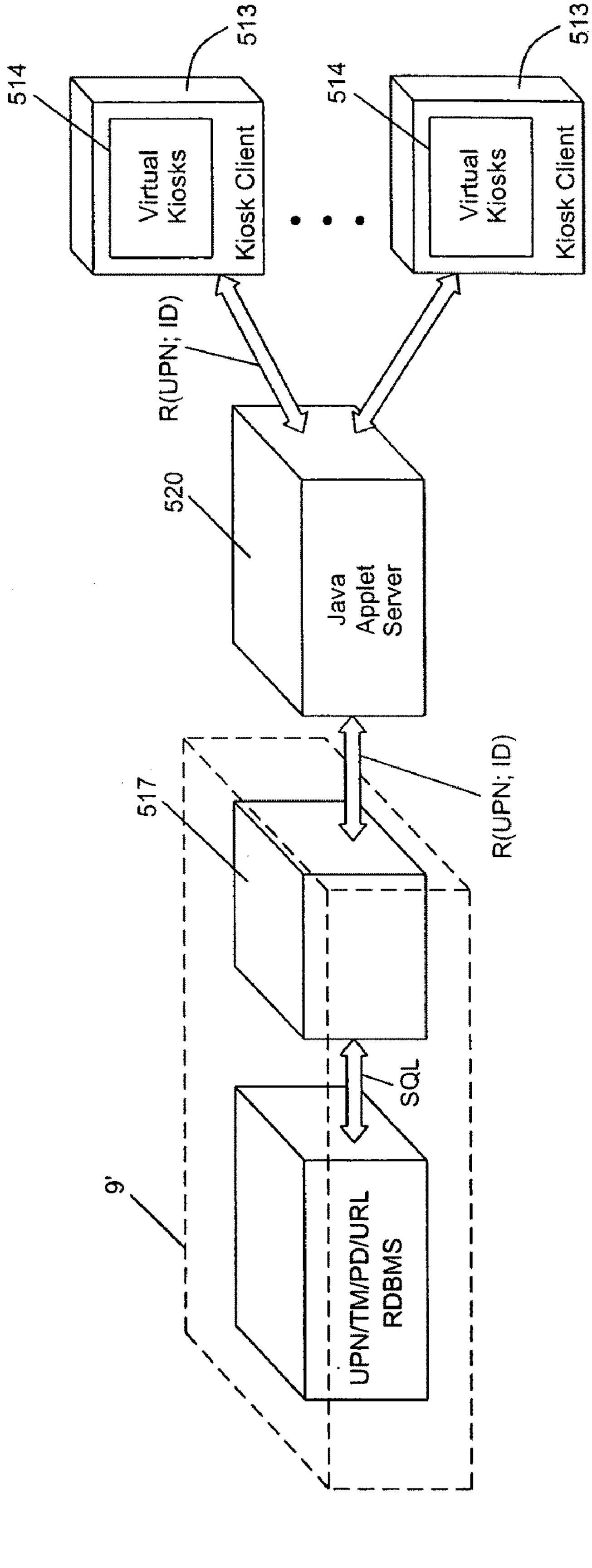

FIG. 27 is a schematic representation of the data-processing method carried out in response to CPI requests made by consumers from virtual-type retailer-based CPI kiosks in accordance with the principles of the present invention.

Figure 28A:
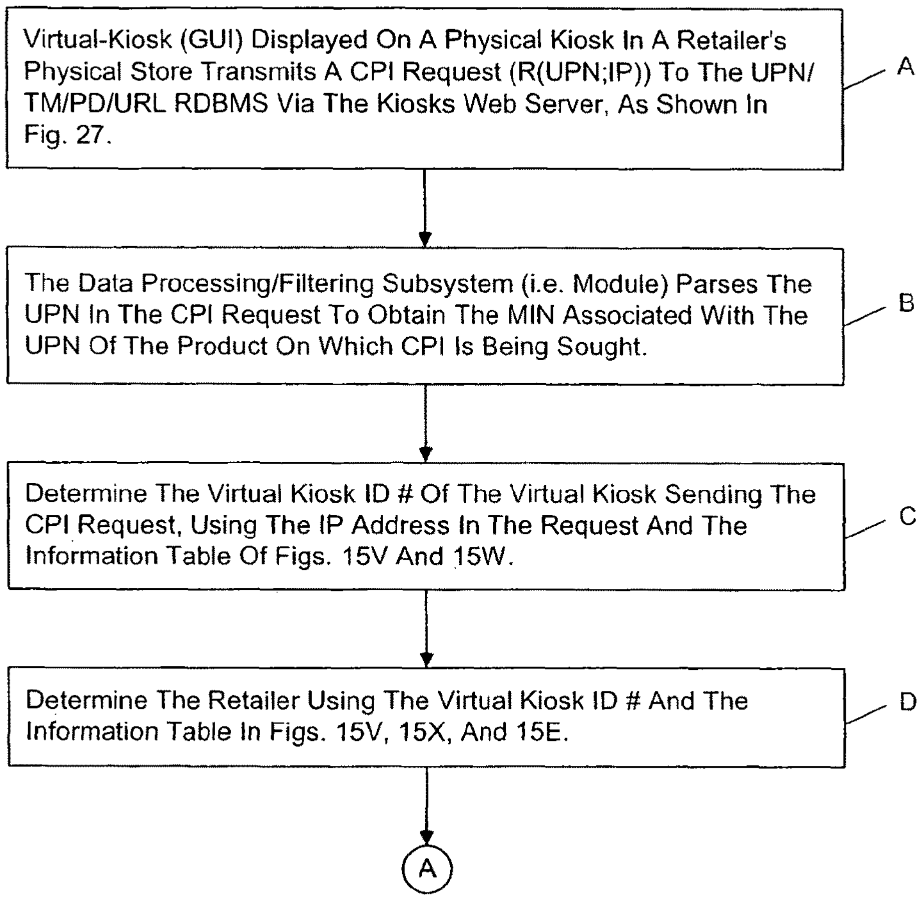
Figure 28B:
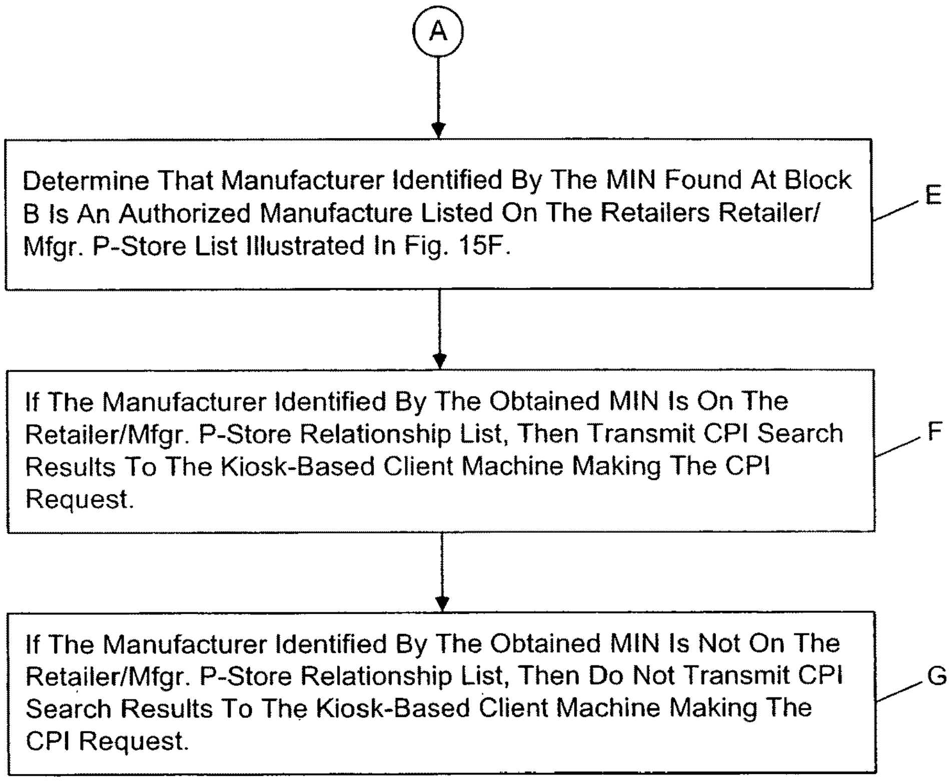

FIGS. 28A and 28B, taken together, show a high-level flow chart illustrating the primary steps involved in carrying out the data-processing method schematically depicted in FIG. 27.

FIG. 29 is a table listing the primary modes of information service provided to advertisers by the Internet-Based Consumer Product Advertisement Marketing, Programming And Delivery Subsystem of the present invention.

Figure 30:
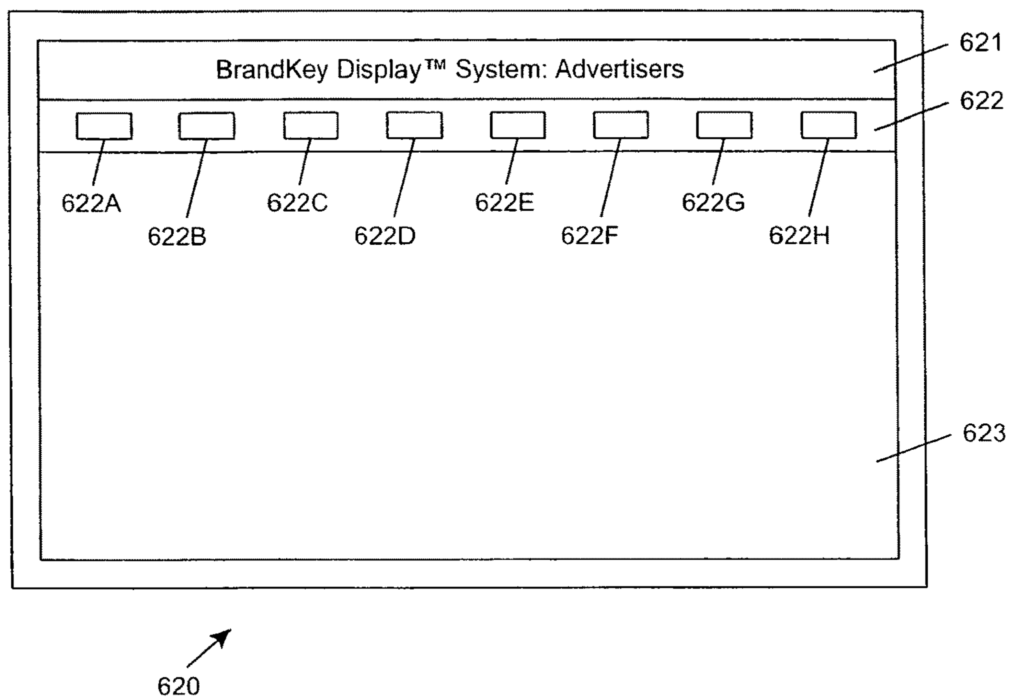

FIG. 30 is a schematic representation of an exemplary CPI kiosk GUI which can be displayed on each Web-enabled client machine used by an advertiser to access and use the information services provided by the Internet-based consumer product advertisement marketing, programming and delivery subsystem of the present invention.

FIG. 31 is a schematic representation of the data-processing method applied during the generation of a consumer product advertising directory identifying a deployed network of physical and virtual types of retailer-based CPI kiosks on which particular advertisers and advertising agents are authorized by retailers to display product advertisements, in accordance with the principles of the present invention.

Figure 32A:
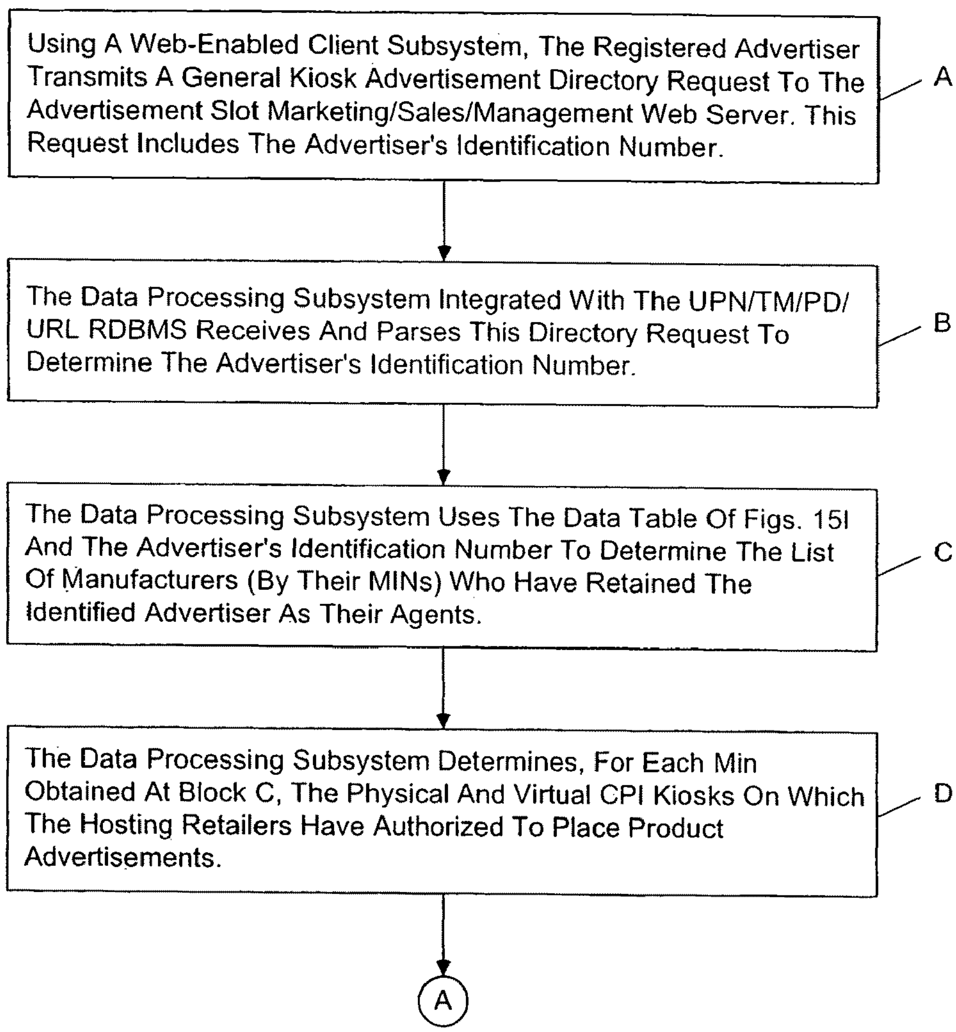
Figure 32B:
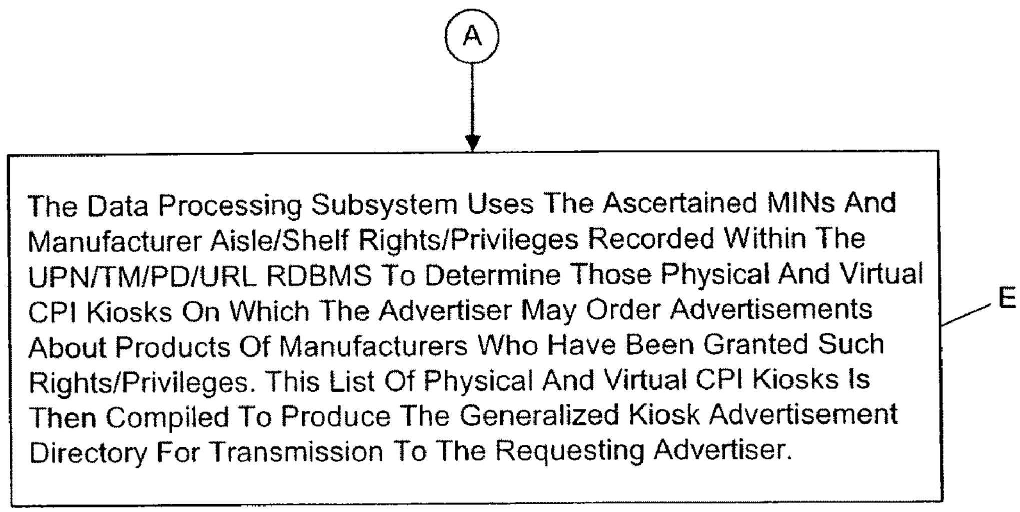

FIGS. 32A and 32B, taken together, show a high-level flow chart illustrating the primary steps involved in carrying out the data-processing method schematically depicted in FIG. 31.

FIG. 33 is a schematic representation of the data-processing method applied during the generation of a retail kiosk advertising directory identifying a deployed network of physical and virtual types of retailer-based CPI kiosks on which a particular advertiser or advertising agent is authorized by kiosk-hosting retailers to display product advertisements regarding a particular brand of UPN-indexed consumer product in accordance with the principles of the present invention.

Figure 34B:
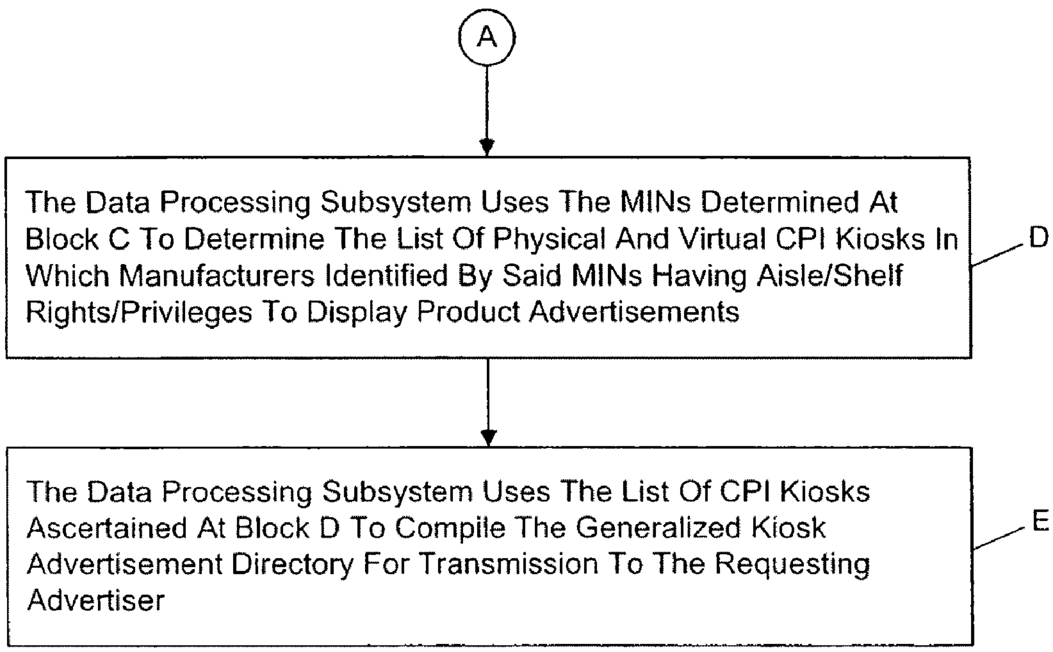

FIGS. 34A and 34B, taken together, show a high-level flow chart illustrating the primary steps involved in carrying out the data-processing method schematically depicted in FIG. 33.

FIG. 35 is a table listing the primary modes of information service provided to advertisers by the Internet-Based Consumer Product Promotion Marketing, Programming And Delivery Subsystem of the present invention.

Figure 36:
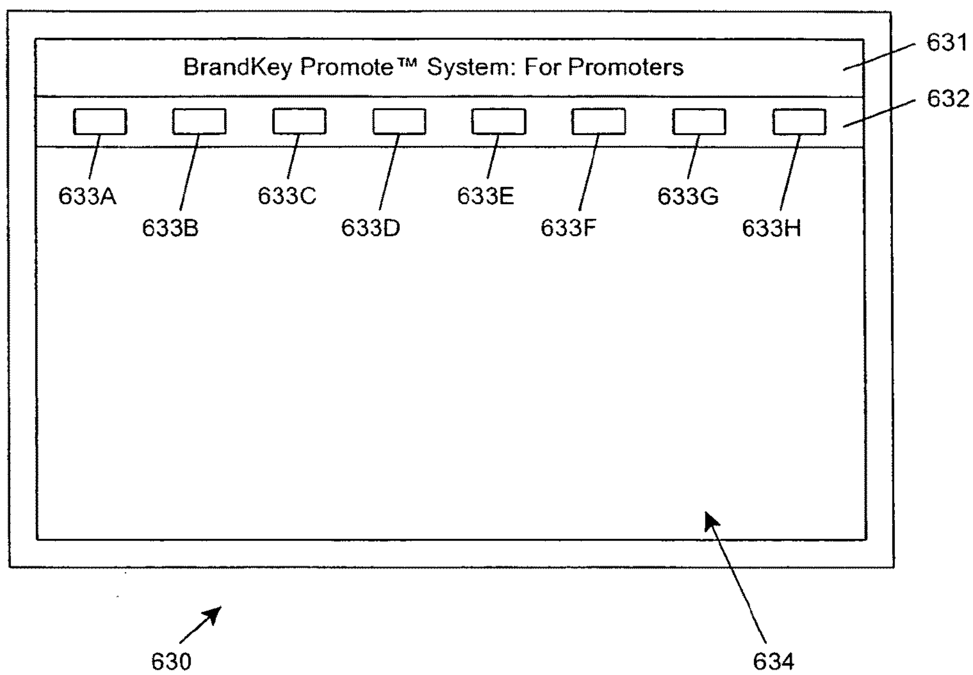

FIG. 36 is a schematic representation of an exemplary CPI kiosk GUI which can be displayed on each Web-enabled client machine used by an advertiser to access and use the information services provided by the Internet-based consumer product advertisement marketing, programming and Delivery subsystem of FIG. 35.

Figure 37:
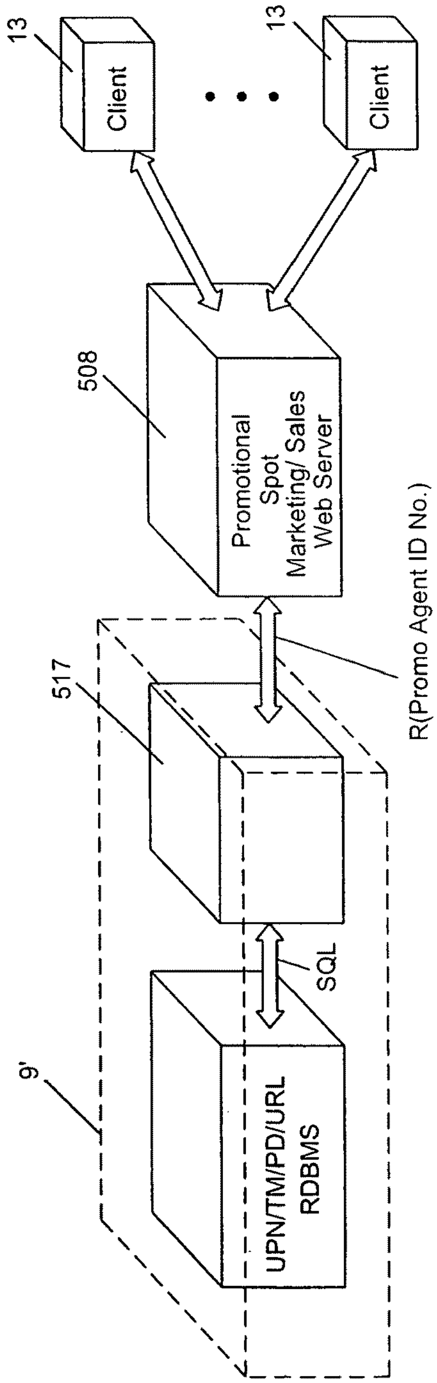

FIG. 37 is a schematic representation of the data-processing method applied during the generation of a retail kiosk promotion directory identifying a deployed network of physical and virtual types of retailer-based CPI kiosks on which particular promoters and promotional agents are authorized by retailers to display product promotions in accordance with the principles of the present invention.

Figure 38B:
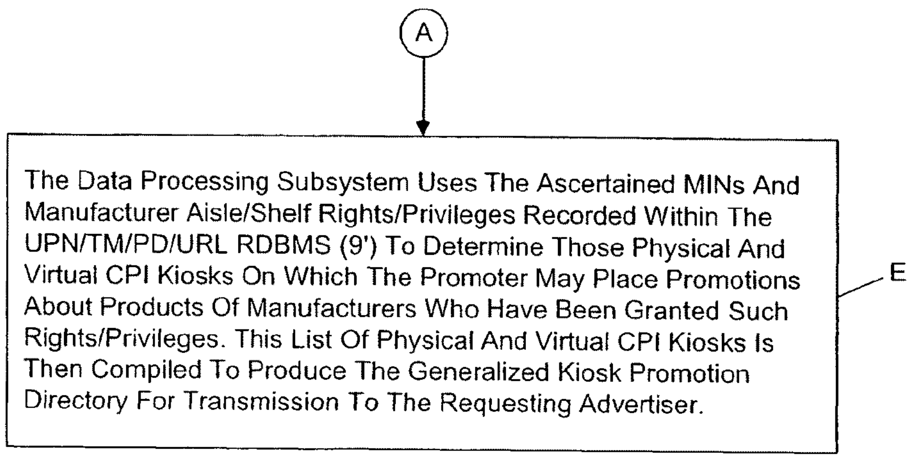

FIGS. 38A and 38B, taken together, show a high-level flow chart illustrating the primary steps involved in carrying out the data-processing method schematically depicted in FIG. 37.

FIG. 39 is a schematic representation of the data-processing method applied during the generation of a retail kiosk promotion directory identifying a deployed network of physical and virtual types of retailer-based CPI kiosks on which a particular promoter or promotional agent is authorized by kiosk-hosting retailers to display product promotions regarding a particular brand of UPN-indexed consumer product in accordance with the principles of the present invention.

Figure 40A:
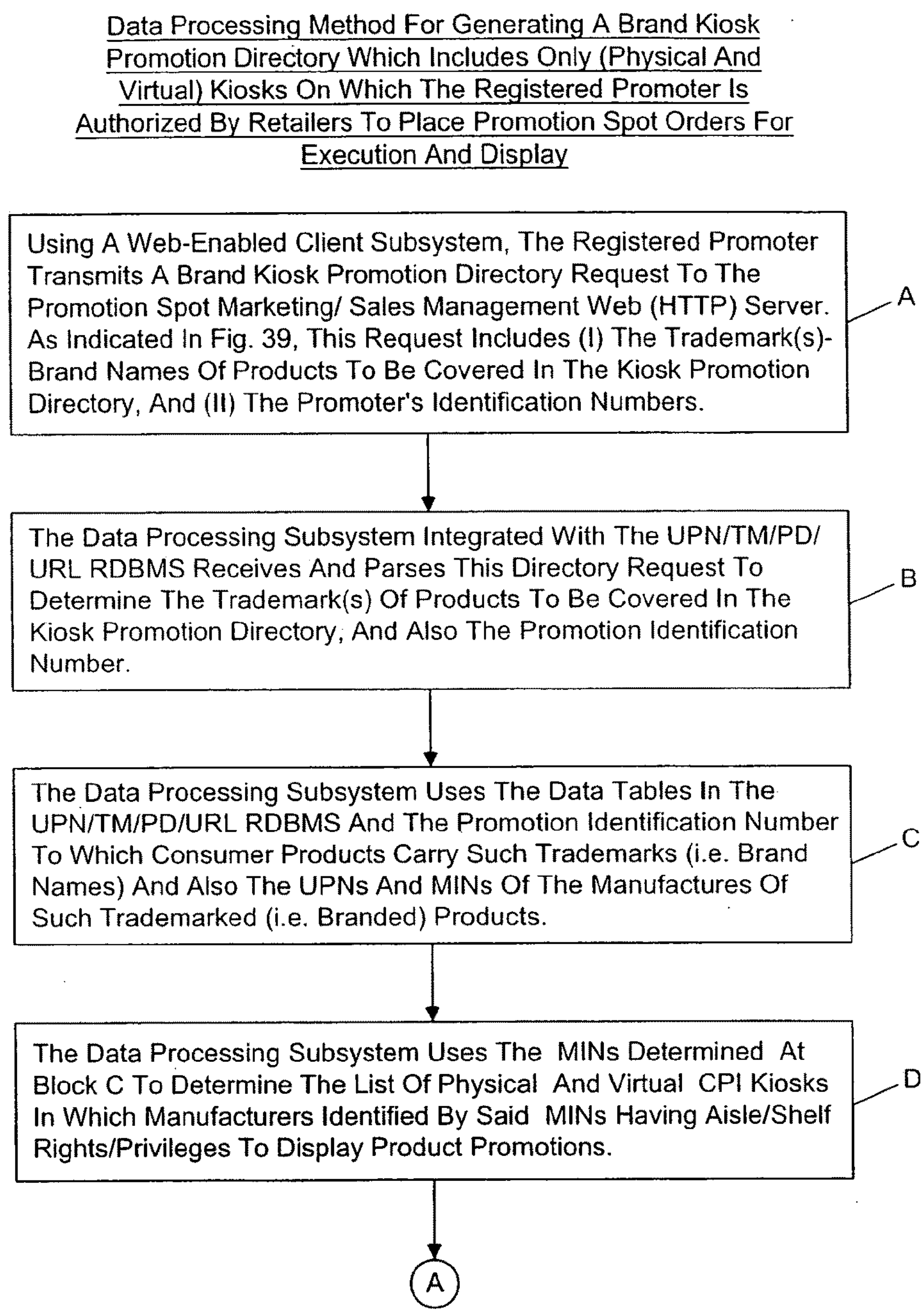
Figure 40B:
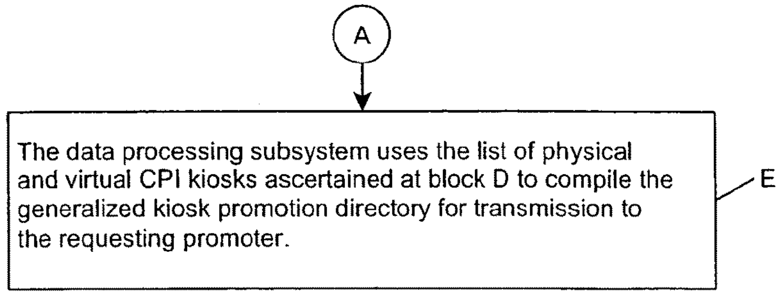

FIGS. 40A and 40B, taken together, show a high-level flow chart illustrating the primary steps involved in carrying out the data-processing method schematically depicted in FIG. 39.

Figure 41:
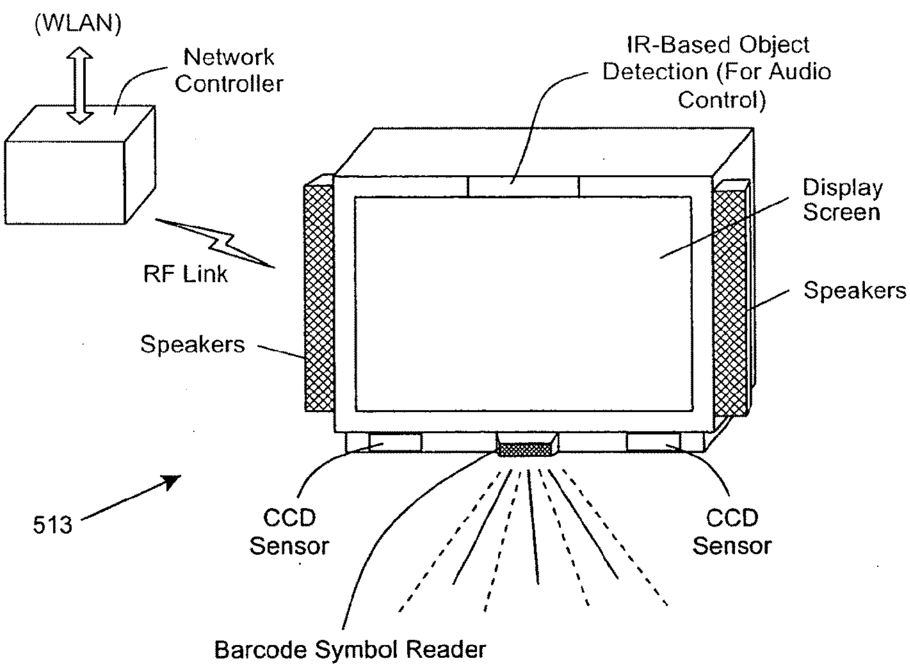

FIG. 41 is a schematic representation of a "multi-mode" physical CPI kiosk of the present invention, as shown in FIGS. 3A3, 3A4 and/or 3A10B, programmed with three different modes of display operation (i.e. CPI Display Mode, Advertisement Spot Display Mode and Promotion Display Mode), and deployed within a physical retail shopping environment in accordance with the present invention.

Figure 42A:
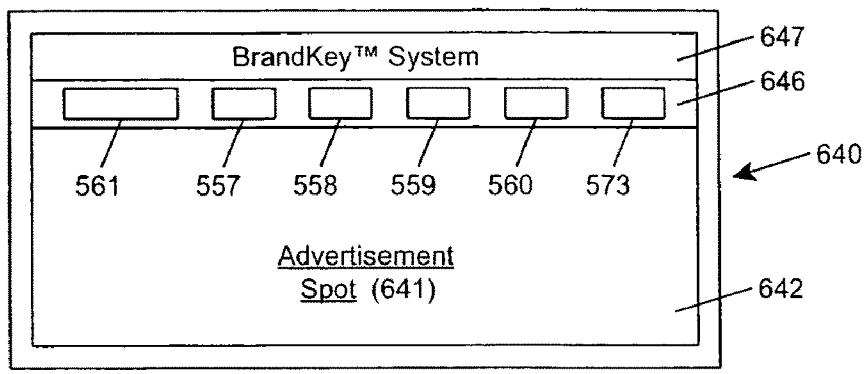

FIG. 42A is a schematic representation of an exemplary GUI screen displayed on the multi-mode physical CPI kiosk of FIG. 41, during its CPI Display Mode of operation, in which requested CPI by a consumer is displayed in response to manual data input or scanning of UPN labels on consumer products.

Figure 42B:
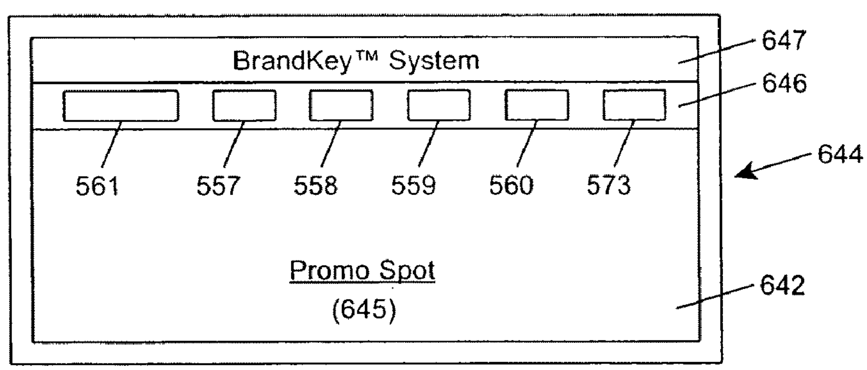

FIG. 42B is a schematic representation of an exemplary GUI screen displayed on the multi-mode physical CPI kiosk of FIG. 41, during its Advertisement Spot Display Mode of operation, in which purchased advertisement spots loaded in the physical CPI kiosk's advertisement/promotion spot queue are automatically displayed on the display screen of the physical CPI kiosk during its quiescent moments (i.e. when consumer are not making CPI requests).

Figure 42C:
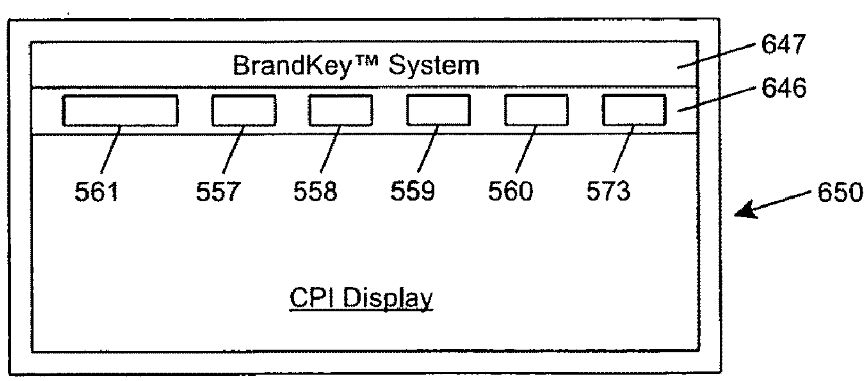

FIG. 42C is a schematic representation of an exemplary GUI screen displayed on the multi-mode physical CPI kiosk of FIG. 41, during its Promotion Spot Display Mode of operation, in which purchased promotion spots loaded into the physical CPI kiosk's advertisement/promotion spot queue are automatically displayed on the display screen of the physical CPI kiosk during its quiescent moments (i.e. when consumer are not making CPI requests).

Figure 43:
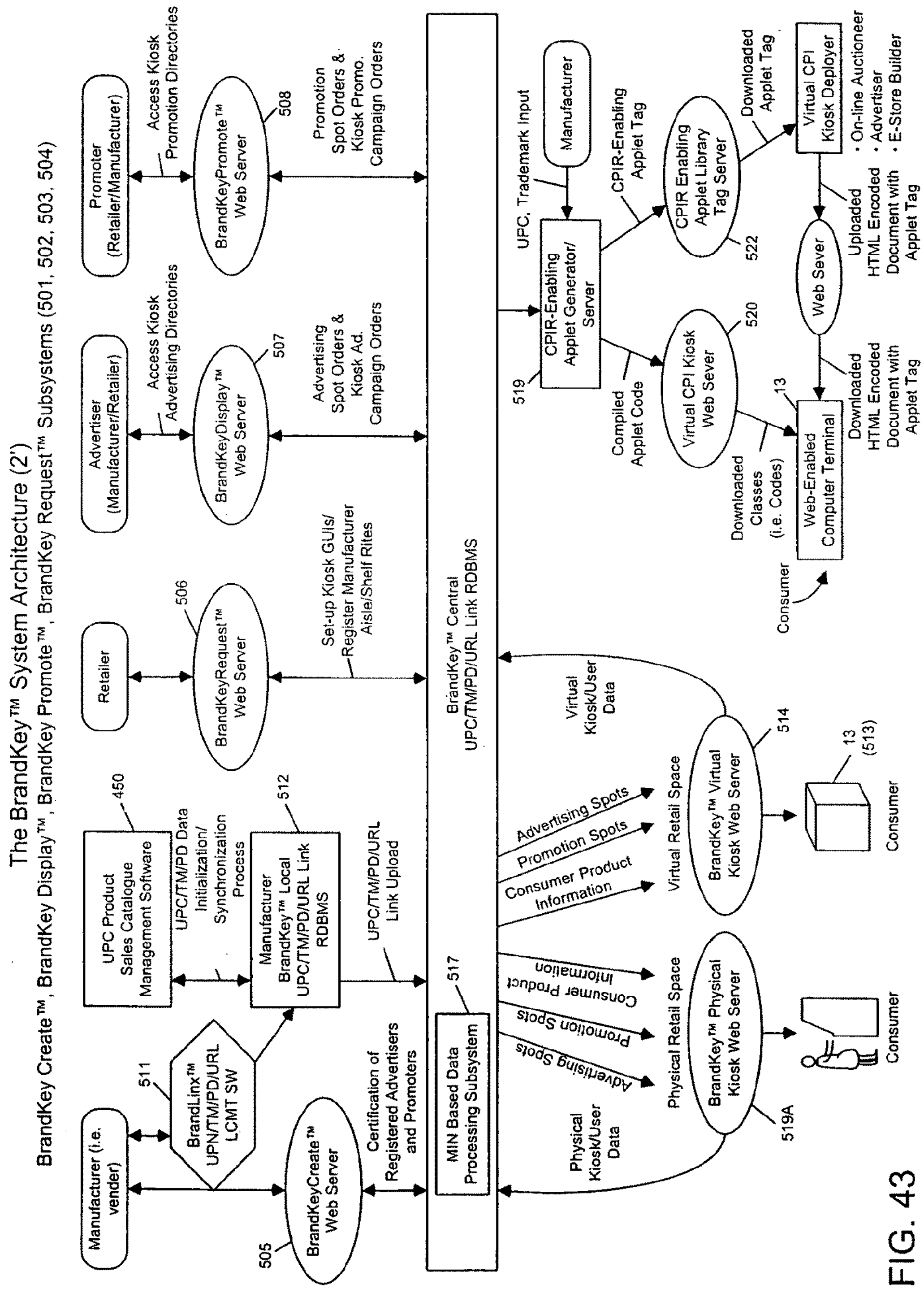

FIG. 43 is a schematic representation of the system architecture of an Integrated Consumer Product Marketing, Merchandising, and Education/Information System of an illustrative embodiment of the present invention.

DETAILED DESCRIPTION OF THE ILLUSTRATIVE EMBODIMENTS OF THE PRESENT INVENTION

Referring to the accompanying Drawings, like structures and elements shown throughout the figures thereof shall be indicated with like reference numerals.

In general, the Detailed Description set forth below discloses a detailed specification of two illustrative embodiments of the Consumer Product Related Information Collection, Management, and Communication System of the present invention, namely: a first illustrative embodiment thereof disclosed in FIGS. 1 through 8, which enables manufacturers (i.e. vendors), retail advertisers and promoters to perform diverse product related functions; and a second illustrative embodiment thereof disclosed in FIGS. 9 through 43. While the second illustrative embodiment discloses an integrated set of subsystems and methods for performing diverse product related functions in an integrated manner, many of the subsystem components and methods employed in the first illustrative embodiments can be used in the second illustrative embodiment.

In general these illustrative embodiments employ many of the inventive principles disclosed in Applicants International Patent Application Publication No. WO 98/19259 published on May 7, 1998, which is incorporated herein by reference in its entirety.

Overview of the First Illustrative Embodiment of the System of the Present Invention As illustrated in FIG. 1, the consumer-product information collection, transmission and delivery system of the first illustrative embodiment of the present invention is generally indicated by reference numeral 1 and comprises an integration of information subsystems, namely: an IPI finding and serving subsystem 2 for allowing consumers to find product related information on the Internet (e.g. WWW) at particular Uniform Resource Locators (URLs), using UPC numbers, trademarks, and/or product descriptions symbolically-linked or related thereto; a Consumer Product Advertising and Promoting Subsystem 2A for advertising and promoting consumer products within physical retail shopping environments using Web-based product promotion kiosks, as shown in FIGS. 3A17 through 3A24; a conventional UPC Product sales Price Information Subsystem (UPC Sales Price Catalog) 3 (e.g. QRS Keystone™ UPC Product Sales Price Catalog, or GEIS s GPC Express™ UPC Product Sales Price Catalog) for providing retailers with accurate up-to-date product information on numerous consumer-products offered for wholesale to retailers by manufacturers registering their products therewith; a Electronic Trading Information Subsystem 4 for providing trading partners (e.g. a manufacturer and a retailer) to sell and purchase consumer goods by sending and receiving documents (e.g. purchase orders, invoices, advance slip notices, etc.) to consummate purchase and sale transactions using either Value Added Network (VAN) based EDI transmission or Internet (e.g. HTTP, SMTP, etc.) based electronic document communications; a Sales Analysis and Forecasting Information Subsystem 5 for providing retailers with information about what products consumers are currently buying at retail stores or expect to be buying in the near future; Collaborative Replenishment Information Subsystem 6 for determining what products retailers can be buying in order to satisfy consumer demand at any given point in time; a Transportation and Logistics Information Subsystem 7 for providing retailers with information about when ordered products (purchased by retailers at wholesale) will be delivered to the retailer s stores; and Input/Output Port Connecting Subsystems 8 (realized by the infrastructure of the Internet) for interconnecting the input and output ports of the above-identified subsystems through the infrastructure of the Internet and various value-added EDI networks of global extent. Notably, unlike prior art supply chain management systems, the consumer-product information collection, transmission and delivery system of the present invention embraces the manufacturers, retailers, and consumers of UPC-encoded products, and not simply the manufacturers and retailers thereof. As will become apparent hereinafter, this important feature of the present invention allows manufacturers and retailers to deliver valuable product related information to the consumers of their products, thereby increasing consumer purchases, consumer satisfaction and consumer loyalty. Prior art supply chain management systems have no way or means of providing such information services to the consumers of UPC-encoded products along the consumer-product supply and demand chain.

As shown in FIGS. 2-1 and 2-2, the consumer-product information collection, transmission and delivery system of FIG. 1 is realized as an arrangement of system components, namely: a central UPN/TM/PD/URL Relational Database Management Subsystem RDBMS 9 for storing and serving various types of consumer-product information to retailers, manufacturers and consumers alike (e.g., the name of the product s manufacturer; the Universal Product Code (UPC) or European Article Number (EAN) assigned to the product by the manufacturer; one or more URLs specifying the location of information resources on the Internet at which particular kinds of information relating to the consumer-product can be found; merchandise classification; style number; trade name; information specifying the size, color and other relevant characteristics of the consumer-product, where applicable; ordering criteria; availability and booking dates, etc.); a globally-based (packet-switched) digital telecommunications network (such as the Internet) 10 having an infrastructure including Internet Service Providers (ISPs), Network Service Providers (NSPs), routers, telecommunication lines, channels, etc., for supporting packet-switched type digital data telecommunications using the TCP/IP networking protocol well known in the art; one or more Internet Product Finding Directory (IPD) Servers, each indicated by reference numeral 11 and being connected to the Internet at strategically different locations via the Internet infrastructure 10 and data-synchronized with each other in order that each such Server maintains mirrored a relational-type database structure as represented in FIGS. 4A and 4B; a plurality of Internet Product-Information (IPI) Servers, each indicated by reference numeral 12 and being connected to the Internet via the Internet infrastructure; a plurality of retailer-related electronic-commerce (EC) information servers 12A, each operably connected to the infrastructure of the Internet, and enabling the hosting or one or more EC-enabled stores or EC-enabled on-line catalogs (i.e. EC-enabled WWW sites) owned, operated, managed and/or leased by one or more retailers along the retail supply and demand chain; a plurality of manufacturer-related electronic-commerce (EC) information servers 12B, each operably connected to the infrastructure of the Internet, and enabling the hosting or one or more EC-enabled stores or EC-enabled on-line catalogs (i.e. EC-enabled WWW sites) owned, operated, managed and/or leased by one or more manufacturers along the retail supply and demand chain; a plurality of User (or Client) Computers, each indicated by reference numeral 13, being connected to the Internet via the Internet infrastructure and available to consumers ($C_1$, $C_2$, $C_3$, . . . , $C_i$); one or more data communication (i.e. EDI) networks 14, comprising data collection nodes 15 and communication links 16, operably connected to the centralized UPN/TM/PD/URL Database Management Subsystem 9, each Client Computer 13 available to a Manufacturer ($M_1$, $M_2$, $M_3$, . . . , $M_j$) and Retailer ($R_1$, $R_2$, $R_3$, . . . , $R_k$) within the retail supply and demand chain; a Web-based Document Server 30 connected to at least one of the IPD Servers 11 and the Internet infrastructure, for transferring documents and messages to remote Client Computer Systems during the registration of manufacturers and consumer products with the system hereof and periodically updating product-related information with the IPD Servers 11 in an automatic manner; and a Web-based Document Administration Computer 31 connected to the Web-based Document Server 30 by way of a TCP/IP connection 32, for administrating the registration of manufacturers and products with the system, initiating the transfer of consumer product related information (e.g. menu of URLs) between the remote Client Computer Systems and Web-Based Document Server 30, transferring such information to the IPD Servers 11, and maintaining local records of such information transfers and the like. As will become apparent hereinafter, Web-based Document Server 30 and Web-based Document Administration Computer 31 provide a subsystem for (i) managing the process of registering qualified manufacturers and their consumer products and related Web pages (e.g. UPC numbers and URLs), and (ii) updating the product-related information with the IPD Servers 11 in an automatic manner to ensure accurate links between UPNs and URLs within the UPN/TM/PD/URL RDBMS. The subsystem comprising the Web-based Document Server 30 and Web-based Document Administration Computer 31 shall be referred to as the Manufacturer/Product Registration Subsystem of the consumer product information finding and delivery subsystem 2 and indicated by reference numeral 33 throughout the figure drawings hereof.

Preferably, the centralized UPN/TM/PD/URL RDBMS 9 and at least one of the IPD Servers 11 are located at a secured information storage/processing center 17, along with a multiprocessor (or mainframe) computer system, information servers, routers, data communication lines, disk storage devices (e.g. RAIDs), tape drives and tape-library system, uninterrupted power supplies (UPS), and other peripheral technology to provide on-line, batch and back-up operations. However, the IPI Servers, the Client Computers and the other IPD Servers (if provided for database mirroring purposes), typically will be located throughout the world, as the distribution of manufacturers, retailers and consumers who are encouraged to use the system is scattered across the Planet.

In the illustrative embodiment, the Web-based Document Server 30 is a Windows NT Server running WebDox" Server software from Premenos Corporation of Concord, California. The Windows NT Server can be realized using a suitable computer system having a Pentium¤ or higher CPU, 64 MB of RAM or higher, running (i) Microsoft Windows NT Server 4.0 or higher Operating System software from Microsoft Corporation, (ii) Microsoft Internet Information Server 2.0 or higher from Microsoft Corporation, and (iii) Microsoft SQL Server 6.5 or higher software from Microsoft Corporation. Also, the WebDox" Server is provided with a dedicated Internet connection (i.e. ISDN or better) to the Internet infrastructure 10.

The EDI administration computer 31 is either a Windows 95 or Windows NT Computer system running WebDox Admin" software from Premenos Corporation of Concord, Calif. The Windows 95 or Windows NT computer system 31 can be realized using a suitable computer system having an Intel 486 or higher CPU, 12 MB of RAM or higher, running Microsoft Windows 95 or Windows NT 4.0 or higher, and having a TCP/IP connection 31 to the WebDox" Server 30.

In order to use the WebDox™ system, each remote Client Computer System 13 includes either a Windows 95 or Windows NT Computer system running WebDox Remote™ software from Premenos Corporation of Concord, Calif. The Windows 95 or Windows NT computer system 13 can be realized using a suitable computer system having an Intel 486 or higher CPU, 16 MB of RAM or higher, and a VGA monitor or better, and running (i) Microsoft Windows 95 or Windows NT 3.51 or higher Operating System (OS) software, and (ii) Microsoft internet Explorer 3.0 or higher from Microsoft Corporation. Also, the WebDox Remote" Server is provided with a dial-up Internet connection (i.e. 14,400 bps or better) to the Internet infrastructure. The function of the Web-based Document Server 30, Web-based Administration System 31 and remote client subsystems 13 running the Premenos¤ WebDox Remote™ software is to provide a Web-based Document Transport System for automatically transferring information (e.g. UPN/TM/PD/URLs) from manufacturers to the IPD Servers of the system in order to periodically update the same. While the illustrative embodiment of this Web-based Document Transport System has been described in terms of its implementation using the WebDox" system from Premenos, it is understood that other commercially available electronic document transport systems (e.g. COMMERCE: FORMS™ Electronic Business Forms Package from Sterling Commerce, Inc.) can be used to carry out this subsystem. The operation of this Web-Based Document Transport System will be described in detail hereinafter with respect to the collection and delivery of consumer product-related information to the IPDs hereof.

The major subsystem components comprising the consumer-product information collection, transmission and delivery system of the present invention will be described in greater detail bellow.

In the illustrative embodiment of the present invention, the IPI Finding and Serving Subsystem 2 is realized using the UPN/TM/PD/URL RDBMS 9 and data communication networks 14 shown in FIGS. 2-1 and 2-2.

In the illustrative embodiment of the system of the present invention, each Client Computer Subsystem 13 has a conventional Java GUI-based web browser program (e.g. Microsoft Internet Explorer, etc.) with a plug-in type module, that provides an on-screen graphical icon for a IPI Web-site Find function. An exemplary display screen 18 produced by such a Java GUI-based web browser program is set forth in FIG. 3B. Alternatively, the URL of the home page of the IPI Web-site can be recorded as a browser bookmark for easy recall and access through a conventional Java GUI-based Internet browser. Once at the home page of the IPI Web-site, an Internet user can find product-related information on the Internet in essentially the same way as when using the web browser program of FIG. 3B. As shown, the on-screen radio button 19 functions as an IPI Web-site Find Button (or Consumer Product Information Button) for instantly connecting the client subsystem to a particular IPI Web-site (i.e. hosted on each mirrored IPD Server) and especially adapted for carrying out the IPI finding and serving method of the present invention. As will be described in greater detail hereinafter, examples of IPI Web-sites can include, but are not limited to: (1) one or more mirrored Retail Industry/Market oriented Web-sites from which consumer product information from all manufacturers is available for access to consumers from predetermined Internet domains; and (2) a Retailer-hosted oriented Web-site, for each retailer, wherein consumer product information associated with only manufacturers of products offered by the retailer is available for access to consumers from predetermined Internet domains within physical retail brick and mortar stores and electronic commerce enabled stores.

Figure 3B:
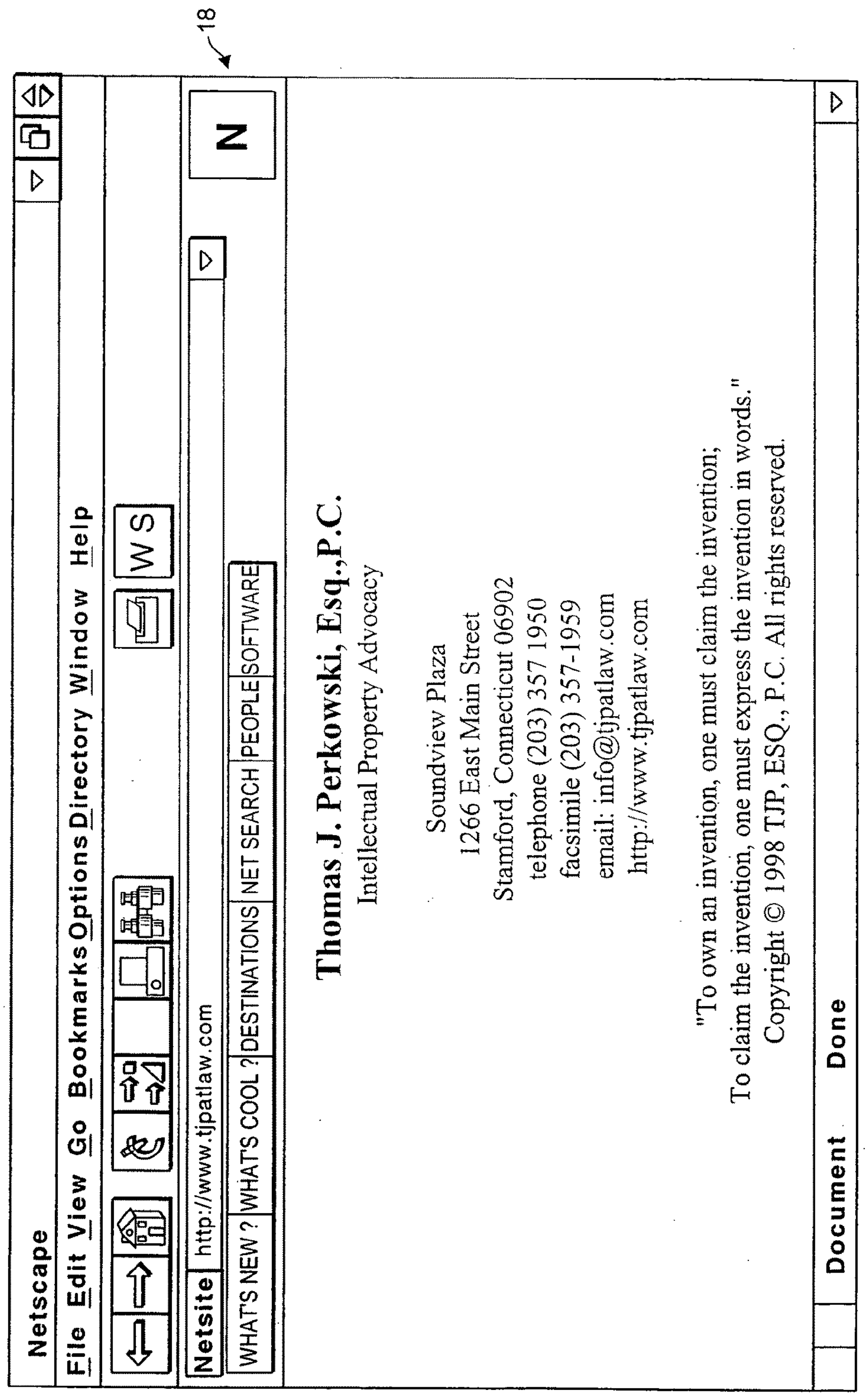
FIG. 3B is a schematic representation of an exemplary display screen produced by a (graphical user interface) Java GUI-based web browser program running on a client subsystem and providing an on-screen IPD Web-site Find Button (e.g. BRANDKEY REQUEST CENTRAL" Website Find Button) for instantly connecting to a Web-site (e.g. BRANDKEY REQUEST CENTRAL™ Website) and carrying out the consumer product information finding and serving method of the present invention.
Figure 3C:
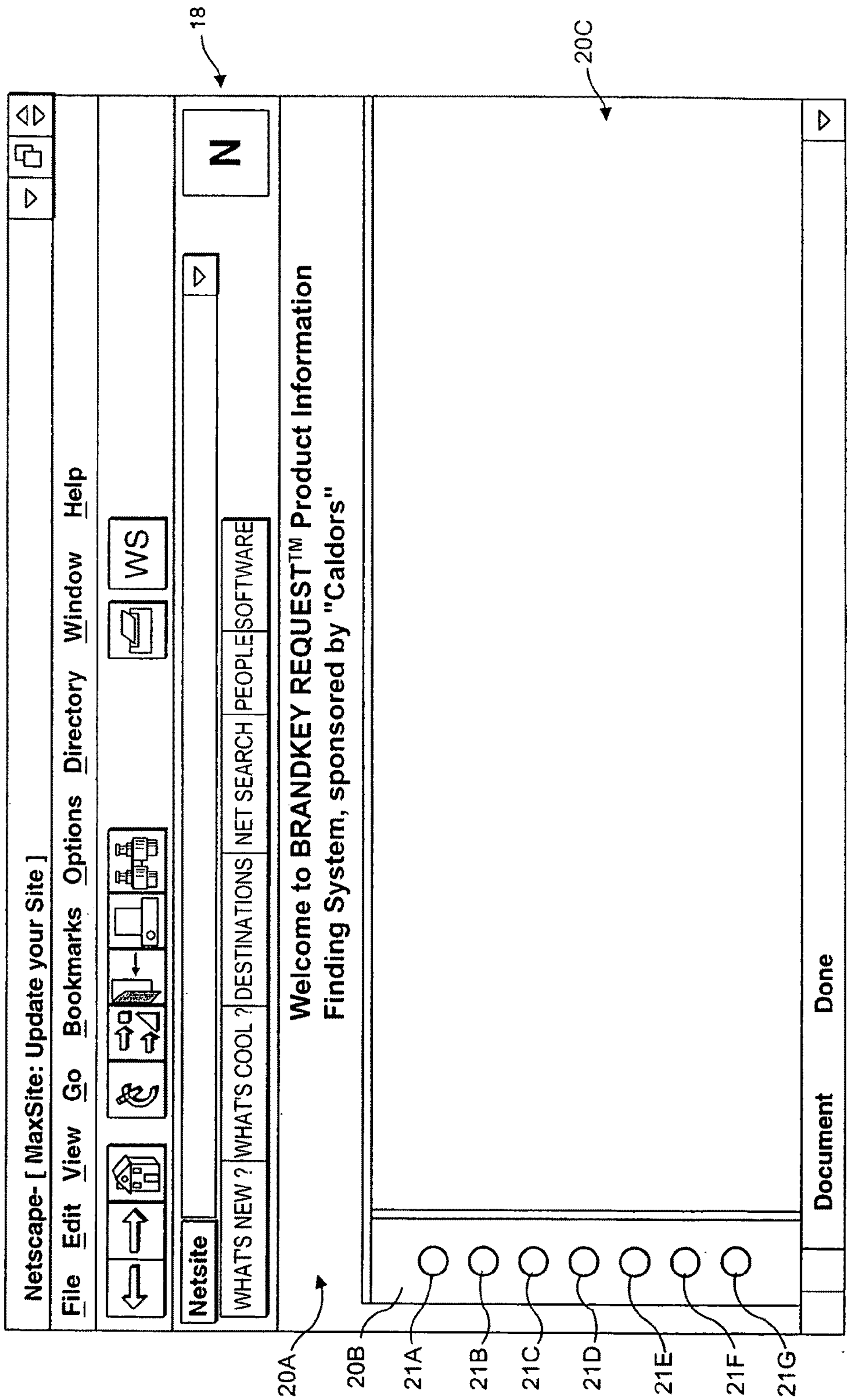
FIG. 3C is a schematic representation of an exemplary display screen produced by a Java GUI-based Internet browser or communication program running on a client subsystem and displaying a Netscape-style browser display framework, served from the IPD Web-site (e.g. BRANDKEY REQUEST CENTRAL" Website), and supporting or providing a sponsor frame for sponsor advertisement, a control frame with Check-Box type buttons for activating any mode of the IPI finding and serving subsystem, and an information frame or displaying HTML documents (instructions, forms, and the like) in accordance with the principles of the present invention.
Figure 402:
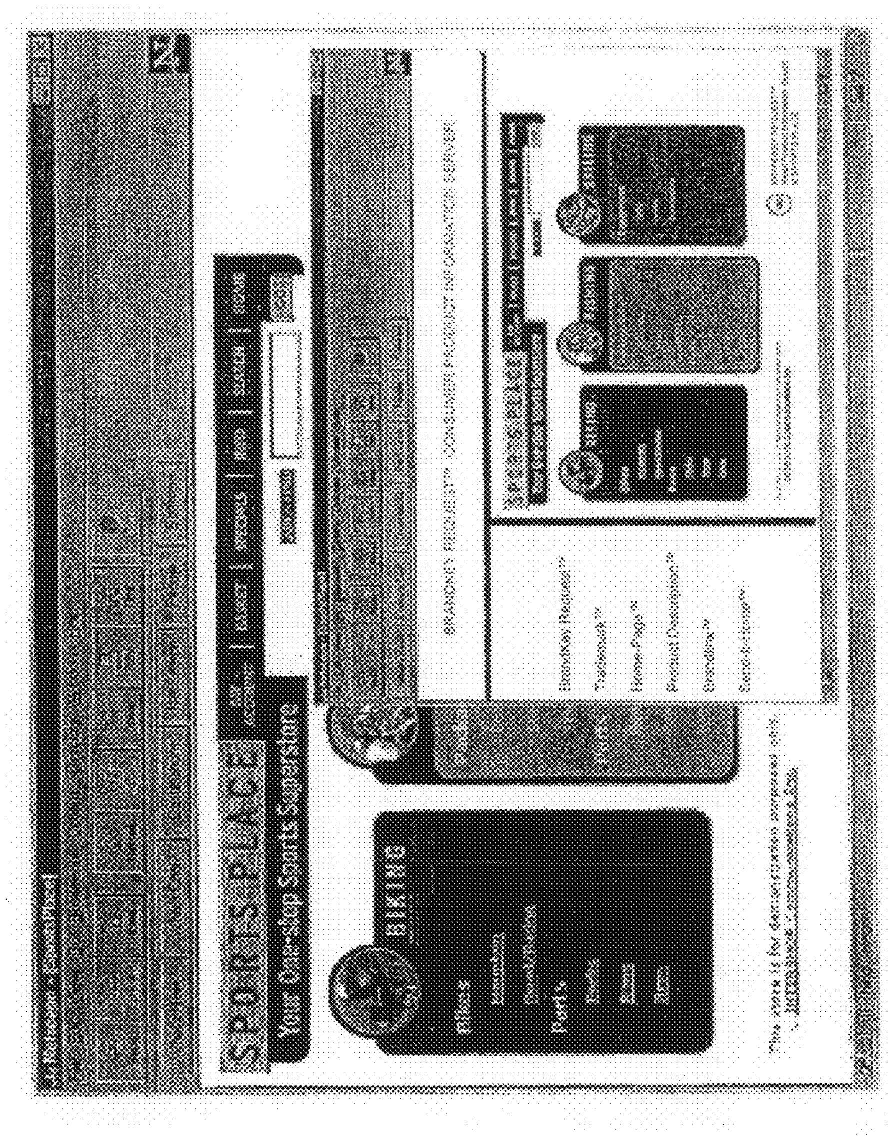

In general, each IPI Web-site can be sponsored by a retail store subscribing to the consumer product information service hereof, or by one or manufacturers and/or service providers. The URL for the home page of any particular IPI Web-site can be selected with marketing considerations in mind, for example, http://www.ipfcorp.com or http://www.upcrequest.com similar in form with the URLs of other information search-engines and directories currently available on the Internet. Upon selecting the IPI Web-site Find Button 19 (e.g. by a clicking of the mouse thereon shown in FIGS. 3B and 3C), the user is automatically connected to the home-page of the IPI Web-site (hosted on each mirrored IPD Server) which, as shown in FIGS. 3B and 3C, supports a Netscape-style framework, within which web pages accessed through the IPI web-site are displayed. An excellent tutorial on framing entitled The Netscape Frames Tutorial" (2nd edition) by Charlton D. Rose set forth at the URL: http://www.newbie.net/frames/, last visited by Applicant on Mar. 26, 1997.

In general, the HTML-encoded documents served from the IPD Servers 11 hereof to the client subsystems 13 hereof will preferably have a three-field Netscape-style display framework which provides a unique and effective way of satisfactorily addressing the needs of consumers, hosting retailers, manufacturers and the IPI provider(s)/publishers alike. In practice, the Netscape-style browser framework can simultaneously accommodate the needs of the consumers using the particular Client Subsystems of the present invention, as well as the needs of the retailers who typically will host client subsystems hereof either (1) physically within their stores, and/or (2) electronically on their WWW sites using Web browser framing techniques as well.

As shown in FIG. 3C, the first (top-most) display field, the sponsor frame 20A, can be used to display to the consumer, a Web page (e.g. HTML-encoded document) containing a message that the IPI Finding and Serving Subsystem 2 is being delivered to the consumer by the IPI Provider under, for example, the sponsorship of either: (1) the hosting retailer; (2) one or more advertisers posting advertising banners in the display frame 20A; or (3) the consumer himself/herself by paying a subscription fee or the like. Understandably, the method of sponsorship employed will vary from embodiment to embodiment of the present invention. An exemplary message for this display screen might read, for example, as follows:

Welcome to the BrandKey Request"

Consumer Product-Information Finding and Serving System

Sponsored by THE HOME DEPOT for your shopping convenience and pleasure.

The height of the sponsor frame 20A need only be a small fraction of the consumer s display screen (e.g. ¾ inches) to convey this message to the consumers during use of the IPI Finding and Serving Subsystem of the present invention within the retailer s real (or virtual/electronic) shopping environment.

As shown in FIG. 3C, the second (left-most) display field, the control frame 20B, is used to display an HTML-encoded document containing a Java GUI-based control panel 21 for the consumer product information finding and serving subsystem of the present invention. In the illustrative embodiment, this control panel 21 includes six Check Box type buttons, namely: a first Check Box type button 21A which, when selected, automatically activates the Manufacturer/Product Registration Mode of the subsystem; a second Check Box type button 21B which, when selected, automatically activates the Manufacturer Website Search Mode of the subsystem; a third Check Box type button 21C which, when selected, automatically activates the UPN-Directed Information Access Mode of the subsystem; a fourth Check Box type button 21D which, when selected, automatically activates the Trademark-Directed Search Mode; a fifth Check Box type button 21E which, when selected, automatically activates the Product-Description Directed Search Mode of operation of the subsystem; and a sixth Check Box type button 21F which, when selected, automatically activates the UPC-Encoded-Applet-Download/Distribution Mode of operation of the subsystem. Each of these Check Box type buttons is hot-linked to a particular HTML-encoded document residing on the IPD Server(s) 11 of the subsystem hereof.

While the IPI Web-site of the illustrative embodiment has a framework characterized by three-display fields, namely, the sponsor frame 20A, the control frame 20B, and the information display frame 20C, it is understood, however, that there may be more or fewer display frames than that shown in FIG. 3C. Each frame will act as a separate display screen where variables such as web pages, scrolling, page colors, etc., are independently controllable.

As will become apparent hereinafter, one of the primary functions of the client subsystems 13 hereof is to provide UPN-driven consumer product information (CPI) GUIs within both physical brick and mortar retail stores and E-commerce enabled retail stores and product catalogs. Hereinafter, UPN-driven CPI GUIs provided within physical retail shopping environments will be referred to as physical or physically-based UPN-driven CPI kiosks, whereas UPN-driven CPI GUIs provided within E-commerce enabled retail shopping environments will be referred to as UPN-driven virtual CPI kiosks, despite the fact that these devices may provide the substantially the same type of consumer product information services to consumers, retailers and manufacturers along the retail supply and demand chain.

Physically-based UPN-driven CPI kiosks will have great utility in physical retail shopping environments, as well as possibly in diverse types of service providers (e.g. doctor offices, airports, malls, bus terminals,parks, libraries, etc.) where manufacturers and/or retailers would like to create a virtual (electronic) retail shopping environment, etc. However, such subsystems will be of little value to consumers browsing the Internet and shopping at EC-enabled WWW sites, unless they are located in brick and mortar type retail stores wherein consumers are provided with the option of shopping and conducting e-commerce transactions therein for all or selected items of merchandise offered for sale by the retailer. Moreover, when shopping in any particular retailer s EC-oriented store, however realized, it is also understood that great efforts must be undertaken to ensure that the shopper does not leave the EC-oriented store prior to making a purchase at the checkout page of the EC-oriented WWW site. Requiring, prompting or otherwise encouraging a shopper to link over to the IPD WWW site hereof (e.g. hosted on the IPD information server) for desired consumer product related information oftentimes presents a great risk that the shopper will not return to the EC-oriented store, at which he or she was once visiting, but rather will visit another EC-oriented store to make the product purchase.

The above limitations of physically-based CPI kiosks and the risks associated with consumer behavior while shopping on the Internet is overcome by the UPN-based virtual kiosks of the present invention. The primary function of UPN-based virtual CPI kiosks is to provide consumers with a simple and effective way of and means for producing UPN-driven CPI graphical user interfaces (GUIs) at the consumer s point of presence (POP) which may exist, for example, when: (i) shopping at EC-enabled stores, product catalogs and other types of EC-oriented WWW sites; (ii) reviewing and responding to Internet-based product advertisements (including Web-based discount coupons and the like) published at selected sections of Web-documents served from diverse types of WWW sites hosted on the millions of Internet information servers connected to the infrastructure of the Internet; and/or (iii) encountering a Web-document addressing a particular consumer product under review, analysis or other form of observation where accurate consumer product related information is desired or required by the consumer, whomever they might be. The details of producing UPN-enabled CPI GUIs in both physical and virtual retail environments will be described hereinafter.

As shown in FIGS. 2-1 and 2-2, each synchronized IPD Server 11 is interfaced with an ISP 10A in a conventional manner. The actual number of IPD Servers 11 used in any particular application will depend on various factors including, for example, user demand, Internet traffic conditions, network router capacity and performance, etc. Each such IPD Server 11 is assigned a static IP address and a common domain name on the Internet according to the Domain Name System (DNS) well known in the art. Data synchronization among such databases can be achieved using conventional data synchronization techniques well known in the art. In addition, a backup and mirroring program can be used to maintain data security. Preferably, the synchronized IPD Servers are maintained by a team of network managers under the supervision of one or more webmasters.

As shown in FIGS. 2B1 through 2B4, using presently known technology available for use on the WWW, there are at least four different ways of configuring IPD Server 11 and back-end UPN/TM/PD/URL Database Management Subsystem 9 of the illustrative embodiment. These four different subsystem architectures are schematically depicted in FIGS. 2B1 through 2B4.

In the system architectures shown in FIGS. 2B2 through 2B4, client-side Applets (Applets), having their <APPLET> HTML tags embedded within HTML documents (e.g. using the HTML 3.2 Specification), are executed with Java-enabled browsers on the client-side of the information network. In the system architecture set forth in FIG. 2B1, server-side Applets (Servlets), having their <SERVLET> HTML tags embedded within HTML documents (e.g. the HTML 3.2 Specification), are executed within Java-enabled Web servers on the server-side of the information network. Collectively, client-side Applets and server-side Applets shall be referred to as Applets, wherein the major distinction between these two types is based on where the Applet is executed on the network (i.e. client-side or server side).

In each of these four system architectures, the IPD Server 11 performs a number of basic functions, for example: (1) serving HTML-encoded documents associated with Retail Industry/Market Oriented and Retailer-Hosted/Oriented Web-sites (e.g. BrandKey Request Central™ WWW site, BrandKey Request Retail™ WWW sites, etc.) to client subsystems 13 on the Internet so as to enable the six primary modes of operation of the consumer product information finding and delivery subsystem hereof including, but not limited to, access to consumer product related information stored within the IPI and Non-IPI Registrant Databases on the UPN/TM/PD/URL Database Management Subsystem 9; as well as (2) serving Libraries of executable files containing UPN-enabled Java Applet tags for client-side Applets as well as server-side Applets a/k/a Servlets, so as to enable retailers, manufacturers, advertisers, et al to download the executable Applet tag containing file to client subsystems.

According to the first system architecture shown in FIG. 2B1, the UPN/TM/PD/URL RDBMS 9 is realized by a SQL-based RDBMS server 9, whereas the IPD server 11 is realized by a Java Web Server 11', provided with Java servlet support, and operably connected to the RDBMS server 9 by way of high-speed digital transmission link known in the art. During system operation, the Java Web Server 11' serves to a Java-enabled client subsystem 13, an HTML-encoded document containing a servlet HTML tag <SERVLET> which, upon selection by a single mouse-clicking operation by the consumer, sends an http request to the Java Web Server 11', invoking a prespecified UPN-encoded servlet stored therewithin, causing the CPIR-enabling servlet to execute on the server-side of the network. This causes the servlet to call and run certain predefined Java methods, which carry out an UPN-specified CPl search on the RDBMS server 9 and return the search results to the client subsystem 13 for display within a predetermined GUI generated therewithin. Using this system architecture, each UPN-encoded servlet executed within the Java Web Server 11' will contain information relating to (1) the UPN-specified consumer product on which product information is to be searched for within the RDBMS server 9, (2) licensing information relating to whom the CPIR-enabling servlet has been licensed.

According to the second system architecture shown in FIG. 2B2, the UPN/TM/PD/URL RDBMS 9 is realized by a SQL-based RDBMS server 9, whereas the IPD server 11 is realized by a Java Web Server 11", providing Java Applet support and being operably connected to the RDBMS Server 9 by a high-speed digital data transmission link known in the art. During system operation, the Java Web Server 11" serves to the Java-enabled client subsystem 13, an HTML-encoded document containing a UPN-encoded Applet HTML tag <APPLET> which, upon selection by a single mouse-clicking operation by the consumer, causes the CPIR-enabling Applet to execute on the client-side of the network, sending an http request to the Java Web Server 11", invoking a prespecified Common Gateway Interface (CGI) stored within the Java Web Server 11". This causes the Applet to call and CGI to run certain predefined methods for carrying out a UPN-specified CPI search on the RDBMS server 9 and returning the search results to the client subsystem 13 for display within a predetermined GUI prespecified within the Applet. Using this system architecture, each UPN-encoded Applet executed within the Java browser of the client machine 13 will contain information relating to (1) the UPN-specified consumer product on which product information is to be searched for within the RDBMS server 9, (2) licensing information relating to whom the client-side Applet has been licensed and by whom the Applet may be served to others within the terms of the licensing program/agreement, etc.

According to the third system architecture shown in FIG. 2B3, the UPN/TM/PD/URL RDBMS 9 is realized by a SQL-based RDBMS server 9, whereas the IPD server 11 is realized by a Java Web Server 11''', providing client-side Applet support, and being operably connected to the RDBMS server 9 by way of a high-speed digital data transmission link known in the art. During system operation, the Java Web Server 11''' serves to the Java-enabled client subsystem 13, an HTML-encoded document containing a UPN-encoded Applet HTML tag <APPLET> which, upon selection by a single-mouse clicking operation by the consumer, causes the Applet to execute on the client-side of the network, creating a socket-type connection at lower (TCP/IP) communication layers between the client subsystem 13 and Java Web Server 11''', enabling the Java Web Server 11''' to run certain predefined Java methods for carrying out a UPN-specified CPI search on the RDBMS server 9, and returning the search results to the client subsystem 13 for display within a GUI prespecified within the Applet. Using this system architecture, each UPN-encoded Applet executed within the Java client subsystem 13 will be created to contain information relating to (i) the UPN-specified consumer product on which product information is to be searched for within the RDBMS server 9, (ii) licensing information relating to whom the client-side Applet has been licensed and by whom the Applet may be served within the terms of the licensing program, etc.

According to the fourth system architecture shown in FIG. 2B4, the UPN/TM/PD/URL RDBMS 9 is realized by a SQL-based RDBMS server 9, whereas the IPD Server 11 is realized by a Java Web Server 11''', supporting client-side Applet execution and being operably connected to a high-speed digital data communication link well known in the art. During system operation the Java Web Server 11''' serves to the Java-enabled client subsystem 13, an HTML-encoded document containing a Applet HTML tag <APPLET> which, upon selection by a single mouse-clicking operation by the consumer, causes the CPIR-enabling Applet to execute within the Java-enabled client 13 on the client-side of the network, calling a Remote Invocation Method to carry out a prespecified CPI search on the RDBMS server 9 and returning the search results to the client subsystem 13 for display within a predetermined GUI prespecified by the Applet. Using this system architecture, each UPN-encoded Applet executing within the Java enabled client 13 will contain information relating to (1) the UPN-specified consumer product on which product information is to be searched for within the RDBMS server, and (2) licensing information relating to whom the server-side Applet has been licensed and by whom the Applet may be served to others within the terms of the licensing program, etc.

In the first illustrative embodiment shown in FIG. 2B1, Java (enabled) Web Server 11''' can be realized by, for example, the Origin 200 Server or the $O_2$ Desktop Workstation from Silicon Graphics, Inc, a high-end SUN information server from Sun Microsystems, Inc., or any other suitable computing machine, running: (1) JDBC Interface software for providing a uniform access to a wide range of relational databases on RDBMS server 9 (if necessary in a particular application of the system hereof) and providing a common base on which higher level tools and interfaces can be built; and (2) a servlet-enabled Web (http) server software program such as, the Java Web Server (JWS) 1.0 or later from JavaSoft, division of Sun Microsystems, Inc., or the JigSaw Web Server from the World Wide Web Consortium, each proving native Java support, or alternatively, the Fastrak™ Web (http) server from Netscape Communications, Inc., the Internet Information Server (IIS) from the Microsoft Corporation, the Apache HTTP Server from The Apache Software Foundation, or any other http server capable of transporting HTML-encoded documents, in conjunction with the Java Servlet Developers Kit from JavaSoft, or the Servlet Express Tool from IBM Research Labs in Haifa, Israel, for managing servlets on Web servers lacking native Java support. In order to develop servlets, the Java Web Server 11' should also be equipped with the following software tools: the Sun Java Developers Kit 1.1.x from Sun Microsystems, Inc.; and the Java Servlets Development Kit (JDSK) from Sun Microsystems, Inc., or a Java Development Environment that supports JDK 1.1.x, such as VisualAge for Java by IBM, Microsofts Visual J++, or the like. Optionally, the Java Web Server 11' may also include Web-site development software (e.g. based on the HTML 3.2 or 4.0 Specification) for creating and maintaining the IPI Web-sites of the present invention, although such tools will be typically run on client subsystem 13 for practical reasons.

In the illustrative embodiments of FIGS. 2B2 through 2B4, Java Web Servers 11" through 11'" can be realized by, for example, the Origin 200 Server or the $O_2$ Desktop Workstation from Silicon Graphics, Inc, a high-end SUN information server from Sun Microsystems, Inc., or any other suitable computing machine, running: (1) JDBC Interface software for providing a uniform access to a wide range of relational databases on RDBMS server 9 (if necessary in a particular application of the system hereof) and providing a common base on which higher level tools and interfaces can be built; (2) a Web (http) server such as the Java Web Server (JWS) from JavaSoft, the JigSaw Web Server from the World Wide Web Consortium, the Internet Information Server (IIS) from the Microsoft Corporation, the Apache HTTP Server from the Apache Software Foundation, or other Java-enabled Web server capable of transporting HTML encoded documents; (3) the Sun Java Developers Kit, from Sun Microsystems, Inc., for developing client-side Applets; and (4) optionally, Web-site development software (e.g. based on the HTML 3.2 or 4.0 Specification) for creating and maintaining the IPI Web-sites hereof, although such tools will typically run on client subsystems 13 for practical reasons. Notably, when using the Microsoft IIS, one can use a Java Development Environment that supports JDK 1.1.x, such as VisualAge for Java by IBM, Microsoft s Visual J++, and the like. Also, Java Web Server 11" must provide support for running CGI scripts written in Java, PERL or other suitable scripting language known in the art.

In the illustrative embodiments shown in FIGS. 2B1 through 2B4, each SQL-based RDBMS Server 9 can be realized by, for example, the Origin 200 Server from Silicon Graphics, Inc., the $O_2$ Desktop Workstation from Silicon Graphics, Inc., a ULTRA™ information server from Sun Microsystems, Inc., or any other suitable computing machine, running a RDBMS software program such as ORACLE 8.0 from Oracle Corporation, Sybase SQL from Sybase, Inc., Access 98 from Microsoft, or other database development program based on a database programming language such as the SQL Language, the Sybase language, or any other suitable database language enabling database programming and connectivity over the Internet.

In principle, there can be millions of IPI Servers 12 within the system hereof, each enabled to serve Web-based documents containing consumer product related information. Notably, each such IPI Server 12 can be realized by, for example, the Origin 200 Server from Silicon Graphics, Inc, the $O_2$ Desktop Workstation from Silicon Graphics, Inc., the ULTRA™ information server from Sun Microsystems, Inc., or any other computing machine (e.g. desktop, palmtop, laptop, etc.) running an operating system (e.g. UNIX, LINUX, Macintosh, MS Windows, NT, etc.) capable of performing the functions of an Internet (http) information server in a client-server distributed object computing environment. As shown in FIGS. 2-1 and 2-2, each IPI Server 12 is interfaced with an ISP 10A in a conventional manner. Each such IPI Server 12 is assigned a static IP address and a unique domain name on the Internet. Each IPI Server 12 is also provided with (i) Web-site development software for creating HTML-encoded multimedia pages for Web-site development, (ii) a dynamic website auction hosting software solution, such as, AuctionNow 4.2 from OpenSite, Inc.; and (iii) Web-site server software for supporting HTTP and serving HTML, XML and other document formats used to construct hypermedia-type Web-sites containing product related information of a multi-media nature. Such Web sites can be expressed in HTML, XML, SGML and/or VRML or any other suitable language, which allows for Web-site construction and Web-site connectivity. Web-site management software can be used to maintain correct hyper-links for any particular Web site. Preferably, the IPI Servers 12 is maintained by a team of network managers under supervision of one or more webmasters.

Each retailer-related electronic-commerce (EC) information server 12A indicated in FIGS. 2-1 and 2-2 is operably connected to the infrastructure of the Internet. In general, each retailer-related information server 12A can be realized by, for example, the Origin 200 Server or $O_2$ Desktop Workstation from Silicon Graphics, Inc., a high-end information server from Sun Microsystems, Inc., or any other computing machine that can perform the function of a Server in a web-based, client-server type computer system architecture of the illustrative embodiment. As shown in FIGS. 2-1 and 2-2, each retailer-related EC-enabled information server 12A is interfaced with an ISP 10A in a conventional manner, and is assigned a static IP address and a unique domain name on the Internet. Each retailer-related EC-enabled information server 12A is also provided with: (i) Java-enabled WWW (http) server software, such as Netscape Communications Fastrak Information Server software, for supporting http, ftp, XML/ICE and other Internet protocols, and serving HTML and XML formatted documents (i.e. pages) associated with Web-sites containing product related information of a multi-media nature; (ii) an advanced EC-enabled product merchandising software solution, such as the Host and Merchant (or Enfinity) Intershop 4 E-Commerce Server Solution from Intershop Communications, Inc., of San Francisco, Calif., and/or catalogMANAGER® and catalogMAKER® software programs from RealEDI, Inc. of Sherman Oaks, Calif., for building, managing and operating all aspects of e-commerce WWW sites, whether implementing on-line merchandising solutions for retailers and manufacturers, creating business-to-business and business-to-consumer product catalogs; (iii) an Internet Advertisement Management Software Solution, such as OPEN ADSTREAM™ Internet AD management software solution by REAL-MEDIA, Inc. of New York, N.Y.), for managing all aspects of Internet advertising on Internet information servers; (iv) a dynamic web-site auction hosting software solution, such as, AuctionNow 4.2 from OpenSite, Inc.; and optionally (v) Web-site development software for enabling the creation of HTML-encoded multi-media pages and the like for the EC-enabled Web-site development. Such EC-enabled Web-sites can be expressed in HTML, XML and/or VRML or any other suitable language, which allows for Web-site construction and Web-site connectivity. Web-site management software can be used to maintain correct hyper-links for any particular Web site. Preferably, each EC-enabled retailer-related server 12A is maintained by a team of network managers under supervision of one or more webmasters. The primary function of each retailer-related EC information server 12A is to enable the hosting of one or more EC-enabled stores or EC-enabled on-line catalogs (i.e. WWW sites) owned, operated, managed and/or leased by one or more retailers, (and optionally wholesalers and manufacturers as well) along the retail supply and demand chain. The use of the Intershop 4 Hosting and Merchant E-commerce software solution enables sellers to design and build dynamic environments for buyers and sellers by enabling sellers (i.e. vendors) to: (1) create a unique look and feel for their e-commerce sites using a Web browser; (2) fully customize their e-commerce sites to maximize the buyers experience, using an import/export function for easily importing existing product databases and site design directly into the Intershop; (3) build detailed profiles of buyers and present them with products that match these profiles, creating a personalized shopping experience; and (4) offer complementary products for sale based on current selections, thereby raising the overall value of each e-commerce transaction carried out. Also, the back-office portion of the Intershop 4 E-commerce Solution is intuitively organized to make it easy for sellers to manage their on-line business through a Web browser.

Each manufacturer-related electronic-commerce (EC) information server 12B indicated in FIGS. 2-1 and 2-2 is operably connected to the infrastructure of the Internet. In general, each manufacturer-related EC information server 12B can be realized by, for example, the Origin 200 Server from Silicon Graphics, Inc., the O2 Desktop Workstation from Silicon Graphics, Inc., the ULTRA™ information server from Sun Microsystems, Inc., or any other computing machine that can perform the function of an http server in a client-server distributed object-computing environment. As shown in FIGS. 2-1 and 2-2, each manufacturer-related EC-enabled information server 12B is interfaced with an ISP 10A in a conventional manner, and is assigned a static IP address and a unique domain name on the Internet. Each manufacturer-related EC-enabled information server 12B is also provided with: (i) Java-enabled WWW (http) server software, such as Netscape Communications FastTrak Information Server software, for supporting http, ftp, and other Internet protocols, and serving HTML and XML formatted documents (i.e. pages) associated with Web-sites containing product related information of a multi-media nature; (ii) an advanced EC-enabled product merchandising software solution, such as the Host and Merchant Intershop 4 E-Commerce Server Solution from Intershop Communications, Inc., of San Francisco, Calif., and/or catalogMANAGER® and catalogMAKER® software programs from RealEDI, Inc. of Sherman Oaks, Calif., for building, managing and operating all aspects of e-commerce WWW sites, whether implementing on-line merchandising solutions for retailers and manufacturers, or creating business-to-business and business-to-consumer product catalogs; (iii) an Internet Advertisement Management Software Solution, such as OPEN ADSTREAM™ Internet AD management software solution by REAL-MEDIA, Inc. of New York, N.Y.), for managing all aspects of Internet advertising on Internet information servers; (iv) a dynamic web-site auction hosting software solution, such as, AuctionNow 4.2 from OpenSite, Inc.; and optionally (v) Web-site development software for enabling the creation of HTML-encoded multi-media pages and the like for the EC-enabled Web-site development. Such EC-enabled Web-sites can be expressed in HTML, XML, SGML and/or VRML or any other suitable language which allows for Web-site construction and Web-site connectivity. Web-site management software can be used to maintain correct hyper-links for any particular Web site. Preferably, each EC-enabled manufacturer-related server 12B is maintained by a team of network managers under supervision of one or more webmasters. The primary function of each manufacturer-related EC information server 12B is to enable the hosting or one or more EC-enabled stores or EC-enabled on-line catalogs (i.e. WWW sites) owned, operated, managed and/or leased by one or more manufacturers, (and optionally wholesalers and retailers as well) along the retail supply and demand chain.

Each Client Computer Subsystem (hereinafter client subsystem) 13 can be realized by any computing system employing operating system (OS) software (e.g. Macintosh, Windows 95, Windows NT, Unix, etc.), which supports a Java-enabled Internet browser program (e.g. Netscape s Navigator, Microsoft s Explorer, NCSC s Mosaic, etc.). The operating system should also include: (1) Internet networking software that supports the TCP/IP networking protocol (required by HTTP, FTP and the like) and provides a JAVA GUI-based Web browser interface; and, in the case of client computer machines 13 that are used by manufacturers and retailers in their back office operations, (2) Electronic Data Interchange (EDI) networking software that supports all versions of EDI between two or more client subsystems over the VAN-based or Web-based EDI networks illustrated in FIGS. 2-1 and 2-2. Alternatively, client subsystems may also be realized by any of the following systems: (i) a Newton Message Pad 130 (running the Newton 2.0 Operating System and NetHopper“ Internet Software and equipped with a Motorola RF PCMCIA modem card); (ii) a Pippin“ computer system from Apple Computer, Inc.; (iii) a Palm Pilot VII wireless Internet-enabled palmtop computing device by 3COM, Inc.; (iv) a network computer (NC) that supports the Java“ programming language and Java applets expressed therewith; (v) a Sony¤ WebTV Internet Terminal (supported by the WebTV Service provided by WebTV Network, Inc.); or the like. As shown in FIGS. 2-1 and 2-2, each Client Computer is interfaced with an ISP 10A in a conventional manner. Each such client subsystem may be assigned a static IP address and a unique domain name on the Internet, or one may be dynamically assigned thereto by way of its ISP depending on its connectivity, and set of assigned functions within the consumer product information network of the present invention. Optionally, any client subsystem may include Web-site (http) server software serving Web documents of various formats (HTML, XML, SGML or the like) from one or more hypermedia-type Web sites in a manner well known in the art.

Typically, each client subsystem 13 will be maintained by either present or future manufacturers, retailers and/or consumers of products, about which information can be found on the Internet. As shown in FIG. 3A1, any client subsystem of the present invention may be realized as a desktop computer workstation comprising: a processor and memory 19; a visual display monitor 20; a keyboard 21; a JAVA GUI mouse 22; and a bar code symbol reader 23 for reading UPC, UPC/EAN and other types of bar code symbols printed on consumer products, brochures, documents, and the like.

As shown in FIG. 3A2, any Client Computer 13 may also be realized in the form of a Web-based (wired or wireless) multi-media kiosk, designed for use as a Cyber sales agent within retail shopping environments. As shown in FIG. 3A2, the Web-based kiosk of the present invention may comprise: a floor, wall or ceiling supported housing 25; an omnidirectional laser bar code symbol reader (e.g. Metrologic MS 6720 Laser Scanner) 26 for reading UPC (and other types of) symbols printed on products, brochures, documents and the like; an active-matrix LCD-type visual display screen 27 for viewing product related information automatically displayed thereon in response to the entry of the UPC numbers scanned into the UPC Number Entry Window 21D below the IPI Finder button 21A of Control Strip 20B displayed on the client subsystem, as shown in FIG. 3C; a touch-screen type keyboard and pointing device 28 for clicking on anchored links on Web pages, entering information into client subsystem during its use; audio-speakers 29A for supporting multimedia Web-sites that may be visited when using the client subsystem; a color or black/white printer for printer 29B for printing out Web pages under consumer command during an information finding session using the system; and also, one or more floppy-disc (or otherwise removable) drive units 29C, accessible to the consumer for recording promotional and trial versions of information-based consumer products (e.g. video and audio recordings, computer software products, and the like) on removable information storage media (e.g. 1.44 MB floppy discs, 100 MB Zip¤ floppy discs, 1 GB Jazz¤ floppy discs, etc.) supplied by either the retailer or consumer. Optionally, the kiosk can be provided with a stereoscopic micropolarizing LCD panel from VRex, Inc. of Elmsford, N.Y. so that micropolarized spatially-multiplexed images (SMIs) of 3-D objects represented with VRML-encoded Web pages can be stereoscopically perceived by consumers when viewed through either an electrically-passive polarizing visor structure supported from the housing of the kiosk, or a pair of polarizing eyeglasses tethered to the kiosk housing and donned by the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

As shown in FIG. 3A3, any Client Computer 13 within the system hereof may be realized in the form of the Web-based multi-media kiosk 34, also designed for use as a virtual sales agent within retail shopping environments. As shown, the Web-based kiosk 34 comprises: an ultra-compact housing 35 capable of being supported upon a pair of support rods (35A), a vertical support surface (e.g. wall), a horizontal support surface (e.g. countertop), or supported from a ceiling or pedestal; an omnidirectional laser bar code symbol reader (e.g. Metrologic MS 6720 Laser Scanner) 36, modified with handle 36A, for reading UPC (and other types of) symbols printed on products, brochures, documents and the like; an active-matrix LCD-type visual display screen 37 for viewing product related information automatically displayed thereon in response to the entry of the UPC numbers scanned into the UPC Number Entry Window 21D displayed on the client subsystem; a touch-screen type keyboard and pointing device 38 for clicking on anchored links on Web pages, entering information into client subsystem during its use; audio-speakers 39A for supporting multimedia Web-site that may be visited when using the client subsystem; a color or black/white printer for printer 39B for printing out Web pages under consumer command during an information finding session using the system; a scanner support stand 40 with guide flanges 41A and 41B, for guidably receiving and supporting the scanner 36 as shown in FIG. 3A3; a recoilable scanner cable 42, dispensed from cable cartridge 43 and guided through hole 44 in a scanner support bridge 40; a telephone handset 45 and associated communication apparatus for making telephone calls over a public telecommunications switching network (PSTN) independent of the operation of the Web-browser of the kiosk; and a mag-stripe card reader 46 and associated credit transaction terminal for automatically dialing up consumer credit and like databases over the PSTN (or Internet) upon scanning mag-stripe card 47 through reader 46. Optionally, the kiosk may also include one or more floppy-disc (or otherwise removable) drive units (not shown) accessible to the consumer for recording promotional and trial versions of information-based consumer products (e.g. video an audio recordings, computer software products, and the like) on removable information storage media (e.g. 1.44 MB floppy discs, 100 MB Zip¤ floppy discs, 1 GB Jazz¤ floppy discs, etc.) supplied by either the retailer or a consumer. Also, the kiosk can be provided with a stereoscopic micropolarizing LCD panel from VRex, Inc. of Elmsford, N.Y. so that micropolarized spatially-multiplexed images (SMIs) of 3-D objects represented with VRML-encoded Web pages can be stereoscopically perceived by consumers when viewed through either an electrically-passive polarizing visor structure supported from the housing of the kiosk, or a pair of polarizing eyeglasses tethered to the kiosk housing and donned by the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

As shown in FIG. 3A3, the bar code symbol reader is supported within its support stand/bridge 40. In this configuration, the laser-scanning field of the reader is projected downwardly upon the surface of the LCD touch screen display panel. By virtue of the angle of tilt of the display panel 37 relative to the ground surface of the retail store, and the projection angle of the laser scanning field relative to the display panel surface, the consumer will be able to easy read the bar code symbol on most consumer products by simply presenting the bar code symbol to the scanning window. In the event that the product is too large to lift from the floor to the scanning window, the consumer can simply remove the bar code symbol reader 36 from its support stand 40, as shown in FIG. 3A3, by pulling cord 42 out of its take-up compartment 43 so that the reader is positioned to read the bar code symbol 49 on the retail consumer product 48. When symbol scanning is completed, the bar code symbol reader is lifted back into its stand support position, between support guides 41A and 41B, while the cord 42 is automatically recoiled back into storage compartment 43, as shown in FIG. 3A3. While the consumer uses the kiosk to scan UPC (or UPC/EAN) symbols on products, to find, access and display consumer product-related information on the display panel 37, he or she may choose or need to use telephone 45 to speak with a manufacturer's representative and engage in electronic commerce, and/or use the magstripe card reader 46 to read magstripe cards (e.g. credit cards) to pay for consumer purchases made over the Internet using the kiosk of the present invention.

As shown in FIG. 3A4, the Web-enabled kiosk of FIG. 3A3 is modified to include a bar code symbol reader having a "cordless-type" scanner interface, thereby eliminating the need for the communication/scanner cable 42 shown in FIG. 3A3. RF-based wireless interfaces, as disclosed in US Letters Patents and Published International Patent Applications, incorporated herein by reference, can be used to realize this cordless-type scanner interface arranged between the bar code symbol reader 36 and the Web-enabled access terminal integrated within the information kiosk. In all other respects, the kiosk shown in FIGS. 3A4 and 3A4' is similar to the kiosk shown in FIGS. 3A3 and 3A3' and described above.

In FIG. 3A5, a fifth illustrative embodiment of the client computer system hereof is realized in the form of a consumer product information access terminal integrated within a point-of-sale (POS) station in retail shopping environments. While this embodiment of the client computer system hereof is particularly adapted for use by sales clerks at POS stations, as well as by store employees behind retail information/service counters, it may also be used by consumers and shoppers alike provided the necessary accommodations are made as described hereinbelow.

As shown in FIG. 3A5, a client subsystem 13 hereof is realized as consumer product information access terminal 60 comprising: a POS station 61 having a cash register computer 61A and keyboard 61B, and a price/UPC Database 61C containing price and UPC number information tables; a Web-enabled computer terminal 62 connecting the POS station 61 to the Internet infrastructure 10 through an ISP 10A; a bar code symbol reader 63 connected to the POS station 61; a 15' diagonal active-matrix LCD panel 64, operably connected to the output of the Web-enabled computer system 62 and the output of the cash register computer 61A, and having a swivel-base 65 that allows the LCD panel to be oriented in various viewing positions for displaying consumer product-related information accessed from the IPI Registrant Database shown in FIGS. 4A1 and 4A2, as well as price information accessed from the price/UPC database 61C. The advantage of this client computer subsystem is that it enables a retail sales clerk to check out customer purchases in a conventional manner, and conveniently access the IPI Finding and Serving Subsystem 2 when check-out business is relatively slow, to answer any questions that consumers may have regarding a particular product in the retail store. This system will be ideal in retail environments having a high level of customer service and large retail service staff. In such instances, the IPI Finding and Serving Subsystem hereof empowers retail sales clerks, at the POS counters as well as customer service counters, by enabling them to quickly access any item of product related information linked to products in their stores by manufacturers and their agents.

As taught in the Objects and Summary of the Present Invention set forth hereinabove, the client computer system of the present invention 13 may also be realized in the form of a transportable bar code driven multi-media kiosk which is completely transportable within the store by hand for the convenience of consumers in retail shopping environments as shown in FIG. 3A6. As taught hereinabove, the retail shopping environment may be a department store, supermarket, superstore, retail outlet or the like. Notably, the transportable bar code driven multi-media kiosk shown in FIG. 3A6 is similar to the bar code driven multi-media kiosk shown in FIG. 3A3, except that the kiosk shown in FIG. 3A6 is scaled down in size and reduced in weight to enable the device to be completely transportable within the store by the hand of the shopper, as taught hereinabove. As shown in FIG. 3A6, the communication connection between the transportable kiosk hereof and the infrastructure of the Internet 10A can be realized using wireless digital communication technology (e.g. RF-based communication subsystems, using DFSK or spread-spectrum modulation techniques) well known in the art in order to provide (i) transportability within retail shopping environments for the convenience of shoppers, as well as (ii) Internet access to the IPI Web-site of the present invention (i.e. hosted on mirrored IPD Servers 11).

Figure 7:
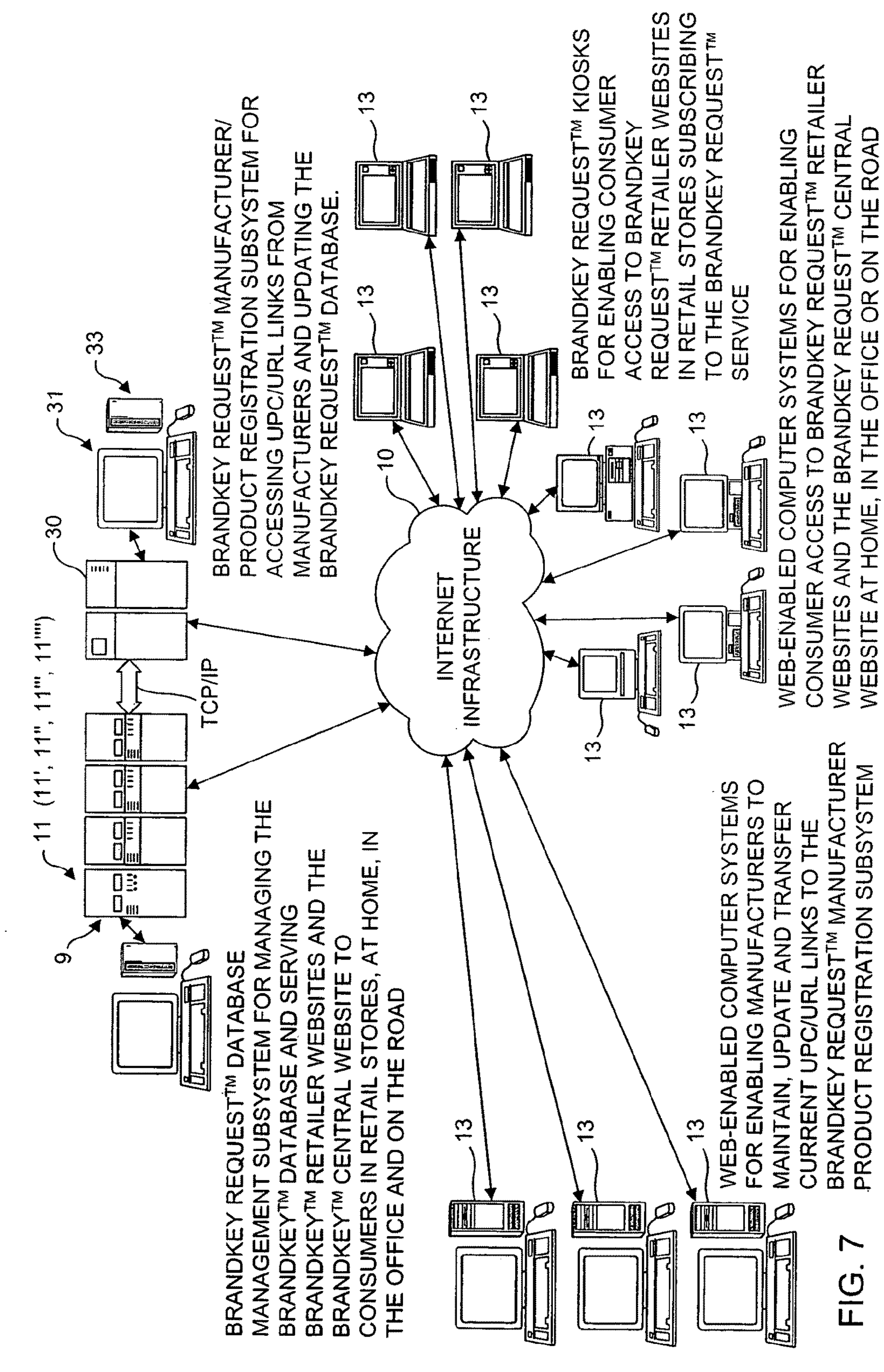

As taught in the Objects and Summary of the Present Invention set forth hereinabove, the client computer system of the present invention 13 may also be realized in the form of a bar code driven multi-media kiosk mounted upon a conventional shopping cart, or other transportation vehicle, so as to be completely transportable within retail shopping environments for the convenience of consumers, as shown in FIG. 3A7. As taught hereinabove, the retail shopping environment may be a department store, supermarket, superstore, retail outlet or the like. Notably, the bar code driven shopping cart kiosk shown in FIG. 3A7 is similar to the bar code driven multi-media kiosk shown in FIG. 3A3, except that the kiosk shown in FIG. 3A7 is mounted upon a conventional shopping cart to be completely transportable within the store, as taught hereinabove. As shown in FIG. 3A7, each shopping cart supported kiosk hereof comprises a cart structure 90 having a basket portion, a push-type handle bar portion 92, a set of wheels and a kiosk device 13 mounted to the handle bar portion. In this illustrative embodiment, the client computer subsystem embodied within the kiosk includes a 2-way RF communication link with its I/O port and a network hub associated with an IP network mounted within the retail-shopping environment of concern. A wireless spread-spectrum communication subsystem including base station 98 and network adapter cards, such as the Symbol Spectrum24 wireless LAN (WLAN) by Symbol Technologies, Inc. can be used to realize the 2-Way RF communication link in a manner known in the communications network art. Such a wireless LAN provides (i) transportability with retail shopping environments for convenience of shoppers, as well as (ii) Internet access to the IPI Web-sites of the present invention (i.e. hosted on mirrored IPD Servers 11). By strategically placing the access points within the retail environment, the Symbol Spectrum 24 wireless LAN makes it possible to create a wireless bridge between a wired (IP-based) LAN within the retail environment (operably connected to the Internet by an ISP) and any number of shopping cart supported kiosks, as well as fixed mounted kiosks, and transportable Internet access terminals lent to consumers for use within the retail shopping environment.

In alternative embodiments, any Client Computer 13 can be realized as a network computer (NC), a Web-TV" type Internet Terminal, a Newton MessagePado¤ DA, or any other device providing Internet access to the IPI Web-site (i.e. mirrored IPD Servers) of the present invention. Notably, the same functionalities provided within the Web-based kiosk described above can be embodied with such alternative embodiments of client computer system.

Figure 8:
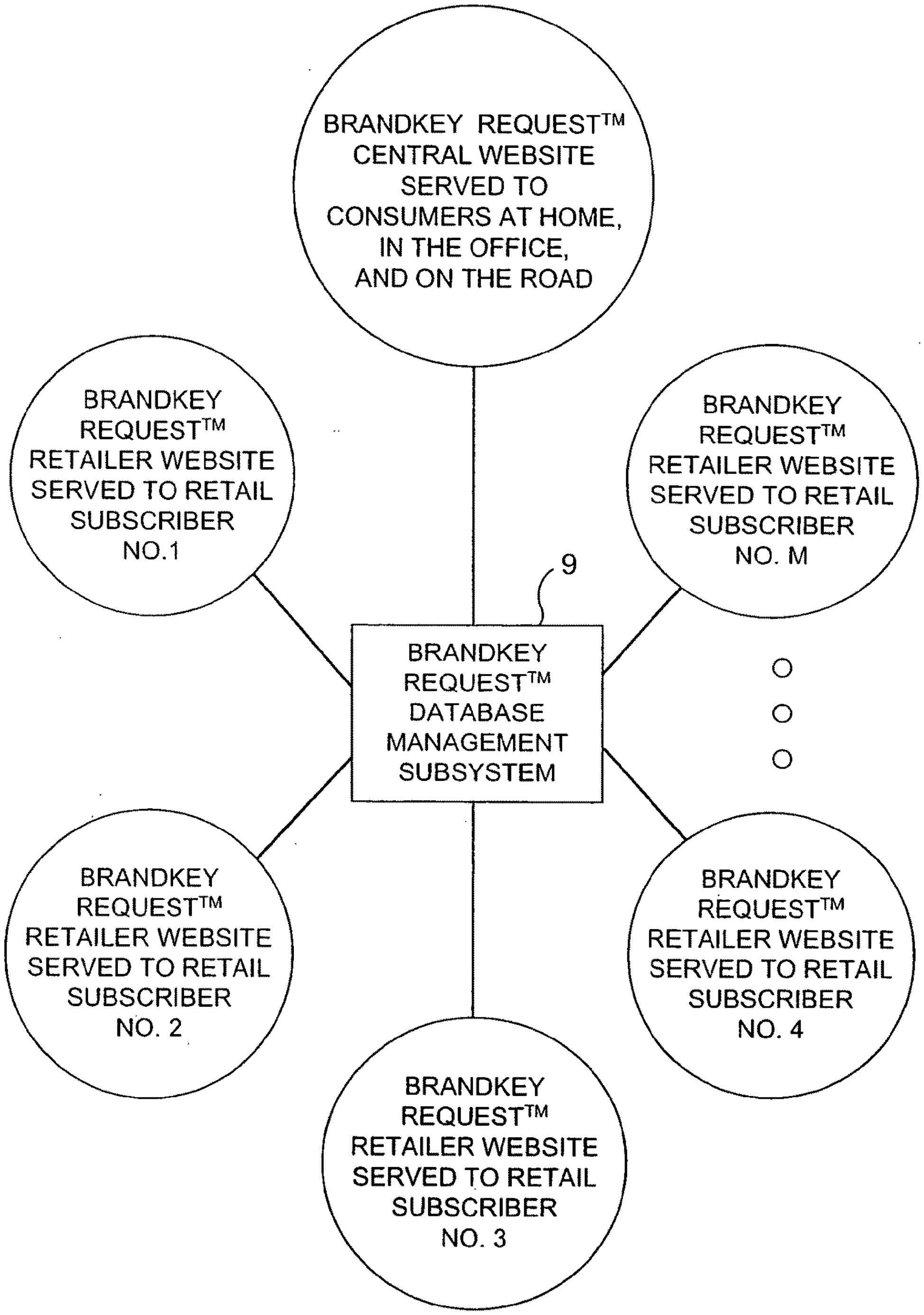

For example, as shown in FIG. 3A8, the client computer subsystem 13 can be realized as a transportable hand-held computer, such as the Newton¤ Model 130 MessagePad 70 from Apple Computer, Inc. of Cupertino, Calif., provided with NetHopper™ brand Internet Access (http-client) Software which supports the TCP/IP networking protocol within the Newton MessagePad operating system, as well as the client-side of http, as taught in U.S. Pat. No. 5,905,251 incorporated herein by reference. Notably, the NetHopper™ brand Internet Access (http-client) Software 71 provides the Newton Model 130 MessagePad with an integrated JAVA GUI-based web browser program for WWW access in a manner know in the Internet access art. As shown in FIG. 3A8, the Newton MessagePad has a display panel 72, touch-screen type keypad 73, and programmed laser scanning bar code symbol reader 74 (e.g., Metrologic ScanQuest¤ Laser Scanning Module Model No. IS4120), integrated within the hand-held device as described in U.S. Pat. No. 5,905,251. The function of bar code symbol scanner 74 is to read UPC or UPC/EAN symbols on consumer products and to produce symbol character data representative of the numbers encoded within such standardized bar code structures. The Newton MessagePad Model 130, denoted by reference numeral 70, is also equipped with a Motorola PCMCIA-based modem card 75 having a RF transceiver for establishing a wireless digital communication link with either a cellular base station or one or more satellite-base stations 76 connected to the Internet by way of an ISP or NSP 10A in a manner well known in the global information networking art. As such, a first wireless digital communication link 77 is established between the Newton MessagePad 130 and cellular (or satellite) base stations 76, and a second digital communications link 78 is established between the base station 76 and the ISP or NSP associated with the infrastructure of the Internet. Accordingly, this embodiment of the client computer subsystem of the present invention is completely mobile (i.e. transportable and provide the consumer access to the Internet and all of its information resources on the WWW and elsewhere, provided that the device maintains its wireless digital communication link with base station 76, distributed through the globe, making access to the IPD servers hereof possible at home, in the office, within retail stores, as well as on the road wherever that may be.

As shown in FIG. 3A8, the Newton MessagePad, ScanQuest¤ Laser Scanning Module 74 and auxiliary battery supply (not shown) are completely housed within a rubberized shock-proof housing 79, in order to provide a hand-supportable unitary device 70 of rugged construction. This hand-held Internet-enabled wireless information access terminal can be used virtually anywhere, provided wireless Internet access is enabled by digital IP communication network service providers (NSPs) in operation about the planet. Operation of Internet access terminal 70 is quite simple from the user s point of view. Upon reading a bar code symbol 80 on a consumer product 81, the object detection field 82 of the device automatically detects the consumer product, and in response thereto, a laser beam 83 is automatically projected and swept across the UPC symbol 80 thereon. While it is generally preferred that the automatic laser scanning engine 74 be interfaced with I/O communications port of the Newton MessagePad device 70, it is understood that, in some instances, it may be desired to connect a pen or wand-type scanning device to the serial port thereof to provide bar code symbol reading capabilities thereto. Optionally, bar code decoding software can be run on the Message Pad device, or as firmware contained within the scanning engine 74 in a manner known in the art.

Notably, it is understood that there will be many different types of wireless mobile Internet-enabled access terminals that may be used to realize the client computer subsystems of the present invention. For example, recently 3COM, Inc. introduced into its commercial product line the Palm Pilot VII Wireless Hand-Held Internet Access Terminal, which is similar in many respects to the Newton MessagePad Model 130 equipped with the Motorola PCMCIA-based modem card 75, and Nethopper™ Software, described above. Also, Symbol Technologies, Inc. of Holtsville, N.Y. has introduced the Symbol SPT 1500, SPT 1700, SPT 1740 and PPT 2700 hand-held wireless bar code scanning Internet access terminals which have virtually the same functionalities embodied within the wireless hand-held Internet access terminal shown in FIG. 3A8, and originally disclosed in U.S. Pat. No. 5,905, 251, supra.

The Web-enabled client subsystems 13 of the present invention described hereinabove may be used to access consumer product-related information, as well as to carry out electronic-commerce related transactions, at home, at work, in the office, on the road, as well as in physical retail shopping environments.

For example, when visiting particular EC-oriented (i.e. electronic-commerce enabled) Web-sites, a consumer may scan UPC (and/or UPC/EAN) numbers on products within his or her home (e.g. in the pantry) using any one of the client computer subsystems hereof equipped with a bar code symbol reader in order to remotely purchase such consumer products using credit or debit type financing, and direct shipment of purchased products to the consumer s home or elsewhere by a particular delivery service. Such EC-enabled WWW sites, commonly referred to as electronic-commerce (EC) stores or storefronts, as well as on-line electronic commerce catalogs, can be operated by manufacturers, wholesalers and/or retailers of consumer products, as indicated in FIGS. 2-1 and 2-2. As shown therein, retailer operated, managed and/or owned EC stores (i.e. EC-enabled WWW sites) are hosted on retailer operated/owned EC information servers (MECIS) 12A, whereas manufacturer operated, managed and/or owned EC stores (i.e. EC-enabled WWW sites) are hosted on manufacturer operated/owned EC information servers (MECIS) 12B operably connected to the infrastructure of the Internet.

The consumer product information delivery system of the present invention shall enable an infinite array of applications with regard to electronic commerce and home shopping, now made possible by the present invention.

Figure 9:
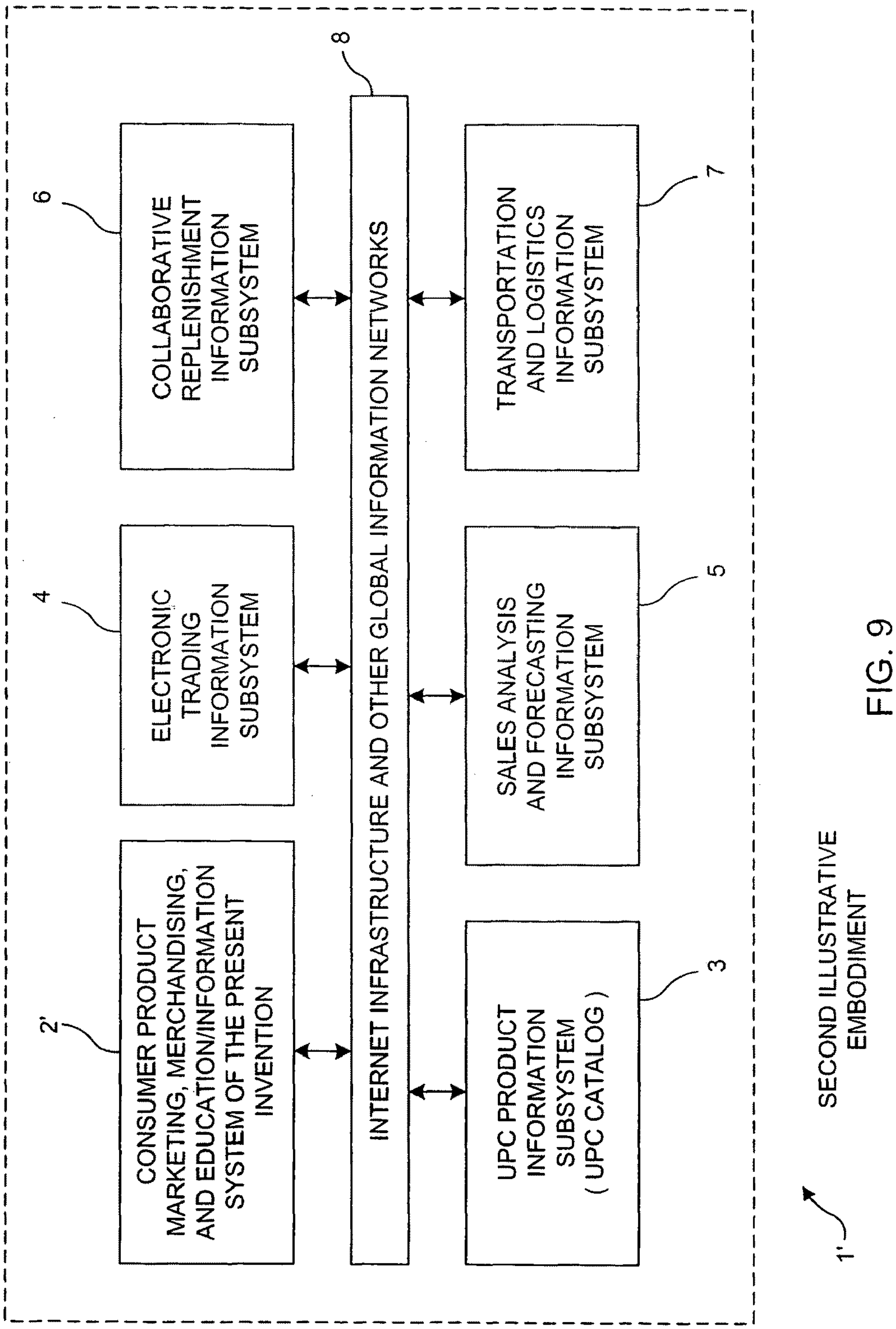

The Retail Store Based Consumer Product Information CPI Link Transport/Delivery Subsystem of the Present Invention As shown in FIGS. 1 and 3A9, each retail shopping environment participating in the system of the present invention is provided with a TCP/IP local area network, referred to as a Retail Store Based CPI Link Transport Subsystem 80 comprising: a plurality of bar code driven kiosks 13 as shown in FIGS. 3A2 through 3A8, having (i) a Web browser program 13A (e.g. Netscape Communicator 4.5 for Windows 98 with a customized GUI) for enabling consumers to access and display information resources on the Internet (e.g. WWW), and (ii) an e-mail client program 133 (e.g. POP3 mail client software) 82 for supporting e-mail based CPI transport operations with remotely-situated e-mail-enabled client subsystems 13 connected to the Internet, in accordance with the principles of the present invention; a network information server 84 running (i) e-mail messaging software 84A for maintaining e-mail accounts and service for each bar code driven kiosk on the retail store based LAN 80, (ii) http server software 84B for serving locally-stored Web document (e.g. advertisements, product prices, specials, notices, etc.) to consumers on the kiosks, as well as (iii) firewall software 84C for maintaining network security; a TCP/IP router 86 connected between the network information server 84 the infrastructure of the Internet (i.e. ISP or NSP), for connecting the retail store based LAN and its connected kiosks to the Internet. Notably, the TCP/IP router 86 is assigned a static IP address that determines the IP address for the retail store based LAN 80. Also, each kiosk can be assigned a static IP address on the retail store based LAN, or a dynamically allocated IP address using the well know Dynamic Host Computer Protocol (DHCP), enabling both Web and e-mail services on each kiosk.

In general, the network information server 84 can be realized by, for example, the Origin 200 Server or O2 Desktop Workstation from Silicon Graphics, Inc., a high-end information server from Sun Microsystems, Inc., or any other computing machine that can perform the function of a server in a web-based, client-server type computer system architecture of the illustrative embodiment. Exemplary electronic messaging (i.e. e-mail) software solutions for the network information server 84 include, but are not limited to: N-Plex® Global Internet Messaging Server solution from Isocor, Inc. of Santa Monica, Calif.; the Message Direct Server from Messaging Direct, Inc.; Mail Spinner, from Nascent; Netscape Messaging Server, from Netscape Communications, Inc.; or Sendmail Pro, from Sendmail Inc. computer system architecture of the illustrative embodiment. Exemplary http server software solutions for the network information server 84 include, but are not limited to: the Java Web Server (JWS) 1.0 or later from JavaSoft, division of Sun Microsystems, Inc.; the JigSaw Web Server from the World Wide Web Consortium; the Fastrak™ Web (http) server from Netscape Communications, Inc.; the Internet Information Server (IIS) from the Microsoft Corporation; the Apache HTTP Server from The Apache Software Foundation; or any other http server capable of transporting HTML-encoded documents.

Alternatively, each network information server 84 can be realized using the Whistle INTERJET II network information server solution from IBM as a turnkey solution for the network information server 84 on the retail store LAN 80. This implementation can support up to hundred (100) bar code driven kiosks on a retail store LAN of the present invention, and in some applications, it may be desirable to modify the e-mail software provided thereon in order to achieve the business objectives of any particular application. It is understood, however, that in many applications, in which advertisements, prices and specials, notices and the like are to be displayed on the kiosks during idle moments (i.e. when consumers are not scanning bar coded products for consumer product related information access and display), there will be a need to use a more robust electronic messaging and http server solutions on the retailer's network information server 84.

As shown in FIG. 3A10A, a preferred way of implementing the retailer based information network of in FIG. 3A9 would be to install a wireless LAN within each brick & mortar retail shopping environment, thereby enabling TCP/IP network connectivity between each Web/e-mail enabled kiosk 13 and the infrastructure of the Internet. As shown in FIG. 3A10A, each Web/e-mail enabled kiosk is seamlessly connected to the TCP/IP network of the retailer LAN 80 using high data rate wireless LAN, such as the Spectrum24™ High Rate Wireless LAN (WLAN) from Symbol Technologies, Inc., of Holtsville, N.Y. Notably, the Spectrum24 High Rate WLAN is designed to the proposed IEEE 802.11 open airwaves standards including the Ethernet backbone, TCP/IP protocols, SNMP network management, PCMCIA adapter card form factors and interfaces, and NDIS and compliant drivers. According to this wireless solution, each Web/e-mail enabled kiosk is equipped with either a Spectrum24™ wireless LAN PC card, radio card, or ISA card 90A to enable a wireless TCP/IP connection to the retail based LAN within the store environment. A Spectrum24 network controller 90B, with integrated RF antenna elements, is installed within the retail shopping environment, preferably in a central location which facilitates excellent RF signal transmission/reception between the network controller 90B and the LAN PC card 90A in each of the Web/e-mail enabled kiosks mounted within the retail shopping environment on, for example, a product self 2000 shown in FIGS. 3A10B through 3A10C. As shown in FIG. 3A10A, the network controller 90B and network information server 84 are connected to a TCP/IP hub 92 configured within the LAN according to a suitable connectivity, well known in the art. In turn, the TCP/IP hub 92 is connected to the infrastructure of the Internet (i.e. ISP) using a modem and a communication link in a manner known in the art. In turn, the TCP/IP hub 92 is connected to the TCP/TP routers 86, which is connected to the Internet infrastructure. Notably, using the Spectrum24 network controller 90, the system administrator can enable administration and configuration of the Web/e-mail enabled kiosks, RF traffic control, node management, and diagnostics. Notably, the 2 Mbps or 11 Mbps version of the Spectrum24 High Rate WLAN can support Voice-over-IP applications in instances where telephonic hand-sets are provided at the kiosk, as shown in FIGS. 3A3 through 3A7.

As shown in FIG. 3A9, the central e-mail server 88 is assigned a static IP address and connected to the infrastructure of the Internet using a modem in a manner known in the art. The retailer RDBMS 81 and a manufacturer RDBMS 83 are connected to the backend of the central e-mail server 88 by way of a high-speed TCP/IP network 91. Preferably, RDBMS 89A and 89B support protocols such as XML/ICE to enable electronic data interchange with client machines operated by retailers and manufacturers alike. The information server supporting the central e-mail server 88 may also support an http server and a suitable database interface to enable retailer and manufacturers alike to access the RDBMS 89A and RDBMS 89B over the Internet using XML, EDI, ftp or other information interchange protocol.

FIGS. 3A10B through 3A10C illustrate an exemplary product shelving system in a retail shopping environment, wherein a plurality of a web/e-mail enabled bar code driven CPI kiosks 12 are mounted onto shelf structures 99 by way of a kiosk mounting bracket 13C that can be removably attached to a shelf structure 99 (e.g. using a special tool if required to prevent unauthorized movement) as well as disattached therefrom for reinstallation within the parts of the retail store as circumstances may require. As shown, each web/e-mail enabled kiosk 13 is equipped with a wireless LAN PC card 90A in order to establish a wireless connection with retailer LAN 90 via the wireless LAN controller 90B. As shown in FIG. 3A10B, the kiosk 13 depicted therein is a modified version of the kiosk shown in FIGS. 3A3 and 3A4, wherein the bar code reading device 36' is pivotally mounted on the kiosk housing and orientated for optimal product label scanning.

In order to better understand the functions of the centralized e-mail server 88 and its back-end RDBM 89A and 89B illustrated in FIGS. 3A9 and 3A10, it will be helpful to provide a brief overview of the CPI transport services enabled by the e-mail based information transport subsystem described above.

During operation of the IPI Finding and Serving Subsystem 2 hereof within a retail shopping environment, the consumer having accessed and displayed a consumer product related Web document on a bar code driven consumer product information kiosk as shown, for example, in FIGS. 3A2 through 3A8, may also desire to retain a copy thereof for future reference and use. In such instances, it would desirable to provide the bar code driven information kiosk 13 with a thermal or like printer so that consumers can printout accessed product related information within the retail-shopping environment and take the same home for future review and evaluation. However, from the retailer s point of view, providing each such CPI kiosk with a printer may be too costly to maintain in typical retail environments. Thus, there is a great need for an improved method of and system for making consumer copies of consumer product information that has been accessed and displayed on bar code driven consumer product information kiosks within retail shopping environments.

In accordance with the principles of the present invention, the problem of providing consumers with copies of accessed consumer product information within retail shopping environments is addressed by enabling the consumer at the retail-based kiosk to: (1) display an e-mail envelope ready for stuffing, addressing and sending the display frame 20C of the Web browser program thereof, by manually selecting control button 21G provided along the control frame 20B, shown in FIG. 3A14A; (2) capturing, saving, and attaching any accessed/displayed consumer product document to the displayed e-mail envelope by manual (or voiced-directed) selection of the capture, save and attach button 110 within the displayed e-mail envelope of FIG. 3A14, or capturing and recording the URL of the CPI-related document being displayed by manual (or voice-directed) selection of the capture and record button 112 within the displayed e-mail envelope of FIG. 3A16; (3) addressing the e-mail envelope with the consumer/shopper s home, office or like e-mail address by either reading an e-mail address encoded within a bar code (or magnetic-stripe) structure or manually entering the same within the addressee field; and (4) sending the stuffed e-mail envelope by manual selection of the send button 114 within the displayed e-mail envelope. The enabling infrastructure for this e-mail enabled consumer product information transport subsystem will be described hereinbelow.

Figure 14:
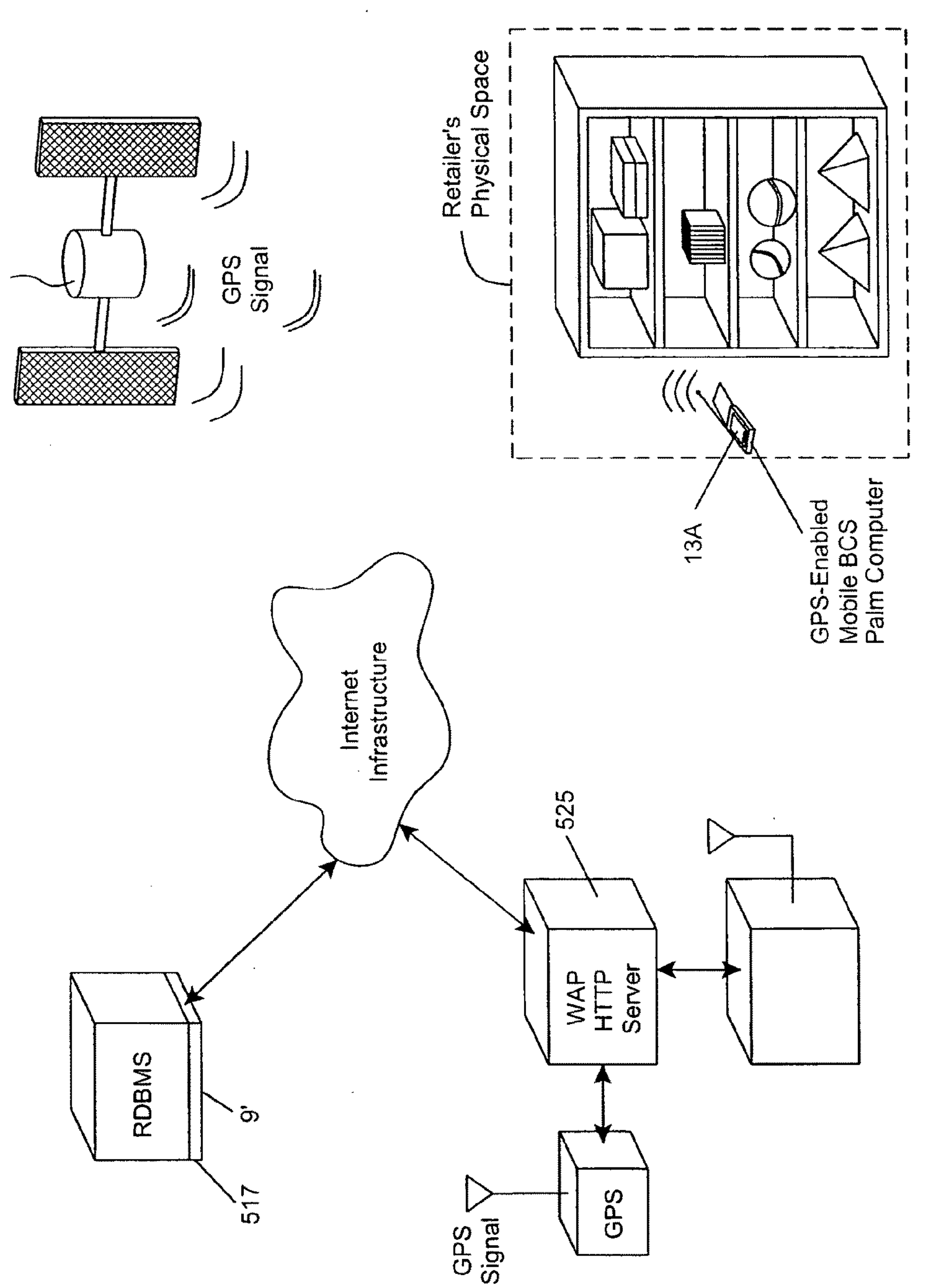

Notably, the e-mail envelope displayed on each information kiosk hereof, as shown in FIGS. 3A14 and 3A16, need not indicate that a copy of a particular e-mail message is being sent to the centralized e-mail server 88 upon selecting the send button, although circumstances may dictate that notice be given to customers using this e-mail CPI-related transport service within retail shopping environments. In the case where the (carbon copy) cc field visually indicated to the consumer, it may be desirable to enable the consumer to delete preset recipients in the addressee fields thereof so that, upon transmission, no copies of transmitted e-mail envelope will be sent to third parties (e.g. retailers and/or manufacturers), thereby providing the customer with a greater sense of confidentiality and privacy with respect to its product inquires when using this e-mail CPI-related transport service.

Having provided an overview of the functions of the e-mail CPI-related transport service of the present invention, it is appropriate at this juncture to briefly describe the primary functions to be performed by central e-mail server 88 and RDBMs 89A and 89B shown in FIG. 3A9.

In the context of the e-mail CPI-related transport service of the present invention, the primary function of the central e-mail server 88 shown in FIGS. 3A9 and 3A10 is to receive a carbon copy of each e-mail envelope sent from a retailer kiosk within the system of the present invention, to the e-mail address of the shopper (or friend thereof) accessible at home, in the office, at school, or on the road. In alternative embodiments of the present invention, the central email server 88 can be realized as a mirrored array of e-mail servers connected to different points of the Internet about the planet, whose main purpose is to collect copies of e-mail CPI transmissions sent to the e-mail addresses of consumers/shoppers from Web/e-mail enabled kiosks 13 within retail shopping environments. Such information is important to retailers and manufacturers as it reflects the consumer product related interests of consumers shopping at particular brick & mortar retail stores, located at particular geographic regions on the Earth. Potentially, each such region will have different market significance to particular retailers and/or manufacturers.

Once such CPI-related information has been collected by the central e-mail server(s) 88, the retailer RDBMS 81 periodically downloads a copy of the e-mail CPI transmission records maintained within the central e-mail server subsystem 88. Thereafter, such records are processed and reorganized in a form that is readily useful to retailers who offer particular UPN-labeled products for sale. An exemplary database structure for the retailer RDBMS 89A is set forth in FIG. 3A11. Preferably, the retailer RDBMS 89A will contain information on which Web documents (specified at a particular URL) were accessed at a particular retailer kiosk (having a geographic specification) and transported to a particular e-mail address of a consumer considering the purchase of the UPN-labeled product linked to the URL. Notably, the retailer RDBMS 89A of the illustrative embodiment can be realized as an Octane® Workstation or $O_2$ Desktop Workstation from SGI of Mountain View, Calif., a high-end SUN information server from Sun Microsystems, Inc., or any other high-end computing platform running RDBMS solution software such as, for example, Oracle8i (Release 2) RDBMS software from Oracle Corp. of Redwood Shores, Calif., and data mining and analysis software such as, for example, Mineset 3.0 Visual data mining software from SGI. Using such data mining and analysis tools, various types of reports can be generated for individual retailers indicating trends in consumer shopping behavior, as well as the address and identity of prospective customers. Preferably, only retailers registered with the system will be provided access to information maintained within the retailer RDBMS 89A that relate to Web documents accessed and reviewed by the retailer s kiosks, prior to or after making a consumer product search and/or purchase within a particular retail-shopping environment.

Similarly, the function of the manufacturer RDBMS 83 is to periodically download a copy of the e-mail CPI transmission records maintained within the central e-mail server subsystem 88, and to thereafter process and reorganize the same so as to be put into a form that will be readily useful to manufacturers who make or have made particular UPN-labeled products for sale and publish particular CPI-related Web documents on the WWW and link the same to particular UPN-labeled products. An exemplary database structure for the manufacturer RDBMS is set forth in FIG. 3A12. Preferably, the manufacturer RDBMS 89B will contain information on which Web documents (specified at a particular URL) were accessed at a particular retailer kiosk (having a geographic specification) and transported to a particular e-mail address of a consumer considering the purchase of the UPN-labeled product linked to the URL. Notably, the manufacturer RDBMS 89B of the illustrative embodiment can be realized as an Octane® Workstation or $O_2$ Desktop Workstation from SGI of Mountain View, Calif., a high-end SUN information server from Sun Microsystems, Inc., or any other high-end computing platform running RDBMS solution software such as, for example, Oracle8i (Release 2) RDBMS software from Oracle Corp. of Redwood Shores, Calif., and data mining and analysis software such as, for example, Mineset 3.0 Visual data mining software from SGI. Using such data mining and analysis tools, various types of reports can be generated for individual manufacturers indicating trends in consumer shopping behavior, as well as e-mail leads on prospective customers. Preferably, only manufacturers registered with the system will be provided access to information maintained within the manufacturer RDBMS 89B that relate to Web documents accessed and reviewed by shoppers or the retailer s kiosks, prior to or after making a particular product search and/or purchase within a particular retail shopping environment.

The Consumer Product Advertisement and Promotion Delivery Subsystem of the Present Invention for use in Retail Shopping Environments The structure and function of the consumer product advertisement and promotion delivery subsystem of the present invention, indicated by reference numeral 2A in the system diagram of FIG. 1, will now be described in greater detail with reference to FIGS. 3A16 through 3A24.

In general, the function of subsystem 2A is to enable the management of Web-based consumer product advertisements, promotions, and product location instructions created by manufacturers, their agents, and retailers, and delivering the same to consumers within physical retail environments using wireless Web-based product promotion/advertising kiosks installed therewithin. As shown in FIG. 3A16, subsystem 2A comprises: a plurality of manufacturer-operated client machines for (i) managing UPN/TM/PD/URL data links and using EDI techniques to transmit the same to a centralized Web-based RDBMS (structured as shown in FIG. 3A19A) for subsequent delivery to Web-based product promotion kiosks installed within a retailer WAN, as shown in FIGS. 3A17 through 3A21A, or (ii) managing UPN-indexed information resource files (IRFs) of a multi-media nature, and using EDI techniques to transmit the same to a centralized Web-based RDBMS for subsequent delivery to the Web-based product promotion kiosks; a plurality of advertiser-operated client machines for (i) managing UPN/TM/PD/URL data links and using EDI techniques to transmit the same to a centralized Web-based RDBMS (structured as shown in FIG. 3A19A) for subsequent delivery to Web-based product promotion kiosks installed within a retailer WAN, as shown in FIGS. 3A17 through 3A21A, or (ii) managing UPN-indexed information resource files (IRFs) of a multi-media nature, and using EDI techniques to transmit the same to a centralized Web-based RDBMS (structured as shown in FIG. 3A19B) for subsequent delivery to the Web-based product promotion kiosks; and a plurality of in-store retailer local area networks (LANs) or wide area networks (WANs), as shown in the FIG. 3A17, for delivering product advertising and promotional information to consumers via Web-based product promotion kiosks of the type shown in FIGS. 3A19A and 3A19B, arranged, for example, in retail stores as shown in FIG. 3A20 and display such information using browser GUIs as shown, for example, in FIG. 3A21A. Notably, Web-based information resource files (IRF) associated with the UPN/TM/PD/URL links in the Web-based RDBMS of FIG. 3A16, can be served from servers 12, 12', 12 and 12A, as in the case of the IPI finding subsystem of FIGS. 2-1 and 2-2, or stored within a terabyte-sized data warehouse (i.e. RDBMS) accessible to consumers through http servers in a manner known in the art.

In FIG. 3A17, an illustrative embodiment of the consumer product promotion/advertisement delivery subsystem of FIG. 3A16 is shown in greater detail. Preferably, each retailer-operated Web-based product promotion kiosk in the information network of FIG. 3A17 uses a multi-frame display framework as shown in FIG. 3A21A, to simultaneously display the following elements of information to consumers within the store: (i) a display frame for displaying the retailer's identity or image (e.g. "Welcome to Wal-Mart® Stores"), created by the manufacturer and selected by the retailer through a Web-enabled client machine (e.g. retailer-operated administration client machine shown in FIGS. 3A16 and 3A17) and indexed by the exemplary URL denoted as URL-DF1; (ii) a display frame for displaying a product advertisement, created by the manufacturer and/or its agent, but selected by the retailer through a Web-enabled client machine (e.g. retailer-operated administration client machine shown in FIGS. 3A17 and 3A17), and indexed by the exemplary URL denoted by URL-DF2; (iii) a display frame for displaying a promotional message about the advertised product, selected by the retailer through a Web-enabled client machine (e.g. retailer-operated administration client machine shown in FIGS. 3A17 and 3A17), and indexed by the exemplary URL denoted by URL-DF3; and (iv) a display frame for displaying information indicating where the advertised product is located within the store (e.g. by store category, aisle, store section, etc.). Notably, each such set of information to be displayed from a particular product promotion kiosk in particular retail store is programmed by the retailer using a Web-enabled client. During the programming operations, the retail manager will view a Product Promotion Programming Table, as shown in FIG. 3A23, which is maintained within Web (http) server 9' or http server connected to the data warehouse shown in FIG. 3A17. The computing platform supporting each such http server can also run the OPEN ADSTREAM™ (OAS) 5.0 Internet Advertisement Management Solution software from Real Media, Inc., of New York, N.Y. Using the OAS 5.0 advertisement management solution, and the Product Promotion Programming Table, each retail store manager (or other designated person within the organization), can determine which product advertisements and promotions (i.e. HTML code, image files, and any other rich media content associated therewith) will be displayed within the designated display frames (DF1, DF2, DF3 and DF4) a particular product promotion kiosk, at which times of the day, on which dates, etc. in accordance with a product promotion program being carried out by the retailer. While the manufacturers, their agents and advertising agents will be enlisted to create product advertisements (i.e. digital content) for the consumer product advertising and promoting subsystem 2A of the present invention, the retailers are provided with total control over what products within their store will be advertised and promoted, when and where within their enterprises.

As shown in FIGS. 3A19A and 3A19B, each Web-based promotion kiosk in the retail shopping LAN or WANs of FIGS. 3A16 and 3A17, comprises a Web-enabled computing platform which may have many if not all of the subcomponents and functionalities of the consumer product information kiosks shown in FIG. 3A3, and described in great detail hereinabove (e.g. including touch-screen LCD panel, automatic laser scanning bar code reader), and therefore, may function as such if and when retail conditions require. However, Web-based the product promotion kiosk of FIGS. 3A19A and 3A19B also includes a number of important intelligence functionalities which makes it particular well suited for product advertising and promotion within retail stores, as shown in FIG. 3A20.

In particular, as shown in FIG. 3A19B, the product promotion kiosk comprises a pair of 2-D CCD sensors and associated light collection optics, integrated within its ultras-thin flat-panel housing, for automatically capturing images of scenery (e.g. human subjects) with its field of view (FOV) of the kiosk, as shown in FIG. 3A19A, and an image processor for processing the same to detect the presence of human eyes glazing at the display surface of the kiosk. Such images are captured using image capture subsystem, of which the 2-D CCD sensors comprise a subcomponent. The individual fields of view of each CCD sensor can be combined to provide a resultant FOV for the kiosk. Each digital image is time-stamped and transferred to an image buffer for preprocessing in a manner well known in the art. Details on digital image preprocessing algorithms can be provided in the textbook HANDBOOK OF IMAGE PROCESSING OPERATORS (1996) by R. Kletpe and P. Zamperoni, incorporated herein by reference.

As shown in FIG. 3A19B, a high-speed digital image processor is provided for processing each preprocessed image of the captured scenery, so as to detect one or more pairs of eyes within the captured image, indicative that human eyes were gazing at the product advertisement and promotion being displayed at the time-stamped instant of the captured image. Conventional eye-tracking algorithm software known in the art can be used or otherwise adapted to perform this image processing function.

Each time a pair of eyes is detected, data indicative thereof (including the time stamp) can be stored within long-term memory (e.g. written to a hard disc storage embodied within the kiosk), whereas each frame of buffered image data, once analyzed, can be discarded (i.e. dumped). Such image frame data can be captured at a rate of 5 or more (pairs of) frames per second to collect accurate information about the number of eyes gazing at the displayed advertisements, within the field of view of the kiosk, which is spatially coincident with the view angle of the touch-screen LCD panel employed within the kiosks. At the same time, information about which UPN-indexed product advertisements are being displayed on the GUI of the kiosk, at time-stamped instances of operation, can also be written to the hard drive of the kiosk, and eventually be compared against the eye-tracking data recorded thereon to determine the number of eyes which gazed at each product advertisement/promotion displayed on each product promotion kiosk, within a particular store, on a given date, as indicated by the exemplary report shown in FIG. 3A24. Periodically, this information can be transferred to a retailer-operated server on the LAN or WAN for comparison with sales information collected at retailer-operated POS stations. As indicated in the report of FIG. 3A24, the server can be analysis the collected retail information and determine how many units of a particular UPN-labeled product were sold in the retail store, within which product advertisements/promotions for the product were displayed on product promotion kiosks within the retail store environment. Such reports will help determine the efficacy of a product advertising/promotion program run over the network of product promotion kiosks in the store, and how the program should be modified to increase sales. All sorts of valuable information can be collected by the intelligent Web-based product promotion kiosks of the present invention, including shopper traffic through a retail store, patterns of shopper pooling during particular parts of the day, all carried out in a non-intrusive manner without violating the privacy concerns of the retailer's customers.

The Database Structure of the IPD Server

In the illustrative embodiment of the present invention, each data-synchronized IPD Server 11 of the preferred embodiment maintains at least two different relational-type databases, namely: a IPI Registrant Database for storing information about manufacturers whose products are registered with the system; and a Non-IPI Registrant Database for storing information about manufacturers whose products are not registered with the system. A schematic representation of the IPI Registrant Database is shown in FIG. 4A1, whereas a schematic representation of the Non-IPI Registrant Database is shown in FIG. 4B.

As shown in FIG. 4A1, the relational-type IPI Registrant Database maintained by each IPD Server comprises a plurality of labeled information fields for each product registered therewith, namely: an IPN Information Field for storing information (e.g. numeric or alphanumeric string) representative of the Universal Product Number (e.g. twelve-digit UPC Version A number, eight-digit UPC Version E number, thirteen-digit UPC/EAN number, or twelve-digit UPC Version A number plus five-digit Add-On Code Segment number frequently used in the publishing industry) assigned to the consumer product; a Company Name Information Field for storing information (e.g. numeric or alphanumeric string) representative of the name of the company making, selling or distributing the corresponding product; a URL Information Field(s) for storing information (e.g. numeric or alphanumeric string) representative of the Universal Resource Locator (URL) or Universal Resource Locators (URLs) at which information resource(s) of the multimedia type can be found on the Internet relating to the corresponding consumer product; a Trademark Information Field for storing information (e.g. text and/or alphanumeric strings) representative of each trademark (or Domain Name) used in connection with the promotion, sale, distribution and/or use of the corresponding product, and preferably registered with the United States Patent and Trademark Office (USPTO) or other governmental or quasi-governmental agency (e.g. INTERNIC or Network Solutions, Inc.); a Product Description Information Field for storing information (e.g. text strings) descriptive of the corresponding product; an E-mail Address Information Field for storing information (e.g. numeric or alphanumeric string) representative of the e-mail address of the corresponding company (e.g. manufacturer) on the Internet; a CPIR-Enabling Applet Information Field for storing information representative of consumer product information request (CPIR) enabling Applets accessible by retailers, wholesalers, advertisers, Web publishers and the like by downloading operations to be described in detail hereinafter, and eventually inserted within the HTML code of Web documents on various types of Internet information servers used to host WWW sites of all sorts, so that, when executed, these CPIR-enabling Applets automatically access from the master UPN/TM/PD/URL Database Management Subsystem 9 hereof, a categorized menu of URLs specifying the location of information resources on the Internet pertaining to a particular UPN-labeled product and symbolically linked thereto by its manufacturer or authorized agent; image file storage field for storing color images of consumer products registered with the system; and a Status Information Field for storing information (e.g. numeric or alphanumeric string) representative of whether the company (e.g. manufacturer) associated registered product has paid their monthly, quarterly or annual registration fees associated with registration within the IPD Servers of the information finding and serving subsystem hereof. Notably, each information item contained with the information field shown along the same horizontal line of FIG. 4A1 is related or linked.

In general, the URL stored in the URL Information Field specifies the address of an information resource on the Internet (e.g. Web), and thus may point to any one of the following types of information resources: a HTML document or file on the World Wide Web (expressed in the Hypertext Markup Language); a single record in a database; the front-end of an Internet program such as Gopher; or the results of a query made using another program. In accordance with convention, the syntactic structure of each URL generally comprises: a Protocol Specifier, such as http, ftp, gopher, news, or mail to, and specifies the type of resource that the URL is pointing (i.e. connecting) to; a Host Indicator, represented by double slashes // if the URL is requesting information from a Web Server; Server Name comprising an Internet Domain Name (e.g. www.), the address of the Web Server (e.g. ibm.), and a designator (e.g. corm, edu, int, mil, net, org, etc.) identifying who owns the server or where it is located; a Path Name, such as Products/Computers/, indicating a path to the destination information file on the identified Server; and a Resource Name (including file extension, e.g. .html), such as aptiva.html, identifying the actual named information file that contains actual information resource specified by the URL.

As used herein as well as in the claims to Invention, the term registered and the variants thereof shall be understood to mean listed or having an entry within a database. Such listing or entry can be achieved in a variety of ways including, but not limited to: (i) by specific request of the associated company or business; or (ii) by the system administrator without a request and/or authorization of the corresponding company or business linked to the product.

Notably, each information item contained within the information field shown along the same horizontal line of FIG. 4A1 is symbolically related or linked. Different products of the same registrant or related registrant may also be linked together so that a user looking for information about a particular product is automatically provided with URLs which are assigned to related products of the registrant which may satisfy the goals or objectives of a particular advertising and/or marketing campaign or product promotion program of the registrant company. As it may be desired to relate particular products at particular points in time, the relationships therebetween can be dynamically changed within the IPI Registrant Database by a straightforward database updating operation carried out by a system administrator (or manager) who, in theory, can be located virtually anywhere throughout the world. Expectedly, such database updating operations would be carried out using appropriate system access and security procedures well known in the art.

Inasmuch as the UPC data structure is presently employed as a universal product identifier (i.e. a primary data structure) in a majority of industries throughout the world, its twelve-digit numeric string (for UPC Version A) or eight-digit numeric string (for UPC Version E) will be a preferred UPN (in many applications) for purposes of carrying out the principles of the present invention. This twelve (12) digit human-readable number, printed on the bottom of each UPC label (and encoded within the bars and spaces of the UPC label itself), comprises: (i) a six digit manufacturer number assigned to the manufacturer by the Uniform Code Council, Inc. (UCC) of Dayton, Ohio, and consisting of a one digit number system number and a five digit manufacturer code; (ii) a five digit product number assigned to the product by the manufacturer; and (iii) a one digit modulo check digit (mathematically calculated) and added to each UPC number to check that the code has been read correctly by the bar code symbol reader.

In order to provide the requester greater control over what information is actually displayed on its client subsystem, the URL Information Field of the IPI Database shown in FIG. 4A1 contains a number of information subfields. As shown in FIG. 4A2, these information subfields comprise: a Product Advertisement Information Field for storing information representative of URLs pointing to information on the Internet relating to advertising and/or promotion of the product; a Product Specification (i.e. Description) Information Field for storing information representative of URLs pointing to information on the Internet relating to specifications on the product; a Product Update Information Field for storing information representative of URLs pointing to information on the Internet relating to product updates, recalls, notices, etc; a Product Distributor (e.g. Wholesaler and/or Resaler) Information Field for storing information representative of URLs pointing to information on the Internet relating to distribution, sale and/or ordering of the product; a Product Warranty/Servicing Information Field for storing information representative of URLs pointing to information on the Internet relating to warranty, extended warranty offerings, servicing and maintenance of the product; a Product Incentive Information Field (e.g. rebates, discounts and/or coupons) for storing information representative of URLs pointing to information on the Internet relating to rebates, discounts and sales on the product; a Product Review Information Field for storing information representative of URLs pointing to information on the Internet relating to reviews, analysis, testing, inspection and/or comparison of the product; and Miscellaneous Information Field(s) for storing information representative of URLs pointing to information on the Internet relating to miscellaneous aspects of the product (e.g., direct product sales on the WWW, product installation/set-up and operating manuals, company reports (10 Ks, annual reports, etc.), and the like. Each URL symbolically linked to a UPC-labeled product registered in the Registered IPI Database is categorized within one or more of these URL categories.

The list of URLs recordable in the IPI Registrant Database for each registered UPC-labeled product is virtually unlimited. Below are just a few examples of how the IPI Finding and Serving Subsystem hereof can be used as a virtual sales agent that provides value-added services to consumers, retailers and the like.

For each CD sound recording, the URL list may contain a URL that points to a promotional QuickTime¤ video recording or MP3-formatted sound recording published on the WWW for reviewing and evaluation by the consumer. The promotional song can be by a commissioned or endorsing artist, as is typically done in conventional advertising programs. The same can be done for video recordings on tape and digital video discs (DVDs). The URL may also provide the consumer with a down-loadable trial version of the product for a limited time period.

For each computer software product, the URL list may contain a URL that points to a multi-media clip on the WWW that provides a demonstration of the solutions that the software product provides, as well as the functions and development tools that it enables. It may also provide the consumer with a down-loadable version of the software product for a time-limited trial period.

For electronic consumer products, the URL list may contain a URL that points to a multi-media clip on the WWW that provides an audio-visual demonstration of the product in various user environments. Also, the URL list can contain a URL that points to a Web-based Specification Sheet that can be printed out in a retail environment, at home, work or on the road.

For groceries and like articles, the URL list may contain a URL that points to a multi-media clip on the WWW that provides a QuickTime¤ video recording or the like of the product, illustrating various cooking recipes and uses for the product. Also, the URL list can contain a URL that points to a Web-based Discount Coupon that can be printed out in the store, at home or work.

For toys, the URL list may contain a URL that points to a multi-media clip on the WWW that provides an audio-visual demonstration of the toy along with promotional endorsements by the various characters used in its advertising campaign.

For clothing, garments, or accessories (e.g. wearing apparel), the URL list may contain a URL that points to a multi-media clip on the WWW that provides a QuickTime¤ video recording or the like of the clothing, garments, and/or accessories being modeled by stunning fashion models. Ideally, such video recordings, linked to particular articles of wearing apparel by their UPC number, can be used to extend and augment the advertising campaign being carried out in other forms of media (e.g. television, radio, print, billboards, etc.).

Preferably, the manufacturer, its marketing personnel and advertising agents will actively participate in the creation of the product related information resources, as well as the placement of their URLs into the above-defined (or like) URL categories maintained within the Database of the IPI Finding and Serving Subsystem hereof. Also, using the Manufacturer/Product Registration Subsystem hereof, manufacturers and/or their agents can easily link their UPNs (e.g. UPC and/or EANs) with such URLs and manage the same in a dynamic manner to ensure that product related information on the Internet is accurately linked to the UPNs of the manufacturer s products. Through such active participation, the business objectives of any particular manufacturer or retailer can be promoted by way of the IPI Finding and Serving Subsystem of the present invention. In this way, the information-requesting consumer is provided with only the kinds of product-related information which he or she seeks.

As shown in FIG. 4B, the Non-IPI Registrant Database maintained by each IPD Server comprises a plurality of labeled information fields for each product that is not currently registered with the IPD Server, namely: an IPSN (i.e. IPN) information Field for storing information (e.g. numeric or alphanumeric string) representative of the Universal Product Number (e.g. a UPC number from a UPC numbering system, or an EAN numbering system) assigned to the non-registered product; a Company Name Information Field for storing information (e.g. numeric or alphanumeric string) representative of the name of the company making, selling or distributing the corresponding non-registered product; a Trademark Information Field for storing information (e.g. text and/or alphanumeric strings) representative of each trademark used in connection the promotion, sale, distribution and/or use of the corresponding product, and preferably registered with the USPTO or other governmental agency; a Product Description Information Field for storing information (e.g. text strings) descriptive of the corresponding product; and an E-mail Address Information Field for storing information (e.g. numeric or alphanumeric string) representative of the e-mail address of the corresponding company (e.g. manufacturer) on the Internet; a Status Information Field for storing information (e.g. numeric or alphanumeric string) representative of whether the company associated non-registered product has been solicited by the IPD Server, and on what dates registration solicitation has occurred. Notably, each information item contained with the information field shown along the same horizontal line of FIG. 4A1 is related or linked. The information required to construct the Non-IPI Registrant Database shown in FIG. 4B can be readily obtained from a number of commercially or publicly available information sources (e.g., the Universal Code Council, Inc., Dayton, Ohio; QRS, Inc. of Richmond. California; General Electric Information Services (GEIS) of Delaware, Maryland; etc.).

Constructing the IPI Registrant Database within the IPI Finding and Serving Subsystem Hereof The utility of the product finding functionalities of the IPI Finding and Serving Subsystem 2 hereof depends in large part on the number of consumer-products registered with the IPI and Non-IPI Registrant Databases supported within the UPN/TM/PD/URL RDBMS 9 hereof, as illustrated in FIGS. 2B1, 2B2, 2B3 and 2B4. In principle, numerous techniques may be employed separately or in combination with each other in order to construct the IPI and Non-IPI Registrant Databases of the present invention. Six such techniques will be detailed below.

According to a first database construction technique, the administrator of the IPI Registrant Database would transmit Product Registration Requests (PRRs) in the form of electronic documents to each and every the manufacturer having been issued, for example, a six digit UPC Manufacturer Identification Number (MIN) by the UCC, Inc. Such electronic documents can be transmitted using conventional MIME protocols such as, for example, STMP. The Product Registration Request document would seek to ascertain from the manufacturers the various information items (including the menu of URLs) identified in the IPI Registrant Database of FIG. 4A1. In response to the Product Registration Request, each solicited manufacturer would send back to the administrator of the IPI Registrant Database (for each of its consumer products) its UPC number and a menu of categorized URLs indicating the location of the information resources identified in the Product Registration Request document. This information can then be used to readily construct the IPI Registrant Database of the illustrative embodiment.

According to a second database construction technique, a global advertising campaign would launched (over various media) in order to solicit the various information elements identified in the IPI Registrant Database of FIG. 4A1 and thus register the products of the manufacturers selling UPC-labeled products. Preferably, such information would be collected by way of an electronic data transfer subsystem(s) set-up to cooperate with the system of the present invention in order to facilitate database construction operations.

According to a third database construction technique, the IPI system itself would continuously solicit consumer product registrations over time in order to collect information from companies responding favorably to the solicitations. While such solicitation efforts can involve the issuance of product registration requests using various types of media, it is preferred that the information collection operations are carried out using electronic data transfer techniques (e.g. ftp, EDI or XML/ICE) described hereinabove.

According to a fourth database construction technique, a number of commercial on-line Internet search engines, such as AltaVista", Yahoo", WebCrawler", Lycos", Excite", as well as powerful off-line parallel-processing search engines, would be enlisted to analyze (i.e. mine) information on the WWW in order to collect and link the information elements specified in the IPI Registrant Database of FIG. 4A1.

Once an initial IPI Registrant Database has been constructed using any one or more of the four database construction techniques described hereinabove, manufacturers registered therewith can be periodically contacted using Web-based electronic document (i.e. message) transfer techniques in order to request updating and confirmation of the UPN/TM/PD/URL listings contained within the database of the IPI subsystem of the present invention.

According to a fifth database and preferred construction technique of the present invention, the Registrant IPI Database of the system would be initially seeded with several items of information obtained and related without the assistance of manufacturers of UPC-labeled products. Such information items include: (1) the six digit UPC Manufacturer Identification Numbers encoded in the UPC symbols (and numbers) applied to the products of such UCC-registered manufacturers; and (2) the URLs of the Web home pages of such manufacturers.

The first step of this database construction method involves obtaining the six digit Manufacturer Identification Numbers (MINs) uniquely issued to manufacturers by the Uniform Code Council, Inc. of Dayton, Ohio. Such MINs can be obtained from various commercial sources including GE Information Services, QRS, Inc. formerly Quick Response Services, Inc.), as well as the UCC. At present, about 180,000 Manufacturers Identification Numbers have been issued to manufacturers by the UCC. A string of six zeros (i.e. 000000) may be added to each one of these 180,000 or so six digit Manufacturer Identification Numbers in order to produce 180,000 or so 12 digit numbers (i.e. hereinafter referred to as Manufacturers Reference Numbers) for the 180,000 or so manufacturers listed in the IPI Registrant Database under construction. As each such Manufacturer Reference Number has the same length as a UPC number of its manufacturer, this number can be conveniently thought of as the Manufacturer Reference UPC Number which can be stored in the UPN Information Field of the Database along with the corresponding manufacturers name being stored in the Company Name Information Field.

The second step of the method involves finding the URL of the Web home page of each of the 180,000 or so manufacturers who, to date, have been assigned a Manufacturers Identification Code and are listed in the Database. Such URL information can be found using a number of available techniques: (i) using a commercially available search engine to search the WWW in order to find the URL of the home page of each manufacturer s Web-site, if it has one, using the name and address thereof obtained during the first step above; or (ii) using a commercially available (INTERNIC-enabled) Domain Name search service that uses the names and addresses of the manufacturers (obtained during the first step above) in order to determine whether a particular manufacturer has a registered domain name on the Internet, and if so, is the domain name being actively used in a URL that points to the home page of the manufacturer s Web-site. Once obtained, such URLs are then added to the IPI Database, along with the e-mail and/or other address of the manufacturer symbolically linked thereto (if available). Having constructed the seeded Database, it can then be used to connect the client subsystem of users to the home page of Web sites of manufacturers of particular products. Initially, when an Internet user provides the UPC number of a particular product as input to the Input Box of the HTML form displayed in the information display frame of the client subsystem (e.g. when operated in its Manufacturer Website Search Mode), then the IPD Server need only compare the first six digits of the entered UPC number against the first six-digits of the Manufacturer Reference UPC Numbers (i.e. Manufacture Identification Numbers) listed in the seeded Database. The corresponding (home-page) URL of the matching manufacturer is returned to the client subsystem $C_a$ for display. In instances of an initially seeded Database, in which only the Manufacturer Reference UPC Numbers are listed therein, the requesting client subsystems are provided with the URLs of the home pages of the symbolically linked manufacturers. Then as manufacturers begin to register their consumer products with the system (e.g. in response to mass e-mailings, advertisements and/or marketing and promotional efforts, etc.), the IPD Database will return a menu of hot-linked URLs, for each registered product, pointing to various types of product-related information resources on the Internet (described above) that can be easily accessed by simply clicking thereon in a conventional manner. Over time, Manufacturer Reference UPC Numbers and the URLs of the home pages of such manufacturers will become replaced by the UPC numbers of registered products and the menu of URLs on the WWW symbolically linked thereto by the manufacturers, thereby allowing consumers and users of the system to precisely pinpoint consumer product-related information on the WWW which has been specified by the manufacturer, its marketing department and/or advertising agency. With manufacturer s and advertiser s participation and Feedback, the initially seeded RDBMS described hereinabove will quickly grow into a robust RDBMS richly filled with the various information items described in FIGS. 4A1 and 4A2, including the a symbolically linked UPCs and URLs that point to very specific consumer product related information resources (i.e. files) stored within IPI Servers of the system located across the global expanse of the Internet.

According to a sixth database construction technique of the present invention, the Registrant IPI Database of the system would be constructed by allowing each manufacturer to construct a limited or restricted version of the master UPN/TM/PD/URL Database (i.e. Registrant IPI Database) of the system, wherein only UPC-encoded products of the registered manufacturer and Web-based information items related thereto are entered into the database. As will be described in greater detail hereinbelow in connection with the third method of Product Registration in the subsystem hereof, the creation of such limited-version UPN/TM/PD/URL RDBMS can be carried out by providing each registered manufacturer with a computer program that allows its administrators to construct and manage a limited UPN/TM/PD/URL database in a turn-key manner. Also, from its Website, the manufacturer can serve the limited UPN/TM/PD/URL RDBMS over the Internet to consumers. As part of the registration process, each registered manufacturer transmits its limited UPN/TM/PD/URL database to Web-server 30 which then integrates all such databases in order to update the master UPN/TM/PD/URL database (IPI Registrant Database) of the system.

Methods of Constructing UPN-Encoded Server-Side and Client Side Applets and Distributing the HTML Tags Associated Therewith to Remote Client Subsystems for Embedding within HTML-Encoded Documents to be Published Over the Internet in Connection with UPN-Labeled Consumer Products In general, for each system architecture shown in FIGS. 2B1 through 2B4, there will be a different Applet-driven method used to access consumer product related information (e.g. UPN/TM/PD/URL links, trademark/URL links, etc.) from the RDBMS server 9 and display the search results within a Java-based GUI at the point of presence of the consumer using a Java-enabled client machine 13. In order to practice these different methods, in various e-commerce related applications which will be described in greater detail hereinafter, it will be helpful to construct either server-side or client-side UPN-encoded CPIR-enabling Applets, distribute the HTML tags associated therewith to remote client subsystems, and thereafter embed these CPIR-enabling Applet tags within HTML-encoded documents for publishing over the Internet. Such CPIR-enabling Applet construction, distribution and embedding methods will now be described in detail hereinbelow.

The First Applet-Driven Method of Accessing and Displaying Categorized UPN/TM/PD/URL Link Menus from the UPN/TM/PD/URL Database Management Subsystem the Present Invention After providing a brief overview on the system architecture of FIG. 2B1 and the nature of the server-side CPIR-enabling Applets deployed therewithin, The steps associated with Applet-driven CPI-acquisition method of the first illustrative embodiment will be described in detail with reference to FIGS. 4E1, 4E2, 4F1 and 4F2.

In general, the method of FIGS. 4E1 and 4E2 involves using a server-side CPIR-enabling Applet to automatically conduct a UPN-directed search on the UPN/TM/PD/URL RDBMS 9 hereof (i.e. RDBMS server 9) in response to a single mouse-clicking operation by the consumer on the HTML tag associated with the server-side Applet. In the illustrative embodiment, the CPIR-enabling servlet of the present invention is a program written in the Java™ programming language and has an HTML tag (indicated by <SERVLET>) which is designed to be included in an HTML page, much in the same way an image can be included therewithin (according to the HTML 3.2 Specification).

CPIR-enabling servlets of the present invention are designed to work within a request/response processing model, as shown in FIG. 2B1. In this request/response model, a client subsystem 13 sends a request message to the Java Web Server 11 and the Server 11 responds by sending back a reply message. In the illustrative embodiment, requests come in the form of http, although is understood that the use of other protocols such as ftp, EDI or a custom protocol, may be possible in particular embodiments. The request and the corresponding response reflect the state of the client and the server at the time of the request.

When using a Java-enabled browser to view a Web page containing a server-side CPIR-enabling Applet tag <SERVLET>, the servlet s compiled class code is automatically accessed from the Java Web Server 11 and executed on the server-side of the network connection illustrated in FIG. 2B1. Thus, as shown in FIG. 2B1, the Java Web Server 11 must provide a Java Virtual Machine (JVM) for running/executing Java servlets on the server-side of the network in much the same way that a client browser must provide a JVM for running Java Applets on the client side thereof. Additionally, the Java Web browser 11 must also support the Java Servlet API, developed by JavaSoft, and define how and when the servlet communicates with the Java Web Server. Essentially, the Servlet API is a well-defined set of function calls (i.e. set of Java classes) to get information to and from the Java Web Server. The servlet needs to be able to access server-defined variables, issue redirects, send error messages and the like. Sun's Java Web Server supports the Servlet API and, of course, includes their JVM.

As shown in FIG. 2B1, the Java Web Server 11 includes a number of software components including the Java Servlet API which comprises several Java interfaces and fully defines the link between the hosting server (e.g. Java Web Server) and the servlets located at the middle tier. The Servlet API is defined as an extension to the standard JDK. This means that there is an explicit definition of servlet interfaces, but it is not part of the Java Development Kit (JDK) 1.1 or the Java 2 platform. Instead, the servlet classes are delivered with the Java Servlet Development Kit (JSDK) version 2.0 from Sun (http://java.sun.com/products/servlet/). This JSDK version is intended for use with both JDK 1.1 and the Java 2 platform. There are a few significant differences between JSDK 2.0 and JSDK 1.0.

JDK extensions are packaged under javax—the root of the Java extension library tree. The Java Servlet API contains the following packages: Package javax.servlet; and Package javax.servlet.http dedicated to supporting HTTP protocol and HTML generation. The Servlet API provides a tight link between a server and servlets, allowing servlets to add new protocol support to a server. Essentially, any protocol (e.g. SMTP, POP, FTP, etc.) that follows a request/response computing model can be implemented by a servlet.

General servlet support is provided by the package "javax.servlet" which comprises the following components:

(1) Servlet: An interface that defines communication between a web server and a servlet. This interface defines the init( ), service( ), and destroy( ) methods (and a few others).

(2) ServletConfig: An interface that describes the configuration parameters for a servlet. This is passed to the servlet when the web server calls its init( ) method. Note that the servlet should save the reference to the ServletConfig object, and define a getServletConfig( ) method to return it when asked. This interface defines how to get the initialization parameters and the context under which the servlet is running.

(3) ServletContext: An interface that describes how a servlet can get information about the server in which it is running. It can be retrieved via the getServletContext( ) method of the ServletConfig object.

(4) ServletRequest: An interface that describes how to get information about a client request.

(5) ServletResponse: An interface that describes how to pass information back to the client.

(6) GenericServlet: A base servlet implementation. It takes care of saving the ServletConfig object reference, and provides several methods that delegate their functionality to the ServletConfig object. It also provides a dummy implementation for init( ) and destroy( ).

(7) ServletInputStream: A subclass of InputStream used for reading the data part of a client's request. It adds a readLine( ) method for convenience.

(8) ServletOutputStream: An OutputStream to which responses for the client are written.

(9) ServletException: Should be thrown when a servlet problem is encountered.

(10) UnavailableException: Should be thrown when the servlet is unavailable for some reason.

Support for HTTP Servlets is provided by the package "javax.servlet.http" which comprises the following components:

(1) HttpServletRequest: A subclass of ServletRequest that defines several methods that parse HTTP request headers.

(2) HttpServletResponse: A subclass of ServletResponse that provides access and interpretation of HTTP status codes and header information.

(3) HttpServlet: A subclass of GenericServlet that provides automatic separation of HTTP request by method type. For example, an HTTP GET request will be processed by the service( ) method and passed to a doGet( ) method.

(4) HttpUtils: A class that provides assistance for parsing HTTP GET and POST requests.

The central abstraction in the Java Servlet API is the Servlet interface. All servlets implement this interface, either directly or more commonly by extending a class that implements it (e.g. such as the HttpServlet class). The Servlet interface declares but does not implement methods that manage the servlet and its communication with clients. The servlet writer will provide some or all of these methods when developing a CPIR-enabling servlet.

Having provided an overview on server-side CPIR-enabling Java Applets (i.e. Servlets) of the present invention and the support framework required thereby in a distributed-computing object oriented programming environment shown in FIG. 2B1, it is appropriate to now describe the method of creating, loading, distributing, embedding and executing server-side CPIR-enabling Java Applets in accordance with the principles of the present invention schematically illustrated in FIGS. 4E1, 4E2, 4F1 and 4F2.

As indicated at Block A1 in FIG. 4E1, the first step of the method involves using the Java Servlet API to write or otherwise author the source code for a server-side CPIR-enabling Java Applet, for each UPN-specified consumer product registered in the UPN/TM/PD/URL Database Management Subsystem 9. In general, the source code for each server-side CPIR-enabling Java Applet (i.e. servlet) will embody one or more of following items of information, namely: (i) the UPN of the particular product on which the CPI search is to be carried out and the search results thereof displayed; (ii) Java classes required for performing a UPN-directed search on the RDBMS Server 9 using one or more Java methods running natively on the Java Web Server 11, and producing a particular Java GUI for displaying the results obtained from the UPN-directed search; and (iii) license-related information specifying the terms and conditions of the CPIR-enabling Servlet license and the conditions under which the CPIR-enabling servlet shall operate.

Notably, such license-related information may specify: (1) one or more specific host domains from which a Web document containing the corresponding servlet tag may launch the CPIR-enabling servlet under a licensing program; (2) one or more general Internet domains (e.g. .com, org., .gov, int, mil, .uk, etc.) from which a Web document containing the corresponding servlet tag may launch the CPIR-enabling servlet under a licensing program; (3) the time duration of the licensing period associated with the CPIR-enabling servlet; and (4) any other restrictions set by the associated manufacturer and/or retailer, and/or administrator of the consumer product information system hereof, that must be observed for a registered CPIR-enabled servlet to operate within a Web-document served from the registered Internet domain.

Notably, the Java source code for each CPIR-enabling Servlet will vary depending upon implementation. However, regardless of the particular implementation, it can be expected that each JDBC-supporting CPIR-enabling servlet when, for example, designed to search an (Oracle JDBC-supported) UPN/TM/PD/URL Database Server 11A for the UPC/URL list currently symbolically linked to a specified UPN and display the search results on the requesting client machine 13, will typically include Java source code specifying:

(1) the importable JDBC classes required by the CPIR-enabling Servlet;
(2) the importable Java classes to be used in the CPIR-enabling Servlet;
(3) the JDBC driver to be loaded for the Oracle-based UPN/TM/PD/URL Database;
(4) the connection strings to the UPN/TM/PD/URL Database;
(5) the CPI query to be executed on the UPN/TM/PD/URL Database, dependent on the UPN of the associated consumer product and possibly other search criteria and Servlet licensing conditions;
(6) the servlet tag, its graphical icon or alias to trigger execution the Servlet and its associated CPI query;
(7) the CPI Search Result GUI to be displayed on the requesting client machine and its relative location to the associated Servlet tag; and
(8) the operations that will be carried out upon execution of the CPI query including
    - Boolean search logic to be carried out upon initiation of the UPN-directed CPI search;
    - if a new connection is required between Java Web Server and the UPN/TM/PD/URL Database;
    - Loading the JDBC driver;
    - Connecting to the UPN/TM/PD/URL Database;
    - Creating a SQL statement based on the specified Boolean search logic and UPN;
    - Executing the SQL query statement; and
    - Dumping the search results to the CPI Search Result GUI.

In the embodiment depicted in FIG. 2B1, a UPN-encoded Servlet is used to replace a Common Gateway Interface (CGI) script and provide a way of searching the UPN/TM/PD/URL Database on RDBMS Server 11, with the advantage of increased speed and stability. In this instance, CPIR-enabling Servlets are accessed by the user as an HTML tag <SERVLET> embedded in an HTML document served to the client subsystem 13. For example, when the consumer selects the servlet tag (graphically encoded by an icon or image) in an HTML-encoded document, the linked servlet residing on the server-side of the network, is automatically executed, causing a UPN-directed search to be carried on the RDBMS server 9.

After writing/authoring the source code for the Applet, the CPIR-enabling Java servlet is ascribed a unique name such as, for example, "UPNXXXXXXYYYYYZ" for a 12 digit Uniform Product Code.

Reference can be made to the following technical publication for additional details on writing Java servlets, designing Java GUIs and the like: Java Servlets and Serialization With RMI (1999) by Scott McPherson, published by Sun Microsystems, Inc., of Palo Alto, Calif.; The Java™ Tutorial Second Edition: Object Oriented Programming For The Internet (1999), by Mary Campione and Kathy Walrath, published by Sun Microsystems, Inc., of Palo Alto, Calif.; and The JFC Swing Tutorial: A Java Guide To Constructing JAVA GUIs (1999), by Mary Campione and Kathy Walrath, published by Sun Microsystems, Inc., of Palo Alto, Calif.; "JAVA" (1997) by Ed Tittel and Bill Brogden, published by IDG Books Worldwide, Inc.; Wilde s WWW: Technical Foundations of the World Wide Web (1999) by Erik Wilde, published by Springer-Verlag, Berlin, Heidelberg each said publication being incorporated herein by reference.

As indicated at Block A2 in FIG. 4E1, the source code for the authored servlet is compiled into Java bytecode, and java bytecode for the servlet classfiles are placed in the server_root/servlets directory on the Java Web Server 11. When compiling, the javax.servlet.* package should be placed in the classpath. The easiest way to do this is to include server_root/lib/classes.zip in the classpath, but it is understood that one must look to the compiler's documentation for specific details in this regard.

As indicated at Block B1 in FIG. 4E1, the second step of the method involves using the Java Server Administration Applet to configure the Java Web Server so as to extend the functionalities thereof and embody (or install) the CPIR-enabling Java servlet within the Java Web Server 11. This process of extending the functionalities of the Java Web Server 11 involves specify the default parameters and arguments thereof. This configuration step is carried out when using the Servlet Loading facility of the Administration Applet in order. The loading process is achieved by clicking on the Servlets Button, and then selecting Add from the list of choices on the left GUI of the Servlet Loading Facility. Thereafter, to add a new servlet, the following procedure is performed: Enter in the Servlet Name field, the unique name for the CPIR-enabling Java servlet one is loading onto the Java Web Server (e.g. "UPNXXXXXXYYYYYZ"); Enter in the Servlet Class field, a valid class name for the Java class of the CPIR-enabling servlet, i.e., the full package name, e.g. "sun.server.http.FileServlet"; and thereafter Click on the Add button.

As indicated at Block B2 in FIG. 4E1, the fourth step of the method involves invoking the CPIR-enabling Java servlet by creating a URL having the path section "/servlet/" prepended to the assigned Servlet Name, so that the URL can be thereafter embodied within the servlet HTML tag <SERVLET>, prior to its insertion within the HTML code of a Web document. To invoke a servlet, the webmaster/administrator calls the servlet by creating a URL with "/servlet/" prepended to the servlet name. One can confirm that the servlet is correctly invoked by entering this URL into ones Web browser and analyzing the output of the created servlet.

As indicated at Block B3 in FIG. 4E1, the fifth step of the method involves (1) embodying the unique URL, created for each consumer product, within a CPIR-enabling servlet HTML tag <SERVLET>, (2) containing each such servlet HTML tag within an executable file, and (3) storing each such servlet tag containing file in the Central CPIR-Enabling Applet Library on the RDBMS Server 9.

As indicated at Block C in FIG. 4E2, the sixth step of the method involves distributing the CPIR-enabling servlet HTML tags (within the Central CPIR-enabling Applet Library) to retailers, wholesalers, advertisers, and others who desire to deliver UPN-directed CPI search results to their customers, clients and the like. This distribution process can be carried out by downloading servlet tag containing files to a remote computer system connected to the Internet using, for example, ftp or other electronic data or document interchange protocols (e.g. XML/ICE) to carry out the servlet tag transport process. These downloaded CPIR-enabling servlet tags can then be stored in a local CPIR-Enabling Applet/Servlet Library maintained on a client computer 13, as shown in FIG. 4F2, until it is time to embed the same into a particular HTML-encoded document.

As indicated at Block D in FIG. 4E2, the seventh step of the method involves enabling retailers, wholesalers, advertisers, and others to (1) open the downloaded servlet tag containing files, (2) extract the CPIR-enabling servlet tags contained therewithin, and (3) embed (i.e. insert) one or more distributed CPIR-enabled servlets HTML tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may, understandably include other types of code (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc. to create the HTML pages associated with a particular WWW site; CatalogMaker™™ and CatalogManager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling servlet tag <SERVLET> using, for example, simple commands or drag-and-drop procedures.

As indicated at Block E in FIG. 4E2, the eighth step of the method involves serving servlet-tag encoded HTML documents from Internet information servers to Java-enabled client computer subsystems 13 operated by consumers at home, in the office, in EC-enabled or brick and mortar retail stores, or on the road, as the case may be. As shown in FIG. 4F, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4E2, the ninth step of the method hereof involves using a Java-enabled client computer subsystems 13 to display served HTML-encoded documents having one or more of CPIR-enabling servlet tags embedded therewithin. This step is carried out by the consumer pointing his or her Java-enabled browser program (e.g. Netscape Navigator, Microsoft Explorer, or Sun Microsystems HotJava program) to an HTML-encoded document within which a CPIR-enabling Java servlet tag is embedded, at a particular point of presence on the WWW. As shown in FIGS. 4M1 through 4R2, CPIR-enabling Applets can be graphically-encoded in an variety of different ways to provide the consumer with a visual indication that, clicking on the graphical object however manifested, will automatically result in a consumer product information search on a particular product identified by the UPN encoded within the associated servlet. In view of the fact the CPIR-enabling servlet tags are distributed over the Internet and inserted within HTML documents by others than the servlet author, at some future date, graphical encoding of CPIR-enabling servlets will typically occur at the time of writing the servlet.

With the above point in mind, it will be helpful to adopt a standardized icon for graphically indicating the presence of a CPIR-enabling servlet tag within an HTML document. In the illustrative embodiments shown in FIGS. 4P1, 4P2, 4R1, 4R2, 4S1, and 4S2, small predefined images of service marks such as GO: BRANDKEY REQUEST™ URL Search are served to inform the consumer that the Java object, if selected from the displayed Web page, will automatically cause a product-specific URL search to be performed with respect to the particular consumer product and the results thereof displayed at the point of presence of the consumer who may be residing at a particular point in an EC-enabled store (e.g. at the check-out display screen or POS), at on-line auction site, at a Web-based product advertisement, or anywhere else on the WWW. Notably, an important advantage provided by this information search technique of the present invention is that it does not disturb the consumer at his or her point of presence (or sale), wherever that may be. Instead, the CPI search and display method hereof enables the delivery of accurate product-specific manufacturer-defined information at precise points in Cyberspace by performing a single mouse-clicking operation. This enables consumers to make informed decisions thereat based on the information displayed in the corresponding Java GUI generated upon launching a CPIR-enabling servlet at the consumer s point of presence on the WWW.

It is understood, however, that other techniques may be used to create a visual indication to the consumer that a CPIR-enabling Applet is located at a particular point on the WWW and that if this Applet is executed (e.g. by a single mouse-clicking operation), then a UPN-directed consumer product information search will be automatically executed and the results therefrom will be displayed within a Java GUI at the consumer s point of presence.

One alternative technique would be to embed within the CPIR-enabling Applet, a thumbnail or large size photo-image of the consumer product being offered for sale, lease, auction, or other purpose on the WWW. Notably, this product image any reside on the RDBMS server 9, or on the http server from which the HTML encoded document is served. Using this technique, the consumer need only click on the image to initiate an UPN-directed consumer product information search against the UPN/TM/PD/URL RDBMS 9 hereof.

Notably, the person or persons responsible for delivering product advertisements to particular locations on one or more WWW sites can use the OPEN ADSTREAM™ (OAS) 5.0 Internet Advertisement Management Solution software from Real Media, Inc., of New York, N.Y., and any other suitable software solution, running on the Internet (http) information server (12, 12, 12A or 12B), and managed using an Web-enabled client subsystem 13, as shown in FIG. 4F1. Using the OAS 5.0 advertisement management solution, and the CPI search and display method of present invention described above, a webmaster or advertising manager assigned to a particular Internet information server (12, 12, 12A or 12B) can: (1) access the Web-based product advertisement for a particular product (i.e. HTML code, image files, and any other rich media content associated therewith); (2) access previously downloaded CPIR-enabling Java servlet(s) for the consumer product, stored in a locally-maintained Library (i.e. Catalog) of CPIR-Enabling Applets on a client machine or server on the network, or directly access CPIR-enabling Java servlets from the centrally-maintained Library (i.e. Catalog) of CPIR-Enabling a Applets illustrated in FIG. 4F1, via the Java Web Server 11; and (3) use Real Media s OAS 5.0 solution software deliver both the Web-based product advertisement (i.e. its HTML code and other media-rich content) and the corresponding CPIR-enabling Applet tag (and possibly any image files associated therewith) to a designated section on a particular Web page of a specific WWW-site.

It is understood that there are different ways of inserting/embedding both of these objects within a particular section of an HTML-encoded document using the highly advanced HTML-editing functionalities of the OAS 5.0 software system. For example, the Web-based product advertisement can be inserted within a first spatially defined portion of the target HTML document (occupying the largest portion of the purchased Internet advertising space), while the CPIR-enabling server-side Applet (i.e. servlet) is inserted within a second spatially-defined portion of the target HTML document occupying the balance of the purchased Internet advertising space. Alternatively, both the CPIR-enabling Applet and the Web-based product advertisement can be inserted within substantially same spatially defined portion of the target HTML document so as to achieve spatial overlap therebetween. This way when the consumer clicks on the advertisement image, or some preselected portion thereof, the underlying CPIR-enabling servlet will be automatically executed and the corresponding Java GUI generated for displaying the results of the UPN-directed database search.

In situations where the Internet product advertisement (e.g. banner advertisement) embodies a servlet HTML tag which, when executed, produces a new Java GUI (i.e. new browser interface), then a CPIR-enabling servlet can be embedded within the HTML-encoded document displayed in the new Java GUI. This servlet tag embedding technique will be useful in many applications where the display space allocated for the Web advertisement in the target HTML-encoded document is limited, and there is a need to generate a new Java GUI for presenting the content of the advertisement.

Other ways of embedding the Web-based advertisement and the related CPIR-enabling servlet tags will become apparent hereinafter to those skilled in the art having had the benefit of reading the present disclosure.

As indicated at Block G in FIG. 4E2, the tenth step in the method involves the consumer recognizing that a CPIR-enabling servlet tag is embedded within a Web-document displayed on a Java-enabled client computer subsystem, and thereafter launching/executing the associated servlet to initiate a UPN-directed consumer product information search within the RDBMS server 9.

Notably, the above illustrative embodiment has been described with particular focus given to CPIR-enabling servlets encoded with the UPN of a particular consumer product. It is understood, however, that the CPIR-enabling servlets of the present invention can be encoded with the trademark(s) used in connection with a particular consumer product, thus providing Trademark-encoded CPIR-enabling servlets, in contrast with UPN-encoded CPIR-enabling servlets. In such alternative embodiments, the encoded trademark would be used to direct a search through the RDBMS server 9, and display the results thereof in a new (independent) Java GUI generated at the point of servlet tag embodiment. Alternatively, a product descriptor associated with a particular product can be encoded within the corresponding CPIR-enabling servlet, used to direct a search through the RDBMS server 9, and display the results thereof in an independent Java GUI generated at the point of servlet tag embodiment.

The Second Applet-Driven Method of Accessing and Displaying Categorized UPN/TM/PD/URL Link Menus from the UPN/TM/PD/URL RDBMS of the Present Invention After providing a brief overview on the system architecture of FIG. 2B2 and the nature of the client-side CPIR-enabling Applets deployed therewithin, the steps associated with Applet-driven CPI-acquisition method of the second illustrative embodiment will be described in detail with reference to FIGS. 4G1, 4G2, 4H1 and 4H2.

In general, the method of FIGS. 4G1 and 4G2 involves using a client-side CPIR-enabling Applet to automatically conduct a UPN-directed search on the UPN/TM/PD/URL RDBMS server 9 in response to a single mouse-clicking operation by the consumer on the HTML tag associated with the CPIR-enabling Applet. In the illustrative embodiment, the CPIR-enabling Applet of the present invention is a program written in the Java™ programming language and has an HTML tag (indicated by <APPLET>) which is designed to be included in an HTML page, much in the same way an image can be included therewithin (according to the HTML 3.2 Specification).

CPIR-enabling Applets of the present invention are designed to work within a request/response processing model, as shown in FIG. 2B2. In this request/response model, a client subsystem 13 sends a request message to the Java Web Server 11 and the Server 11 responds by sending back a reply message. In the illustrative embodiment, requests come in the form of http, although is understood that the use of other protocol as such as ftp, EDI or a custom protocol, may be possible in particular embodiments. The request and the corresponding response reflect the state of the client and the server at the time of the request.

When using a Java-enabled browser to view a Web page containing a client-side CPIR-enabling Applet tag <APPLET>, the Applet s compiled class code is automatically accessed from the Java Web Server 11 and executed on the client-side of the network connection illustrated in FIG. 2B2. Thus, as shown in FIG. 2B2, the Java-enabled client machine 13 in this network architecture must run a Java-enabled browser program that provides a Java Virtual Machine (JVM) for running/executing Java Applets on the client-side of the network in much the same way that Java Web Server 11 must provide a JVM for running Java servlets on the server side thereof, as shown in FIG. 2B1.

As shown in FIG. 2B2, the Java-enabled Web browser 13 includes a number of software components including Java interfaces for fully defining the link between the Java Web browser and the Applets located at the middle tier. In order to write, compile and load Applets onto the Java Web Server 11, the system administrator or webmaster can use the Java API provided for within the Java 2 (development) platform from JavaSoft, a division of Sun Microsystems, Inc. This platform also supports The API specification of the Java 2 Platform, Standard Edition, version 1.2.2, comprises the following Packages:

(1) java.applet: Provides the classes necessary to create an applet and the classes an applet uses to communicate with its applet context.

(2) java.awt: Contains all of the classes for creating user interfaces and for painting graphics and images.

(3) java.awt.color: Provides classes for color spaces.

(4) java.awt.datatransfer: Provides interfaces and classes for transferring data between sand within applications.

(5) java.awt.dnd: Drag and Drop is a direct manipulation gesture found in many Graphical User Interface systems that provides a mechanism to information between two entities logically associated with presentation elements in the GUI.

(6) java.awt.event: Provides interfaces and classes for dealing with different types of events fired by AWT components.

(7) java.awt.font: Provides classes and interface relating to fonts.

(8) java.awt.geom: Provides the Java 2D classes for defining and performing operations on objects related to two-dimensional geometry.

(9) java.awt.im: Provides classes and an interface for the input method framework.

(10) java.awt.image: Provides classes for creating and modifying images.

(11) java.awt.image.renderable: Provides classes and interfaces for producing rendering-independent images.

(12) java.awt.print: Provides classes and interfaces for a general printing API.

(13) java.beans: Contains classes related to Java Beans development.

(14) java.beans.beancontext: Provides classes and interfaces relating to bean context.

(15) java.io: Provides for system input and output through data streams, serialization and the file system.

(16) java.lang: Provides classes that are fundamental to the design of the Java programming language.

(17) java.lang.ref: Provides reference-object classes, which support a limited degree of interaction with the garbage collector.

(18) java.lang.reflect: Provides classes and interfaces for obtaining reflective information about classes and objects.

(19) java.math: Provides classes for performing arbitrary-precision integer arithmetic (BigInteger) and arbitrary-precision decimal arithmetic (BigDecimal).

(20) java.net: Provides the classes for implementing networking applications.

(21) java.rmi: Provides the RMI package.

(22) java.rmi.activation: Provides support for RMI Object Activation.

(23) java.rmi.dgc: Provides classes and interface for RMI distributed garbage-collection (DGC).

(24) java.rmi.registry: Provides a class and two interfaces for the RMI registry.

(25) java.rmi.server: Provides classes and interfaces for supporting the server side of

(26) java.security: Provides the classes and interfaces for the security framework.

(27) java.security.acl: The classes and interfaces in this package have been superseded by classes in the java.security package.

(28) java.security.cert: Provides classes and interfaces for parsing and managing certificates.

(29) java.security.interfaces: Provides interfaces for generating RSA (Rivest, Shamir and Adleman AsymmetricCipher algorithm) keys as defined in the RSA Laboratory Technical Note PKCS#1 and DSA (Digital Signature Algorithm) keys as defined in NIST's FIPS-186.

(30) java.security.spec: Provides classes and interfaces for key specifications and algorithm parameter specifications.

(31) java.sql: Provides the JDBC package.

(32) java.text: Provides classes and interfaces for handling text, dates, numbers and messages in a manner independent of natural languages.

(33) java.util: Contains the collections framework, legacy collection classes, event model, date and time facilities, internationalization, and miscellaneous utility classes (a string tokenizer, a random-number generator, and a bit array).

(34) java.util.jar: Provides classes for reading and writing the JAR (Java ARchive) file format, which is based on the standard ZIP file format with an optional manifest file.

(35) java.util.zip: Provides classes for reading and writing the standard ZIP and GZIP file formats.

(36) javax.accessibility: Defines a contract between user-interface components and an assistive technology that provides access to those components.

(37) javax.swing: Provides a set of "lightweight" (all-Java language) components that, to the maximum degree possible, work the same on all platforms.

(38) javax.swing.border: Provides classes and interface for drawing specialized borders around a Swing component.

(39) javax.swing.colorchooser: Contains classes and interfaces used by the JcolorChooser component.

(40) javax.swing.event: Provides for events fired by Swing components.

(41) javax.swing.filechooser: Contains classes and interfaces used by the JfileChooser component.

(42) javax.swing.plaf: Provides one interface and many abstract classes that Swing uses to provide its pluggable look-and-feel capabilities.

(43) javax.swing.plaf.basic: Provides user interface objects built according to the Basic look-and-feel.

(44) javax.swing.plaf.metal: Provides user interface objects built according to the "metal" look-and-feel.

(45) javax.swing.plaf.multi: The multiplexing look and feel allows users to combine auxiliary look and feels with the default look and feel.

(46) javax.swing.table: Provides classes and interfaces for dealing with java.awt.swing.JTable.

(47) javax.swing.text: Provides classes and interfaces that deal with editable and noneditable text components.

(48) javax.swing.text.html: Provides the class HTMLEditorKit and supporting classes for creating HTML text editors.

(49) javax.swing.text.html.parser

(50) javax.swing.text.rtf: Provides a class (RTFEditorKit) for creating Rich-Text-Format text editors.

(51) javax.swing.tree: Provides classes and interfaces for dealing with java.awt.swing.JTree.

(52) javax.swing.undo: Provides support for undo/redo capabilities in an application such Was a text editor.

(53) org.omg.CORBA: Provides the mapping of the OMG CORBA APIs to the Java™ programming language, including the class ORB, which is implemented so that a programmer can use it as a fully-functional Object Request Broker (ORB).

(54) org.omg.CORBA.DynAnyPackage: Provides the exceptions used with the DynAny interface (InvalidValue, Invalid, InvalidSeq, and TypeMismatch).

(55) org.omg.CORBA.ORBPackage: Provides the exception InvalidName, which is thrown by the InconsistentTypeCode, which is thrown by the Dynamic Any creation methods in the ORB class.

(56) org.omg.CORBA.portable: Provides a portability layer, that is, a set of ORB APIs that makes it possible for code generated by one vendor to run on another vendor's ORB.

(57) org.omg.CORBA.TypeCodePackage: Provides the user-defined exceptions BadKind and Bounds, which are thrown by methods in the class TypeCode.

(58) org.omg.CosNaming: Provides the naming service for Java IDL.

(59) org.omg.CosNaming.NamingContextPackage: Provides the exceptions used in the package org.omg.CosNaming (AlreadyBound, CannotProceed, InvalidName, NotEmpty, and NotFound) and also the Helper and Holder classes for those exceptions.

Having provided an overview on client-side CPIR-enabling Java Applets of the present invention and the support framework required thereby in a distributed-computing object oriented programming environment shown in FIG. 2B2, it is appropriate to now describe, the method of creating, loading, distributing, embedding and executing client-side CPIR-enabling Java Applets in accordance with the principles of the present invention schematically illustrated in FIGS. 4G1, 4G2, 4H1 and 4H2.

As indicated at Block A1 in FIG. 4G1, the first step of the method involves using the Java Applet API to write or otherwise author the source code for a client-side CPIR-enabling Java Applet for each UPN-specified consumer product registered in the RDBMS server 9. In general, the source code for each client-side CPIR-enabling Java Applet (i.e. Applet) will embody one or more of following items of information: (i) the UPN of the particular product on which the CPI-based search is to be carried out and the search results thereof displayed; (ii) Java classes required for performing a UPN-directed search on the RDBMS server 9 using a CGI script executing on the Java Web Server 11, and producing a particular Java GUI for displaying the results obtained from the UPN-directed search; and (iii) license-related information specifying the terms and conditions of the CPIR-enabling Applet license and conditions under which the CPIR-enabling Applet shall operate.

Notably, such license-related information may specify: (1) one or more specific host domains from which a Web document containing the corresponding Applet tag may launch the CPIR-enabling Applet under a licensing program; (2) one or more general Internet domains (e.g. .com, org., .gov, int, mil, .uk, etc.) from which a Web document containing the corresponding Applet tag may launch the CPIR-enabling Applet under a licensing program; (3) the time duration of the licensing period associated with the CPIR-enabling Applet; and (4) any other restrictions set by the associated manufacturer and/or retailer, and/or administrator of the consumer product information system of the present invention, that must be satisfied for a registered CPIR-enabled Applet to operate within a Web-document.

Notably, the Java source code for each CPIR-enabling Applet will vary depending upon implementation. However, regardless of the particular implementation, it can be expected that each CPIR-enabling Applet designed, for example, to search an (Oracle-based JDBC) RDBMS Server 9 for a current categorized UPC/URL list/menu symbolically linked to a specified UPN and thereafter display the results in an independent Java GUI, will typically include Java source code specifying:

(1) the importable JDBC classes required by the CPIR-enabling Applet;

(2) the importable Java classes to be used in the CPIR-enabling Applet;

(3) the JDBC driver to be loaded for the Oracle-based RDBMS server 9;

(4) the connection strings to the RDBMS server 9;

(5) the CPI query to be executed on the UPN/TM/PD/URL, dependent on the UPN of the associated consumer product and possibly other search criteria and Applet licensing conditions;

(6) the Applet tag, its graphical icon or alias to trigger execution the Applet and its associated CPI query;

(7) the CPI Search Result GUI to be displayed on requesting client and its relative location to the associated applet tag; and (8) the operations that will be carried out upon execution of the CPI query including Boolean search logic to be carried out upon initiation of the UPN-directed CPI search;

if a new connection is required between Java Web Server 11 and the RDBMS server 9;

Loading the JDBC driver;

Connecting to the RDBMS server 9;

Creating a SQL statement based on the specified Boolean search logic and UPN;

Executing the SQL query statement; and

Dumping the search results to the CPI Search Result GUI.

When using earlier versions of the HTML Specification (i.e. HTML 3.2 by the World Wide Web Consortium), the source code for each CPIR-enabling Java Applet would adhere to the following general syntax:

```
    [CODEBASE=codebaseURL]
    CODE-appletFile
    [ALT=alternateText]
    [NAME=appletInstanceName]
    WIDTH=pixels HEIGHT=pixels
    [ALIGN=alignment]
    [VSPACE=pixels][HSPACE=pixels]
>
    [<PARAM NAME=Attribute1 VALUE=value>]
    [<PARAM NAME=Attribute2 VALUE=value>]
    . . .
    [alternateHTML]
    >/APPLET]
```

Wherein the set of brackets [ ] indicates optional parameters within the HTML 3.2 Specification.

The optional <PARAM> tag lets you to specify applet-specific attributes that your applet can retrieve as Strings. These Strings can be used in an HTML document to customize the Applet's behavior and supply their respective values in command-line variables.

CODEBASE, CODE, WIDTH, and HEIGHT are attributes specified by the first part of the <APPLET> tag. The Java-enabled Web browser 13 uses these attributes to locate the CPIR-enabling Applet code on the Java Web Server 11 and to indicate the amount of space to be reserved in the target HTML document during display. CODEBASE directs the Java-enabled Web browser to look for code in the classes directory of the Java Web Server 11. The mandatory parameter CODE provides the name of the Java code file that is to be loaded from the Java Web Server 11. Any other class files used by the Applet are loaded from the Codebase Directory as well.

WIDTH and HEIGHT are attributes that tell the Java-enabled Web browser to reserve space in the document display before the Java code is loaded ("x" pixels wide by "x" pixels high), similar to the way browsers deal with images, reserving space before the complete image is available. To place an invisible Applet on a page, specify height and width of zero.

Current Java-enabled Web browsers ignore the Java language resize( ) method for applets. Although the applet viewer provided in the JDK responds to the resize( ) method, one will have to specify width and height correctly in the CPIR-enabling APPLET tag for general Web browsers.

VSPACE and HSPACE are optional attributes for specifying the amount of space (in pixels) that surrounds the CPIR-enabling Applet above and below (vspace) and on each side (hspace) of the Applet area.

ALIGN is another optional attribute used to designate where the Java-enabled Web browser is to place the Applet area in relation to any other design elements. ALIGN can have possible values like those for the IMG tag: left, right, top, texttop, middle, absmiddle, baseline, bottom, and absbottom.

Notably, the optional parameters ALIGN, VSPACE and HSPACE, if used, may be set either at the time of CPIR-enabling Applet creation (i.e. when writing the source code therefor), or at the latter time such as, for example, after compiling and loading the Java class code on the Java Web Server, downloading CPIR-enabling Applet tag files, after extracting CPIR-enabling Applets, or after to embedding the CPIR-enabling Applet tag within a HTML-encoded document. Such Applet parameter modifications by the user can be achieved by providing Web-based API for users to access, and specify such parameters at the time of Registering/Licensing a CPIR Web-based GUI for this user-oriented Java-API should be very simple and user friendly to allow users to utilize its Applet parameter modification functions. Thus, these optional parameters enable the Web page, EC-commerce site and auction site designer to modify (after Java class code compiling and loading operations, but before Applet tag insertion/embedding operations) certain parameters and attributes within each CPIR-enabling Applet tag that determine the precise location where the Java-enabled browser on the client machine 13 will display the CPIR-enabling Applet and its associated image graphics on the browser display screen.

The ALT attribute designates a string to be displayed if the browser understands the <APPLET> tag but does not have Java capabilities. Netscape 2.0 allows turning the Java interpreter on or off via a check box under Options on the Security Preferences menu. The ALT attribute is a way to remind users to turn Java back on after turning it off to avoid wasting time on slow applets (as can often occur on Web pages).

CPIR-enabling Applets that coexist on the same Web page communicate by means of the NAME attribute. The AppletContext method getApplet(String name) returns a reference to the named Applet if it can be found in the Web page and then allows communication between Applets in the conventional sense.

The PARAM tag is used in transferring text information to the Applet code by way of the getParameter(String param_name) applet method. Since the parameter-matching code is not case sensitive and quote marks are parsed out, the following tags are equivalent:

<PARAM name=EMAIL
<param NAME=EMAIL
<param name="email"

Between the last <PARAM> tag and the </APPLET> tag, text and HTML code can be designated for display if the Web browser of a particular client system cannot recognize the <APPLET> tag. Notably, the content of the Applet tag acts as alternate information for client subsystems that do not support this element or are currently configured not to support Applets. Otherwise, the content of the Applet must be ignored.

The final element of the Applet tag must be </applet> in order to tell the Web browser that the Applet has ended.

Notably, in the HTML 4.0 Specification, the Applet element has been deprecated in favor of the OBJECT element, which offers an all purpose solution to generic object inclusion. The HTML 4.0 Specification now allows the OBJECT element to include images (via the <IMG> tag) and Applets (via the <APPLET> tag) in the same manner. Thus, when constructing Web documents and CPIR-enabling Applets in accordance with the HTML 4.0 Specification, the source code for each CPIR-enabling Applet will adhere to an entirely different syntax, the details of which are set forth which in the HTML 4.0 Specification, supra, incorporated herein by reference.

For additional details pertaining to Java Applet construction, embedding techniques and Java GUI design and development, reference can be made to the following technical publications: "JAVA" (1997) by Ed Tittel and Bill Brogden, published by IDG Books Worldwide, Inc.; Wilde s WWW: Technical Foundations of the World Wide Web (1999) by Erik Wilde, published by Springer-Verlag, Berlin, Heidelberg; The Java™ Tutorial Second Edition: Object Oriented Programming For The Internet (1999), by Mary Campione and Kathy Walrath, published by Sun Microsystems, Inc., of Palo Alto, Calif.; and The JFC Swing Tutorial: A Java Guide To Constructing JAVA GUIs (1999), by Mary Campione and Kathy Walrath, published by Sun Microsystems, Inc., of Palo Alto, Calif.; each said publication being incorporated herein by reference.

After writing/authoring the source code for the Applet, the CPIR-enabling Java Applet is ascribed a unique name such as, for example, "UPNXXXXXXYYYYYZ" for a 12 digit Uniform Product Code.

As indicated at Block A2 in FIG. 4G1, the second step of the method involves compiling the source code of the Applet into Java bytecode, and then placing/loading the classfiles for the Applet within the server_root/Applets directory on the Java Web Server 11.

As indicated at Block BI in FIG. 4G1, the third step of the method involves for each UPN-specified consumer product, (1) containing the complete Applet HTML tag <APPLET> within an executable file, and (2) storing each such Applet tag containing file in the Central CPIR-Enabling Applet Library (or Catalog) on the RDBMS server 9, as shown in FIG. 4H1.

As indicated at Block C in FIG. 4G1, the fourth step of the method involves distributing E the CPIR-enabling Applet HTML tags to retailers, wholesalers, advertisers, and others who desire to deliver UPN-directed CPI search results to their customers, clients and the like. This distribution process may be carried out in a number of ways.

For example, in one embodiment of the present invention shown in FIG. 4M1, retailers, wholesalers, advertisers, and others would visit the IPI Central (Retail Industry/Market oriented) WWW site as shown in FIG. 3C and selected the Applet Tag Download/Distribute Mode by selecting mode control button 21F, whereupon a (Java) GUI, is displayed in the display frame 20C. Within this GUI, a master list of executable files containing CPIR-enabling Applet tags is displayed for each consumer product registered within the system. The CPIR-enabling Applet tag containing file associated with any particular consumer product can be searched for by UPN, trademark, and/or product descriptor, and once found, can be viewed and simply downloaded to a remote client computer system connected to the Internet using, for example, ftp or other electronic data or document interchange protocols (e.g. XML/ICE) suitable for carrying out the <APPLET> tag transport process. Downloaded CPIR-enabling Applet tag containing files can be then stored in a local CPIR-enabling Applet/Servlet Library maintained on a client computer until it is time to extract the Applet tag therefrom and embed the same into a particular HTML-encoded document.

In an alternative embodiment shown in FIG. 4M2, the distribution of CPIR-enabling Applet tags is enabled by providing a CPIR-enabling Applet Tag Download Link/Button 100 on the Web page of each product being offered for sale in an EC-enabled store or product catalog maintained by a manufacturer, retailer or other party. This inventive feature should be most useful in EC-enabled Business-to-Business (i.e. Vendor-to-Retailer) UPC-based Product Sale Price Catalogs such as, for example, QRS s Keystone UPC Product Catalog, where purchasing agents of retailers could download Applet tag containing files, along with product images and other product information after placing a purchase order therethrough, for use in constructing the retailer s EC-enabled (retailer-to-consumer) store or product catalog. Using this method of the present invention, consumers would be provided with instant manufacturer-defined product information prior to, and/or after a consumer purchase at an EC-enable store on the WWW, thereby greatly improving the consumer shopping experience on the WWW.

As indicated at Block D in FIG. 4G2, the fifth step of the method involves enabling retailers, wholesalers, advertisers, and others to (1) open the downloaded Applet tag containing files, (2) extract the CPIR-enabling HTML tags contained therewithin, and (3) embed (i.e. insert) one or more distributed CPIR-enabled Applet tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may understandably include other types of code (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc to create the HTML pages associated with a particular WWW site; CatalogMaker™™ and CatalogManager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling Applet HTML tag using, for example, simple commands or drag-and-drop procedures.

As indicated at Block E in FIG. 4G2, the sixth step of the method involves serving HTML documents with inserted CPIR-enabling Applet tags, from Internet information servers to Java-enabled client computer subsystems 13 operated by consumers at home, in the office, in EC-enabled and brick and mortar retail stores, or on the road, as the case may be. As shown in FIG. 4H1, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4G2, the seventh step of the method hereof involves using a Java-enabled client computer subsystem 13 to display served HTML-encoded documents having one or more of CPIR-enabling Applet tags embedded therewithin. This step is carried out by the consumer pointing his or her Java-enabled browser program (e.g. Netscape Navigator, Microsoft Explorer, or Sun Microsystems HotJava program) to an HTML-encoded document within which a CPIR-enabling Java Applet tag is embedded, at a particular point of presence on the WWW.

As shown in FIGS. 4M1 through 4R2, CPIR-enabling Applets can be graphically-encoded in an variety of different ways to provide the consumer with a visual indication that, clicking on the graphical object, however manifested, will automatically result in a CPI search on a particular product identified by a UPN encoded within the associated Applet.

In the illustrative embodiments shown in FIGS. 4P1, 4Q1, 4R1 and 4S1, service marks such as BRANDKEY REQUEST™ UPN/TM/PD/URL Search serve to inform the consumer that the object, if selected from the displayed Web page, will cause a URL search to be performed with respect to the particular consumer product and the results thereof displayed the point of presence of the consumer which may be at a particular point in an EC-enabled store (e.g. at the check-out display screen or POS), at on-line auction site, at a Web-based product advertisement, or anywhere else on the WWW. Notably, an important advantage provided by this information search technique of the present invention is that it does not disturb the consumer at his or her point of presence (or sale), wherever that may be. Instead, the CPI-based search and display method of the present invention enables the delivery of accurate product-specific manufacturer-defined information at a particular point in Cyberspace by the consumer performing a single mouse-clicking operation. This enables the consumer to make an informed decision thereat based on the information displayed in the corresponding Java GUI generated upon launching the CPIR-enabling Applet at the consumer s point of presence on the WWW.

It is understood, however, that other techniques may be used to create a visual indication to the consumer that a CPIR-enabling Applet is located at a particular point on the WWW and that if this Applet is executed (e.g. by a single mouse-clicking operation), then a UPN-directed consumer product information search will be automatically executed and the results therefrom will be displayed within a Java GUI at that point of presence. One alternative technique would (be to embed the CPIR-enabling Applet within a thumbnail or large size photo-image of the consumer product being offered for sale, lease, auction, or other purpose on the WWW. Using this technique, the consumer need only click on the image to initiate an UPN-directed consumer product information search on the IPI Registrant Database (e.g. RDBMS Server 9) of the system.

Notably, the person or persons responsible for delivering product advertisements to particular locations on one or more WWW sites can use the OPEN ADSTREAM™ (OAS) 5.0 Internet Advertisement Management Solution software from Real Media, Inc., of New York, N.Y., and any other suitable software solution, running on the Internet (http) information server (12, 12, 12A or 12B), and managed using an Web-enabled client subsystem 13, as shown in FIG. 4H2. Using the OAS 5.0 advertisement management solution, and the CPI search and display method of the present invention described above, a webmaster or advertising manager assigned to a particular Internet information server (12, 12, 12A or 12B) can: (1) access the Web-based product advertisement for a particular product (i.e. HTML code, image files, and any other rich media content associated therewith); (2) access previously downloaded CPIR-enabling Java Applet(s) for the consumer product, stored in a locally-maintained Library (i.e. Catalog) of CPIR-Enabling Applets on a client machine or server on the network, or directly access CPIR-enabling Java Applets from the centrally-maintained Library (i.e. Catalog)

of CPIR-Enabling Applets illustrated in FIG. 4H2; and (3) use Real Media s OAS 5.0 solution software to deliver both the Web-based product advertisement (i.e. its HTML code, and other media-rich content) and the corresponding CPIR-enabling Applet tag (and image files associated therewith) to a designated section on a particular Web page of a specific WWW-site.

It is understood that there are different ways of inserting/embedding both of these objects within a particular section of an HTML-encoded document using the highly advanced HTML-editing functionalities of the OAS 5.0 software system. For example, the Web-based product advertisement can be inserted within a first spatially-defined portion of the target HTML document (occupying the largest portion of the purchased Internet advertising space), while the CPIR-enabling client-side Applet is inserted within a second spatially-defined portion of the target HTML document occupying the balance of the purchased Internet advertising space. Alternatively, both the CPIR-enabling Applet and the Web-based product advertisement can be inserted within substantially same spatially-defined portion of the target HTML document so as to achieve spatial overlap therebetween. This way when the consumer clicks on the advertisement image, or some preselected portion thereof, the underlying CPIR-enabling Applet will be automatically executed and the corresponding Java GUI generated for displaying the results of the UPN-directed database search.

In situations where the Internet product advertisement (e.g. banner advertisement) embodies a Java Applet tag which, when executed, produces a new Java GUI (i.e. new browser interface), then a CPIR-enabling Applet tag can be embedded within the HTML-encoded document displayed in the new Java GUI.

Other ways of embedding the Web-based advertisement and the related CPIR-enabling Applet tags will become apparent hereinafter to those skilled in the art having had the benefit of reading the present disclosure.

As indicated at Block G in FIG. 4G2, the eight step in the method involves the consumer recognizing that a CPIR-enabling Applet tag is embedded within a Web-document displayed on a Java-enabled client computer subsystem 13, and thereafter launching/executing the associated Applet to initiate a UPN-directed search within the RDBMS server 9 by performing a single mouse clicking operation.

Notably, the second illustrative embodiment described above has been described with particular focus given to CPIR-enabling Applets encoded with the UPN of a particular consumer product. It is understood, however, that the CPIR-enabling Applets of the present invention can be encoded with the trademark(s) used in connection with a particular consumer product, thus providing Trademark-encoded CPIR-enabling Applets, in contrast with UPN-encoded CPIR-enabling Applets. In such alternative embodiments, the encoded trademark would be used to direct a search through the RDBMS server 9, and display the results thereof in a new (independent) Java GUI generated at the point of Applet tag embodiment. Alternatively, a product descriptor associated with a particular product can be encoded within the corresponding CPIR-enabling Applet, used to direct a search through the RDBMS server 9, and display the results thereof in an independent Java GUI generated at the point of Applet tag embodiment.

The Third Applet-Driven Method of Accessing and Displaying Categorized UPN/TM/PD/URL Link Menus from the UPN/TM/PD/RDBMS of the Present Invention After providing a brief overview on the system architecture of FIG. 2B3 and the nature of the client-side CPIR-enabling Applets deployed therewithin, the steps associated with Applet-driven CPI-acquisition method of the third illustrative embodiment will be described in detail with reference to FIGS. 4I1, 4I2, 4J1 and 4J2. In general, the method of FIGS. 4I1 and 4I2, like that of FIGS. 4G1 and 44G2, involves using a client-side CPIR-enabling Applet to automatically conduct a UPN-directed search on the UPN/TM/PD/URL Database Management Subsystem hereof (i.e. RDBMS server 9) in response to a single mouse-clicking operation by the consumer on the HTML tag associated with the CPIR-enabling Applet. In the illustrative embodiment, the CPIR-enabling Applet of the present invention is a program written in the Java™ programming language and has an HTML tag (indicated by <APPLET>) which is designed to be included in an HTML page, much in the same way an image can be included therewithin (in accordance with the HTML 3.2 Specification) .

In the method of the second illustrative embodiment, CPIR-enabling Applets are designed to work within a request/response processing model, as shown in FIG. 2B3. In this request/response model, a client subsystem 13 sends a request message to the Java Web Server 11 and the server 11 responds by sending back a reply message. In the illustrative embodiment, requests come in the form of http, although it is understood that other protocols (e.g. ftp, EDI or a custom protocol) may be used. The request and the corresponding response reflect the state of the client and the server at the time of the request.

When using a Java-enabled browser to view a Web page containing a client-side CPIR-enabling Applet tag <APPLET>, the Applet s compiled class code is automatically accessed from the Java Web Server 11 and executed on the client-side of the network connection illustrated in FIG. 2B3. Thus, as shown in FIG. 2B3, the Java-enabled client machine 13 in this network architecture must run a Java-enabled browser program that provides a Java Virtual Machine (JVM) for running/executing Java Applets on the client-side thereof, in much the same way that Java Web Server 11 must provide a JVM for running Java servlets on the server side thereof, as shown in FIG. 2B1.

With reference to FIG. 2B3, the method of creating, loading, distributing, embedding and executing client-side CPIR-enabling Java Applets in accordance with the principles of the present invention schematically illustrated in FIGS. 4I1, 4I2, 4J1 and 4J2 will now be described below.

As indicated at Block A1 in FIG. 4I1, the first step of the method involves using the Java Applet API to write or otherwise author the source code for a client-side CPIR-enabling Java Applet for each UPN-specified consumer product registered in the RDBMS server 9. In general, the source code for each client-side CPIR-enabling Java Applet (i.e. Applet) will embody one or more of following items of information: (i) the UPN of the particular product on which the CPI search is to be carried out and the search results thereof displayed; (ii) Java classes required for performing a UPN-directed search on the RDBMS server 9 using a socket connection between the Java-enabled client subsystem 13 and the Java Web Server 11, producing a particular Java GUI for displaying the results obtained from the UPN-directed search; and (iii) license-related information specifying the terms and conditions of the CPIR-enabling Applet license and conditions under which the CPIR-enabling Applet shall operate.

Notably, such license-related information may specify: (1) one or more specific host domains from which a Web document containing the corresponding Applet tag may launch the CPIR-enabling Applet under a licensing program; (2) one or more general Internet domains (e.g. .com, org., .gov, int, mil, .uk, etc.) from which a Web document containing the corresponding Applet tag may launch the CPIR-enabling Applet under a licensing program; (3) the time duration of the licensing period associated with the CPIR-enabling Applet; and (4) any other restrictions set by the associated manufacturer and/or retailer, and/or administrator of the consumer product information system of the present invention, that must be satisfied for a registered CPIR-enabled Applet to operate within a Web-document.

Notably, the Java source code for each CPIR-enabling Applet will vary depending upon implementation. However, regardless of the particular implementation, it can be expected that each CPIR-enabling Applet designed, for example, to search an (Oracle-based JDBC) RDBMS Server 9 for current UPC/URL list symbolically linked to a specified UPN and thereafter display the results in an independent Java GUI, will typically include Java source code specifying:

(1) the importable JDBC classes required by the CPIR-enabling Applet;

(2) the importable java classes to be used in the CPIR-enabling Applet;

(3) the JDBC driver to be loaded for the Oracle-based RDBMS server 9;

(4) the connection strings to the RDBMS server 9;

(5) the CPI query to be executed on the UPN/TM/PD/URL Database, dependent on the UPN of the associated consumer product and possibly other search criteria and Applet licensing conditions;

(6) the Applet tag, its graphical icon or alias to trigger execution the Applet and its associated CPI query;

(7) the CPI Search Result GUI to be displayed on requesting client and its relative location to the associated Applet tag; and (8) the operations that will be carried out upon execution of the CPI query including

- Boolean search logic to be carried out upon initiation of the UPN-directed CPI search;
- if a new connection is required between Java Web Server 11 and the RDBMS server 9;
- Loading the JDBC driver;
- Connecting to the RDBMS server 9;
- Creating a SQL statement based on the specified Boolean search logic and UPN;
- Executing the SQL query statement; and
  - Dumping the search results to the CPI Search Result GUI.

When using earlier versions of the HTML Specification (i.e. HTML 3.2 by the World Wide Web Consortium), the source code for each CPIR-enabling Java Applet will adhere to the general syntax of that the HTML 3.2 Specification. Also, if the HTML 4.0 Specification is used, then the source code for each CPIR-enabling Java Applet will adhere to the general syntax of the HTML 4.0 Specification, as discussed above.

After writing/authoring the source code for the CPIR-enabling Java Applet, the Applet is ascribed a unique name such as, for example, "UPNXXXXXXYYYYYZ" for a 12 digit Uniform Product Code.

As indicated at Block A2 in FIG. 4I1, the second step of the method involves compiling the source code of the Applet into Java bytecode, and then placing/loading the classfiles for the Applet within the server_root/Applets directory on the Java Web Server 11.

As indicated at Block B1 in FIG. 4I1, the third step of the method involves for each UPN-specified consumer product, (1) containing the complete Applet HTML tag <APPLET> within an executable file, and (2) storing each such Applet tag containing file in the Central CPIR-Enabling Applet Library on the RDBMS server 9, as shown in FIG. 4J1.

As indicated at Block C in FIG. 4I1, the fourth step of the method involves distributing the CPIR-enabling Applet HTML tags to retailers, wholesalers, advertisers, and others who desire to deliver UPN-directed CPI search results to their customers, clients and the like. This distribution process may be carried out in several different ways which have been detailed hereinabove in connection with the second illustrative method illustrated in FIGS. 4G1 through 4H2 and described above.

As indicated at Block D in FIG. 4G2, the fifth step of the method involves enabling retailers, wholesalers, advertisers, and others to (1) open the downloaded Applet tag containing files, (2) extract the CPIR-enabling HTML tags contained therewithin, and (3) embed (i.e. insert) one or more distributed CPIR-enabled Applet tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may understandably include other types of code (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc. to create the HTML pages associated with a particular WWW site; CatalogMaker™™ and CatalogManager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling Applet HTML tag using, for example, simple commands or drag-and-drop procedures.

As indicated at Block E in FIG. 4G2, the sixth step of the method involves serving servlet tag encoded HTML documents from Internet information servers to Java-enabled client computer subsystems 13 operated by consumers at home, in the office, in EC-enabled and brick and mortar retail stores, or on the road, as the case may be. As shown in FIG. 4H1, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4G2, the seventh step of the method hereof involves using a Java-enabled client computer subsystem 13 to display served HTML-encoded documents having one or more of CPIR-enabling Applet tags embedded therewithin. This step is carried out by the consumer pointing his or her Java-enabled browser program (e.g. Netscape Navigator, Microsoft Explorer, or Sun Microsystems HotJava program) to an HTML-encoded document within which a CPIR-enabling Java Applet tag is embedded, at a particular point of presence on the WWW. As shown in FIGS. 4M1 through 4R2, CPIR-enabling Applets can be graphically-encoded in an variety of different ways as described in detail detailed hereinabove in connection with the second illustrative method illustrated in FIGS. 4G1 through 4H2 and described above.

As indicated at Block G in FIG. 4G2, the eight step in the method involves the consumer recognizing that a CPIR-enabling Applet tag is embedded within a Web-document displayed on a Java-enabled client computer subsystem, and thereafter launching/executing the associated Applet to initiate a UPN-directed search within the RDBMS server 9 by performing a single mouse clicking operation.

Notably, the third illustrative embodiment has been described with particular focus given to CPIR-enabling Applets encoded with the UPN of a particular consumer product. It is understood, however, that the CPIR-enabling Applets of the present invention can be encoded with the trademark(s) used in connection with a particular consumer product, thus providing Trademark-encoded CPIR-enabling Applets, in contrast with UPN-encoded CPIR-enabling Applets. In such alternative embodiments, the encoded trademark would be used to direct a search through the RDBMS server 9, and display the results thereof in a new (independent) Java GUI generated at the point of Applet tag embodiment. Alternatively, a product descriptor associated with a particular product can be encoded within the corresponding CPIR-enabling a Applet, used to direct a search through the RDBMS server 9, and display the results thereof in an independent Java GUI generated at the point of Applet tag embodiment.

The Fourth Applet-Driven Method of Accessing and Displaying Categorized UPN/TM/PD/URL Link Menus from the UPN/TM/PD/URL RDBMS the Present Invention After providing a brief overview on the system architecture of FIG. 2B4 and the nature of the client-side CPIR-enabling Applets deployed therewithin, the steps associated with Applet-driven CPI-acquisition method of the fourth illustrative embodiment will be described in detail with reference to FIGS. 4K1, 4K2, 4L1 and 4L2.

In general, the method of FIGS. 4K1 and 4IK2, like that of FIGS. 4G1 and 4G2 and 4I1 and 4I2 involves using a client-side CPIR-enabling Applet to automatically conduct a UPN-directed search on the UPN/TM/PD/URL RDBMS hereof (i.e. RDBMS server 9) in response to a single mouse-clicking operation by the consumer on the HTML tag associated with the CPIR-enabling Applet. In the illustrative embodiment, the CPIR-enabling Applet of the present invention is a program written in the Java™ programming language and has an HTML tag (indicated by <APPLET>) which is designed to be included in an HTML page, much in the same way an image can be included therewithin (in accordance with the HTML 3.2 Specification).

In the method of the second illustrative embodiment, CPIR-enabling Applets are designed to work within a request/response processing model, as shown in FIG. 2B4. In this request/response model, a client subsystem 13 sends a request message to the Java Web Server 11 and the server 11 responds by sending back a reply message. In the illustrative embodiment, requests come in the form of http, although it is understood that other protocols (e.g. ftp, EDI or a custom protocol) may be used. The request and the corresponding response reflect the state of the client and the server at the time of the request.

When using a Java-enabled browser to view a Web page containing a client-side CPIR-enabling Applet tag <APPLET>, the Applet s compiled class code is automatically accessed from the Java Web Server II and executed on the client-side of the network connection illustrated in FIG. 2B4. Thus, as shown in FIG. 2B3, the Java-enabled client machine 13 in this network architecture must run a Java-enabled browser program that provides a Java Virtual Machine (JVM) for running/executing Java Applets on the client-side thereof, in much the same way that Java Web Server 11 must provide a JVM for running Java servlets on the server side thereof, as shown in FIG. 2B1.

With reference to FIG. 2B4, the method of creating, loading, distributing, embedding and executing client-side CPIR-enabling Java Applets in accordance with the principles of the present invention schematically illustrated in FIGS. 4K1, 4K2, 4L1 and 4L2 will now be described below.

As indicated at Block A1 in FIG. 4K1, the first step of the method involves using the Java Applet API to write or otherwise author the source code for a client-side CPIR-enabling Java Applet for each UPN-specified consumer product registered in the RDBMS server 9. In general, the source code for each client-side CPIR-enabling Java Applet (i.e. Applet) will embody one or more of following items of information: (i) the UPN of the particular product on which the CPI search is to be carried out and the search results thereof displayed; (ii) Java classes required for performing a UPN-directed search on the RDBMS server 9 using a Remote Invocation Method (RMI) executed on the Java Web Server 11, producing a particular Java GUI for displaying the results obtained from the UPN-directed search; and (iii) license-related information specifying the terms and conditions of the CPIR-enabling Applet license and conditions under which the CPIR-enabling Applet shall operate.

Notably, such license-related information may specify: (1) one or more specific host domains from which a Web document containing the corresponding Applet tag may launch the CPIR-enabling Applet under a licensing program; (2) one or more general Internet domains (e.g. .com, org., .gov, int, mil, .uk, etc.) from which a Web document containing the corresponding Applet tag may launch the CPIR-enabling Applet under a licensing program; (3) the time duration of the licensing period associated with the CPIR-enabling Applet; and (4) any other restrictions set by the associated manufacturer and/or retailer, and/or administrator of the consumer product information system of the present invention, that must be satisfied for a registered CPIR-enabled Applet to operate within a Web-document.

The RMI on Java Web Server 11''' enables connectivity between Java Web Server 11''' and the RDBMS Server 9 using the standard Java native method interface (JNI) or the standard JDBC package. At its most basic level, RMI is Java s remote procedure call (RPC) mechanism enabling connectivity to the RDBMS server 9 using native methods. Further details on the RMI are published in the Technical Paper Java Remote Method Invocation—Distributed Computing For Java by JavaSoft, incorporated herein by reference.

Notably, the Java source code for each CPIR-enabling Applet will vary depending upon implementation. However, regardless of the particular implementation, it can be expected that each CPIR-enabling Applet designed, for example, to search an (Oracle-based JDBC) RDBMS Server 9 for current UPC/URL list symbolically linked to a specified UPN and thereafter display the results in an independent Java GUI, will typically include Java source code specifying:

(1) the importable JDBC classes required by the CPIR-enabling Applet;

(2) the importable java classes to be used in the CPIR-enabling Applet;

(3) the JDBC driver to be loaded for the Oracle-based RDBMS server 9;

(4) the connection strings to the RDBMS server 9;

(5) the CPI query to be executed on the UPN/TM/PD/URL Database, dependent on the UPN of the associated consumer product and possibly other search criteria and Applet licensing conditions;

(6) the Applet tag, its graphical icon or alias to trigger execution the Applet and its associated CPI query;

(7) the CPI Search Result GUT to be displayed on requesting client and its relative location to the associated Applet tag; and (8) the operations that will be carried out upon execution of the CPI query including Boolean search logic to be carried out upon initiation of the UPN-directed CPI search;

if a new connection is required between Java Web Server 11 and the RDBMS server 9;

Loading the JDBC driver;

Connecting to the RDBMS server 9;

Creating a SQL statement based on the specified Boolean search logic and UPN;

Executing the SQL query statement; and

Dumping the search results to the CPI Search Result GUI.

When using earlier versions of the HTML Specification (i.e. HTML 3.2 by the World Wide Web Consortium), the source code for each CPIR-enabling Java Applet will adhere to the general syntax of that the HTML 3.2 Specification. Also, if the HTML 4.0 Specification is used, then the source code for each CPIR-enabling Java Applet will adhere to the general syntax of the HTML 4.0 Specification, as discussed above.

After writing/authoring the source code for the CPIR-enabling Java Applet, the Applet is ascribed a unique name such as, for example, "UPNXXXXXXYYYYYZ" for a 12 digit Uniform Product Code.

As indicated at Block A2 in FIG. 4K1, the second step of the method involves compiling the source code of the Applet into Java bytecode, and then placing/loading the classfiles for the Applet within the server_root/Applets directory on the Java Web Server 11.

As indicated at Block B1 in FIG. 4K1, the third step of the method involves for each UPN-specified consumer product, (1) containing the complete Applet HTML tag <APPLET> within an executable file, and (2) storing each such Applet tag containing file in the Central CPIR-Enabling Applet Library on the RDBMS server 9, as shown in FIG. 4J1.

As indicated at Block C in FIG. 4I1, the fourth step of the method involves distributing the CPIR-enabling Applet HTML tags to retailers, wholesalers, advertisers, and others who desire to deliver UPN-directed CPI search results to their customers, clients and the like. This distribution process may be carried out in several different ways which have been detailed hereinabove in connection with the second illustrative method illustrated in FIGS. 4G1 through 4H2 and described above.

As indicated at Block D in FIG. 4K2, the fifth step of the method involves enabling retailers, wholesalers, advertisers, and others to (1) open the downloaded Applet tag containing files, (2) extract the CPIR-enabling HTML tags contained therewithin, and (3) embed (i.e. insert) one or more distributed CPIR-enabled Applet tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may understandably include other types of code (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc. to create the HTML pages associated with a particular WWW site; CatalogMaker™™ and CatalogManager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling Applet HTML tag using, for example, simple commands or drag-and-drop procedures.

As indicated at Block E in FIG. 4K2, the sixth step of the method involves serving servlet; tag encoded HTML documents from Internet information servers to Java-enabled client computer subsystems 13 operated by consumers at home, in the office, in EC-enabled and brick and mortar retail stores, or on the road, as the case may be. As shown in FIG. 4H1, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4G2, the seventh step of the method hereof involves using a Java-enabled client computer subsystem 13 to display served HTML-encoded documents having one or more of CPIR-enabling Applet tags embedded therewithin. This step is carried out by the consumer pointing his or her Java-enabled browser program (e.g. Netscape s Navigator, Microsoft s Internet Explorer, or Sun Microsystems HotJava program) to an HTML-encoded document within which a CPIR-enabling Java Applet tag is embedded, at a particular point of presence on the WWW. As shown in FIGS. 4M1 through 4R2, CPIR-enabling Applets can be graphically-encoded in an variety of different ways as described in detail detailed hereinabove in connection with the second illustrative method illustrated in FIGS. 4G1 through 4H2 and described above.

As indicated at Block G in FIG. 4G2, the eight step in the method involves the consumer recognizing that a CPIR-enabling Applet tag is embedded within a Web-document displayed on a Java-enabled client computer subsystem, and thereafter launching/executing the associated Applet to initiate a UPN-directed search within the RDBMS server 9 by performing a single mouse clicking operation.

Notably, the third illustrative embodiment has been described with particular focus given to CPIR-enabling Applets encoded with the UPN of a particular consumer product. It is understood, however, that the CPIR-enabling Applets of the present invention can be encoded with the trademark(s) used in connection with a particular consumer product, thus providing Trademark-encoded CPIR-enabling Applets, in contrast with UPN-encoded CPIR-enabling Applets. In such alternative embodiments, the encoded trademark would be used to direct a search through the RDBMS server 9, and display the results thereof in a new (independent) Java GUI generated at the point of Applet tag embodiment. Alternatively, a product descriptor associated with a particular product can be encoded within the corresponding CPIR-enabling Applet, used to direct a search through the RDBMS server 9, and display the results thereof in an independent Java GUI generated at the point of Applet tag embodiment.

While the illustrative embodiments described above have employed Java Applet technology, which is designed to work with nearly all modern Internet browser programs, it is understood, however, that it is possible to use Active-X type objects (i.e. Active-X Applets) embedded within Web-documents, such as XML and SGML encoded documents including Active Server Pages (ASPs) from the Microsoft Corporation, in order to implement UPN-directed methods or the present invention at the point of presence of the consumer within a Cyberspace environment. Such alternative embodiments are a straightforward application of the techniques and technology disclosed hereinabove and thus falls within the scope and spirit of the present invention.

Also, while the above-described method of information searching, access and display has been described in connection with consumer products, it is understood that the principles of the present invention can also be used to deliver Web-based information to consumers in connection with a particular consumer service which has been assigned a Universal Service Number (USN) that functions in a similar manner to a UPN used in connection with a particular consumer product. In such alternative embodiments, the UPN/TM/PD/URL RDBMS 9 can be readily extended to contain symbolic links between Universal Service Numbers (USN) and URLs to form a UPS/URL database along the principles described hereinabove.

Also, the CPIR-enabling Applets of the present invention may be modified to provide consumers with general access to any IPI WWW site in accordance with the present invention, and not necessarily a product-specific Cyber-Service™ search, as described above. Thus, for example, in the case where the CPIR-enabling Applet is not encoded with any particular UPN, then the CPIR-enabling Applet will generate and display a pop-up Java GUI at the point where its Applet tag (or related image IMG) is embedded. Such as Java GUI could be designed to ix enable either (1) a generalized (unrestricted) consumer product information display, as would be desired at WWW search Engines/Directories such as Yahoo, Lycos, Excite, Alta-Vista, and the like, or (2) a restricted consumer product information display, as would be desired by a particular retailer operating an EC-enabled store or on-line catalog where browsing for merchandise not carried in the store or catalog is not to be encouraged.

An example of a CPIR-enabling Applet designed to produce a Java GUI for the manufacturer-unrestricted or generalized CPI Service is illustrated in FIGS. 4N1 and 4Q1 by using a graphical icon or button, displayed on the lower portion of each display screen, and labeled as BRANDKEY REQUEST™ CENTRAL Product Information Search. An example of the Java GUIs produced by these CPIR-enabling Applets are illustrated in FIG. 4N2 and 4Q2, respectively.)

An example of a CPIR-enabling Applet designed to produce a CPID-enabling Java GUI for the manufacturer-restricted BRANDKEY REQUEST Retailer CPI Service is indicated in FIG. 4O1 by a graphical icon or button, displayed on the lower portion of each display screen, and labeled as BRANDKEY REQUEST RETAIL™ Product Information@SPORTS PLACE. An example of the Java GUI produced by this CPIR-enabling Applet is indicated in FIG. 4O2. Notably, this type of CPIR-enabling Applet provides consumers with desired information about the UPN-encoded product, while disabling the consumer from browsing for merchandise not carried in the EC-oriented store or catalog of the hosting retailer.

As illustrated above, in the case where the CPIR-enabling Applet is encoded with a particular UPN, then the function of the CPIR-enabling Applet will be to generate and display an independent pop-up Java GUI at the point where the Applet tag (or associated image) is embedded, for displaying the search results made against the consumer product identified by the UPN embodied within the CPIR-enabling Applet. An example of a CPIR-enabling Applet designed to produce a CPID-enabling Java GUI for a BRANDKEY REQUEST™ URL Search is indicated in FIGS. 4P1 and 4R1 by a graphical icon or button, displayed on the lower portion of each display screen, and labeled as BRANDKEY REQUEST™ URL Search. Notably, operation of this type of CPIR-enabling Applet can be restricted to a particular retailer (or manufacturer) by the inclusion of a domain name constraint within the Applet itself, as described hereinabove. In the case of the Cyber-Service URL, the executed CPIR-enabling Applet automatically returns for display a menu of categorized URLs symbolically linked to the encoded UPN by the manufacturer and/or its agent. It would be desirable to embed this type of CPIR-enabling Applet on Web-documents in an EC-enabled stores and on-line catalogs of a particular retailer or manufacturer, displaying consumer products to be purchased, as well as on Web-documents serving as Internet-based product advertisements.

Referring to FIGS. 4N1 and 4N2, the above-described method of CPI searching and display will now be illustrated in the context of browsing a WWW Search Directory or Engine, and looking for a simple yet effective way of finding accurate consumer product related information on a particular product, or class of products. When searching for consumer product information at a WWW Search Directory or Engine, such as Yahoo, Excite, Alta Vista, Lycos, etc., it will be desirable for the consumer to search against all manufacturers within the entire UPN/TM/PD/URL RDBMS 9 before returning the search results to the consumer for display. Therefore, in this sort of Cyberspace environment, it will be oftentimes desirable to embed a CPIR-enabling Applet in the home-page of the WWW search directory or engine so that, upon clicking the graphical icon thereof, an independent Java GUI to the BRANDKEY REQUEST CENTRAL™ WWW site will be automatically produced so that all modes of searching are made available to the consumer against all manufacturers registered (and possibly unregistered) within the UPN/TM/PD/URL RDBMS 9, as shown in FIG. 4N2. Notably, this Java GUI is very similar to the Java GUI set forth in FIG. 3C.

Referring to FIGS. 4O1 through 4O2, the above-described method of CPI searching and display is illustrated in a different context, wherein a consumer is shopping/browsing an EC-enabled storefront of a particular retailer, and considering whether or not to make an on-line purchase of a particular consumer product displayed within the catalog pages thereof. In this sort of environment, the retailer will typically prefer that the consumer can only search on manufacturers of merchandise being offered for sale within the EC-enabled store, lest the consumer will encouraged to leave upon finding out that what he or she is looking for is available in a different retail store, and not the store at which he or she is present. Therefore, in this sort of Cyberspace environment, it will be oftentimes desirable to embed a CPIR-enabling Applet in the home-page (or other conspicuous locations) of each retailer s WWW EC store so that, upon clicking the graphical icon thereof, an independent Java GUI to the BRANDKEY REQUEST Retailer WWW site@the retailer store will be automatically produced so that all modes of searching are made available to the consumer against only those manufacturers registered (and possibly unregistered) with the UPN/TM/PD/URL RDBMS 9 which supply consumer products for sale within the particular retail store, as shown in FIG. 4O2. Notably, this Java GUI is similar to the Java GUI set forth in FIG. 3C, except that a manufacturer filter set by the retailer UPC product catalog is used to filter out the search results displayed on the Java GUI.

Referring to FIGS. 4P1 and 4P2, it can be seen that the consumer within the EC-enabled store shown in FIGS. 4O1 and 4O2 has proceed to look at a particular product in the retail store (e.g. the Ultralite Dagger Mountain Bike being offered for sale for $285.00). At this point of presence within the EC-enabled retail store, the consumer might like to review the very best information published wherever on the WWW relating to this particular consumer product. Therefore, in this sort of Cyberspace environment, it will be desirable to embed a CPIR-enabling Applet within or near the image of this product in the retailer s WWW EC store so that, upon clicking the graphical icon thereof, a BRANDKEY REQUEST URL Search will be automatically carried out within the UPN/TM/PD/URL RDBMS 9, and the search results thereof displayed in a Java GUI, as shown in FIG. 4P2. As shown, the Java GUI displays a menu-formatted list of categorized URLs that have been symbolically linked to the UPN of the consumer product on which the search inquiry was initiated. Typically, this menu of URLs, accessed from the UPN/TM/PD/URL RDBMS 9, would have been updated as early as the night before during UPN/TM/PD/URL link updating/management operations carried out between (i) the UPN/TM/PD/URL catalog maintained in a client computer subsystem 13 within the back office of the manufacturer, and (ii) the Manufacturer/Product Registration Subsystem 31, 33, using electronic data interchange processes based on any one of number of protocols (e.g. ftp, EDI, XML/ICE, etc.).

Referring to FIGS. 4Q1 through 4Q2, the above-described method of CPI display is illustrated in the context of a consumer visiting an on-line EC-enabled auction site, and considering whether or not to place a bid on a particular consumer product displayed within the auction listings thereof. In general, this environment is similar to the situation where a consumer finds him/herself searching for consumer product information at a WWW Search Directory or Engine, such as Yahoo, Excite, Alta Vista, Lycos, etc. In such an environment, it will be desirable for the consumer to search against all manufacturers within the entire UPN/TM/PD/URL RDBMS 9 before returning the search results to the consumer for display. Therefore, in this sort of Cyberspace environment, it will be oftentimes desirable to embed a CPIR-enabling Applet in the home-page of the WWW on-line auction site so that, upon clicking the graphical icon thereof, an independent Java GUI to the BRANDKEY REQUEST CENTRAL™ WWW site will be automatically produced so that all modes of searching are made available to the consumer against all manufacturers registered (and possibly unregistered) within the UPN/TM/PD/URL RDBMS 9, as shown in FIG. 4Q2. Notably, this Java GUI is very similar to the Java GUI set forth in FIG. 3C.

Referring to FIG. 4R1 and 4R2, it can be seen that the consumer within the on-line auction site shown in FIGS. 4Q1 and 4Q2 has proceed to look at a particular item being auctioned off (e.g. the Sony Mavica MVC-FD81 at a current bid of $420.50). At this point of presence within the on-line auction site, the consumer might very well like to review the very best information published wherever on the WWW relating to this particular consumer product. Therefore, in this sort of Cyberspace environment, it will also be desirable to embed a CPIR-enabling Applet within or near the title of the product being auctioned (or image thereof if available) so that, upon clicking the graphical icon thereof, a BRANDKEY REQUEST URL Search will be automatically carried out within the UPN/TM/PD/URL RDBMS 9, and the search results thereof displayed in a CPID-enabling Java GUI, as shown in FIG. 4R2. As shown, this Java GUI displays a menu-formatted list of categorized URLs that have been symbolically linked to the UPN of the auctioned consumer product on which the search inquiry was initiated. Typically, this categorized menu of URLs, accessed from the UPN/TM/PD/URL RDBMS 9, would have been updated as early as the night before during daily UPN/TM/PD/URL link updating/management operations carried out in the manner described hereinabove.

Referring to FIGS. 4S1 through 4S2, the above-described method of CPI searching and display is illustrated in the context of a consumer visiting a typical WWW site, whereupon an Internet advertisement is presented for a particular consumer product, solely for illustrative purposes. At this point of presence on the WWW, the consumer might very well like to review information published on the WWW relating to the advertised consumer product. Therefore, in this sort of Cyberspace environment, it will also be desirable to embed a CPIR-enabling Applet within, closely near, or immediately about the space of the advertisement so that, upon clicking the image associated thereof, a BRANDKEY REQUEST URL Search will be automatically carried out within the UPN/TM/PD/URL RDBMS 9, and the search results thereof displayed in a CPID-enabling Java GUI, as shown in FIG. 4S2. As shown, this Java GUI displays a menu-formatted list of categorized URLs that have been symbolically linked to the UPN of the advertised consumer product on which the search inquiry was initiated. Typically, this categorized menu of URLs, accessed from the UPN/TM/PD/URL RDBMS 9, would have been updated as early as the night before UPN/TM/PD/URL link updating/management operations carried out in the manner described hereinabove.

In situations where the advertisement itself embodies a Java-Applet, as in the case of most banner-type advertisements, it would be desirable to embed the CPIR-enabling Applet within the HTML-encoded document displayed within the new Java GUI generated when the Java-Applet is executed by the consumer upon his or her initial encounter of the advertisement. Upon the display of the menu-formatted list of categorized URLs within the CPID-enabling Java GUI, the consumer can easily access different Web-documents containing information related to the advertised consumer product by simply selecting the URL and linking to the information resource to which it points on the WWW. Notably, the displayed URL menu would include (i) one or more URLs pointing to EC-enabled stores and on-line catalogs at which the advertised product can be purchased over the Internet, as well as (ii) one or more URLs pointing to brick and mortar type retail stores at which the advertised product can be purchased in the stream of commerce.

As shown in FIG. 4S3, the consumer having accessed the product-specific search results of FIG. 4S2, may then select, from the displayed URL Menu, a URL displayed in the Buy On The Web URL category thereof, thereby automatically linking to the EC-enabled store or product catalog specified by the selected URL, as shown in FIG. 4S2, and thus enabling the purchase of the advertised product or service thereat. Preferably, the EC-enabled store or product catalog employs the one-click purchase order placement system and method taught in U.S. Pat. No. 5,960,411 to Hartman, et al., and assigned to Amazon.com, Inc., which is incorporated herein by reference in its entirety. This would simplify ordering the product by the retailer having the consumer s credit card and shipping address information on file.

Thus, the CPI-based search and display method of the present invention gives rise to a new method of and system for purchasing consumer products over the Internet (e.g. WWW) comprising the steps of: embedding a UPN-encoded CPIR-enabling Applet within the HTML-code of a consumer product advertisement, wherein the CPIR-enabling Applet, when executed, automatically displays a categorized URL menu containing one or more URLs pointing to one or more EC-enabled stores or on-line catalogs on the WWW at which the consumer product identified by the encoded UPN can be purchased and delivered to a particular address in physical space.

Referring to FIGS. 4T1 through 4T2, the above-described method of CPI searching and display is illustrated in the context of a consumer visiting a particular on-line electronic trading WWW site (e.g. http://www/etrade.com). At this site, the consumer is assumed to be reviewing the performance chart of a particular consumer product company displayed at this electronic trading WWW site, and is considering whether or not to buy, keep or sell securities (e.g. stock or bonds) in this consumer product company. At this point of presence on the WWW, the consumer decides that he or she would like to first ascertain specific information about the company s products by initiating a trademark/company name-directed CPI search according to the principles of the present invention. In accordance with the present invention, the consumer, upon identifying a CPIR-enabling Java Applet (embedded within the HTML code of the performance chart displayed at the on-line electronic trading WWW site), would click thereon. In the illustrated embodiment, the CPIR-enabling Applet is graphically indicated by an associated graphical image (e.g. BRANDKEY REQUEST™ Trademark-Directed URL Search) and is encoded with the trademark an/or company name of a particular manufacturer/vendor associated with the display performance chart. Notably, the creation, distribution and embedding of such CPIR-enabling Applets must be carried out well in advance of the consumer arriving at the particular point of presence shown in FIG. 4T1. In accordance with the principles of the present invention, when the consumer performs a single mouse-clicking operation on the graphical image associated with the embedded CPIR-enabling Java Applet, the underlying CPIR-enabling Applet is executed and a trademark-directed URL search is automatically made against the UPN/TM/PD/URL RDBMS 9 hereof. Quickly thereafter, the results from the trademark/company name directed search are automatically displayed in a Java GUI on the browser of the requesting consumer s client machine, as shown in FIG. 4T2. As shown, the consumer is free to scroll through the displayed GUI, looking for URLs on particular consumer products of the manufacturer/vendor.

Preferably, in above application, each entry in the displayed Trademark Search Results screen shown in FIG. 4T2 is itself a CPIR-enabling Java Servlet which, when clicked upon, automatically initiates a UPN-directed CPI search against a particular product of the manufacturer related to the displayed stock performance chart, as taught in great detail hereinabove. This novel technique will greatly simplify accessing and displaying accurate and up-to-date UPC/URL menus on the products offered by a particular company in which a consumer is considering buying, keeping or selling a particular number of financial securities. Also, while conducting such on-line CPI research, the consumer may also consider purchasing a particular consumer product at an EC-enabled store or product catalog, as illustrated in FIG. 4S3, supra.

Overview of Modes of Operation for IPI Finding and Serving Subsystem

In order to enter a primary mode of operation of the IPI Finding and Serving Subsystem 2, the consumer, retail sales clerk or retailer selects a particular mode activation button (e.g. 21A, 21B, 21C, 21D, 21E, or 21F) displayed in the control frame 21B of the Java GUI browser program at the requesting client subsystem 13. Upon making the selection, the Web browser at the client subsystem 13 automatically requests a particular HTML-encoded form (typically residing on the IPD Server(s) 11). In general, each mode activation button 21A through 21F can be linked to a client-side or server-side Java Applet tag embedded within an HTML-encoded document, or directly to a predefined static-type HTML form corresponding to the selected mode of operation. In the case of Java Applets, upon selecting the mode selection button, a Java GUI is automatically produced and displayed within the information display frame 20C of the Web browser of the requesting client subsystem. In the case of the directly linked static-type HTML forms, a GUI in the form of HTML document is automatically produced and displayed within the information display frame 20C of the Web browser of the requesting client subsystem. In either case, the HTML-encoded form corresponds to the selected mode and is linked to a Java method (or CGI script) related to the selected mode and possibly to other methods or forms required to carry out the database access and/or management process associated therewith. The requesting client subsystem then enters the information requested by the HTML form displayed within the information display frame 20C of the Web browser s GUI interface. Information entry into the HTML form can be carried out using bar code symbol reading equipment, keyboard or keypad, speech dictation equipment (by Dragon Systems, Inc. of Newton, Mass.), and the like.

In general, the particular messages which will be displayed within the HTML forms during any particular mode of operation will depend upon several factors namely: whether the IPI Web-site is intended for access by bar code driven kiosks (i.e. client subsystems 13) as shown, for example, in FIGS. 3A2, 3A3, 3A4, and 3A5 located within retail environments; or whether the IPI Web-site is intended for access by desktop, laptop and palmtop client computer systems 13 as shown, for example, in FIG. 3A1 located at home, in the office or oil the road.

For example, if the IPI Web-site supported by the IPI Finding and Serving Subsystem hereof is intended for access by bar code driven kiosks, then the HTML documents related to the IPI Website will be particularly adapted to facilitate the use of bar code symbol reader at the client subsystem. This way UPNs (e.g. UPC or EAN symbols) can be easily entered into the subsystem without manual key-entry operations. In contrast, if the IPI Web-site supported by the IPI Finding and Serving Subsystem hereof is intended for access by client subsystems not having bar code symbol readers (e.g. Web-enabled computer systems at home, in the office or on the road), then the HTML documents related to the IPI Website will be particularly adapted to facilitate the use of data-entry display screens at the client subsystem. This way, UPNs (e.g. UPC or EAN symbols) can be easily entered into the subsystem using bar code symbol scanners avoiding manual key-entry operations. In the illustrative embodiment, bar code-code driven and manual data-entry IPI Websites are served from a framed Java GUI, in which the control strip 20B has six (5) Check Boxes 21A through 21F described above to enable the consumer, retail sales/service personnel as well as manufacturers to select the particular mode of operation that suits his or her consumer product information needs at any particular instance in time.

It understood that the use of Java Applets (including Servlets) will be most beneficial in constructing Java-based IPI Central and retail WWW sites, as indicated above, and in most instances will be preferable over static HTML documents and CGIs linking the IPD (http) server 11 to the back-end RBDMS servers 9 of the system. However, for purposes of illustration only, the six primary modes of operation of the system will be described below using a CGI implementation, illustrated in FIG. 2B2. However, it is understood that implementations using CPIR-enabling Servlets as shown in FIG. 2B1 can be used to replace such CGI constructions. Also, implementations using CPIR-enabling Applets as shown in FIGS. 2B3 and 2B4 can be used to enable access to the UPN/TM/PD/URL RDBMS 9 and its supporting RDBMS servers.

Manufacturer/Product Registration Mode of Operation

Figure 5A:
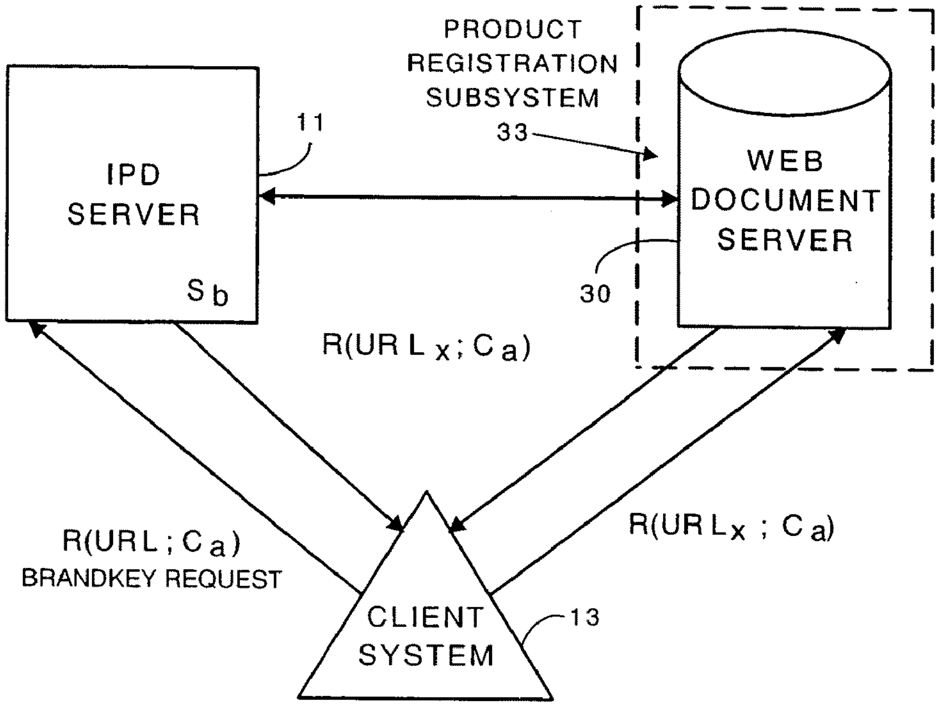
FIG. 5A is a schematic diagram illustrating the high level structure of communication protocol that can be used among the client subsystem $C_a$, the IPD Server $S_b$, and the Web-based Document Server $S_{WD}$ (30) of the IPI Finding And Serving Subsystem hereof when, from any particular client subsystem, the subsystem is engaged is in Manufacturer/Product Registration Mode of operation, requesting as input a URL which automatically connects the client subsystem to the Web Document Server associated with the Manufacturer/Product Registration Subsystem of the present invention.
Figure 6A:
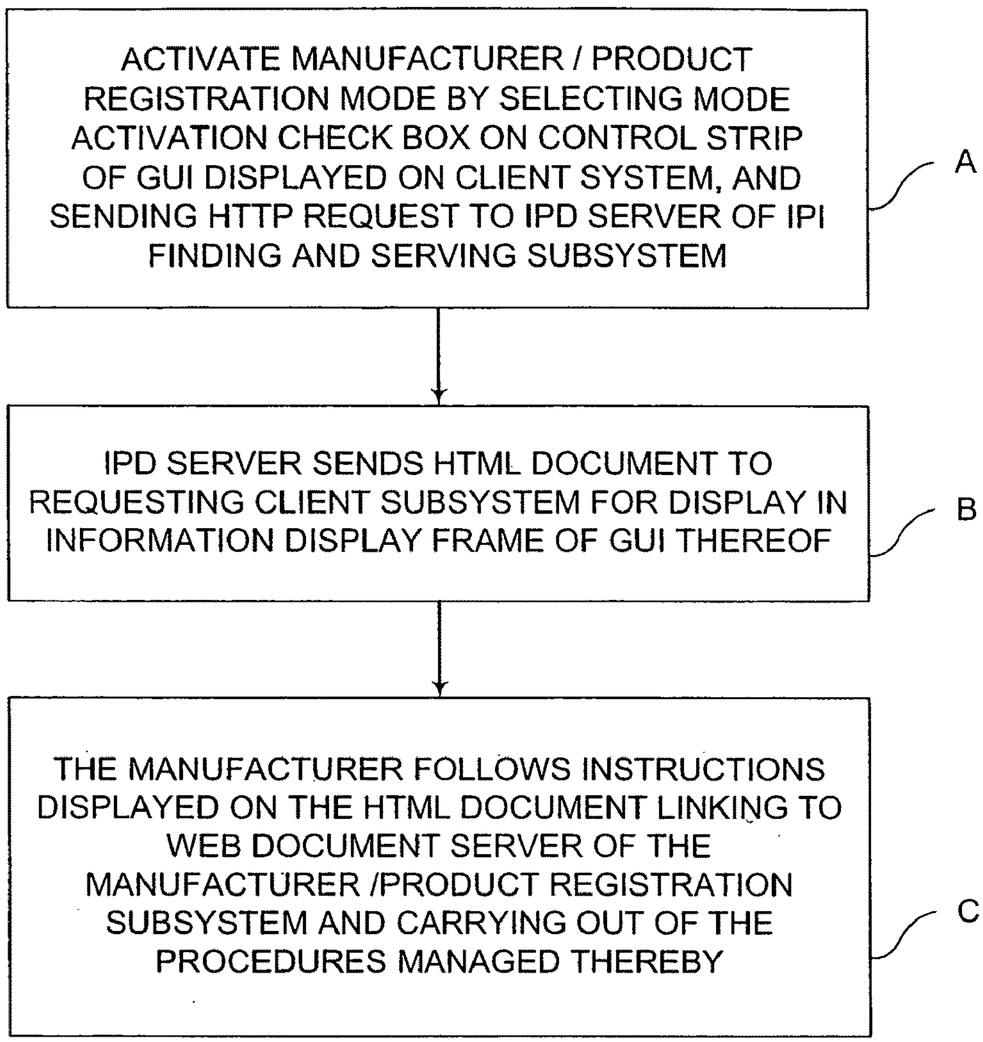
FIG. 6A provides a high level flow chart illustrating the steps involved in carrying out the communication protocol shown in FIG. 5A when the IPI Finding and Serving Subsystem is in its Manufacturer/Product Registration Mode of operation.

Referring to FIG. 5A, the high level structure is shown for a communication protocol that can be used among a client subsystem $C_a$, an IPD Server Sb, and an IPI Server Sc of the IPI finding and serving subsystem hereof when it is induced into the Manufacturer/Product Registration Mode of operation from the point of view of the depicted client subsystem. FIG. 6A provides a high level flow chart illustrating the steps involved in carrying out this communication protocol when the IPI Finding and Serving Subsystem is in its Manufacturer/Product Registration Mode of operation.

As indicated at Block A in FIG. 6A, when selected from the user interface of an IPI Website, the first Check Box type button 21A automatically activates the Manufacturer/Product Registration Mode of the IPI Finding and Serving Subsystem by sending an HTTP request to the IPD Server(s) 11 based on a URL hot-linked to the selected Check Box. As indicated at Block B in FIG. 6A, this causes a HTML-encoded document residing on the IPD Server 11 shown in FIG. 2B2, to requesting client subsystem 13 or display on the information display frame 20C thereof. The HTML document of the illustrative embodiment displays several types of information relevant to the Manufacturer/Product Registration Mode, namely: eligibility requirements (i.e. qualifications) for a manufacturer to register with the IPI Finding and Serving Subsystem; optional ways of registering consumer products and product-related information with the Manufacturer/Product Registration Subsystem hereof 33; ways of acquiring computer software necessary for managing consumer product-related information (e.g. UPNs, URLs, trademarks and product descriptors) on a particular computing platform using EDI (or XML/EDI) techniques supported by the Manufacturer/Product Registration Subsystem 33; etc; and one or more Check Boxes embodying links (i.e. anchors) to HTML documents, CGI scripts and the like designed to facilitate this mode of operation. Notably, at least one of these HTML documents will be located on the Web Document Server 30 of the Manufacturer/Product Registration Subsystem 33, providing manufacturers (and/or their designated information-managers and agents) with a point of entry into the manufacturer/product registration process hereof. As indicated at Block C in FIG. 6A, the manufacturer and or its agent follow the instructions displayed on the HTML document, linking to the Web Document Server 30 of the Manufacturer/Product Registration Subsystem 33 and filling out the various HTML forms transmitted to the requesting client subsystem, downloading Web-based EDI (or XML/EDI) software for UPN/TM/PD/URL management; and the like. While carrying out registration of manufacturers with the subsystem is relatively straightforward, there are a number of different ways of carrying out the Product Registration Mode of the subsystem. These alternative techniques will be described below.

The first method illustrated in FIGS. 2-1 and 2-2 involves by carrying out FTP between a client subsystem of the registering manufacturer (or its agent) Mi and IPD Server 11 in order to update the IPI Registrant Database associated therewith. This can be carried out by the manufacturer s officer or agent surfing to the IPI Website, selecting the Product Registration Mode from the control strip, and then following the instructions displayed on the various screens of the Website in this mode. When using the first method, product UPCs, URLs and other information elements can be formatted within suitable Product Registration Forms and transmitted by FTP from the client subsystem or Database Server of a registering manufacturer to the IPD Server 11 so that the IPI Registrant Database thereof maintained within the RDBMS 9 can be updated accordingly. The first method will be desirable typically when registering a few consumer-products.

The second method illustrated in FIG. 2A, involves first carrying out EDI between a client subsystem of the registering manufacturer (or its agent) and the UPN/TM/PD/URL RDBMS 9, and then carrying out FTP or SMTP between the client subsystem and IPD Server 11 in order to update the IPI Registrant Database maintained therein. The second method will be desirable when a manufacturer needs or desires to register a large number of consumer-products. The details of these information transmission methods will be described below.

When using the second method, conventional EDI protocols or more modern protocols (e.g. XML/ICE) can be used to transmit product UPCs, URLs and other information elements from client subsystems or database servers of manufactures to the UPN/TM/PD/URL Database Subsystem 9 of the present invention. FTP can be used to transmit UPCs and URLs from the UPN/TM/PD/URL RDBMS 9 to each IPD Server in the system so that the IPI Registrant Database thereof can be updated accordingly. Once registered with the system using either of these methods in the Product Registration Mode, such consumer-products can be easily found on the Internet by anyone wishing to use the product finding techniques of the present invention.

The third method involves by carrying out electronic data and document interchange over the Internet between the WebDox Remote "Computer System 13 and the WebDox" Server 30 of the system of the present invention, and communication between the WebDox" Server 30 and the WebDox" Admin computer system 31 of the system hereof. The various steps involved in this embodiment of the consumer product registration process will be described in detail below.

When the manufacturer selects the Product Registration Mode of the system, a Manufacturer Registration Form is automatically downloaded from the WebDox" Server 30 to the Manufacturer s client computer system 13 (i.e. the WebDox Remote" Computer System). At the end of the downloading process, a Manufacturer Registration Form is presented (i.e. displayed) and the manufacturer then enters some requested identification information (e.g. Manufacturer s Company Name, Address, Name of CEO and President, phone number, 6-digit Manufacturer Identification Number assigned by the UCC, etc.) and presses the Send button on the Manufacturer Registration Form. The form is then transmitted immediately via the Internet and received by the WebDox" Server 30. At the WebDox" Server 30, an automated process takes the information in the Manufacturer Registration Form and registers the Manufacturer with the system.

Upon registering the manufacturer with the system, the manufacturer is asked to select which version of customized WebDox Remote "software (i.e. the UPN/TM/PD/URL Registration Application) the manufacturer would like downloaded to its client computer system 13 (e.g. WebDox Remote with UPN/TM/PD/URL Database and CGI scripts for MacOS Web Server, WebDox Remote with UPN/TM/PD/URL Database and CGI scripts for UNIX Web Server, or WebDox Remote with UPN/TM/PD/URL Database and CGI scripts for NT Web Server). Once the manufacturer makes its selection, the customized WebDox Remote software is automatically downloaded to the manufacturer s client computer system 13. This downloaded software includes a computer program that automatically generates (on the manufacturer s) client subsystem, a relational RDBMS (RDBMS) which allows the manufacturer (or its agents) to easily construct and maintain a UPN/TM/PD/URL database (akin to that specified in FIG. 4A1) but restricted to containing information relating only to the manufacturer s products. Thus when the manufacturer attempts to enter a UPC number into the manufacturer s UPN/TM/PD/URL database that does not contain the 6-digit Manufacturer Identification Number assigned to the manufacturer by the UCC, the RDBMS automatically blocks all such information entries. Consequently, the UPN/TM/PD/URL database can only maintain information pertaining to the registered manufacturer s products and information relating thereto on the Internet. As the manufacturer adds or removes products from its retail or wholesale line, the database administrator simply adds or removes the UPC and URL information relating thereto from the RDBMS. As will be described in greater detail hereinafter, such database changes are periodically transmitted to the WebDox" Server 30 so that the IPI Registrant Database (i.e. master UPN/TM/PD/URL database) of the system can be updated in a timely manner.

Preferably, the limited or restricted version of the UPN/TM/PD/URL database maintained by each registered manufacturer on its client subsystem 13 is connected to the manufacturer s Internet Server 12 (or 12B) by a CGI script or Java method, as shown in FIGS. 2-1 and 2-2. In this way, the manufacturer s limited version of the UPN/TM/PD/URL database can be made accessible to consumers world-wide from the manufacturer s Website which, in the illustrative embodiment, is assumed to be hosted on an Internet information server 12 or 12B that is similar to an IPI Server 12 described in detail hereinabove. In order to simply the process of serving of the manufacturer s limited-version of the UPN/TM/PD/URL database on the WWW, it is preferred that the CGI script 40, input forms, output forms, and methods for searching and the displaying the results from the limited-version UPN/TM/PD/URL database are predesigned for use with manufacturer s Internet Server 12 (taking into consideration its operating system and the like). This way, prior to registration the manufacturer need only make a selection of the type of customized WebDox Remote software it needs for its computing and Internet serving platform(s). Then, during software download, the WebDox Server 30 simply transmits the suitable version of the customized WebDox Remote software to the manufacturer so that it can create, maintain and serve (on the WWW) its limited version of the UPN/TM/PD/URL database in a turn-key manner.

In the illustrative embodiment of the present invention, the homepage of each registered manufacturer s Website will display a visually conspicuous radio button labeled, for example, BRANDKEY REQUEST" Product Finder or the like. Moreover, whenever a consumer attempts to search the manufacturer s limited-version UPN/TM/PD/URL database for products not registerable to the manufacturer (i.e. using UPC numbers not containing the manufacturer s 6-digit UCC Manufacturer Identification Number), the limited-version of the UPN/TM/PD/URL database will automatically display an HTML-encoded message from the manufacturer s Website, urging the consumer to surf to the IPI Registrant Database of the system (maintained on the network of IPD servers 11). Preferably, such HTML-encoded messages will have a hot-linked URL (i.e. anchor) to Website(s) providing consumer access to the master UPN/TM/PD/URL database.

The WebDox Remote "computer system 13 available to each registered manufacturer has both online and offline modes of operation. In the offline mode, the manufacturer responds to a UPN/TM/PD/URL Registration Request from the WebDox" Server in the following manner. First, the WebDox Remote "software analyzes the limited-version of the UPN/TM/PD/URL database that it has been currently created and maintained by the manufacturer or its designee. Thereafter, the WebDox software automatically creates a UPN/TM/PD/URL Registration Response document which contains a set of currently active URLs specifying the address location of Web-based information resources associated with each UPC-encoded product of the manufacturer. Then, WebDox Remote" program establishes an Internet connection with the WebDox" Server, through a Get/Send Mail option. This delivers the UPN/TM/PD/URL Registration Response (document) to the WebDox" Server 30 and retrieves any documents which are waiting thereat for the manufacturer. These new documents are listed by WebDox Remote "program and presented in the InBasket of the manufacturer s WebDox Remote" computer system 13.

In the online mode, WebDox Remote "(under the control of the Form Application) can also send UPN/TM/PD/URL Registration Request documents immediately. For very sensitive applications (i.e. Just-in-Time), this ensures that the UPN/TM/PD/URL Registration Response document is received at the WebDox" Server 30 the moment that the manufacturer completes the document.

In general, the WebDox" Server 30 provides a high-volume document processing and mail boxing environment between the WebDox Server and the WebDox Remote" system of each registered manufacturer. WebDox" Server 30 performs: permanent storage and tracking of all UPN/TM/PD/URL Registration Request documents sent and UPN/TM/PD/URL Registration Response documents received; automatic reconciliation of acknowledgments from WebDox Remote" program; automatic creation of user-friendly receipt messages to the manufacturer; mailboxing of outbound UPN/TM/PD/URL Registration documents for retrieval by manufacturer; and automatic manufacturer and profile creation based on forms received from manufacturers. The WebDox" Server 30 consists of online components that run as extensions to Microsoft s Internet Information Server (IIS) using the ISAPI interface. This provides higher performance and lower hardware requirements than a conventional CGI Web Interface. Processing intensive tasks are performed asynchronously from the Web server. An integrated queuing and dispatching system manages the processing of documents and interaction with the corresponding application. For large volume situations, the WebDox" Server components can be deployed on different machines, the WebDox" Server components (ISAPI extensions) on one machine, the processing components and database on another machine.

Data for UPN/TM/PD/URL Registration Request documents to be sent to manufacturers is extracted from the IPI Registrant Database using an interface or utility program. The document data (e.g. information fields associated with UPN/TM/PD/URL registration) can then be accepted by WebDox in a direct manner after formatting. The UPN/TM/PD/URL Registration Request document should be formatted to a file structure created during the design of the UPN/TM/PD/URL Registration Application. The WebDox" Server 30 then converts the application data into a UPN/TM/PD/URL Registration request document (i.e. data package). The data package for each manufacturer is then stored (as a message) in an assigned Mailbox of the WebDox" Server 30. These messages are then available to be retrieved by the registered manufacturers using WebDox Remote s" Get/Send Mail feature.

As discussed above, the WebDox Remote "program transmit s messages (e.g. UPN/TM/PD/URL Registration Response documents) to the WebDox" Server 30, where, after passing security checks, they are placed in the WebDox Mailbox system. Incoming (document) messages are received from the Mailbox, processed, and converted into data files for direct transfer to the RDBMS handling the IPI Registrant Database.

For each document received, the WebDox" Server 30 will return a message to the manufacturer confirming receipt of the document. WebDox Remote" system also returns delivery confirmations to the WebDox Server. These messages are used by the WebDox "Server to track the status of messages. WebDox" Server 30 maintains Mailbox Files for all inbound and outbound messages. The status of messages is updated on an ongoing basis as acknowledgement messages are received, allowing timely and precise audits.

WebDox Admin "Computer system 31 provides an easy-to-use tool to manage the community of manufacturers, review the status of documents, and configure the WebDox" Server 30, including: ad hoc maintenance of manufacturer information; online display of the Mailbox permitting inquiry into document status or document activity for particular manufacturers, and the ability to reset document status; creation and maintenance of UPN/TM/PD/URL Registration Profiles; preparation of releases of new and update UPN/TM/PD/URL Registration Applications; Distribution of new and updated UPN/TM/PD/URL Registration Applications; and automatic inventory and tracking of UPN/TM/PD/URL Registration Applications distributed to manufacturers.

In the preferred embodiment, UPN/TM/PD/URL Registration Application design and development is carried out on a Windows 95 or NT workstation. The UPN/TM/PD/URL Registration Application is developed, tested, and then fully implemented for production with manufacturers. New or updated UPN/TM/PD/URL Registration Applications are registered with the WebDox Admin "computer system 31 and are then distributed to the manufacturers as described herein above.

In the preferred embodiment, UPN/TM/PD/URL Registration Applications are developed using Microsoft Visual Basic" and related software tools. These products provide rapid design and creation of the screen-based forms that the manufacturer uses. In addition, the intelligence behind the form, in the UPN/TM/PD/URL Registration Application, can be very powerful, making the manufacturer s work easier while ensuring that the user and Server application receive high quality data.

The WebDox Admin" system handles the distribution of UPN/TM/PD/URL Registration Applications to manufacturers. New UPN/TM/PD/URL Registration Applications can be sent to some or all of the existing manufacturers assigned UPC Manufacturer Identification Numbers. Updates to UPN/TM/PD/URL Registration Applications can be sent to manufacturers who are currently using that UPN/TM/PD/URL Application. The actual update is distributed by sending a small notification message to each manufacturer, which then results in the remote site downloading the new forms from the WebDox" Server 30, as hereinbefore described above.

Notably, the WebDox™ Solution has been described above provides one way and means of implementing a method of electronic data and document interchange between client machines of manufacturers and the IPI Registrant Database (i.e. master UPN/TM/PD/URL database in RDBMS 9) of the system of the present invention. It is understood, however, that many different types of electronic data interchange solutions (e.g. XML or XML/EDI) can be used to practice the system and method of UPN/TM/PD/URL database management in an efficient and timely manner so that consumers will always be provided with up-to-date URL links on the Internet. For example, the new CenterStage 4 Application Suite from On Display, Inc. of San Ramon, Calif., can be used to enable XML-based electronic data interchange (i.e. transfer) between the client computer subsystems 13 operated within the back offices of manufacturers, and the IPI Registrant Database (i.e. master UPN/TM/PD/URL database) of the system hereof operated in the back office of the system administrator. Manufacturers (i.e. vendors) can format their data transactions in any of the many new languages of electronic-business (e.g. cXML, RosettaNet, CBL, BizTalk, OBI, ICE proprietary formats, or standard EDI formats such as ANSI X12), and the CenterStage 4 platform will automatically convert their transactions into the chosen formats of the system administrator responsible for managing the master UPN/TM/PD/URL database.

For further details on the use of electronic data interchange technologies in order to realize this functionality of the system of the present invention, reference can be made to the Following technical publications: XML/EDI: Cyber Assisted Business in Practice (1999) by Dick Raman (ISBN: 90-8050233-2-1); The A to Z of EDI and Its Role in E-Commerce Second Edition, 1998) by Nahid Jilovec, published by Duke Communications, Inc., Loveland, Colo.; Electronic Commerce With EDI: A Guide For Decision Makers (1998), by Robert L. Sullivan, published by Twain, Inc. North Andover, Mass.; and Wild s WWW: Technical Foundations of the World Wide Web (1999) by Erik Wilde, published by Springer-Verlag, Berlin, Heidelberg; each said publication incorporated herein by reference as of set forth herein.

In FIG. 2A, there is shown an alternative way of collecting and managing consumer product information along the consumer-product supply and demand chain. While the method of consumer product information collection and management shown in FIG. 2A is similar in many ways to the method shown in FIG. 2A, there are several important differences. For example, in the method of FIG. 2A, the manufacturer or its agent is still responsible for symbolically linking consumer product information resources to the UPN of its associated product, but there is no need for such information resources to be published on the WWW at the time of linking; all that is required is that the information resource file (IRF) associated with the product be symbolically linked or indexed to its UPN, and then for such linked information to be transported to the UPN/TM/PD/URL RDBMS 9A, realized as a data warehouse (i.e. RDBMS) supported upon a massively-parallel computing platform. Thereafter, each IRF in the data warehouse can be linked a URL specifying the location of the IRF within the data warehouse, and all URLs associated with a particular product can be linked to its UPN. The IRFs can be classified by information type, as well, to facilitate searching by the consumer. According to this method, when a consumer enters the UPN of a particular product into http server of the UPN/TM/PD/URL RDBMS 9A, the http server associated therewith responds by serving (to the consumer) the list or menu of URLs symbolically linked to the UPN, for selection by the consumer.

In FIG. 2C, there is disclosed a novel distributed method of collecting, managing and transmitting UPN/TM/PD/URL menus for consumer products. Notably, this distributed system and method will be useful in large corporate environments, where departmentalization is the general rule. As shown, instead of each manufacturer having a single EDI-enabled workstation (equipped with EDI or EDI/XML software) 13 for carrying out UPN/TM/PD/URL management operations, a group of EDI-enabled client computers 13 are connected to a local or wide area network 200 via a network-centric Web (http) server 133 using a network router 201 to interface with the infrastructure of the Internet, as well as the other local or wide area network 200 as shown in FIG. 2C. Preferably, each client computer 13 on the LAN or WAN is equipped with UPN/TM/PD/URL management software for managing the consumer product information collected in the UPN/TM/PD/URL RDBMS 9 for a particular manufacturer, as shown in FIGS. 4A1 through 4B.

In one arrangement, each manufacturer-operated client machine 13 would be assigned the task of managing the UPN/TM/PD/URLs associated with a particular department of the manufacturer (e.g. engineering department, sales department, service/support department, marketing department, advertising department, etc.). The UPN/TM/PD/URLs menus and other CPI related information collected by each department is maintained within a local UPN/TM/PD/URL RDBMS 202 on the department s client machine 13, and is periodically transmitted to a Manufacturer s UPN/TM/PD/URL RDBMS 203 hosted on the network Internet server 133 In addition to providing the client machine behind the corporate firewall with http, e-mail and ftp services, the network Internet server 133 is also equipped with an EDI (e.g. EDI or XML/ICE) software solution which enables periodic uploading of the manufacturer s UPN/TM/PD/URL RDBMS 203 to the Central UPN/TM/PD/URL RDBMS 9, shown in FIG. 2C Another arrangement, each manufacturer-operated client machine 13 would be assigned the task of managing the UPN/TM/PD/URLs associated with a particular department of the manufacturer (e.g. engineering department, sales department, service/support department, marketing department, advertising department, etc.). The UPN/TM/PD/URLs menus and other CPI related information collected by each department is maintained within a local UPN/TM/PD/URL RDBMS 202 on the department s client machine 13, and is periodically transmitted directly to the Central UPN/TM/PD/URL RDBMS 9, shown in FIG. 2C. In such an alternative embodiment of the present invention, the network Internet server 133 would provide each client machine behind the corporate firewall with http, e-mail and ftp services in a conventional manner, but not maintains a central manufacturer s UPN/TM/PD/URL database 202.

The primary advantage of the above described techniques for distributed UPN/TM/PD/URL management hereof is that such techniques provide manufacturers with a revolutionary way of and means for enlisting the different departments within the organization, having different business perspectives, goal and resources, to create up-to-date links between UPN s on their consumer products and the diverse types of consumer related information resources published on the Internet, all in concerted effort to achieve the sales, marketing and support programs of the company in a unified manner. Using the system and method of the present invention, symbolic links between the manufacturer products and published information resources on the Internet (e.g. WWW) can be impressed upon the minds of consumers as they seek access to such current information at home, in the office, in physical and electronic stores, as well as on the road.

Preferably, each manufacturer-operated client machine 13 on the LAN (or WAN) of FIG. 2C will be equipped with OS program software, Web-browser program software and RDBMS program software configured so that an UPN/TM/PD/URL manager (e.g. assigned to a particular department within the company) can easily link (i) URLs associated with consumer product related information on the WWW, to (ii) the UPN of a particular product registered with the IPI finding subsystem 2 of the present invention. As shown in FIG. 2C1, this can be achieved by providing a UPN/TM/PD/URL data linking function between a GUI-based window associated with a Web-document editing/browser application (e.g. Microsoft Explorer browser program) and a GUI-based window associated with a UPN/TM/PD/URL data link management program (e.g., Microsoft Access or SQL RDBMS program), running either on each manufacturer-operated client machine, or on a manufacturer-operated server connected to the manufacturer's LAN or WAN, whereto Internet connectivity is enabled in a manner known in the art. As will be described below, this UPN/TM/PD/URL data linking function can be realized in a number of different ways.

One way of realizing this UPN/TM/PD/URL linking function is to create and install a plug-in module within the Web browser program with which consumer product information can be viewed on the WWW. The function of the plug-in module would be to write the URL of the currently viewed Web document (viewed by the browser program) into the currently selected URL field within the UPN/TM/PD/URL data link management program. Using this method, the UPN/TM/PD/URL manager would perform the following procedure: first open the UPN/TM/PD/URL data link management program; select the URL field to be filled (i.e. written into); open the browser program; browse onto a Web document containing consumer product information related to the selected UPN information field; and then select the UPN/TM/PD/URL link button on the browser's control panel enabled by virtue of the plug-in module of the present invention.

Another way of realizing this UPN/TM/PD/URL linking function is to use a multi-tasking/multi-threading operation system (OS), such as UNIX or some version thereof, into which support has been designed to simultaneously run the Web browser program and the UPN/TM/PD/URL data link management program, as shown in FIG. 2C1. Using this method, the UPN/TM/PD/URL data linking program would include URL importing functionalities of the plug-in module designed above so that when a desired Web document is being browsed by the Web browser program, the URL of the currently displayed Web document will be automatically written into the currently selected URL information field in the UPN/TM/PD/URL data link management program upon selecting, for example, a "URL Import" button provided for on the GUI of the UPN/TM/PD/URL data link management program.

Another way of realizing this UPN/TM/PD/URL linking function is to provide the enterprise of each manufacturer with a consumer product information catalog subsystem (RDBMS) 450 (shown in FIG. 2C) for storing and managing media-rich consumer product information content relating to each and every UPN-indexed product that the manufacturer makes, sells and/or distributes to retailers along the retail supply and demand chain. As shown in FIG. 2C, such a consumer product information management database subsystem 450 can be realized as a standalone database application supported on one or more client machines operably connected to the LAN or WAN of the manufacturer's enterprise, and or as a network database information server connected to the LAN or WAN and being accessible to various consumer product information managers working within the manufacturer's enterprise, and using Web-enabled client machines (e.g. 13, 202) to carry out consumer product information content management operations across the enterprise, most likely under the supervision of one or more consumer product brand-managers, responsible for branding of such consumer products. The consumer product information management database subsystem 450 can be constructed using commercially-available catalog software such as, for example, Lexmedia Catalog Pro™ (Regular, Sales Force or Distributor Edition) catalog software, Lexmedia Catalog Pro Express™ catalog software, and/or Lexmedia Catalog Showcase™ catalog software, from Lexmedia Corporation, of Fairfield, Conn., (http://www/lexmedia.com/catalog-software.asp), suitably modified using database structures and data linking techniques of the present invention disclosed herein, and database programming techniques and electronic data interchange (EDI) or communication techniques well known in database construction and data communication arts. The consumer product information management database subsystem (RDBMS) 450 will permit storage of all major information file formats including multimedia files such as MPEG, AVI, MP3, JPEG, GIF, Web Pages (HTML), CAD Drawings, PDF files, and the like.

Also, in accordance with the principles of the present invention, the consumer product information management subsystem 450 will also include one or more computer programs (e.g. scripts) for (i) analyzing the information fields of the RDBMS 450, (ii) automatically generate a set of UPN/TM/PD/URL data links for each UPN-indexed product with the RDBMS, (iii) locally store each such set of UPN/TM/PD/URL/Trademark/Product-Descriptor data links within the RDBMS 450, and (iv) ultimately electronic data transport each such set of data links to the UPN/TM/PD/URL Database Management Subsystem 9, shown in FIG. 2A, during periodic database updating operations, described in greater detail hereinafter.

Notably, the structure of the consumer product information management database 450 of the present invention can be similar to the database structure shown in FIGS. 4A1 through 4D, with the exception that the actual (multi-media) files of the consumer product information related to each UPN of the manufacturer will be stored within the RDBMS 450, rather than just the URLs of such information files stored on the Internet, as described in the other illustrative embodiments of the present invention disclosed herein in greater technical detail.

One advantage of using the consumer product information management subsystem (RDBMS) 450 described above is that the brand managers are provided with useful tools for managing various types of consumer product information published by the manufacturer, its agents (e.g. advertising agents) or other third parties publishing consumer product related information on the Internet. Another advantage is that, by using such consumer product information tools within the manufacturer's enterprise, the manufacturer (i.e. brand manager) is given the choice of either storing the URLs of consumer product related information, and also the actual information file content thereof if such multi-media information content is within the control of the manufacturer's operations, or copyable into the RDBMS 450 under its supervision control.

In view of the present disclosure described above, many modifications to the consumer product information management (and data-link generation) subsystem 450 of the present invention will occur to those with ordinary skill in the art.

While the three methods have been described above for realizing the UPN/TM/PD/URL data linking functionalities provided for on manufacturer-operated clients (and servers) of the present invention, it is understood that there will be alternative ways of realizing such functionalities within the scope and spirit of the present invention.

As shown in FIG. 2C2, it is possible to realize the Manufacturer s EDI-enabled UPN/TM/PD/URL Database 203 shown in FIG. 2C1 as an integral part of a conventional manufacturer's EDI-enabled UPC-indexed Product Sales Catalog (e.g. UPC+5.0 management software by Barcode World, Inc. or UPC Manager software by Intercoastal Data Corporation) 460 deployed within a manufacturer's enterprise. The purpose of the EDI-enabled UPC-indexed Product Sales Catalog software 460, typically run on an internetworked computing platform, is to support conventional UPC management functions required by EDI-enabled business-to-business (B2B) processes carried out between the manufacturer and its various retail trading partners through a conventional EDI-enabled B-2-B trading network (e.g. the QRS Network by QRS, Inc., or the GEIS Network by General Electric Information Services, Inc.). In most larger manufacturer enterprises, the personnel assigned the responsibility of carrying out UPN/TM/PD/URL data linking operations in accordance with the present invention will most likely not be the same the personnel assigned the responsibility of maintaining conventional EDI-enabled UPC-index product sales catalogs (e.g. UPC+5.0 management software by Barcode World, Inc. or UPC Manager software by Intercoastal Data Corporation). Rather, UPN/TM/PD/URL data linking operations will most likely be carried out under the supervision of the manufacturer's brand, product and/or agency promotion managers, and not conventional UPC managers responsible for managing the manufacturer's EDI-enabled UPC-indexed Product Sales Catalog 460 using, for example, UPC+5.0 management software by Barcode World, Inc. or UPC Manager software by Intercoastal Data Corporation, which is designed specifically for carrying out very limited functions. Also, graphical user interface (GUI) design requirements for conventional UPC product catalog management operations are also markedly different from the GUI requirements for the novel UPN/TM/PD/URL management operations associated with the present invention. Furthermore, the conventional forces of established concerns in the field oft UPC management may initially provide opposition to the practice of the UPN/TM/PD/URL data link management operations taught herein, for various reasons.

In order to accommodate such concerns described above, an alternative subnetwork arrangement is disclosed in FIG. 2C2, wherein the manufacturer's EDI-enabled UPN/TM/PD/URL RDBMS of the present invention 203 and/or the consumer product information catalog database management subsystem of the present invention 450 are shown configured between (i) a plurality of Web-enabled client machines 13 operated within the manufacturer s enterprise by various departments as shown in FIG. 2C, and (ii) a conventional manufacturer's EDI-enabled UPC-indexed Product Sales Catalog (e.g. UPC+5.0 management software by Barcode World, Inc. or UPC Manager software by Intercoastal Data Corporation) 460 running on a (possibly remotely-situated) computing platform deployed within a manufacturer's enterprise. The function of the manufacturer's EDI-enabled UPC-indexed Product Sales Catalog 460, as discussed above, is to enable (1) the local maintenance of the manufacturer's UPC-indexed Product catalog (containing product descriptors, price terms, shipping terms, trading conditions, etc.) and (2) uploading the catalog to one or more centralized UPC Product Sales Catalogs (e.g. the Keystone™ UPC Product Sales Catalog by QRS, Inc. and/or the UPC Express™ UPC Product Sales Catalog by GEIS) using, for example, EDI techniques employing the 832 Transaction Set (i.e. Price Sales Catalog) over VAN or TCP/IP networks interconnected with conventional EDI-enabled B-2-B trading networks (e.g. the QRS Network by QRS, Inc., or the GEIS Network by General Electric Information Services, Inc.), well known in the art. In accordance with convention, such centralized UPC Product Sales Catalogs enable retail-trading parties (e.g. retail purchasing agents) to shop from such product sales catalogs and purchase such products at wholesale prices by way EDI-enabled business-to-business (B2B) transaction sets.

In this novel subnetwork arrangement within the manufacturer's enterprise, shown in FIG. 2C2, the manufacturer's EDI-enabled UPN/TM/PD/URL RDBMS 203 and/or the consumer product information catalog database management subsystem 450 are initialized by importing UPC numbers, trademarks and product-descriptors from the manufacturer's locally-maintained UPC-indexed product sales catalog 460 deployed within the manufacturer's enterprise. According to the aspect of the present invention shown in FIG. 2C2, the conventional UPC-indexed product sales catalog 460 would function as the "master" UPC catalog source within the manufacturer's enterprise, while the manufacturer's EDI-enabled UPN/TM/PD/URL RDBMS 203 and the consumer product information catalog database management subsystem 450 would function as "slave" UPC catalog sources within the enterprise, data-synchronized to the master UPC catalog source 460.

In accordance with this method of the present invention, the manufacturer's EDI-enabled UPN/TM/PD/URL RDBMS 203 (as well as the consumer product information catalog database management subsystem 450) are programmed to automatically (i) access the conventional UPC-Indexed product sales catalog 460 on periodic (e.g. daily) basis and (ii) import up-to-date (i.e. current) UPC numbers, trademarks and product-descriptors that are being used by the manufacturer within its UPC product sales catalog 460 for enabling B-2-B e-commerce transactions with its retail trading partners. Such data-synchronization operations can be carried in a fully automatic programmed manner over the Internet or particular VAN, regardless of where the manufacturer's EDI-enabled UPN/TM/PD/URL 203 and UPC-indexed product sales catalog 460 resides on the network. Using these imported UPC numbers, trademarks and product-descriptors, through the above-described database-initialization and data-synchronization techniques of the present invention, the manufacturer's brand managers, product managers, advertising agents and support personnel can manage UPN/TM/PD/URL data links within the manufacturer's EDI-enabled UPN/TM/PD/URL RDBMS 203 and transport the same to the central UPN/TM/PD/URL RDBMS 9 shown in FIG. 2C, in cooperation with pre-existing EDI-based B-2-B e-commerce support operations. Alternatively, using a less preferred method, manufacturer's brand managers, product managers, advertising agents and support personnel can manage UPN/trademark-indexed CPI data files within the manufacturer's consumer product information catalog database management subsystem 450 and transport the same to central UPN-indexed Data warehouse 470 shown in FIG. 2C, in accordance the principles of the present invention.

By virtue of the above-described database-initialization and synchronization techniques illustrated in FIG. 2C2, the business-to-consumer (B-2-C) consumer product information management and distribution system of the present invention can be used in cooperation with conventional EDI-enabled B-2-B e-commerce transaction networks supported by conventional UPC Product Sales Price Catalogs (e.g. the Keystone™ UPC Product Sales Catalog by QRS, Inc. and the UPC Express™ UPC Product Sales Catalog by GEIS), enabling brand managers, product managers, advertising agents and support personnel to practice the novel UPN/TM/PD/URL management techniques of the present invention without disrupting or compromising conventional UPC management operations traditionally performed by others within the manufacturer's enterprise in connection with enabling EDI-based B-2-B e-commerce transactions.

Manufacturer Website Search Mode of Operation

Figure 5B:
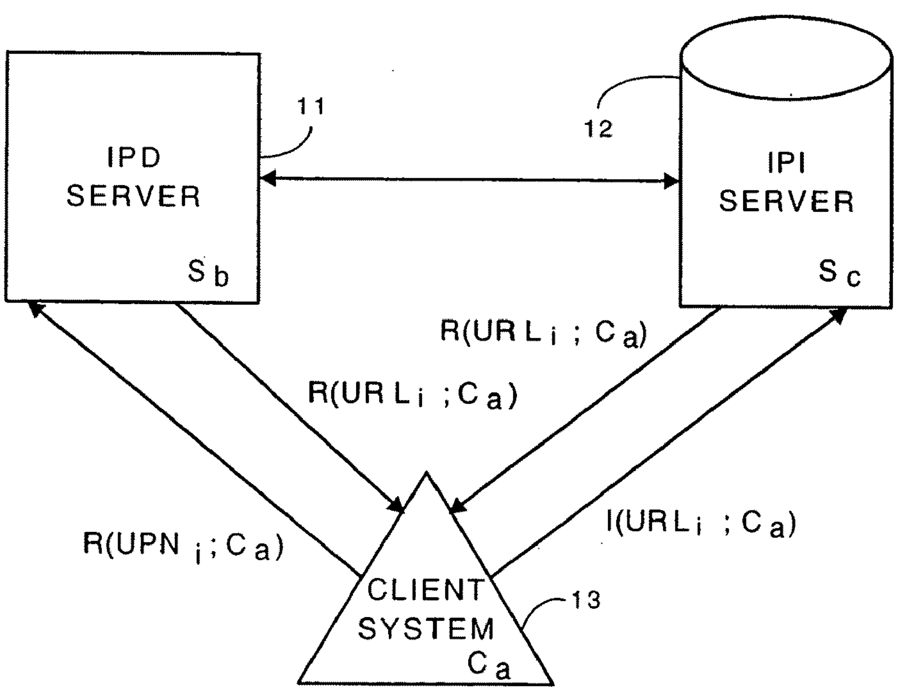
FIG. 5B is a schematic diagram illustrating the high level structure of a communication protocol that can be used among the client subsystem $C_a$, the IPD Server $S_b$, and the IPI Server $S_c$ of the IPI Finding and Serving Subsystem hereof when the subsystem is in its Manufacturer Website Search Mode of operation, requesting as input a UPN (e.g. UPC or EAN) associated with a manufacturer s product, and providing as output the URL of the home page of the manufacturer s Web-site and automatically displaying the same.
Figure 6B:
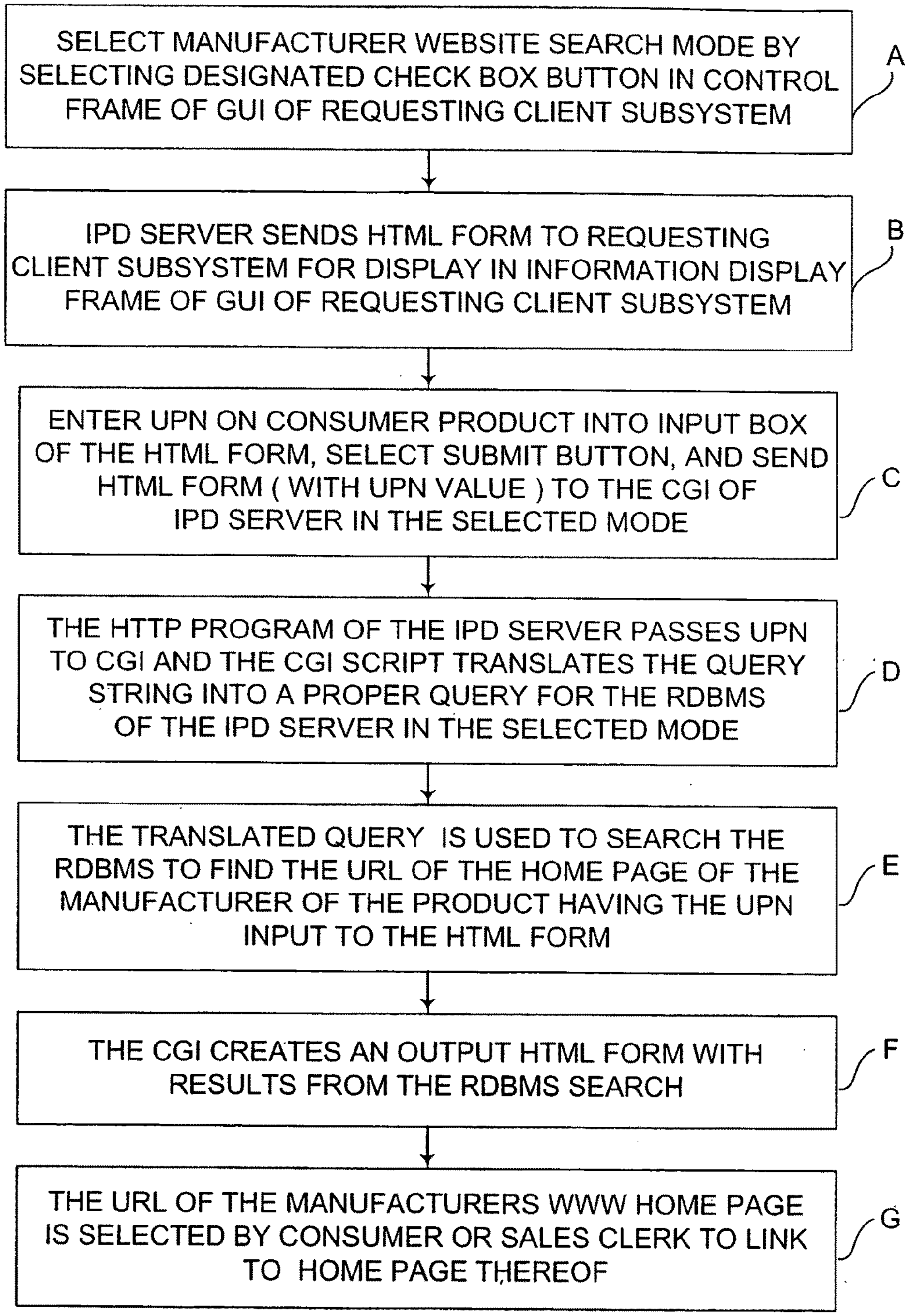
FIG. 6B provides a high level flow chart illustrating the steps involved in carrying out the communication protocol shown in FIG. 5B when the IPI Finding and Serving Subsystem is in its Manufacturer Website Search Mode of operation.

Referring to FIG. 5B, the high level structure is shown for a communication protocol that can be used among a client subsystem Ca, an IPD Server Sb, and an IPI Server Sc of the IPI finding and serving subsystem hereof when it is induced into the Manufacturer Website Search Mode of operation from the point of view of the depicted client subsystem. FIG. 6B provides a high level flow chart illustrating the steps involved in carrying out this communication protocol when the IPI Finding and Serving Subsystem 2 is in its Manufacturer Website Search Mode of operation.

As indicated at Block A in FIG. 6B, when selected from the user-interface of a bar-code driven IPI Website, the second Check Box type button 21B automatically activates the Manufacturer Website Search Mode of the IPI Finding and Serving Subsystem 2 by sending an HTTP request to the IPD Server(s) 11 based on a URL hot-linked to the selected Check Box.

As indicated at Block B in FIG. 6B, this causes a particular type of HTML-encoded document (i.e. called an HTML form or Web form document) residing on the IPD Server(s) 11 to be sent to the Web browser of the requesting client subsystem 13 and displayed on the information display frame 20C thereof (requesting this mode of service). As in the Manufacturer Website Search Mode described above, the HTML form sent in the Manufacturer Website Search Mode may also use any HTML format commands, such as headers, paragraphs, and lists, but must include three unique items, namely: the METHOD by which the user input is to be sent; the ACTION, which specifies a URL to which the user input is to be sent, presumably, the IPD Server 11 that will act upon the request appropriately; and a SUBMIT button, to send the completed form over the Internet via HTTP. In the illustrative embodiment, user input (i.e. a UPC or EAN number associated with a particular consumer product) is obtained by an Input Box, which allows the user (i.e. retail sales clerk or consumer) to type in or scan in a UPC or EAN number assigned to a consumer product on which product related information is sought.

As indicated at Block C in FIG. 6B, the consumer or retail clerk scans the bar coded consumer product, or enters the UPC or EAN number thereon into the Input Box of the HTML reform, and selects the SUBMIT button thereon. In response thereto, the Web browser on the client subsystem 13 sends a GET request to the IPD server 11B shown in FIG. 2B2. When selecting the SUBMIT button on the HTML form, the Web browser executes the METHOD associated with the HTML form and sends the stored UPC (or EAN) value to the URL specified by ACTION associated with the HTML form (i.e. the Web browser performs the action specified in the ACTION). The ACTION of the HTML form specifies the URL of the CGI script within the http server 11 that will process the request from the HTML form. This amounts to the Web browser constructing a GET request for that URL, with the arguments (the query string) being attached to the end of the URL. The arguments of the HTML form are specified by the INPUT items of the HTML form (i.e. the UPC or EAN number on the consumer product on which information is sought).

In general, the HTTP and HTML protocols provide three ways to pass the input (e.g. UPC or EAN number) from the users to CGI scripts on the IPD Server 11 (i.e. HTTP Server).

All three CGI scripts accomplish the same thing: they allow the Web browser to pass information to the IPD Server 11.

Figure 6C:
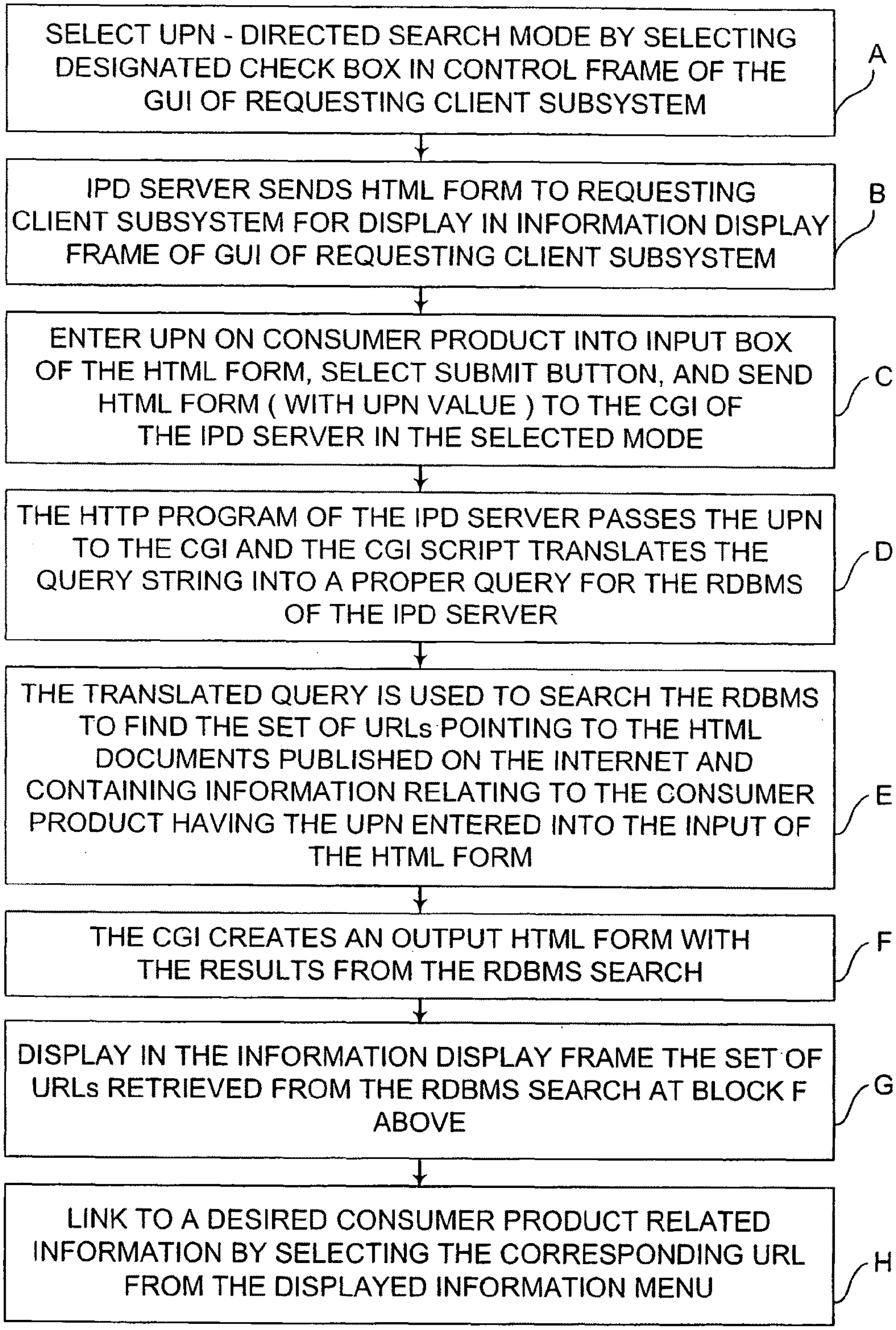
FIG. 6C provides a high level flow chart illustrating the steps involved in carrying out the communication protocol shown in FIG. 5D when the IPI Finding and Serving Subsystem is in its UPN-Directed Information Access Mode of operation.

As indicated at Block D in FIG. 6C, the HTTP (http) program on IPD server 11 passing the arguments (the UPC or EAN numbers in the query string) to the CGI script thereon and the CGI script translates the query string into a proper query for use in searching the RDBMS 9 shown in FIG. 2B2.

As indicated at Block E in FIG. 6C, the translated query is used to search the RDBMS 9 in order to find the set of URLs pointing to HTML documents (i.e. Web Pages) published on the Internet and containing information relating to the consumer product having the input UPC or EAN number. The result returned from the RDBMS 9 is an ASCII record specifying the set of URLs pointing to HTML documents published on the Internet and containing information relating to the consumer product having the input UPC or EAN number entered into the HTML reform. In order for the Web browser of the requesting client subsystem to display the results of the database search using the UPC or EAN input, the ASCII record must be converted into a HTML document (i.e. output HTML form). As indicated at Block F in FIG. 6B, the IPD Server 11 creates the elements of an output HTML form (Web output form), inserts the result from the RDBMS 11 into the output form, and sets the Content-type to be text/html. The CGI script may translate, filter, augment and reformat the result from the database search in any way so long as the result is an HTML document or some format that the Web browser of the client subsystem can display.

As indicated at Block G, the menu of URLs retrieved from the database search is displayed in the Web output form. At Block H, the consumer or retail sales clerk can link to a desired consumer product related information resource (HTML document) by selecting from the information menu, the URL anchored to the information resource in the displayed information menu.

UPN-Directed Information Access Mode of Operation

Figure 5C:
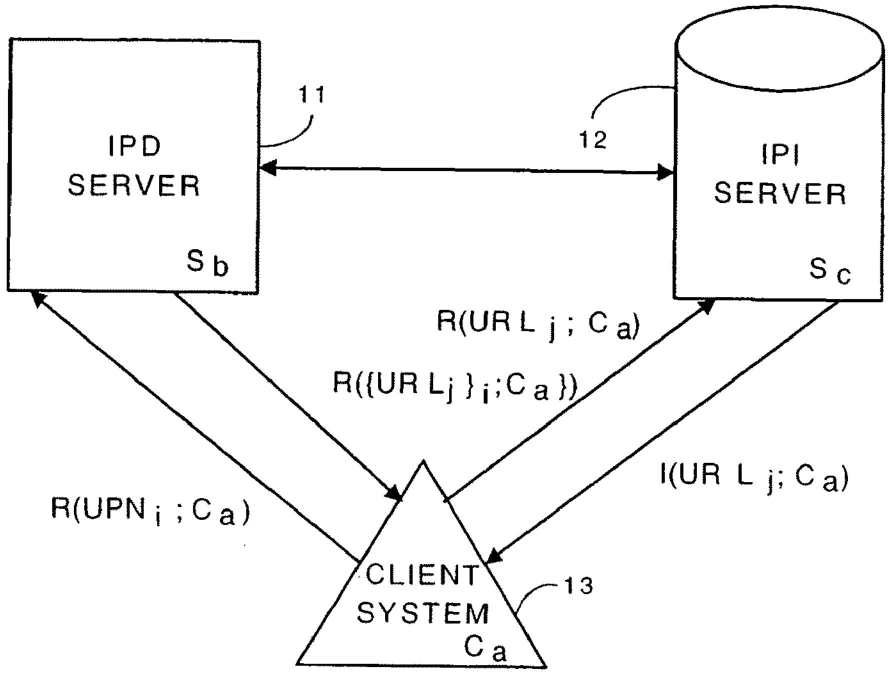
FIG. 5C is a schematic diagram illustrating the high level structure of a communication protocol that can be used among the client subsystem $C_a$, the IPD Server $S_b$, and the IPI Server $S_c$ of the IPI Finding And Serving Subsystem hereof when the subsystem is in its UPN-Directed Information Access Mode of operation, requesting as input a UPN associated with the consumer product, and providing as output the set of URL(s) registered with the consumer product identified by the UPN within the database of the system and pointing to HTML-encoded documents containing particular types of product-related information.

Referring to FIG. 5C, the high level structure is shown for a communication protocol that can be used among a client subsystem Ca, an IPD Server Sb, and an IPI Server Sc of the IPI finding and serving subsystem hereof when it is induced into the UPN-Directed Information Access Mode of operation from the point of view of the depicted client subsystem. FIG. 6C provides a high level flow chart illustrating the steps involved in carrying out this communication protocol when the IPI Finding and Serving Subsystem is in its UPN-Directed Information Access Mode of operation.

As indicated at Block A in FIG. 6C, when selected from the user-interface of an IPI Website, the third Check Box type button 21C automatically activates the UPN-Directed Information Access Mode of the IPI Finding and Serving Subsystem 2 by sending an HTTP request to the IPD Server(s) 11 based on a URL hot-linked to the selected Check Box.

As indicated at Block B in FIG. 6C, this causes a particular type of HTML-encoded document (i.e. called an HTML form or Web form document) residing on the IPD Server(s) 11 to be sent to the Web browser of the requesting client subsystem 13 and displayed on the information display frame 20C thereof (requesting this mode of service). As in the Manufacturer Website Search Mode described above, the HTML form sent in the UPN-Directed Information Access Mode may also use any HTML format commands, such as headers, paragraphs, and lists, but must include three unique items, namely: the METHOD by which the user input is to be sent; the ACTION, which specifies a URL to which the user input is to be sent, presumably, IPD Server 11 that will act upon the request appropriately; and a SUBMIT button, to send the completed form over the Internet via HTTP. In the illustrative embodiment, user input (i.e. a UPC or EAN number associated with a particular consumer product) is obtained by an Input Box, which allows the user (i.e. retail sales clerk or consumer) to type in or scan in a UPC or EAN number assigned to a consumer product on which product related information is sought.

As indicated at Block C in FIG. 6C, the consumer or retail clerk scans the bar coded consumer product, or enters the UPC or EAN number thereon into the Input Box of the HTML form, and selects the SUBMIT button thereon. In response thereto, the Web browser on the client subsystem 13 sends a GET request to the IPD Server 11 shown in FIG. 2B2. When selecting the SUBMIT button on the HTML form, the Web browser executes the METHOD associated with the HTML form and sends the stored UPC (or EAN) value to the URL specified by ACTION associated with the HTML form (i.e. the Web browser performs the action specified in the ACTION). The ACTION of the HTML form specifies the URL of the IPD SERVER 11 that will process the request from the HTML form. This amounts to the Web browser constructing a GET request for that URL, with the arguments (the query string) being attached to the end of the URL. The arguments of the HTML form are specified by the INPUT items of the HTML form (i.e. the UPC or EAN number on the consumer product on which information is sought).

As indicated at Block D, the IPD server 11 passes the arguments (the UPC or EAN numbers in the query string) to a CGI script running therewithin which translates the Web query string into a proper query to the RDBMS 9 shown in FIG. 2B1.

As indicated at Block E, the translated query is used to search the RDBMS 11A and find the set of URLs (i) linked to the registered consumer product (by the manufacturer or agent thereof) assigned the UPC or EAN number entered into the Input Box of the HTML form, and (ii) pointing to HTML documents on the WWW containing particular types of consumer product related information. The result returned from the RDBMS 9 is an ASCII record specifying the set of URLs satisfying the above criteria. In order for the Web browser of the requesting client subsystem to display the results of the database search during this mode, the ASCII record must be converted into a HTML document (i.e. Web output form).

As indicated at Block F, a CGI script within IPD server 11 creates the elements of an HTML document (Web output form), inserts the result from the RDBMS 9 into the Web output form, and sets the Content-type of this HTML document to text/html. In the illustrative embodiment, when the Web output form is displayed by the requesting client subsystem, a set of URLs categorized by particular product information types is displayed on the information display frame 20C. Notably, this set of URLs points to particular types of consumer product related information registered within the RDBMS 9 of the system.

As indicated at Block G, the consumer or retail sales clerk can then access and display any HTML document (Web page) located at a particular URL within the information menu by selecting the same using a touch screen, mouse, or other input selection device.

Trademark-Directed Search Mode of Operation

Figure 5D:
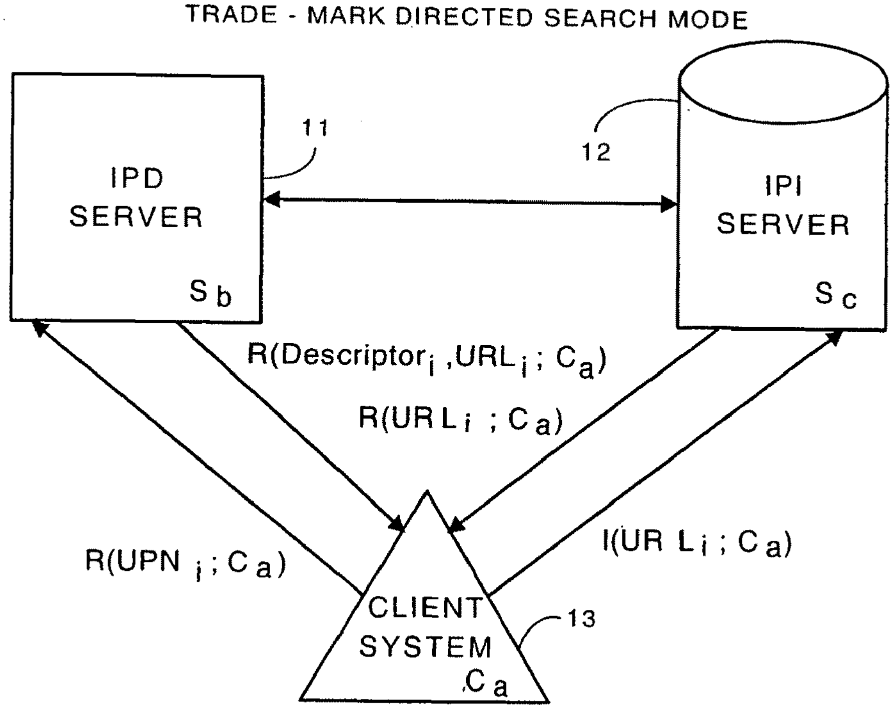
FIG. 5D is a schematic diagram illustrating the high level structure of a communication protocol that can be used among the client subsystem $C_a$, the IPD Server $S_b$, and the IPI Server $S_c$ of the IPI Finding And Serving Subsystem hereof when the subsystem is in its Trademark-Directed Search Mode of operation, requesting as input a trademark and/or company name, and providing as output the product descriptor(s) and a UPN (or set thereof) related to the trademark within the database of the system and pointing to HTML-encoded documents containing particular types of product-related information.

Referring to FIG. 5D, the high level structure is shown for a communication protocol that can be used among a client subsystem Ca, an IPD Server Sb, and an IPI Server Sc of the IPI finding and serving subsystem hereof when it is induced into the Trademark-Directed Search Mode of operation from the point of view of the depicted client subsystem. FIGS. 6D1 through 6D23, taken together, provides a high level flow chart illustrating the steps involved in carrying out this communication protocol when the IPI Finding and Serving Subsystem is in its Trademark-Directed Search Mode of operation.

As indicated at Block A in FIG. 6D1, when selected from the user-interface of an IPI Website, the fourth Check Box type button 21D automatically activates the Trademark-Directed Search Mode of the IPI Finding and Serving Subsystem by sending an HTTP request to the IPD Server(s) 11" based on a URL hot-linked to the selected Check Box.

As indicated at Block B in FIG. 6D1, this causes a particular type of HTML-encoded document (i.e. called an "HTML form" or "Web input form document") residing on the IPD Server(s) 11" to be sent to the Web browser of the requesting client subsystem 13 and displayed on the information display frame 21C thereof (requesting this mode of service). As in the UPN-Directed Information Access Mode described above, the HTML form sent in the Trademark-Directed Search Mode may also use any HTML format commands, such as headers, paragraphs, and lists, but must include three unique items, namely: the METHOD by which the user input is to be sent; the ACTION, which specifies a URL to which the user input is to be sent, (e.g. a CGI script running within http server 11" that will act upon the request appropriately); and a SUBMIT button, to send the completed form over the Internet via HTTP. In the illustrative embodiment, user input (i.e. the trademark or trade name used with a particular consumer product on which information is sought) is obtained by an Input Box, which allows the user (i.e. E retail sales clerk or consumer) to type in the trademark or trade name believed or otherwise known to be used in connection with a particular consumer product on which information is sought.

As indicated at Block C in FIG. 6D1, the consumer or retail clerk enters the trademark or trade name into the Input Box of the HTML form, and selects the SUBMIT button thereon. In response thereto, the Web browser on the client subsystem 13 sends a GET request to the IPD server 11 shown in FIG. 2B2. When selecting the SUBMIT button on the HTML form, the Web browser executes the METHOD associated with the HTML form and sends the stored trademark value to the URL specified by ACTION associated with the HTML form (i.e. the Web browser performs the action specified in the ACTION). The ACTION of the HTML form specifies the URL of the CGI script running within the IPD server 11 that will process the request from the HTML form. This amounts to the Web browser constructing a GET request for that URL, with the arguments (the query string) being attached to the end of the URL. The arguments of the HTML form are specified by the INPUT items of the HTML form (i.e. the trademark or trade name used in connection with the consumer product on which information is sought).

As indicated at Block D in FIG. 6D1, the IPD server 11 passes the arguments (the trademark or trade name in the query string) to a CGI script running therewithin and the CGI script translates the Web query string into a proper query to the RDBMS 9, as shown in FIG. 2B2.

As indicated at Block E in FIG. 6D1, the translated query is used to search the RDBMS 9 in order to find all registered consumer products having product descriptions (PD) registered within the RDBMS 9 that are related to the trademark or trade name entered into the Input Box of the HTML form. The result returned from the RDBMS 9 is an ASCII record specifying each triplet data set (Product Description, UPN and Manufacturer) which satisfies the above trademark search criteria (to a particular degree) entered into the Input Box of the HTML form. In order for the Web browser of the requesting client subsystem to display the results of the database search during this mode, the ASCII record must be converted into another HTML form for use in refining the consumer product information display.

At Block F in FIG. 6D2, a CGI script within IPD server 11 creates the elements of another HTML document (Web auxiliary input form), inserts the preliminary search result from the RDBMS 9 into the Web auxiliary input form, and sets the Content-type of this HTML document to text/html. In the illustrative embodiment, the Web auxiliary-input form has an ACTION which specifies the URL of a CGI script within the IPD server 11 that will act upon the request appropriately as if the system were in the UPN-Directed Information Access Mode. The Web auxiliary input form includes an Input Box listing all triplet data sets (i.e. Product Description, Manufacturers and UPN number) satisfying the input trademark search criteria entered in the primary Web input document, described hereinabove. The qualifying triplets listed in the Input Box are provided with a Radio-Button to allow the consumer or retail sales clerk to select one of the triplets from the list thereof for use in a subsequent refined search of the RDBMS 9. The Web auxiliary-input form also has a SUBMIT button for sending the HTML form back to the IPD server 11 for processing.

As indicated at Block G in FIG. 6D2, when the consumer or retails sales clerk makes a selection with the Radio-Button and then selects the SUBMIT button, the Web browser on the client subsystem 13 sends a request to the HTTP program on the IPD server 11 to get the completed HTML form.

As indicated at Block H in FIG. 6D2, the HTTP (httpd) program on IPD server 11 passes the arguments (the trademark or trade name in the query string) to a CGI script running therewithin and the CGI script translates the Web query string into a proper query for use in searching RDBMS 9, as shown in FIG. 2B2.

At Block I in FIG. 6D2, the query is used to search the RDBMS 9 in order to find the set of URLs (i) related to the registered consumer product (by the manufacturer or agent thereof) assigned the UPN, (Product Description and Manufacturer) entered into the Input Box of the HTML (auxiliary) form, and (ii) pointing to HTML (or FTP) documents on the WWW containing particular types of consumer product related information. The result returned from the RDBMS 9 is an ASCII record specifying the set of URLs satisfying the above criteria. In order for the Web browser of the requesting client subsystem to display the results of the database search during this mode, the ASCII record must be converted into an HTML document (i.e. Web output form).

At Block J in FIG. 6D2, the IPD Server 11 creates the elements of an HTML document (Web output form), inserts the result from the RDBMS 9 into the Web output form, sets the Content-type of this HTML document to text/html, and sends the HTML form to the requesting client subsystem.

At Block K in FIG. 6D3, the set of URLs categorized by particular product information types is displayed within the output HTML form on the information display frame 20C. Notably, this set of URLs points to particular types of consumer product related information registered within the RDBMS 9 of the system by the manufacturer of the product or its agent(s) thereof using the UPN/TM/PD/URL management tools accessible during the Manufacturer/Product Registration Mode hereof.

As indicated at Block L in FIG. 6D3, the consumer or retail sales clerk can access and display any HTML document (Web page) located at a particular URL within the displayed information menu by selecting the same using a touch screen, mouse, or other input selection device available at the requesting client subsystem 13.

Product-Description Directed Mode of Operation

Figure 5E:
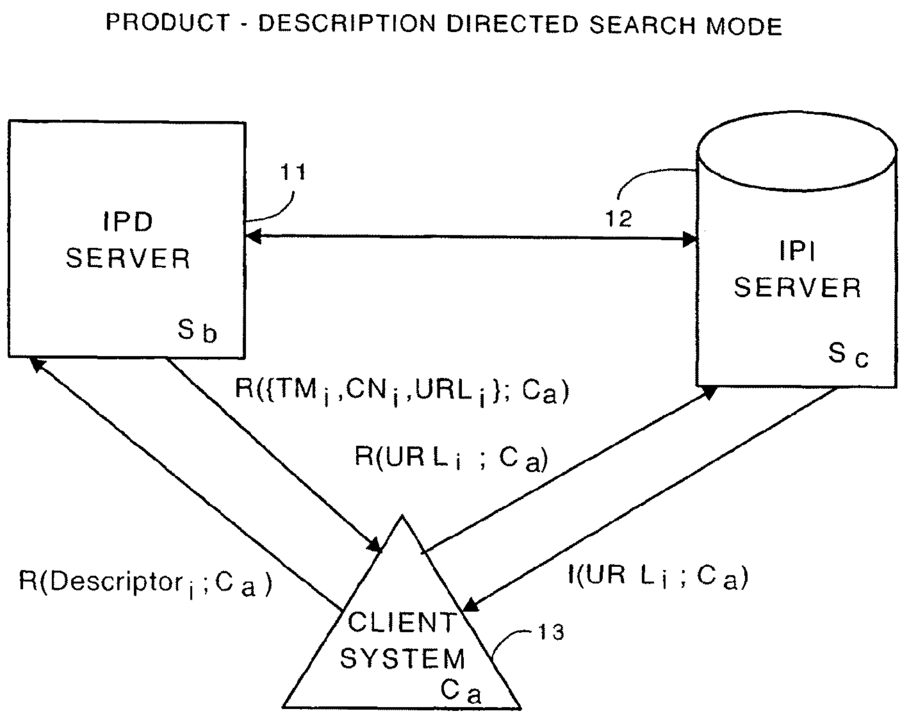
FIG. 5E is a schematic diagram illustrating the high level structure of a communication protocol that can be used among the client subsystem $C_a$, the IPD Server $S_b$, and the IPI Server $S_c$ of the IPI Finding And Serving Subsystem hereof when the subsystem is in its Product-Description Directed Search Mode of operation, requesting as input a product descriptor related to the consumer product on which information is sought and providing as output the trademark, company name and URL(s) related to the product descriptor within the database of the system and pointing to HTML-encoded documents containing particular types of product-related information.

Referring to FIG. 5E, the high level structure is shown for a communication protocol that can be used among a client subsystem Ca, an IPD Server Sb, and an IPI Server Sc of the IPI Finding and Serving Subsystem hereof when it is induced into the Product-Description Directed Mode of operation from the point of view of the depicted client subsystem. FIGS. 6E1 through 6E3 provides a high level flow chart illustrating the steps involved in carrying out this communication protocol when the IPI Finding and Serving Subsystem is in its Product-Description Directed Mode of operation.

As indicated at Block A in FIG. 6E1, when selected from the user-interface of an IPI Website, the fifth Check Box type button 21E automatically activates the Product-Description Directed Search Mode of the IPI Finding and Serving Subsystem by sending an HTTP request to the IPD Server(s) 11 based on a URL hot-linked to the selected Check Box.

As indicated at Block B in FIG. 6E1, this causes a particular type of HTML-encoded document (i.e. called an HTML form or Web input form document) residing on the IPD Server(s) 11 to be sent to the Web browser of the requesting client subsystem 13 and displayed on the information display frame 21C thereof (requesting this mode of service). As in the Trademark-Directed Search Mode described above, the HTML form sent in the Product-Description Directed Search Mode may also use any HTML format commands, such as headers, paragraphs, and lists, but must include three unique items, namely: the METHOD by which the user input is to be sent; the ACTION, which specifies a URL to which the user input is to be sent, (e.g. a CGI script running within the IPD server 11 that will act upon the request appropriately); and a SUBMIT button, to send the completed form over the Internet via HTTP. In the illustrative embodiment, user input (i.e. the description or descriptor for a particular consumer product on which information is sought) is obtained by an Input Box, which allows the user (i.e. retail sales clerk or consumer) to type in the product description for a particular consumer product on which information is sought.

As indicated at Block C in FIG. 6E1, the consumer or retail clerk enters the product description into the Input Box of the HTML form, and selects the SUBMIT button thereon. In response thereto, the Web browser on the client subsystem 13 sends a GET request to the IPD server 11. When selecting the SUBMIT button on the HTML form, the Web browser executes the METHOD associated with the HTML form and sends the stored product description to the URL specified by ACTION associated with the HTML form (i.e. the Web browser performs the action specified in the ACTION). The ACTION of the HTML form specifies the URL of a CGI script within the IPD server 11 that will process the request from the HTML form. This amounts to the Web browser constructing a GET request for that URL, with the arguments (the query string) being attached to the end of the URL. The arguments of the HTML form are specified by the INPUT items of the HTML form (i.e. the product description for the consumer product on which information is sought).

As indicated at Block D in FIG. 6E1, the http program on the IPD server 11 passes the arguments (the product description in the query string) to a CGI script therewithin and the CGI script translates the Web query string into a proper query to the RDBMS 9 shown in FIG. 2B2.

As indicated at Block E in FIG. 6E1, the translated query is used to search the RDBMS 9 in order to find all registered consumer products having trademarks or trade names within the RDBMS 9 that are linked to the product description entered into the Input Box of the HTML form. The result returned from the RDBMS 9 is an ASCII record specifying each triplet data set (Trademark, UPN and Manufacturer) which satisfies the above product-description search criteria (to a particular degree) entered into the Input Box of the HTML form. In order for the Web browser of the requesting client subsystem to display the results of the database search during this mode, the ASCII record must be converted into another HTML form for use in refining the consumer product information display.

At Block F in FIG. 6E2, the IPD server 11 creates the elements of another HTML document (Web auxiliary input form), inserts the preliminary search result from the RDBMS 9 into the Web auxiliary input form, and sets the Content-type of this HTML document to text/html. In the illustrative embodiment, the Web auxiliary-input form has an ACTION which specifies the URL of a CGI script within IPD server 11 that will act upon the request appropriately as if the system were in the UPN-Directed Information Access Mode. The Web auxiliary input form includes an Input Box listing all triplet data sets (i.e. Trademark, Manufacturer, and UPN number) satisfying the input product-description search criteria entered in the primary Web input document, described hereinabove. The qualifying triplets listed in the Input Box are provided with a Radio-Button to allow the consumer or retail sales clerk to select one of the triplets from the list thereof for use in a subsequent refined search of the RDBMS 9. The Web auxiliary-input form also has a SUBMIT button for sending the HTML, form back to the IPD server 11 for processing.

As indicated at Block G in FIG. 6E2, when the consumer or retails sales clerk makes a selection with the Radio-Button and then selects the SUBMIT button, the Web browser on the client subsystem 13 sends a request to the IPD server 11

As indicated at Block H in FIG. 6E2, the http program on the IPD server 11 passes the arguments (the product description in the query string) to a CGI script therewithin and the CGI script translates the Web query string into a proper query for use in searching RDBMS 9 shown in FIG. 2B2.

At Block I in FIG. 6E2, the query is used to search the RDBMS 9 in order to find the set of URLs (i) linked to the registered consumer product (by the manufacturer or agent thereof) assigned the UPN, (Trademark and Manufacturer) entered into the Input Box of the HTML (auxiliary) form, and (ii) pointing to HTML (or FTP) documents on the WWW containing particular types of consumer product related information. The result returned from the RDBMS 9 is an ASCII record specifying the set of URLs satisfying the above search criteria. In order for the Web browser of the requesting client subsystem to display the results of the database search during this mode, the ASCII record must be converted into a HTML document (i.e. output HTML form).

At Block J in FIG. 6E2, the IPD server 11 creates the elements of an output HTML form, inserts the result from the RDBMS 9 thereinto, and sets the Content-type of this HTML document to text/html and sends a request to the IPD server 11 to get the HTML form.

At Block K in FIG. 6E3, the set of URLs categorized by particular product information types is displayed within the output HTML form on the information display frame 20C. Notably, this set of URLs points to particular types of consumer product related information registered within the RDBMS 9 of the system by the manufacturer of the product or its agent(s) thereof using the UPN/TM/PD/URL management tools accessible during the Manufacturer/Product Registration Mode hereof.

As indicated at Block L in FIG. 6E3, the consumer or retail sales clerk can access and display any HTML document (Web page) located at a particular URL within the displayed information menu by selecting the same using a touch screen, mouse, or other input selection device available at the requesting client subsystem 13.

The protocols described above can be realized using any suitable programming language including, for example, an object-oriented programming language such as the Java" programming language.

CPIR-Enabling Applet Tag Download/Distribution Mode of System Operation

As illustrated in FIGS. 4F1, 4F2, 4H1, 4H2, 4J1, 4J2, 4L1 and 4L2, a centralized Library of CPIR-enabling Applet/Servlet Tags is created, managed and stored within the UPN/TM/PD/URL RDBMS 9 hereof in accordance with the above-described methods. In accordance with the principles of the present invention, these CPIR-enabling Applet/Servlet tags can be widely distributed to retailers, manufacturers, advertisers and others about the globe and thereafter widely embedded within HTML-encoded documents, as taught in detail hereinabove, to practice this aspect of the present invention in a commercially successful manner. The function of the CPIR-enabling Applet Tag Download/Distribution mode of operation of the system is to enable the global distribution of this centralized Library of CPIR-enabling Applet/Servlet Tags, in accordance with the licensing program associated with each such CPIR-enabling Applet/Servlet.

As shown in FIG. 3C, the CPIR-enabling Applet Download/Distribution mode is automatically initiated by the user depressing mode control button 21F displayed on the control panel 20B of the IPI Website GUI of the illustrative embodiment, but certainly elsewhere in practice. The user can be anyone with the requisite authority to use the Applets in accordance with the terms of the licensing program to be enforced in connection therewith. Understandably, the terms of such licensing programs will be based on prevailing business conditions and will vary from embodiment to embodiment of the present invention.

As best illustrated in FIG. 4F2, upon entering the UPC-Encodecd-Applet Tag Download/Distribution mode, the IPD server 11 of the illustrative embodiment will serve a custom Java GUI as shown in FIGS. 4M1 and 4M2, for carrying out Applet tag downloading and licensing procedures. The GUI will provide (1) links to the centralized Library of CPIR-Enabling Applet/Servlet Tags maintained within the UPN/TM/PD/URL RDBMS 9, as well as (2) launchable GUIs for downloading selected UPN-identifiable CPIR-enabling Applet tags to specified Internet-enabled client computer subsystems 13 or Internet information/application servers operated by the user interfacing with this mode of system operation. Notably, electronic data interchange/exchange processes (e.g. based on EDI, XML/ICE or other protocols) can be used to carry out the downloading of CPIR-enabling Applets and other files between client computers and the IPD server 11 during this and other modes of operation.

For licensing purposes, it may be desirable or necessary to have the user supply end-use types of information to the IPD server 11 during this mode of operation in order to identify on which information servers or domains particular CPIR-enabling Applets are to be used (i.e. embedded within HTML-documents and launched therefrom by the end-user which will typically be the consumer). In some instances, licenses for CPIR-enabling Applets will carry a fee to be paid by the downloader; in other instances, there will be no fee requirements. Such details will depend on prevailing business conditions along the retail supply and demand chain.

Once a user has downloaded CPIR-enabling Applet tags onto a designated (target) client machine or server, the user will have built a local Library (or Catalog) of CPIR-enabling Applet tags for use during Applet tag embedding operations which will typically be carried out alongside of other HTML-code authoring and management operations involving, for example, the design, construction, management and maintenance of Web-pages, EC-stores, on-line (retail and wholesale) product catalogs, on-line auction site pages, Web advertisements, and the like.

As shown in FIG. 4F2, during Step D1 of the Applet tag embedding process, CPIR-enabling requests are accessed from the local Library of CPIR-enabling Applets typically over an IP-type local area network (LAN) or wide area network (WAN). Then during Step D2, the accessed CPIR-enabling Applet tag is inserted within the HTML code of the target document. This step of the process will typically involve use of HTML-editing tools of one sort or another, as discussed herein above.

Once the CPIR-enabling Applet tag has been embedded within the target HTML-encoded documents, the HTML-encoded can then be published in its intended publishing environment so that consumers can instantly initiate UPN-directed searches within the centralized UPN/TM/PD/URL RDBMS 9 hereof by clicking on the CPIR-enabling Applet tag, and thereafter display the search results within an independent Java GUI which performs the function of a virtual kiosk provided at the consumer s point of presence on the WWW.

Accessing the Modes of Operation of the IPI Finding System Hereof by Launching CPIR-Enabling Applets Embedded within HTML-Encoded Documents Associated with Electronic-Commerce Enabled Stores and Product Catalogues, Internet Advertisements, On-Line WWW Auction Sites, and the Like As described in detail hereinabove, a consumer can automatically produce a CPID-enabling Java GUI (i.e. virtual kiosk) by clicking upon a CPIR-enabling Java Applet tag that has been embedded within the HTML code of any Web-document. As illustrated in FIGS. 4N2, 4O2, 4P2, 4Q2, 4R2 and 4S2, each consumer product information display (CPID) enabling GUI of the illustrative embodiment is a new and independent Web browser having a Netscape-type framework, in which the six mode selection buttons 21A through 21G of the illustrative embodiment are displayed. When such CPID-enabling GUIs are displayed at the consumer s point of presence on the WWW, the consumer is free to select any one of the mode selection buttons and cause the system to enter the selected mode and precisely deliver the information service associated therewith without disturbing his or her present Cyberspace experience. The description of these modes will be described in detail hereinbelow with reference to FIGS. 2-1, 2-2, 2A and 2C.

Registration Solicitation Mode of the IPI Finding and Serving Subsystem

In the illustrative embodiments of the present invention, the data-synchronized IPD Servers of the system hereof 11 are also provided with an Automated Registration Solicitation Mode programmed by the webmaster (or administrator) of the IPI Web-site(s). In this mode, each IPD Server 11 analyzes the data collected within its Non-IPI Registrant Database. The data analysis procedure seeks to determine: (1) which unregistered products in the Non-IPI Registrant Database were the subject of an information request at the IPD Server; (2) how many hits (requests) were made for the product within a predetermined length of time (e.g. one week) by Internet users; and (3) whether the number of requests exceeds a particular request threshold (e.g. 100 requests in week period). Then for each unregistered product which has exceeded the request threshold, the IPD Server automatically sends an E-mail message to the associated company. Preferably, the E-mail message is designed to (i) inform the company of recent information requests for their products, and (ii) solicit the registration of such products with the IPD Server. Once registered with the system, such products can be easy found on the Internet by anyone wishing to use the product information finding techniques of the present invention.

Operation of the IPI Finding and Serving Subsystem and Method Hereof

When the Check Box button 21C is selected from the control frame 20B, the IPI Finding and Serving Subsystem enters its UPN-Directed Information Access Mode illustrated in FIG. 6C. Preferably, the user is provided with a choice of language (e.g. English, German, French, Japanese, Korean, Russian, Chinese, etc.) by way of an appropriate menu-selection screen. After the desired language selection is made, the home page is displayed upon the client subsystem s display screen. A typical display screen produced from the IPD Server might read as follows:

Welcome to BRANDKEY REQUEST“, the world s only manufacturer-specified Product-Information Finding and Serving System on the Internet.

Have you purchased a particular product, are you considering the purchase of a particular product, on which you would like current, up-to-date information from the manufacturer or advertiser?

Look no further than the BRANDKEY REQUEST“ Universal Product-Information Finding and Serving System.

When the subsystem is in its UPN-Directed Information Access Mode, a Web-based information resource pertaining to any commercial product registered with the system can be displayed and selected by the user in order to automatically access the same from the Internet. Such information resources can include advertisements, specifications, operation descriptions, product simulations, purchase information, maintenance information, warranty and servicing information, product updates, distributor/reseller information, incentives (e.g. discounts, rebates, coupons, etc.), electronic data transaction screens, etc. In this mode, desired product information is obtained by simply entering the registered product s UPN (e.g. its UPC s 12 digit numerical string) into the Inout Box of the HTML form displayed in the information display frame 20C. Such data entry can be carried out manually using keyboard data entry techniques, or automatically using a bar code symbol reader connected to the client subsystem as discussed in detail above. When using the seeded IPI Database described hereinabove, only the first six digits of the UPC number need be entered into the dialogue box. An exemplary display screen produced from the IPD Server might be as follows:

Simply enter the 12 digit UPC the particular product; click REQUEST, and then wait for the display of the list of Web locators (URLs) at which the desired product information can be found on the Internet?

In response to such data entry operations, a list or menu of URLs organized according to information subfield classifications as set forth, for example, in FIG. 4A2, are displayed on client subsystem Ca making the request of the IPD Server 11. At this stage, another display screen associated with the HTML form produced from the IPD Server 11 would appear with an exemplary message as follows:

Please select the URL from the displayed URL Menu using the information subfield product information category displayed above. This will connect you to the product information related to the selected URL. You can return to the URL display list at anytime.

Upon selecting a particular URL from the displayed URL menu, video and audio information content are automatically served from the IPI Server 12 hosting the selected URL and thereafter displayed on the client subsystem 13.

When the Check Box button 21D is selected, the IPI Finding and Searching Subsystem enters its Trademark-Directed Search Mode, illustrated in FIGS. 6D1 through 6D3. Preferably, the user is provided with a choice of language (e.g. English, German, French, Japanese, Chinese, etc.) by way of an appropriate menu-selection screen.

When the system is in its Trademark-Directed Search Mode, a predesignated information resource pertaining to any commercial product registered with the system can be automatically accessed from the Internet and displayed from the Internet browser of a client subsystem 13. Such information resources can include advertisements, specifications, operation descriptions, product simulations, product upgrade information, purchase information, maintenance information, warranty and servicing information, etc. In this mode, desired product information is obtained by simply entering the registered product s trademark(s) and/or associated company name into the Input Box of the HTML form displayed on the information display frame 20C of the client subsystem. An exemplary message associated with the HTML form produced from the IPD Server 11 might be as follows:

Simply enter the trademark used in connection with the particular product and/or the company name of the product s manufacturer; click REQUEST, and then wait for the display of a menu of manufacturer-categorized Web locators (URLs) at which desired types of product information can be found about the product on the Internet In response to such data entry operations, a list of URLs organized according to the information subfield classifications set forth in FIG. 4A2 are displayed on client subsystem placing the request. Upon selecting a particular URL from the displayed list thereof, video and audio information content are automatically served from the IPI Server hosting the selected URL and thereafter displayed on the client subsystem.

In an alternative embodiment of the present invention, the UPN-Directed Information Access Mode and the Trademark-Directed Search Mode can be integrated into a single server application so that there is no need or desire to manually select between mode activation buttons 21C and 21D, respectively. In such an embodiment, the interaction between the IPD Server and the requesting client subsystem can be designed to support the following Web server display screens and script underlying the same:

Welcome to BRANDKEY REQUEST“, the only Universal Product-Information Finding and Serving System on the Internet.

Have you purchased a particular product, or consid ering the purchase of a particular product, on which you would like current, up-to-date information from the manufacturer or advertiser?

Look no further than the BRANDKEY REQUEST“ Universal Product Information Finding and Serving System.

Simply enter the 12 digit UPC number of the particular product, click REQUEST, and select from the displayed menu of Web locators (URLs) to find the desired product information on the WWW.

If you do not know the UPC number associated with the product you are looking for, then simply enter the trademark used in connection with the particular product and/or the company name of the manufacturer, then click REQUEST, and wait for the display of the list of Web locators (URLs) at which the desired product information can be found.

Please select the URL from the displayed URL list by clicking on it. This will connect you to the product information related to the selected URL. You can return to the URL display list at anytime.

Notably, such an integrated Web server application can be realized in a variety of ways. The exact words and graphics used to create an interactive script for an integrated Web server application will vary from embodiment to embodiment of the present invention.

In instances when an IPI Website in accordance with the present invention is being served to consumers in retail environments using a computer-based kiosk as shown in FIG. 3A2, the consumer as well as retail sales clerk is presented with the option of ascertaining the price of an product in the store. This is achieved by simply depressing the Price Display button 21F on Control Strip 20B, shown in FIG. 3C, to engage the system in its price lookup/display mode. In this mode of operation, the consumer then need only scan the UPC bar code symbol on the product using bar code scanner 26 in order for the price to be looked-up in the Product Price Database maintained in the Retailer s Price Server (RPS) 35, and displayed on the kiosk display screen. In general, the Product Price Database of the hosting retailer can be made accessible by the computer-based kiosk in several possible ways. As shown in FIGS. 2-1 and 2-2, one way is to place the retailer s RPS on Internet (by using an HTTP server) and connect the RPS to the IPD Server 11 of the system by way of a CGI well known in the art. The CGI can be made accessible only by authorized client subsystems (e.g. computer-based kiosks installed in the hosting retailer s store and possibly administrators of the information delivery system). An alternative technique of connecting the Product Price Database to each computer-based kiosk would involve providing the RPS with a direct interface to each computer-based kiosk in the hosting retailer s store(s). This alternative technique may require the use of computer networking technology well known in the art.

Method of Accessing and Displaying and Consumer Product Related Information within Retail Shopping Environments and Transporting the Same to Remote Locations for Subsequent use and/or Review by Consumers at Home, Work, School or on the Road As explained hereinabove, the problem of providing consumers with copies of accessed consumer product information within retail shopping environments is addressed by enabling the consumer at retail-based bar code driven kiosks to: (1) display an e-mail envelope within the display frame 20C of the Web browser program thereof, by manually selecting control button 21G provided along the control frame 20B, shown, for example, in FIGS. 3A14A and 3A14B; (2) capturing, saving, and attaching any accessed/displayed consumer product document to the displayed e-mail envelope 116 by manual selection of the capture, save and attach button 110 (or voiced-directed selection thereof) within the displayed e-mail envelope of FIG. 3A14, or capturing and recording the URL of the CPI-related document being displayed by manual selection of the capture and record button 112 (or voice-directed selection thereof) within the displayed e-mail envelope 116 of FIG. 3A16B; (3) addressing the e-mail envelope 116 with the consumer/shopper s home, office or like e-mail address by either reading an e-mail address encoded within a bar code (or magnetic-stripe) structure or manually entering the same within the addressee field 115; and (4) sending the stuffed e-mail envelope by manual selection of the send button 114 within the displayed e-mail envelope.

At this stage, the first illustrative embodiment of the CPI transport method (i.e. service) of the present invention referred for hereinafter as the "SEND-IT-HOME™" e-mail service will now be described with reference to FIGS. 3A13A through 3A14.

As indicated at Block A in FIG. 3A13A, the first step of the first illustrative embodiment of the CPI transport method involves launching a consumer product information (CPI) capture and transport application/service on an Internet-enabled bar code driven (BCD) CPI kiosk of the present invention, as shown in FIGS. 3A9 through 2A10D. As indicated in FIG. 3A14, this application launching process can be initiated by selecting application/service button 21G in the control strip of the kiosk browser display screen. When the application has been launched, a CPI-transporting electronic-mail envelope 116 will appear within the display frame of the browser s GUI, as shown in FIG. 3A14. As shown therein, the (Java-enabled) GUI for the CPI transporting email envelope is provided with:

(i) a first single-click button 110 for capturing and storing thereon, as an HTML-encoded document, any CPI related document that is being displayed on the display screen of the BCD CPI kiosk 13 within the retail shopping environment, shown in FIGS. 3A9 through 3A10D;

(ii) a second single-click button 114 for transporting copies of the envelope 116 to the e-mail address of the consumer/shopper or friend/agent thereof;

(iii) a consumer e-mail address field 115 for entering the e-mail address of the consumer/shopper or friend thereof, to which a copy of the e-mail envelope 116 can be automatically sent during envelope transport; and (iv) a retailer e-mail address field 117 containing a preset e-mail address of the retailer operating the kiosk, indicating the retail store location, and possibly the retail department from which the CPI-transporting envelope 116 was sent on the time and date of the electronic message transmission.

As indicated at Block B in FIG. 3A13A, the consumer enters into the consumer e-mail address field of the envelope 116, either his or her e-mail address or the e-mail address of a friend to which he or she would like to send consumer product related information. Notably, this operation can be achieved in a variety of different ways, namely: by manually typing the e-mail address using a pop-up keyboard or keypad provided for by the kiosk itself; using voice recognition command technology embodied within the kiosk; by reading a bar coded consumer identification card 150, as shown in FIG. 3A10B, having the consumer s e-mail address and possibly other information items (e.g. shopper/consumer identification number, credit card information, name, address and/or status within a particular loyalty/courtesy program encoded therewithin if desired; or, by reading a magnetic-stripe type consumer identification card 150 encoded with the same or similar information using a magnetic stripe reader 46 interfaced with the BCD CPI kiosk, as shown in FIG. 3A10B.

As indicated at Block C in FIG. 3A13B, the consumer/shopper uses the UPN, trademark, product descriptor and/or company name associated with the sought after product, to access consumer product related information resource of interest on the WWW, and display the same on the display screen of the BCD CPI kiosk within the retail shopping environment. When using the UPN-Directed Search Mode of operation of the system, a UPN/TM/PD/URL link menu as shown in FIGS. 4P2, 4R2 and 452, will be displayed in the display frame of the browser screen. When using the Trademark Directed Search Mode, a list of URLs linked to the input trademark will be displayed in the display frame of browser screen.

As indicated at Block D in FIG. 3A13B, each instant the consumer/shopper has found a consumer product information resource of particular interest on the WWW, which he or she wants to send a copy thereof to a home or work e-mail address, the consumer/shopper selects the first single-click button 110 on the CPI-transporting envelope (indicated as CAPTURE, SAVE & ATTACH in FIG. 3A14). This causes the information resource being displayed on the display screen of the BCD CPI kiosk to be automatically captured and stored as an HTML-encoded document attached to the CPI-enabling envelope, as intended in FIG. 3A14.

As indicated at Block E in FIG. 3A13B, the consumer/shopper sequentially repeats Steps C and D for each consumer product information resource on the WWW to be captured, stored and attached to the opened CPI-transporting envelope 116 being displayed on the display screen of the kiosk. Typically, there will be a maximum number of documents to be attached to the CPI-enabling envelope using present e-mail protocols at 6 understood, however, that a larger number of documents may be transportable within a single e-mail envelope using future 3-mail protocols.

As indicated at Block F in FIG. 3A13C, upon capturing, storing and attaching a desired number of consumer product related information resources to the CPI-transporting envelope 116, the consumer/shopper then selects the second single-click button 114 on the CPI-transporting envelope (i.e. indicated as SEND in FIG. 3A14) so as to transport the CPI-transporting envelope 116 to the e-mail address entered within the consumer e-mail address field of the CPI-transporting envelope.

As indicated at Block G in FIG. 3A13C, an information record of each CPI-transporting envelope and the contents thereof is maintained at the retailer e-mail server 84 and a copy thereof is transported to the central e-mail server 88, shown in FIGS. 3A9 and 3A10. Thereafter, such information on the central e-mail server 88 can be analyzed to determine trends and patterns in consumer shopping behavior in different geographic locations and retail shopping departments and the like. The results of such analysis are stored in retailer and manufacturer RDBMSs 88A and 89B, respectively.

The second illustrative embodiment of the CPI transport method (i.e. service) of the present invention, referred to hereinafter as the SEND-IT-HOME™ e-mail service, will now be described with reference to FIGS. 3A15A through 3A1G.

As indicated at Block A in FIG. 3A15A, the first step of the second illustrative embodiment of the CPI transport method involves launching a consumer product information (CPI) capture and transport application/service on an Internet-enabled bar code driven (BCD) CPI kiosk of the present invention, as shown in FIGS. 3A9 through 3A10D. As indicated in FIG. 3A16, this application launching process can be initiated by selecting application/service button 21G in the control strip of the kiosk browser display screen. When the application has been launched, a CPI-transporting electronic-mail envelope will appear within the display frame of the browser s GUI, as shown in FIG. 3A16. As shown therein, the (Java-enabled) GUI for the CPI transporting email envelope is provided with:

(i) a first single-click button 110 for capturing and storing therein, as an HTML-encoded document, any CPI related document that is being displayed on the display screen of the BCD CPI kiosk 13 within the retail shopping environment, as shown in FIGS. 3A9 through 3A10D;

(ii) a second single-click button 114 for transporting copies of the envelope 116 to the e-mail address of the consumer/shopper or friend/agent thereof;

(iii) a consumer e-mail address field 115 for entering the e-mail address of the consumer/shopper, to which a copy of the e-mail envelope 116 can be automatically sent during envelope transport;

(iv) a retailer e-mail address field containing a preset e-mail address of the retailer operating the kiosk, indicating retailer store location, and possibly retailer department from which the CPI-transporting envelope 116 was sent on the time and date of the electronic message transmission; and (v) a message field 119 to record captured URLs, as well as other notes of the consumer.

As indicated at Block B in FIG. 3A15A, the consumer enters his or her e-mail address into the consumer e-mail address field of the envelope 116, his or her e-mail address or the e-mail address of a friend to which he or she would like to send consumer product related information. Notably, this operation can be achieved in a variety of different ways, namely: by manually typing the e-mail address using a pop-up keyboard or keypad provided for by the kiosk itself; using voice recognition command technology; by reading a bar coded consumer identification card 150, as shown in FIG. 3A10B, having the consumer s e-mail address and possibly other information items (e.g. shopper/consumer identification number, credit card information, name, address, and/or status within a particular retailer loyalty/country program) encoded therewithin if desired; or by reading a magnetic-stripe type consumer identification card 150 encoded with the same or similar information using a magnetic stripe reader 46 interfaced with the BCD CPI kiosk, as shown in FIG. 3A10B.

As indicated at Block C in FIG. 3A15B, the consumer/shopper uses the UPN, trademark, product descriptor and/or company name associated with the sought after product, to access a consumer product related information resource of interest on the WWW, and display the same on the display screen of the BCD CPI kiosk within the retail shopping environment. When using the UPN-Directed Search mode of operation of the system, a UPN/TM/PD/URL menu, as shown in FIGS. 4D2, 4R2 and 4S2, will be displayed in the display frame of the browser screen. When using the Trademark Directed Search mode, a list of URLs linked to the input trademark, as shown in FIG. 4T2, will be displayed in the display frame of browser screen.

As indicated at Block D in FIG. 3A15B, each instant the consumer/shopper has found a consumer product information resource of particular interest, which he or she wants to send the corresponding URL to a home or work e-mail address, the consumer/shopper selects the first single-click button 110 on the CPI-transporting envelope 116 (indicated as CAPTURE AND RECORD in FIG. 3A16). This causes the URL of the information resource being displayed on the display screen of the BCD CPI kiosk to be automatically captured and recorded within the message field 119 of the CPI-enabling envelope 116. Optionally, the consumer may type a short note in this field using a pop-up keyboard launched by pop-up keypad button 121 on envelope 116.

As indicated at Block E in FIG. 3A15B, the consumer/shopper sequentially repeats Steps C and D for each consumer product information related URL to be captured and recorded within the message field 119 of the opened CPI-transporting envelope 116.

As indicated at Block F in FIG. 3A15C, upon capturing and recording a desired number of consumer product related URLs to the CPI-transporting envelope 116, the consumer/shopper then selects the second single-click button 114 on the CPI-transporting envelope (i.e. indicated as SEND in FIG. 3A16) so as to transport the CPI-transporting envelope to the e-mail address entered within the consumer e-mail address field 115 of the CPI-transporting envelope.

As indicated at Block G in FIG. 3A15C, an information record of each CPI-transporting envelope and the contents thereof is maintained at the retailer e-mail server 84 and a copy thereof is automatically transported to the central e-mail server 88. Thereafter, such information on the central e-mail server 88 can be analyzed to determine trends and patterns in consumer shopping behavior in different geographic locations and retail shopping departments and the like. The results of such analysis are stored in retailer and manufacturer RDBMSs 89A and 89B, respectively.

The above-described methods of e-mail based CPI transport may be modified in various ways to satisfy particular requirements of the application at hand. Also, these methods may be modified to provide novel ways of transporting displayed CPI-related Web documents to remote e-mail addresses while a consumer/shopper is visiting an E-commerce enabled store or on-line product catalog.

A Best Mode Embodiment of IPI Finding and Serving Subsystem of the Present Invention The IPI finding and serving system (i.e. subsystem) 2 of the present invention embodied within the system of FIGS. 2-1 and 2-2 can be realized on the Internet in a variety of different ways. Each embodiment of the system will provide manufacturers, retailers, consumers and sponsors with various benefits hitherto unachievable using prior art systems and methodologies. A best mode embodiment of the system embodiment will now be described below with reference to Intent-to-Use (ITU) service marks that Assignee hereof has sought to register under the Lanham Act and ultimately use in reducing the Internet-based consumer product information finding system to commercial practice in one form or another as taught herein. The inventive subject matter herein disclosed can be readily applied to carry out such an Internet-based information finding and delivery system.

According to the best mode embodiment, the IPI Finding and Serving Subsystem 2, referred to hereinabove as the BRANDKEY REQUEST“ Consumer Product Information Finding System in FIGS. 7 and 8 hereof, comprises an integration of several subsystems including, for example: the BRANDKEY REQUEST“ Manufacturer/Product Registration Subsystem 33 (e.g. Web Document Server 30 and Workstation 31) including Web-based and Value Added Networks (VAN)-based infrastructure and processes 14 for supporting EDI and UPN/TM/PD/URL link database management operations by manufacturers and/or their agents; the BRANDKEY REQUEST“ UPN/TM/PD/URL link RDBMS 9 interfaced with the BRANDKEY REQUEST“ Manufacturer/Product Registration Subsystem 33; numerous BRANDKEY REQUEST“ kiosks (e.g. client subsystems 13) installed in retail stores, retail outlets and the like, each having a bar code symbol driven Internet browser providing access to the Internet through an Internet Service Provider (ISP); and all of the Web-enabled client subsystems 13 located in consumer homes, in consumer offices and on the road, having access to the Internet through an ISP. While distributed geographically, these subsystems are integrated through the infrastructure of the Internet.

The function of the BRANDKEY REQUEST“ Manufacturer/Product Registration Subsystem 33 is two-fold: (1) to enable qualified manufacturers to quickly and easily register their companies with the System (i.e. the BRANDKEY REQUEST“—RDBMS 9) by way of a Web-enabled computer system of their choice; and (2) to enable manufacturers and/or their agents to (i) easily link, manage and update their UPC numbers and linked URLs using any Web-enabled computer system 13 running the EDI (or XML/EDI) based UPN/TM/PD/URL database management software (downloaded during manufacturer registration), and periodically transmit such updated information to the BRANDKEY REQUEST“ RDBMS 9 in order to update each manufacturer s information within the BRANDKEY REQUEST“ RDBMS 9 (i.e., IPI Database shown in FIGS. 4A1 and 4A2).

The function of the BRANDKEY REQUEST“ RDBMS 9 is to maintain and update the BRANDKEY REQUEST“ Database (shown in FIGS. 4A1, 4A2 and FIGS. 4C through 4C4), which contains various information items regarding registered manufacturers, service-subscribing retailers, and registered consumer products including, for example, UPC (and/or UPC/EAN) numbers assigned to consumer products and linked TMs, PDs and URLs pointing to published HTTP-encoded documents (i.e. Web pages) containing particular types of information related to such products.

Within the store of each retailer subscribing to the BRANDKEY REQUEST“ Consumer Information Service, the function of the BRANDKEY REQUEST“ kiosk is to provide consumer access to the BRANDKEY REQUEST RETAIL“ Website (e.g. BRANDKEY REQUEST“ Retail @ Wal-Mart, BRANDKEY REQUEST RETAIL“ @ Home Depot, etc.). The BRANDKEY REQUEST RETAIL“ Website served to both physical kiosk and virtual kiosks within the retailer s brick and mortar and EC stores, respectively, provides consumer access to UPN/TM/PD/URL information links (i) relating only to those products sold by the retailer and maintained within the BRANDKEY REQUEST“ RDBMS 9 by the manufacturer or agent thereof (i.e. achieved by applying MIN-based UPN-filtering techniques to the UPN/TM/PD/URL database, and (ii) not containing distribution channel information. If desired by the subscribing retailer, its BRANDKEY REQUEST RETAIL“ Website can be freely served to customers over the Internet, e.g. accessible from a hot-link embedded somewhere in the retailer s Web-site.

Within the realm of the BRANDKEY“ System 2, the function of the Web-enabled 13 client computer system 13 of each consumer, wherever it may be located (e.g. at home, in the office or on the road), is to provide consumer access the BRANDKEY REQUEST CENTRAL“ Website which is freely served over the Internet to any consumer having a, Web-enabled computer system. Unlike each BRANDKEY REQUEST RETAIL“ Website maintained by the BRANDKEY REQUEST“ RDBMS 9, the BRANDKEY REQUEST CENTRAL“ Website provides consumer access to UPN/TM/PD/URL links relating to every product maintained within the BRANDKEY REQUEST“ RDBMS 9 by every registered manufacturer. Any attempt by a consumer to access information from a particular BRANDKEY REQUEST RETAIL“ Website regarding a product not sold in the retailer s store will automatically result in a link over to the BRANDKEY REQUEST CENTRAL“ Website.

Depending on the particular implementation of the system hereof, it might be desirable or necessary for particular or all BRANDKEY REQUEST CENTRAL™ Website(s) to be designed so that is does no support Web-clipping or functionally equivalent techniques so that hand-held wireless (client) computing devices 13, whether or not equipped with a bar code symbol reader, and free to move anywhere including Retail stores subscribing to BRANDKEY REQUEST RETAIL WWW site services, cannot receive Web-Clipped HTML-encoded pages served from BRANDKEY REQUEST CENTRAL™ WWW Site, Retailers subscribing to BRANDKEY REQUEST RETAIL WWW sites can be confident the consumers/shoppers cannot access BRANDKEY REQUEST CENTRAL™ WWW Service within retail store environmentally using wireless web-enabled hand-held devices having display panels substantially smaller than the dimensions of web pages being served therefrom.

A Brief Description of the BRANDKEY REQUEST" Information Service Suite of the First Illustrative Embodiment of the Present Invention When installed in retail stores, the BRANDKEY REQUEST" System of the first illustrative embodiment will provide seven revolutionary Internet-based consumer information services under the service marks HOME-PAGE", BRANDLINX", BRANDKEY REQUEST", TRADEMARK", PRODUCT-TYPE", UPC-ENCODED-APPLET-DOWNLOAD, and SEND-IT-HOME™, respectively. Each of these information services is accessible to consumers and sales clerks alike from a BRANDKEY REQUEST RETAILER" Website (e.g. BRANDKEY REQUEST RETAIL" @ Home Depot Website) accessed within a retail store, as well as from on the BRANDKEY REQUEST CENTRAL" Website.

In the BRANDKEY REQUEST" version of the IPI Finding and Serving Subsystem of the present invention, the BRANDLINX" provision is supported during and enabled by Manufacture/Product Registration Mode; the HOME-PAGE" provision is supported during and enabled by the Manufacturer Website Search Mode; the BRANDKEY REQUEST" provision is supported during and enabled by UPN-Directed Information Access Mode; TRADE-MARK" provision is supported during and enabled by the Trademark-Directed Search Mode; PRODUCT-TYPE" provision is supported during and enabled by the Product-Description Directed Search Mode; and UPC-ENCODED-APPLET-TAG-DOWNLOAD/DISTRIBUTE service supported during and enabled by the UPC-Encoded Applet Tag Download/Distribution Mode. Each of these system modes has been described in great detail hereinabove.

To constantly remind the public at large of the fee-paying sponsors of the BRANDKEY REQUEST" System, all Web pages displayed by the BRANDKEY REQUEST" System in a retail store (e.g. on BRANDKEY REQUEST RETAIL" @ Home Depot Website), or on the BRANDKEY REQUEST CENTRAL" Website, will be displayed within a three-frame display framework comprising a sponsor frame, a control frame, and an information frame.

The "sponsor frame", located on the upper-most portion of the Internet browser screen, displays the sponsor's greeting such as, for example, "Welcome to BRANDKEY REQUEST™, sponsored by Visa and Federal Express."

The "control frame", located on the left-most side of the Internet browser screen, will provide six mode activation buttons. The first mode activation button 21A enables manufacturers to request the BRANDLINX™ service. The second mode activation button 21B enables consumers to request the HOME-PAGE™ service. The third mode activation button 21C enables consumers to request BRANDKEY REQUEST service. The fourth mode activation button 21D enables consumers to request TRADE-MARK™ service. The fifth mode activation button 21E enables consumers to request PRODUCT-TYPE™. The sixth mode activation button 21F enables consumers to request UPC-ENCODED-APPLET-DOWNLOAD/DISTRIBUTE™. A seventh button 21G enables the launching of the SEND-IT-HOME™ e-mail transport service of the present invention. An additional button can be provided to enable the download a free plug-in software module which automatically installs a "Product Information" button on the graphical user interface of the consumer's Internet browser, so that the BRANDKEY REQUEST CENTRAL™ Website can be accessed anywhere in the world with a single click of the mouse button on any pointing device.

The "information frame", occupying the balance of the Internet browser screen, will display: all HTTP (i.e. Web) and FTP pages launched by in-store scanning of UPC-labeled products during HOME-PAGE™ or BRANDKEY REQUEST™; all HTTP and FTP pages launched by clicking on hypertext-links embedded within Web pages accessed through a particular BRANDKEY REQUEST RETAIL™ Website in retail stores or from the BRANDKEY REQUEST CENTRAL™ Website; as well as all information search and display (menu) screens served by a BRANDKEY REQUEST RETAIL™ Website to the BRANDKEY REQUEST™ Central Website.

While the web-enabled kiosks of the present invention 13 have been shown herein as employing a commercial-type Internet browser program (i.e. http client program), preferably with instructions on browsing in retail shopping environments, it is understood that the browser programs employed in such kiosks can be customized for each retailer in whose store the kiosk is installed, and could be provided with "minimal" browser control buttons (e.g. Page Forward →, Page Backward ←, Stop ⊗, and Reload), which, in cooperation with the control buttons in the control frame 20B, provide a suitable GUI for use in both brick and mortar and electronic retail shopping environments.

In retail stores subscribing to the BRANDKEY REQUEST™ System, HOMEPAGE™ manufacturer's Website search service will enable consumers to automatically access the WWW Home Page of any registered manufacturer by scanning the UPC (or UPC/EAN) bar code symbol on any product thereof using the bar code symbol reader associated with a. BRANDKEY REQUEST™ kiosk. In general, the BRANDKEY REQUEST™ kiosk can be realized by any Web-enabled computer system 13 having an Internet browser program, on-line access to the BRANDKEY REQUEST™ Retailer Website, and optionally a touch-screen display panel. The BRANDKEY REQUEST™ kiosk may, however, be realized as an inexpensive Internet access terminal comprising a Web-enabled network computer (NC), an LCD touch-screen panel, and a laser scanning bar code symbol reader integrated within an ultra-compact housing that is mountable within diverse locations within retail stores. As shown in FIG. 3A5, the BRANDKEY REQUEST™ kiosk may also be integrated within a conventional Point Of Sale (POS) station having a laser scanning bar code symbol reader and a large rotatable LCD display panel. Being as easy to install as a telephone modem, BRANDKEY REQUEST™ kiosks of this design can be widely deployed throughout retail stores worldwide with minimal modifications to the preexisting information infrastructure, and illustrated hereinabove.

At home, in the office, or on the road, HOME-PAGE™ search service enables consumers to automatically access the WWW Home Page of any registered manufacturer by entering the UPN (or UPC/EAN number) on any product into the search screen served up by a particular BRANDKEY REQUEST™ Retailer Website, or by the BRANDKEY REQUEST™ Central Website.

BRANDLINX™ information service, carried out using EDI (or XML/EDI) based UPN/TM/PD/URL Database Management software (downloaded from Manufacturer/Product Registration Subsystem 33), enables manufacturers to simply relate (link), manage and update therein (i) the UPN, the trademark (TM) and the generic product descriptor (PD) on any product with (ii) the Internet address (i.e. URL) of product-related Web pages published on the Internet by the manufacturer, its agents, or others, for subsequent access and display by consumers using BRANDKEY REQUEST™. While the BRANDLINX™ service could be made accessible through BRANDKEY REQUEST™ kiosks 13 in retail stores (i.e. for the sake of vendors who frequent the same), the actual UPN/TM/PD/URL information linking, management and transport operations associated with the BRANDLINX™ service will typically occur in the "back-offices" of registered manufacturers using Internet-enabled computer systems accessing BRANDLINX™ through a hot-linked URL posted on the BRANDKEY REQUEST™ Retailer Website and/or the BRANDKEY REQUEST™ Central Website.

UPC-ENCODED-APPLET-DOWNLOAD/DISTRIBUTE™ information service, carried out using EDI (or XML/EDI) based processes, enables manufacturers (via the system administrator) to distribute CPIR-enabling Applets/Servlets to retailers, manufacturers, advertisers and others about the globe so that they may embed the same within HTML-encoded documents in order that consumers can instantly initiate single mouse-click UPN-Directed, Trademark-Directed and/or Product-Descriptor-directed CPI searches within the centralized UPN/TM/PD/URL RDBMS 9 hereof and display the search results within a CPID-enabling Java GUI which performs the function of a "virtual-kiosk" provided at the consumer's point of presence on the WWW. In the context of the illustrative embodiment of the system of the present invention, such single mouse-click initiated CPI searches solve a major fear of most retailers in both Physical and Cyber Space retail environments, namely: getting a customer into their store, and then having them step out to get some more advice, information or endorsement before making a purchase, or worse yet, never returning to make a purchase, and instead shopping elsewhere for the sought after product.

The BRANDKEY REQUEST™ CPI search service, accessible through a particular BRANDKEY REQUEST RETAIL™ Website or the BRANDKEY REQUEST CENTRAL™ Website, enables consumers at home, in the office, on the road, and in retail stores, to quickly access particular types of product-related information which have been published on the WWW by registered manufacturers, their agents and others about consumer products registered with the BRANDKEY REQUEST™ RDBMS. BRANDKEY REQUEST™ displays such product-related information in a menu-like format organized by particular information types (e.g., Product Advertisements, Product Endorsements, Product Reviews, Product Rebates and Incentives, Product Description, Product Manual/Instructions, Product Updates (at FTP Sites), Product Returns, Warranty and Repair Service, Direct Product Purchase, Retailers, Wholesalers, Complementary Products, Company Annual Report, Stock Purchase, etc.). Each displayed information menu associated with a consumer product contains hyper-linked URLs pointing to HTML-documents containing particular types of product-related information linked to the product by the manufacturer or its agent.

When BRANDKEY REQUEST™ CPI search service is selected from a particular BRANDKEY REQUEST RETAIL™ Website, each product-related Web page listed in the displayed "information menu" can be accessed and displayed simply by touching the corresponding Internet address (i.e. URL) displayed on the touch-screen display panel of the BRANDKEY REQUEST™ kiosk in the retail store. When BRANDKEY REQUEST™ is selected from the BRANDKEY REQUEST CENTRAL™ Website, each product-related Web page listed in the displayed "information menu" can be accessed and displayed simply by clicking the display screen thereof accessed by an Internet-enabled computer system.

TRADE-MARK™ CPI search service, accessible through a particular BRANDKEY REQUEST™ Retail Website or the BRANDKEY REQUEST™ Central Website, enables consumers to quickly access particular types of product-related information from the BRANDKEY REQUEST™ Database, by using the trademark or trade name of the related product. When this mode of service is requested, a search screen is displayed within the information frame so that the consumer or sales clerk can enter the trademark or trade name for the related consumer product.

PRODUCT-TYPE™ CPI search service, accessible through a particular BRANDKEY REQUEST RETAIL™ Website or the BRANDKEY REQUEST CENTRAL™ Website, enables consumers to quickly access particular types of product-related information from the BRANDKEY REQUEST™ Database, by using a descriptive term for the related product. When this mode of service is requested, a search screen is displayed within the information frame so that the consumer or sales clerk can enter a descriptive term for the related consumer product.

SEND-IT-HOME℠ e-mail service, accessible through a particular BRANDKEY REQUEST RETAIL™ Website or BRANDKEY REQUEST CENTRAL™ Website, enables a consumer to send to a desired e-mail address at home, work or elsewhere, consumer product information on the WWW, accessed from a Web/e-mail-enabled kiosk in a retail shopping environment.

To maximize value to a particular retail store's customers, each BRANDKEY REQUEST RETAIL™ Website served at each retail store subscriber would be made accessible to consumers outside their retail stores (e.g. at home, in the office or on the road) by several Internet access methods including, for example: through a hot-linked URL posted on the retail store's Website, pointing to the BRANDKEY REQUEST RETAIL™ Website; through a publicly accessible URL, etc.

Application of the System and Methods of the Present Invention to Print and Electronic Publishing Industries Notably, newspaper and magazine articles, product and service brochures, product discount coupons, certificates, documents and other forms of information-carrying products embodied within a print medium (e.g. paper, plastic, metal, glass, etc.) are properly deemed "consumer products" within the scope and spirit of the present invention, regardless of whether of not such products are assigned a UPC or UPC/EAN label by its manufacturer (e.g. publisher/printer). Thus, the system and methods of the present invention described hereinabove can be used to manage and serve print-media related information on the WWW to consumers (e.g. readers), relating to particular publications (e.g. articles, stories, product advertisements, etc.) embodied in a published print-medium.

Stated more specifically, the system and methods of the present invention can be used to manage symbolic links created between (i) an UPN uniquely assigned to an information carrying product or object embodied in any form of media (e.g. printed publication existing in physical space, or other form of information carrying media), and (ii) the URL specifying the location of an information resource (e.g. Web document) on the Internet (e.g. WWW). In such application environments, the UPN can be any unique number assigned to the information-carrying product embodied in any physical medium. In general, each UPN can be expressed in numerical or alphanumerical form, and in the case of print-type media, will be encoded within a machine-readable structure, such as a bar code symbol structure, associated with the information-carrying product. Preferably, each unique UPN will be assigned to the information-carrying product by a source of an authority assuming managerial responsibility for the universal product/service (i.e. object) numbering system being used. Such organizations may be public, quasi-public, or private, depending on the circumstances at hand.

In general, Web-based information resources located at URLs to be symbolically linked to particular UPNs assigned to information carrying products by a particular publisher can be served from any Internet (http) information server, including e-commerce enabled servers 12, 12', 12A and 12B, shown in FIGS. 2-1 and 2-2 and described in great detail hereinabove.

The UPN/TM/PD/URL link management subsystem 9, server 33, administration computer 32, and the EDI-enabled client subsystems shown in FIGS. 2-1, 2-2, 2A, and 2C, and described in great detail hereinabove can be used by publishers (e.g. a particular type of product manufacturer) to symbolically link each UPN assigned to particular information carrying products (e.g. newspaper and magazine articles, product advertisements, etc.) to one or more URLs specifying product-related information on the Internet.

As shown in FIG. 2D, a plurality of publisher-operated client subsystems (i.e. manufacturer-operated client subsystems) are connected to a local or wide area TCP/IP-based network, for the purpose of enabling different departments within the publishing organization (e.g. advertising, world news, business, technology, sports, finance, education, arts and leisure, etc.) manage different types of UPN/TM/PD/URL links based on the type of information contained within the URL-specified information resource on the WWW. In the back-offices of publishing firms (e.g. newspaper publishing houses, magazine publishers, product advertisement flyer publishers/printers, product coupon publishing/marketing firms and the like) UPN/TM/PD/URL data link management operations will be carried out prior to print publication using distributed UPN/TM/PD/URL link management methods.

In the case of a newspaper or magazine publisher firm, each client computer subsystem within a particular department (e.g. sports, international news, national news, local news, business, arts & entertainment, science & technology, etc.) as shown in FIG. 2D, would be provided with one or more of the following software programs, namely: (i) computer-based publishing software having integrated UPN/TM/PD/URL data link management capabilities; and (ii) UPN/TM/PD/URL management software in the form of a stand-alone application or utility.

Operation of computer-based publishing software with integrated UPN/TM/PD/URL data link management capabilities is shown in FIGS. 2E1 and 2E2. In general, this publishing software program has at least three modes of operation, namely: (1) a composition/editorial mode illustrated in FIG. 2E1, in which literary and graphical content can be composed and edited in much the same way as conventional word processing and graphics programs; (2) a UPN/TM/PD/URL data linking mode illustrated in FIG. 2E2, in which the author/composer can create symbolic links between URL indexed sections of Web documents and UPN indexed sections of print-media documents, using drag, drop and click procedures similar to those used in conventional "flow charting" and graphics software programs; and (3) a UPN/TM/PD/URL data link table generation mode, in which a "UPN/TM/PD/URL data link table" is generated for each corresponding set of Web and print-media documents, as shown in FIG. 2E3, and is electronically transportable to the UPN/TM/PD/URL RDBMS 9 hereof using electronic data interchange techniques described in detail hereinabove.

In the first and second modes of operation, in a split-screen structure 300 as shown in FIG. 2E1 is displayed, wherein the first (e.g. left) side document frame 301 contains information relating to a particular Web document and has an independent scroll bar 302 within a 304B windows-type GUI-based data structure, and wherein second (e.g. right) side document frame 303 contains information relating to a particular print-media document and has an independent scroll bar 304 within a windows-type GUI-based data structure. By providing such a split-screen display screen GUIs in both of these modes of operation, the publishing software program of the present invention enables the author to independently scroll literary and graphical context in the Web document frame 301 of the GUI, and the print-media document frame 303 thereof, thereby facilitating alignment of corresponding sections during both the composition/editorial mode of operation as well as during the UPN/TM/PD/URL data linking mode of operation.

When in the composition/editorial mode, the publishing software program of the present invention enables the electronic layout of a Web-based document or publication (e.g. expressible in HTML or SGML code) 300 in frame 301, and a print-media based document or publication (e.g. expressible in a desired font) in frame 303, as shown in FIG. 2E1. As shown therein, the Web-based document in frame 301 has different content and advertising sections 306 and 308 associated with each Web page thereof and each such Web page being located on the WWW at a particular URL. The print-media based document in frame 303 has different content sections and advertising sections 310 and 312 associated with each printed-page thereof. As illustrated in FIGS. 2E1, each content section in the Web-based document is assigned a Universal Product Number (UPN) (i.e. UPN-encoded bar code symbol) which is symbolically linked or related to a particular content section on the corresponding Web-page located at a specified URL. Likewise, each advertising section in the Web-based document is assigned a Universal Product Number (UPN) which is symbolically linked or related to a particular advertising section on the corresponding Web page located at a specified URL. During the composition/editorial mode of operation, content in the Web and print-media documents is displayable in the split-screen display structure 300, so that a particular content section in a Web document is displayed along side of the corresponding section in a print-media document.

Typically, the author enters the a URL/UPN (or UPN/TM/PD/URL) data linking mode of operation of the program, shown in FIG. 2E2, after authoring or otherwise composing literary and/or graphic context within (i) a specific content section on a particular Web document and (ii) a corresponding content section on a particular print-media document. While in this mode of operation, the author is able to create "UPN/TM/PD/URL data links" between pairs of corresponding content sections, pairs of corresponding advertising sections, and/or pairs of content and advertising sections. In accordance with the principles of the present invention, such UPN/TM/PD/URL data links are created by (1) drawing graphical boundaries around the content (or advertising) section on a particular Web document using a mouse-pointing device and automatically assigning thereto a relative URL index 400 as shown in FIGS. 2E2 and 2E3; (2) drawing graphical boundaries around the corresponding content (or advertising) section on the corresponding print-media document and automatically assigning thereto a UPN (i.e. UPN-encoded bar code symbol) as shown in FIG. 2E2 (e.g.

obtained from the system administrator using on-line or real-time UPN assignment methods implemented over the Internet); and (3) then drawing a graphical link between such graphically bounded sections between the Web and print-media documents displayed in frames 301 and 303. During this mode of operation, the UPN/TM/PD/URL data links are graphically represented as double-arrow type links for the author to review, and are editable in much the same manner that such graphical elements are created and edited. However, when returning to the composition/editorial mode, such graphical links are suppressed, and instead, alphanumeric type UPN/TM/PD/URL links are displayed on the Web and print-media documents.

After the Web and print-media documents have been finalized and approved for publishing, the computer-based publishing program of the present invention enters the UPN/TM/PD/URL data link table generation mode, shown in FIG. 2E3. In this mode, a UPN/TM/PD/URL data link table 400 is generated for each corresponding set of Web and print-media document, as shown in FIG. 2E3. Thereafter, this data table is electronically transportable to the UPN/TM/PD/URL RDBMS 9 hereof using electronic data interchange techniques described in detail hereinabove. This ensures that the UPN/TM/PD/URL data links are stored in the UPN/TM/PD/URL RDBMS 9 hereof so that when the UPNs (on published print-media) are entered into the browser of a client subsystem 13 hereof, pointing to an IPI Website of the present invention, the corresponding URL or set thereof is automatically displayed thereon.

The above-described publishing software program will have great value in publishing applications where both Web and print-media versions of documents, articles and the like are simultaneously published on the WWW and in the world of print-media, as in the case of many newspapers, magazines, journals, subscriptions, product discount flyers, and the like. In such instances, each publication will have numerous "Sections" or "Parts", classified by the type of subject matter being addressed, and contributed to by authors and composers from categorically different departments (e.g. business, sports, world news, local news, arts and entertainment, technology, etc.). Thus, in such instances, a "client" copy of the publishing program of the present invention discussed above will run on different client computing subsystems on the LAN or WAN of the publisher, as shown in FIG. 2D, while a "server" copy runs on at least one client computing subsystem on the LAN or WAN. Such a client-server solution enables an editorial manager to oversee the entire Web/print-media publication process, while individual writers are permitted to labor on their literary and graphical art assignments, whatever they may be. In short, the novel publishing tools and methods of the present invention have now made linking the worlds of electronic and print-media simple, efficient and reliable.

In some publishing applications such as coupons, books, financial instruments, notes, product specifications, and the like, there is a need for an alternative way of and means for creating UPN/TM/PD/URL data links between the print-media and electronic media worlds, and automatically generate UPN/TM/PD/URL data link tables for electronic transport to the UPN/TM/PD/URL RDBMS 9. In this alternative embodiment of the present invention, shown in FIGS. 2E4 and 2E5, the way of and means for UPN/TM/PD/URL data linking is realized by an operating system (OS) based function that enables the author to generate "UPN/TM/PD/URL data links between (i) Web documents authored using a first arbitrary content-creating browsing application (e.g. Netscape Navigator browser, HTML Editor program) running on a computing platform, and (ii) UPN-encoded elements of print-media authored using a second arbitrary content-creating/browsing application (e.g. Adobe® Illustrator drawing program or Microsoft Word® word processing program) running on the same platform.

In practice, such UPN/TM/PD/URL data linking capabilities are integrated into the multi-tasking and/or multi-threading operating system (OS) (e.g. MAC OS, Window 2000, MS NT, Linux, etc.) on the client computer used to run the first and second arbitrary content-creating/browsing applications 330 and 332, shown in FIG. 2E4. For illustrative purposes, the first application 330 is the Netscape Navigator browser, whereas the second application 332 is the Adobe® Illustrator graphics program. UPN/TM/PD/URL data links produced from this OS-based UPN/TM/PD/URL data linking functionality are stored in a UPN/TM/PD/URL data link GUI table 400 shown in FIG. 2E4, and are electronically transportable to the UPN/TM/PD/URL RDBMS 9 using electronic data interchange techniques described hereinabove. The end result of this OS-based UPN/TM/PD/URL data linking function of the present invention is to enable consumers (e.g. readers) to create UPN/TM/PD/URL data links between print-media documents and corresponding Web-based media documents, and also, to transport the same to the UPN/TM/PD/URL RDBMS 9 hereof.

In FIG. 2E4, the OS-based UPN/TM/PD/URL data linking function (i.e. utility) is shown in its composition/editorial mode, wherein the GUI-based window for the first content creating/browsing application 330 is displayed on the OS GUI, along with the GUI-based window for the second content creating/browsing application 332, and the GUI-based window for the UPN/TM/PD/URL Data Link Table/Palette 400.

In FIG. 2E5, the OS-based UPN/TM/PD/URL data linking function (i.e. utility) is shown in its UPN/TM/PD/URL Data Linking Mode, wherein graphically expressed UPN/TM/PD/URL data links are created in a manner similar to that carried out in the first illustrative embodiment shown in FIGS. 2E1 through 2E3 and described hereinabove.

In the UPN/TM/PD/URL data-linking mode, the UPN/TM/PD/URL table is generated and electronically transported to subsystem 9 hereof.

Preferably, the OS-based UPN/TM/PD/URL data linking utility of the present invention is launchable by selecting a command in a pull-down or like window provided on the OS GUI. Once this utility has been launched, then its different modes of operation can be selected by a designated control button provided on the windows-based GUI-structure for the UPN/TM/PD/URL link.

Notably, by using the EDI-based UPN/TM/PD/URL data link management and serving techniques of the present invention, described in great detail hereinabove, publishers of print-media based products can quickly update the UPN/TM/PD/URL RDBMS 9 to contain current UPN/TM/PD/URL links created only minutes before hand in the back-offices of the publishing firm (e.g. just after final approval by the chief editor assigned to a particular print-media publication). This enables consumers to automatically link to related URLs at the time distribution of the print publication, using Web-enabled client subsystems 13 in accordance with the principles of the present invention.

Modifications of and Extensions to the System and Method of the Present Invention to Provide an Integrated Solution to the Diverse Problems Encountered by Manufacturers, Retailers, E-Retailers, the Advertising and Promotional Agents thereof, and Consumers Along the Demand-Side of the Retail Chain.

By integrating the functionalities provided by systems 2 and 2A shown in FIG. 1, the consumer product information related network thereof is transformed into a "functionally-integrated" consumer product marketing, merchandising and education/information system network 2', as shown in FIG. 9 et seq. As will be described in greater detail hereinafter this system 2', a subsystem within the Internet-based Consumer Product Related Information Collection, Management, and Communication System 1, enables manufacturers, retailers, their respective agents, and consumers to carry out (i.e. perform) four (4) basic product-related functions along the demand-side of the retail chain, namely: (1) enabling manufacturers' marketing, brand and/or product managers to create and manage a composite brand image for each consumer product being offered for sale in both physical and electronic marketplaces; (2) enabling manufacturers, retailers, and their advertising and marketing agents to display consumer product advertisements to consumers, at or near the point of purchase or sale within both physical and electronic retail shopping environments, in a way which is guaranteed to project the manufacturer's intended brand image while positively influencing product demand; (3) enabling retailers, manufacturers, and their marketing and promotional agents to promote consumer products with consumers within physical and electronic retail shopping environments in order to positively influence (i.e. reduce) the supply of such products in inventory and promote sales and profits; and (4) enabling consumers to request and obtain reliable information about a manufacturer's product in order to make informed/educated purchases along the demand side of the retail chain, while enabling retailer purchasing agents to request and obtain reliable information about a manufacturer's product in order to make informed/educated purchases along the supply side, thereby influencing product demand in a positive manner.

Figure 9A:
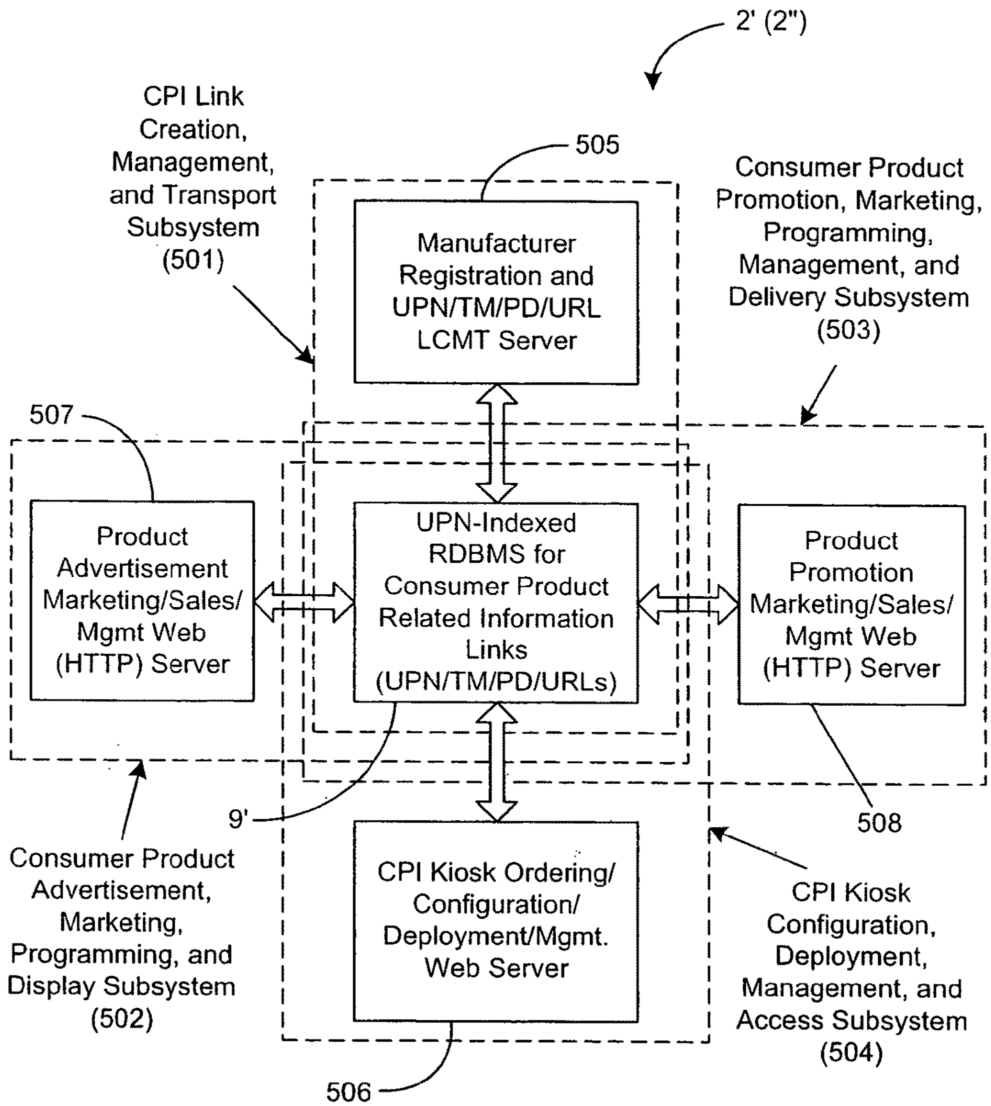
FIG. 9A is a schematic representation of the Internet-based Consumer Product Marketing, Merchandising and Education/Information Subsystem of FIG. 9, wherein four distinct product function performing subsystems, namely, (1) Consumer Product Related Information Link Creation, Management And Transport Subsystem, (2) Consumer Product Advertisement Marketing, Sales, Management And Delivery Subsystem, (3) Consumer Product Promotion Marketing, Sales, Management and Delivery Subsystem, and (4) Consumer Product Information Kiosk Configuration, Deployment, Management and Access Subsystem are integrated about a common Internet-enabled UPN-indexed RDBMS for managing UPN-indexed consumer product related information in accordance with the principles of the present invention.

In order to enable manufacturers, retailers, their agents, and consumers to simply and reliably carry out these four product-related functions in an integrated manner, the consumer product marketing, merchandising and education system/network 2' illustrated in system architecture schematic of FIG. 9A comprises four functionally-integrated Internet-based information subsystems, namely: an Internet-Based Consumer Product Information (CPI) Link Creation, Management and Transport (LCMT) Subsystem 501; an Internet-Based Consumer Product Advertisement Marketing, Programming, Management and Delivery Subsystem 502; an Internet-Based Consumer Product Promotion Marketing, Programming, Management and Delivery Subsystem 503; and Consumer Product Information (CPI) Kiosk Configuration, Deployment, Management and Access Subsystem 504.

The primary functions of the Internet-Based CPI Link Creation, Management and Transport Subsystem are to enable a manufacturer, as to anyone else operating along the retain chain as a vendor of consumer products (which may also include retailers as well), to register with the system, and download software-based EDI-enabled UPN/TM/PD/URL link creation, management and transport tools 511. as well as technical support and materials therefor, to registered manufacturers, and their agents, so as to enable the manufacturer's marketing, brand and/or product managers (and their support personnel) to create and manage (within their back offices) a list of UPN/TM/PD/URL links for each consumer product within their product/brand portfolio. In accordance with the present invention, these UPN/TM/PD/URL links are used to build and maintain a dynamic and robust manufacturer-managed UPN/TM/PD/URL link database 511 essential for supporting and operating the other functionally-integrated subsystems comprising system 2'. Using downloaded UPN/TM/PD/URL LCMT software 511, UPN/TM/PD/URL information-link lists for each product are stored in a locally managed UPN/TM/PD/URL link RDBMS 512, typically within the manufacturer's enterprise, and periodically are electronically transported to the central (and preferably mirrored) UPN/TM/PD/URL Link RDBMS 9'. These UPN/M/PD/URL links are then distributed globally to consumers having access to physical and virtual CPI kiosks of the present invention 513 and 514, respectively, from which such information-link lists are displayed in the form of a UPN/TM/PD/URL link display GUI 515 for use in accessing valuable brand-creating information about the related consumer product.

The primary functions of the Consumer Product Kiosk Configuration, Deployment, Management and Access Subsystem 504 are to enable: (1) retailers and their agents to configure, deploy and manage physical and virtual CPI kiosks in retail shopping space 516; (2) manufacturers and their agents to configure, deploy and manage virtual CPI kiosks anywhere along the HTML-fabric of the WWW (outside physical retail shopping space); (3) advertisers, auctioneers, publishers, writers, critics, Web-site developers, masters and others to download CPIR-enabling Applet tags and install "product-specific" virtual CPI kiosks at licensed domains on the WWW; and (4) consumers, including retail purchasing agents, to access physical and virtual CPI kiosks in the retail world, and request CPI links (e.g. UPN/TM/PD/UPN links) that have been carefully created and managed by the marketing, brand and/or product managers of the manufacturer, so that such informational links, once received by the consumer at a Web-enabled client subsystem, can be used to access and display media-rich Internet-based (e.g. HTML, XML, ftp, mail, etc.) information resources published on the WWW about the consumer product. Thus, subsystem 504 comprises: (i) a network of barcode-driven/touch-screen operated physical CPI kiosks 513, each installed within a "brick and mortar (B&M)" type retail environments using wireless Internet-connectivity enabling technology, and made accessible to millions of retail shoppers across the globe; and (ii) a network of CPIR-enabling Applet driven virtual CPI kiosks 514, each symbolically embedded within the HTML-fabric of the WWW (e.g. in EC-based retail stores and catalogs, on-line auction sites, Internet product advertisements, etc.) as the described hereinabove, and made accessible to millions of retail shoppers across the Internet. These system elements have been described in great detail hereinabove.

The primary functions of the Internet-Based Consumer Product Advertisement Marketing, Programming, Management and Delivery Subsystem 502 are to enable advertisers of manufacturers (and retailers) to: (1) register with the system; (2) buy randomly-allocated advertising slots on particular retailer-deployed physical barcode-driven CPI kiosks 513 (and/or retailer-deployed virtual CPI kiosks 514); (3) build kiosk-based product advertising campaigns within physical and electronic retail space 516; (4) execute such kiosk-based advertisement campaigns by having short UPC-indexed (QuickTime® or Superstitial™ video) product advertisements delivered to consumers over a network of physical and/or virtual CPI kiosks 513, 514, deployed within physical and/or electronic retail shopping space 516, preferably during moments when consumers are not requesting CPI from the system 2'; and (5) manage such kiosk-based product advertisement campaigns as required by the needs and conditions of the advertiser, to determine their effectiveness by comparing sales data collected at physical or virtual point-of-sale (POS) stations with UPON-indexed advertisements displayed to consumers in the same retail shopping space in which the participating physical and/or virtual CPI kiosks are deployed.

The primary function of the Internet-Based Consumer Product Promotion Marketing, Programming, Management and Delivery Subsystem 503 is to enable the retailer, as well as the manufacturer and their promotion agents to: (1) register with the system; (2) buy randomly-allocated promotion slots on particular retailer-deployed physical barcode-driven CPI kiosks 513 (and/or retailer-deployed virtual CPI kiosks 514); (3) build kiosk-based product promotion campaigns within physical and electronic retail space; (4) execute such kiosk-based promotion campaigns by having short UPC-indexed (QuickTime® or Superstitial™ video) product promotions delivered to consumers over a network of physical and/or virtual CPI kiosks deployed within physical and/or electronic retail shopping space 516, preferably during moments when consumers are not requesting CPI from the system; and (5) manage such kiosk-based product promotion campaigns as required by the needs and conditions of the advertiser, to determine their effectiveness by comparing sales data collected at physical or virtual point-of-sale (POS) stations with UPN-indexed promotions displayed to consumers in the same retail shopping space in which the participating physical and/or virtual CPI kiosks are deployed.

While each such subsystem shown in FIG. 9A and described above performs a different set of product-related functions along the demand side of the retail chain, each of these subsystems is built upon and uses diverse types of information contained within the common centralized (typically mirrored) UPC/TM/PD/URL RDBMS 9' which stores UPN-indexed CPI links, i.e. UPN/TM/PD/URL link records, including URLs pointing to Web-based product advertisements and sales-promotions, and diverse types of information records relating to the various participants in the system hereof, as well as the primary structures involved in the methods supported thereby, as shown in FIGS. 15A through 15MM. The UPN/TM/PD/URL links in the RDBMS 9' are collaboratively managed by manufacturers' marketing, brand and/or product managers and support personnel across their enterprises using electronic data interchange (EDI) techniques in the manner detailed hereinabove. As will be described in greater detail hereinafter, these UPN/TM/PD/URL links are also data processed (i.e. filtered) in various ways prior to distribution to consumers over the physical and virtual CPI kiosk networks of the system, so as to preserve the trust, confidence and good will developed between manufacturers and retailers in both physical and electronic streams of commerce, thus ensuring delivery of the highest possible level of service and value to consumers, retailers and manufacturers alike. As will be described in greater detail, such data filtering operations involve using information about (i) the manufacturers represented (or promoted) by a particular retailer in a particular retail environment, as well as (ii) the rights and/or privileges accorded to product manufacturers and/or distributors (i.e. vendors) by retailers with regard to displaying a manufacturer's product in, for example, a particular aisle of the retailer's store and perhaps even at a particular shelf location therealong, as well as on a particular Web-page(s) of a retailer's electronic store or catalog (e.g. virtual aisles) and perhaps even at a particular location (i.e. virtual shelf location) therealong. In addition, novel data filtering operations are provided to generate kiosk-based advertising directories customized to each advertising and promotional agent registered with the system so that the directories list only CPI kiosks that have been effectively authorized by registered retailers as having been assigned particular manufacturer aisle/shelf rights/privileges in their physical and/or electronic retail stores.

The structure and function of these Internet-based information subsystems will be described in greater detail below.

Referring now to FIGS. 10A1 and 10A2, there is shown a more detailed schematic diagram of the functionally-integrated consumer-product marketing, merchandising, and education/information system 2' of the second illustrative embodiment of the present invention. As shown, system 2' is similar in all respects to the system 2 shown in FIGS. 2-1 and 2-2, except for the removal of system components 11, 31, 33 and 35, and the addition of the following system components, namely: a plurality of mirrored Physical And Virtual Multi-Mode Kiosk Server Subsystems (i.e. PVM kiosk server subsystems) 11A; a plurality of mirrored Web-Based (HTTP) Manufacturer Registration and UPN/TM/PD/URL Link Creation, Management And Transport (LCMT) Servers 505 operably connected to the infrastructure of the Internet; a plurality of mirrored Web-Based (HTTP) CPI Kiosk Ordering/Configuration/Deployment/Management Servers 506 operably connected to the infrastructure of the Internet; a plurality of mirrored Web-Based (HTTP) CPI Kiosk Advertisement Marketing/Sales/Management Servers 507; a plurality of mirrored Web-Based (HTTP) CPI Kiosk Promotion Marketing/Sales/Management Servers 508 operably connected to the infrastructure of the Internet; a plurality of Web-Based (HTTP) Consumer Product Advertising Servers 509; and a plurality of Web-Based (HTTP) Consumer Product Promotion Servers 510 operably connected to the infrastructure of the Internet. The structure and function of these system components will be described briefly below, and in greater detail hereinafter.

In the Internet-Based Consumer Product Related Information Link Creation, Management and Transport Subsystem 501, the primary function of the web-based manufacturer registration and UPN/TM/PD/URL link creation, management and transport (LCMT) server 505 is for (1) supporting manufacturer registration operations, (2) downloading UPN/TM/PD/URL link creation, management and EDI-enabled transport (LCMT) software described hereinabove to registered manufacturers, (3) installing and setting up such software within the manufacturer's enterprise, (4) selecting and customizing the GUI Design for the UPN/TM/PD/URL link display menu filled by the UPN/TM/PD/URL link creation, collection, management and EDI-enabled transport software 511 (e.g. including Manufacturer Customization Options, Default CPI Categories for linked URLs, Custom CPI Categories for linked URLs), (5) On-Line Training for UPN/TM/PD/URL Link Creation, Collection, Management and Transport Software, (6) Updating Manufacturer Registration Information, (7) Registering Manufacturer's Product Advertising Agents, (8) Registering Manufacturer's Product Promotional Agents; and central UPN/TM/PD/URL RDBMS 9'.

In the Consumer Product Information (CPI) Kiosk Configuration, Deployment, Management and Access Subsystem 504, the primary function of the web-based CPI kiosk ordering/configuration/deployment/management server 506 is for: (1) supporting retailer (and e-retailer) and manufacturer registration operations; (2) updating and displaying the Kiosk Deployment Directory for the registered retailer or manufacturer; (3) enabling retailers to select and order physical and/or virtual kiosks for deployment, and manufacturers to select and order virtual kiosks for deployment by the manufacturer or others; (4) specifying the location of physical kiosk installation and deployment, and the domain of virtual kiosk installation and deployment; (5) selecting particular information services to be enabled on and delivered to ordered/deployed CPI kiosks in order to configure the same for its intended application; (6) selecting and customizing the kiosk GUI Design (as a further part of the kiosk configuration process); (7) registering the manufacturer's Aisle/Shelf Rights and Privileges on deployed CPI kiosks; (8) registering the retailer's (or manufacturer's) advertising agents as the case may be; (9) registering the retailer's (or manufacturer's) product promotional agents as the case may be; (10) monitoring the performance of registered retailer (or manufacturer) advertising agents as the case may be; and (11) monitoring the performance of registered retailer (or manufacturer) promotional agents as the case may be.

In the Internet-Based Consumer Product Advertisement Marketing, Programming, Management and Delivery Subsystem 502, the primary function of the Web-Based CPI Kiosk Advertisement Marketing/Sales/Management Server 507 is to enable advertisers (e.g. employed by a particular manufacturer or retailer or working as an advertising agent therefor) to perform a number of functions, namely: (1) register with the system 2'; (2) log onto the Kiosk Advertisement Marketing/Sales/Management Web Site maintained by the system administrator or its designated agent; (3) view catalogs of physical and/or virtual CPI kiosks deployed within retail shopping environments by retailers, at which a registered advertiser can consider purchasing ad slots on manufacturer/retailer authorized physical and/or virtual CPI kiosks (e.g. at a price set by the user activity characteristics of the kiosk periodically measured by the http and/or Applet server enabling the same); (4) purchase advertisement slots on manufacturer/retailer-authorized physical or virtual CPI kiosks deployed in physical or electronic retail shopping space; (5) create, deploy and manage advertising campaigns over one or more physical and/or virtual CPI kiosks deployed by retailers in retail space; and (6) monitor the performance of kiosk-based advertising campaigns during execution, as required by client demands and prevailing business considerations, using any Web-enabled client subsystem 13.

In the Web-Based Consumer Product Promotion Marketing, Programming, Management and Delivery Subsystem 503, the primary function of the Web-based CPI Kiosk Promotion Marketing/Sales/Management Server 508 is to enable promoters (e.g. employed by a particular retailer or manufacturer or working as an promotional agent therefor) to perform a number of functions, namely: (1) register with system 2'; (2) log onto the CPI Kiosk Promotion Marketing/Sales/Management Web Site maintained by the system administrator or its designated agent; (3) view catalogs of physical and/or virtual CPI kiosks deployed within retail shopping environments by retailers, at which a registered promoter can consider purchasing or otherwise acquiring promotion slots on manufacturer/retailer-authorized CPI kiosks (e.g. at a price set by the user activity characteristics of the kiosk periodically measured by the http and/or Applet server enabling the same); (4) purchase or otherwise acquire (product sales) promotion slots on manufacturer/retailer authorized physical or virtual CPI kiosks deployed in retail shopping space; (5) create, deploy and manage product promotion campaigns over one or more physical and/or virtual kiosks deployed by retailers (or manufacturers) in retail space; and (6) monitor the performance of kiosk-based promotion campaigns as required by client demands and prevailing business considerations, using any Web-enabled client subsystem.

In the illustrative embodiment, the primary function of each Consumer Product Advertising Web Server 509 is to enable the publication of Internet-based product advertisements (e.g. QuickTime® videos from Adobe, Inc., Superstitial™ rich media advertisements from Unicast communications, Inc., etc.) for delivery to subnetworks of physical and virtual CPI kiosks in accordance with the principles of the present invention. As described in great detail hereinabove, these Web-based kiosk advertisements can be created by the registered advertiser using powerful authoring tools well know in the digital creation arts.

In the illustrative embodiment, the primary function of the Consumer Product Promotion Web Server 510 is to enable the publication of Internet-based product promotions (e.g. QuickTime® videos from Adobe, Inc., Superstitial™ rich media promotions from Unicast communications, Inc etc.) for delivery to subnetworks of physical and virtual CPI kiosks in accordance with the principles of the present invention. As described in great detail hereinabove, these Web-based kiosk promotions can be created by the registered promoter using powerful promotion authoring tools made available from the Web-based CPI Kiosk Promotion Marketing/Sales/Management Server 510, to be described in greater detail hereinafter.

Figure 11:
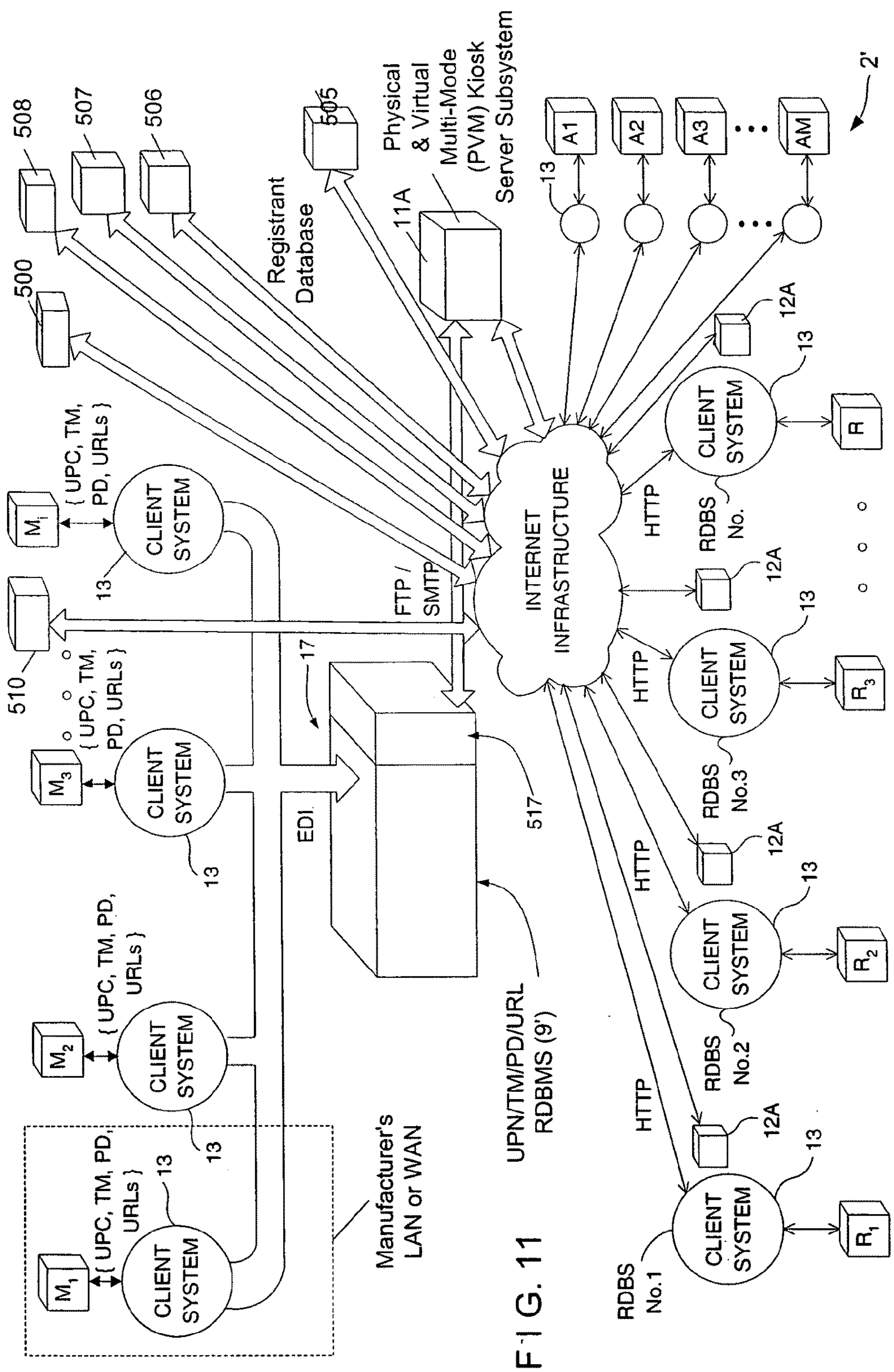

FIG. 11 illustrates the flow of CPI-type link data within the system shown in FIGS. 10A1 and 10A2, with the addition of information servers 505 through 510 described above. In all other respects, this schematic is similar to the one shown in FIG. 2A.

Figure 12:
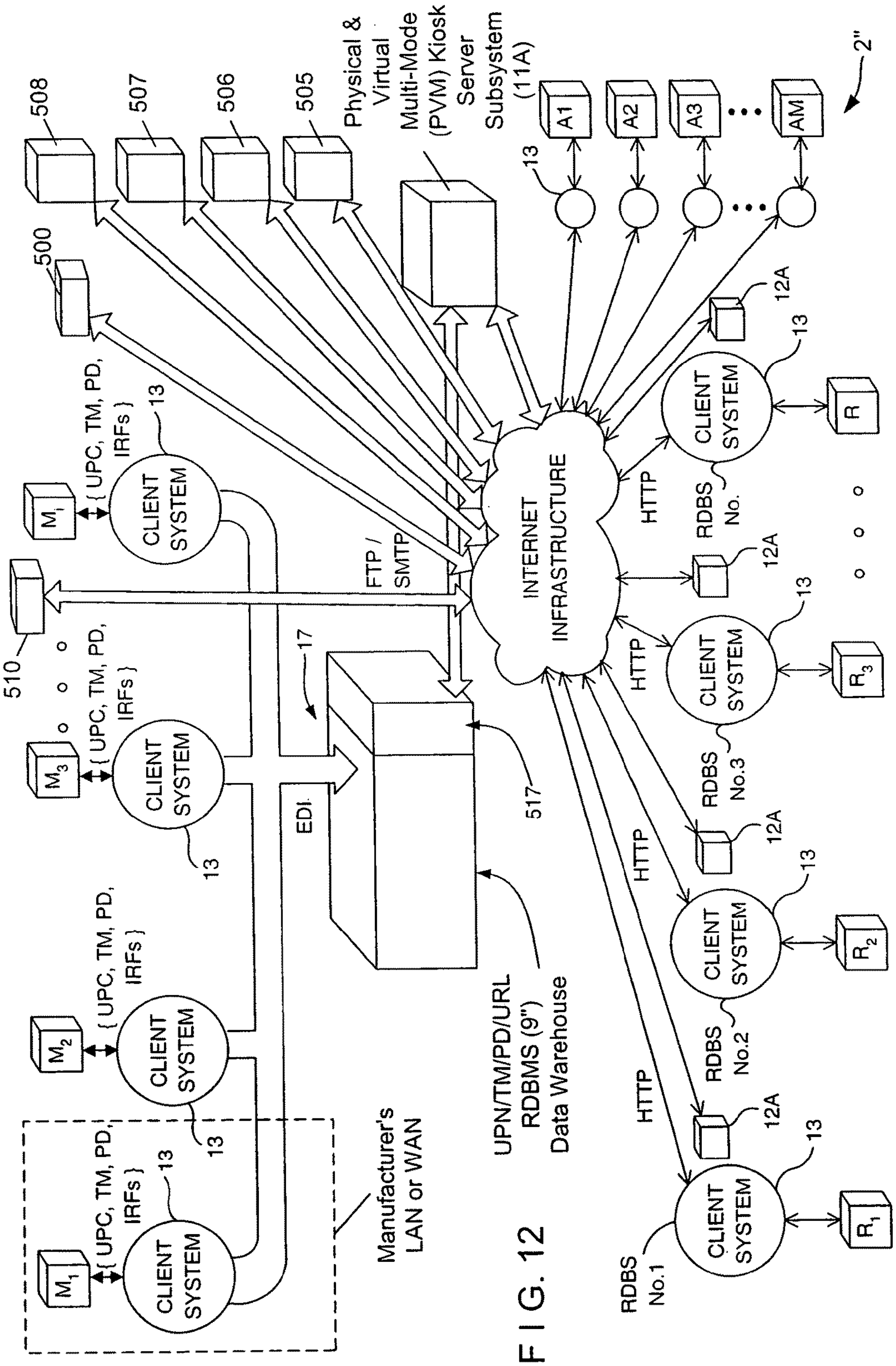

FIG. 12 illustrates the flow of CPI-type link content data within the system shown in FIGS. 10A1 and 10A2, appropriately modified so that instead of only UPN/TM/PD/URL links being transported from each registered manufacturer's enterprise (e.g. local UPN/TM/PD/URL RDBMS), UPN-indexed (media-rich) information resource files (i.e. IRFs) are also transported from the manufacturer's enterprise (e.g. local UPN/TM/PD/URL RDBMS 502) to a centralized UPN/TM/PD/IRF RDBMS 9" for central storage, management and distribution, as described above in connection with the illustrative embodiment shown in FIG. 2A'. In the illustrative embodiment shown in FIG. 12, the central UPN/TM/PD/IRF RDBMS 9" is realized as a massive centralized data warehouse using data warehouse technology known in the art. In all other respects, this schematic representation is similar to the one shown in FIG. 2B.

Figure 13:
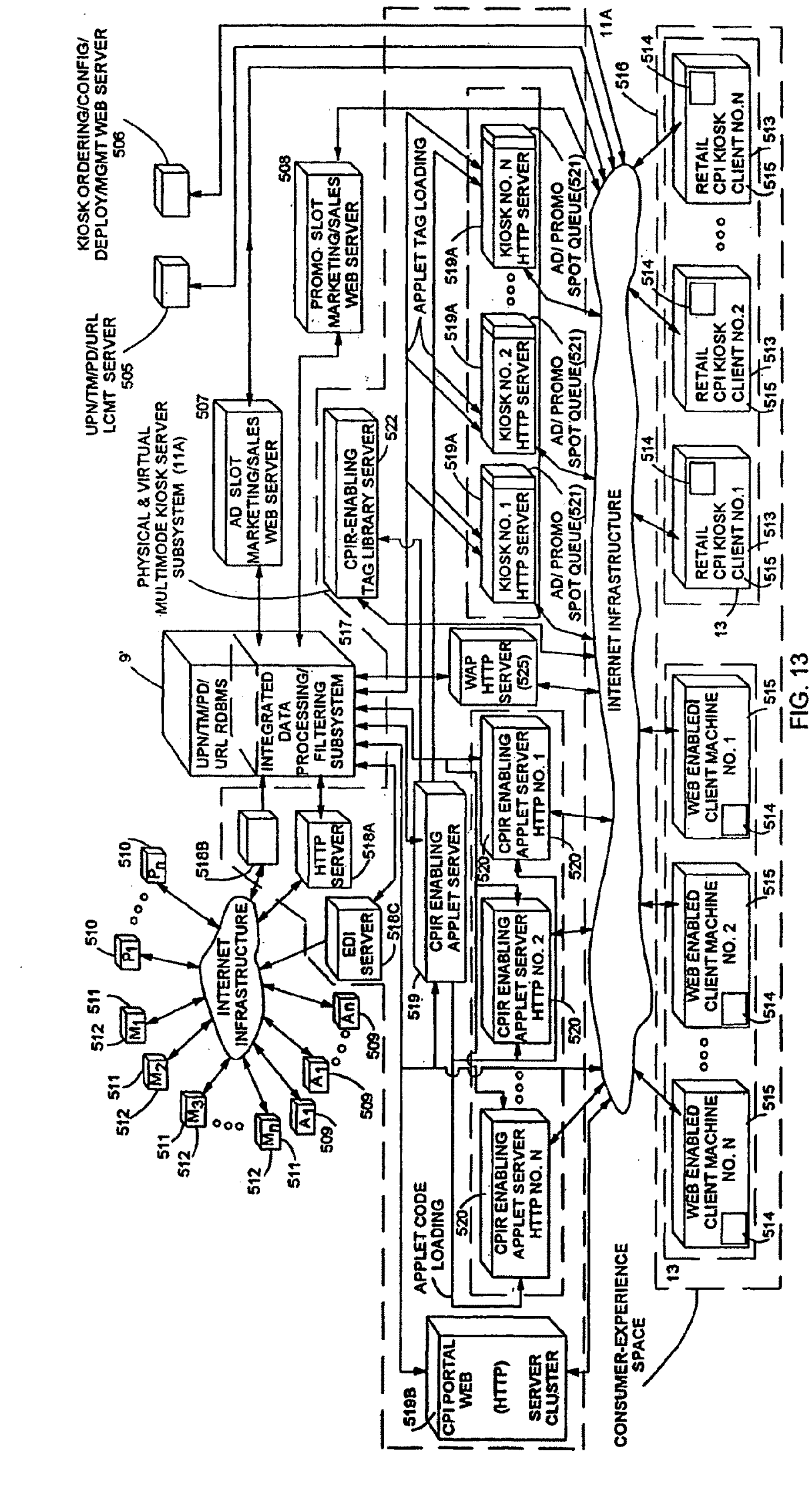
FIG. 13 is a block schematic diagram of the Internet-based system of the present invention comprising a plurality of manufacturer-operated client machines equipped with EDI-enabled UPN/TM/PD/URL management RDBMS software for (1) collecting UPN/Trademark/Product-Descriptor/URL links from manufacturers and their agents (contributing to the brand-images of their products), (2) managing such brand-forming information links within a UPN/TM/PD/URL RDBMS locally-maintained within each manufacturer's enterprise, and (3) transporting each such locally-managed UPN/TM/PD/URL RDBMS to a centralized UPN/TM/PD/URL RDBMS, for distribution to (i) consumers and end-users within physical retail environments having access to a plurality of physical CPI serving kiosks driven by a plurality of Web (http) servers operably connected to the infrastructure of the Internet, (ii) consumers and end-users within electronic retail environments having access to a plurality of virtual CPI serving kiosks driven by a plurality of CPIR-enabling Java Applet servers operably connected to the infrastructure of the Internet, and (iii) consumers and end-users interfaced with a plurality of Web-enabled client machines at home, school, in the office or on the road having access to a plurality of UPN-driven consumer product information portals (e.g. BrandKey Request Central™ WWW Site) on the WWW, driven by a plurality of mirrored http information servers operably connected to the infrastructure of the Internet.

Brief Overview of the Internet-Based Consumer Product Marketing, Merchandising and Education/Information System of the Second Illustrative Embodiment FIG. 13 is an alternative block schematic diagram of the Internet-based system shown in FIGS. 10A1 and 10A2, in which the primary system sub components are graphically indicated for the purpose of clearing explaining how the components of system 2' cooperate to realize the functionalities of each subsystem schematically depicted in FIG. 9A.

The UPN/TM/PD/URL RDBMS and Data Processing/Filtering Subsystem of the Second Illustrative Embodiment The primary function of the UPN/TM/PD/URL RDBMS 9' is to manage UPN/TM/PD/URL link data as well as all other types of data collected and managed during the information services supported by the subsystems 501, 502, 503 and 504, and catalogued in the tables of FIGS. 15A through 15MM. In general, the RDBMS 9' is realized as a set of logical or template data tables (i.e. data structures), each having a set of information fields wherein one or more of these information fields are related to similar information fields in other template data tables by way of relational links, known in the relational database art. The data tables comprising the exemplary RDBMS 9' of the present invention are shown in FIGS. 15A through 15MM. Preferably, RDBMS 9' is realized using a powerful robust RDBMS technology such as Oracle **8*i* RDBMS software from the Oracle Corporation, but it is understood that other commercial RDBMS products can be used with excellent results by virtue of the fact that each UPN/TM/PD/URL link record contains a relatively small amount of information, while the actual information content associated with such links resides on Internet-enabled information servers located potentially in every corner of the world. Each of these database tables will be described below in detail. Notably, however, the relational links among the numerous data tables are not schematically depicted in FIGS. 15A through 15**MM to avoid obfuscation of the present invention. It is noted however that these relational links exist between similar information fields in different data tables, in a manner well known in the relational database technology arts.

As shown in FIG. 13, a data processing/filtering subsystem 517 (e.g. comprising modules of data processing scripts) is integrated with the UPN/TM/PD/URL RDBMS 9' as shown in FIG. 1. The primary function of data processing subsystem 517 is to process the data elements within UPN/TM/PD/URL RDBMS 9' to perform the following product-related functions: (1) enabling each retail-based (physical or virtual) CPI kiosk 513, 514 to display only UPN/TM/PD/URL links created by manufacturer's who (i) sell products in the retailer's store and (ii) have acquired rights and/or privileges (by the retailer) to display products on the retailer's store shelves about which the kiosk is installed in the retailer's space; and (2) generating "retailer-authorized" kiosk advertisement and promotion directories listing retailer-authorized CPI kiosks which registered product advertisers and promoters can use to provide their services, without violating any aisle/shelf rights/privileges that may have granted to particular manufacturers by retailers during their business relations.

In the preferred embodiment of the present invention, the data processing subsystem 517 is realized as a system of software modules (e.g. scripts) which cooperate with the UPN/TM/PD/URL RDBMS 9' whenever (i) CPI requests are made from either a physical or virtual CPI kiosk in subsystem 504, (ii) kiosk advertising directories are requested from subsystem 507, and (iii) kiosk promotional directories are requested from subsystem 508. Operation of the data processing subsystem 517 is illustrated in detail in FIGS. 25-40B and will be described in greater detail hereinafter.

Internet-Based Consumer Product Information (CPI) Link Creation, Management and Transport (LCMT) Subsystem 501

As shown in FIG. 13, Internet-Based Consumer Product Information (CPI) Link Creation, Management and Transport (LCMT) Subsystem 501 of the illustrative embodiment comprises a number of system components, namely: a web-based manufacturer registration and UPN/TM/PD/URL link creation, management and transport (LCMT) server 505; UPN/TM/PD/URL RDBMS 9' operably connected to the infrastructure of the Internet; a plurality of Web-enabled client computer subsystems 13 operably connected to the infrastructure of the Internet; a plurality of manufacturer-operated client subsystems 512 operably connected to the infrastructure of the Internet, running UPN/TM/PD/URL link creation, collection, management and EDI-enabled transport (LCMT) software 511; and a plurality of http, ftp and/or EDI servers 518A, 518B and 518C, respectively, operably connected to the UPN/TM/PD/URL RDBMS 9' and the infrastructure of the Internet.

The primary function of the web-based manufacturer registration and UPN/TM/PD/URL link creation, management and transport server 505 is for (1) supporting manufacturer registration operations; (2) downloading UPN/TM/PD/URL link creation, management and EDI-enabled transport (LCMT) software 511 described hereinabove to registered manufacturers; (3) installing and setting up such software within the manufacturer's enterprise; (4) selecting and customizing the GUI Design for the UPN/TM/PD/URL link display menu 515 using the UPN/TM/PD/URL LCMT software (e.g. such customization including Manufacturer Customization Options, Default CPI Categories for linked URLs, Custom CPI Categories for linked URLs); (5) On-Line Training for UPN/TM/PD/URL LCMT Software 511; (6) Updating Manufacturer Registration Information; (7) Registering Manufacturers' Product Advertising Agents; and (8) Registering Manufacturers' Product Promotional Agents; and central UPN/TM/PD/URL RDBMS 9'.

Each manufacturer-operated client subsystem 13, shown in FIG. 13, is equipped with UPN/TM/PD/URL LCMT software 511 downloaded from information server 505. The UPN/TM/PD/URL LCMT software performs at least two (3) functions. The first function is to enable a manufacturer's (i.e. vendor's) marketing, brand and/or product managers and their agents (contributing to the brand-images of their products) to create UPN/TM/PD/URL links in connection with their consumer products. The second function it to enable the manufacturer' marketing, brand and/or product managers and their agents, to manage such brand-forming information links within a UPN/TM/PD/URL RDBMS 512 locally-maintained within each manufacturer's enterprise. The third function is to enable the manufacturer' marketing, brand and/or product managers and their agents to transport such locally-managed UPN/TM/PD/URL RDBMS to centralized UPN/TM/PD/URL RDBMS 9' for central management, processing and distribution in accordance with the principles of the present invention.

The purpose of transporting the data content in each such locally-managed UPN/TM/PD/URL RDBMS 512 to centralized UPN/TM/PD/URL RDBMS 9' is to enable distribution of its UPN/TM/PD/URL links to: (i) consumers and end-users within physical retail environments having access to a plurality of physical CPI serving kiosks 513 driven by a plurality of Web (http) servers 519 operably connected to the infrastructure of the Internet, as shown in FIG. 13; (ii) consumers and end-users within electronic retail environments having access to a plurality of virtual CPI serving kiosks driven by a plurality of CPIR-enabling Java Applet servers 520 operably connected to the infrastructure of the Internet; and (iii) consumers and end-users interfaced with a plurality of Web-enabled client machines at home, school, in the office or on the road having access to a plurality of UPN-driven consumer product information portals on the WWW, driven by a plurality of mirrored http information servers 519B (operably connected to the infrastructure of the Internet) as shown in FIG. 13. Similarly, each registered advertising agent might be supplied with such UPN/TM/PD/URL LCMT software and participate in the creation, management, and transport of the manufacturer's UPN/TM/PD/URL RDBMS.

The primary function of the http, ftp and/or EDI servers 518A, 518B and 518C, respectively, is to receive the structured files of locally-created/managed UPN/TM/PD/URL RDBMS 512 that have been electronically transported by each registered manufacturer within the system, for purposes of updating the UPN/TM/PD/URL RDBMS 9' centrally managed by the system 2'.

Consumer Product Information (CPI) Kiosk Configuration, Deployment, Management and Access Subsystem 504

In the illustrative embodiment, the primary functions of the web-based CPI kiosk ordering/configuration/deployment/ management server are for: (1) supporting retailer (and e-retailer) and manufacturer registration operations; (2) updating and displaying the Kiosk Deployment Directory for the registered retailer or manufacturer; (3) enabling retailers to select and order physical and/or virtual kiosks for deployment, and manufacturers to select and order virtual kiosks for deployment by the manufacturer or others; (4) specifying the location of physical kiosk installation and deployment, and the domain of virtual kiosk installation and deployment; (5) selecting particular information services to be enabled on and delivered to ordered/deployed CPI kiosks in order to configure the same for its intended application; (6) selecting and customizing the kiosk GUI Design (as a further part of the kiosk configuration process); (7) registering the manufacturer's Aisle/Shelf Rights and Privileges on deployed CPI kiosks 513; (8) registering the retailer's (or manufacturer's) advertising agents as the case may be; (9) registering the retailer's (or manufacturer's) product promotional agents as the case may be; (10) monitoring the performance of registered retailer's (or manufacturer's) advertising agents as the case may be; and (11) monitoring the performance of registered retailer (or manufacturer) promotional agents as the case may be.

In the illustrative embodiment, the Consumer Product Information (CPI) Kiosk Configuration, Deployment, Management and Access Subsystem 504 is realized by a number of system components, namely: UPN/TM/PD/URL RDBMS 9'; a plurality of mirrored Physical and Virtual Multi-Mode Kiosk Server Subsystems 11A operably connected to the infrastructure of the Internet and the UPN/TM/PD/URL RDBMS 9'; a plurality of barcode-driven/touch-screen-enabled LCD-based physical CPI kiosks 513 installed with physical retail shopping space 516 and operably connected to the infrastructure of the Internet; and a plurality of Web-enabled client subsystems (e.g. PC computers, wireless palm computers, WAP-enabled cell phones, etc.) 13 operably connected to the infrastructure of the Internet as described hereinabove, for use by consumers to access UPN/TM/PD/URL links within the central UPN/TM/PD/URL RDBMS 9' from anywhere on Earth.

As shown in FIG. 13, each Physical and Virtual Multi-Mode Kiosk Server Subsystem 11A of the illustrative embodiment comprises a number of subcomponents, namely: a CPIR-enabling Applet/Servlet Generator/Server 521 operably connected to the UPN/TM/PD/URL RDBMS 9'; a CPIR-Enabling Applet Tag (i.e. Product-Specific CPI Virtual Kiosk) Library (Catalog) Web Server 522 operably connected to the CPIR-enabling Applet/Servlet Generator/Server 519, and the infrastructure of the Internet; a plurality of Web-based (http) Multi-Mode (e.g. CPI) Kiosk Servers 519A and operably connected to UPN/TM/PD/URL RDBMS 9' and the infrastructure of the Internet; a plurality of CPIR-enabling Applet servers 520 operably connected to the UPN/TM/PD/URL RDBMS 9' CPIR-enabling Applet/Servlet Generator 521 and the infrastructure of the Internet; a plurality of Web-based kiosk servers 519A operably connected to UPN/TM/PD/URL RDBMS 9' and the infrastructure of the Internet; a plurality of Web-based (http) CPI portal servers 519B operably connected to the UPN/TM/PD/URL RDBMS 9'; and a GPS-time synchronized WAP-enabled information server 523 operably connected to the infrastructure of the Internet.

Each barcode-driven/touch-screen-enabled LCD-based physical CPI kiosk (513) may be realized as any of the physical CPI kiosks disclosed herein. Such CPI kiosks are installed with physical retail shopping space 516, and configured and operated in accordance with the principles of the present invention.

As shown in FIG. 13, each Web-based (http) CPI kiosk server 519A has a statically assigned IP address, and an assigned domain name. Preferably, each such CPI kiosk server 519A is assigned to a single barcode-driven/touch-screen-enabled LCD-based physical CPI kiosk 513, on which a retailer-oriented WWW site (at the assigned domain) is graphically displayed in the retailer's store 516. As shown in FIG. 13, the function of the advertisement/promotion spot queue 521 associated with each Web-based kiosk server 519A is together queuing up advertisement and promotion spots, ordered by registered advertisers, for either a random or ordered display on the particular physical CPI kiosk assigned to the Web-based kiosk server 519A.

As shown in FIG. 13, the CPIR-enabling Applet/Servlet Generator/Server 521 is operably connected to the UPN/TM/PD/URL RDBMS 9' for automatically generating a CPIR-enabling Applet/Servlet of the present invention for each UPN/TM/PD/URL link record in the UPN/TM/PD/URL RDBMS 9'. In accordance with the principles of the present invention, (i) the compiled code associated with the CPIR-enabling Applet is loaded onto one of the plurality of CPIR-enabling Applet servers 520 shown in FIG. 13, and (ii) the corresponding CPIR-enabling Applet tag is loaded within the CPIR-Enabling Applet Tag (i.e. Product-Specific CPI Virtual Kiosk) Library Web Server 522 for viewing and downloading by retailers, advertisers, auctioneers, etc, as described in detail hereinabove. Each CPIR-enabling (e.g. JAVA) Applet server 520 has a statically assigned IP address, and an assigned domain name, and is assigned to numerous physical-type CPIR-enabling Applet-driven virtual CPI kiosks (i.e. GUIs) 514 deployed at retailer-oriented WWW sites served to kiosks in the retailer's store, or otherwise on the WWW.

Notably, each Web-based kiosk server 519A and each CPIR-enabling Applet server 520 in the system will be provided with either a MIN-based data filtering mechanism, UPN-based data filtering mechanism, and/or trademark (TM) based data filtering mechanism supplied by the data processing/filtering subsystem 517 integrated with the UPN/TM/PD/URL RDBMS 9', as shown in FIG. 13. This data filtering subsystem 517 serves at least three (3) important product functions in the retail-kiosk-based marketing, merchandising and education/information system of the present invention 2'.

The first product function of these filters is to ensure that only "retailer-authorized" UPN/TM/PD/URL links are supplied to retail-based CPI kiosks (513, 514) driven by such kiosk servers, and that such retailer-authorization is achieved by restricting the display of product advertisements and promotions on retail-based CPI kiosks having manufacturer aisle/shelf rights/privileges registered therewith, thereby preserving the goodwill embodied within manufacturer-retailer relationships along the retail chain.

The second product function of these filters is to enable consumers to access and display on a retail-based CPI kiosk, only CPI related to products of manufacturers (i.e. vendors) who currently have products being sold in the retail store in which the retail-based CPI kiosk is installed, thereby assisting retailers in their effort to market and merchandise products offered by their manufacturers, and help educate consumers about such product offerings.

The third product function is to enable the automatic generation of kiosk advertisement and promotion directories which are specifically tailored to each registered product advertiser and promoter, wherein each such directory lists physical and/or virtual CPI kiosks on which the advertiser or promoter is authorized by retailers to display product advertisements or promotions while respecting the manufacturer's aisle/shelf rights/privileges granted in the listed CPI kiosks by kiosk-hosting retailers. As with the first and second product functions described above, the third product function operates to preserve the goodwill embodied within manufacturer-retailer relationships along the retail chain.

As shown in FIG. 13, each Web-based (http) portal information server 519B has a statically assigned IP address, and an assigned domain name. The primary function of the Web information server 519B is to serve up to the public, in different languages, barcode-drivable CPI portal WWW sites, at which the entire UPN/TM/PD/URL RDBMS 9' is searchable by members of the public without the restriction of MIN filters, UPN filters and/or trademark (TM) filters which are applied to retail-based CPI kiosks for the purpose of preserving the goodwill embodied within manufacturer-retailer relationships along the retail chain, as discussed hereinabove.

As shown in FIG. 14, a GPS-time synchronized WAP-enabled information server 525 can be optionally used to deliver CPI links from the UPN/TM/PD/URL RDBMS 9' to a GSU-enabled wireless Web-enabled palm computer 13 carried by a consumer within a physical retail shopping environment, when, for example, the palm computer is physically located within a particular portion of a physical retail shopping space.

To preserve the goodwill embodied within manufacturer-retailer relationships along the retail chain, it would not be desired by retailers for Web-based CPI portal servers 519B to serve UPN/TM/PD/URL links to WAP-enabled mobile computing devices of consumers who wish to (i) rummage through a retailer's store, (ii) read UPN symbols on consumer products, and (iii) view comparison price information on scanned products in an effort to haggle down the retailer's price, while disregarding the value that the retailer adds to the purchase price through its store's shopping experience, knowledgeable sales personnel, etc. In such instances where only the consumer wants the lowest price, and would be willing to buy a product in a warehouse off a shipping pallet, but the retailer aims to provide a more rich consumer experience, albeit at an increased purchase price (i.e. for the added value), the retailer will not want consumers to bring barcode-driven mobile price-comparison palm computers 13 into their stores, although they most likely cannot stop them by law from doing so. To prevent the CPI links collected by the system hereof exacerbating this potential situation in physical retail shopping environments, it will be preferred that Web-enabled CPI portal servers 519B do not support the Wireless Applications Protocol (WAP).

However, in instances where WAP is supported and retailers permit such mobile devices 13 in their stores, it would be preferred for the consumer to carry a GSU-enabled/Web-enabled (bar code driven) palm computer 13, cell phone or other mobile appliance 13A into the retail store, so that when the portable device is located within a particular store, the GSU-enabled device 13A is automatically activated to deliver retailer-specific information to the consumer, enhancing such mobile commerce (M-commerce) applications. Details of GPS time-synchronized WAP-enabled information servers 525 and GSU-enabled mobile computers 13A are taught in published WIPO Patent Application No. WO 00/50974, by Reveo, Inc. incorporated herein by reference in its entirety.

Internet-Based Consumer Product Advertisement Marketing, Programming, Management and Delivery Subsystem 502

In the illustrative embodiment, the Consumer Product Advertisement Marketing, Programming, Management and Delivery Subsystem 502 comprises: a web-based product advertisement marketing/sales (http) server 507 operably connected to the infrastructure of the Internet; the UPN/TM/PD/URL RDBMS 9' operably connected to the infrastructure of the Internet; and a plurality of Web-enabled client subsystems 13 operably connected to the infrastructure of the Internet as described hereinabove.

In the illustrative embodiment, the primary function of the web-based product advertisement marketing/sales/management (http) server 507 is to enable the following advertiser-oriented information services: (1) registering advertisers (e.g. agents of manufacturers and retailers) and the creating advertiser accounts; (2) logging into the subsystem as a registered advertiser; (3) displaying General Kiosk Advertising Directories and identifying CPI kiosks on which the advertiser is authorized to display advertisements on consumer products; (4) displaying Brand Kiosk Advertising Directories and identifying CPI kiosks on which the advertiser is authorized to display advertisements on a particular brand of consumer products; (5) registering Kiosk Advertising Campaigns to be displayed on a retailer-authorized (initially-unspecified) subnetwork of CPI kiosks; (6) building Kiosk Advertising Campaigns by placing ad spot orders to be run on a specified subnetwork of CPI kiosks; (10) running and displaying Kiosk Advertising Campaigns on the retailer-authorized subnetwork of CPI kiosks; (11) modifying Kiosk Advertising Campaigns; and (12) monitoring the performance of Kiosk Advertising Campaigns; central UPN/TM/PD/URL RDBMS 9'. Each of these product related functions are carried out by the product advertiser using a Web-enabled client subsystem 13 operably connected to the infrastructure of the Internet as described hereinabove. Using a Web-enabled client subsystem, the advertiser can access subsystem 507 and central UPN/TM/PD/URL RDBMS 9' from anywhere on Earth.

Internet-Based Consumer Product Promotion Marketing, Programming, Management and Delivery Subsystem 503

In the illustrative embodiment, the Consumer Product Promotion Marketing, Programming, Management and Delivery Subsystem 503 comprises: a web-based product promotion marketing/sales/management (http) server 508 operably connected to the infrastructure of the Internet; the UPN/TM/PD/URL RDBMS 9' operably connected to the infrastructure of the Internet; and a plurality of Web-enabled client subsystems 13 operably connected to the infrastructure of the Internet as described hereinabove.

In the illustrative embodiment, the primary functions of the web-based product Kiosk Promotion Marketing/Sales/Management (http) server 508 is for enabling the following promoter-oriented information services: (1) registering promoters and the creating promoter accounts; (2) logging into the subsystem by promoter; (3) displaying General Kiosk Promotion Directories and identifying CPI kiosks on which the promoter is authorized to display promotions on consumer products; (4) displaying Brand Kiosk Promotion Directories and identifying CPI kiosks on which the promoter is authorized to display advertisements on a particular brand of consumer products; (5) registering Kiosk Promotion Campaigns to be displayed on an (initially-unspecified) retailer-authorized subnetwork of CPI kiosks; (6) building Kiosk Promotion Campaigns by placing promo spot orders to be run on a specified subnetwork of CPI kiosks; (10) running and displaying kiosk promotion campaigns on the retailer-authorized subnetwork of CPI kiosks; (11) modifying kiosk promotion campaigns; and (12) monitoring the performance of kiosk promotion campaigns; and central UPN/TM/PD/URL RDBMS 9'. Each of these product related functions are carried out by the product promoter using a Web-enabled client subsystem 13 operably connected to the infrastructure of the Internet as described hereinabove. Using a Web-enabled client subsystem, the promoter can access subsystem 503 and central UPN/TM/PD/URL RDBMS 9' from anywhere on Earth.

Detailed Description of the UPN/TM/PD/URL RDBMS of the Second Illustrative Embodiment of Present Invention In order to more fully understand the functions carried out by the system of the present invention, it will be helpful to describe each of the data tables shown in FIGS. 15A through 15MM, comprising the UPN/TM/PD/URL RDBMS 9' of the present invention. As will be described in greater detail hereinafter, certain information items stored in data records within the RDBMS 9', and structured in accordance with its corresponding data table structure, will be entered into the RDBMS 9' by either (i) manual, semi-manual or automated data entry operations carried during one of the various modes of information indicated in FIGS. 16, 19, 29, and 35, or (ii) by automated data entry operations carried out during UPN/TM/PD/URL link data entry and update operations performed periodically by the system.

As shown in FIG. 15A, the RDBMS table entitled MANUFACTURER in the illustrative embodiment of the present invention, comprises a number of primary information fields, namely: Company (Manufacturer's) Name; Street Address; City; State; Postal Code; County; MIN Assigned by UCC/EAN; URL of Manufacturer's WWW Site; Phone Number; Email Address; Fax Number; Standard Industry Codes (SIC) assigned to the products produced and/or sold by the manufacturer; Marketing Executive Identity; Marketing Executive Phone No.; Marketing Executive E-mail; UPN/TM/PD/URL Management SW Installed; UPC Management SW for EDI B2B; UPC Service Bureau Employed; UPC Service Bureau Contact; UPC Service Bureau Phone Number; UPC Service Bureau E-Mail; EDI Vendor Employed; EDI Vendor Contact Person; EDI Vendor Phone Number; EDI Vendor E-Mail Address; EDI Service Bureau Employed; EDI Service Contact; EDI Service Bureau Phone Number EDI Service Bureau E-Mail; Number of UPC/TM/PD/URL SW Licenses; UPN/TM/PD/URL Management SW License Total; Total Number of UPC Numbers; Date of UPC Number Accounting; Annual UPC/TM/PD/URL Management SW Fee Due; Date of UPC/TM/PD/URL SW Fee Payment; UPC/TM/PD/URL SW Fee Agent; UPC/TM/PD/URL SW Fee Agent Phone; UPC/TM/PD/URL SW Fee Agent Email; and Date of Last Record Update. Many of these information items will be collected by the system during the Manufacturer Registration mode of the system, depicted in the Information Service Mode shown in FIG. 16. By collecting information about the manufacturer's marketing and brand managers, and the current UPC management system in place to support B-2-B commerce with the manufacturer's trading partners, the system administrator can recommend the best type of UPN/TM/PD/URL link management software for downloading to the manufacturer and its agents after completion of the registration process. Such information will also be helpful in seamlessly integrating the UPN/TM/PD/URL link management subsystems of the present invention with conventional UPC management systems, in the master-slave relationship discussed in great detail hereinabove in connection with FIG. 2C2.

As shown in FIG. 15B, the RDBMS table entitled UPN/TM/PD/URL MANAGEMENT SOFTWARE (SW) LICENSE in the illustrative embodiment of the present invention, comprises a number of primary information fields, namely: MIN Assigned by UCC/EAN; Version of UPN/TM/PD/URL Management SW; Number of Licenses Granted; UPN/TM/PD/URL Management. SW License Keys; UPN/TM/PD/URL Management SW Acct. Number; UPN/TM/PD/URL Management SW Acct. Rep.; UPN/TM/PD/URL Management SW Download Date; and Date of Last Record Update. The information in this table structure is maintained by the system in order to determine which models and versions of UPN/TM/PD/URL link management software has been downloaded to which manufacturers and agents thereof, to account for licensing fees due, if any, as well as troubleshooting and support operations enabled by the system.

As shown in FIG. 15C, the RDBMS table entitled CONSUMER PRODUCT in the illustrative embodiment of the present invention, comprises a number of primary information fields, namely: MIN Assigned by UCC/FAN; Assigned UPN (UPC or UPC/EAN); UPN Symbology type; Primary Trademark (TM)/Brand; Secondary Trademark/Brand; Generic Product Description (PD); Cash Register Short Description; Cash Register Description; Model Number; Package Type; Labeling Language; URL Marking on Package; Service Phone Number on Package; Brand Manager Identity; Brand Manager Phone Number; Brand Manager E-Mail Address; Product Manager Identity; Product Manager Phone Number; Product Manager E-Mail Address; Trademark Notice on Package; Copyright Notice on Package; Patent Notice on Package; URL for Primary TM Image; Date of Last Record Update. For manufacturers using a conventional UPC management system for maintaining UPC-indexed Product Sales catalogs used in connection with B-2-B e-commerce operations with retail trading partners, some of the information items in this data table (e.g. Assigned UPN (UPC or UPC/EAN), UPN Symbology type, Primary Trademark (TM)/Brand, Generic Product Description (PD), Cash Register Short Description, Cash Register Description) can be imported from the UPC management system maintained by manufacturer or its agent during data initialization and synchronization operations, as described in detail above in connection with FIG. 2C2. Alternatively, all information items in this data table can be manually maintained by marketing, brand and/or product managers within the manufacturer's enterprise, and then such information exported to the UPC management system employed to support UPC-indexed Product Sales catalogs used in connection with B-2-B e-commerce operations.

As shown in FIGS. 15D1 and 15D2, the RDBMS table entitled INTERNET INFORMATION RESOURCES in the illustrative embodiment of the present invention, comprises primary information fields, namely: Assigned UPN; URL for Product Description; URL for Product Instructions; URL for Product Operating Manual; URL for Orig. Warranty Service; URL for Extended Warranty Service; URL for $1^{st}$ Ad on WWW; URL for $2^{nd}$ Ad on WWW; . . . N; URL for $1^{st}$ Product Review; URL for $2^{nd}$ Product Review; . . . ; URL for $n^{th}$ Product Review; URL for $1^{st}$ Product Endorsement; URL for $2^{nd}$ Product Endorsement; . . . ; URL for $n^{th}$ Product Endorsement; URL for Manufacturer. Service Request; URL for Product Returns to Manufacturer; URL for Product News; URL for Company News; URL for FAQs About Product; URL for Customer Service Line 1; URL for Customer Service Line 2; URL for Manufacturer Promotion #1; URL for Manufacturer. Promotion #2; URL for Manufacturer Promotion #3; URL for Retailer Promotion #1; URL for Retailer Promotion #2; . . . N; URL for Direct Manufacturer. Purchase; URL for Dealer Location in USA; URL for Product Wholesaler #1; URL for Product Wholesaler #2; . . . ; URL for Product Wholesaler #N; URL for Product Retailer #1; URL for Product Retailer #2; . . . ; URL for Product Retailer #N; URL for Complementary Product #1; URL for Complementary Product #2; . . . ; URL for Complementary Product #N; URL for Special Product Notices; URL for Product Uses and Applications; URL for Recreational Uses of Products; URL for Manufacturer Affiliate #1; URL for Manufacturer Affiliate #2; . . . ; URL for Manufacturer Affiliate #N; URL for Product Updates; URL for Software Downloads; URL for Manufacturer-Sponsored Auctions; URL for Retailer-Sponsored Auctions; URL for Manufacturer's Suggested Retail Price; and Date of Last Record Update. As illustrated in FIGS. 17 and 18, these URLs are preferably organized for display to consumers in two different categories, namely: "Pre-purchase Related CPI Links" which inform and educate consumers while incrementally driving demand for the product; and Post-Purchase Related CPI Links" which provide customers with product related service, instruction and technical support while promoting the retention of customers by such value-added services after the consumer purchase. Notably, the URL categories indicated above are merely illustrative, and that numerous other kinds of URL categories may be added to UPN/TM/PD/URL link menu for each product in the manufacturer's product line.

As shown in FIG. 15E, the RDBMS table entitled RETAILER in the illustrative embodiment of the present invention, comprises primary information fields, namely: Company Name; Street Address; City; State; Postal Code; Country; Retailer ID No.; Contact Person; Phone Number; E-Mail Address; Fax Number; URL of Retailer WWW Site; Purchasing Director Identity; Purchasing Director E-Mail; UPC Catalog Provider; UPC Catalog Provider Contact; UPC Catalog Provider Phone; UPC Catalog Provider E-Mail; EDI B2B Enabler; EDI B2B Enabler Contact; EDI B2B Contact Phone; EDI B2B Contact E-Mail; EDI Vendor; EDI Vendor contact Identity; EDI Vendor Contact Phone; EDI Vendor Contact E-Mail; Marketing Manager; Total Number of Retail Stores; and Date of Last Record Update. Many of these information items will be collected by the system during the Retailer Registration mode of the system, depicted in the Information Service Mode shown in FIG. 19A. Information about the retailer's EDI capabilities and UPC Catalog management facilities will be useful in those cases where the retailer is a vendor of private-label goods, typically manufactured by another who applies the retailer's brand name (i.e. trademarks) to the consumer goods under contract. In such instances, the retailer (i.e. a vendor of privately-labeled consumer product goods) would want to create and manage links between the UPNs of its products, trademarks applied thereto, product descriptors, and URLs pointing to CPI published in the WWW. Thus, in such instances, such retailers would register with the system in the same way as a manufacturer would, downloading UPN/TM/PD/URL link creation, management and transport software for installation and use in the manner illustrated in FIG. 2C2 and described above.

As shown in FIG. 15F, the RDBMS table entitled RETAILER/P-STORE RELATION in the illustrative embodiment of the present invention, comprises primary information fields, namely: Retail P-Store ID No.; Manufacturer #1 ID No.; Manufacturer #2 ID No; . . . ; Manufacturer #N ID No.; Total Number of Manufacturer Relationships; and Date of Last Record Update. This data table maintains important information about which manufacturers make and/or sell products in a particular retailer's physical (i.e. brick and mortar) store. As will be described in greater detail, this information is used to create MIN-based data filtering mechanisms that are embodied within the data processing methods carried out on CPI requests made by consumers from physical retail-based CPI kiosks, as illustrated in FIGS. 25 through 28B. The effect of such MIN-based data processing filters is to enable a physical kiosk within the a retailer's store to display (to a consumer) only UPN/TM/PD/URL links which are related to products made and/or sold by manufacturers who are listed in the data table of FIG. 15F. Such MIN-based data filtering operations prevents consumers from requesting (within the store) information about products not carried by the retailer, thus promoting loyalty between retailers and manufacturers represented thereby.

As shown in FIG. 15G, the RDBMS table entitled RETAILER RELATIONSHIPS in the illustrative embodiment comprises primary information fields, namely: MIN Assigned by UCC/EAN; Retailer #1 ID No.; Retailer #2 ID No.; . . . N; Total # Retailer Relationships; and Date of Last Record Update. This data table maintains important information about which retailers sell products of a particular manufacturer along the retail chain. Such information can be used by system promoters to actively solicit retailers to register and use the system described herein, particularly when such retailers sell products of a particular manufacturer who has previously registered with the system.

As shown in FIG. 15H, the RDBMS table entitled CONSUMER of the illustrative embodiment of the present invention, comprises primary information fields, namely: Consumer Name; Consumer ID No.; E-Mail Address; Street Address; City; State; Postal Code; Phone Number; Shopped at Retail Store ID Nos.; Shopped at Retailer Store ID No.; Consumer Index 1; Consumer Index 2; . . . ; Consumer Index N; Credit Card Nos.; and Date of Last Record Update. This data table maintains information on consumers who register with the system, such as e-mail address, assigned consumer identification number(s), retail locations at which the consumer shops as well as various consumer indices which characterize the interests and preferences of the consumer. While such information is not essential to the operation of the primary functions of the system, collection and management of such information will be useful in carrying out various subordinate system functions described herein including, for example, retail-store based e-mail-enabled transport of CPI links (e.g. SEND-IT HOME™ CPI Collection and Transport Service) collected while using either a physical or virtual CPI kiosk of the present invention.

As shown in FIG. 15I, the RDBMS table entitled ADVERTISER in the illustrative embodiment comprises primary information fields, namely: Advertiser Name; Street Address; City; State; Postal Code; Contact Person; Phone Number; E-Mail Address; Fax Number; Advertiser ID No.; Ad Agent for Manufacturer. #1; Ad Agent for Manufacturer #2; . . . ; Ad Agent for Manufacturer #N; Total # Manufacturer Agency Relations; Ad Agent for Retailer. #1; Ad Agent for Retailer #2; . . . ; Ad Agent for Retailer #N; Total Number of Retailer Agency Relations; URL for Advertiser WWW Site; Advertiser Network Acct. No.; Advertiser Network Password; and Date of Last Record Update. This data table maintains information on advertisers (e.g. advertising agents for manufacturers, retailers and other vendors working along the retail supply and demand chain) who register with the system, as well as their agency relationships with particular manufacturers, retailers and other vendors. While such agency relationship information will be initially supplied by the advertiser during the Advertiser Registration procedure indicated in FIG. 29, it must be confirmed or verified by the manufacturer during Advertiser Registration procedure indicated in FIG. 16, or by the retailer during advertiser registration procedure indicated in FIG. 19A.

As shown in FIG. 15J, the RDBMS table entitled PROMOTER in the illustrative embodiment of the present invention comprises primary information fields, namely: Promoter Name; Street Address; City; State; Postal Code; Contact Person; Phone Number; E-Mail Address; Fax Number; Promoter ID No.; Promotion Agent for Manufacturer #1; Promotion Agent for Manufacturer #2; . . . ; Promotion Agent for Manufacturer #N; Total Number of Manufacturer Agency Relations; Promotion Agent for Retailer #1; Promotion Agent for Retailer #2; . . . ; Promotion Agent for Retailer #N; Total Number of Retailer Agency Relations; URL for Promoter WWW Site; Promoter Network Acct. No.; Promoter Network Password; and Date of Last Record Update. This data table maintains information on promoters (e.g. promotional agents for manufacturers, retailers and other vendors working along the retail supply and demand chain) who register with the system, as well as their agency relationships with particular manufacturers, retailers and other vendors. While such agency relationship information will be initially supplied by the promoter during the Promoter Registration procedure indicated in FIG. 29, it must be confirmed or verified by the manufacturer during Promoter Registration procedure indicated in FIG. 16, or by the retailer during promoter registration procedure indicated in FIG. 19A.

As shown in FIG. 15K, the RDBMS table entitled PHYSICAL KIOSK in the illustrative embodiment of the present invention comprises primary information fields, namely: Physical Kiosk ID No.; Retail P-Store ID No.; Physical Kiosk HTT Server URL; Assigned Static IP Address; P-Kiosk Aisle/Shelf Location; Physical Kiosk Access Password; CPI Request Service Status; Ad Display Service Status; Promotion Service Status; Kiosk Activity Index No. 1; Kiosk Activity Index No. 2; . . . ; Kiosk Activity Index No. N; Status of Retailer's MIN filter; Cost of Kiosk Ad Spot on Monday; Cost of Kiosk Ad spot on Tues.; . . . ; Cost of Kiosk Ad spot on Sunday; Cost of Kiosk Ad Promotion on Mon.; Cost of Kiosk Ad Promotion on Tues.; Cost of Kiosk Ad Promotion on Wed.; . . . ; Cost of Kiosk Ad Promotion on Sunday; CPIR Request Service GUI Type; Ad Display service GUI Type; Promotion Service GUI Type; and Date of Last Record Update. This data table maintains information on each physical (bar code driven) CPI kiosk deployed within the system. While some of this information, such as, for example, the location of the kiosk (in which retailer's P-store), the types of information service enabled on the kiosk, the status of the retailer's MIN-filter (e.g. enabled or disabled), and the GUI type for advertisement and promotion display on the kiosk, are provided by the retailer at the time of kiosk registration/deployment indicated in FIG. 19A, the other informational items in this data table are provided by other sources within the system. For example, kiosk activity indices (related to types of information requested from the retail kiosk by consumers) would be provided by the analytical scripts running on the Web-based information server supporting the kiosk, while the cost of advertising spots within the kiosk's Advertisement/Promotion Slot Queue 525 would be provided by analytical scripts running on the Web-based Kiosk Advertisement Marketing/Sales and Programming Server 507 whereas the cost of promotion spots within the kiosk's Advertisement/Promotion Slot Queue 525 would be provided by analytical scripts running on the Web-based Kiosk Promotion Marketing/Sales and Programming Server 508, shown in FIGS. 11 and 13.

As shown FIG. 15L, the RDBMS table entitled RETAILER PHYSICAL STORE in the illustrative embodiment of the present invention comprises primary information fields, namely: Retailer ID No.; Address; City; State; Postal Code; Country; Retail P-store ID No.; Store Manager Identity; Store Manager Phone; Store Manager E-Mail; Regional Manager Identity; Regional Manager Phone; Regional Manager E-Mail; Number of Store Aisles; Number of Floors; Floor Plan Diagrams; Product Category/Shelf Maps; Available Internet Connectivity; Retailer/Manufacturer Relations; and Date of Last Record Update. This data table maintains information on each retailer's physical store registered with the system. Preferably, retailers will provide such information during the retailer registration mode indicated in FIG. 19A. Such information will be displayable to registered advertisers and promoters after they have generated custom kiosk advertising and promotion directories, as indicated in FIGS. 31 through 34B and 39 through 40B, respectively. Preferably, such kiosk advertising and promotion directories will not only include specifications of available kiosks at which advertisements/promotions may be placed by the advertiser/promoter, with the approval of the retailer, but also descriptions (e.g. maps, floor plans and other specifications) of the retail store and aisle and shelf locations at which a particular physical CPI kiosk has been deployed. Such types of information can be used by the advertisers and promoters in making their decision on whether or not to place an UPN-indexed product advertisement or promotion slot order on a particular kiosk. Such information in conjunction with other information about a particular CPI kiosk can be useful in helping advertisers and promoters build and execute product advertising and promotional campaigns within a retailer store environment.

As shown in FIG. 15M, the RDBMS table entitled PHYSICAL KIOSK HTTP SERVER in the illustrative embodiment of the present invention comprises primary information fields, namely: Physical Kiosk http Server URL; Physical Kiosk http Server Log; Physical Kiosk ID No.; and Date of Last Record Update. This data table maintains information on each physical kiosk http server deployed within the system, for the purpose of serving a retailer-specified kiosk GUI to a single physical kiosk deployed with a particular retailer store. Notably, this information is provided by the array (i.e. farm) of http information servers 519A (shown in FIG. 13) used to support the network of physical CPI kiosks deployed within the system, as well as the system administrator. Such information is continually updated and can be accessed by registered retailers as needed to operate corresponding physical kiosks with the retailer's physical shopping environment.

As shown in FIG. 15N, the RDBMS table entitled RETAILER'S PHYSICAL KIOSK CATALOG in the illustrative embodiment comprises primary information fields, namely: Retail-Store ID No.; Physical Kiosk ID No. 1; Physical Kiosk ID No. 2; . . . ; Physical Kiosk ID No. N; Total # of Physical Kiosks; and Date of Last Record Update. This data table maintains information on each physical (bar code driven) CPI kiosk deployed within the system by a particular retailer, and thus the set of kiosks deployed by each registered retailer is referred to as a "physical kiosk catalog". Notably, as the number and type of CPI kiosks deployed by a particular retailer will change over time in response to the needs of the retailer, so too will the physical kiosk catalog thereof.

As shown in FIG. 15O, the RDBMS table entitled PHYSICAL KIOSK E-MAIL in the illustrative embodiment of the present invention comprises primary information fields, namely: Physical Kiosk ID No.; Physical Kiosk E-Mail Log; and Date of Last Record Update. This data table maintains information on each e-mail transmission made from each physical kiosk deployed within the system. Such e-mail log information, alone and in combination with other information collected by the system, is useful in constructing demographic profiles on consumers requesting consumer product information, as well as merchandise preferences in particular retail stores.

As shown in FIG. 15P, the RDBMS table entitled PHYSICAL KIOSK USER ACTIVITY in the illustrative embodiment of the present invention comprises primary information fields, namely: Date(s) of Activity Measurement; Physical Kiosk ID No.; Number of HTML Pages Accessed; Number of BrandKey Requests at Kiosk; different HTML Pages Served-Up; Outgoing E-Mail Transmissions; System Mode Transitions; E-Commerce Transactions Made; Number of Brand-Key Requests at Kiosk; and Date of Last Record Update. This data table maintains information on each e-mail transmission made from each physical kiosk deployed within the system. Such e-mail related information can be valuable to retailers and manufacturers alike who seek to acquire new and retain current customers.

As shown in FIG. 15Q, the RDBMS table entitled AD SPOT ORDER—VIRTUAL KIOSK in the illustrative embodiment of the present invention comprises a number of primary information fields, namely: UPN of Advertised Product; Virtual Kiosk ID No.; Scheduled Date of Ad Spot; Advertiser Placing Order; Date of Ad Spot Order; Advertiser ID No.; Cost of Ad Spot; URL of Advertisement Spot; Time Duration of Ad Spot; Copyright Owner of Advertisement; Ordered Number of Displays/Date; File Format of Advertisement; Virtual Kiosk Ad Spot ID No.; Actual Number of Displays/Date; Actual Number of Interruptions; Ad Spot Cost; Date of Ad Payment; and Date of Last Record Update. This data table maintains information on each order placed by an advertiser for a consumer product advertisement spot on a particular virtual kiosk deployed within the system. Such information is collected during advertisement campaign building operations indicated in FIG. 29. Such advertisement (ad) spots are eventually placed in the advertisement/promotion spot queue associated with the virtual kiosk indicated in the ad spot order. Both ad spots orders and promotion spot orders are placed randomly in the advertisement/promotion spot queue associated with the virtual kiosk.

As shown in FIG. 15R, the RDBMS table entitled AD SPOT ORDER—PHYSICAL KIOSK in the illustrative embodiment of the present invention comprises a number of primary information fields, namely: UPN of Advertised Product; Physical Kiosk ID No.; Scheduled Date of Ad Spot; Advertiser Placing Order; Date of Ad Spot; Advertiser ID No.; Cost of Ad Spot; URL of Advertisement Spot; Time Duration of Ad Spot; Copyright Owner of Advertisement; Ordered Number of Displays/Date; File Format of Advertisement; Physical Kiosk Ad Spot ID No.; Actual number of Displays/Date; Actual Number of Interruptions; Ad Spot Cost; Date of Ad Payment; and Date of Last Effective Change. This data table maintains information on each order placed by an advertiser for a consumer product advertisement spot on a particular physical kiosk deployed within the system. Such information is collected during advertisement campaign building operations indicated in FIG. 29. Such advertisement (ad) spots are eventually placed in the advertisement/promotion spot queue associated with the physical kiosk indicated in the ad spot order. Both ad spots orders and promotion spot orders are placed randomly in the advertisement/promotion spot queue associated with the physical CPI kiosk.

FIG. 15S is a graphical representation of the RDBMS table entitled PROMO SPOT ORDER—PHYSICAL KIOSK, showing its primary information fields, namely: UPN of Promoted Product; Physical Kiosk ID No.; Scheduled Date of Promotion Spot; Promoter Placing Order; Date of Promotion Spot Order; Promoter ID No.; URL of Promotional Ad in DF1; Promotional Message in DF2; Promotional Message in DF3; Promotional Message in DF4; Time Duration of Promotion Spot; Copyright Owner of Promotion Ad; Ordered Number of Displays/Date; File Format of Promotional Ad; Physical Kiosk Promotion Spot ID No.; Actual Number of Displays/Date; Actual Number of Interruptions; Cost of Promotion Spot; promo spot Payment; Date of Promotion Spot Payment; and Date of Last Record Update. This data table maintains information on each order placed by a promoter for a consumer product promotional spot on a particular physical kiosk deployed within the system. Such information is collected during promotion campaign building operations indicated in FIG. 35. Such promotion (promo) spots are eventually placed in the advertisement/promotion spot queue associated with the physical kiosk indicated in the ad spot order. Both ad spots orders and promotion spot orders are placed randomly in the advertisement/promotion spot queue associated with the physical kiosk.

As shown in FIG. 15T, the RDBMS table entitled PHYSICAL KIOSK AD CAMPAIGN in the illustrative embodiment of the present invention comprises a number of primary information fields, namely: Physical Kiosk ID No.; Date of Ad Campaign; Ad Spot ID No. 1; Ad spot ID No. 2; . . . ; Ad Spot ID No. N; Total Ad Spots Ordered On Kiosk; and Date of Last Record Update. This data table maintains information on each advertisement spot order placed by an advertiser in connection with a particular ad campaign being run on a subnetwork of physical CPI kiosks. Such information is collected during advertisement campaign building operations indicated in FIG. 29.

As shown in FIG. 15U, the RDBMS table entitled PHYSICAL KIOSK PROMO CAMPAIGN in the illustrative embodiment of the present invention comprises a number of primary information fields, namely: Physical Kiosk ID No.; Date of Promotion Campaign; Physical Kiosk Promotion Spot ID No. 1; . . . Physical Kiosk Promotion Spot ID No. N; Total Ad Spots Ordered; and Date of Last Record Update. This data table maintains information on each promotion spot order placed by an advertiser in connection with a particular ad campaign being run on a subnetwork of physical CPI kiosks. Such information is collected during promotion campaign building operations indicated in FIG. 35.

As shown in FIG. 15V, the RDBMS table entitled VIRTUAL KIOSK in the illustrative embodiment of the present invention comprises a number of primary information fields, namely: Virtual Kiosk ID No.; Retail P-store or E-Store ID No.; Type of Virtual Kiosk; CPIR-enabling Applet ID No.; Licensed Internet Domain; Virtual Kiosk Licensee; Virtual Kiosk Enabling Password; E-Store Web-Page Location; CPI Request Service Status; AD Display Service Status; Promotion Service Status; Kiosk Activity Index No. 1; Kiosk Activity Index No. 2 . . . ; Kiosk Activity Index No. N; Status of Retailer MIN Filter; Cost of Kiosk Ad Spot on Mon.; Cost of Kiosk Ad Spot on Tues.; Cost of Kiosk Promotion Spot on Mon.; . . . ; Cost of Kiosk Promotion Spot on Sunday; URL for Accessing CPI Kiosk; and Date of Last Record Update. This data table maintains information on each virtual (Applet-driven) CPI kiosk deployed within the system. While some of this information, such as, for example, the location of the virtual kiosk (in which retailer's E-store), the types of information service enabled on the kiosk, the status of the retailer's MIN-filter (e.g. enabled or disabled), and the GUI type for advertisement and promotion display on the kiosk, are provided by the retailer at the time of kiosk registration/deployment indicated in FIG. 19A, the other informational items in this data table are provided by other sources within the system. For example, kiosk activity indices (related to types of information requested from the retail virtual kiosk by consumers) would be provided by the analytical scripts running on the Java-enabled Applet information server supporting the virtual kiosk, while the cost of advertising spots within the virtual kiosk's Advertisement/Promotion Slot Queue would be provided by analytical scripts running on the Web-based Kiosk Advertisement Marketing/Sales/Management and Programming Server 507, whereas the cost of promotion spots within the kiosk's Advertisement/Promotion Slot Queue 525 would be provided by analytical scripts running on the Web-based Kiosk Promotion Marketing/Sales/Management and Programming Server 508, shown in FIGS. 11 and 13.

As shown in FIG. 15W, the RDBMS table entitled CPIR-ENABLING APPLET in the illustrative embodiment of the present invention comprises a number of primary information fields, namely: CIPR-Enabling Applet ID No.; Type of CPIR-Enabling Applet; URL of CPIR-Enabling Applet BC; Virtual Kiosk ID No.; Virtual Kiosk Server Log; and Date of Last Record Update. This data table maintains information on each CPIR-enabling Applet supporting the GUI of each virtual CPI kiosk deployed within the system. Typically, such information is provided at the time that each retailer orders and configures a virtual CPI kiosk for deployment within its retail environment, as indicated in FIG. 19A.

As shown in FIG. 15X, the RDBMS table entitled RETAILER E-STORE in the illustrative embodiment of the present invention comprises a number of primary information fields, namely: Retailer ID No.; Address; City; State; Postal Code; Country; Retail E-Store ID No.; E-Store Manager Identity; E-Store Manager Phone; E-store Manager E-Mail; E-Store WWW Site Map; Retailer/Manufacturer Relations; and Date of Last Record Update. This data table maintains information on each retailer's virtual store registered with the system. Preferably, the retailer will provide such information during the retailer registration mode indicated in FIG. 19A. Such information will be displayable to registered advertisers and promoters after they have generated custom kiosk advertising and promotion directories, as indicated in FIGS. 31 through 34B and 39 through 40B, respectively. Preferably, such kiosk advertising and promotion directories will not only include specifications of available virtual kiosks at which advertisements/promotions may be placed by the advertiser/promoter, with the approval of the retailer, but also descriptions (e.g. site maps, virtual floor plans and other specifications) of the virtual retail store and virtual aisle and shelf locations at which a particular virtual CPI kiosk has been deployed. Such types of information can be used by the advertisers and promoters in making their decision on whether or not to place an UPN-indexed product advertisement or promotion slot order on a particular virtual kiosk. Such information in conjunction with other information about a particular virtual CPI kiosk can be useful in helping advertisers and promoters build and execute product advertising and promotional campaigns within a particular electronic retailer's (e-tailors) store environment.

As shown in FIG. 15Y, the RDBMS table entitled RETAILER'S VIRTUAL KIOSK CATALOG in the illustrative embodiment of the present invention comprises a number of primary information fields, namely: Retail P-Store ID No.; Virtual Kiosk ID No. 1; Virtual Kiosk ID No. 2; Virtual Kiosk ID No. N; Total # of Virtual Kiosks; Retailer ID No.; and Date of Last Record Update. This data table maintains information on each physical (Applet driven) virtual CPI kiosk deployed within the system by a particular e-retailer, and thus the set of virtual kiosks deployed by each registered retailer is referred to as a "virtual kiosk catalog". Notably, as the number and type of virtual CPI kiosks deployed by a particular retailer will change over time in response to the needs of the retailer, so too will the virtual kiosk catalog thereof.

As shown in FIG. 15Z, the RDBMS table entitled VIRTUAL KIOSK E-MAIL in the illustrative embodiment of the present invention comprises a number of primary information fields, namely: Virtual Kiosk ID No.; Virtual Kiosk E-Mail Log; and Date of Last Record Update. This data table maintains information on each e-mail transmission made from each virtual kiosk deployed within the system. Such e-mail related information can be valuable to retailers and manufacturers alike who seek to acquire new and retain current customers.

As shown in FIG. 15AA, the RDBMS table entitled VIRTUAL KIOSK USER ACTIVITY, showing its primary information fields, namely: Date(s) of Activity Measurement; Virtual Kiosk ID No.; Number of HTML Pages Accessed; Number of BrandKEey Requests at Kiosk; Number of Trademark Requests; Different HTML Pages Served-Up; Outgoing E-Mail transmissions; System Mode Transitions; E-commerce Transactions Made; and Date of Last Record Update. This data table maintains information on each e-mail transmission made from each virtual kiosk deployed within the system. Such e-mail related information can be valuable to retailers and manufacturers alike who seek to acquire new and retain current customers.

As shown in FIG. 15BB, the RDBMS table entitled PROMO SPOT ORDIER—VIRTUAL KIOSK in the illustrative embodiment of the present invention comprises a number of primary information fields, namely; UPN of Promoted Product; Virtual Kiosk ID No.; Scheduled Date of Promotion Spot; Promoter Placing Order; Date of Promotion spot Order; Promoter ID No.; URL of Promotional Ad in DF1; Promotional Message in DF2; Promotional Message in DF3; Promotional Message in DF4; Time Duration of Promotion Spot; Copyright Owner of Promotion Ad; Ordered Number of Displays/Date; File format of Promotional Ad; Virtual Kiosk Promotion spot ID No.; Actual Number of Displays/Date; Actual Number of Interruptions; Cost of Promotion Spot; Promotion Cost Payment; Date of Promotion Payment; and Date of Last Record Update. This data table maintains information on each order placed by an advertiser for a consumer product promotion spot on a particular virtual kiosk deployed within the system. Such information is collected during promotion campaign building operations indicated in FIG. 29. Such promotion (i.e. "promo") spots are eventually placed in the promotion/promotion spot queue associated with the virtual kiosk indicated in the promo spot order. Both ad spots orders and promo spot orders are placed randomly in the advertisement/promotion spot queue associated with the virtual kiosk.

As shown in FIG. 15CC, the RDBMS table entitled VIRTUAL KIOSK PROMO CAMPAIGN in the illustrative embodiment of the present invention comprises a number of primary information fields, namely: Virtual Kiosk ID No.; Date of Promotion Campaign; Virtual Kiosk Promotion Spot ID No. 1; . . . ; Virtual Kiosk Promotion Spot ID No. N; Total Promotion Spots Ordered; and Date of Last Record Update. This data table maintains information on each promotion spot order placed by a promoter in connection with a particular promotional campaign being run on a subnetwork of virtual CPI kiosks. Such information is collected during promotion campaign building operations indicated in FIG. 35.

As shown in FIG. 15DD, the RDBMS table entitled VIRTUAL KIOSK AD CAMPAIGN in the illustrative embodiment of the present invention comprises a number of primary information fields, namely: Virtual Kiosk ID No.; Date of Ad Campaign; Virtual Kiosk Ad Spot ID No. 1; Virtual Kiosk Ad Spot ID No. 2; . . . ; Virtual Kiosk Ad Spot No. N; Total Ad spots Ordered on Kiosk; Effective Change Date; and Date of Last Record Update. This data table maintains information on each advertisement spot order placed by an advertiser in connection with a particular ad campaign being run on a subnetwork of virtual CPI kiosks. Such information is collected during ad campaign building operations indicated in FIG. 29.

As shown in FIG. 15EE, the RDBMS table entitled AD CREDIT—PHYSICAL KIOSK in the illustrative embodiment of the present invention comprises a number of primary information fields, namely: Advertiser ID No.; Physical Kiosk ID No.; Physical Kiosk Ad Spot ID No.; UPN of Advertised Product; URL of Interrupted Ad; Date of Interruption; Time of Interruption; UPN of Interrupting Product; Amount of Ad Credit; and Date of Last Record Update. This data table maintains information on each advertisement credit issued to an advertiser in connection with a particular advertising spot order placed to run a particular physical CPI kiosk or subnetwork of such kiosks. In the illustrative embodiment, such information is automatically generated at the end of the retail day when a particular ad spot order has not been carried out, so as to grant a partial credit to the advertiser account. The purpose of issuing such credit under such circumstances to deal fairly with the advertiser placing the ad spot order on a particular kiosk, but which did not run thereon due to either (i) today many ad and/or promo spot orders put in to the particular physical kiosk's ad/promo spot queue, or (ii) consumer demand for CPI at the physical kiosk was great as to not allow time for the ordered ad spot to run in the retail shopping environment on its ordered execution/run date. Such details of physical kiosk operation will be described in greater detail hereinafter.

As shown in FIG. 15FF, the RDBMS table entitled AD CREDIT—VIRTUAL KIOSK in the illustrative embodiment of the present invention comprises a number of primary information fields, namely: Advertiser ID No.; Virtual Kiosk ID No.; Virtual Kiosk Ad spot ID No.; URL of Advertised Product; URL of Interrupted Ad; Date of Interruption; Time of Interruption; UPN of Interrupting Product; Amount of Ad Credit; and Date of Last Record Update. This data table maintains information on each advertisement credit issued to an advertiser in connection with a particular advertising spot order placed to run a particular virtual CPI kiosk or subnetwork of such kiosks. In the illustrative embodiment, such information is automatically generated at the end of the retail day when a particular ad spot order has not been carried out, so as to grant a credit to the advertiser's account preferably in the amount of purchase price of the ad spot. The purpose of issuing such credit under such circumstances to deal fairly with the advertiser placing the ad spot order on a particular kiosk, which did not run/execute thereon due to, for example, the fact that the number of ad and/or promo spot orders put into the particular virtual kiosk's ad/promo spot queue, in relation to the actual amount of ad/promo display time made available to the multi-mode CPI kiosk due to the CPI demand characteristics of the kiosk on the ad spot run date, did not allow time for the ordered ad spot to run in the retail shopping environment. Such details of virtual kiosk operation will be described in greater detail hereinafter.

Notably, granting credit to advertisers for non-executed ad spot orders represents a lost business opportunity to the system administrator and its sponsors, which is something that should be minimized throughout the system. In order to mitigate this problem, the present invention teaches enforcing/setting an upper limit on the number of ad and promo spots which can be placed on a virtual or physical kiosk by advertisers. The upper limit on such ad and promo spot orders would be based on several parameters including, for example: (i) the current user activity characteristics of the kiosk; (ii) the time duration allocated to each ad and promo spot ordered to run on the kiosk; and (iii) the operational time duration of the kiosk in the retail store on the ad spot order date. While parameters (ii) and (iii) can be made relatively constant by the system administrator, parameter (i) will be a variable set by consumer demand for CPI at a particular kiosk, in a given retail shopping environment, over a particular time duration. Computation of these dynamically set "ad/promo spot order limits" can be carried out by algorithms running on Web servers 507 and 508 shown in FIG. 13, using parameters (i), (ii) and (iii) as input to the algorithm. The output of the algorithm will be the total number of ad spot orders and total number of promo spot orders that can be put into the ad/promo spot queue 525 of the kiosk server 513 assigned to the kiosk. Such algorithms will minimize the number of credits issued to advertisers requesting service on a given multimode CPI kiosk of the present invention, and maximize the operating efficiency of each such kiosk in each of its viewing modes of operation (i.e. ad view mode, promo view mode, and CPI display view mode). This inventive feature of the system hereof will result in substantial improvements in the operational efficiency of each (virtual and physical) multimode CPI kiosk 513 deployed within the system.

As shown in FIG. 15GG, the RDBMS table entitled PROMO CREDIT—PHYSICAL KIOSK in the illustrative embodiment of the present invention comprises a number of primary information fields, namely: Advertiser ID No.; Physical Kiosk ID No.; Physical kiosk Promotion spot ID No.; UPN of Advertised Product; URL of Interrupted Promotion; Date of Interruption; Time of Interruption; UPN of Interrupting Product; Amount of Promotion Credit; and Date of Last Record Update. This data table maintains information on each promotion credit issued to a promoter in connection with a particular promotion spot order placed to run a particular physical CPI kiosk or subnetwork of such kiosks. In the illustrative embodiment, such information is automatically generated at the end of the retail day when a particular promo spot order has not been carried out, so as to grant a partial credit to the promoter's account. The purpose of issuing such credit under such circumstances is to deal fairly with the promoter placing the promo spot order on a particular kiosk, but it did not run thereon due to either (i) a great amount of ad and/or promo spot orders put in to the particular physical kiosk's ad/promo spot queue, or (ii) consumer demand for CPI at the physical kiosk was so great as to not allow time for the ordered ad spot to run in the retail shopping environment. Such details of the physical kiosk operation will be described in greater detail hereinafter.

As shown in FIG. 15HH, the RDBMS table entitled PROMO CREDIT—VIRTUAL KIOSK in the illustrative embodiment of the present invention comprises a number of primary information fields, namely: Advertiser Identification No.; Virtual Kiosk ID No.; Physical Kiosk Promotion Spot ID No.; UPN of Advertised Product; URL of Interrupted Promotion; Date of Interruption; Time of Interruption; UPN of Interrupting Product; Amount of Promotion Credit and Date of Last Record Update. This data table maintains information on each advertisement credit issued to a promoter in connection with a particular promotion spot order placed to run a particular virtual CPI kiosk 514 or subnetwork of such kiosks. In the illustrative embodiment, such information is automatically generated at the end of the retail day when a particular promo spot order has not been carried out, so as to grant a partial credit to the promoter's account. The purpose of issuing such credit under such circumstances to deal fairly with the promoter placing the promo spot order on a particular virtual kiosk, but it did not in fact run thereon due to either (i) a great amount of ad and/or promo spot orders put in to the particular virtual kiosk's ad/promo spot queue 525, or (ii) consumer demand for CPI at the virtual kiosk 514 was great as to not allow time for the ordered ad spot to run in the retail shopping environment. Such details of the physical kiosk operation will be described in greater detail hereinafter.

As shown in FIG. 15II, the RDBMS table entitled PURCHASE AT PHYSICAL STORE in the illustrative embodiment of the present invention comprises a number of primary information fields, namely: Retailer ID No.; Retail P-Store ID No.; UPN of Product Sold; Date of Product Sale; Time of Product Sale; Price of Sold Product; Customer ID No.; Credit Card No.; Retailer's Discount; URL of Promotion Advertisement; and Date of Last Record Update. This data table maintains information on each purchase transaction carried out within the retailer's physical store, and is typically generated automatically when a particular product has been purchased within the retailer's physical (P) store. As described in greater detail in connection with the first illustrative embodiment hereinabove, such purchase transaction information is used to determine how many units of a particular UPN-indexed advertised and/or promoted on particular CPI kiosks within a particular retailer's physical store on particular date were in fact purchased by consumers within that retailer's store on that date, or on particular dates after such advertising and/or promotion. Using such purchase transaction information, advertising and/or promotional effectiveness reports can be computed for retail managers, as well as their designated agents, to provide valuable feedback on the effectiveness of particular in-store product advertising and/or promotion campaigns, how they might be modified to improve product sales, store traffic, and the like.

As shown in FIG. 15JJ, the RDBMS table entitled PURCHASE AT E-STORE in the illustrative embodiment of the present invention comprises a number of primary information fields, namely: Retailer ID No.; Retail E-Store ID No.; UPN of Product Sold; Date of Product Sale; Time of Product Sale; Price of Sold Product; Customer ID No.; Credit Card No.; Retailer's Promotion Discount; Manufacturer's Promotion discount; URL of Promotion Advertisement; is; and Date of Last Record Update. In the illustrative embodiment, such information is automatically generated at the end of the consumer purchase within the retailer's virtual or electronic (E) store.

As shown in FIG. 15KK, the RDBMS table entitled RETAILER/E-STORE RELATON in the illustrative embodiment of the present invention comprises a number of primary information fields, namely: Retail E-Store ID No.; Manufacturer #1 ID No. (e.g. MIN); Manufacturer #2 ID No.; Manufacturer #N ID No.; Total # Manufacturer Relationships; and Date of Last Record Update. This data table maintains important information about which manufacturers make and/or sell products in a particular retailer's virtual (i.e. electronic) store. As will be described in greater detail, this information is used to create MIN-based filtering mechanisms that are embodied within the data processing methods carried out on CPI requests made by consumers from virtual retail-based CPI kiosks, as illustrated in FIGS. 25 through 28B. The effect of such MIN-based data filters is to enable a virtual kiosk 514 within the a retailer's store to display (to a consumer) only UPN/TM/PD/URL links which are related to products made and/or sold by manufacturers who are listed in the data table of FIG. 15F. Such MIN-based data filtering operations prevents consumers from requesting (within the store) information about products not carried by the retailer, thus promoting loyalty between retailers and manufacturers represented thereby.

As shown in FIG. 15LL, the RDBMS table entitled AISLE/SHELF RIGHTS in the illustrative embodiment of the present invention comprises a number of primary information fields, namely: P-Kiosk Aisle/Shelf Location; MIN of Manufacturer #1; MIN of Manufacturer #2; MIN of Manufacturer #N; Date of Last Record Update. This data table maintains important information about the rights and/or privileges, which particular manufacturers have with respect to displaying its product within a particular retail store aisle and/or on a store shelf within the store aisle. Such information can be manually entered into the system by the retailer, or automatically entered into the system by the Manufacturer Aisle/Shelf Rights/Privileges Registration procedure in FIGS. 23, 24A, and 24B.

As shown in FIG. 15MM, the RDBMS table entitled E-STORE WEB-PAGE RIGHTS in the illustrative embodiment of the present invention comprises a number of primary information fields, namely: E-Store Web-Page Location; MIN of Manufacturer #1; MIN of Manufacturer #2; MIN of Manufacturer #N; and Date of Last Record Update. This data table maintains important information about the rights and/or privileges which particular manufacturers have with respect to displaying its product within a particular virtual store aisle (e.g. Web page and/or on a virtual store shelf. Such information can be manually entered into the system by the retailer during registration as well as during updating operations, or automatically entered into the system by the Manufacturer Aisle/Shelf Rights/Privileges Registration procedure indicated in FIGS. 23, 24A and 24B.

Having described the structure of the RDBMS 9' of the second illustrative embodiment, the functions and operations of the subsystems 501, 502, 503 and 504 referred to above will now be described in greater detail below with reference to FIGS. 9A, 13 and 16 through 40B.

Detailed Description of the Internet-Based Consumer Product Information Link Creation, Management and Transport System of the Second Illustrative Embodiment of Present Invention As shown in FIG. 16, the web-based manufacturer registration and UPN/TM/PD/URL LCMT server 505 associated with the CPI LCMT subsystem 501 supports a number of modes of information service for manufacturers (i.e. vendors) and their agents, namely:

- Registering Manufacturer and Creating a Manufacturer Account;
- Logging-into system by Manufacturer;
- Downloading and Registering UPN/TM/PD/URL Link Creation, Management and Transport (LCMT) Software;
- Installing and Setting-up of UPN/TM/PD/URL Link Creation, Collection, Management and Transport Software within Manufacturer's Enterprise;
- Selecting and Customizing the GUI Design for the UPN/TM/PD/URL link display menu filled by the UPN/TM/PD/URL LCMT software including Manufacturer Customization Options—
- Default CPI Categories for linked URLs
- Custom CPI Categories for linked URLs;
- On-Line Training for UPN/TM/PD/URL LCMT Software;
- Updating Manufacturer Registration Information;
- Certifying Registered Manufacturer's Product Advertising Agents; and Certifying Registered Manufacturer's Product Promotional Agents.

As illustrated in FIG. 16A, the web-based manufacturer registration and UPN/TM/PD/URL link creation, management and transport server 505 is made accessible to manufacturers (e.g. marketing, brand and/or product managers, and other support personnel) through a Web-based GUI 574, using any Web-enabled client computer subsystem 13. An exemplary GUI for this subsystem 501 is illustrated in FIG. 16A. As shown therein, the GUI 574 for subsystem 501 can be realized as a Netscape-style three frame display framework, comprising: a thin upper horizontal display frame 575 containing a graphical image indicating the name of the WWW site at which subsystem 501 is located; a thin horizontal control frame 576 having a set of buttons 577A through 577E for enabling the above-described functions provided by subsystem 501; and a large information display frame 578 for displaying HTML-encoded pages used to construct the graphical interfaces associated with the various functions provided by this subsystem.

To register with the system, the manufacturer selects function button 577A in the control strip 576 of the GUI shown in FIG. 16A and appropriate interactive display screens will be displayed in display frame 578 to enable solicitation and entry of various types of data reflected in the manufacturer (i.e. vendor) related data tables shown in FIGS. 15A, 15B and 15G. During the registration process, information about the manufacturer's relationship with product retailers, advertisers and promoters (i.e. the manufacturer's agents) will be collected in order to carry out the various functions in the system requiring such kinds of information.

To access the information services supported by the web-based manufacturer registration and UPN/TM/PD/URL link creation, management and transport server 505, the registered manufacturer logs into the subsystem by selecting function button 577B and using its user name and password. Once logged-in, the manufacturer is invited to download and register UPN/TM/PD/URL LCMT software 511 from server 505 (or other designated web or ftp server) to computers within the manufacturer's enterprise, by selecting function button 577C in the control strip of the GUI shown in FIG. 16A. In response thereto, appropriate interactive display screens will be presented in display frame 578 to enable the software download and registration process and entry of various types of data reflected in the manufacturer (i.e. vendor) related data tables shown in FIGS. 15A and 15B.

By selecting function button 577D, the manufacturer may also obtain on-line training for UPN/TM/PD/URL LCMT software downloaded to its enterprise.

By selecting function button 577E, the manufacturer may update any registration related information as required by changes of circumstance and/or situation.

By selecting function button 577D, the manufacturer may certify any of the manufacturer's previously registered product advertising agents listed in the data table of FIG. 15I by way of the manufacturer's advertiser registration process supported by server 507. This information service can be used for initial certifications and well as changing or modifying advertiser certifications. Once properly certified by the manufacturer using subsystem 501, each certified/registered advertising agent will be deemed authorized by its manufacturer-principal to publish product advertisements, on retailer-authorized kiosks, on behalf of the manufacturer, using UPN-indexed advertising materials listed in the data table of FIG. 15D1 by the manufacturer's marketing, brand or product manager using registered UPN/TM/PD/URL LCMT software 511 running within the manufacturer's enterprise.

By selecting function button 577E, the manufacturer may certify any of the manufacturer's product promotion agents listed in the data table of FIG. 15J by way of the manufacturer's promoter registration process supported by server 508. This information service can be used for initial certifications and well as changing or modifying promoter certifications. Once properly certified by the manufacturer using subsystem 501, each certified/registered promotional agent will be deemed authorized by its manufacturer-principal to publish product promotions on retailer-authorized CPI kiosks, on behalf of the manufacturer, using UPN-indexed advertising/promotional materials listed in the data table of FIG. 15D1 by the manufacturer's marketing, brand and/or product manager using UPN/TM/PD/URL LCMT software 511 running within the manufacturer's enterprise.

In general, the CPI LCMT subsystem 501 of the present invention can be used by any consumer product vendor having properly registered with a UPN assignment association (e.g. UCC, Inc. or the EAN Organization), and not just manufacturer's of products. Therefore, a vendor who has products made by another, and applies its brand labels to such products and offers then for sale in the stream of commerce, shall be deemed a "manufacturer" hereinafter and in the claims. Thus, in the case where a retail corporation, who is registered with the UCC, Inc. and sells a consumer product bearing a UPC label, as well as its own brand label, then this retailer shall be deemed a "manufacturer" in accordance with the present invention, and will be permitted to (i) register with subsystem 501 in FIG. 9A by way of server 505, and (ii) certify any advertiser listed in its data table shown in FIG. 15I, or promoter listed in its data table shown in FIG. 15J.

In FIG. 17, an exemplary GUI 526 is shown for carrying out UPN/TM/PD/URL link creation, management and transport (LCMT) operations using UPN/TM/PD/URL LCMT software 511 of the illustrative embodiment, running on one or more manufacturer-operated/managed client computer subsystems 513, as shown in FIG. 13.

As shown in FIG. 17, GUI 526 comprises a number of display structures namely: a window-style framework having a toolbar menu 527 along the upper portion of the framework and an information display window 528 centrally disposed within the framework and having horizontal and vertical scroll bars 529A and 529B, respectively, for moving into view the UPN/TM/PD/URL link information about any UPN-indexed product registered in its locally-managed UPN/TM/PD/URL; a Use Default URL Link Categories button 530 for enabling the user to create a prespecified set of URL link data fields, organizable into "pre-purchase" and "post-purchase" types, into which active URL links can be entered manually, semi-automatically or automatically using the various techniques described hereinabove; a Create Custom URL Link Categories button 531 for enabling the user to create a custom-designed set of URL link fields, organizable into, pre-purchased and post-purchase types, into which active URL links can be entered manually or using the semi-automated techniques described hereinabove; a Create URL Link button 532 for enabling the user to enter URLs into the URL link categories established within the local UPN/TM/PD/URL RDBMS 9' under construction; Manage (i.e. Edit) URL Link button 533 for enabling the user to edit URLs entered into the URL link categories established within the local UPN/TM/PD/URL RDBMS under construction or management; a Transport UPN/TM/PD/URL RDBMS button 534 for enabling the user to manually or automatically initiate/activate the transport of the locally-managed UPN/TM/PD/URL RDBMS 512 to the centrally maintained UPN/TM/PD/URL RDBMS 9' using EDI (e.g. ftp, XML, conventional EDI, etc.)

processes as taught in detail hereinabove; UPN/TM/PD/URL Link Record data field 535 for displaying the UPN, trademarks (TMS), product descriptors, and URLs related to the consumer product assigned to the UPN by the UPC manager of the manufacturer (or vendor);a if UPN data field 536 for displaying the UPN associated with a particular UPN/TM/PD/URL Link Record data field; a First Trademark (i.e. brand name) data field 537A for displaying the primary trademark associated with a particular UPN/TM/PD/URL Link Record data field; a Second Trademark (i.e. brand name) data field 537B for displaying the secondary trademark associated with a particular UPN/TM/PD/URL Link Record data field; a Product Descriptor (PD) data field 538 for displaying a generic product description or descriptor associated with a particular UPN/TM/PD/URL Link Record data field; a Pre-purchase URL Link Record 539 for displaying a first plurality of Categorized URL Records 540, each Categorized URL Record containing a Pre-purchase Related URL Category Label 541 and a URL string 542 pointing to an information resource on the Internet, and associated with a particular UPN/TM/PD/URL Link Record data field; a Post-purchase URL Link Record 543 for displaying a second plurality of Categorized URL Records 544, each Categorized URL Record containing a Post-purchase Related URL Category Label 545 and a URL string 546 pointing to an information resource on the Internet, and associated with a particular UPN/TM/PD/URL Link Record data field; a First Date Created data field 548 for displaying the first date that the particular UPN/TM/PD/URL Link Record data field was created within the manufacturer's (or vendor's) UPN/TM/PD/URL RDBMS; a Last Date Modified data field 549 for displaying the last date that the particular UPN/TM/PD/URL Link Record data field was modified within the manufacturer's (or vendor's) UPN/TM/PD/URL RDBMS; a Last Date Transported data field 550 for displaying the last date that the particular UPN/TM/PD/URL Link Record data field was transported from the manufacturer's (or vendor's) UPN/TM/PD/URL RDBMS, to the centrally-managed UPN/TM/PD/URL RDBMS 9' during database updating operations; and Approved By Whom data field 551 for displaying the name and identification code of the authorized user who last modified or transported the particular UPN/TM/PD/URL Link Record data field stored within the manufacturer's (or vendor's) UPN/TM/PD/URL RDBMS. Notably, the data displayed within this GUI 526 is obtained from the data tables comprising the UPN/TM/PD/URL RDBMS 9' shown in FIGS. 15A through 15MM. As shown in FIG. 17A, the UPN, TM and PD data fields 536, 537A, 537B and 538 are automatically populated with data imported from the UPC management RDBMS 450 during data importation and synchronization operations, illustrated in FIG. 2C2, and described in detail above.

In order to provide marketing, brand and product managers with a wide range of choice in URL Link Category labeling, and without having to create custom-designed URL Link Category labels by entering the Custom URL Link Category Design mode of the software-based system, the UPN/TM/PD/URL link creation, management and transport software 511 of the illustrative embodiment provides the user with a list of pre-designed Default URL Link Category label sets, each being specifically tailored to a particular segment and sectors of the consumer product industry (as well as to particular segments and sectors of various services industries when such tools are used by vendors offering services for sale, rather than consumer products). For example, a manufacturer in the sound recording industry, making and selling music CD-ROMs, might be interested in "pre-purchase-type" URL Link Category labels such as: music-video sample clip #1; music-video sample clip #2; music sample #1; music sample #2; CD Recording Graphics; Music Review # 1; Music Review #2; Web-based Product Advertisement # 1; Web-Based Product Advertisement #2; Product Promotion #1; Product Promotion #2; Buy CD On-Line; etc.; while "Post-purchase-type" URL Link Category labels might include: Artist Biography; Concert Tour Schedule; Artist WWW site; On-Line Chat; E-mail Artist; Earlier Musical Works; etc. While URLs listed under "pre-purchase-type" URL Link Category labels will typically serve to satisfy the consumer need for information about the product in order to decide to purchase the same, URLs listed under "post-purchase-type" URL Link Category labels will typically serve to provide the consumer with valuable information useful after purchasing the product, and helping the manufacturer to retain its customers.

The GUI 526 shown in FIG. 17 and described above is merely illustrative of the kind of graphical user interface which would enable marketing, brand and/or product managers and their agents and assistants to carry out their UPN/TM/PD/URL link creation, management and transport operations in an efficient and productive manner. It is understood, however, that other GUI designs can be used to practice this aspect of the present invention in accordance with the novel teachings disclosed herein.

In order to fully utilize the diverse intellectual and information resources typically available within a manufacturer's (i.e. vendor's) organization, the present invention teaches using a distributed method of URL category management in the system of FIGS. 9-14, similar to the method illustrated in FIG. 2C, and described above. This distributed method will be described below with reference to FIGS. 17A and 17B.

As shown in FIG. 17A, a plurality of manufacturer-operated client subsystems 512 are shown connected to a local or wide area IP-based local area network (LAN or wide area network (WAN) 200, preferably maintained behind a secure corporate firewall. The secured manufacturer information network 200 is connected to the infrastructure of the Internet by way of an Internet router and server. The primary function of this network is to enable different departments within a business organization (e.g. marketing, sales, engineering, support and service, advertising, finance, etc.) manage different types of UPN/TM/PD/URL links in accordance with the distributed method of URL category management described. According to this distributed method of URL category management, a different set of CPI URL categories are assigned to and managed by a different department within the manufacturer's enterprise. As illustrated in FIG. 17B, each manufacturer-operated computing subsystem 512 employed in each department runs the UPN/TM/PD/URL LCMT software 511 described above, and displays a local GUI 526A similar to the GUI 526 schematically shown in FIG. 17. The primary difference is that each local UPN/TM/PD/URL LCMT GUI 526A is constrained to accept entry of URL data for only the set of URL categories assigned by the central UPN/TM/PD/URL management GUI 512A to the department in which the local UPN/TM/PD/URL LCMT GUI 512 is deployed. As shown, each local UPN/TM/PD/URL LCMT program 511 periodically transports its UPN/TM/PD/URL link information files to the EDI-enabled network information server 512A configured within the LAN or WAN 200 of the manufacturer's enterprise. Periodically, the complete set of UPN/TM/PD/URL link information files, associated with the manufacturer's entire local UPN/TM/PD/URL RDBMS 511A, are transported to the central UPN/TM/PD/URL RDBMS 9' using EDI, ftp, http, e-mail, or other electronic transport processes known in the art or to be developed in the future.

As taught in great detail above, the data contained in each UPN/TM/PD/URL Link Record data field within a manufacturer's (or vendor's) UPN/TM/PD/URL RDBMS 512 is transported to the centrally managed UPN/TM/PD/URL RDBMS 9', and thereafter such data is distributed to consumers worldwide by way of physical and virtual types of multi-mode kiosks 513, 514 deployed by the kiosk server subsystem 11A in accordance with the principles of the present invention. In general, there are many possible display formats in which such UPN/TM/PD/URL link data can be displayed to consumers through physical and virtual CPI kiosks 513, 514. FIGS. 18A through 18C2 illustrate exemplary GUIs 552A through 552E for consumers to interactively access and display consumer product information (CPI) from both physical and virtual multi-mode kiosks operating in their CPI-access/display mode of operation.

In FIG. 18A, there is shown an exemplary (physical or virtual) kiosk GUI 552A which is displayed when (i) the UPN-directed search mode has been selected by the consumer, and (ii) UPN data has been entered into the kiosk GUI by either manual data entry into the UPN-entry window in the kiosk GUI or by reading a UPN bar code symbol on a product using a bar code scanner connected to the kiosk. In response to such data entry operations, a database search is automatically made against the UPN/TM/PD/URL RDBMS 9', and an UPN/TM/PD/URL link record is automatically retrieved from the database search and displayed within the kiosk GUI 552A. As shown therein, the UPN, TM and PD data associated with the entered UPN data is displayed in the upper portion of the kiosk GUI 552A, whereas the pre-purchase and post-purchase URLs are displayed within the balance of the GUI. At this stage, the consumer is encouraged to select any URL entry displayed in the kiosk GUI to automatically access and display the corresponding (multi-media) information resource within a separate GUI screen displayed on the consumer's client computing machine 13.

As shown in FIG. 18A, GUI 552A comprises a number of display structures namely: a scalable window-style framework 553 having a toolbar menu 554 along the upper portion of the framework and an information display window 555 centrally disposed within the framework and having horizontal and vertical scroll bars 556A and 556B, respectively, for displaying either (i) UPN/TM/PD/URL link information about any UPN-indexed product registered in its locally-managed UPN/TM/PD/URL in response to a UPN-directed search against the central UPN/TM/PD/URL RDBMS 9', or (ii) a list of UPN/TM/PD/URL links returned from a trademark (TM) directed search, product directed (PD) search, or manufacturer's home-page MHP) directed search made against the central UPN/TM/PD/URL RDBMS 9'; a UPN-Directed Search button 557 for enabling the user to initiate a UPN-directed search against the central UPN/TM/PD/URL RDBMS 9'; a TM-Directed Search button 558 for enabling the user to initiate a TM-directed search against the central UPN/TM/PD/URL RDBMS 9'; a PD-Directed Search button 559 for enabling the user to initiate a PD-directed search against the central UPN/TM/PD/URL RDBMS 9'; a MHP-Directed Search button 560 for enabling the user to initiate a MHP-directed search against the central UPN/TM/PD/URL RDBMS 9'; a data entry field 561 for entering UPN, TM or PD data in connection with a segmented CPI search anode by a consumer; UPN data field 562 for displaying the UPN associated with a particular UPN/TM/PD/URL Link Record data field retrieved from the central UPN/TM/PD/URL RDBMS 9'; a First Trademark (i.e. brand name) data field 563A for displaying the primary trademark associated with the particular UPN/TM/PD/URL Link Record data field; a Second Trademark (i.e. brand name) data field 563B for displaying the secondary trademark associated with the particular UPN/TM/PD/URL Link Record data field; a Product Descriptor data field 564 for displaying a generic product description or descriptor associated with the particular UPN/TM/PD/URL Link Record data field; a Pre-purchase URL Link Record 565 for displaying a first plurality of Categorized URL Records 566, each Categorized URL Record containing a Pre-purchase Related URL Category Label 567 and a URL string 568 pointing to an information resource on the Internet, and associated with a particular UPN/TM/PD/URL Link Record data field; a Post-purchase URL Link Record 569 for displaying a second plurality of Categorized URL Records 570, each Categorized URL Record containing a Post-purchase Related URL Category Label 571 and a URL string 572 pointing to an information resource on the Internet, and associated with a particular UPN/TM/PD/URL Link Record data field; and a UPN/TM/PD/URL-Link Transport Button 573 for enabling a consumer to send collected CPI-links to a remote e-mail address using e-mail-based protocols, as taught herein above with respect to the first illustrative system embodiment.

In general, when the manufacturer (or vendor) has decided to use the predesigned default URL Link Category labels for its UPN/TM/PD/URL link creation, management and transport GUI, as described above, then the physical and virtual kiosk GUIs used to display the manufacturer's (or vendor's) UPN/TM/PD/URL links to consumers will use the same predesigned Default URL Link Category labels to display URLs linked to the UPN/TM/PD/URL Link Records transported to the central UPN/TM/PD/URL RDBMS 9'. Similarly, when the manufacturer (or vendor) has decided to use Custom (manufacturer-created) URL Link Category labels for its UPN/TM/PD/URL link creation, management and transport GUI, during UPN/TM/PD/URL link creation, management and transport operations, as described above, then the physical and virtual kiosk GUIs used to display the manufacturer's (or vendor's) UPN/TM/PD/URL links to consumers will use the same custom-created URL Link Category labels to display URLs linked to particular UPN/TM/PD/URL Link Records. Such inventive features of the consumer product e-marketing system hereof provide marketing, brand and product managers great flexibility in designing/choosing URL Link Categories that match their product marketing and brand strategies.

In FIG. 18B1, there is shown an exemplary (physical or virtual) kiosk GUI 552B which is displayed when (i) the TM-directed search mode has been selected by the consumer, and (ii) a keyboard emulation screen is automatically displayed to enable the consumer to enter trademark (TM) data into the kiosk GUI by manual data entry. At this stage, the consumer is encouraged to enter one or more trademarks (TMs) into the kiosk GUI using the displayed keyboard emulation 556C. Upon entering such data into the kiosk GUI 552B, a database search against the UPN/TM/PD/URL RDBMS 9' is made, and the UPN/TM/PD/URL link record is retrieved from the database search and displayed into the exemplary (physical or virtual) kiosk GUI 552C shown in FIG. 18B2. As shown in FIG. 18B2, the UPN, TM and PD associated with the entered TM data is displayed in the upper portion of the kiosk GUI 552C, whereas the pre-purchase and post-purchase URLs are displayed within the balance of the GUI. At this stage, the consumer is encouraged to select any URL entry displayed in the kiosk GUI 552C to automatically access and display the corresponding (multi-media) information resource within a separate GUI screen displayed in the consumer's client computing machine.

FIG. 18C1, there is shown an exemplary (physical or virtual) kiosk GUI 552D which is displayed when (i) the PD-directed search mode has been selected by the consumer, and (ii) a keyboard emulation 556C screen is automatically displayed to enable the consumer to enter product descriptor (PD) data into the kiosk GUI by manual data entry. At this stage, the consumer is encouraged to enter one or more product descriptor into the kiosk GUI using the displayed keyboard emulation. Upon entering such data into the kiosk GUI 552D, a database search against the UPN/TM/PD/URL RDBMS 9' is made, and the UPN/TM/PD/URL link record is retrieved from the database search and displayed into the exemplary (physical or virtual) kiosk GUI 552E shown in FIG. 18C2. As show therein, the UPN, TM and PD associated with the entered PD data is displayed in the upper portion of the kiosk GUI 552E, whereas the pre-purchase and post-purchase URLs are displayed within the balance of the GUI. At this stage, the consumer is encouraged to select any URL entry displayed in the kiosk GUI to automatically access and display the corresponding (multi-media) information resource within a separate GUI screen displayed in the consumer's client computing machine 13.

Detailed Description of the Internet-Based Consumer Product Information Kiosk Configuration, Deployment, Management and Access Subsystem of the Second Illustrative Embodiment of Present Invention Information Services for Retailers As illustrated in FIG. 19A, the CPI kiosk ordering/configuration/deployment/management server 506 of the illustrative embodiment supports a number of information services for retailers, namely:

- Registering Retailer and Creating a Retailer Account;
- Logging-into system by Retailer;
- Updating and Displaying Kiosk Deployment Directory;
- Selecting and Ordering Physical and Virtual Kiosks for Deployment;
- Specifying The Location/Domain of Kiosk Installation and Deployment;
- Selecting Information Services Delivered by Deployed CPI Kiosks;
- Selecting and Customizing CPI Kiosk GUI Design;
- Registering Manufacturer's Aisle/Shelf Rights and Privileges on CPI Kiosks;
- Registering Retailer's Advertising Agents;
- Registering Retailer's Product Promotional Agents;
- Monitoring the Performance of Registered Retailer Advertising Agent;
- Monitoring the Performance of Registered Retailer Promotional Agent.

In the illustrative embodiment, these functions are supported by the CPI kiosk ordering/configuration/deployment/management server 506 which is made accessible to retailers (e.g. regional, district and/or store managers) through a Web-based GUI, using any Web-enabled client computer subsystem 13. An exemplary GUI for this subsystem 506 is illustrated in FIG. 20A. As shown therein, the GUI for subsystem 506 can be realized as a Netscape-style three frame display framework 580, comprising: a thin upper vertical display frame 581 containing a graphical image indicating the name of the WWW site (e.g. "BrandKey Request Administration For Retailers") at which subsystem 506 is located; a thin horizontal control frame having a set of buttons 583A-583G for enabling the various functions provided by subsystem 506; and a large information display frame 584 for displaying HTML-encoded pages used to construct the graphical interfaces associated with the various functions provided by this subsystem.

To register with the system, the retailer selects function button 583A in the control strip 582 of the GUI shown in FIG. 20A and appropriate interactive display screens will be displayed in display frame 584 to enable solicitation and entry of various types of data reflected in the retailer-related data tables shown in FIGS. 15E, 15F and 15KK. During the registration process, information about the retailers relationship with product manufacturers, advertisers and promoters will be collected in order to carry out the various functions in the system requiring such kinds of information.

To access the information services supported by the CPI kiosk ordering/configuration/deployment server 506, the registered retailer logs into the subsystem by selecting function button 583B and using its user name and password. Once logged-in, the retailer may view a catalog of the virtual and physical CPI kiosks currently deployed within its physical and electronic retail shopping environments. From these displayed catalogs, detailed information about each deployed kiosk can be accessed and displayed. The number and type of information services (e.g. CPI, advertising and promotional modes) enabled on each such kiosk can be modified as dictated by the need of the retailer. Also, additional (multi-mode type) CPI kiosks ca be specified, configured and ordered for deployment within a particular retail-shopping environment. Orders for physical CPI kiosks placed by a particular retailer will require physical installation in a specified retail store, and therefore the system will typically require registration of each physical retail store (i.e. P-Store) within the UPN/TM/PD/URL RDBMS 9' at the time the physical kiosk order is placed, or beforehand, however the case may be. When P-stores are registered with the system, the retailer will be asked to submit store floor plans, showing aisles, shelf locations and the like to facilitate installation of the physical kiosk.

When ordering a CPI kiosk, the subsystem 506 will request the retailer to select a CPI kiosk GUI suitable to the retailer's needs. Some retailers currently deploy a retailer's WWW site and one or more retailer-oriented WWW sites on store-based kiosks, seeking to create a seamless interface between their physical and electronic shopping environments. In such instances, where the retailer does not want to disturb this marketing approach, the retailer will most likely want to deploy virtual CPI kiosks 514 on physical (bar code driven) CPI kiosks 513 displaying the retailer's in-store Web site with virtual CPI kiosks 514 employed therein. Using this technique, CPIR-enabling Applets can be embedded within the HTML-fabric of the retailer's in-store Web site at locations where virtual CPI kiosks are desired.

In other instances, the retailer may desire to install physical "multi-mode" CPI kiosks 513 having a GUI similar to the one shown in FIG. 3A14, or as shown in FIGS. 21A through 21C.

As shown in FIG. 21A, the multi-mode physical CPI kiosk of the illustrative embodiment displays a three-frame Netscape-style GUI screen 590 on its touch-screen LCD display panel when the CPI kiosk is operating in its Advertisement Spot Display Mode. In this display mode, purchased advertisement spots are loaded into the physical CPI kiosk's advertisement/promotion spot queue and are automatically displayed on the display screen of the physical CPI kiosk when consumer are not making CPI requests (i.e. during its quiescent moments).

As shown in FIG. 21B, the multi-mode physical CPI kiosk of the illustrative embodiment displays a three-frame Netscape-style GUI screen 592 on its touch-screen LCD display panel when the CPI kiosk is operating in its Promotion Spot Display Mode. In this display mode, purchased promotion spots are loaded into the physical CPI kiosk's advertisement/promotion spot queue 525 and are automatically displayed on the display screen of the physical CPI kiosk 513 when consumers are not making CPI requests thereof (i.e. during its quiescent moments).

As shown in FIG. 21C, the multi-mode physical CPI kiosk of the illustrative embodiment displays a three-frame Netscape-style GUI screen 592 on its touch-screen LCD display panel when the CPI kiosk is automatically switched into its CPI Display Mode of operation in response to an interruption of its Advertisement Spot Display Mode of operation (shown in FIG. 21A or its Promotion Spot Display Mode of operation (shown in FIG. 21B). In this mode of operation, CPI requested by a consumer is automatically displayed on the CPI kiosk in response to manual data input or scanning of UPN labels on consumer products. Also, any of the four basic modes of CPI searching (e.g. UPN-directed, TM-directed, PD-directed or MHP-directed) can be selected by the consumer by simply depressing the corresponding mode selection buttons 593A, 593B, 593C and 593D, respectively, displayed along the control strip 594 of the GUI display framework. Also, the e-mail driven CPI-Link Transport Mode of the CPI kiosk can be selected by way of mode selection button 593E in the control strip 594.

In yet other instances, the retailer may not wish to provide bar code scanning functionalities within one or more physical CPI kiosks deployed within a physical retailer store, but yet wants to enable consumers to quickly access consumer product information on products displayed on the physical store shelves about which a multi-mode physical CPI kiosk is installed along a store aisle. In such cases, the retailer may configure its ordered physical CPI kiosk 513 to have a GUI 580 similar to the one shown in FIG. 22, wherein a 2-D or 3-D computer graphics model 595 is created for the aisle and shelf space disposed about the physical CPI kiosk 513 and this computer graphics model is displayed through the physical kiosk GUI 596 so that a consumer viewing the (multimode) CPI kiosk, and the consumer products displayed thereabout, sees (on the touch-screen display screen of the kiosk) a virtual model of the surrounding aisle and shelf space and all of the brands of products displayed thereon.

Preferably, each virtual product 597 displayed through this GUI will carry its trademark (i.e. brand), and its location will spatially correspond to the location of its graphical image or icon with the virtual aisle/shelf model displayed on the physical kiosk. Using this sort of GUI on a physical CPI kiosk 513, the consumer can access and display (within a virtual CPI kiosk 514) the UPN/TM/PD/URL link record associated with a particular consumer product by simply touching the graphical image or icon of a particular consumer product displayed on the touch-screen enabled physical CPI kiosk 513. Upon the display of the virtual CPI kiosk, and the UPN/TM/PD/URL link record displayed therewithin, the consumer can then select the URL links relating to types of information sought by the consumer. This CPI display technique can be realized by embedding a CPI-enabling Java Applet within the graphical image or icon of the consumer product displayed in the virtual model of the store shelf, about the physical CPI kiosk. Preferably, each CPIR-enabling Java Applet embodies the UPN (or trademark) of the consumer product and its Applet tag includes a graphics file of the image of the consumer product or of a graphical icon embodied within the graphical image of the consumer product, as taught by Applicant in great detail hereinabove.

Notably, the 2-D or 3-D computer graphics model 595 of the physical shelf (and aisle) space about the physical CPI kiosk will be created by the retailer or its agent using appropriate computer-graphic store aisle/shelf modeling software made accessible to the retailer or its agent through the GUI 580 shown in FIG. 20A. Such computer graphic models will be stored within the central UPN/TM/PD/URL RDBMS 9', preferably in an information field (not shown) in the data table shown in FIGS. 15A-15MM, or elsewhere within the UPN/TM/PD/URL RDBMS 9'. Such computer graphic models of the physical kiosk, surrounding aisle(s) and shelves and products thereon, are served to the physical CPI kiosk 513 by way of its enabling Web server 519A, operably connected to the UPN/TM/PD/URL RDBMS 9', as shown in FIG. 13.

Once a physical or virtual type CPI kiosk has been designed, ordered, configured and installed, the retailer will have the option of registering the rights and privileges it has granted to manufacturers who stock and display particular brands of products in the physical aisles and on the physical shelves of its physical stores, as well as the virtual aisles and on the virtual shelves of its virtual (i.e. electronic) stores accessible on the WWW. Typically, such aisle/shelf rights/privileges are negotiated by (i) the retailer's purchasing agent or buyer (or its store or district manager) and (ii) the manufacturer's sales representative, oftentimes at the time of purchase of particular goods. During such negotiations, the manufacturer's sales representative typically seeks to negotiate the best position for stocking and displaying its products in the retailer's store in order to maximize sales and profit for the manufacturer. The retailer, who purchases products from the manufacturer/vendor at wholesale terms and prices, typically wants to purchase goods at the lowest price, warehouse the purchased products as needed, and sell the products to maximize sales and profits.

In order to register such manufacturer aisle/shelf rights/privileges with respect to a particular CPI kiosk deployed in the particular aisle of a particular retail store, the retailer must operate subsystem 505 in its Manufacturer Aisle/Shelf Right/Privilege Registration Mode. Notably, registration of such rights/privileges can be done by manual data entry operations, using any Web-enabled client computer (e.g. located anywhere within the retailers enterprise). Typically, such registration operations will require access to information records maintained by the retailer regarding its grant of manufacturer aisle/shelf rights/privileges in a particular retail store or chain of stores. However, such manual data entry operations can be quite laborious, and therefore there is a need for an easier, more convenient method of registering manufacturer (i.e. vendor) aisle/shelf rights in a physical retail store.

In FIG. 23, there is illustrated an easier, more convenient method of registering manufacturer (i.e. vendor) aisle/shelf rights with respect to a particular physical CPI kiosk deployed in retail store. As shown, this novel method involves using either (i) a portable wireless bar code symbol reader 600 to read the UPC or UPC/EAN labels on consumer products 601 located on the physical shelves 602 and in the physical aisles 603 surrounding the physical CPI kiosk 513, or (ii) a portable wireless optical character reader 605 to read the UPC or UPC/EAN labels on consumer products located on the physical shelves and in the physical aisles surrounding the physical CPI kiosk. Preferably, the portable wireless bar code reader 600 or optical character reader 605 can be RF-linked to any particular physical CPI kiosk (but preferably to the one being programmed with manufacturer aisle/shelf rights/privileges), or the LAN to which the kiosk is connected, and then the Manufacturer Aisle/Shelf Right/Privilege Registration Mode of the system can be selected on the physical CPI kiosk 513 to which the bar code symbol reader or optical character reader is linked during manufacturer aisle/shelf right registration operations.

The primary steps involved in carrying out the data-processing method schematically depicted in FIG. 23 are illustrated in FIGS. 24A and 24B.

In FIG. 24A, a UPC-directed method of manufacturer aisle/shelf rights/privileges registration is illustrated. As indicated at Block A in FIG. 24A, the first primary step of this method involves the retailer inducing the physical CPI kiosk into its Manufacturer Aisle/Shelf Rights/Privileges Registration Mode which can be achieved simply by selecting button 583D on the GUI shown in FIG. 20. In this state, the kiosk is deemed active and ready to be programmed with manufacturer identification numbers (MINs) against the kiosk's identification number. In this state, a kiosk display screen will be presented within the information frame of the GUI providing simple instructions on how to register such manufacturer rights/privileges with regard to the particular kiosk before him or her.

As indicated at Block B in FIG. 24A, the second primary step in the method involves reading the UPC symbol labels on different brands of consumer products on the shelves about the "active" kiosk, within and about the aisles thereof, so that such information can be transmitted back to the UPN/TM/PD/URL RDBMS 9' for processing by the integrated data processing subsystem 517. Such bar code symbol reading operations can be carried out using: (1) ones eyes and then entering such information into the system by way of keyboard data entry operations emulated on the touch-screen display of the CPI kiosk; (2) a bar code symbol reader with memory which subsequently downloaded to the UPN/TM/PD/URL RDBMS 9'; or (3) a bar code symbol reader 600 RF-linked to the kiosk being programmed, or to a central wireless network controller with IP-connectivity to the LAN to which the interface kiosk is connected, e.g. commercially available from Symbol Technologies, Inc., in a manner well known in the art. Using a simple data processing algorithm, the data processing subsystem 517 can analyze the inputted UPNs and parse out the MINs therefrom to determine a list of manufacturers having aisle/shelf rights to the particular kiosk. Such resultant information would be stored in the data table of FIG. 15LL. In essence, recording such MINs into this data table provides the corresponding kiosk with "retailer authorization" to subsequently accept product advertisement and promotion spot orders for display to consumers during the business daily hours. For manufacturers whose MINs are not recorded in the corresponding data table of FIG. 15LL, such manufacturers and their advertising and promotional agents, will not be permitted to place product advertisement and promotion spot orders to run on the particular kiosk being programmed, thereby respecting aisle/shelf rights/privileges granted to particular manufacturers by particular retailers as part of their business agreements.

In FIG. 24B, a TM-directed method of manufacturer aisle/shelf rights/privileges registration is illustrated. As indicated at Block A in FIG. 24B, the first primary step of this method involves the retailer inducing the physical CPI kiosk into its Manufacturer Aisle/Shelf Rights/Privileges Registration Mode which can be achieved simply by selecting button 543E on the GUI shown in FIG. 20. In this state, the kiosk is deemed active and ready to be programmed with manufacturer identification numbers (MINs) against the kiosk's identification number. In this state, a display screen will be presented within the information frame of the GUI providing simple instructions on how to register such manufacturer rights/privileges with regard to the particular kiosk before him or her.

As indicated at Block B in FIG. 24A, the second primary step in the method involves the trademark (or brand name) labels on different brands of consumer products on the shelves about the "active" kiosk, within and about the aisles thereof, and entering such information into the system (e.g. via virtual keyboard displayed on the kiosk GUI during this state of programming) so that such information can be transmitted back to the UPN/TM/PD/URL RDBMS for processing by the integrated data processing subsystem 517. Such trademark reading operations can be carried using: (1) ones eyes and then entering such information into the system by way of keyboard data entry operations; (2) an optical character reader 600 with memory which subsequently downloaded to the UPN/TM/PD/URL RDBMS 9'; or (3) an optical character reader 605 RF-linked to the kiosk being programmed, or to a central wireless network controller with IP-connectivity to the LAN to which the interface kiosk is connected, e.g. commercially available from Symbol Technologies, Inc., in a manner well known in the art. Using a simple data processing algorithm, the data processing subsystem 517 can analyze the inputted TMs and then determine a list of manufacturers (identified by MIN) having aisle/shelf rights to the particular kiosk. Such resultant information would be stored in the data table of FIG. 15LL. In essence, recording such MINs into this data table provides the corresponding kiosk with "retailer authorization" to subsequently accept product advertisement and promotion spot orders for display to consumers during the business daily hours. For manufacturers whose MINs are not recorded in the corresponding data table of FIG. 15LL, such manufacturers and their advertising and promotional agents, will not be permitted to place product advertisement and promotion spot orders to run on the particular kiosk being programmed, thereby respecting aisle/shelf rights/privileges granted to particular manufacturers by particular retailers as part of their business agreements.

When desiring to register the virtual aisle/shelf rights of manufacturers with a particular virtual CPI kiosk of the present invention, similar techniques to those described above can be used, except that the obtained list of MINs related to a particular kiosk will be store in the data table of FIG. 15MM.

Notably however, in many instances, the retailer may contain data files containing information on the manufacturer aisle/shelf rights/privileges granted to particular manufacturer(s) with respect to a particular (physical or virtual) kiosk in a retail-shopping environment. In such instances, programming the kiosk with such manufacturer's rights/privileges will be greatly simplified. In some instances, a single manufacturer may have exclusively aisle/shelf rights to a particular kiosk, but other stores, many manufacturers will have non-exclusive aisle/shelf rights, resulting a more diverse mix of product advertisements and promotions displayed on the interactive kiosk.

Once such manufacturer aisle/shelf rights have been registered with a particular physical CPI kiosk, the information collected during the registration process is automatically stored in the data tables of the UPN/TM/PD/URL RDBMS 9', shown in FIGS. 15LL and 15MM. As will be described in greater detail hereinafter, such manufacturer aisle/shelf rights/privileges are used to create MIN-based data filters within the data processing subsystem 517 in the UPN/TM/PD/URL 9', shown in FIG. 13. Such data filters will enable advertisers and promoters to place ad spot orders and promotion spot orders on particular physical CPI kiosks, provided that the manufacturers associated the product ad or promo spot are registered as having "manufacturer aisle/shelf rights/privileges" granted to an aisle and shelf location at which the physical CPI kiosk is located.

While primary focus above has been given to physical CPI kiosk 513, it must be pointed out that retailers can order, configure and deploy virtual-type CPI kiosks 514 in much the same manner as physical CPI kiosks, as described above. Thus, in those cases where, for example, the CPIR-enabling Applet tag is to be installed in a specified e-retail store, system 2' will typically require registration of the virtual retail store (i.e. E-Store) within the UPN/TM/PD/URL RDBMS 9' at the time the virtual kiosk order is placed, or beforehand, however the case may be. When E-stores are registered with the system by the retailer, the e-retailer will be asked to submit virtual floor plans of its WWW site, showing virtual aisles, shelf locations and the like if any, to facilitate the specification and identification of the deployed kiosk in a retailer's virtual kiosk advertisement directory, or virtual kiosk promotion directory.

By selecting function button 583F, the retailer may certify any of the retailer's registered product advertising agents listed in the data table of FIG. 15I by way of the retailer's advertiser registration process supported by server 507. This information service can be used for initial certifications and well as changing or modifying advertiser certifications. Once properly certified by the retailer using subsystem 501, each certified/registered advertising agent will be deemed authorized by its retailer-principal to publish product advertisements, on retailer-authorized kiosks, on behalf of the retailer, using UPN-indexed advertising materials listed in the data table of FIG. 15D1.

By selecting function button 583G, the retailer may certify any of the retailer's registered product promotion agents listed in the data table of FIG. 15J by way of the retailer's promoter registration process supported by server 508. This information service can be used for initial certifications and well as changing or modifying promoter certifications. Once properly certified by the retailer using subsystem 501, each certified/registered promotional agent will be deemed authorized by its retailer-principal to publish product promotions on retailer-authorized CPI kiosks, on behalf of the retailer, using UPN-indexed advertising/promotional materials listed in the data table of FIG. 15D1.

Information Services for Manufacturers

Also illustrated in FIG. 19B, the CPI kiosk ordering/configuration/deployment/management server 506 of the illustrative subsystem embodiment 505 supports a number of information services for manufacturers, namely:

- Registering Manufacturer and Creating a Manufacturer Account;
- Logging-into system by Manufacturer;
- Updating and Displaying Manufacturer's Virtual CPI Kiosk Deployment Directory;
- Selecting and Ordering Product-Specific Virtual CPI Kiosks for Deployment (by specifying UPNs and/or TMs used in connection with such consumer products);
- Specifying The Domain of Virtual Kiosk Installation and Deployment;
- Selecting Information Services Delivered by Deployed Virtual CPI Kiosks;
- Selecting and Customizing CPI Design—Virtual Kiosk GUI Design;
- Registering Manufacturer's Virtual Aisle/Shelf Rights and Privileges on Virtual CPI Kiosks;
- Registering Manufacturer's Advertising Agents;
- Registering Manufacturer's Product Promotional Agents;
- Monitoring the Performance of Certified/Registered Manufacturer Advertising Agent;
- Monitoring the Performance of Certified/Registered Manufacturer Promotional Agent.

In the illustrative embodiment, these functions are supported by the CPI kiosk ordering/configuration/deployment/management server 506 which is made accessible to manufacturers (e.g. marketing, brand and/or product managers, and other support personnel) through a Web-based GUI, using any Web-enabled client computer subsystem. An exemplary GUI 610 for subsystem 506 in this mode of operation is illustrated in FIG. 20B. As shown therein, the GUI for subsystem 506 can be realized as a Netscape-style three frame display framework, comprising: a thin upper horizontal display frame 611 containing a graphical image indicating the name of the WWW site (e.g. "BrandKey Request For Manufacturer") at which subsystem 506 is located; a thin horizontal control frame 612 having a set of buttons 612A through 612D for enabling the various functions provided by subsystem 506; and a large information display frame 613 for displaying HTML-encoded pages used to construct the graphical interfaces associated with the various functions provided by this subsystem 504.

To register with the subsystem, the manufacturer selects function button 612A in the control strip 612 of the GUI 610 shown in FIG. 20B and appropriate interactive display screens will be displayed in display frame 613 to enable solicitation and entry of various types of data reflected in the retailer-related data tables shown in FIGS. 15E, 15F and 15G. If a manufacturer has already registered with subsystem 501, then registration with subsystem 504 will be a significantly abbreviated process as much relevant information will have been previously collected. During the registration process, information about the retailers relationship with product manufacturers, advertisers and promoters will be collected in order to carry out the various functions in the system requiring such kinds of information. Such information is used to certify advertisers and promoters who have independently registered with the system.

To access the information services supported by the CPI kiosk ordering/configuration/deployment/management server 506, the registered manufacturer logs into the subsystem by selecting function button 612B and using its user name and password. Once logged-in, the manufacturer may select function button 612C to view (i) a directory/catalog of the virtual "UPN-restricted/product-specific" CPI kiosks which have been currently deployed on the WWW (by either the manufacturer or others), as well as (ii) a directory of virtual UPN-restricted/product-specific CPI kiosks which may be deployed and install on the WWW by others who download the enabling CPIR-enabling Applet tags from the CPIR-enabling Applet Tag Server 522, as shown in FIG. 13, and embed the tags in the HTML-fabric of the WWW at domains where the virtual CPI kiosks 514 are to be installed.

At any instant in time, the former virtual CPI kiosk directory indicated at (i) above might reflect a particular marketing campaign or strategy to create a heightened awareness, in a targeted market segment/domain, concerning a particular product or brand of products within the manufacturer's (i.e. vendor's) portfolio. However, the latter virtual CPI kiosk directory indicated at (ii) above, will typically be intended for use by the general public and have an entirely different purpose in the eyes of the manufacturer, e.g. to create good will with the public, enable them to promote the resale or trading of their consumer products via on-line auctions where installing a virtual product-specific CPI kiosk would be most valuable to someone considering making a bid on a particular consumer product. For a host of good reasons, some manufacturers may wish to provide this revolutionary CPI service to members of the public (e.g. its customers) for free (i.e. no licensing fee due), while other manufacturers may desire to charge each member of the general public a small licensing fee for each such virtual CPI kiosk deployed and installed on the WWW.

From the manufacturer-authorized virtual kiosk directory, detailed information about each virtual kiosk 514 deployed therefrom by members of the public can be accessed and displayed by the manufacturer and/or its agents. Such information can help manufacturers determine the demand for each product-specific virtual CPI kiosk offered to the general public for deployment/installation on the WWW. The number and type of information services (e.g. CPI, advertising and promotion modes) enabled on each virtual kiosk in the manufacturer's virtual kiosk directory can be modified as dictated by the needs of the manufacturer.

For each manufacturer's product, or brand of product, on which the manufacturer wishes a virtual product-specific multi-mode kiosk 514 to be deployable from subsystem 505 by others, the manufacturer will send the UPN and/or TM of the product to the CPIR-enabling Applet Generator/Server 519, indicated in FIG. 13, so as to instruct this server to automatically generate a CPIR-enabling Applet required to implement a product-specific type virtual multi-mode kiosk for the manufacturer's product. As illustrated in FIG. 13, the compile Applet code is loaded within one of the CPIR-enabling Applet Servers 520, while the corresponding the Applet tag is loaded into the CPIR-enabling Applet Tag Library Server 522, as described in great detail hereinabove. The licensing terms associated with the use and operation of each such product-specific multi-mode (e.g. CPI, advertising and promoting) virtual kiosk 514 will be encoded within the compiled code and tag of the Applet, as described. The manufacturer or its agent will manage its Catalog or Library of Product-Specific Multi-Mode Virtual Kiosks through the multi-mode kiosk ordering/configuration/deployment/management server 506.

As discussed hereinabove, the CPIR-enabling Applet tags enabling the generation of these product-specific virtual kiosks on the WWW can be cataloged according to their UPNs. However, to help the general public access a particular CPIR-enabling Applet tag, such Applet tags will be searchable by the name of the manufacturer of the corresponding consumer product, its brand name (e.g. trademark), and as well as by the generic product descriptor. Those desiring to install a CPI virtual kiosk along the WWW in accordance with the principles of the present invention will visit the CPIR-enabling Applet Tag Library, as described in detail above. The encapsulated CPIR-enabling Applet tag is then downloaded using any one of a number of techniques described above. Thereafter, the Applet tag is embedded within the HTML-code of the Web page, at which the user (i.e. virtual kiosk deployer) desires to install the corresponding virtual CPI kiosk.

Using the principles of the present invention, the manufacturer may choose to sponsor a library of "multi-mode" type virtual product-specific kiosks for the general public so that advertisements and/or product promotions can be programmably displayed from the product-specific virtual kiosk when launched from its point of installation on the WWW. In such applications, the CPIR-enabling Applet enabling the virtual kiosk 514 may be designed to automatically launch at the time of displaying its host HTML document, thereby providing a kiosk GUI on which to display product advertisement and/or promotion spots about the manufacturer's product. Depending on who sponsors the advertisement and/or promotion spot on the virtual kiosk (e.g. a particular retailer or the manufacturer of a complementary product), then it is possible that the product-specific virtual kiosk deployed by the manufacturer may be a potential source of advertising/promotional revenue therefor.

Information Services for Consumers

As shown in FIG. 19A, Web Server 506 in the Internet-Based Consumer Product Information Kiosk Configuration, Deployment, Management and Access Subsystem 504 of the illustrative embodiment also supports a number of information services for consumers, namely:

Accessing links to consumer product information (CPI)
Using UPNs (i.e. Bar Code Scanners)
Using Trademarks
Using Product Descriptors
Sending CPI-related URL links to consumers at home or work, using e-mail protocols;
Visiting the Manufacturer's website (i.e. homepage);
Registering Consumer (for links, or issuance, of items such as Retailer Courtesy Cards);
Displaying CPI Kiosk Directories
Virtual CPI Kiosks deployed in Retailer e-stores
Physical CPI Kiosks deployed in Retailer physical stores
Finding Physical CPI Kiosks deployed in Physical Retail Space;
Finding Virtual CPI Kiosks deployed on the Internet;
Monitoring Consumer E-Mail Transmission.

From the consumer's point of view, most information services designed therefor will be accessed within a registered retailer's store, and/or on the WWW. However, the WWW site providing consumers access to consumer-related information services provided by subsystem 504 will also contain consumer-related directories specifying the location of physical and virtual CPI kiosks deployed within the system. Based on such directories, the consumer can quickly access physical and/or virtual CPI kiosks of interest and seek UPN/TM/PD/URL link records on consumer products in which the consumer is interested.

When attempting to access CPI links from a physical CPI kiosk 513 within a particular retailer's store, the consumer CPI search request will automatically be data filtered (i.e. processed) using the data-processing method shown in FIG. 25, and described in FIGS. 26A and 26B. As described in such figures, the CPI request will typically include the (i) UPN of the product on which categorized CPI links are sought, as well as (ii) the IP address of the physical CPI kiosk enabling the CPI request. As indicated at Blocks F and G in FIG. 26B, if the manufacturer identified by the MIN recovered from the UPN contained in the CPI request is listed on the "retailer/manufacturer P-store relationship list" maintained within the UPN/TM/PD/URL RDBMS 9', then the CPI search results will be transmitted back to the requesting physical kiosk 513 for display to the consumer making the request; otherwise, the CPI search results obtained from the UPN/TM/URL RDBMS 9' will not be transmitted thereto, but instead will be filtered out to protect the goodwill embodied within the relationship between the manufacturer and retailer, as discussed in greater detail hereinabove.

When attempting to access CPI links from a virtual CPI kiosk 514 within a particular retailer's e-store, the consumer CPI search request will automatically be data filtered (i.e. processed) using the data-processing method shown in FIG. 27, and described in FIGS. 28A and 28B. As described in such figures, the CPI request will typically include the (i) UPN of the product on which categorized CPI links are sought, as well as (ii) the IP address of the virtual CPI kiosk enabling the CPI request. As indicated at Blocks F and G in FIG. 28B, if the manufacturer identified by the MIN recovered from the UPN contained in the CPI request is listed on the "retailer/manufacturer E-store relationship list" maintained within the UPN/TM/PD/URL RDBMS 9', then the CPI search results will be transmitted back to the requesting virtual kiosk for display to the consumer making the request; otherwise, the CPI search results obtained from the UPN/TM/PD/URL RDBMS 9' will not be transmitted thereto, but instead will be filtered out to protect the goodwill embodied within the relationship between the manufacturer and e-retailer, as discussed in greater detail hereinabove.

Detailed Description of the Internet-Based Consumer Product Advertisement Marketing, Programming and Delivery Subsystem of the Second Illustrative Embodiment of Present Invention As shown in FIGS. 9A, 11, and 13, the Consumer Product Related Advertisement Marketing, Programming, Management and Delivery Subsystem 502 comprises: a web-based product advertisement marketing/sales management (http) server 507 for enabling the following services: (1) registering advertisers (e.g. agents of manufacturers and retailers) and the creating advertiser accounts: (2) logging into the subsystem as a registered advertiser; (3) displaying General Kiosk Advertising Directories and identifying CPI kiosks on which the advertiser is authorized to display advertisements on consumer products; (4) displaying Brand Kiosk Advertising Directories and identifying CPI kiosks on which the advertiser is authorized to display advertisements on a particular brand of consumer products; (5) registering Kiosk Advertising Campaigns to be displayed on a retailer-authorized (initially-unspecified) subnetwork of CPI kiosks; (6) building Kiosk Advertising Campaigns by placing ad spot orders to be run on a specified subnetwork of CPI kiosks; (10) running and displaying Kiosk Advertising Campaigns on the retailer-authorized subnetwork of CPI kiosks, (11) modifying Kiosk Advertising Campaigns, and (12) monitoring the performance of Kiosk Advertising Campaigns; central UPN/TM/PD/URL RDBMS 9'; a plurality of Web-enabled client subsystems 13 operably connected to the infrastructure of the Internet as described hereinabove, for use by advertisers to access subsystem 502 and central UPN/TM/PD/URL RDBMS 9' from anywhere on Earth.

As shown in FIG. 29, the Internet-Based Consumer Product Advertisement Marketing, Programming, Management And Delivery Subsystem 502 of the illustrative embodiment supports a number of information services for advertisers, namely:

Registering Advertiser and Creating an Advertiser Account;

Logging-into the system by Advertiser;

Displaying General Kiosk Advertising Directory

Identifying CPI Kiosks on which the Advertiser is Authorized to Display Advertisements on Consumer Products;

Displaying Brand Kiosk Advertising Directory

Identifying CPI Kiosks on which the Advertiser is Authorized to Display Advertisements on a Particular Brand of Consumer Products;

Registering a Kiosk Advertising Campaign to be displayed on a Retailer-Authorized Subnetwork of CPI Kiosks;

Building a Kiosk Advertising Campaign by Placing Ad spot Orders to be run on a Particular Subnetwork of CPI Kiosks;

Running and Displaying Kiosk Advertising Campaign on Retailer-Authorized Subnetwork of CPI Kiosks;

Modifying Kiosk Advertising Campaign; and

Monitoring the Performance of Kiosk Advertising Campaign

In the illustrative embodiment, these functions are supported by the product Kiosk Advertisement Marketing/Sales/Management (http) server 507 which is made accessible to advertisers (e.g. manufacturer and/or retailer marketing personnel, advertising agents, etc.) through a Web-based GUI, using any Web-enabled client computer subsystem 13. An exemplary GUI for this subsystem 502 is illustrated in FIG. 30. As shown therein, the GUI 620 for subsystem 502 can be realized as a Netscape-style three frame display framework, comprising: a thin upper horizontal display frame 621 containing a graphical image indicating the name of the WWW site (e.g. "BrandKey Display™ Subsystem For Advertisers") at which subsystem 502 is located; a thin vertical control frame 622 having a set of buttons 622A-622G for enabling the various functions provided by subsystem 502; and a large information display frame 623 for displaying HTML-encoded pages used to construct the graphical interfaces associated with the various functions supported by this subsystem.

To access the information services provided by the product advertisement marketing/sales (http) server 607, the advertiser first selects function button 622A and registers with the subsystem, at which time it is assigned a password. Thereafter, the registered advertiser logs into the subsystem by selecting function button 622B and using its user name and password. Once logged-in, the advertiser may display and view two different kinds of directories, namely: a General Kiosk Advertising Directory by function button 622C which can be used to identify CPI Kiosks on which the advertiser is authorized to display advertisements on consumer products; and a Brand Kiosk Advertising Directory by function button 622D which can be used to identify CPI kiosks on which the advertiser is authorized to display advertisements on a particular brand of consumer products.

The data processing methods used to generate the General and Brand Kiosk Advertising Directories from the data contained with the UPN/TM/PD/URL RDBMS 9' are shown in FIGS. 31 through 34B.

As described in FIGS. 31 through 32B, a request for a general kiosk advertising directory will include the advertiser's identification number. The displayed directory includes only (physical and virtual) kiosks on which the registered advertiser is authorized by retailers to place ad spot orders for execution and display. This directory can be used by the certified/registered advertiser to determine in which retail stores, and on what CPI kiosks, the advertiser is permitted to place Advertisement (Ad) spot orders and thus build kiosk-based advertising campaigns using such retailer-based CPI kiosks. The details of this data processing method will be described below with reference to FIGS. 32A and 32B.

As indicated at Block A in FIG. 32A, the first step of the data-processing based method of generating a generalized-type kiosk advertisement directory involves the registered advertiser, using a Web-enabled client subsystem, to transmit a general kiosk advertisement directory request to the Advertisement Slot Marketing/Sales/Management Web server 507. In the illustrative embodiment, this would involve switching the Web server 507 to its Generate Generalized Kiosk Advertisement Directory Mode by clicking on button 622C in control strip of the GUI of FIG. 30. As indicated in FIG. 31, this request includes the advertiser's identification number.

As indicated at Block B in FIG. 32A, the data processing subsystem 517 integrated with the UPN/TM/PD/URL RDBMS 9' of FIG. 13 receives and parses this directory request to determine the advertiser's identification number.

Then at Block C in FIG. 32A, the data processing subsystem 517 uses the data tables of FIG. 15I and the advertiser's identification number to determine the list of manufacturers (by their MINs) who have retained the identified advertiser as their agents.

At Block D in FIG. 32A, the data processing subsystem 517 determines, for each MIN obtained at Block C, the physical and virtual CPI kiosks on which the hosting retailers have authorized to place product advertisements.

Then, at Block E in FIG. 32B, the data processing subsystem 517 uses the ascertained MINs and manufacturer aisle/shelf rights/privileges recorded within the UPN/TM/PD/URL RDBMS 9' to determine those physical and virtual CPI kiosks on which the advertiser may order advertisements about products of manufacturers who have been granted such rights/privileges. This list of physical and virtual CPI kiosks is then compiled to produce the generalized kiosk advertisement directory for transmission to the requesting advertiser.

Notably, as the relationships between particular manufacturers and particular retailers, and particular manufacturers and particular advertising agents will typically change over time, so too will the CPI kiosks listed in the general kiosk advertising directory generated for a particular registered advertiser. With knowledge of where the registered advertiser is authorized to advertise on behalf of its client (e.g. manufacturer or retailer), the advertiser is able to efficiently extend its product advertising campaigns into both physical and virtual retail shopping environments, while preserving the aisle/shelf rights/privileges granted by retailers to manufacturers typically during wholesale product purchase transactions.

As described in FIGS. 33 through 34B, a request for a brand kiosk advertising directory will include the advertiser's identification number and the trademark of a brand of product on which the advertiser is soliciting a brand kiosk advertising directory. The displayed directory includes only (physical and virtual) kiosks on which the registered advertiser is authorized by retailers to place ad spot orders for execution and display. This directory can be used by the certified/registered advertiser to determine in which retail stores, and on what CPI kiosks, the advertiser is permitted to place ad spot orders on the specified brand of product and thus build kiosk-based advertising campaigns on the specific brand using such retailer-based CPI kiosks. The details of this data processing method will be described below with reference to FIGS. 34A and 34B.

As indicated at Block A in FIG. 34B, the first step of the data-processing based method of generating a brand-type kiosk advertisement directory involves the registered advertiser, using a Web-enabled client subsystem, to transmit a brand kiosk advertisement directory request to the Advertisement Slot Marketing/Sales/Management Web server 507. In the illustrative embodiment, this would involve switching the Web server 507 to its Generate Brand Kiosk Advertisement Directory Mode by clicking on button 622D in control strip of the GUI of FIG. 30. As indicated in FIG. 33, this request includes (i) the trademark(s)—brand name(s)—of products to be covered in the kiosk advertising directory, and the (ii) the advertiser's identification number.

As indicated at Block B in FIG. 34A, the data processing subsystem 517 integrated with the UPN/TM/PD/URL RDBMS 9' of FIG. 13 receives and parses this directory request to determine the trademark(s) of products to be covered in the kiosk advertising directory, and also the advertiser's identification number.

Then at Block C in FIG. 34A, the data processing subsystem 517 uses the data tables in the UPN/TM/PD/URL RDBMS and the advertiser's identification number to which consumer products carry such trademarks (i.e. brand names) and also the UPNs and MINs of the manufacturers of such trademarked (i.e. branded) products.

At Block D in FIG. 34A, the data processing subsystem 517 uses the MINs determined at Block C to determine the list of physical and virtual CPI kiosks in which manufacturers identified by said MINs having aisle/shelf rights/privileges to display product advertisements.

Then, at Block E in FIG. 34B, the data processing subsystem 517 uses the list of CPI kiosks ascertained at Block D to compile the generalized kiosk advertisement directory for transmission to the requesting advertiser.

Notably, as the relationships between particular pairs of manufacturers and retailers, and particular pairs of manufacturers and advertising agents will typically change over time, so too will the CPI kiosks listed in the brand kiosk advertising directory generated for a particular registered advertiser. With knowledge of where the registered advertiser is authorized to advertise on behalf of its client (e.g. manufacturer or retailer), the advertiser is able to efficiently extend its product advertising campaigns on the specified brand into both physical and virtual retail shopping environments, while preserving the aisle/shelf rights and privileges granted by retailers to manufacturers typically during wholesale product purchase transactions.

Equipped with such kiosk advertising directories, the advertiser is then selects the Build Kiosk Advertising Campaign Mode of subsystem 502 by selecting function button 622E, in which the certified/registered advertiser places ad spot orders to be run on a particular subnetwork of retailer-authorized CPI kiosks indicated in the custom-displayed kiosk advertising directories described above. In this mode of information service, a different GUI will be displayed to the advertiser to enable the construction of a registered kiosk advertising campaign, which will be assigned a unique Kiosk Advertising Campaign Number. Notably, each multi-media advertisement spot ordered to run in a particular advertisement campaign can be realized in variety of different ways and to have a variety of different formats, but is expected that particular standards and preferences will naturally evolve in the industry as the present invention is commercially realized. For example, the "advertisement spot" creation and development tools taught herein in connection with the retail-based network of retailer-operated product promotion/advertisement kiosks shown in FIG. 3A18, and disclosed supra. can be used to create suitable product advertisement and product advertisement spots (i.e. digital content) which can be linked into the UPN/TM/PD/URL RDBMS 9', and ultimately delivered to consumers in retail environments through the use of multi-mode CPI kiosks of the present invention. Notably, other techniques can be used to create advertising spot content for linking within the UPN/TM/PD/URL RDBMS 9' and display on multi-mode CPI kiosks connected to retailer LANs or WANs as disclosed, for example, in FIGS. 3A17 and 3A18.

Thereafter, the advertiser selects function button 622 to run and display the registered kiosk advertising campaign on an retailer-authorized subnetwork of multi-mode CPI kiosks.

In subsystem 502, the price of each randomly-allocated "product advertising/promotion slot" 525 on a particular retailer CPI kiosk 513 will be based on several factors, such as for example: (1) the amount of "consumer-activity" (i.e. the number of consumer product information requests made/placed) at the particular kiosk over, for example, the preceding month or so, so that kiosks which are more frequently used to make consumer product information request will have higher advertising fees associated with advertising slots maintained in its advertising queue; and (2) the number of product advertising campaigns created and scheduled to run (on a given day) within a particular retail store. Typically, at the beginning of each month, the retailer hosting the barcode-driven CPI kiosk will be given the option to reserve (i.e. purchase) a particular number of product advertising/promotion slots on each CPI kiosk 513 deployed within its retail stores.

The subsystem 502 also will automatically issue advertising fee credits to advertiser's accounts if and when a product advertisement spot, once displayed during a randomly-assigned/opened product advertisement/promotion slot is interrupted by a consumer requesting consumer product information (from the CPI kiosk) on a consumer product which is not related to the manufacturer of the product about which the advertisement is being displayed. No advertising fee credits will be issued to the advertiser's account if and when a product advertisement, once displayed during a randomly-opened product advertising/promotion slot, is interrupted by a consumer requesting consumer product information (from the CPI kiosk) on a consumer product which is related to the manufacturer whose product advertisement is being displayed. If the purchased product advertisement, loaded into a purchased product advertisement slot within a particular kiosk's advertisement/promotion queue 525, is not displayed over the retailer's CPI kiosks 513 when scheduled for display, then the price paid for the product advertisement will be automatically refunded to the advertiser, or the scheduled product advertisement can be rescheduled for display on an alternative display date(s), in accordance with the advertiser's instructions.

Once a kiosk advertising campaign has been ordered to run, the advertiser can enter the Modify Kiosk Advertising Campaign Mode of subsystem 502 by selecting function button 622G, wherein the advertiser is provided the opportunity to modify any one of its registered kiosk advertising campaigns, using a Web-enabled client computer subsystem 13.

Once a kiosk advertising campaign has run or is running, the advertiser can enter the Monitor Kiosk Advertising Campaign Performance Mode of subsystem 502 by selecting function button 622H, and monitor the performance of any one of the advertiser's kiosk advertising campaigns, using a Web-based client computer.

In the illustrative embodiments, consumer product advertising services can be delivered to consumers in retail stores by two different techniques: (1) by way of a retail WWW site served from a CPI kiosk; or (2) by way of a virtual kiosk having a product advertising script linked (by the advertiser) to underlying CPIR-enabling Applet tag, which is automatically launched when a consumer clicks upon the CPIR-enabling Applet tag embedded within the HTML-fabric of the WWW. In either case, when the suite of information services are delivered to consumers in the retailer's environment, the UPC/TM/PD/URL RDBMS 9' participates in the subsystem by employing data processing methods (e.g. scripts), illustrated in FIGS. 25 through 28B, which automatically filter out (i.e. block) from this retailer's environment, all products advertisements relating to manufacturers not represented by the retailer. By not permitting advertisers to display such UPC-indexed advertisements in product advertising/promotion slots on the retailer's CPI kiosks, the subsystem 502 provides the manufacturer and its advertising agents (and retailers as well) with an opportunity to positively influence product demand and sales without infringing on the dignity of the consumer or compromising the trust and goodwill developed between the manufacturer and its retailers along the retail supply and demand chain.

Detailed Description of the Internet-Based Consumer Product Promotion Marketing, Programming and Delivery Subsystem of the Second Illustrative Embodiment of Present Invention As shown in FIGS. 9A, 11, and 13, the Consumer Product Related Promotion Marketing, Programming and Delivery Subsystem 503 comprises: a web-based product Kiosk Promotion Marketing/Sales/Management (http) server 508 for (1) registering promoters and the creating promoter accounts; (2) logging into the subsystem by promoter; (3) displaying General Kiosk Promotion Directories and identifying CPI kiosks on which the promoter is authorized to display promotions on consumer products; (4) displaying Brand Kiosk Promotion Directories and identifying CPI kiosks on which the promoter is authorized to display advertisements on a particular brand of consumer products; (5) registering Kiosk Promotion Campaigns to be displayed on an (initially-unspecified) retailer-authorized subnetwork of CPI kiosks; (6) building Kiosk Promotion Campaigns by placing promo spot orders to be run on a specified subnetwork of CPI kiosks; (10) running and displaying kiosk promotion campaigns on the retailer-authorized subnetwork of CPI kiosks; (11) modifying kiosk promotion campaigns; and (12) monitoring the performance of kiosk promotion campaigns.

As shown in FIG. 35, the Internet-Based Consumer Product Promotion Marketing, Programming, Management And Delivery Subsystem 503 of the illustrative embodiment supports a number of information services for promoters, namely:

- Registering Promoter and Creating a Promotion Account;
- Logging-into the system by Promoter;
- Displaying General Kiosk Promotional Directory;
- Identifying CPI Kiosks on which the Advertiser is Authorized to Display Promotions for Consumer Products;
- Displaying Brand Kiosk Promotional Director;
- Identifying CPI Kiosks on which the Advertiser is Authorized to Display Promotions for a Particular Brand of Consumer Products;
- Registering a Kiosk Promotion Campaign to be displayed on a Retailer-Authorized Subnetwork of CPI Kiosks;
- Building a Kiosk Promotion Campaign by Placing Promotional spot Orders to be run on a Particular Subnetwork of CPI Kiosks;
- Running and Displaying Kiosk Promotion Campaign on Retailer-Authorized Subnetwork of CPI Kiosks;
- Modifying Kiosk Promotion Campaign; and
- Monitoring the Performance of Kiosk Promotion Campaign In the illustrative embodiment, these functions are supported by the product Kiosk Promotion Marketing/Sales/Management (http) server 508 which is made accessible to promoters (e.g. retailer marketing personnel, manufacturer marketing personnel, etc.) through a Web-based GUI, using any Web-enabled client computer subsystem. An exemplary GUI for this subsystem 503 is illustrated in FIG. 36. As shown therein, the GUI 630 for subsystem 503 can be realized as a Netscape-style three frame display framework, comprising: a thin upper horizontal display frame 631 containing a graphical image indicating the name of the WWW site (e.g. "BrandKey Promote™ For Promoters") at which subsystem 503 is located; a thin horizontal control frame 632 having a set of buttons 633A through 633G for enabling the various functions provided by subsystem 503; and a large information display frame 634 for displaying HTML-encoded pages used to construct the graphical interfaces associated with the various functions supported by this subsystem.

To access the information services provided by the product Kiosk Promotion Marketing/Sales/Management (http) server 508, the promoter registers with the subsystem by selecting function button 633A, at which time it is assigned a password. Thereafter, the registered promoter logs into the subsystem 503 by selecting function button 633B and using its user name and password. Once logged-in, the promoter may display and view two different kinds of directories, namely: a General Kiosk Promotion Directory (selected by function button 633C) which can be used to identify CPI kiosks on which the promoter is authorized to display promotions on consumer products; and a Brand Kiosk Promotion Directory (selected by function button 633D) which can be used to identify CPI Kiosks on which the promoter is authorized to display promotions on a particular brand of consumer products.

The data processing methods used to generate the General and Brand Kiosk Promotion Directories from the data contained with the UPN/TM/PD/URL RDBMS 9' are shown in FIGS. 37 through 40B.

As described in FIGS. 37 through 38B, a request for a general kiosk promotion directory will include the promoter's identification number. The displayed directory includes only (physical and virtual) kiosks on which the registered promoter is authorized by retailers to place promotion (promo) spot orders for execution and display. This directory can be used by the certified/registered promoter to determine in which retail stores, and on what CPI kiosks, the promoter is permitted to place promo spot orders and thus build kiosk-based promotion campaigns using such retailer-based CPI kiosks. The details of this data processing method will be described below with reference to FIGS. 38A and 38B.

As indicated at Block A in FIG. 38A, the first step of the data-processing based method of generating a generalized-type kiosk promotion directory involves the registered promoter, using a Web-enabled client subsystem, to transmit a general kiosk promotion directory request to the promotion spot marketing/sales/management web server 508. In the illustrative embodiment, this would involve switching the Web server 508 to its Generate Generalized Kiosk Promotion Directory Mode by clicking on button 633C in control strip 632 of the GUI of FIG. 36. As indicated in FIG. 36, this request includes the promoter's identification number.

As indicated at Block B in FIG. 38A, the data processing subsystem 517 integrated with the UPN/TM/PD/URL RDBMS 9' of FIG. 13 receives and parses this directory request to determine the promoter's identification number.

Then at Block C in FIG. 38A, the data processing subsystem 517 uses the data tables of FIG. 15J and the promoter's identification number to determine the list of manufacturers (by their MINs) who have retained the identified promoter as their agents.

At Block D in FIG. 38B, the data processing subsystem 517 determines, for each MIN obtained at Block C, the physical and virtual CPI kiosks on which the hosting retailers have authorized to place product promotions.

Then, at Block E in FIG. 38B, the data processing subsystem 517 uses the ascertained MINs and manufacturer aisle/shelf rights/privileges recorded within the UPN/TM/PD/URL RDBMS 9' to determine those physical and virtual CPI kiosks on which the promoter may place promotions about products of manufacturers who have been granted such rights/privileges. This list of physical and virtual CPI kiosks is then compiled to produce the generalized kiosk promotion directory for transmission to the requesting advertiser.

Notably, as the relationships between particular manufacturers and particular retailers, and particular manufacturers and particular promotional agents will typically change over time, so too will the CPI kiosks listed in the general kiosk promotion directory generated for a particular registered promoter. With knowledge of where the registered promoter is authorized to promote on behalf of its client (e.g. retailer or manufacturer), the promoter is able to efficiently extend its product promotion campaigns into both physical and virtual retail shopping environments, while preserving the aisle/shelf rights/privileges granted by retailers to manufacturers typically during wholesale product purchase transactions.

As described in FIGS. 39 through 40B, a request for a brand kiosk promotion directory will include the promoter's identification number and the trademark of a brand of product on which the promoter is seeking a brand kiosk promotion directory. The displayed brand kiosk advertising directory includes only (physical and virtual) kiosks on which the registered promoter is authorized by retailers to place promotion spot orders for execution and display. This directory can be used by the certified/registered promoter to determine in which retail stores, and on what CPI kiosks located therein, the promoter is permitted to place promotion spot orders on the specified brand of product and thus build kiosk-based promotion campaigns on the specific brand using such retailer-based CPI kiosks. The details of this data processing method will be described below with reference to FIGS. 40A and 40B.

As indicated at Block A in FIG. 40A, the first step of the data-processing based method of generating a brand-type kiosk promotion directory involves the registered promoter, using a Web-enabled client subsystem, to transmit a brand kiosk promotion directory request to the promotion spot marketing/sales/management web (http) server 508. In the illustrative embodiment, this would involve switching the Web server 508 to its Generate Brand Kiosk Promotion Directory Mode by clicking on button 633D in control strip of the GUI of FIG. 30. As indicated in FIG. 39, this request includes (i) the trademark(s)—brand name(s)—of products to be covered in the kiosk promotion directory, and the (ii) the promoter's identification number.

As indicated at Block B in FIG. 40A, the data processing subsystem 517 integrated with the UPN/TM/PD/URL RDBMS 9' of FIG. 13 receives and parses this directory request to determine the trademark(s) of products to be covered in the kiosk promotion directory, and also the promotion identification number.

Then at Block C in FIG. 40A, the data processing subsystem 517 uses the data tables in the UPN/TM/PD/URL RDBMS and the promotion identification number to which consumer products carry such trademarks (i.e. brand names) and also the UPNs and MINs of the manufacturers of such trademarked (i.e. branded) products.

At Block D in FIG. 40A, the data processing subsystem 517 uses the MINs determined at Block C to determine the list of physical and virtual CPI kiosks in which manufacturers identified by said MINs have aisle/shelf rights/privileges to display product promotions.

Then, at Block E in FIG. 40B, the data processing subsystem 517 uses the list of physical and virtual CPI kiosks ascertained at Block D to compile the generalized kiosk promotion directory for transmission to the requesting promoter.

Notably, as the relationships between particular manufacturers and particular retailers, and particular manufacturers and particular promotional agents will typically change over time, so too will the CPI kiosks listed in the brand kiosk promotion directory generated for a particular registered promoter. With knowledge of where the registered promoter is authorized to promote on behalf of its client (e.g. manufacturer or retailer), the promoter is able to efficiently extend its product promotion campaigns on the specified brand into both physical and virtual retail shopping environments, while preserving the aisle/shelf rights/privileges granted by retailers to manufacturers typically during wholesale product purchase transactions.

Equipped with such kiosk promotion directories, the promoter then selects the function button 633E, activating the Build Kiosk Promotion Campaign Mode of subsystem 503, in which the certified/registered promoter places promo spot orders to be run on a particular subnetwork of retailer-authorized CPI kiosks indicated in the custom-displayed kiosk promotion directories described above. In this mode of information service, a different GUI will be displayed to the promoter to enable the construction of a registered Kiosk Promotion Campaign, which will be assigned a unique Kiosk Promotion Campaign Number.

Notably, each multi-media promotion spot ordered to run in a particular promotion campaign can be realized in variety of different ways and to have a variety of different formats, but it is expected that particular standards and preferences will naturally evolve in the industry as the present invention is commercially realized. For example, the "promotion spot" creation and development tools taught herein in connection with the retail-based network of retailer-operated product promotion/advertisement kiosks shown in FIG. 3A18, and disclosed supra., can be used to create suitable product advertisement and product promotion spots (i.e. digital content) which can be linked into the UPN/TM/PD/URL RDBMS 9', and ultimately delivered to consumers in retail environments through the use of multi-mode CPI kiosks of the present invention. Notably, other techniques can be used to create advertising and promotional spot content for linking within the UPN/TM/PD/URL RDBMS 9' and display on multi-mode CPI kiosks connected to retailer LANs and WANs as disclosed, for example, in FIGS. 3A17 and 3A18. The format for such product promotion spots can be as taught in FIG. 3A21A, but it is understood that other formats are possible and expectedly will be used to practice the principles of the present invention.

Thereafter, the promoter runs and displays the registered Kiosk Promotion Campaign on a retailer-authorized subnetwork of CPI kiosks.

In subsystem 503, the price paid for each randomly-allocated product promotion slot on a particular retailer CPI kiosk 513 will be based on several factors, as well, such as for example: the number of product promotion campaigns created and scheduled to run (on a given day) within a particular retail store. Typically, at the beginning of each month, the retailer will be given the option to reserve (i.e. purchase) a particular number of "product promotion slots" on each CPI kiosk deployed within its retail stores. After the option purchase period, the retailer will then have agreed to purchase product promotion slots on CPI kiosks deployed within its stores according to a fee structure determined by the number of product information requests made and product advertising/promotion slots purchased on its CPI kiosks.

The subsystem 503 will automatically issue promotion fee credits to the advertiser's account if and when a product promotion, once displayed during a randomly-assigned/opened "product advertising/promotion slot", is interrupted by a consumer requesting consumer product information (from the CPI kiosk) on a consumer product which is not related to the manufacturer of the product about which the promotion is being displayed. No promotion fee credits will be issued to retailers (accounts) if and when a product promotion, once displayed during a randomly-opened product advertising/promotion slot, is interrupted by a consumer requesting consumer product information (from the CPI kiosk) on a consumer product which is related to the manufacturer whose product promotion is being displayed. If product promotions loaded into purchased product advertising/promotion slots within a particular kiosk's advertisement/promotion spot queue are not displayed over the retailer's CPI kiosks when scheduled for display, then the price paid for the product promotion will be automatically refunded to the retailer, or the scheduled product promotion can be rescheduled for display on an alternative display date(s), in accordance with the retailer's instructions.

Once a kiosk promotion campaign has been ordered to run, the advertiser can enter the Modify Kiosk Promotion Campaign mode of subsystem 50 at anytime by selecting function button 633F, and modify any one of its registered Kiosk Promotion Campaigns, using a Web-enabled client computer subsystem.

Once a kiosk promotion campaign has run or is running, the promoter can enter the Monitor Kiosk Promotion Campaign Performance Mode of subsystem 603, by selecting the function button 633G, and monitor the performance of any one of its Kiosk Promotion Campaign, using a Web-based client computer.

In the illustrative embodiment, the product promotion services of subsystem 503 can be delivered to consumers in retail stores by two different techniques: (1) by way of a retail WWW site served from a CPI kiosk; or optionally (2) by way of a virtual kiosk having a "product promotion script" (linked thereto by the e-retailer) that is automatically launched when a consumer clicks upon the underlying CPIR-enabling Applet tag embedded within the HTML fabric of the EC-enabled retail shopping environment. In either case, when the suite of information services are delivered to consumers in the retailer's environment, the UPC/TM/PD/URL RDBMS 9' participates in the subsystem 503 by employing data processing methods (e.g. scripts), illustrated in FIGS. 25 through 28B, which automatically filter out (i.e. block) from this retailer's environment, all products promotions relating to manufacturers not represented by the retailer. By not permitting promoters to display such UPC-indexed promotions in product advertising/promotion slots on the retailer's CPI kiosks 513, 514, the subsystem 503 provides the retailer and its promotional agents (and the manufacturer's promotional agents as well) with an opportunity to positively influence product demand and sales without infringing on the dignity of the consumer or compromising the trust and goodwill developed between the manufacturer and its retailers along the retail supply and demand chain.

Generalized Operation of the Integrated Consumer Product Electronic Marketing, Merchandising and Education System of the Second Illustrative Embodiment of the Present Invention In the integrated consumer product electronic marketing, merchandising and education/information system of the present invention 2' illustrated in FIGS. 9A through 40B, different events can be programmed to happen whenever a consumer establishes contact with either a physical or virtual "multi-mode" CPI kiosk of the present invention 513, 514, described in detail hereinabove. Two general cases will be considered below.

For example, when a consumer establishes contact with a physical "multi-mode" CPI kiosk hereof in a retailer's physical shopping environment, the consumer might be shown either: (1) a product advertisement ordered by the manufacturer of the product sold in the retailer's store, the advertising agent of the manufacturer, the retailer, or the retailer's advertising agent; or (2) a product promotion ordered by the retailer, the retailer's promotional agent, the manufacturer of the promoted product sold in the retailer's store, or the manufacturer's promotional agent. However, in either case, the consumer can automatically interrupt the product advertisement or promotion by (i) scanning the UPC label on a consumer product using the physical kiosk's integrated bar code scanner, (ii) clicking on the "CPI Request" button on the physical kiosk's GUI, or (iii) touching the integrated touch-screen display panel of the physical CPI kiosk.

When a consumer establishes contact with a virtual "multi-mode" CPI kiosk hereof displayed in a virtual retail shopping environment, the consumer might be shown either: (1) a product advertisement ordered by the manufacturer of the product sold in the retailer's store, the advertising agent of the manufacturer, the retailer, or the retailer's advertising agent; or (2) a product promotion ordered by the retailer, the retailer's promotional agent, the manufacturer of the promoted product sold in the retailer's store, or the manufacturer's promotional agent. In either case, the consumer can automatically interrupt the product advertisement or promotion by (i) clicking on the product advertisement or promotion, or (ii) clicking on the "CPI Request" button on the virtual kiosk's GUI.

In each of these two different cases, the CPI kiosk is enabled to deliver more than one mode of information service, i.e. more than just CPI service, but also consumer product advertisement service and/or consumer product promotion service. For this reason, the CPI kiosks are said to be "multi-mode" CPI kiosks, by virtue of the multiple modes of information service in which they can operate in retail and other environments.

In the Internet-based system of FIG. 9, access to each of the four Internet-based subsystem components 501, 502, 503 and 504 described in detail above can be achieved by providing (i) a "system home-page" for the overall functionally-integrated system 2' shown in FIGS. 9A through 13, and (ii) individual "subsystem home-pages" for each of the four separate subsystems thereof, wherein hyperlinks are provided between each subsystem home-page and the system home-page.

While each subsystem 501, 502, 503 and 504 shown in FIG. 9A can host its own WWW site, as indicated above, each subsystem is operably connected to and is driven by the common UPN/TM/PD/URL RDBMS 9' described in detail above. By virtue of this common UPN/TM/PD/URL RDBMS 9', the product functions supported by the component subsystems 501, 502, 503 and 504 can be completely integrated within a single system, as described hereinabove. This unique feature of the present invention enables, for the first time ever, manufacturers, manufacturer advertising agents, retailers, retailer advertising agents, retailer promotional agents and manufacturer promotional agents to carry out diverse product related functions using consumer product related information on the Internet which marketing, brand and product managers of manufacturers have linked to the UPNs, trademarks and generic product descriptors of their consumer products, as part of a novel way to project the. For the first time in history, this revolutionary approach to consumer product education, marketing and merchandising enables a manufacturer's marketing, brand and/or product managers to project a coherent brand image of their products to consumers worldwide, substantially independent of the level of knowledge and skill of the retailers, advertising agents and promotional agents of the manufacturer. This translates to value to all those participating on the demand side of the retail chain.

Referring to FIGS. 41 through 42C, the three primary modes of display operation (i.e. CPI Display Mode, Advertisement Spot Display Mode, and Promotion Spot Display Mode) associated with a "multi-mode" physical CPI kiosk 513 of the present invention will be described in greater detail.

In general, the form factor of the multi-mode CPI kiosk of the present invention 513 can be realized in a variety of different ways. For example, any of the kiosk designs shown in FIGS. 3A19C, 3A3, 3A4 and/or 3A10B can be readily programmed with a CPI Display Mode, an Advertisement Spot Display Mode, and/or a Promotion Spot Display Mode as taught herein. It is understood, however, that any Web-enabled computer provided with a retail-based interactive display can be readily adapted and programmed for deployment within the global network of retail multi-display mode CPI kiosks organized in accordance with the principles taught herein. Thus, while it is preferred that ultra-compact, ultra-thin, light-weight LCD panel based CPI kiosks are employed in the practice of the present invention, because they can be easily embedded within or supported upon the store shelving structures employed in retail stores, it is understood that any desktop computer, such as the iMac™ desktop computer from Apple Computer, Inc., or any other PC computer, once properly programmed, can be configured and deployed as a multi-mode CPI kiosk in accordance with the principles of the present invention.

In FIG. 42A, there is shown an exemplary GUI screen 640 which is displayed on the multi-mode physical CPI kiosk 513 shown in FIG. 41 during its Advertisement Spot Display Mode of operation. Notably, GUI screen 640 is similar to that shown in FIG. 21A. In this mode of operation, purchased advertisement spots 641, which have been loaded in the physical CPI kiosk's advertisement/promotion spot queue, are automatically displayed in the information display frame 642 of the physical kiosk GUI 640 during the kiosk's quiescent moments of operation (i.e. when consumers are not making CPI requests with the kiosk).

In FIG. 42B, there is shown an exemplary GUI screen 644 which is displayed on the multi-mode physical CPI kiosk shown in FIG. 41 during its Promotion Spot Display Mode of operation. Notably, GUI 644 is similar to that shown in FIG. 21B. In this mode of operation, purchased promotion spots 645, which have been loaded into the physical CPI kiosk's advertisement/promotion spot queue, are automatically displayed in the information display frame 642 of the physical kiosk GUI during the kiosk's quiescent moments of operation (i.e. when consumer are not making CPI requests). At any instant in time, either an advertisement spot or promotion spot can be displayed within the information display frame of the kiosk GUI. In accordance with the principles of the present invention, the advertisement or promotion spot displayed on a particular retail multi-mode kiosk will be related to a product or product brand by a manufacturer who has been granted aisle/shelf rights/privileges by the retailer, thereby acquiring the right/privilege to display, or have displayed (by its agents), advertisements and/or promotions relating to the manufacturer's (i.e. vendor's) products.

Depending on the design of the physical CPI kiosk, various conditions at the kiosk can terminate the currently active Advertisement Spot Display Mode or the Promotion Spot Display Mode, and activate its CPI Display mode, namely: touching the touch-screen display screen within its information display frame, within which the advertisement or promotion is displayed; manually selecting search mode/function selection buttons 557 through 561 and 573 displayed in the horizontal control frame; or reading a bar code symbol label on a consumer product using the scanner integrated within the CPI kiosk 513; etc.

The operation of the multi-mode CPI kiosk of the illustrative embodiment can be summarized by the following rules of operation: (1) if a consumer touches the information display frame 642 on the touch-screen (i.e. interactive) GUI 640 or 644, then the multi-mode CPI kiosk will automatically display the GUI 650 shown in FIG. 42C, enabling the consumer to conduct a CPI search against the UPN/TM/PD/URL RDBMS 9'; if a consumer manually selects any search mode selection button 593A through 593D displayed in the horizontal control frame 646 of the GUI shown in FIG. 42C, then the multi-mode CPI kiosk will automatically display a corresponding search display screen in the information display frame 642 as shown, for example, in FIGS. 18A and 18B (e.g. enabling a UPN-directed search, a TM-directed search, or a PD-directed search, or home-page(HP) directed search, as a the case may be); if a consumer touches the (retail) sponsor frame 647 at the top of the kiosk GUI shown in FIG. 42C, then the CPI kiosk 513 or 514 will automatically display (within the information display frame) the home-page of the kiosk-hosting retailer, or some other preprogrammed interactive retail display screen; and if the a consumer reads a (UPC or UPC/EAN) bar code symbol label on a consumer product using the bar code symbol reader integrated within the CPI kiosk shown in FIG. 41, then the CPI kiosk will automatically display a UPN/TM/PD/URL link menu within the information display frame 642, having an interactive display format, shown, example, in FIG. 18A, described in detail hereinabove; and if the CPI kiosk does not experience any consumer input within a predetermined time period (e.g. 30-45 seconds), then the CPI kiosk will automatically display (in its information display frame) the next product advertisement or promotion spot loaded within the advertisement/promotion spot queue of the Web server driving the CPI kiosk, as shown in FIG. 13.

In FIG. 43, the system architecture is shown for an integrated product marketing, merchandising, and education/information system constructed in accordance with the principles of invention disclosed in the system shown in FIGS. 9 through 42C described above. Common system components shown in FIGS. 9-13 are referenced in FIG. 43 using like reference numerals.

Modifications of the Illustrative Embodiments of the Invention

The present invention has been described in great detail with reference to the above illustrative embodiments. It is understood, however, that numerous modifications will readily occur to those with ordinary skill in the art having had the benefit of reading the present disclosure.

The system shown in FIGS. 9 through 40B has four functionally integrated subsystems. However, in alternative embodiments of the present invention, it is contemplated that there are applications in which the advertising and promotion subsystems 503 and 504 may be eliminated from the system, while still providing a kiosk-based CPI system having great utility in many diverse applications. Also, subsystems 501 and 504 can be modified in various ways without departing from the principles of the present invention taught herein.

Notably, product advertisements and promotion orders loaded into the Advertisement/Promotion spot queues of CPI kiosks can be displayed in a preordered manner, rather than randomly, etc.

Having realized an UPN/TM/PD/URL RDBMS in accordance with the principles described above, numerous value-added applications can be built upon and around this RDBMS. For example, portable memory-type bar code scanners can be used to read UPC bar codes on products to create shopping lists of goods to be purchased or considered for purchased, as well as personalized stores containing descriptions of goods from which consumers can request more CPI and thereafter decide to purchase using EC-enabled transaction techniques described or well known in the art.

The system and method of the present invention has been shown to combine the use of UPNs, trademarks, product descriptions, and company names when making a consumer product information request of the system. It is understood, however, that the present invention can be practiced using any one of these items of information, alone or in combination with each other, in order to place a product information request with the system hereof.

Also, while the system of the illustrative embodiment has been shown used to collect, transport and distribute information related to consumer products, it is understood that the system can be used to link TMs, PDs and URLs of HTML (and other Internet) documents with consumer services assigned uniform service numbers (USN) which may be based on the UPC or EAN numbering system, or some other suitable system which may be constructed and implemented in the future. In such alternative embodiments, the RDBMS 9' would contain information pertaining to uniform service numbers (USN) that have been linked to the service marks (SMs), service descriptors (SDs) and URLs of HTML or like documents on the Internet by the manufacturer or its agents (e.g. vendors), in essentially the same manner as conducted for consumer products. Such USN/SM/SD/URL link creation, management and transport (LCMT) operations can be carried out in a similar to that described in connection with UPN/TM/PD/URL link creation, management and transport along the retail supply and demand chain. In this alternative embodiment of the present invention, system 2' would remain substantially the same except the term “product” would be replace by “service” and the term “manufacturer” will be replaced by the term “service provider”, “vendor” or the like. In yet a embodiment of the present invention, UPNs associated with particular “products” and USNs associated with particular “services” can be linked to TM/PD/URL links and SM/SD/URL links, respectively, to provide a hybrid-type consumer product and service marketing, promotion, and education/information system.

In connection with the consumer service information (CSI) embodiments of the present invention, it is understood that at present, few (if any) services have been assigned a UPC (or EAN) number in the manner that nearly all consumer products have been assigned in the contemporary period. In spite of this fact, however, the present invention contemplates the need and utility of widespread assignment of UPC, EAN or similar numbers by service providers to particular services (as well as the imprinting of UPC, EAN, UPC/EAN or similar symbols on printed service brochures and advertisements). Notably, assigning uniform service numbers (USNs) to particular services, and labeling printed and graphical brochures and advertisements with such universal numbers, will provide a number of new opportunities hitherto unavailable.

In particular, service-related information could be easily found (i.e. located and accessed) on Web sites using the system and method of the present invention, and thereafter the service easily procured through an electronic data transaction. In accordance with the present invention, this can be achieved by uniquely identifying and assigning particular services by a Universal Service Code (USC), which has many if not all of the attributes of a conventional UPC, as well as others pertaining to services. While not necessary, a single digit may be optionally added to the USC in order to demark that services, rather than products, are being identified. An example of such USC labeling would be printing an assigned UPC label (number) on: admission tickets to a theatrical, dramatic or musical performance and/or its playbill; admission tickets to a movie; admission tickets to a concert and/or its concert program; admission tickets to a sporting event and/or its sports program; admission tickets to an art, science or history museum; admission tickets to the zoo or botanical gardens; and the like. The UPC label would be encoded to identify a particular event at which an entertainment, educational or professional service is provided. The UPC label printed on the tangible medium associated with the promotion of or access to the particular service would then be registered with the system hereof, along with the name of the provider of the service, and a list of URLs that identify the Web locations at which particular kinds of information related to the particular service can be found.

These and all other such modifications and variations are deemed to be within the scope and spirit of the present invention as defined by the accompanying claims to Invention.

What is claimed is:

1. A Web-based consumer product marketing communication network for managing and delivering consumer product marketing communications to consumers along E-Commerce (EC) enabled Web sites on the World Wide Web (WWW), wherein each said EC-enabled Web site includes a plurality of HTML-encoded pages containing images and/or text descriptions of a plurality of consumer products offered for sale through said EC-enabled Web sites, said Web-based consumer product marketing communication network comprising:

a first Web-based subsystem, operably connected to the infrastructure of the Internet, and configured to allow product management team members and/or authorize parties, associated with one or more of said plurality of consumer products, to create and deploy one or more Web-based Multi-Mode Virtual Kiosks (MMVKs) for said one or more of said plurality of consumer products;

wherein each said MMVK has a graphical user interface (GUI) that is characterized by a plurality of independently programmable display modes selected from the group consisting of (i) an advertising display mode for displaying one or more advertising spots, (ii) a promotional display mode for displaying one or more promotional spots, and (iii) a consumer product information (CPI) menu display mode for displaying a set of consumer product information (CPI) resources, wherein a plurality of Web-based information servers are operably connected to the infrastructure of the Internet, for serving a plurality of consumer product information (CPI) resources;

a database server, in communication with a first Internet-enabled information server, and for storing and managing a CPI link structure for each said consumer product, wherein each said CPI link structure includes (i) a consumer product identifier assigned to the consumer product, and (ii) a set of URLs specifying the location of said plurality of CPI resources on the WWW, and for programming said independently programmable display modes of said MMVK created and deployed for the consumer product identified by said consumer product identifier;

a second Web-based subsystem configured to allow said product management team members and/or said authorized parties to manage said CPI link structures for said one or more MMVKS, and independently program said set of CPI resources displayable during said CPI menu display mode of each said MMVK;

a third Web-based subsystem configured to allow said product management team members and/or said authorized parties to independently program the advertising and promotional display modes of each MMVK with one or more of said advertising spots and said promotional spots;

wherein each said MMVK is implemented employing (a) a computer-executable server-side component stored on said first Internet-enabled information server, and (b) a MMVK tag embedded within any of the HTML-encoded pages included in said BC-enabled Web sites, embodying a unique URL, and referencing said computer-executable server-side component;

wherein said computer-executable server-side component includes code specifying:

(i) a connection to said database server, and (ii) a CPI query to be executed on said database server, and dependent on the consumer product identifier assigned to said consumer product; and wherein, the Web-browser of the consumer is configured to process said MMVK tag embedded within an HTML-encoded page of at least one of said EC-enabled Web sites, wherein said computer-executable server-side component corresponding to the MMVK tag is configured to automatically execute, and wherein said first Internet-enabled information server is configured to generate the GUI of said MMVK for display on the Web browser, for review by the consumer at the EC-enabled Web site.

2. The Web-based consumer product marketing communication network of claim 1, wherein said consumer product identifier comprises a Universal Product Number (UPN) assigned to the consumer product.

3. The Web-based consumer product marketing communication network of claim 2, wherein said CPI link structure further comprises:

(iii) at least one Trademark (TM) assigned to the consumer product.

4. The Web-based consumer product marketing communication network of claim 1, wherein, for each MMVK created and deployed for a consumer product registered on said Web-based consumer product marketing communication network, the MMVK tag associated with the MMVK is embedded in a graphical component contained within one said HTML-encoded page.

5. The Web-based consumer product marketing communication network of claim 1, wherein, for each MMVK created and deployed for a particular consumer product on said Web-based consumer product marketing communication network, the computer-executable server-side component associated with the MMVK comprises a consumer product information (CPIR) requesting servlet loaded onto said first Internet-enabled information server.

6. The Web-based consumer product marketing communication network of claim 3, wherein said CPI link structure further comprises, for each consumer product, (iv) a Product Descriptor (PD) associated with the consumer product; and (v) a set of display attributes associated with each CPI resource associated with said CPI link structure.

7. The Web-based consumer product marketing communication network of claim 1, wherein said set of CPI resources are selected from the group consisting of product videos, audio files, product images, product specifications, product advertisements, and product promotions.

8. The Web-based consumer product marketing communication network of claim 6, wherein said set of display attributes are selected from the group consisting of text for said URLs, graphical icons displayed next to said URLs, and sound files associated with said URLs.

9. The Web-based consumer product marketing communication network of claim 1, wherein said first Web-based subsystem is further configured to allow said product management team members and/or said authorized parties to create and deploy one or more MMVKs for the consumer product, and then program the advertising and promotional display modes of said one or more MMVKs.

10. The Web-based consumer product marketing communication network of claim 6, wherein a supply-chain information management system, operably connected to the infrastructure of the Internet, is configured to import said Universal Product Number (UPN), said Trademark (TM) and said Product Descriptor (PD) associated with each said CPI link structure, into said database server.

11. The Web-based consumer product marketing communication network of claim 1, wherein the Web browser of the consumer is supported on a client computing machine selected from the group consisting of a desktop computer, a portable computer, a portable digital assistant (PDA), and mobile computer, and physical retail kiosk.

12. The Web-based consumer product marketing communication network of claim 1, wherein at least one said MMVK tag is embedded in an graphical component in said HTML-encoded page.

13. The Web-based consumer product marketing communication network of claim 1, which further comprises a plurality of EC-enabled information servers, operably connected to the infrastructure of the Internet, for supporting said plurality of EC-enabled Web sites selected from the group consisting of EC-enabled stores and EC-enabled online product catalogs.

14. The Web-based consumer product marketing communication network of claim 1, wherein said plurality of Web-based information servers are operably connected to the infrastructure of the Internet, and configured for storing and serving said one or more advertising spots, said one or more promotional spots and said set of CPI resources to said Web browser, for display to the consumer through said plurality of independently programmable display modes of each said MMVK.

15. The Web-based consumer product marketing communication network of claim 1, which further comprises a fourth Web-based subsystem configured to allow hosting of a plurality of said MMVK tags listed in a Web-based MMVK Tag Library served on the WWW.

16. The Web-based consumer product marketing communication network of claim 15, wherein an authorized party can download one or more of said MMVKs tags listed in said Web-based MMVK Tag Library, for subsequent embedding in one or more HTML-encoded pages.

17. The Web-based consumer product marketing communication network of claim 1, wherein said second Web-based subsystem is further configured to allow said product management team members and/or said authorized parties to register said plurality of consumer products with said Web-based consumer product marketing communication network, using said consumer product identifiers.

* * * * *